US009975465B2

(12) United States Patent
Rasmussen

(10) Patent No.: US 9,975,465 B2
(45) Date of Patent: May 22, 2018

(54) VEHICLE HAVING A BED LIFT IN A SLIDE-OUT ROOM

(71) Applicant: Lippert Components, Inc., Elkhart, IN (US)

(72) Inventor: C. Martin Rasmussen, Ogden, UT (US)

(73) Assignee: Lippert Components, Inc., Elkhart, IN (US)

( * ) Notice: Subject to any disclaimer, the term of this patent is extended or adjusted under 35 U.S.C. 154(b) by 0 days. days.

(21) Appl. No.: 15/480,349

(22) Filed: Apr. 5, 2017

(65) Prior Publication Data

US 2017/0210273 A1 Jul. 27, 2017

Related U.S. Application Data

(60) Division of application No. 15/191,982, filed on Jun. 24, 2016, which is a division of application No. (Continued)

(51) Int. Cl.

| | |
|---|---|
| ***B60P 3/39*** | (2006.01) |
| ***A47C 17/80*** | (2006.01) |
| ***A47C 19/04*** | (2006.01) |
| ***A47C 19/02*** | (2006.01) |
| ***A47C 20/04*** | (2006.01) |
| ***A47C 17/165*** | (2006.01) |
| ***A47C 17/34*** | (2006.01) |

(Continued)

(52) U.S. Cl.

CPC .............. *B60P 3/39* (2013.01); *A47C 17/165* (2013.01); *A47C 17/34* (2013.01); *A47C 17/80* (2013.01); *A47C 17/84* (2013.01); *A47C 19/025* (2013.01); *A47C 19/045* (2013.01); *A47C 19/202* (2013.01); *A47C 20/041* (2013.01); *B60P 3/32* (2013.01); *B60P 3/34* (2013.01)

(58) Field of Classification Search

CPC ...... B60N 2/34; B60P 3/32; B60P 3/34; B60P 3/39; A47C 17/84

USPC ....... 296/156, 164, 168, 170, 172, 173, 176, 296/24.3, 24.33, 65.01, 69, 190.02, 174, 296/64, 233, 24.32; 297/97, 93, 954.13, 297/118, 344.13, 94; 5/37.1, 22; 312/246, 247, 249.1, 319.8, 349; 52/29

See application file for complete search history.

(56) References Cited

U.S. PATENT DOCUMENTS 5,020,169 A * 6/1991 Hamada ................ A47C 17/84 5/10.2

6,082,805 A * 7/2000 Gray ........................ B60N 2/34 296/65.09

(Continued)

OTHER PUBLICATIONS

Information about Related Patents, Patent Applications, and Patent Office Proceedings see the section below having the same title.

(Continued)

*Primary Examiner* — Jason S Morrow

(74) *Attorney, Agent, or Firm* — Holland & Hart, LLP

(57) ABSTRACT

A vehicle includes a slide-out room that moves between a retracted position and an extended position and a bed coupled to the slide-out room. The bed moves vertically between a lowered position where the bed is positioned to receive one or more persons thereon and a raised position where the bed is stowed.

28 Claims, 222 Drawing Sheets

Related U.S. Application Data

14/177,936, filed on Feb. 11, 2014, now Pat. No. 9,380,881, which is a continuation-in-part of application No. 13/685,471, filed on Nov. 26, 2012, now Pat. No. 8,651,545, which is a continuation of application No. 13/270,046, filed on Oct. 10, 2011, now Pat. No. 8,336,940, which is a continuation of application No. 12/779,849, filed on May 13, 2010, now Pat. No. 8,038,193, which is a continuation of application No. 12/135,806, filed on Jun. 9, 2008, now Pat. No. 7,744,142, which is a continuation of application No. 11/422,532, filed on Jun. 6, 2006, now Pat. No. 7,384,093, which is a continuation of application No. 11/255,165, filed on Oct. 19, 2005, now Pat. No. 7,350,850, which is a continuation-in-part of application No. PCT/US2004/025360, filed on Jul. 31, 2004.

(60) Provisional application No. 60/491,448, filed on Jul. 31, 2003, provisional application No. 60/492,440, filed on Aug. 4, 2003, provisional application No. 60/510,270, filed on Oct. 9, 2003, provisional application No. 60/534,092, filed on Jan. 2, 2004, provisional application No. 60/544,000, filed on Feb. 12, 2004, provisional application No. 60/560,872, filed on Apr. 9, 2004, provisional application No. 60/621,606, filed on Oct. 21, 2004, provisional application No. 60/639,676, filed on Dec. 27, 2004, provisional application No. 61/932,634, filed on Jan. 28, 2014.

(51) Int. Cl.

| | |
|---|---|
| ***A47C 19/20*** | (2006.01) |
| ***A47C 17/84*** | (2006.01) |
| ***B60P 3/32*** | (2006.01) |
| ***B60P 3/34*** | (2006.01) |

(56) References Cited

U.S. PATENT DOCUMENTS

| | | | | |
|---|---|---|---|---|
| 2004/0143901 A1* | 7/2004 | Roepke | A47C 17/84 | 5/10.2 |
| 2004/0160074 A1* | 8/2004 | Shea | B60P 3/34 | 296/26.13 |
| 2005/0189785 A1* | 9/2005 | Harder | B60P 3/34 | 296/171 |
| 2005/0239586 A1* | 10/2005 | Nebel | A63H 17/05 | 474/58 |

OTHER PUBLICATIONS

Information Submitted in Parent Patent Applications, see MPEP 609.02 and the section below having the same title.
U.S. Appl. No. 15/480,349, filed Apr. 5, 2017, Rasmussen, Vehicle Having a Bed Lift in a Slide-Out Room.
U.S. Appl. No. 15/191,982, filed Jun. 24, 2016, Rasmussen, Mobile Structure Couch-Bed Configuration.
U.S. Pat. No. 9,380,881, Jul. 5, 2016, U.S. Appl. No. 14/177,936, filed Feb. 11, 2014, Rasmussen, Strap Bed Lift.
U.S. Pat. No. 8,651,545, Feb. 18, 2014, U.S. Appl. No. 13/685,471, filed Nov. 26, 2012, Rasmussen, Bed Lift.
U.S. Pat. No. 8,336,940, Dec. 25, 2012, U.S. Appl. No. 13/270,046, filed Oct. 10, 2011, Rasmussen, Structure Including an Item That Moves Vertically.
US-Interference No. 105,865, Sep. 29, 2011, Interference between U.S. Pat. No. 6,983,979 and U.S. Appl. No. 11/872,628.
U.S. Pat. No. 8,038,193, Oct. 18, 2011, U.S. Appl. No. 12/779,849, filed May 13, 2010, Rasmussen, Strap Bed Lift.
U.S. Pat. No. 7,744,142, Jun. 29, 2010, U.S. Appl. No. 12/135,806, filed Jun. 9, 2008, Rasmussen, Strap Bed Lift.
U.S. Pat. No. 7,121,613, Oct. 17, 2006, U.S. Appl. No. 11/424,852, filed Jun. 16, 2006, Rasmussen, Vehicle Including Multiple Items that Move Vertically.
U.S. Pat. No. 7,384,093, Jun. 10, 2008, U.S. Appl. No. 11/422,532, filed Jun. 6, 2006, Rasmussen, System for Lifting Various Objects in a Vehicle.
U.S. Pat. No. 7,350,850, Apr. 1, 2008, U.S. Appl. No. 11/255,165, filed Oct. 19, 2005, Rasmussen, Bed that Moves Vertically and Converts into a Couch.
U.S. Pat. No. 7,121,612, Oct. 17, 2006, U.S. Appl. No. 11/255,164, filed Oct. 15, 2005, Rasmussen, Vehicle Including Multiple Items that Move Vertically.
U.S. Pat. No. 6,983,980, Jan. 10, 2010, U.S. Appl. No. 10/916,253, filed Aug. 11, 2004, Rasmussen, System for Moving a Bed Using and Endless Drive.
U.S. Pat. 6,988,760, Jan. 24, 2006, U.S. Appl. No. 10/916,112, filed Aug. 11, 2004, Rasmussen, System for Moving a Bed Using a Chain.
U.S. Pat. No. 7,198,320, Apr. 3, 2007, U.S. Appl. No. 10/915,984, filed Aug. 11, 2004, Rasmussen, System for Moving a Bed Using a Rack and Gear.
U.S. Pat. No. 6,983,979, Jan. 10, 2006, U.S. Appl. No. 10/903,922, filed Jul. 31, 2004, Rasmussen, System for Moving Beds.

* cited by examiner 12
22
1118
624
630c
1152b
650c
620
1156
1152d
1152b
1090
1110
1104
630a
1152a
660c
1152d
618
1152c
650a
1108
1152a
1152c
16
626
1106
50
36
30
650b
650d
630d
660a
26
630b
660b
60

VEHICLE HAVING A BED LIFT IN A SLIDE-OUT ROOM

BACKGROUND

Shelter from the elements is a basic human need. Over the years, a number of structures have been developed to satisfy this need. For example, structures such as homes, apartments, condominiums, and the like have been used to effectively provide shelter from the elements. In addition to these immobile structures, mobile structures such as land vehicles, aircraft, watercraft, and the like have also been used to effectively shelter and/or transport people. Many of these structures are used not just to provide shelter but also to provide living quarters.

Ever since people began to use structures as living quarters, there has been an almost universal desire to increase the size and comfort provided by these structures. This is true regardless of whether the structure is mobile or immobile. For immobile structures, this desire is manifest by the continually increasing size of homes, apartments, condominiums, hotels, and the like. In the context of mobile structures, the desire for more space and comfort is manifest by the increased size of land vehicles, aircraft, watercraft, and the like. The size of immobile structures may be limited by a number of factors such as cost, available real estate in the area, government regulations, and the like. The size of mobile structures may be limited by transportation regulations set by the government (e.g., width of a road vehicle, length of a road vehicle, etc.) and by the physical dimensions of the roads (e.g., width of a travel lane, distance between railroad tracks, height of bridges, etc.) or other medium of transportation (e.g., waterways, etc.). Also, building larger structures may unnecessarily increase the consumption of valuable resources (e.g., land, steel, wood, etc.). Accordingly, it would be desirable to utilize the space in structures more effectively without increasing the "footprint" of the structures.

One type of vehicle where it may be desirable to more effectively utilize the space are "toy hauler" type recreational vehicles. Toy haulers may differ from other types of recreational vehicles in a number of ways. For example, toy haulers include a cargo area which is used to receive and transport off-road vehicles. Because of the cargo area, the toy hauler may have different characteristics than other recreational vehicles. For instance, in many recreational vehicles, the integrity of the body may be reinforced using a number of techniques such as coupling cabinets to both the side walls and the ceiling of the vehicle, using interior walls extending between the ceiling and the floor, and the like. These techniques are often not used in the cargo area of a toy hauler in an effort to maximize the amount of cargo space. The lack of these reinforcement techniques combined with the rear wall being used as a door or ramp to load the off-road vehicles (i.e., the rear wall is not a rigid stationary structure) may contribute to flexing, swaying, etc. of the side walls in the area adjacent to the cargo area. This may be a problem when the toy hauler is traveling at high speeds, in high winds, or over rough surfaces (e.g., washboard gravel roads, unmaintained backcountry roads, and the like). The flexing, swaying, and the like may cause an object such as a bed coupled between the side walls to dislodge and fall during travel. Off-road vehicles positioned in the cargo area may be damaged by the falling bed. In light of these problems, it would be desirable to provide an improved system to securely hold and move the bed or other objects to prevent such an occurrence.

In the past, there have been attempts to utilize space inside structures more effectively by using a system which moves a bed to a use position at night and a stowed position during the day. Thus, the space taken up by the bed is capable of being utilized for other purposes when the bed is not being used for sleeping. Unfortunately, these systems suffered from a number of problems. For example, many of these systems were considered unreliable and difficult to maintain and operate. These problems may have inhibited the widespread adoption of these systems. Accordingly, it would be desirable to provide an improved system for moving objects that is more reliable and effective for its intended use.

DRAWINGS

Figure 81:
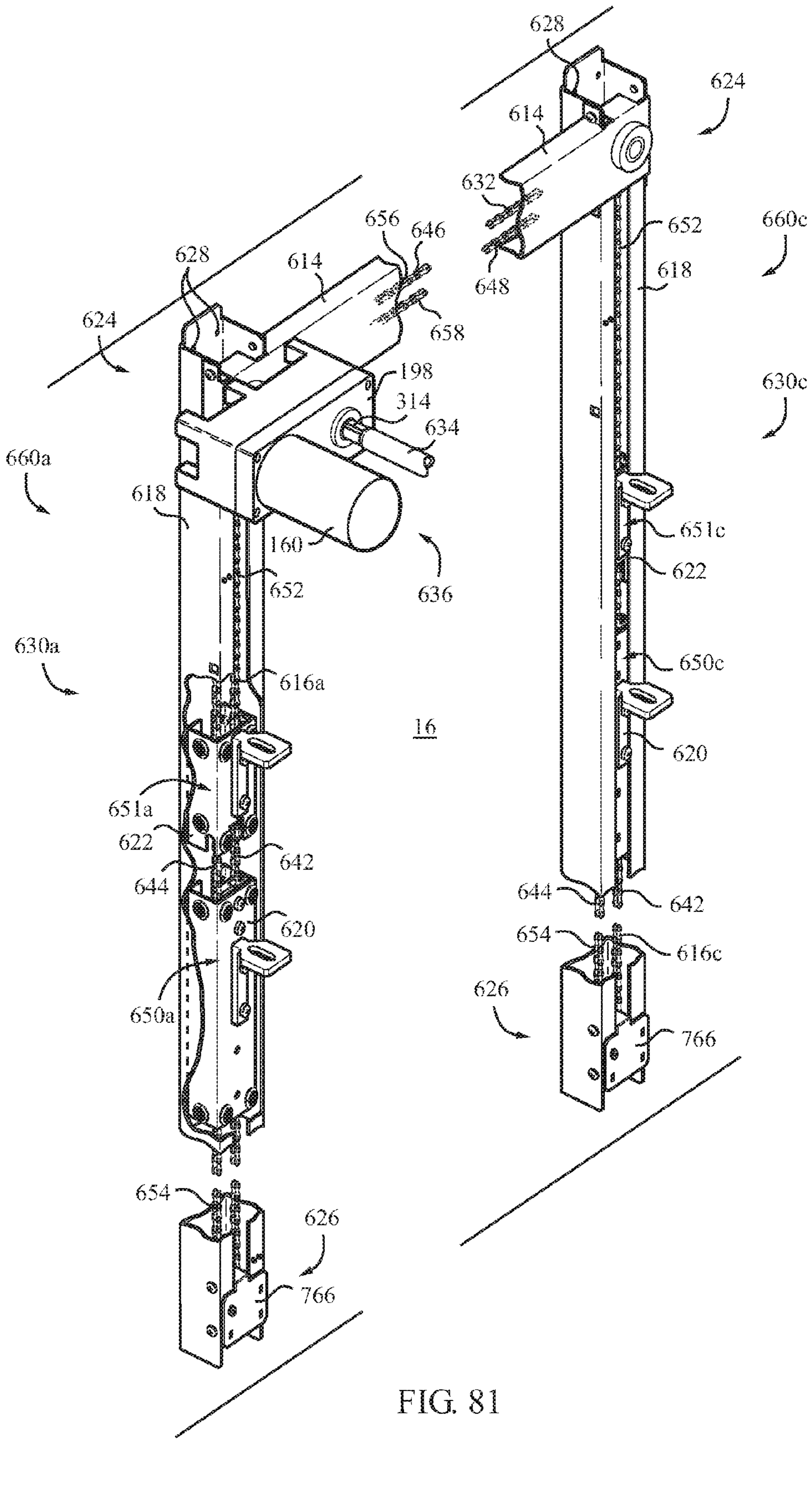
Figure 82:
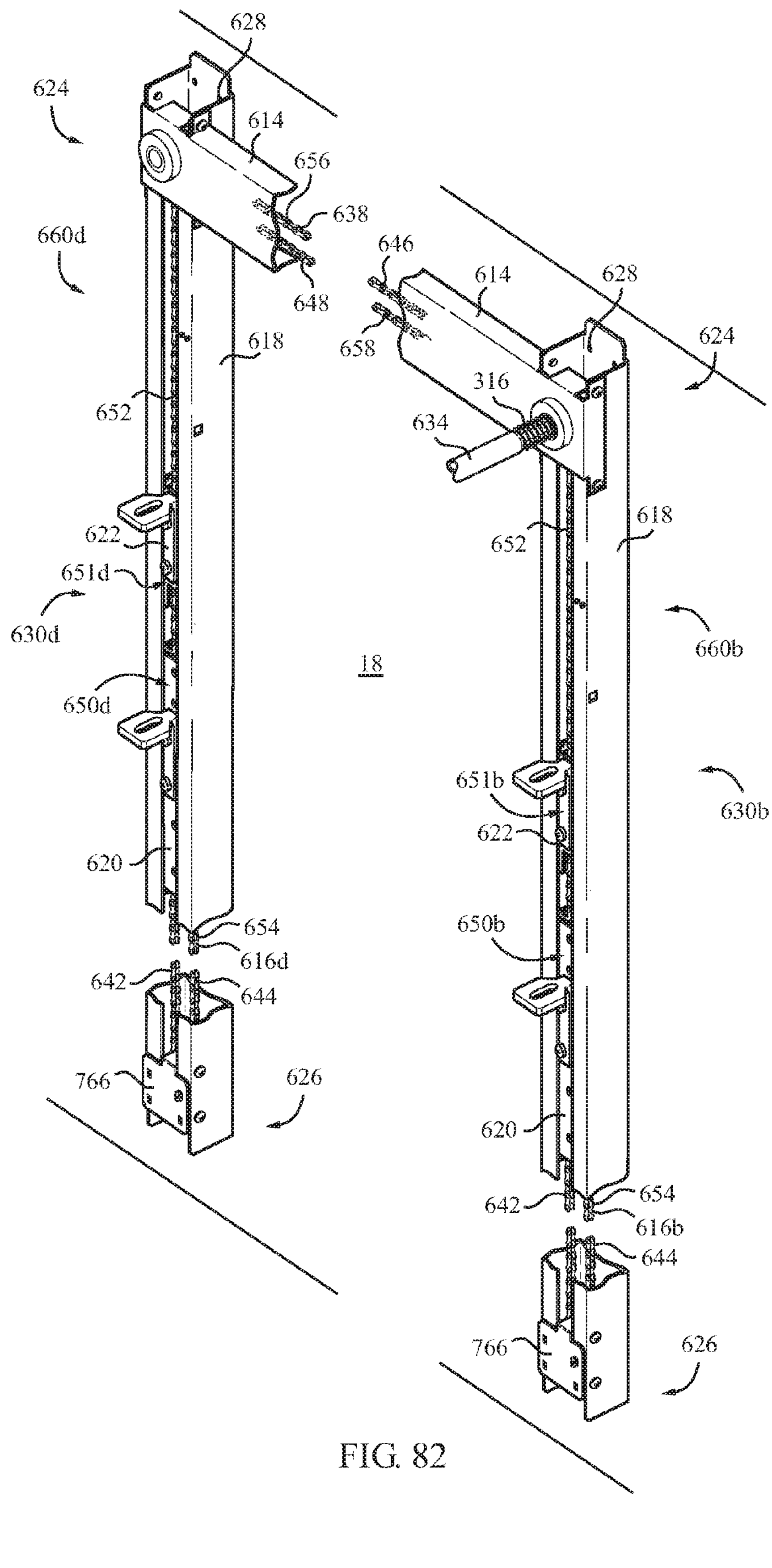

FIGS. 81-82 each show a perspective view of one embodiment of two lifting assemblies coupled to a wall where the lifting assemblies use a chain to vertically move one or more beds.

Figure 83:
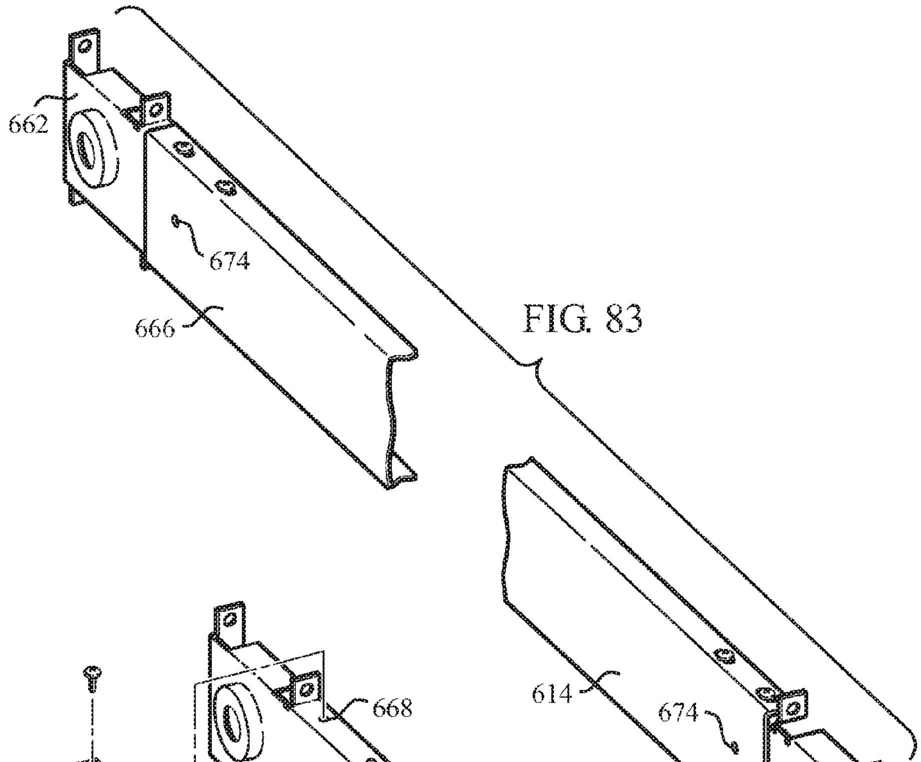

FIG. 83 shows a perspective view of one embodiment of a cross member which may be used to couple adjacent lifting assemblies together.

Figure 84:
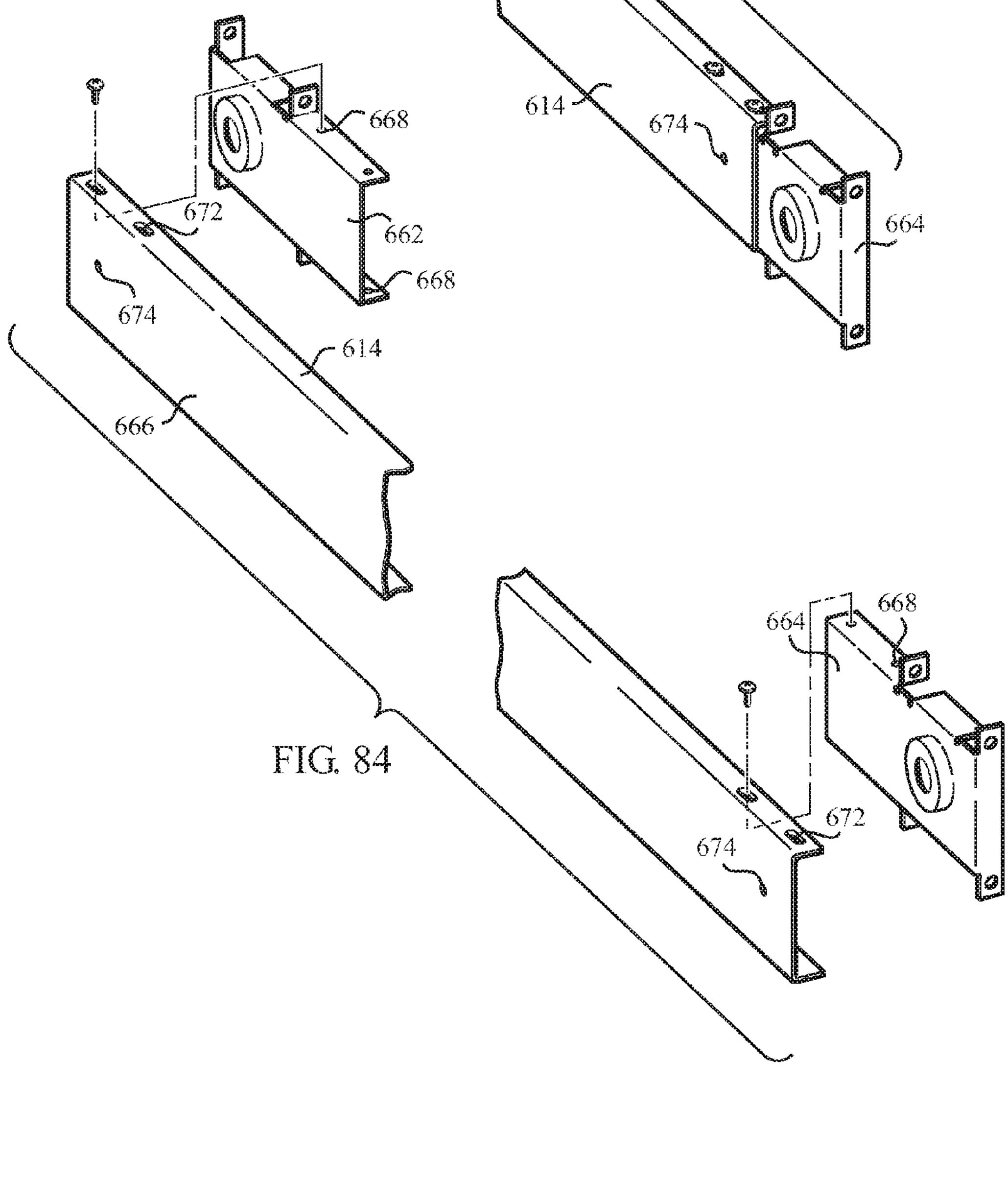

FIG. 84 shows an exploded perspective view of another embodiment of a cross member which may be used to couple adjacent lifting assemblies together.

Figure 85:
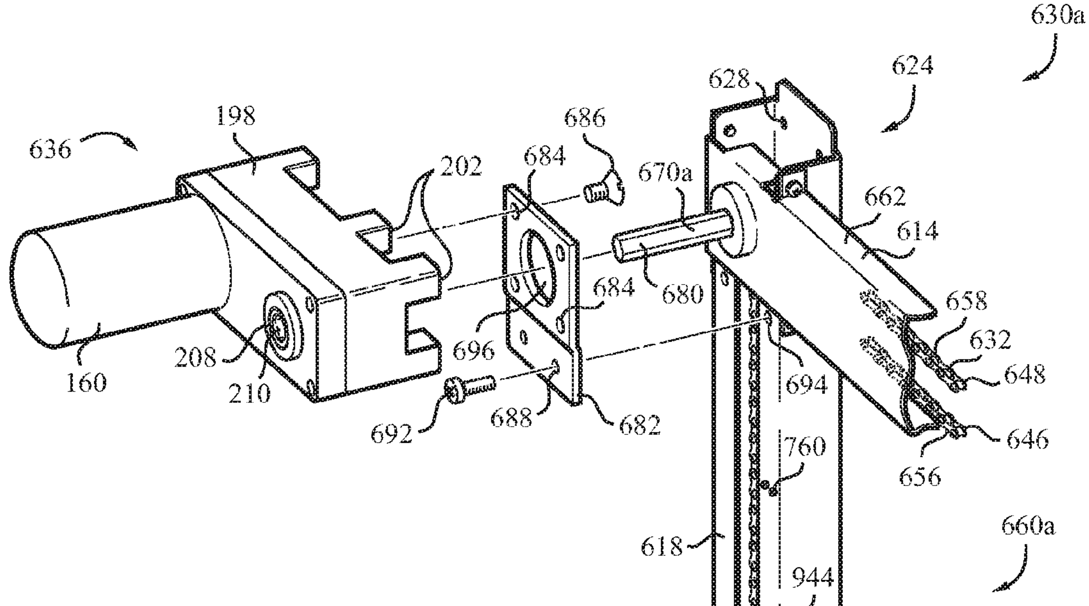
Figure 85:
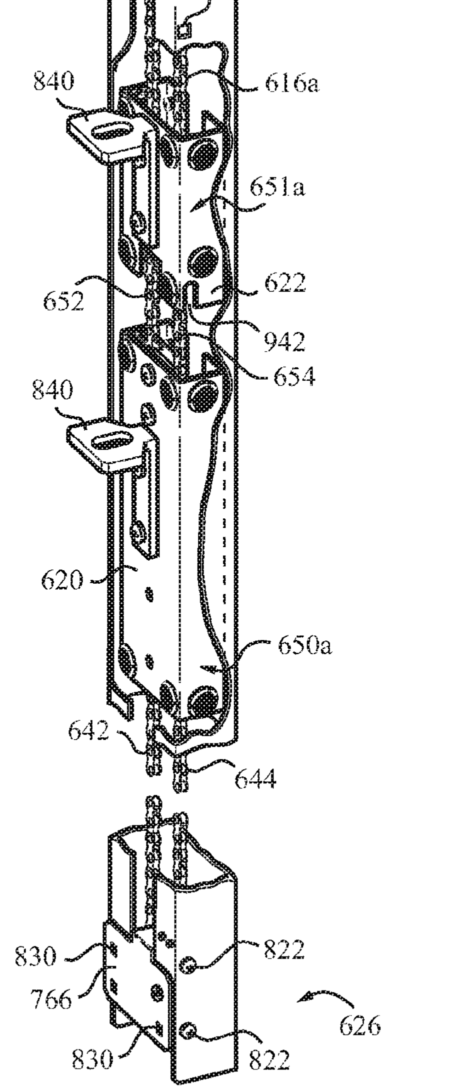

FIG. 85 shows a cut-away perspective view of another embodiment of a lifting assembly which uses a chain to vertically move one or more beds.

Figure 86:
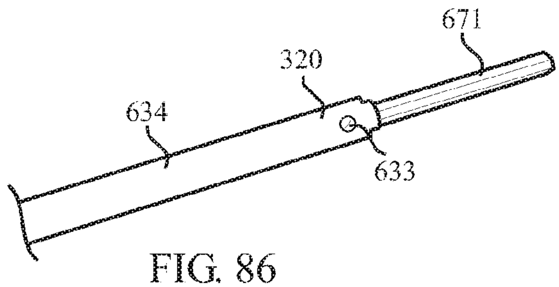

FIG. 86 shows a perspective view of one embodiment of a drive member which may be used to move multiple lifting assemblies in unison.

Figure 87:
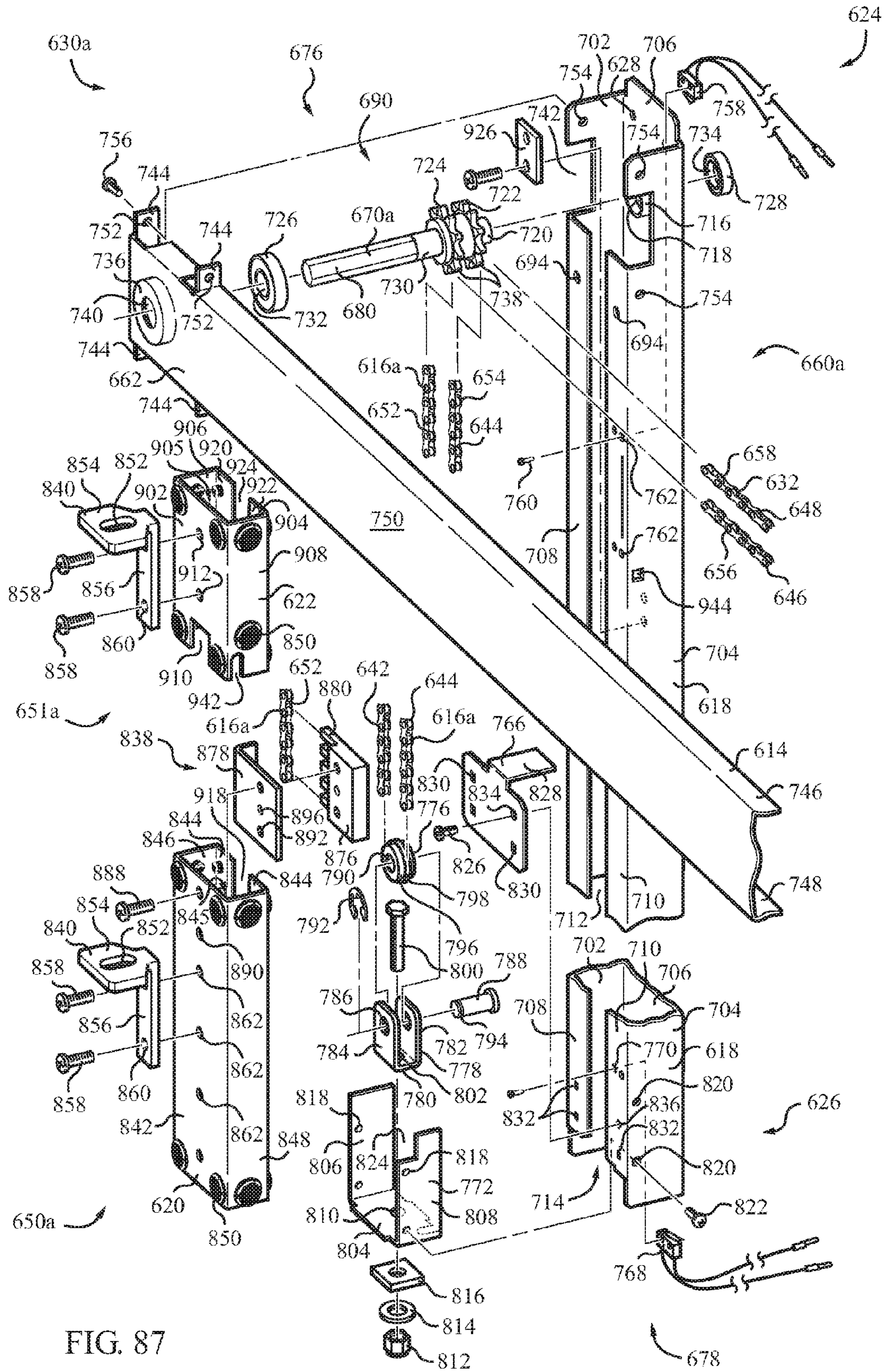

FIG. 87 shows an exploded perspective view of the lifting assembly which uses a chain to vertically move one or more beds.

Figure 88:
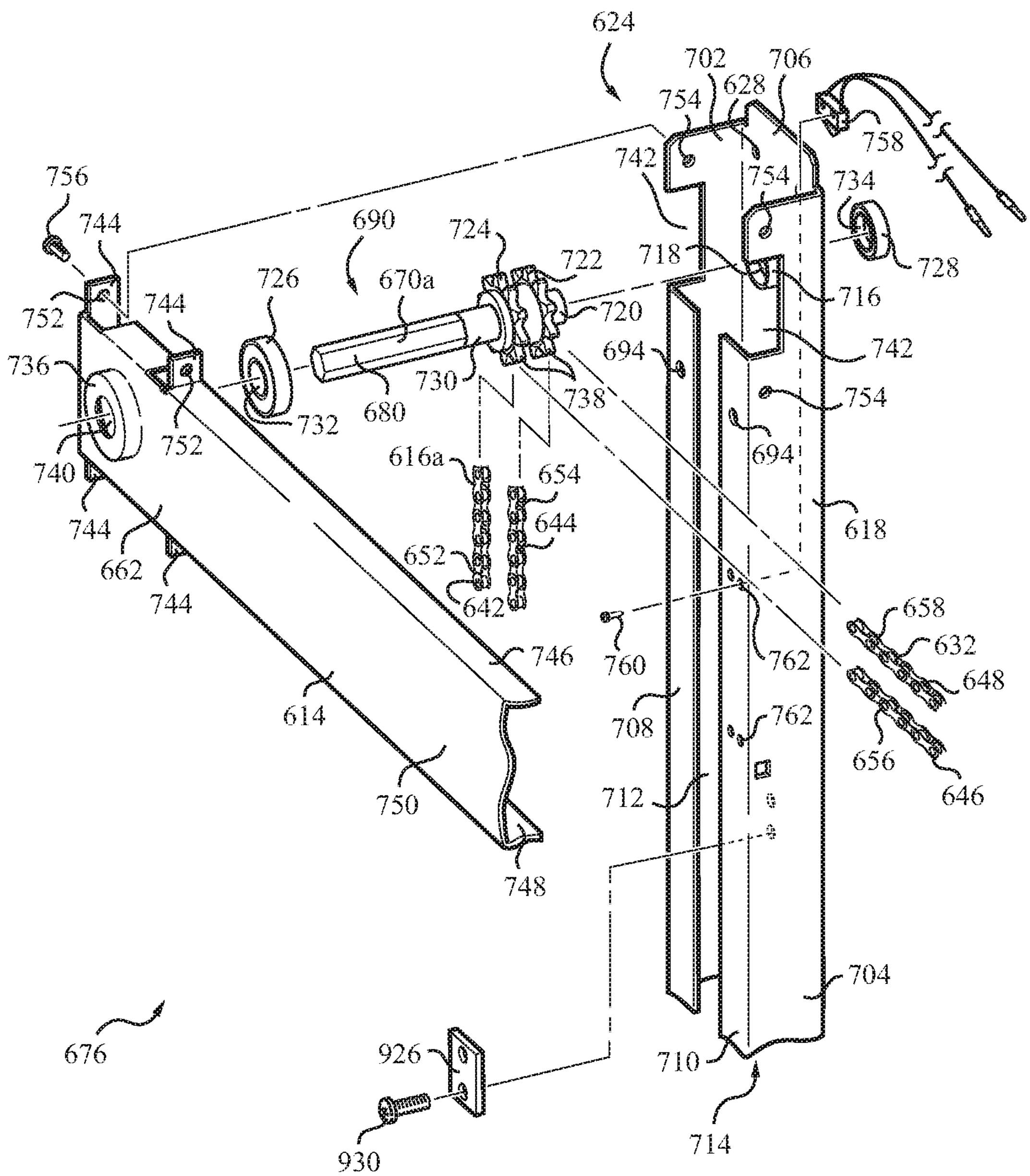

FIG. 88 shows an exploded perspective view of an upper group of components which may be included in the lifting assembly.

Figure 89:
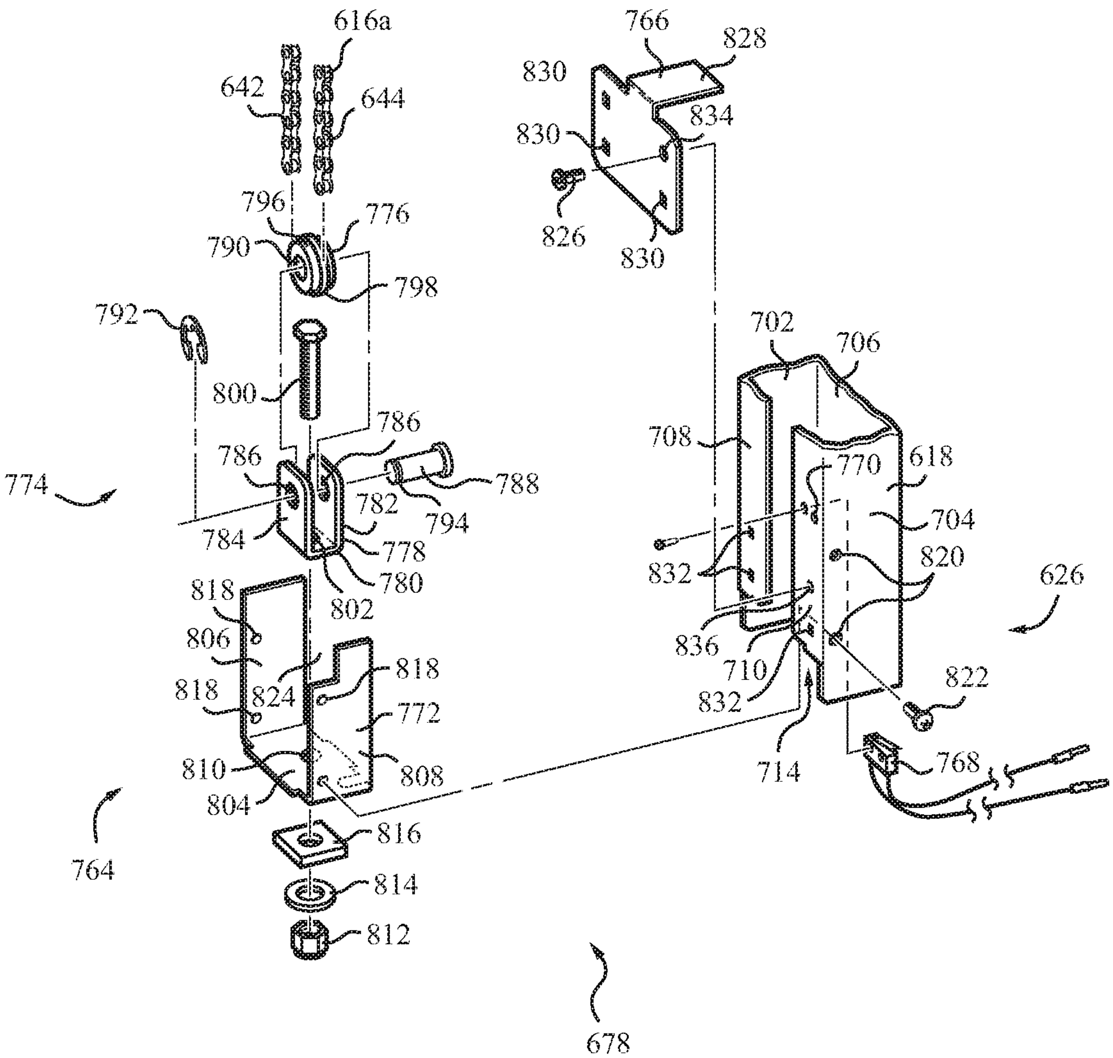

FIG. 89 shows an exploded perspective view of a lower group of components which may be included in the lifting assembly.

Figure 91:
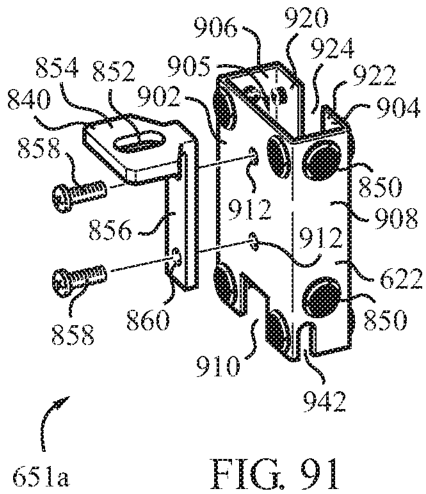
Figure 90:
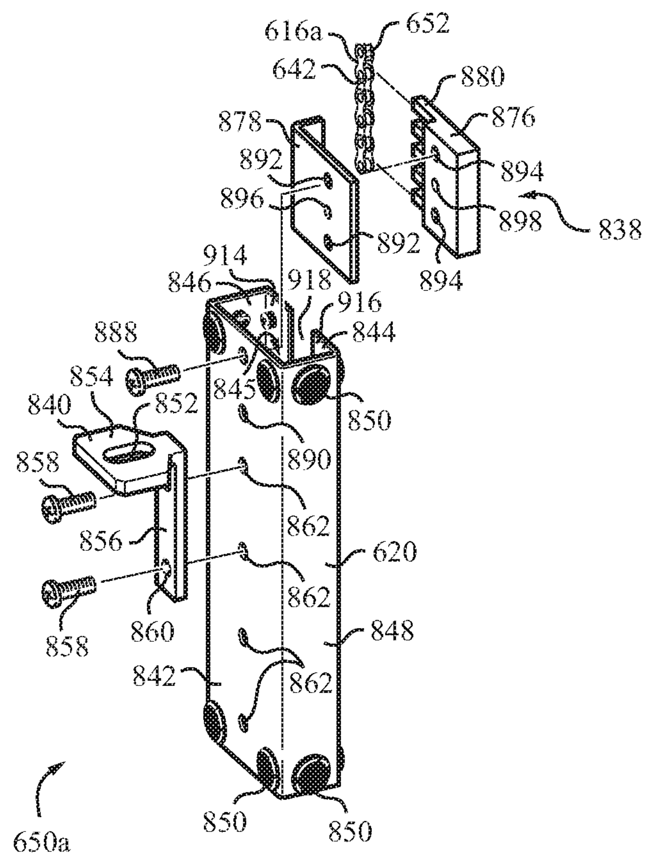

FIGS. 90-91 show partially exploded perspective views of various embodiments of a moving assembly which may be used in the system for vertically moving one or more beds.

Figure 92:
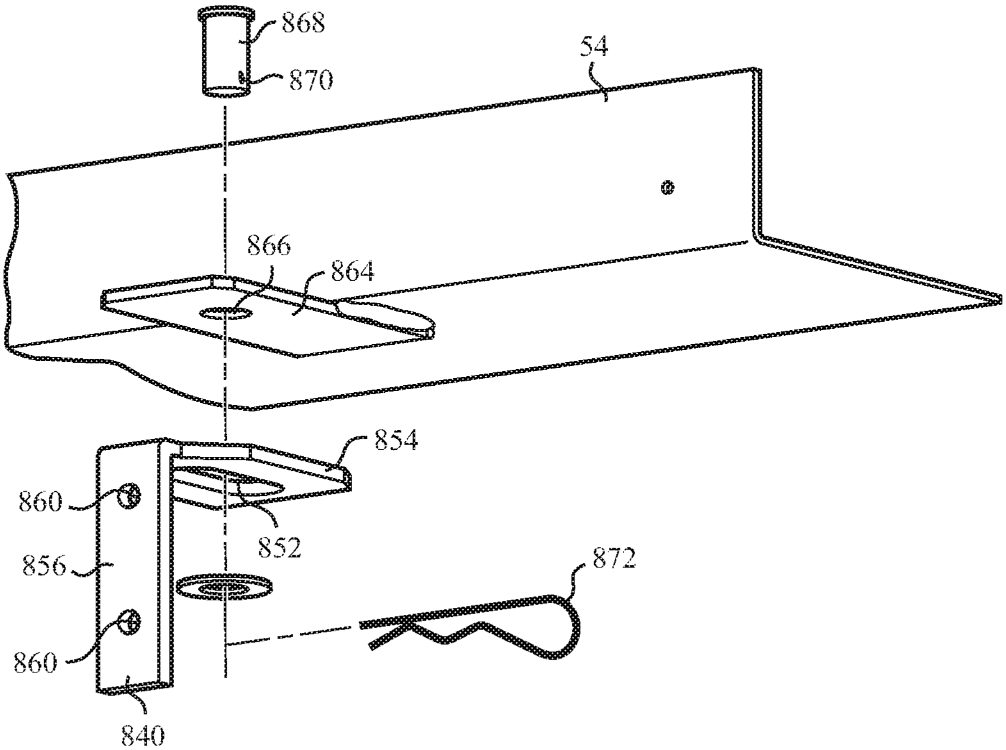

FIG. 92 shows a perspective view of another embodiment of an arrangement for coupling a bed to a lifting assembly in a disengaged configuration.

Figure 93:
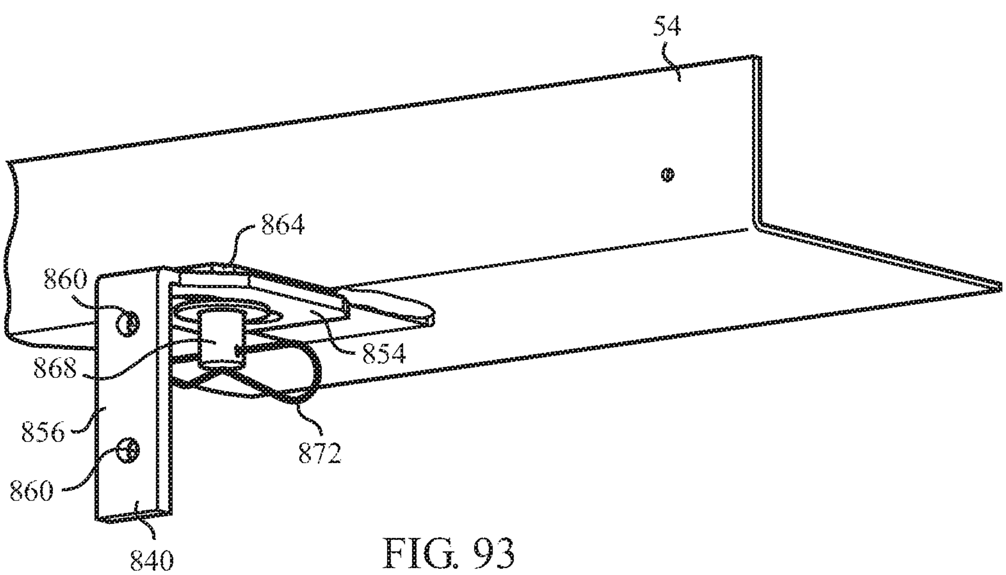

FIG. 93 shows a perspective view of the arrangement for coupling the bed to the lifting assembly in an engaged configuration.

Figure 94:
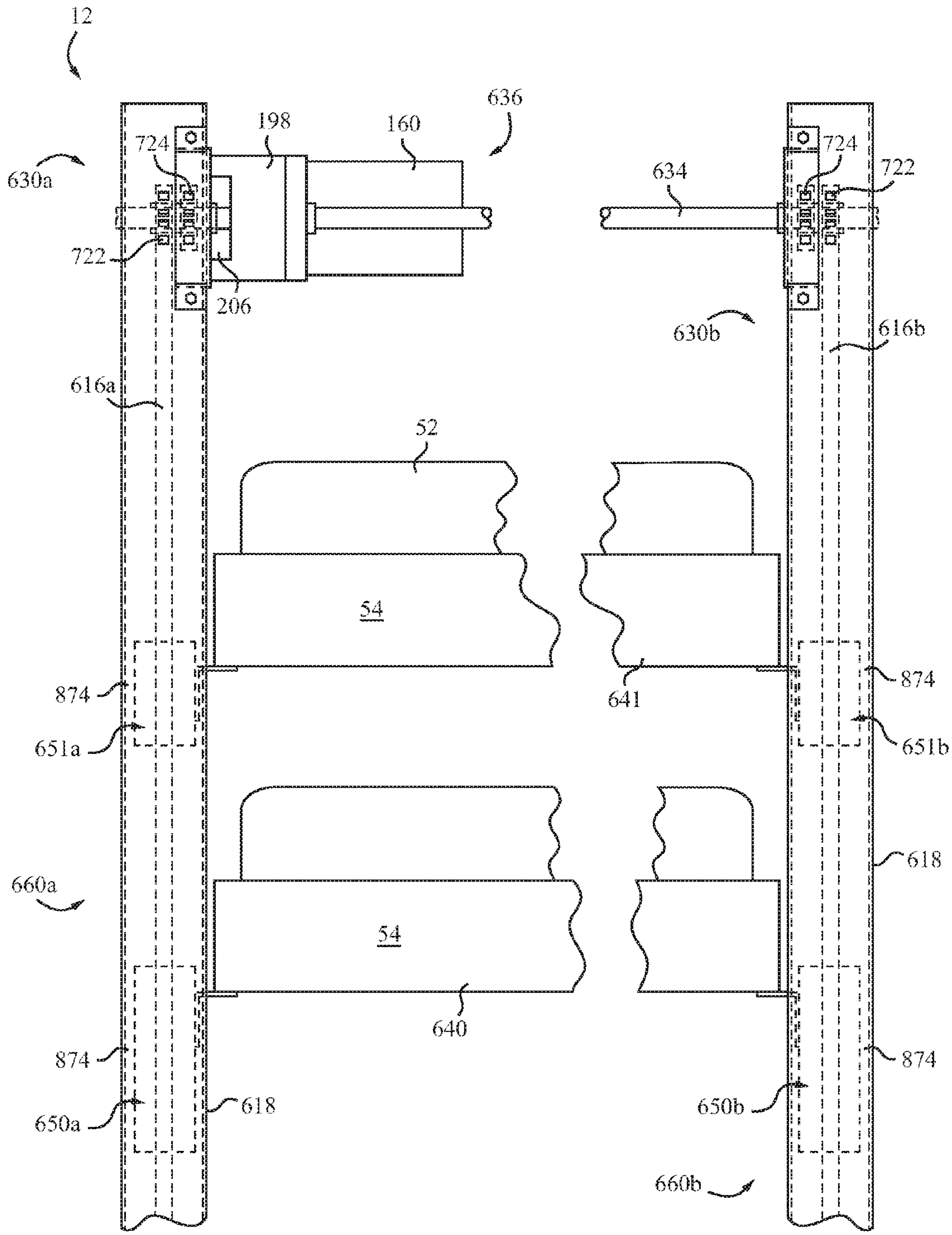
Figure 95:
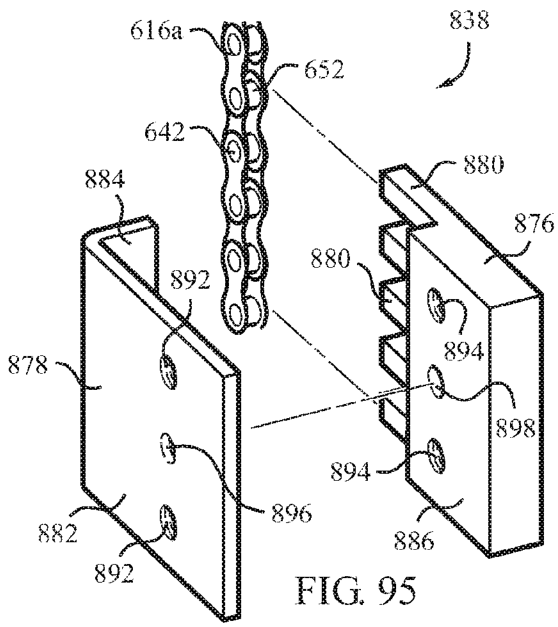

FIG. 94 shows a side view of another embodiment of a system for vertically moving a pair of beds where the system compensates for width variations between the side walls of the structure.

FIGS. 95-98 show perspective views of one embodiment of a coupling device which may be used to couple a drive member to a moving member in a system for vertically moving one or more beds.

Figure 99:
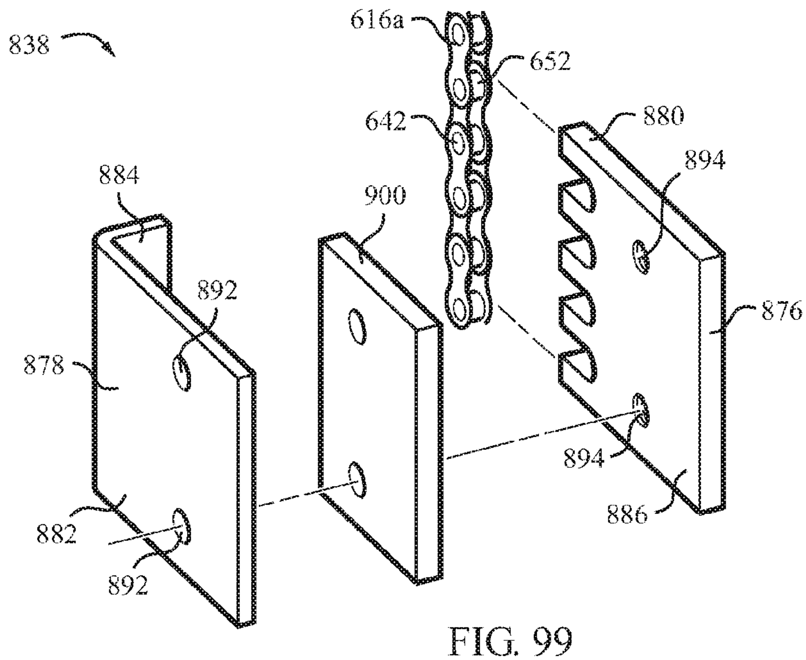
Figure 100:
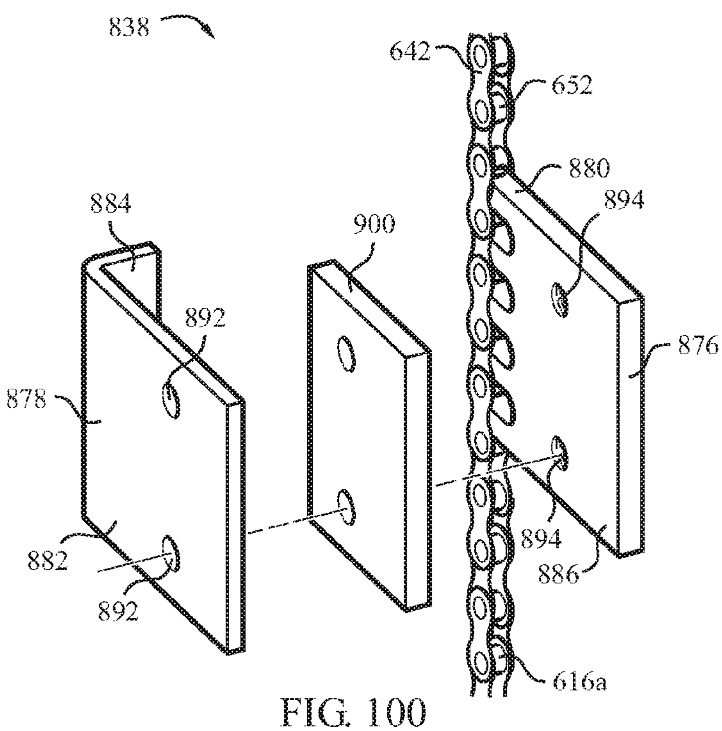
Figure 101:
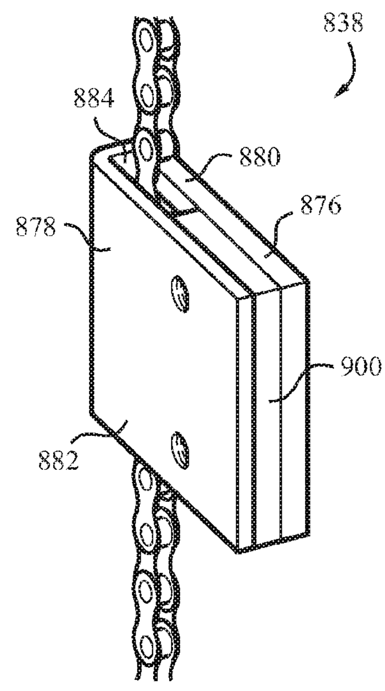

FIGS. 99-101 show perspective views of another embodiment of a coupling device which may be used to couple a drive member to a moving member in a system for vertically moving one or more beds.

Figure 102:
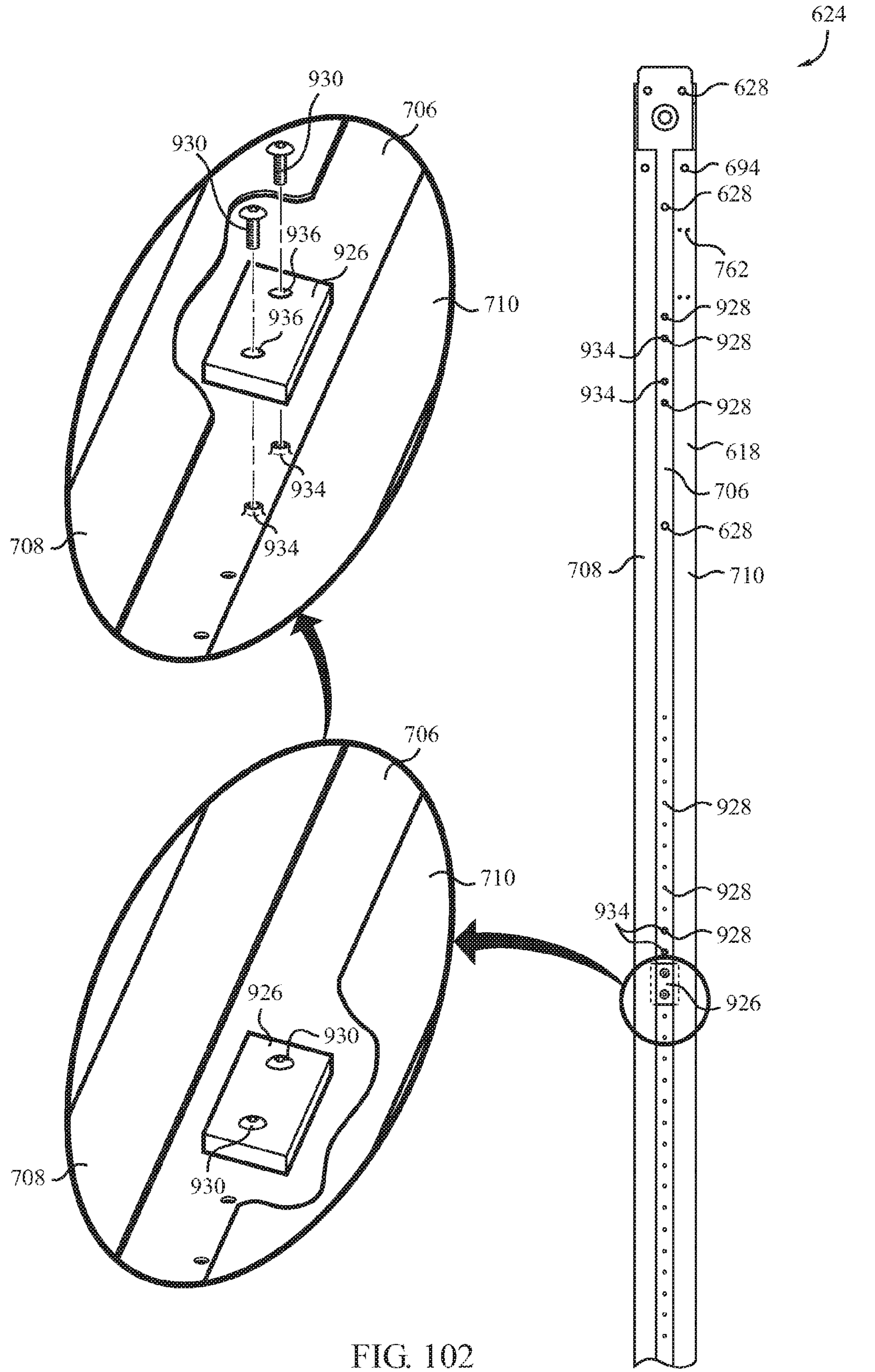

FIG. 102 shows a front view of an arrangement using an adjustable stop to support a bed in the use position.

Figure 103:
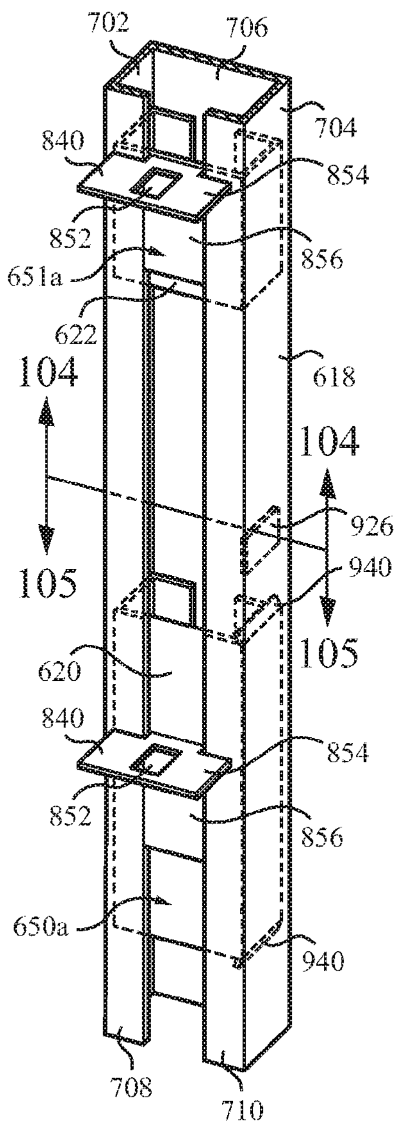

FIG. 103 shows a perspective view of a lifting assembly which includes a stop to support one bed in the use position, the stop being configured to allow another bed to be lowered below the stop.

Figure 104:
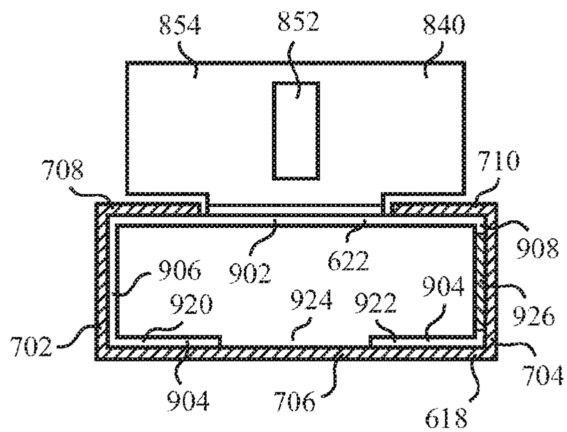

FIG. 104 shows a cross-sectional bottom view of the lifting assembly from FIG. 103.

Figure 105:
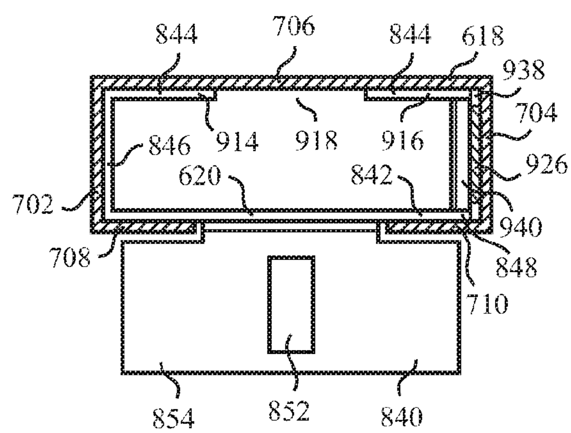

FIG. 105 shows a cross-sectional top view of the lifting assembly from FIG. 103.

Figure 106:
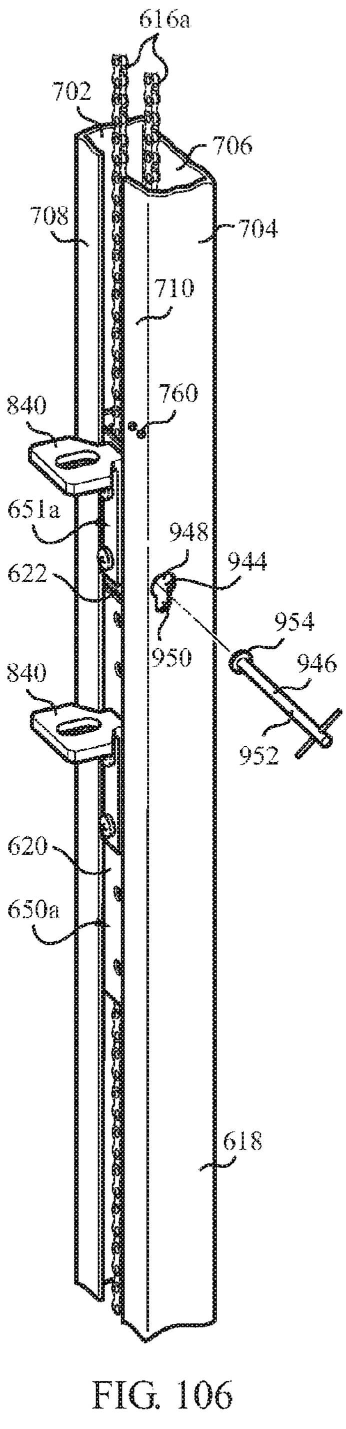
Figure 107:
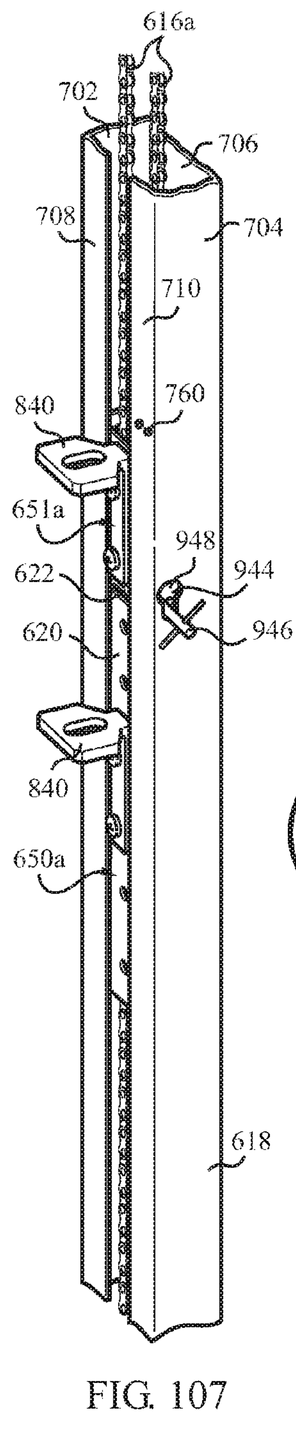
Figure 108:
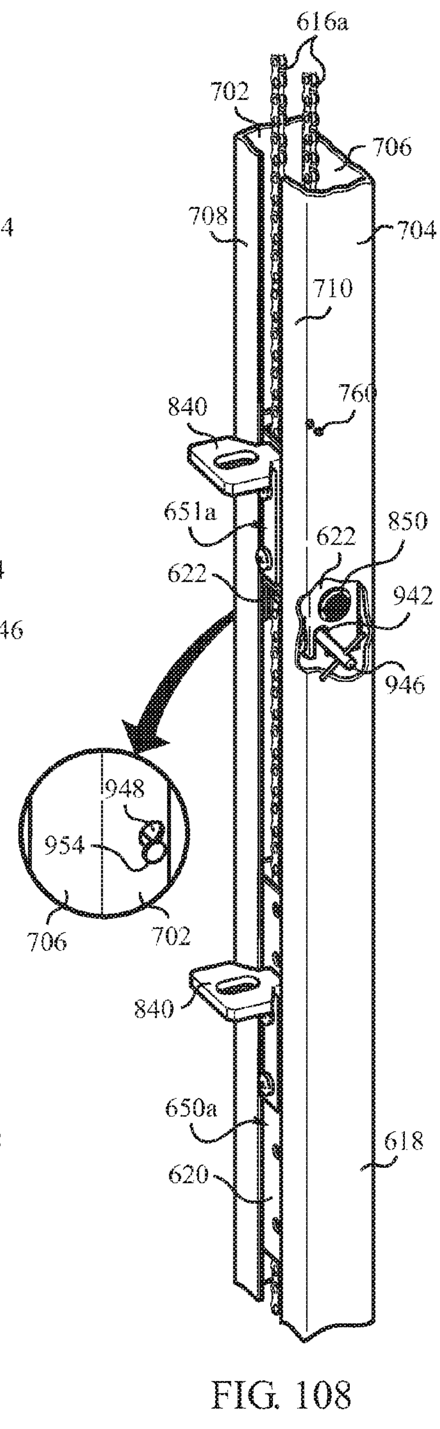

FIGS. 106-108 show perspective views of a lifting assembly which is used to support an upper bed in a stowed position when a lower bed is in a use position.

Figure 109:
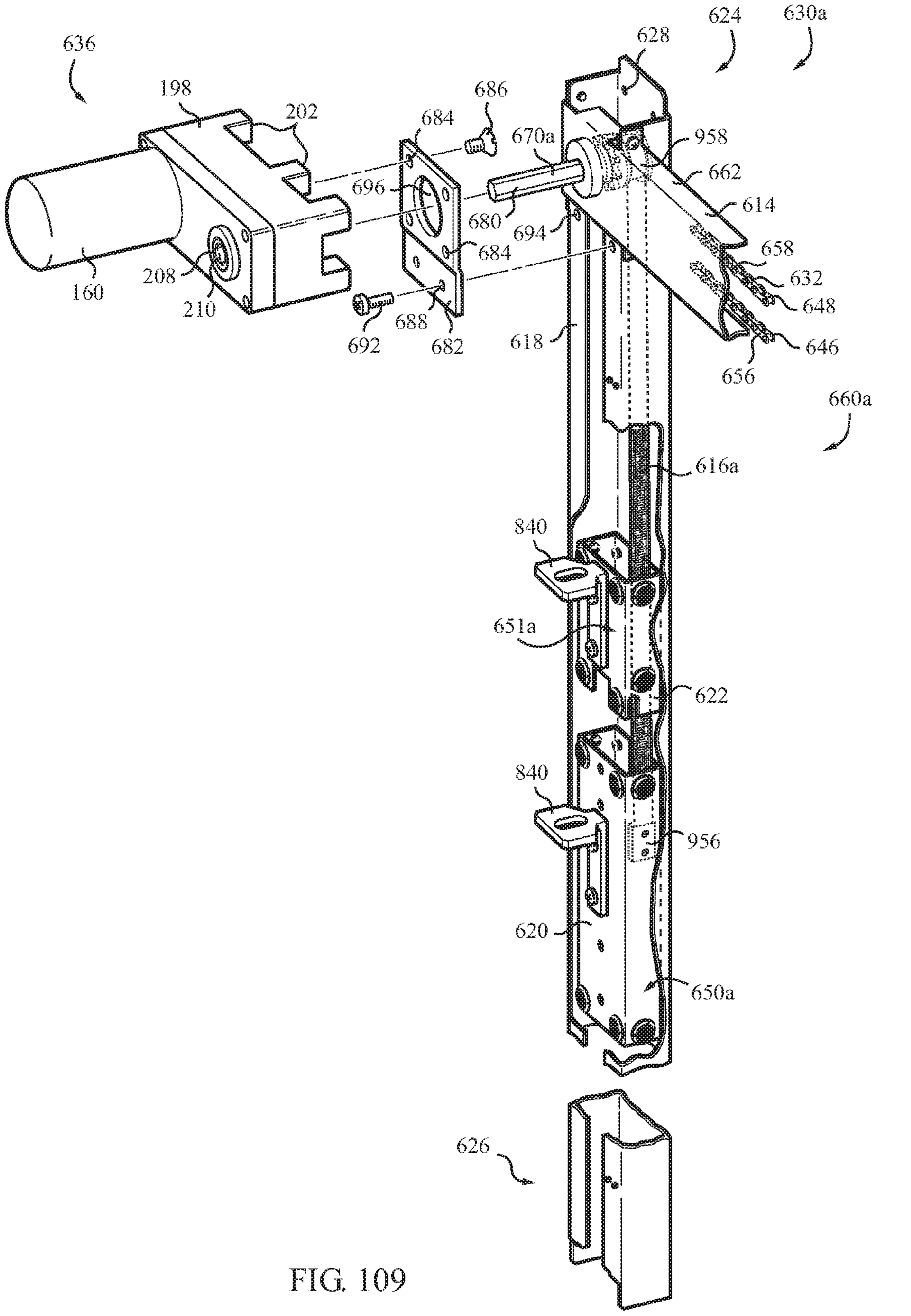

FIG. 109 shows a cut-away perspective view of another embodiment of a lifting assembly which uses a strap to vertically move one or more beds.

Figure 110:
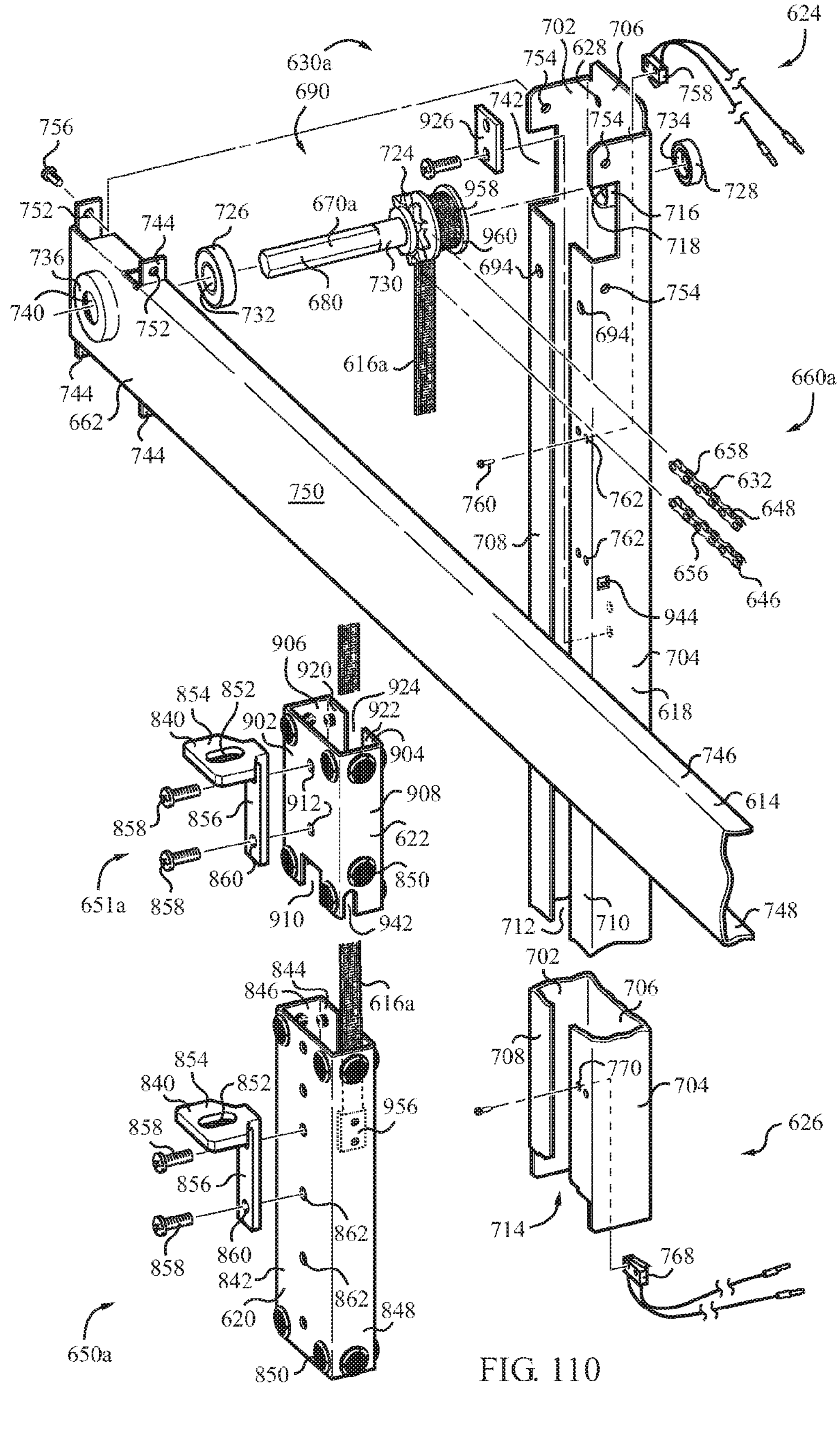

FIG. 110 shows an exploded perspective view of the lifting assembly which uses a strap to vertically move one or more beds.

Figure 111:
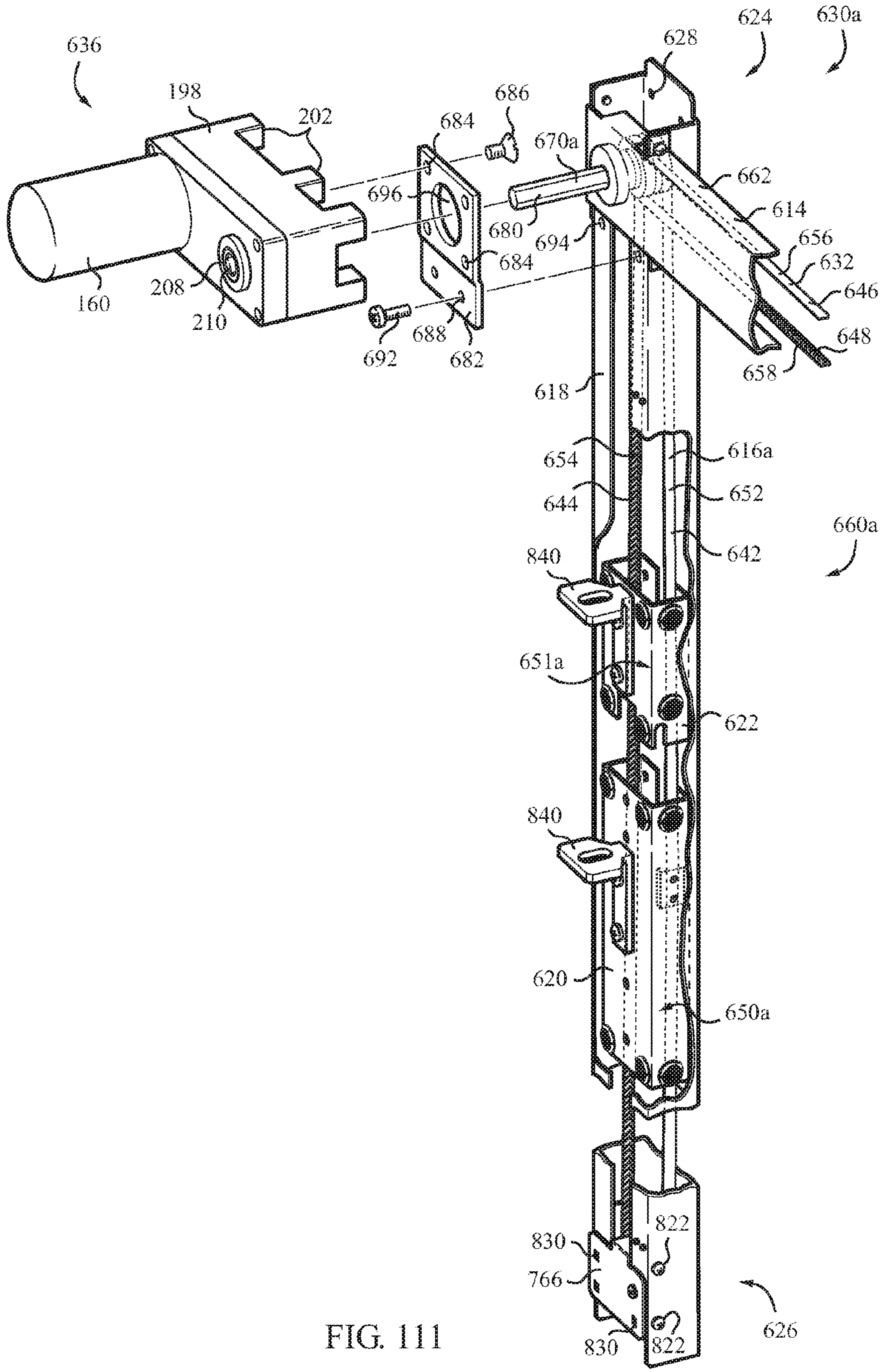

FIG. 111 shows a cut-away perspective view of another embodiment of a lifting assembly which uses a toothed belt to vertically move one or more beds.

Figure 112:
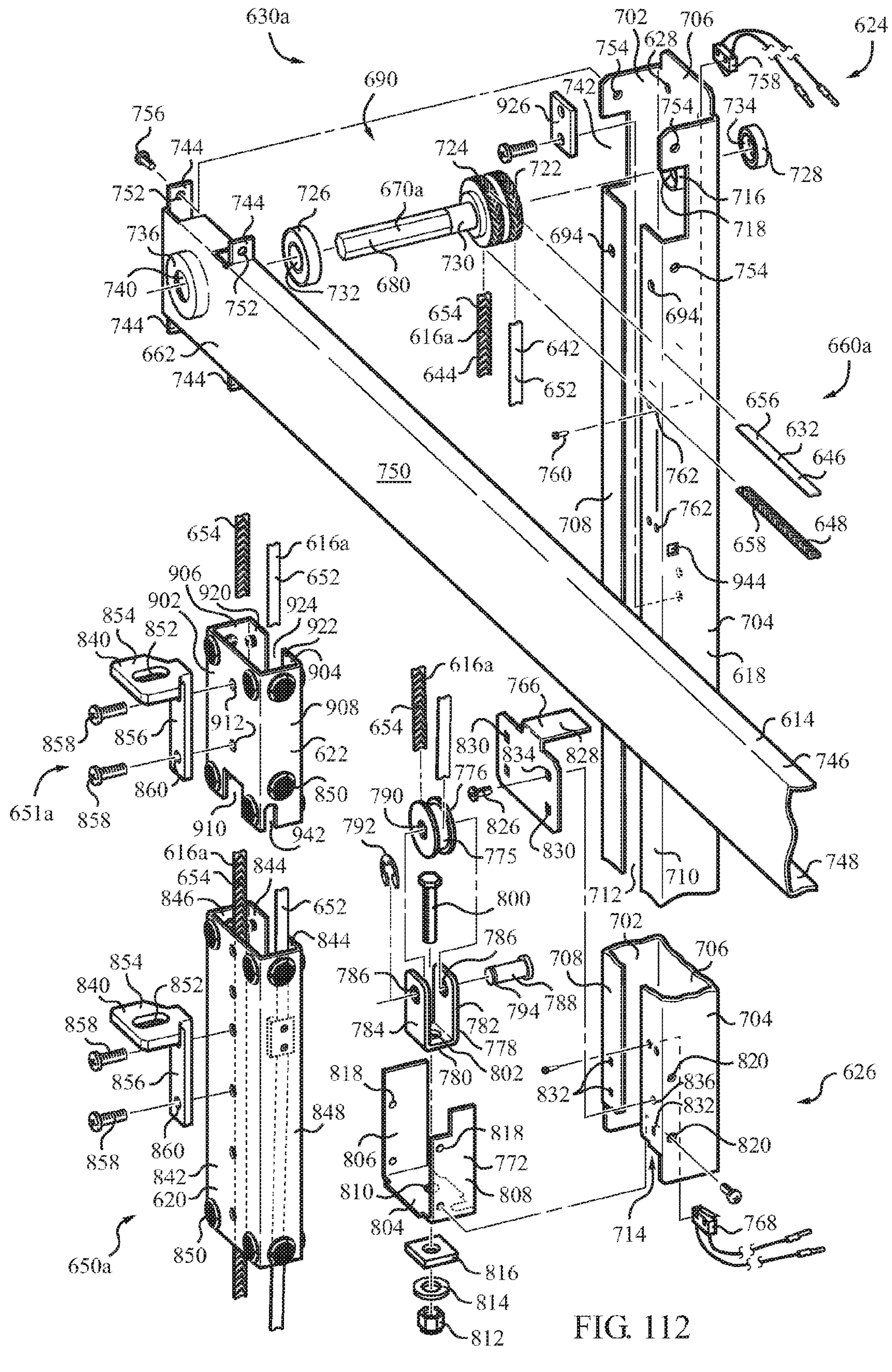

FIG. 112 shows an exploded perspective view of the lifting assembly which uses a toothed belt to vertically move one or more beds.

Figure 113:
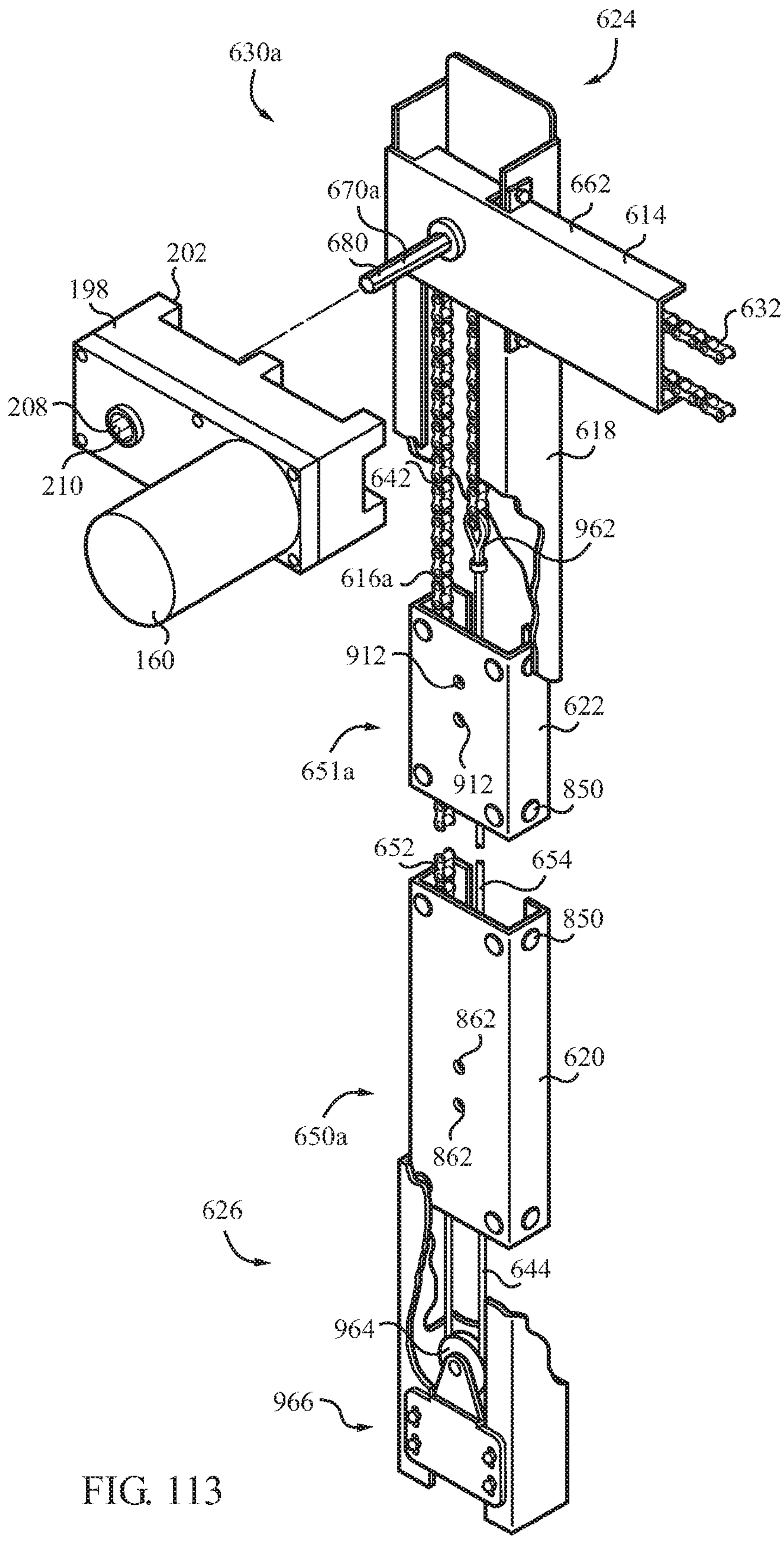

FIG. 113 shows a cut-away perspective view of another embodiment of a lifting assembly which uses a flexible drive member comprising two types of flexible drive materials to vertically move a pair of beds.

Figure 114:
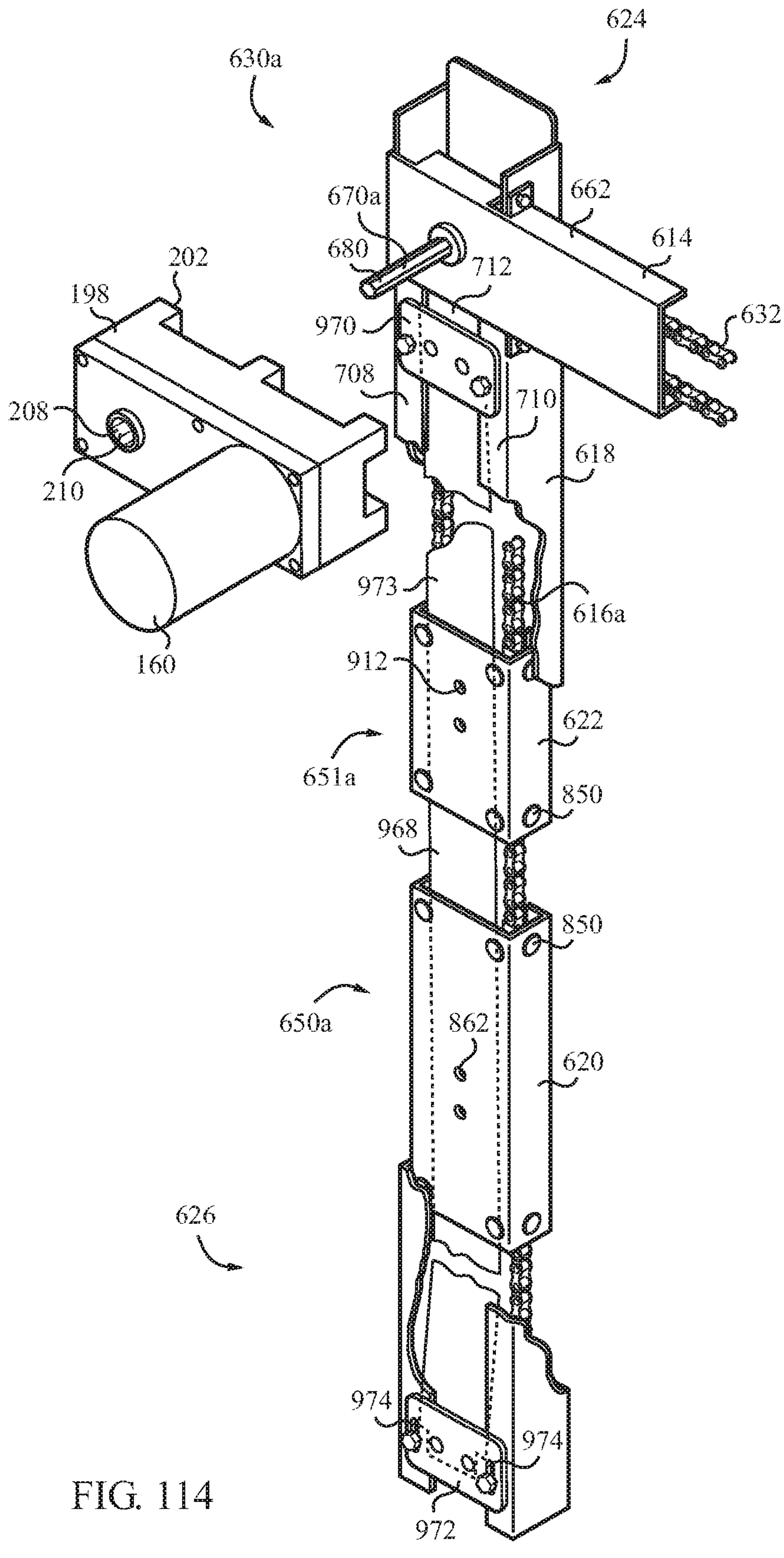

FIG. 114 shows a cut-away perspective view of another embodiment of a lifting assembly which uses a cover to conceal interior components of the lifting assembly.

Figure 115:
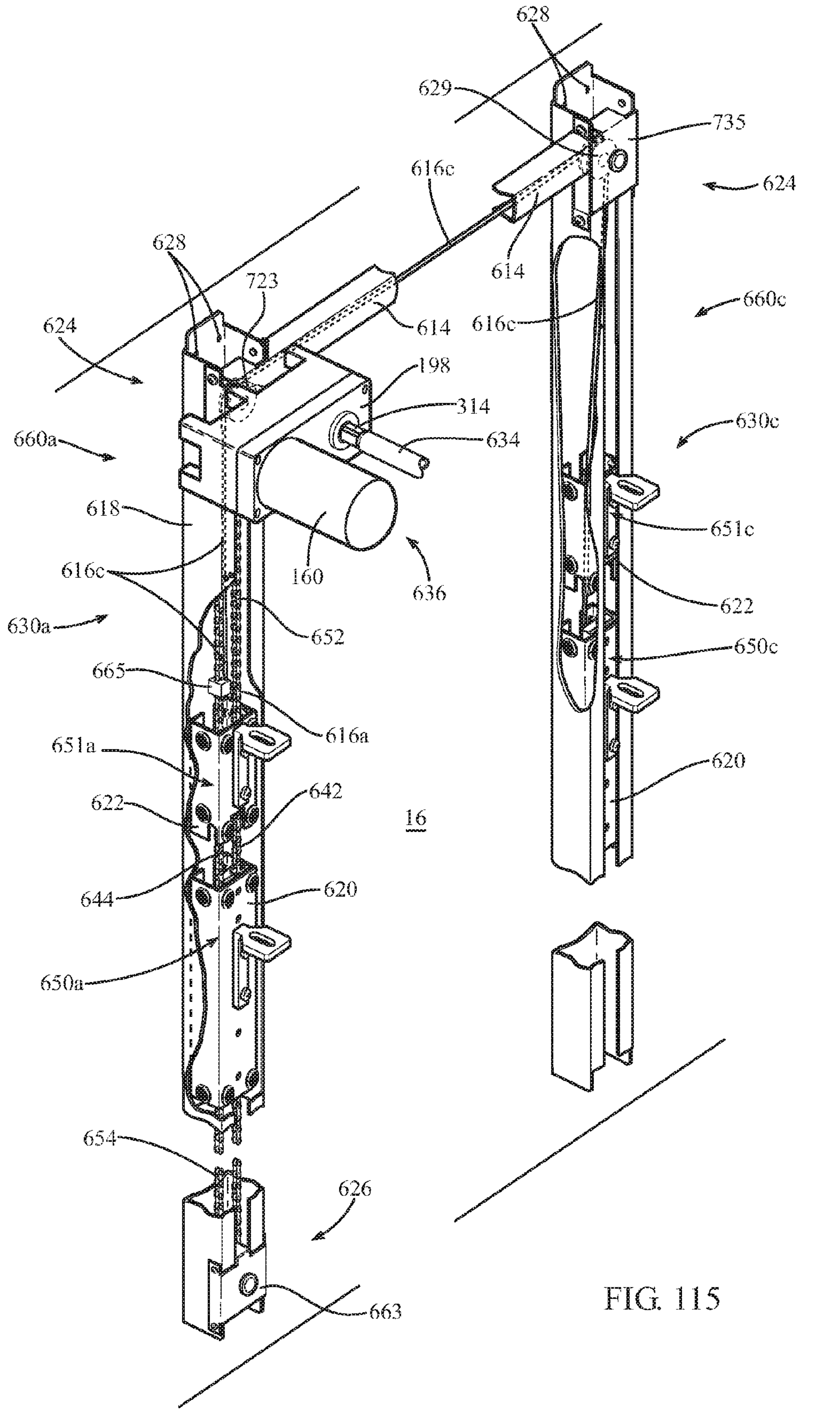
Figure 116:
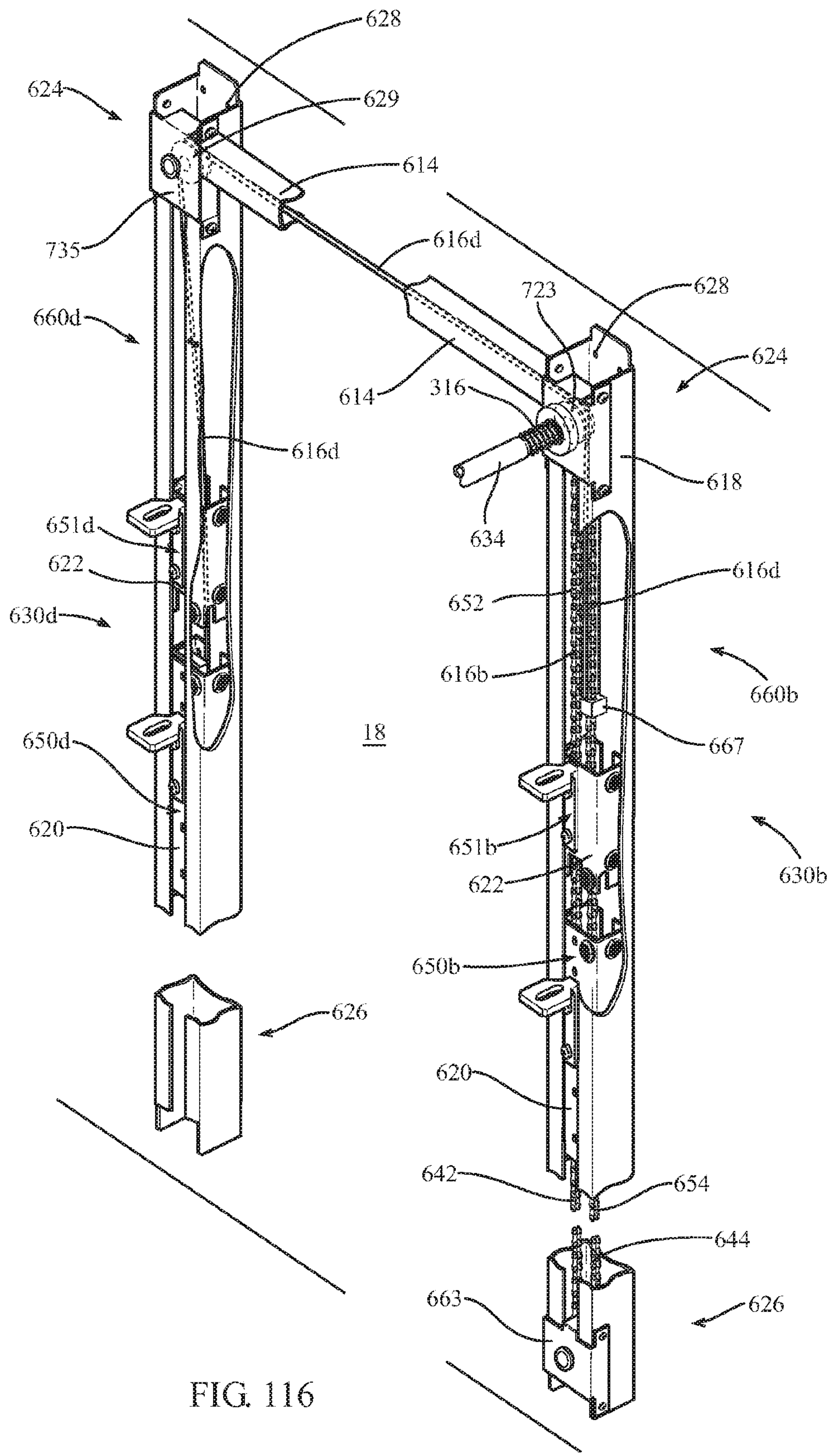

FIGS. 115-116 show perspective views of two lifting assemblies coupled to a wall and which use a chain and a cable to vertically move one or more beds.

Figure 117:
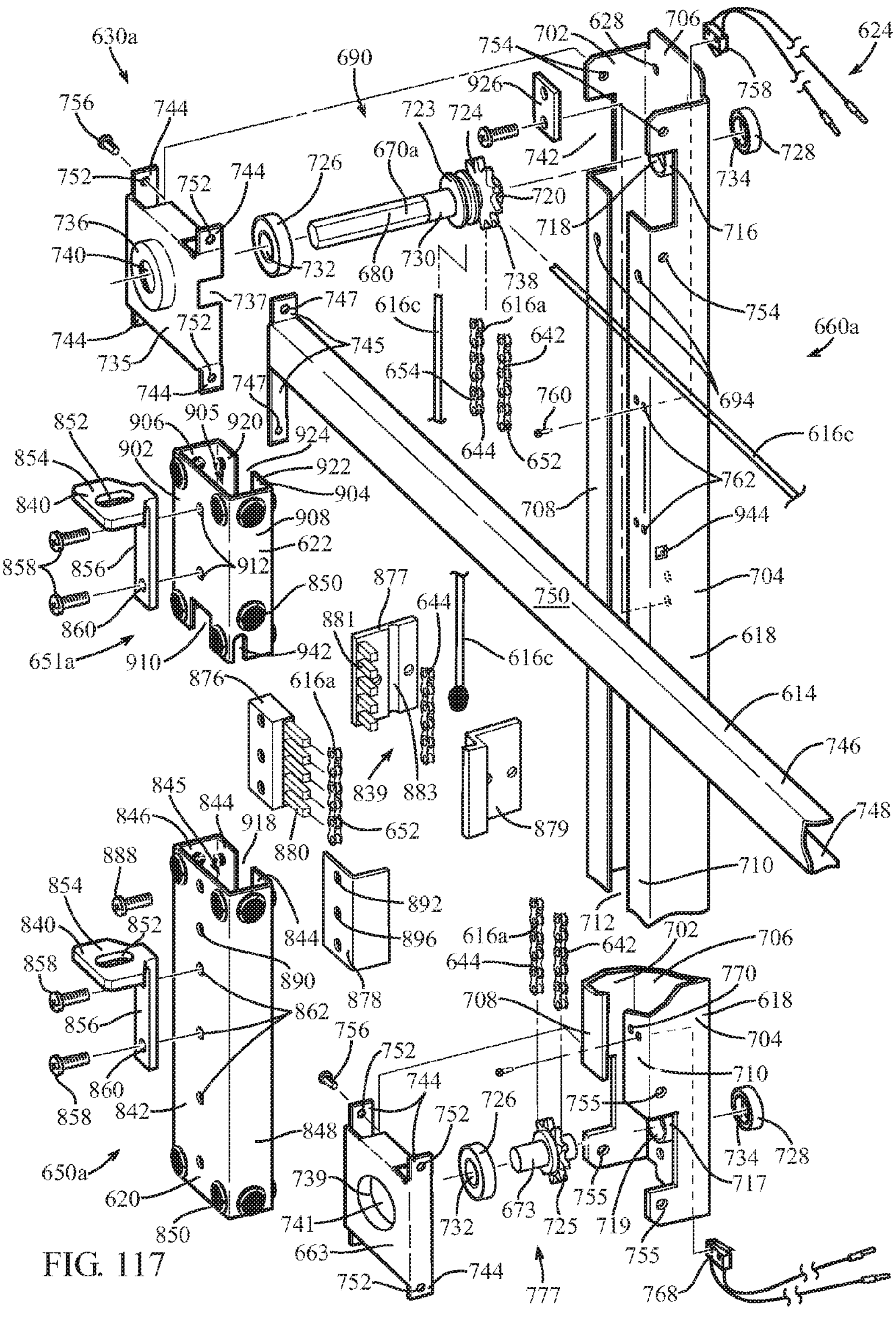

FIG. 117 shows an exploded perspective view of a lifting assembly which uses a chain and a cable to vertically move one or more beds.

Figure 118:
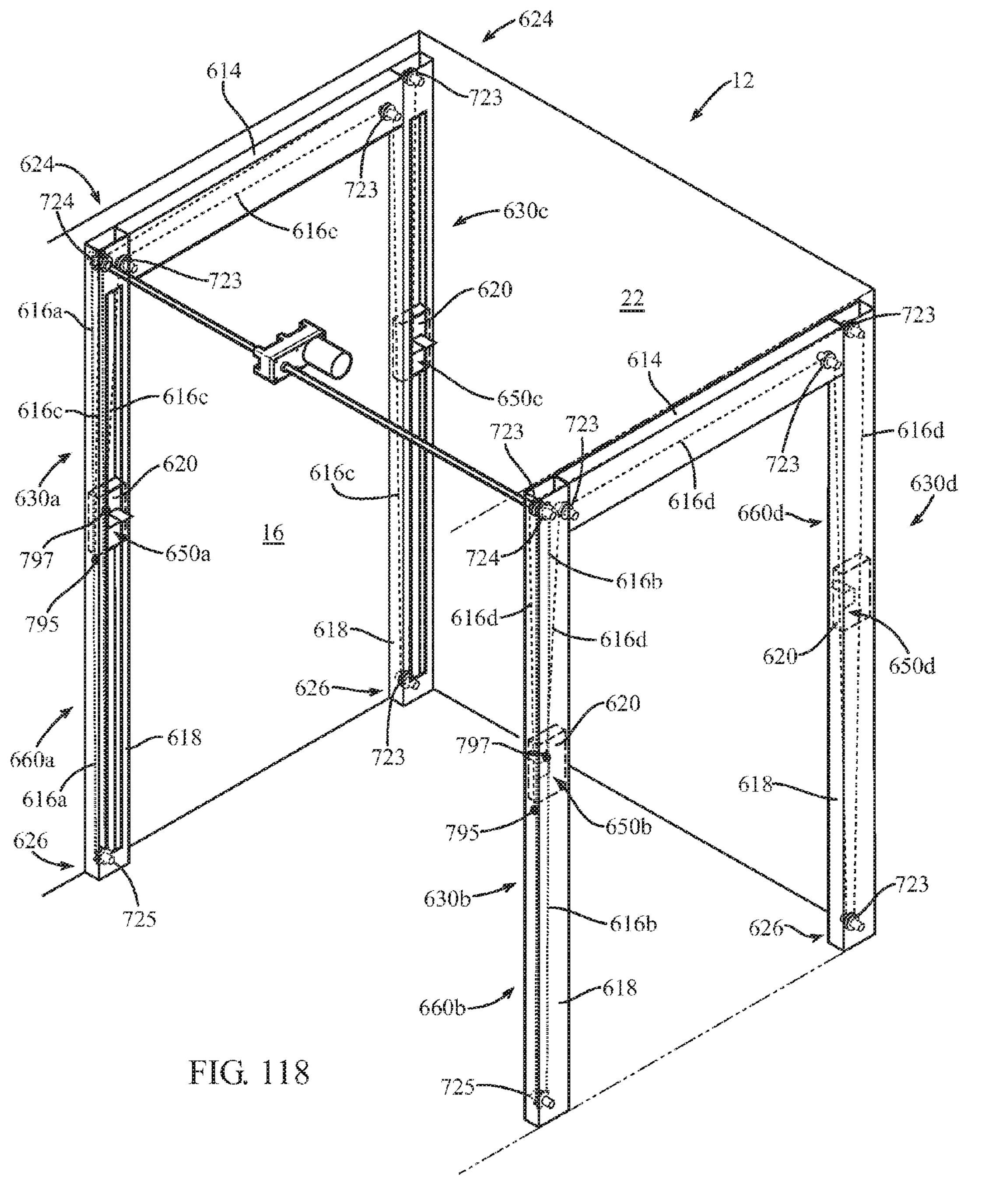

FIG. 118 shows a perspective view of another embodiment of a system for vertically moving one or more beds using chains and cables which move along endless paths.

Figure 119:
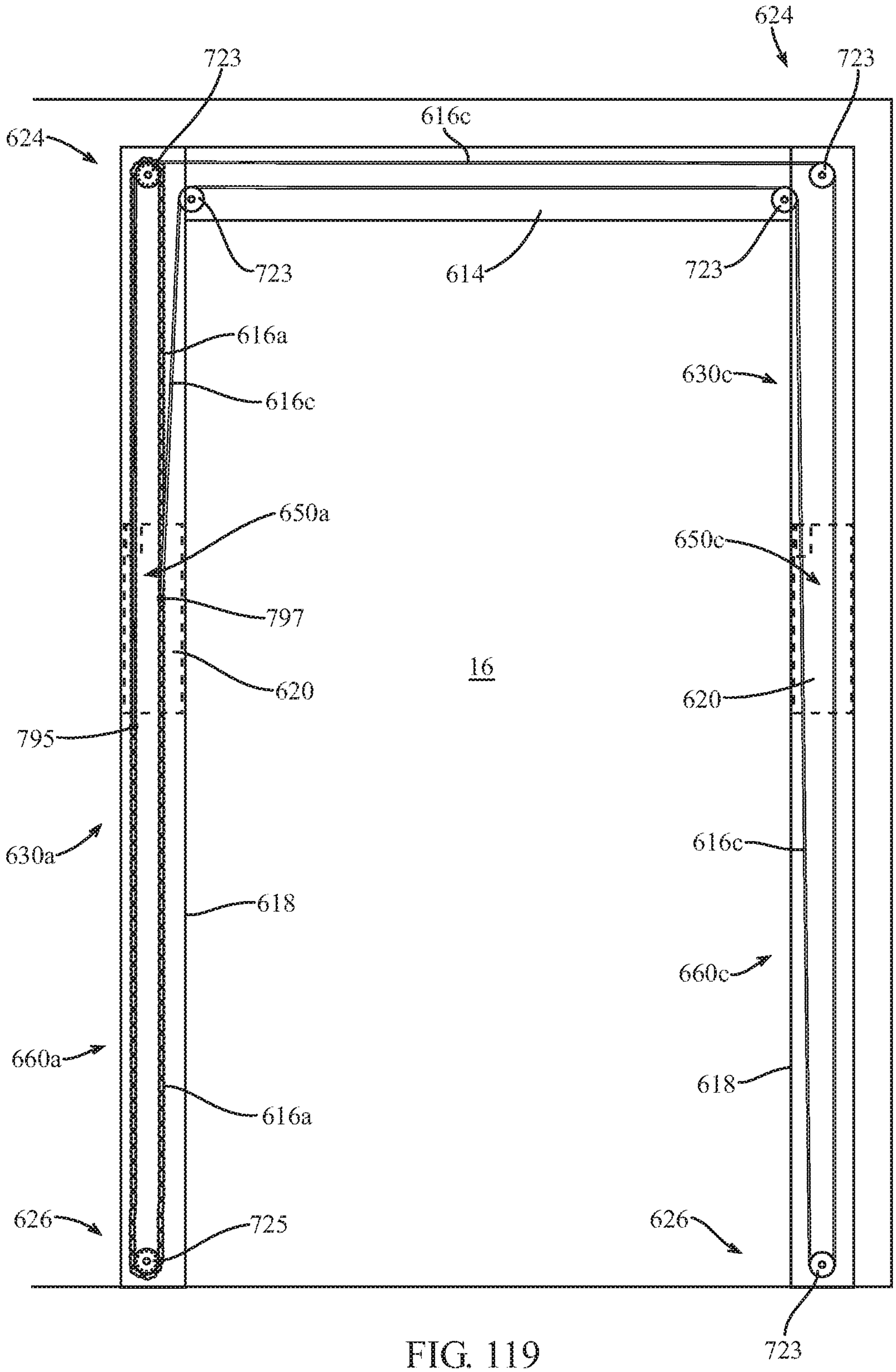

FIG. 119 shows a front view of two lifting assemblies coupled to a wall and used to vertically move one or more beds using a chain that moves along an endless path and a cable that moves along an endless path.

Figure 120:
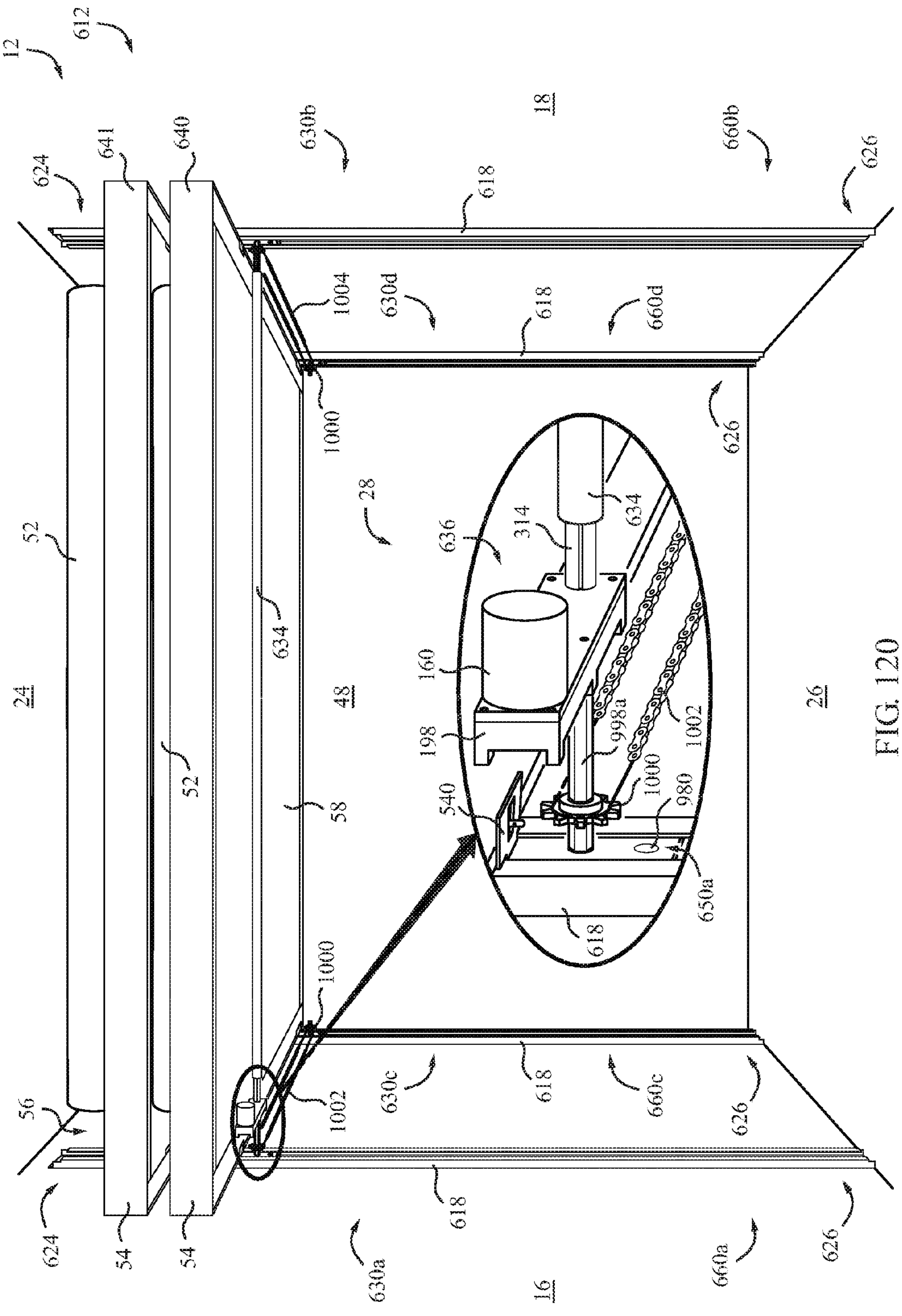

FIG. 120 shows a perspective view of another embodiment of a system for vertically moving one or more beds, the beds being shown in a stowed configuration.

Figure 121:
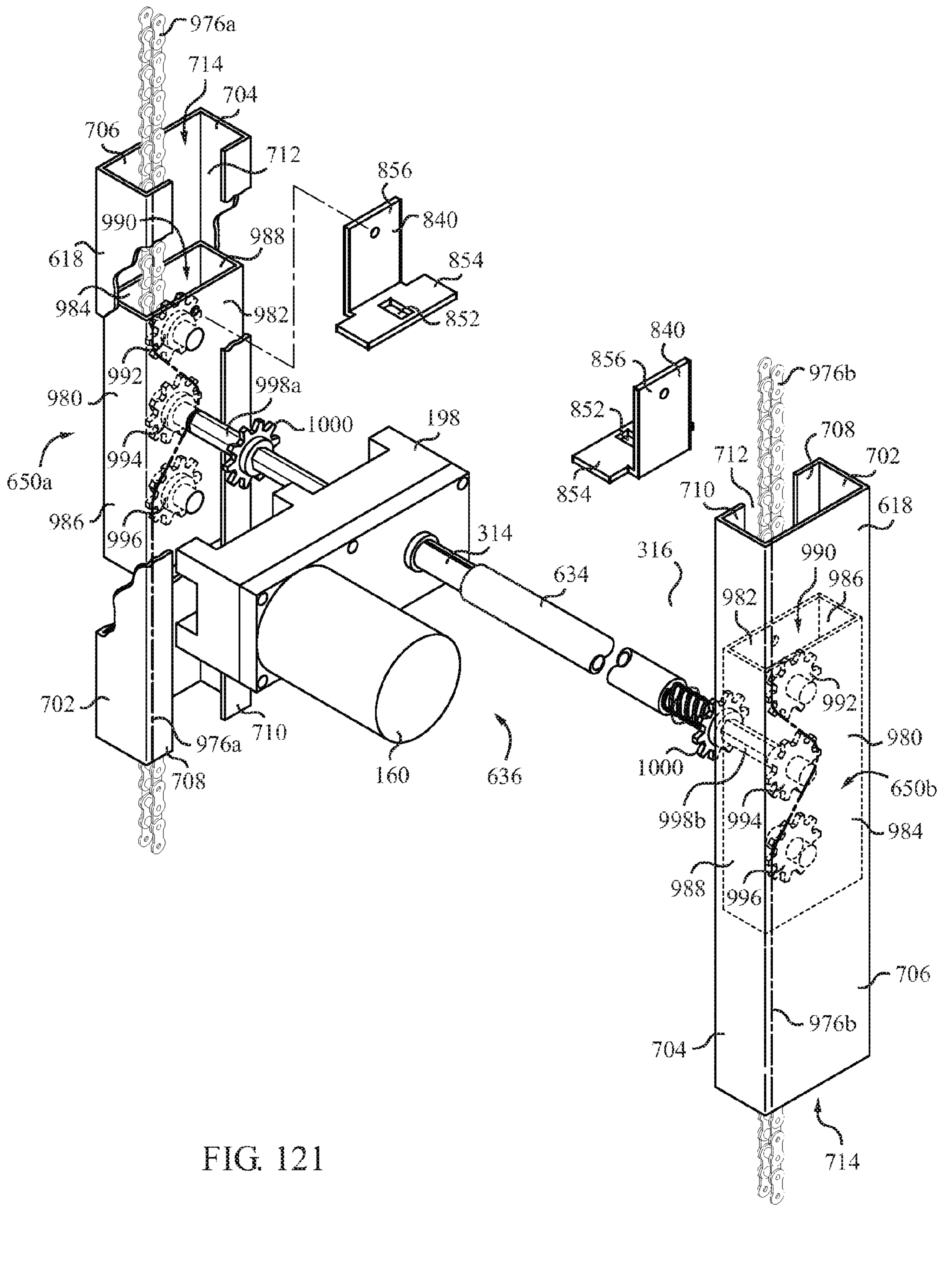

FIG. 121 shows a cut-away perspective view of a pair of opposed lifting assemblies which may be used in a system for vertically moving one or more beds.

Figure 122:
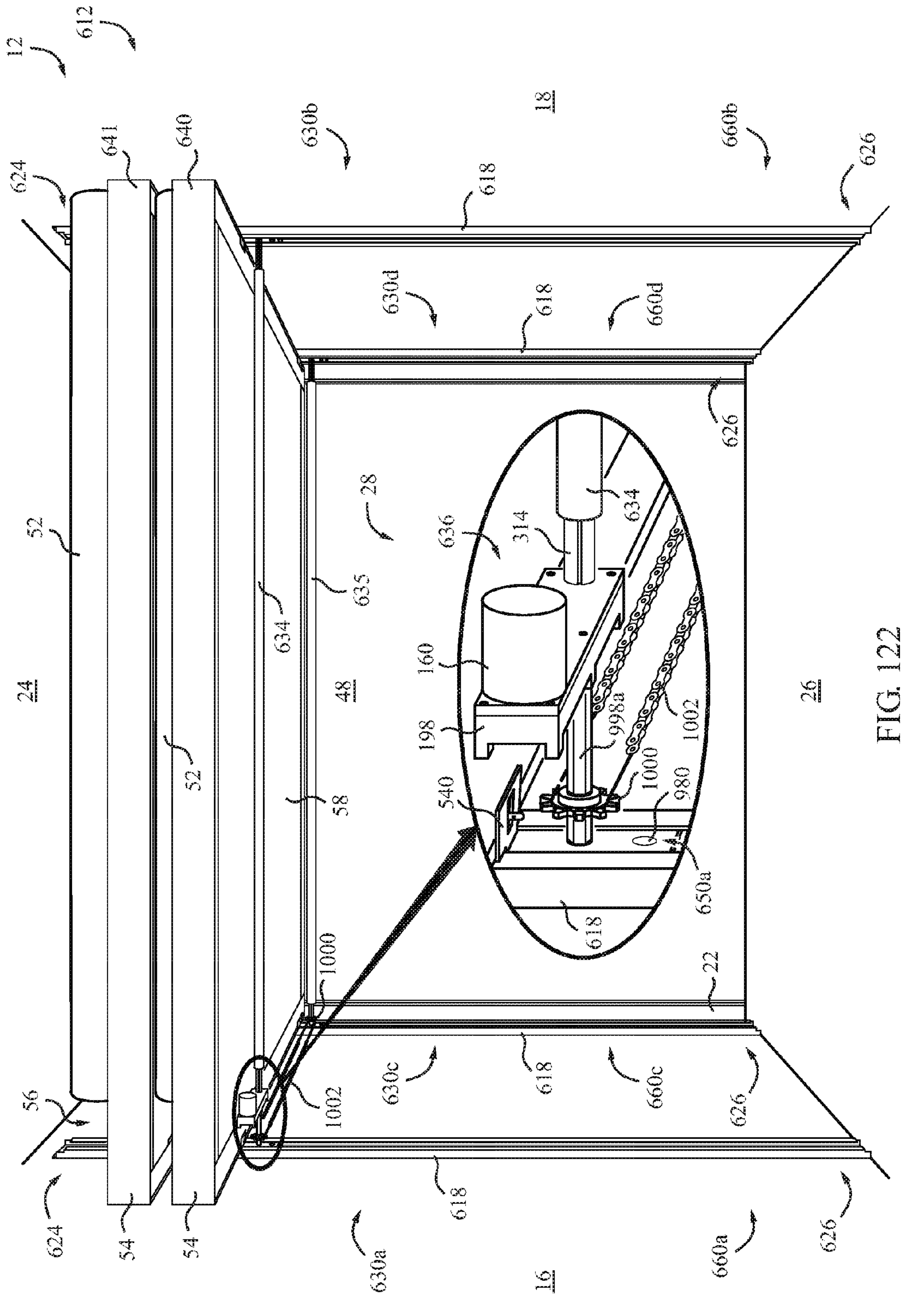

FIG. 122 shows a perspective view of another embodiment of a system for vertically moving one or more beds, the beds being shown in a stowed configuration.

Figure 123:
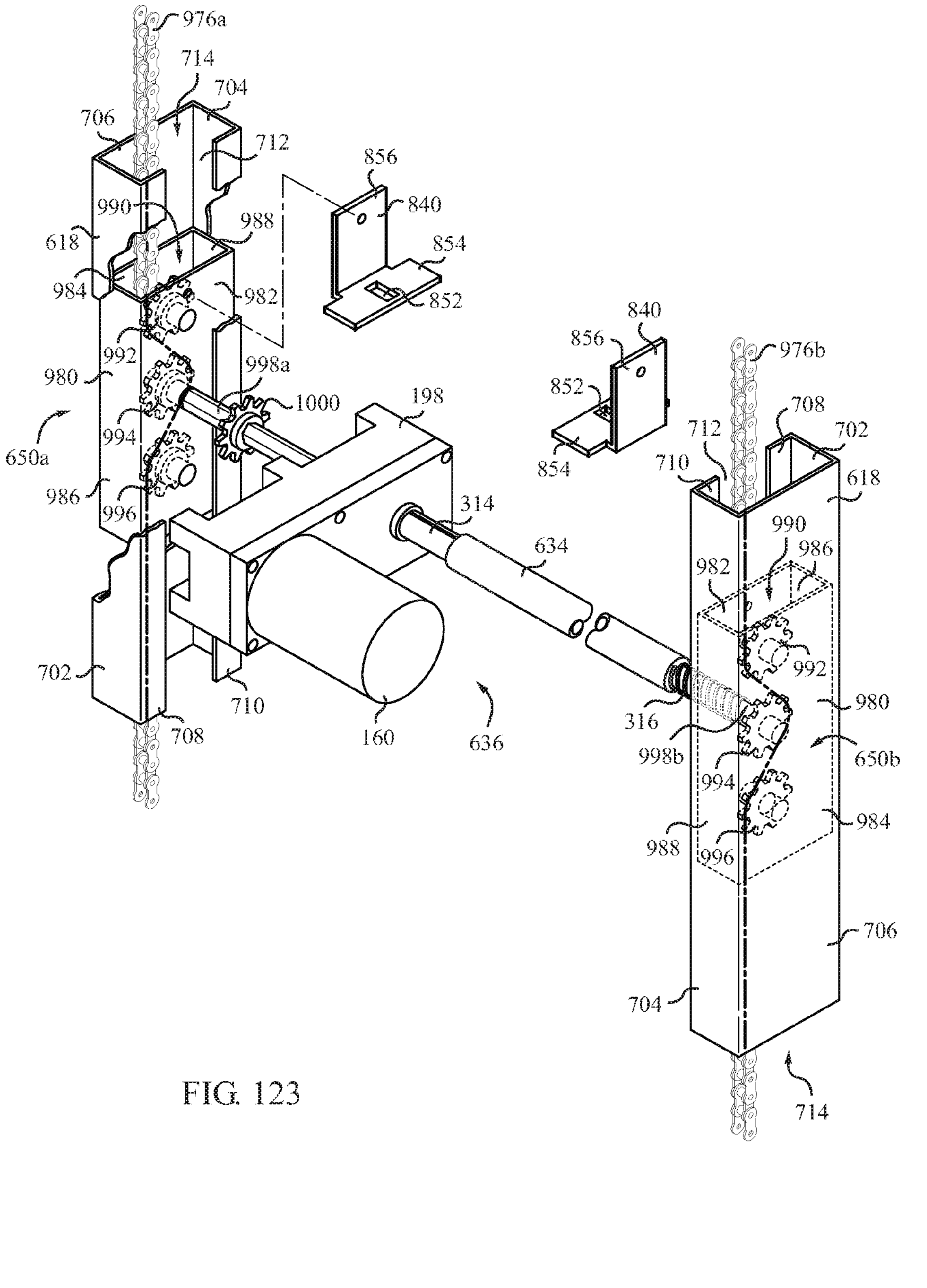

FIG. 123 shows a cut-away perspective view of a pair of opposed lifting assemblies which may be used in a system for vertically moving one or more beds.

Figure 124:
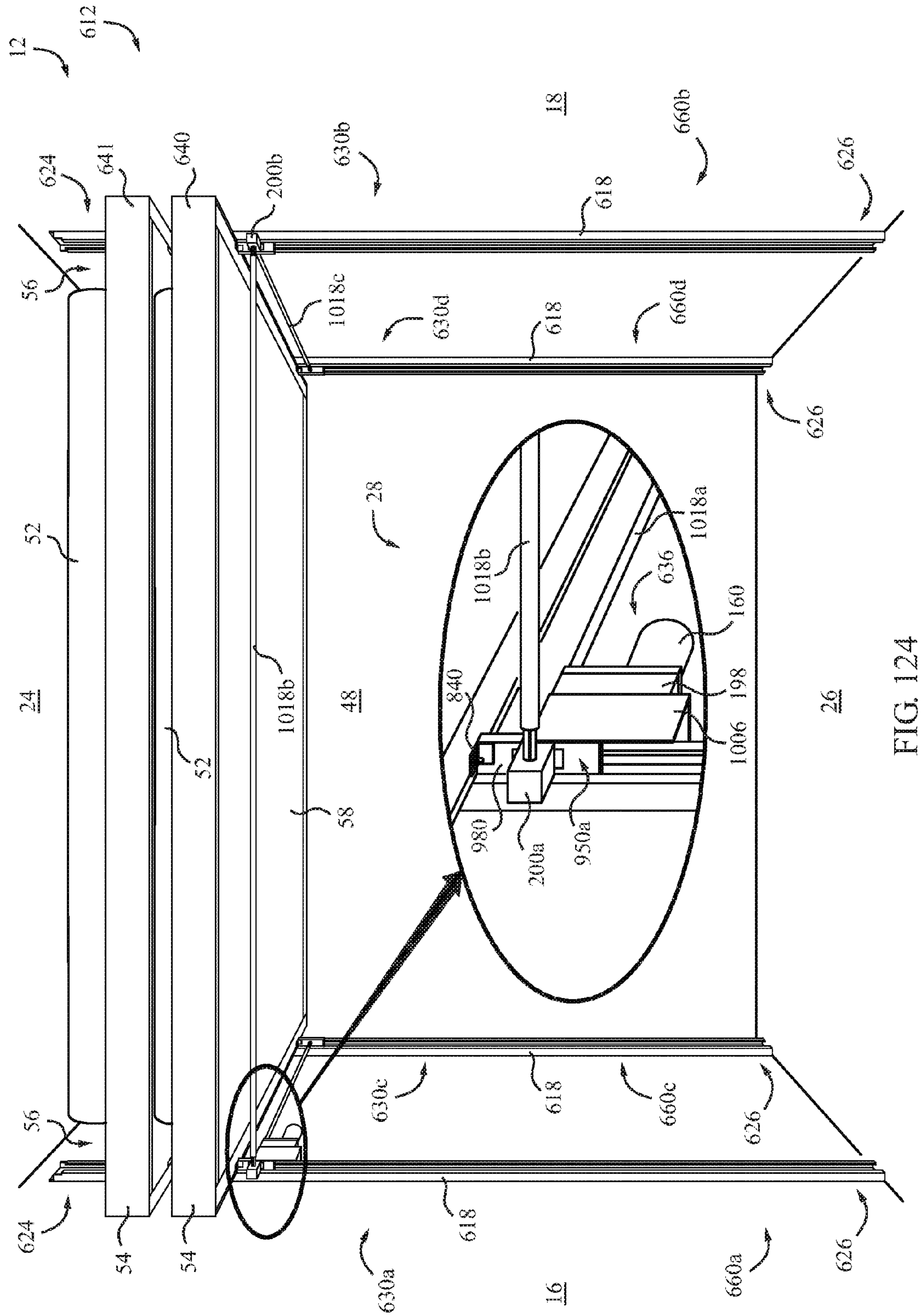

FIG. 124 shows a perspective view of another embodiment of a system for vertically moving one or more beds, the beds being shown in a stowed configuration.

Figure 125:
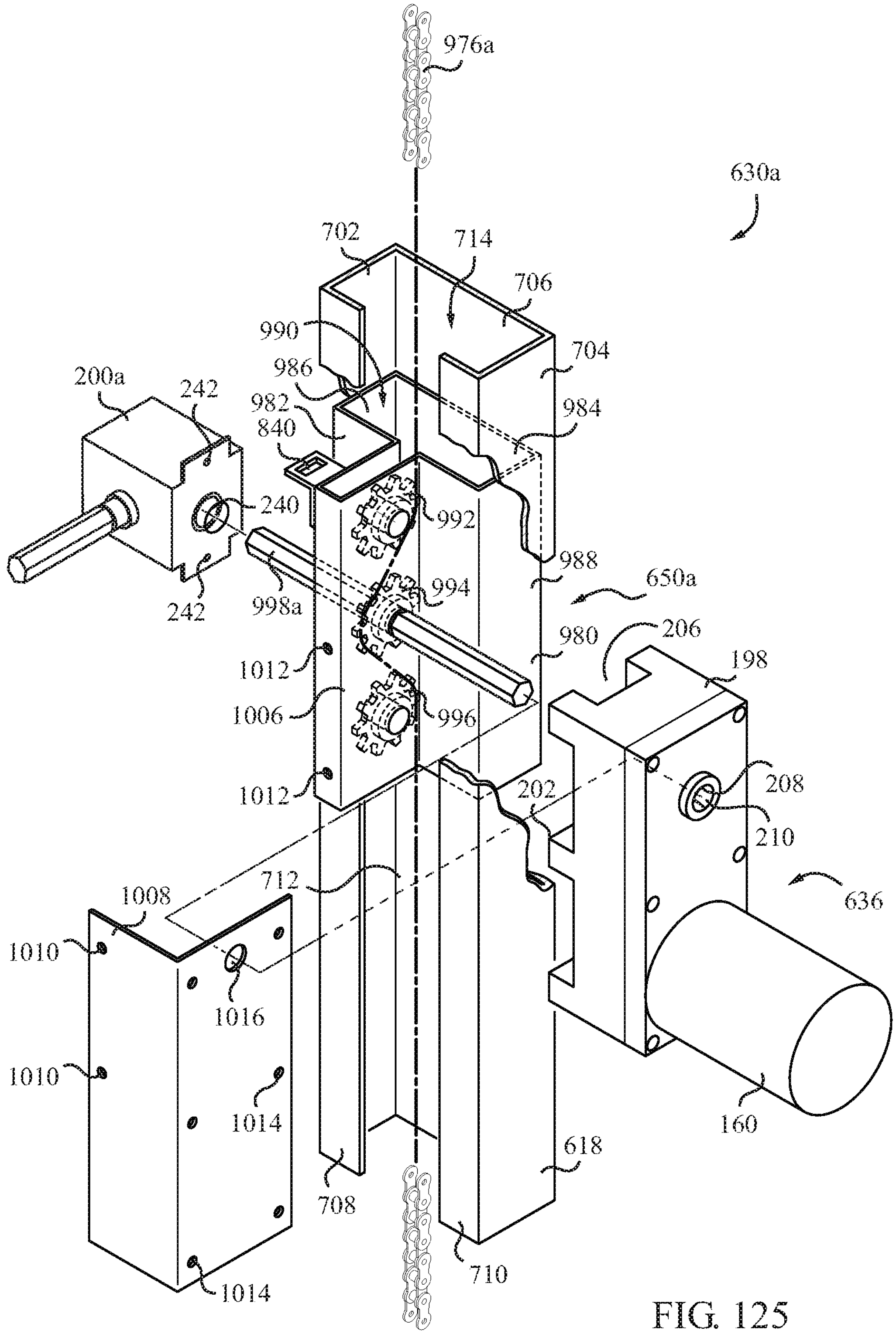

FIG. 125 shows a cut-away perspective view of a lifting assembly which may be used in a system for vertically moving one or more beds.

Figure 126:
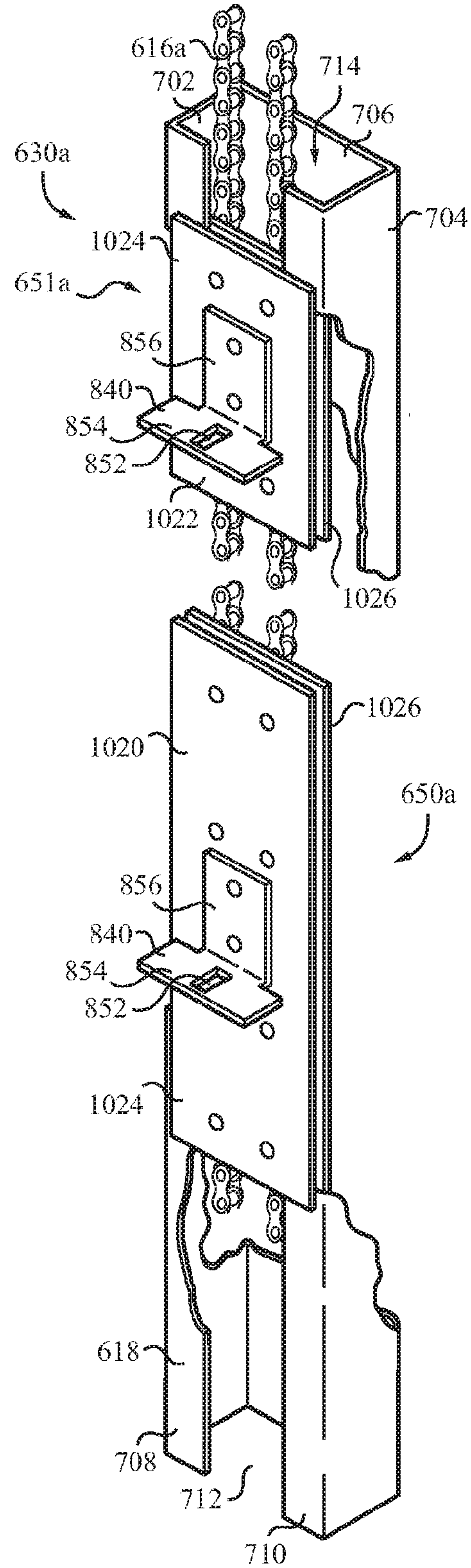

FIG. 126 shows a cut-away perspective view of another embodiment of a lifting assembly which may be used in a system for vertically moving one or more beds.

Figure 127:
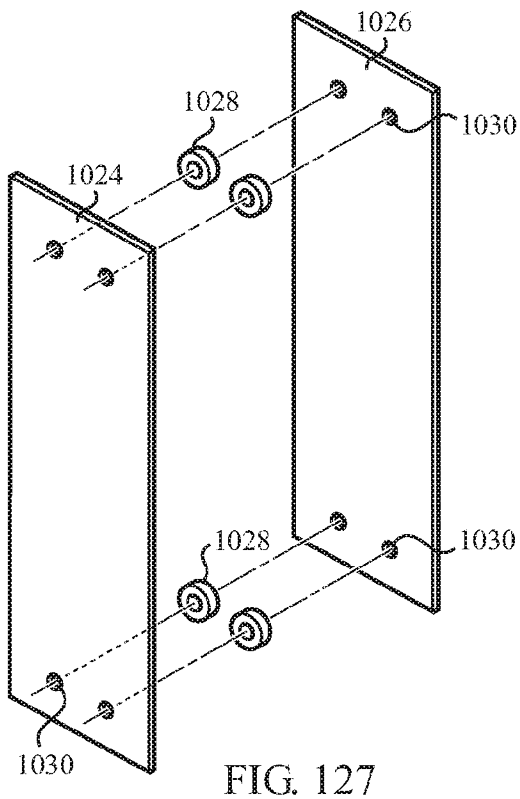

FIG. 127 shows an exploded perspective view of a moving member which may be used in a system for vertically moving one or more beds.

FIGS. 128-131 show various views of another embodiment of a lifting assembly which uses a chain to vertically move one or more beds.

Figure 132:
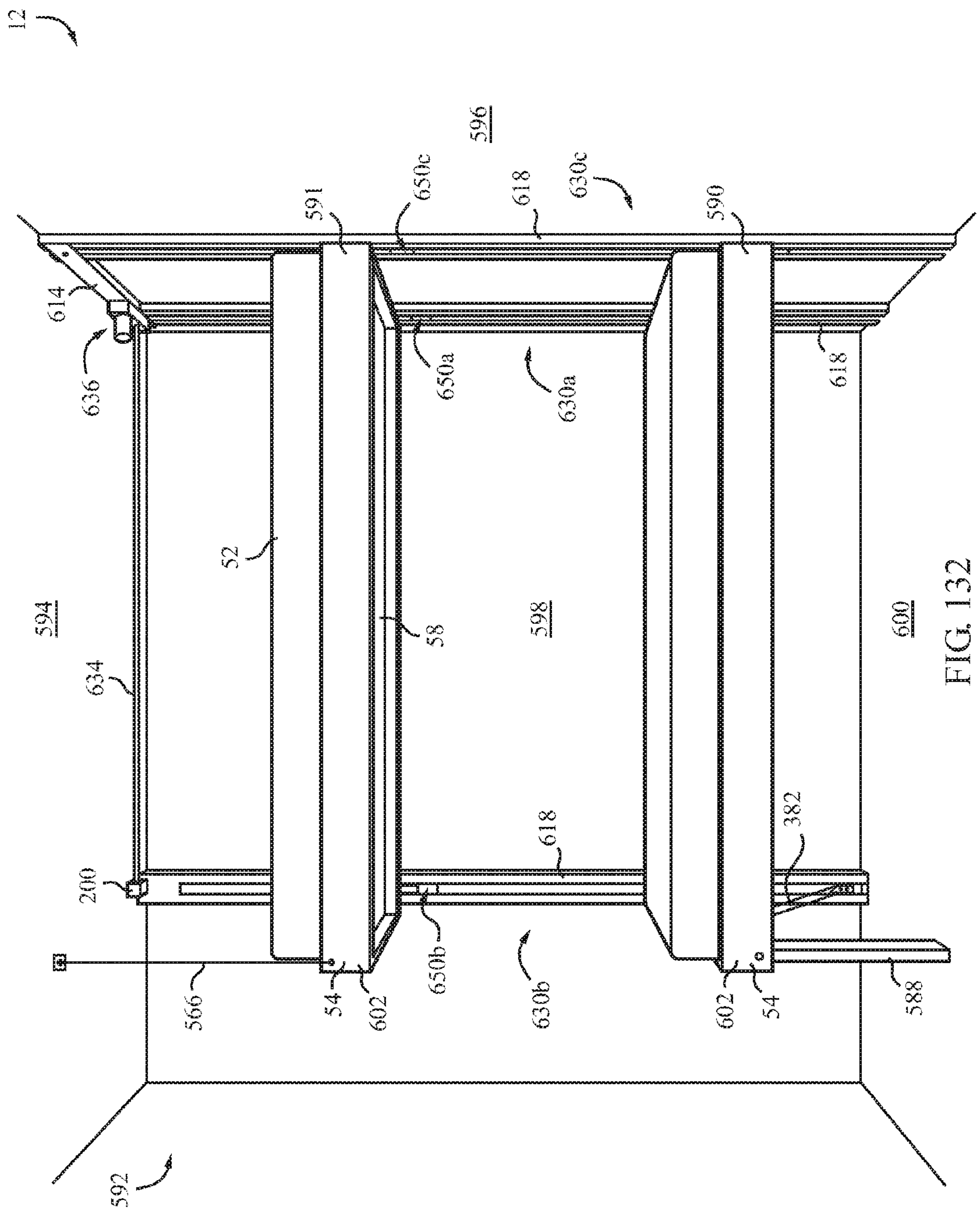

FIG. 132 shows a perspective view of one embodiment of a system for moving one or more beds in a corner.

Figure 133:
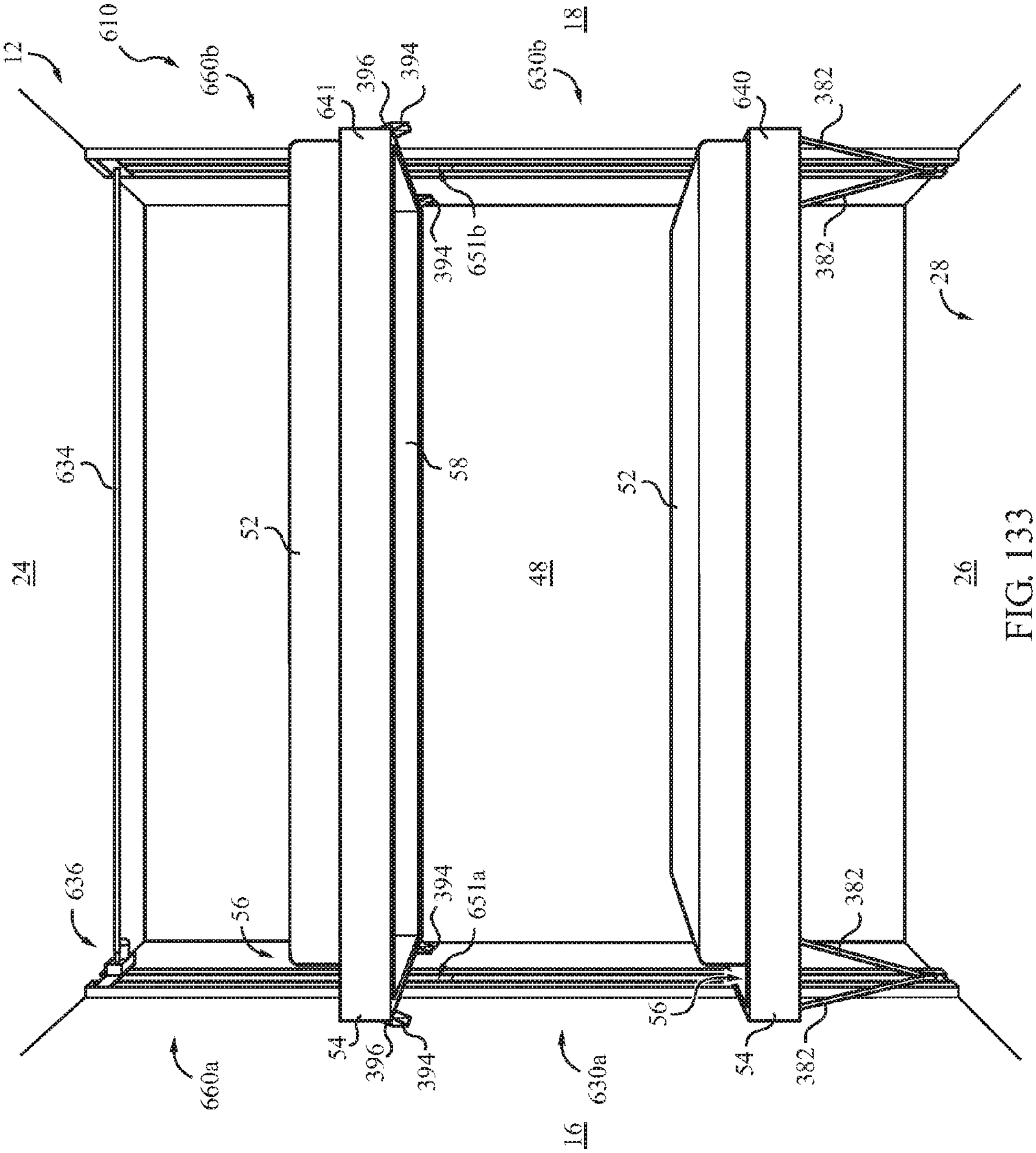

FIG. 133 shows a perspective view of another embodiment of a system for vertically moving one or more beds using a single lifting assembly coupled to opposing walls, the beds being shown in the use configuration.

Figure 134:
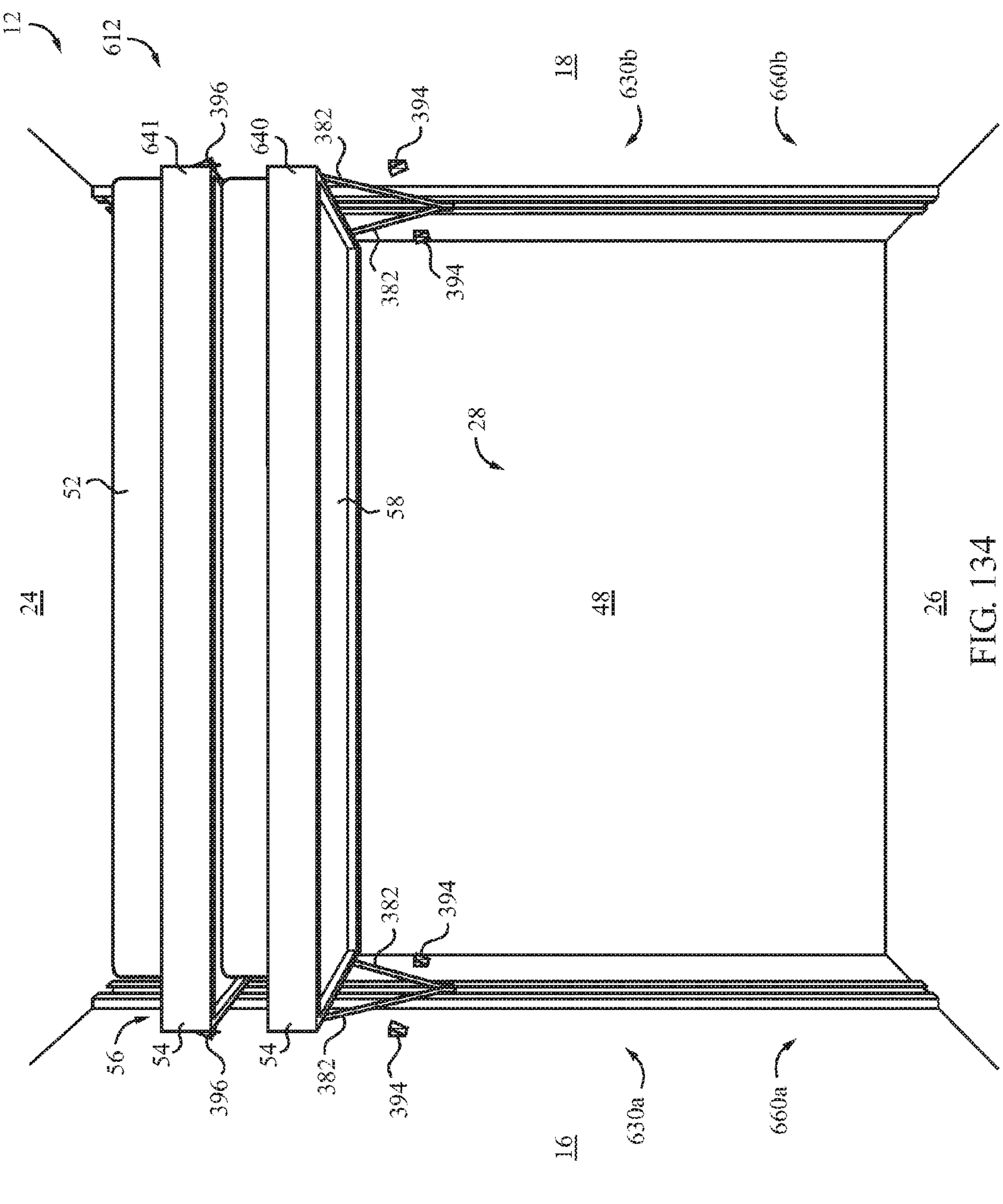

FIG. 134 shows a perspective view of the system for vertically moving one or more beds using a single lifting assembly coupled to opposing walls, the beds being shown in the stowed configuration.

Figure 135:
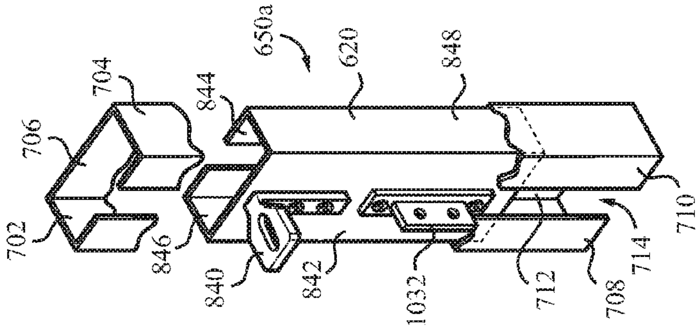

FIG. 135 shows a cut-away perspective view of another embodiment of a moving assembly.

Figure 136:
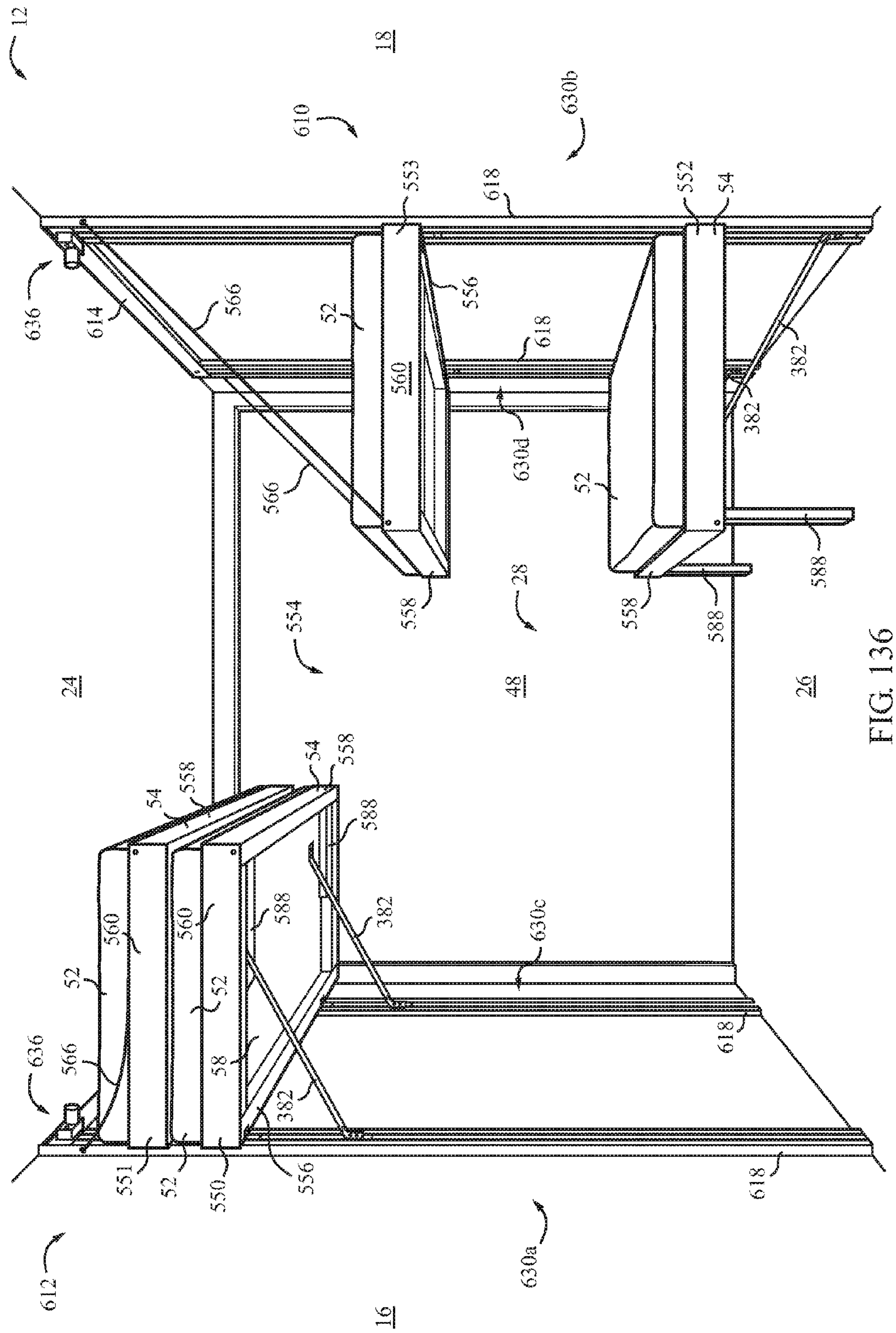

FIG. 136 shows a perspective view of another embodiment of a system for vertically moving two pairs of beds, each of the beds is coupled to a single wall and where one pair of beds is shown in a use configuration and another pair of beds is shown in a stowed configuration.

Figure 137:
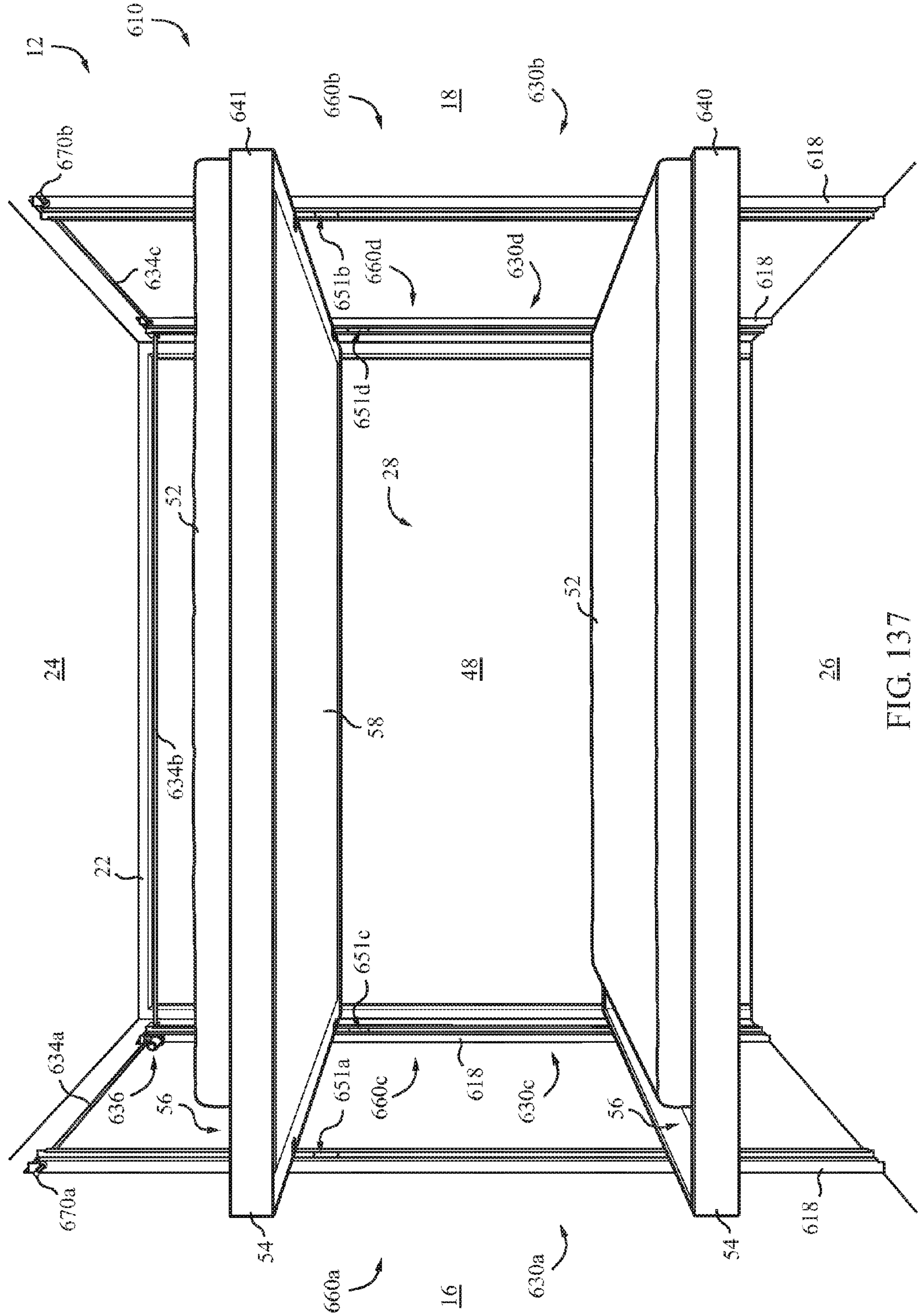

FIG. 137 shows a perspective view of another embodiment of a system for vertically moving one or more beds, the beds being shown in a use configuration.

Figure 138:
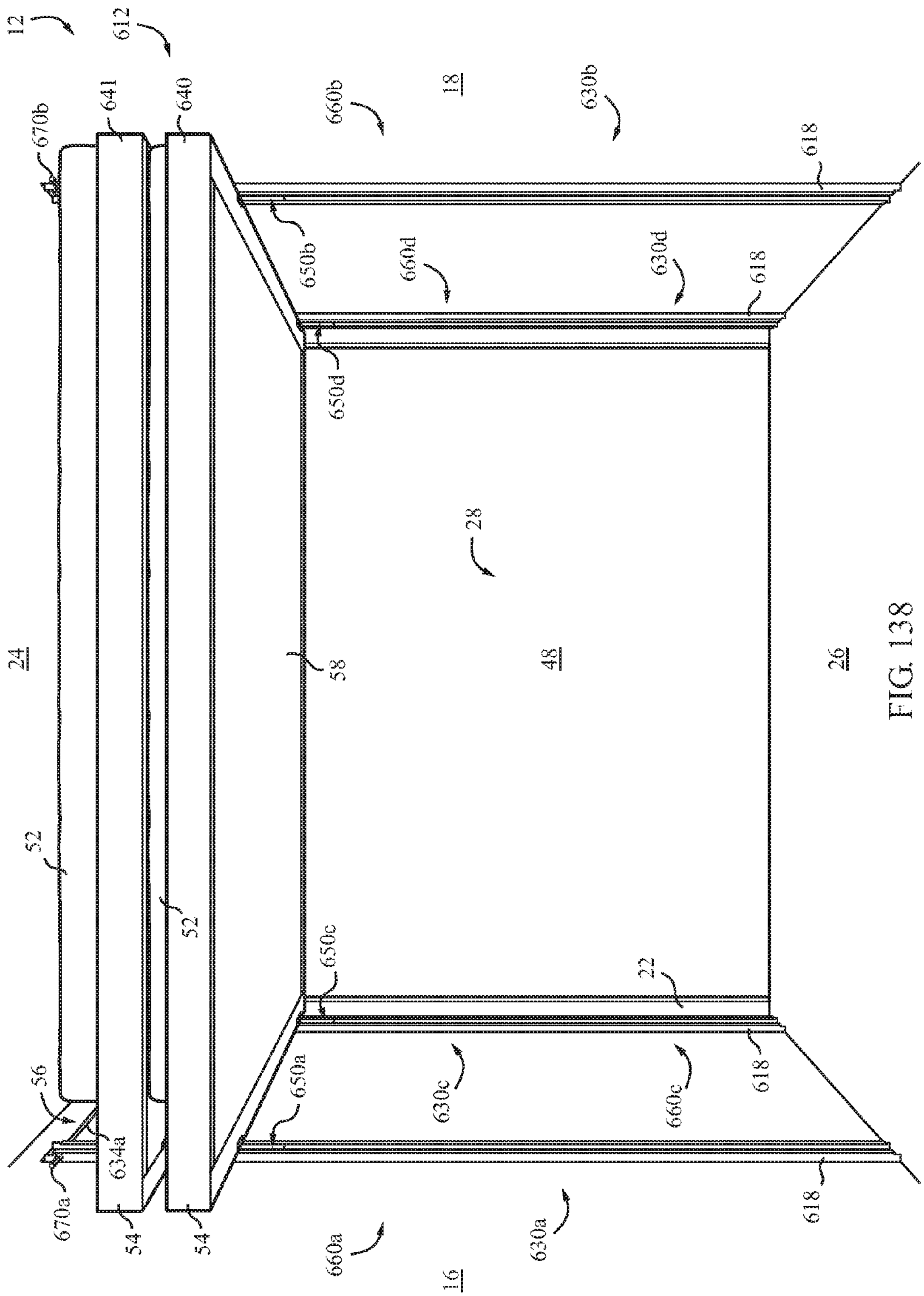

FIG. 138 shows a perspective view of the system for vertically moving one or more beds, the beds being shown in a stowed configuration.

Figure 139:
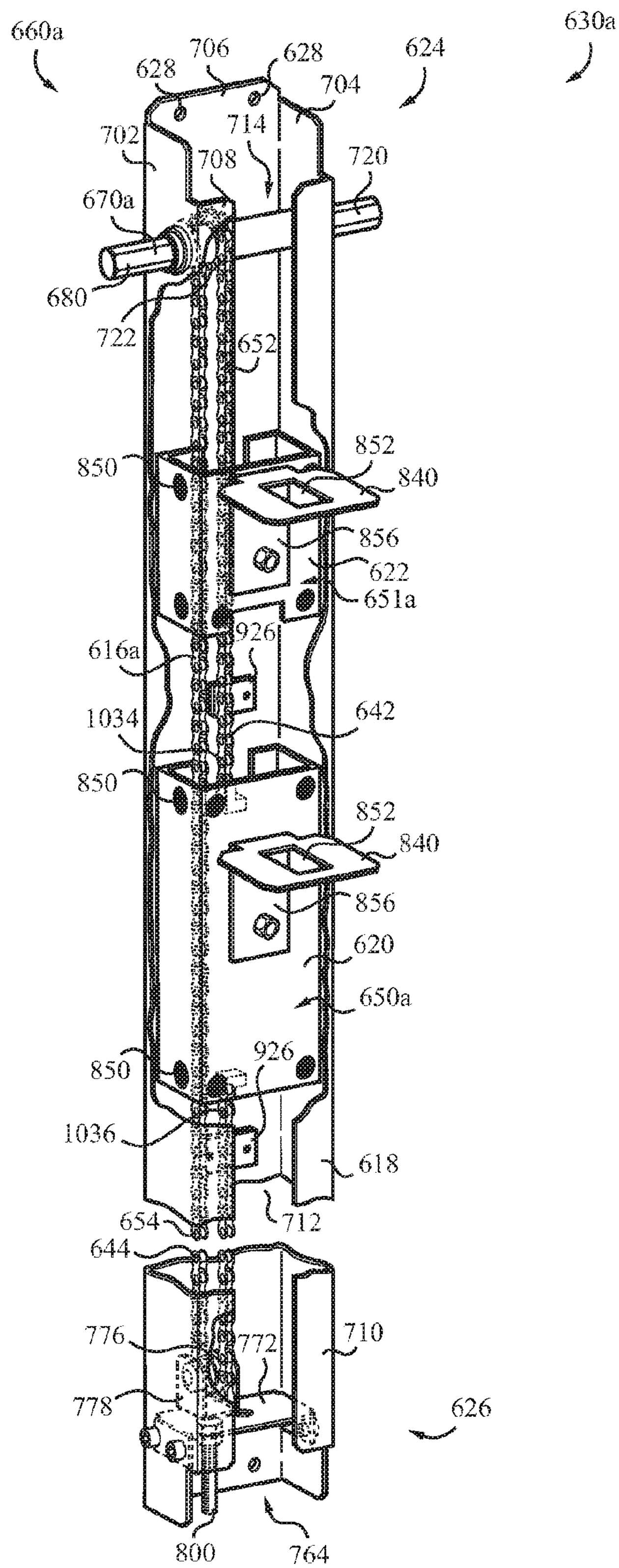

FIG. 139 shows a cut-away perspective view of another embodiment of a lifting assembly which uses a chain to vertically move one or more beds.

Figure 140:
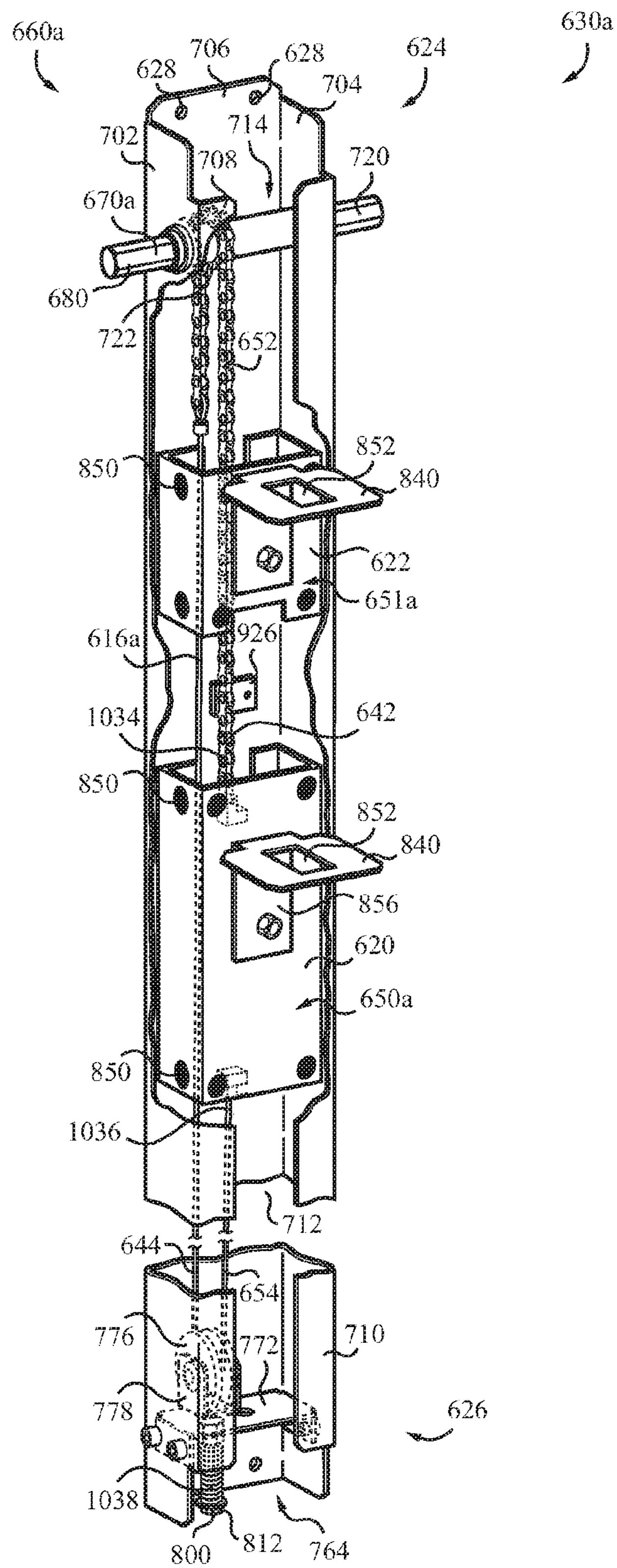

FIG. 140 shows a cut-away perspective view of another embodiment of a lifting assembly which uses a flexible drive member comprising two types of flexible drive materials to vertically move one or more beds.

Figure 141:
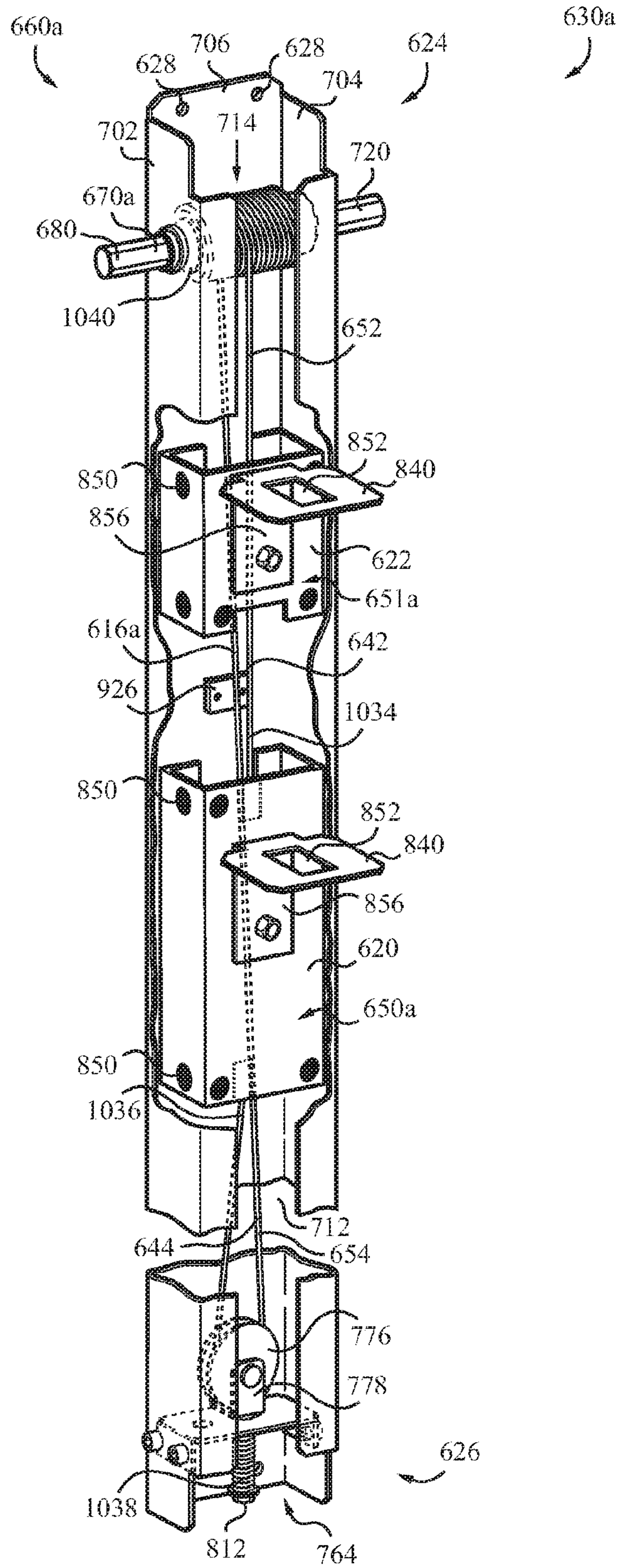

FIG. 141 shows a cut-away perspective view of another embodiment of a lifting assembly which uses an endless cable to vertically move one or more beds.

Figure 142:
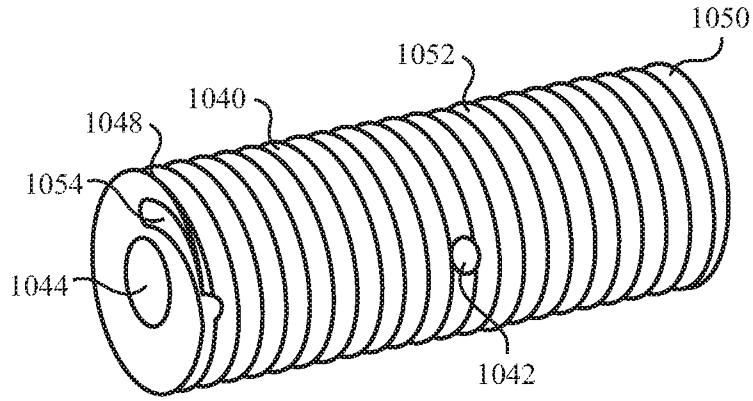
Figure 143:
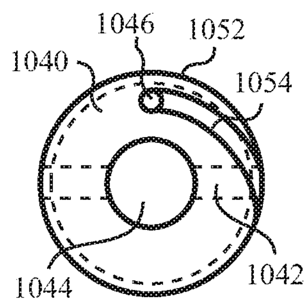
Figure 144:
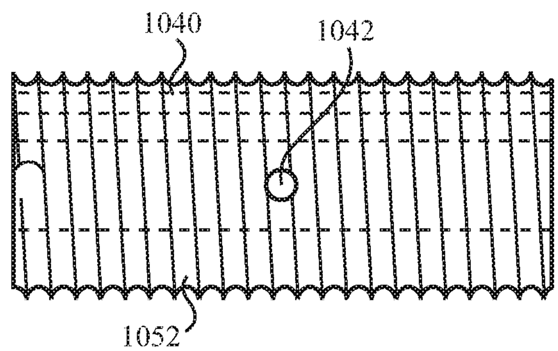

FIGS. 142-144 show various views of one embodiment of a spool which may be configured to hold the endless cable from FIG. 141.

Figure 145:
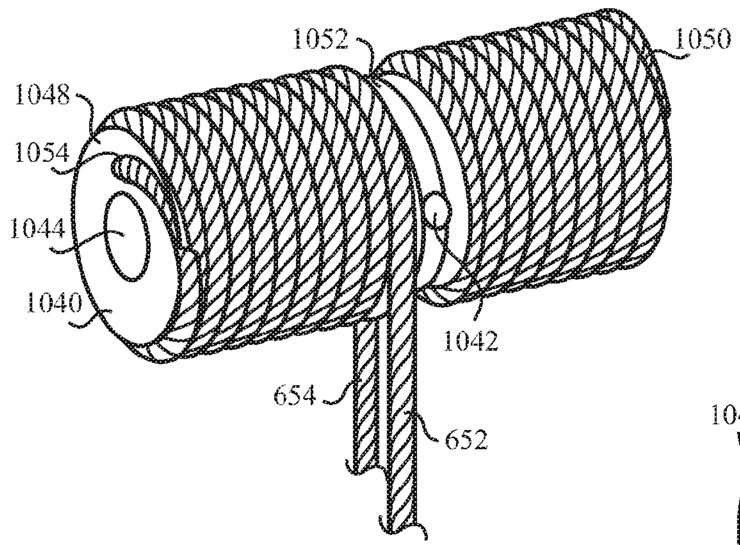
Figure 146:
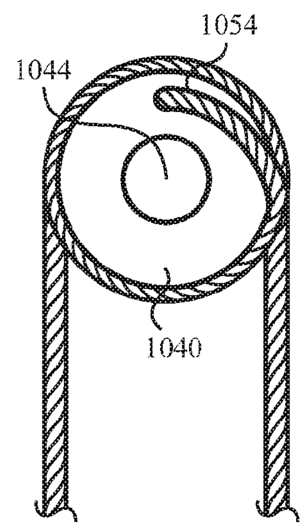
Figure 147:
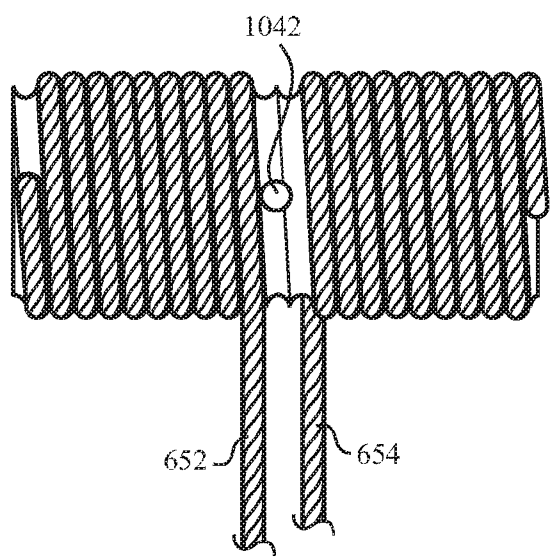

FIGS. 145-147 show various views of the spool with an endless cable wrapped on the spool.

Figure 148:
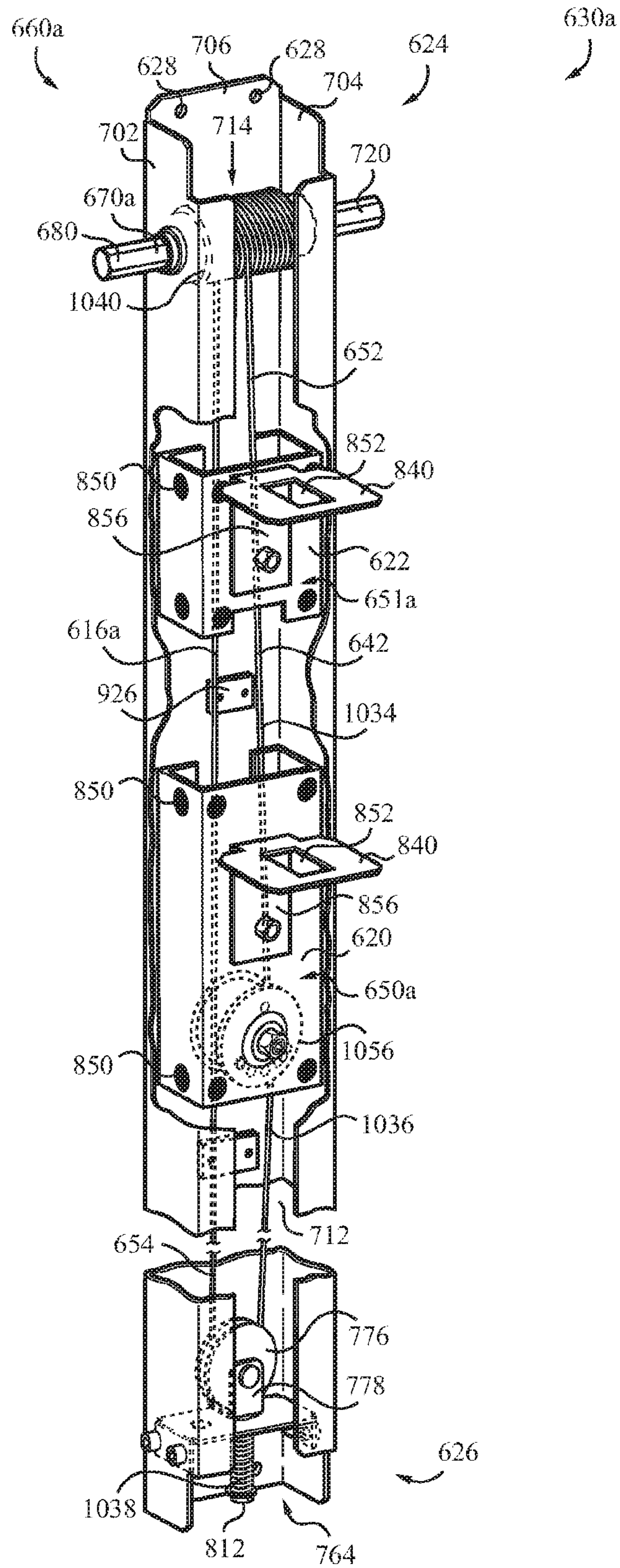

FIG. 148 shows a cut-away perspective view of another embodiment of a lifting assembly which uses a timing mechanism to adjust the position of a moving assembly.

Figure 149:
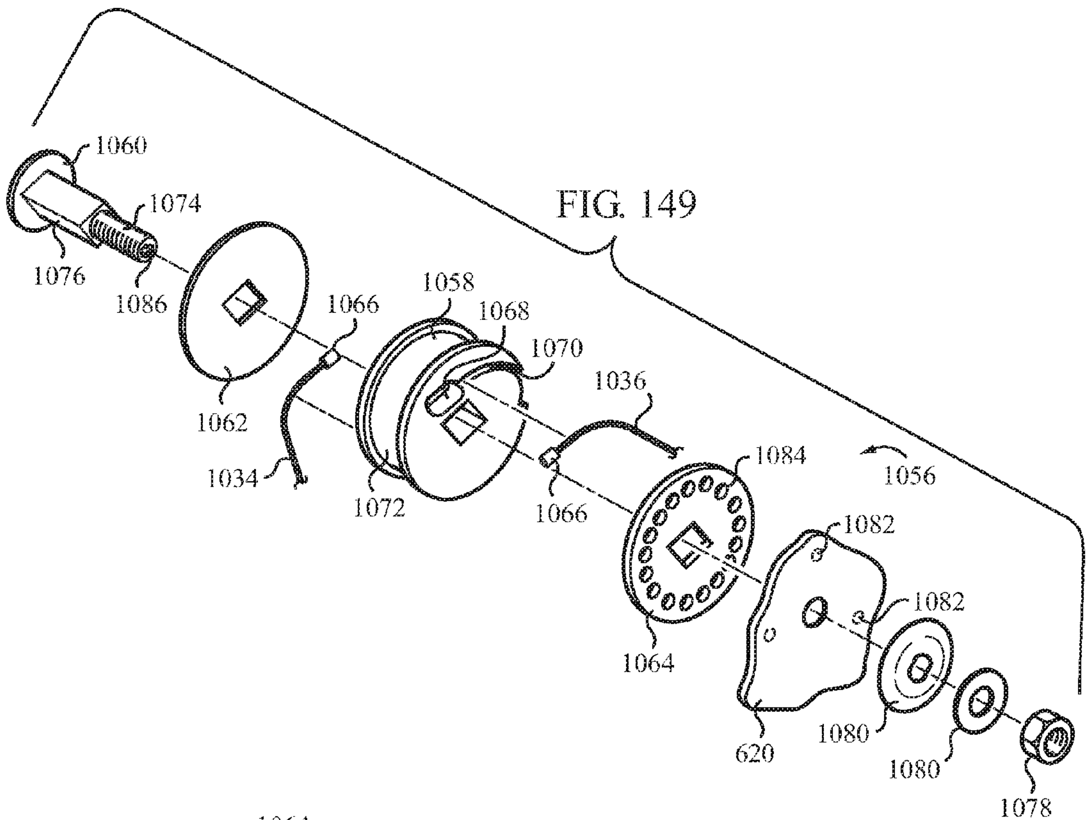

FIG. 149 shows an exploded view of the timing mechanism.

Figure 150:
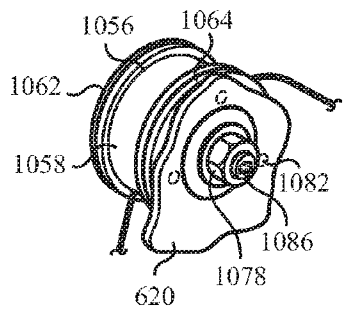
Figure 151:
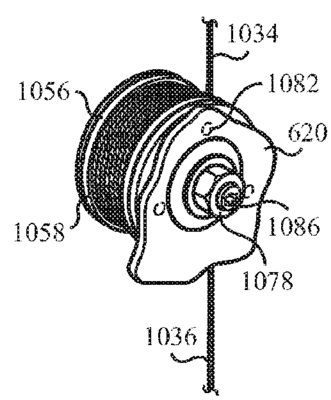

FIGS. 150-151 show perspective views the timing mechanism with and without a cable wrapped on the timing assembly.

Figure 152:
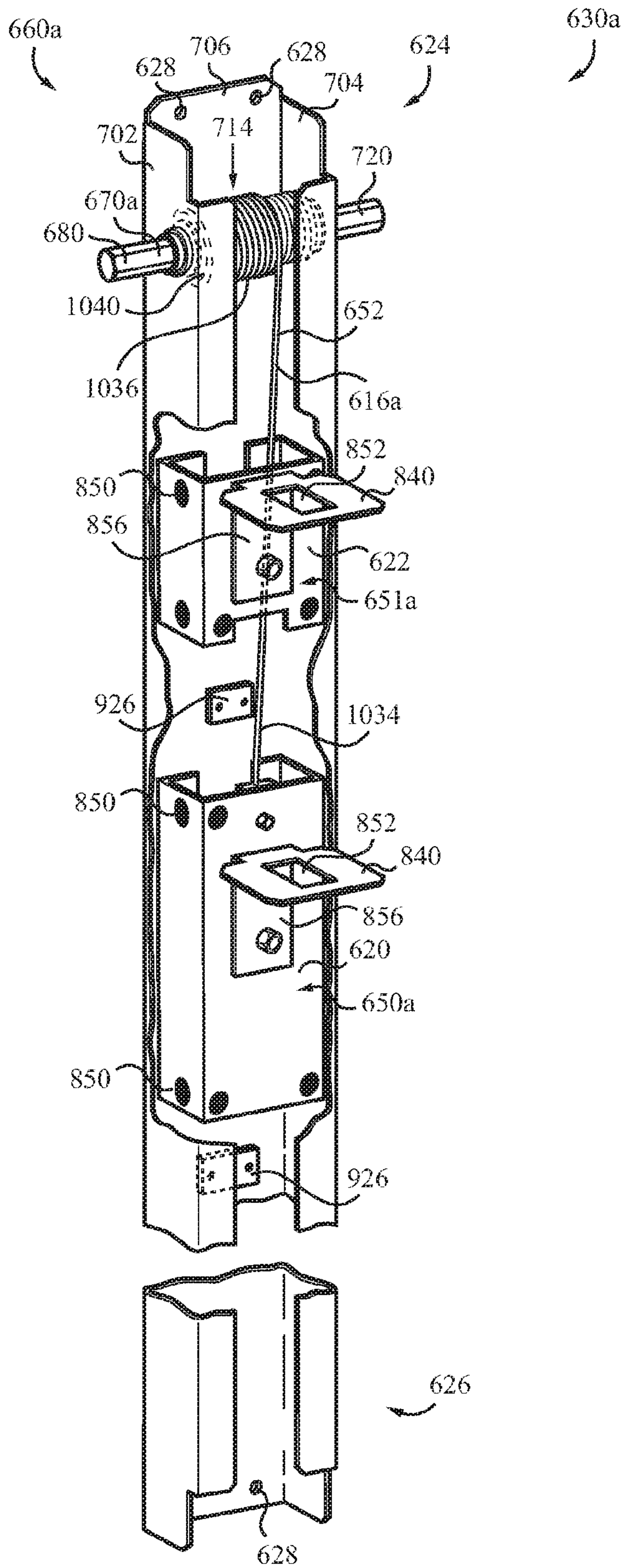

FIG. 152 shows a cut-away perspective view of another embodiment of a lifting assembly which uses a cable to vertically move one or more beds.

Figure 153:
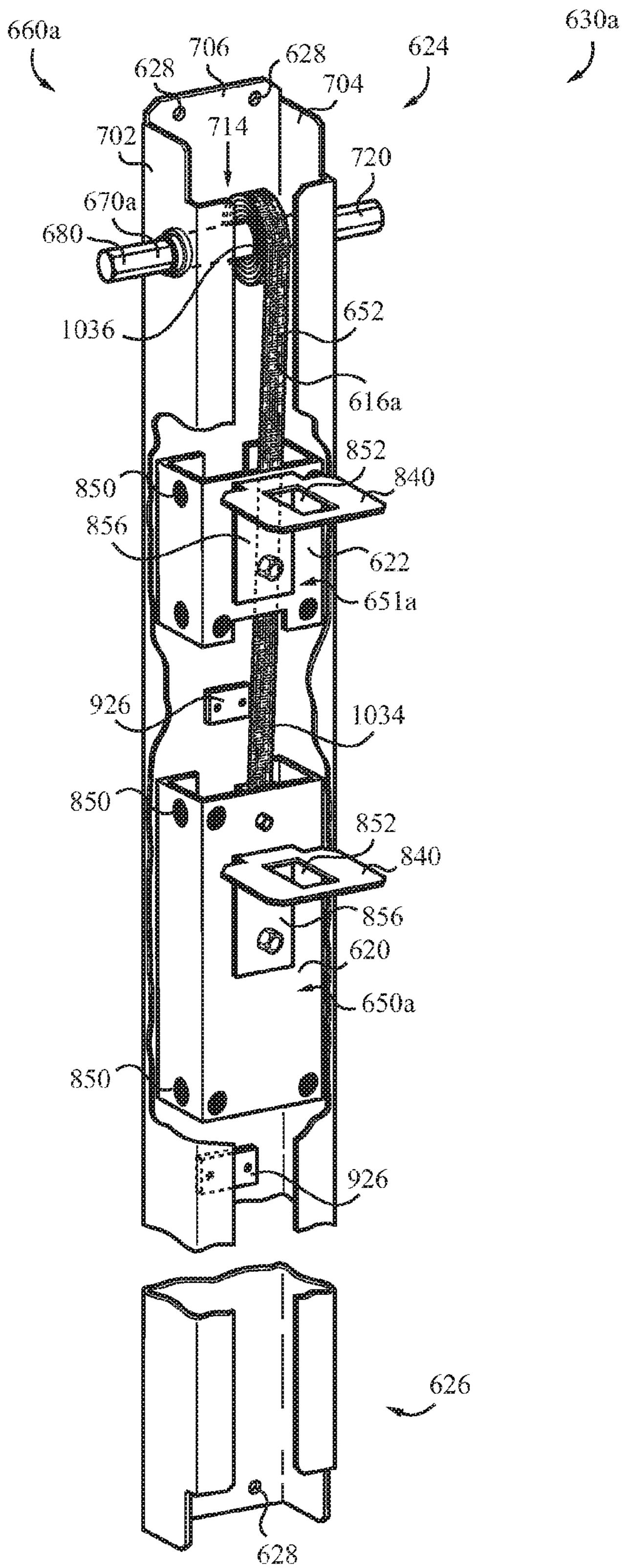

FIG. 153 shows a cut-away perspective view of another embodiment of a lifting assembly which uses a strap to vertically move a pair of beds.

Figure 154:
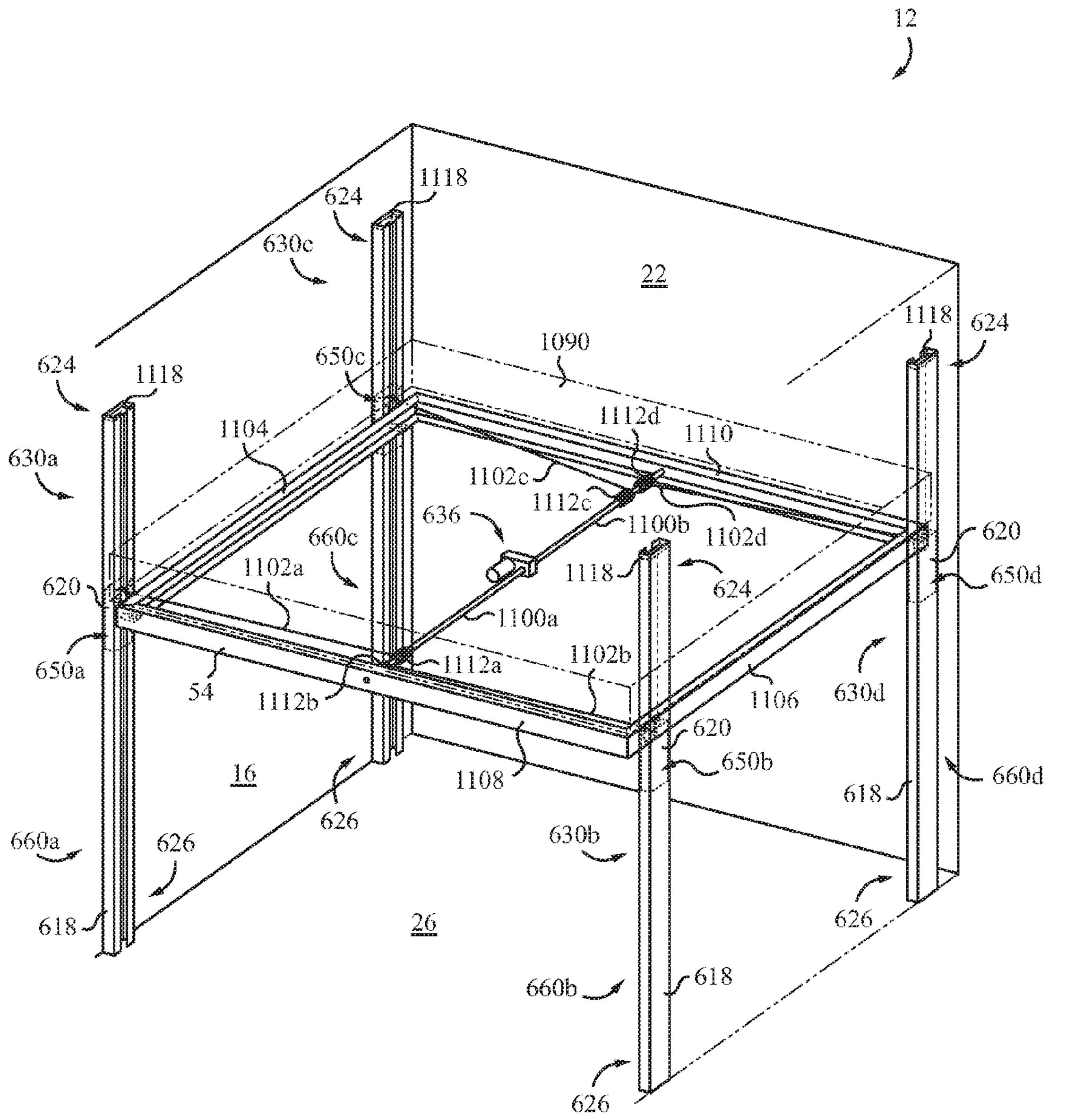

FIG. 154 shows a perspective view of another embodiment of a system for vertically moving one or more beds which uses cables that wrap on spools positioned underneath the bed.

Figure 155:
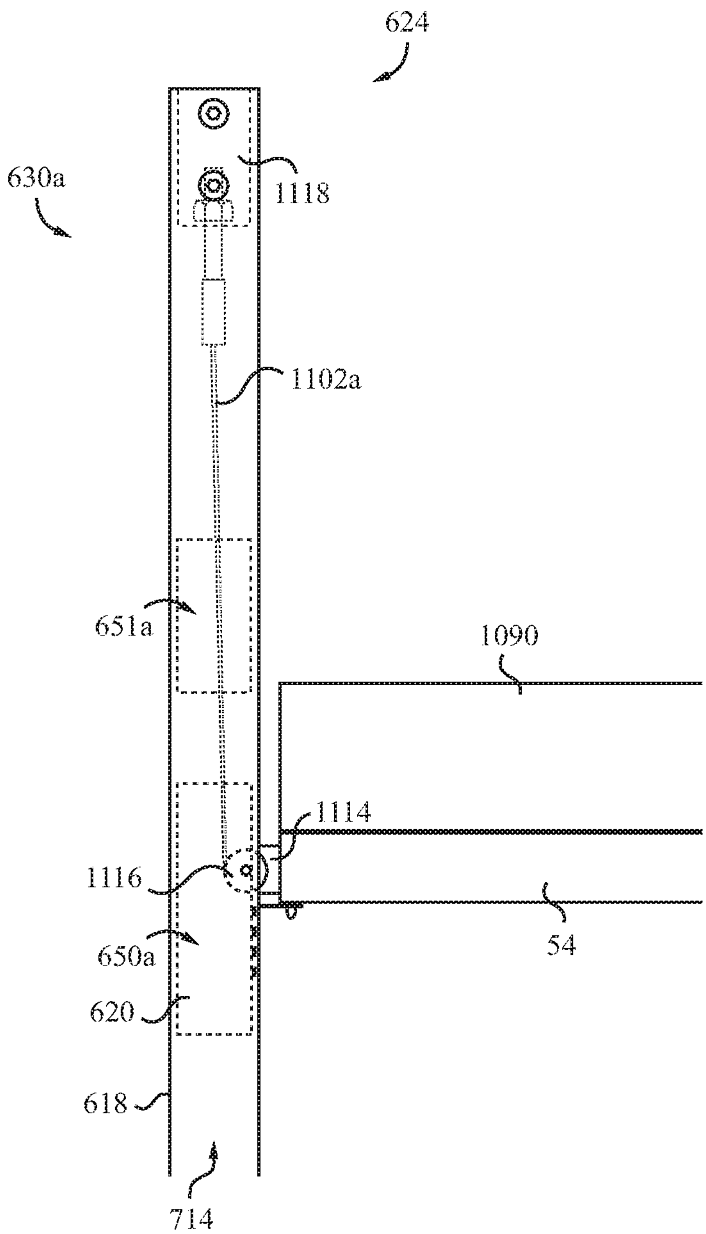

FIG. 155 shows a side view of the lifting assembly which uses cables that wrap on spools to vertically move a bed.

Figure 156:
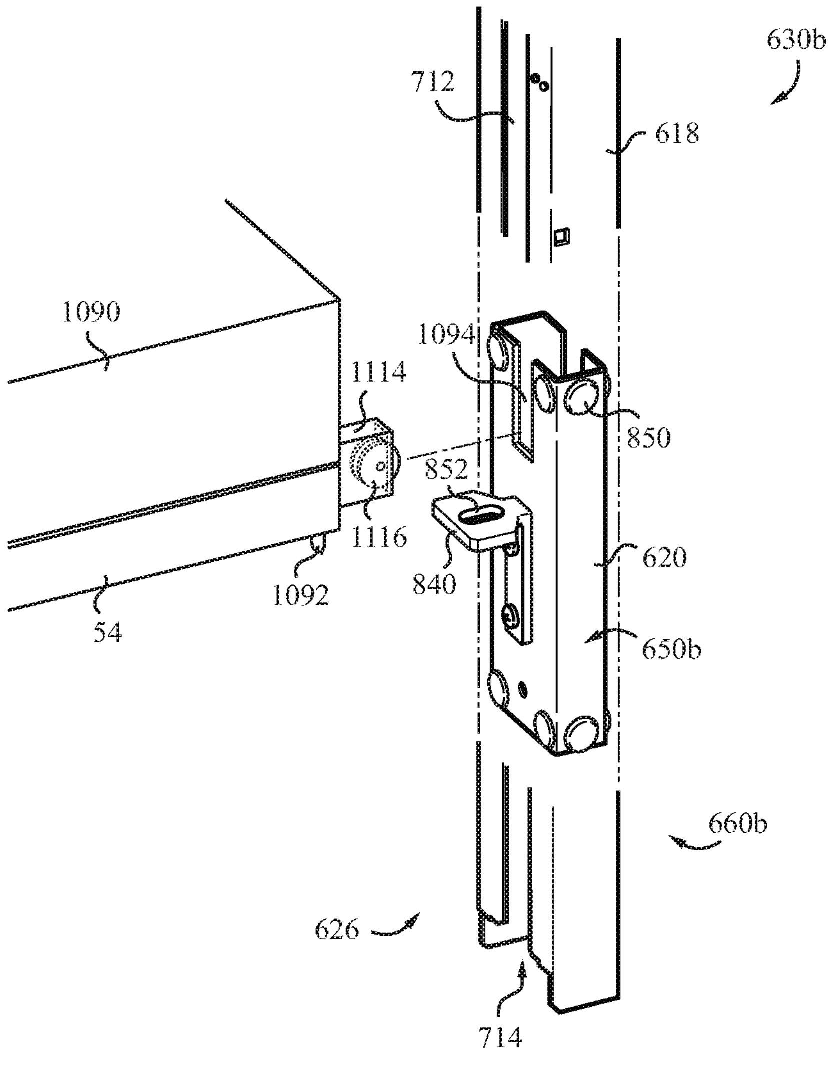

FIG. 156 shows a perspective view of one embodiment of a lifting assembly which cooperates with a frame member of a bed to vertically move the bed.

Figure 157:
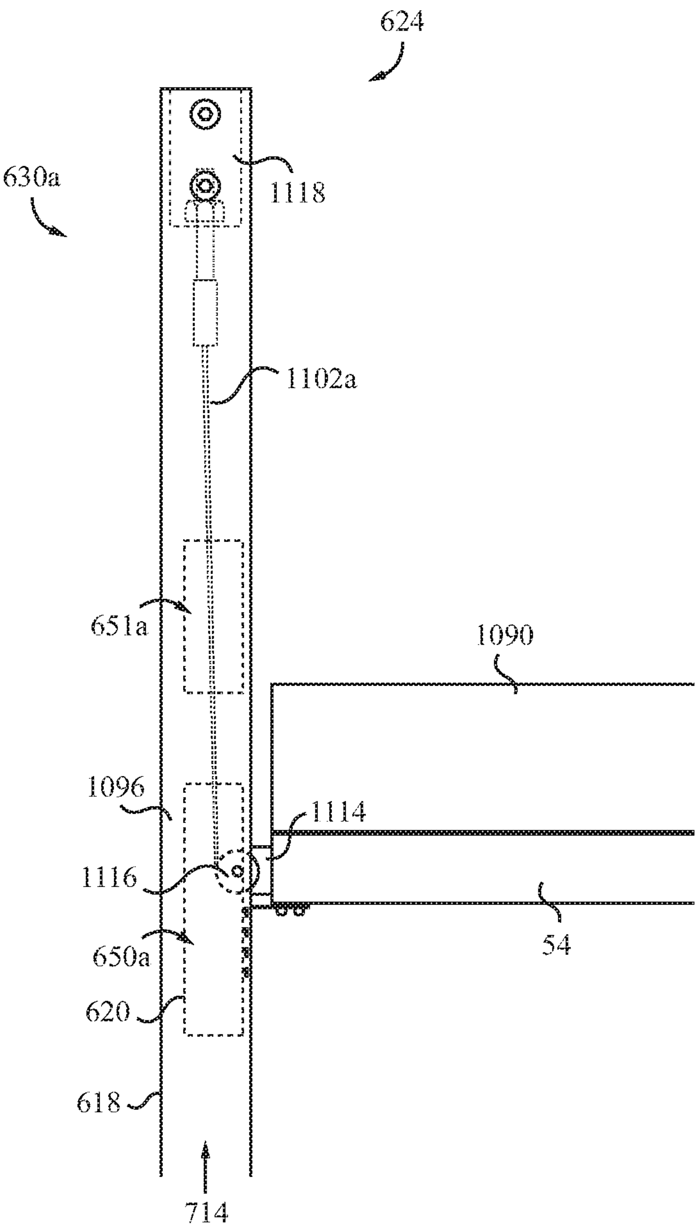

FIG. 157 shows a side view of another embodiment of a lifting assembly which uses a cable to vertically move a bed where the lifting assembly compensates for width variations between the side walls of a structure.

Figure 158:
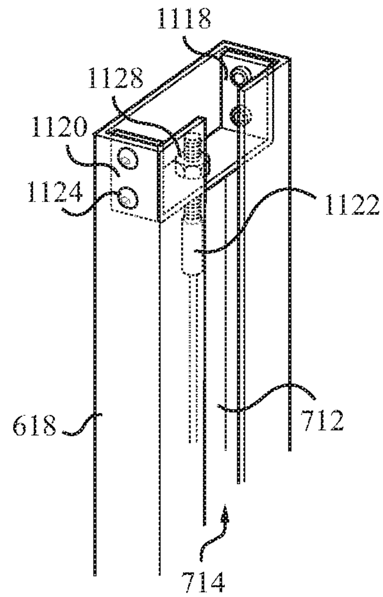

FIG. 158 shows a perspective view of one embodiment of an anchor assembly which may be used to couple a cable to a lifting assembly.

Figure 159:
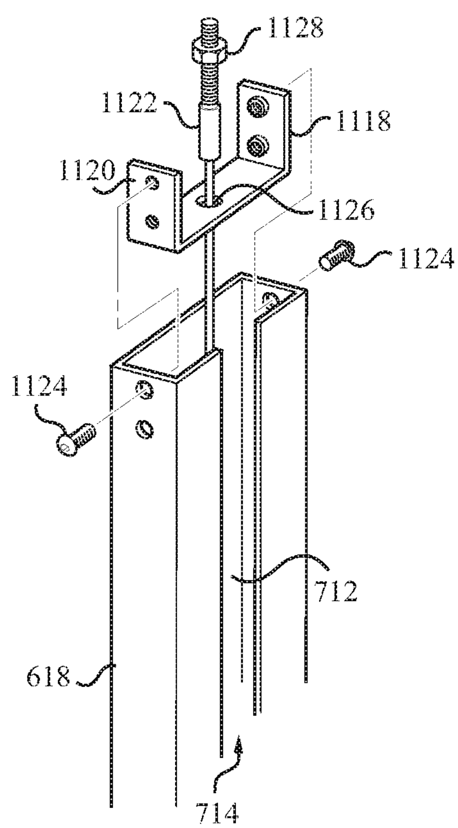

FIG. 159 shows an exploded perspective view of the anchor assembly which may be used to couple a cable to a lifting assembly.

Figure 160:
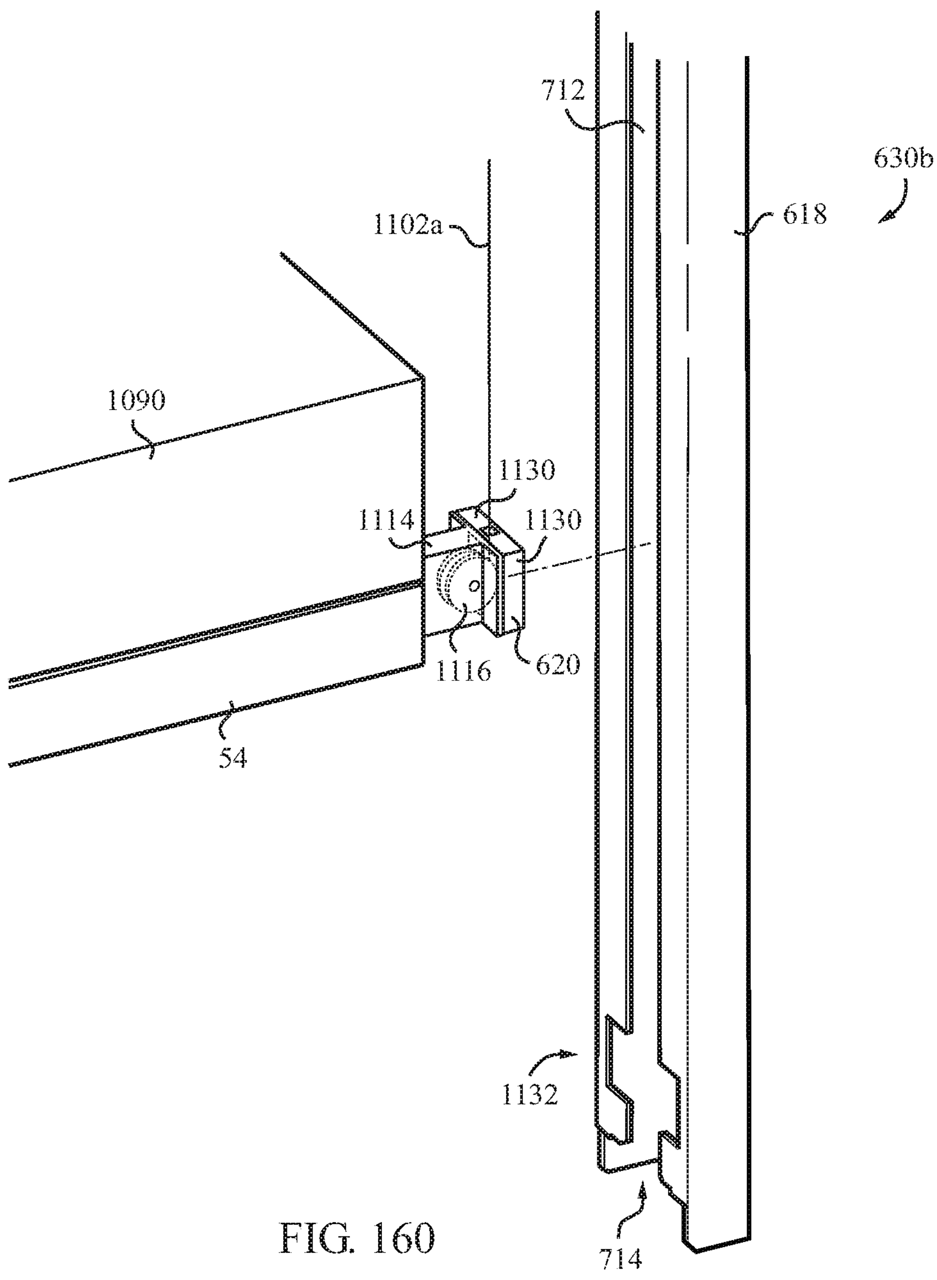

FIG. 160 shows a perspective view of another embodiment of a lifting assembly which cooperates with a frame member of a bed to vertically move the bed.

Figure 161:
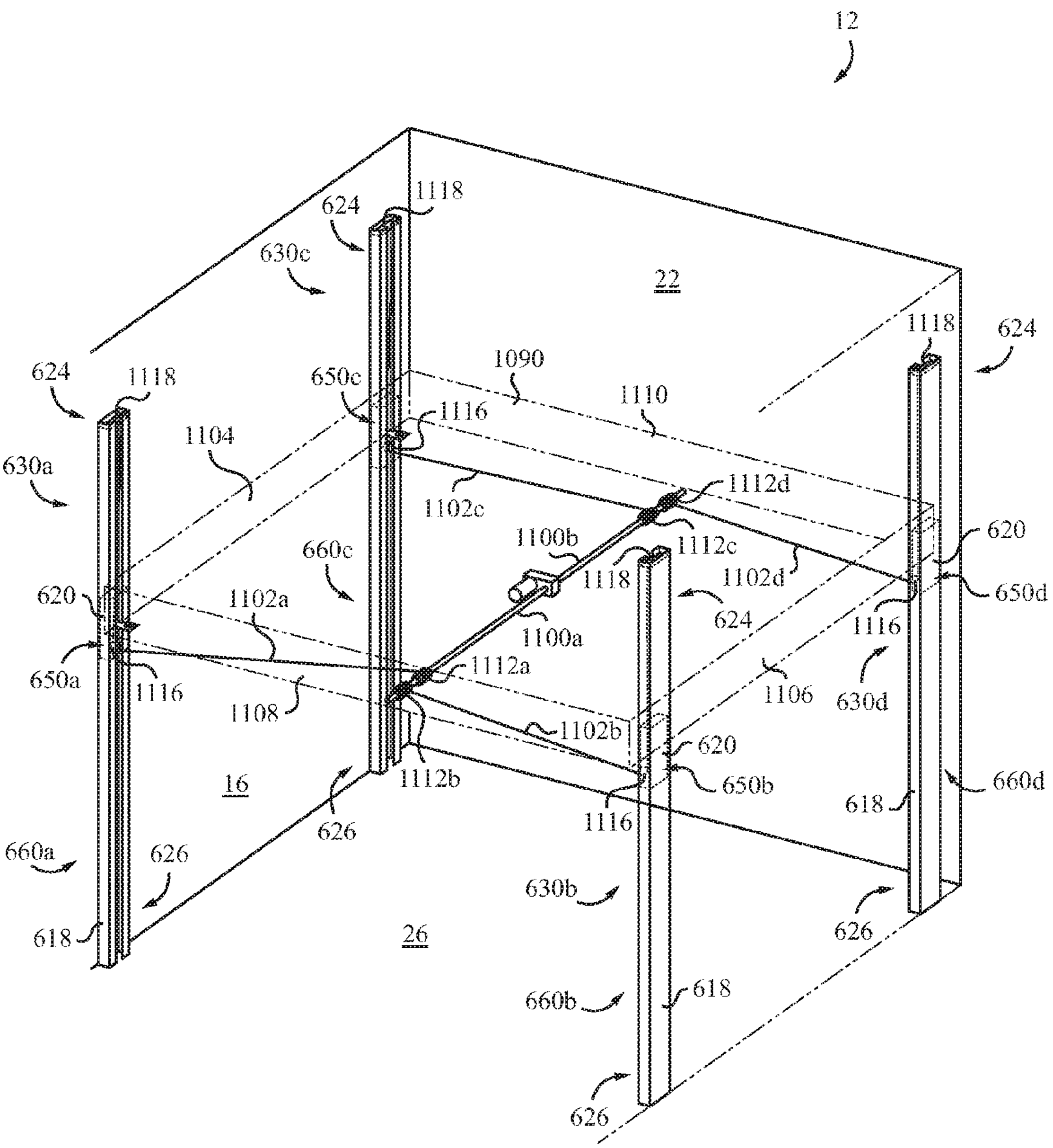

FIG. 161 shows a perspective view of another embodiment of a system for vertically moving one or more beds which uses cables that wrap on spools positioned underneath the bed.

Figure 162:
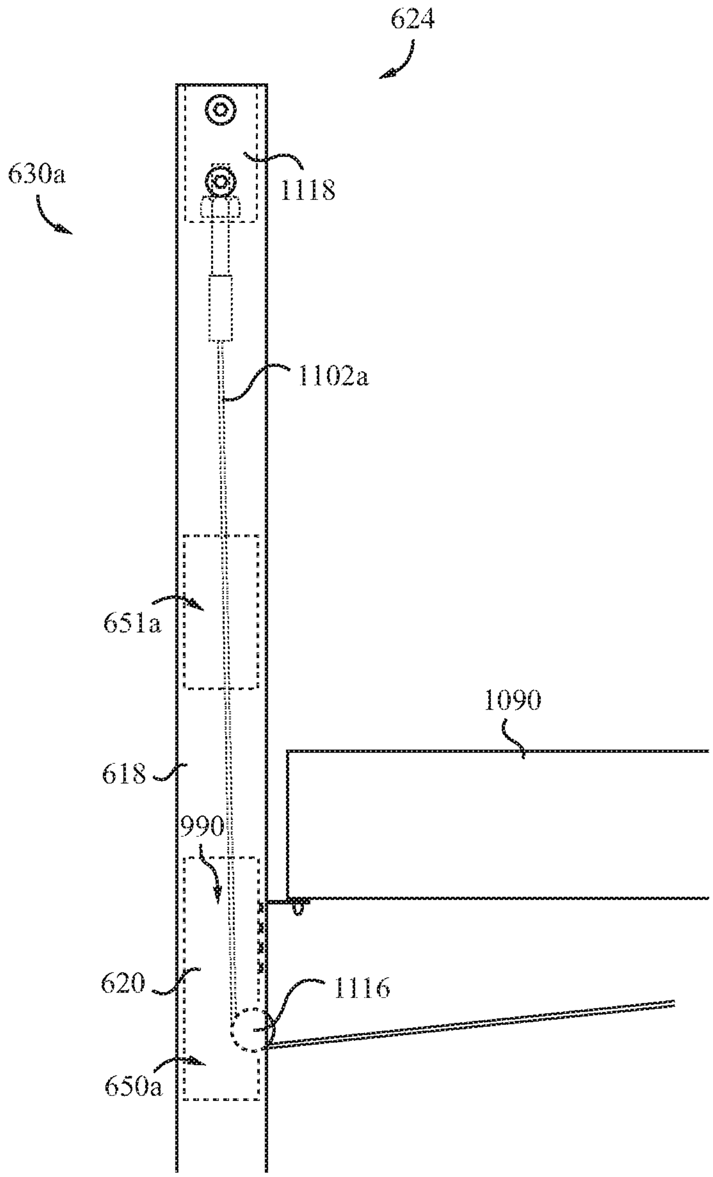

FIG. 162 shows a side view of the lifting assembly which uses cables that wrap on spools to vertically move a bed.

Figure 163:
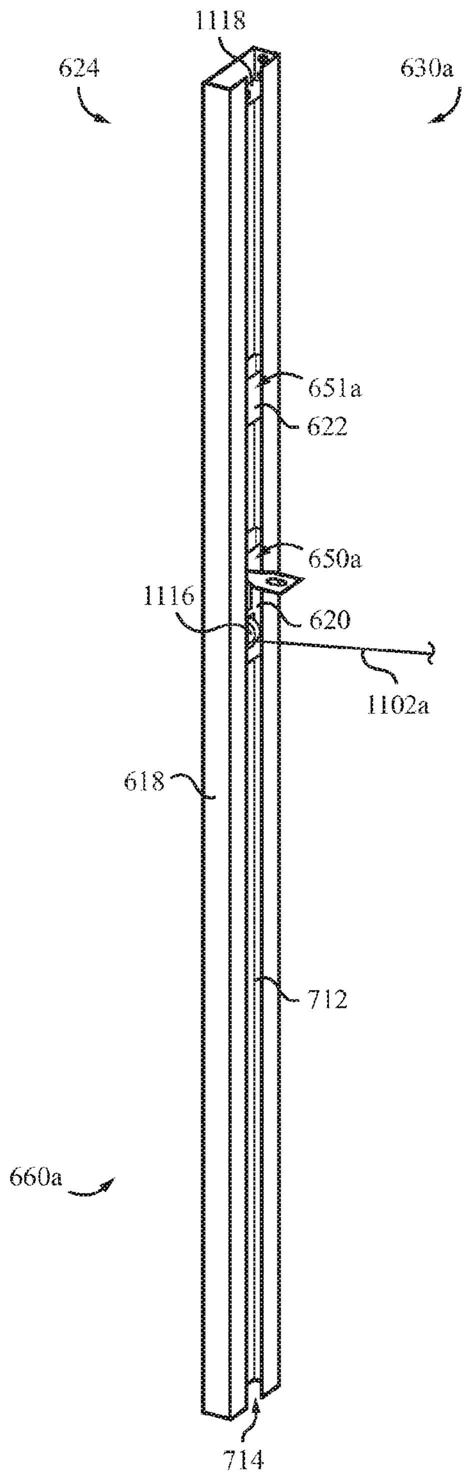

FIG. 163 shows a perspective view of the lifting assembly which uses a cable to vertically move a bed.

Figure 164:
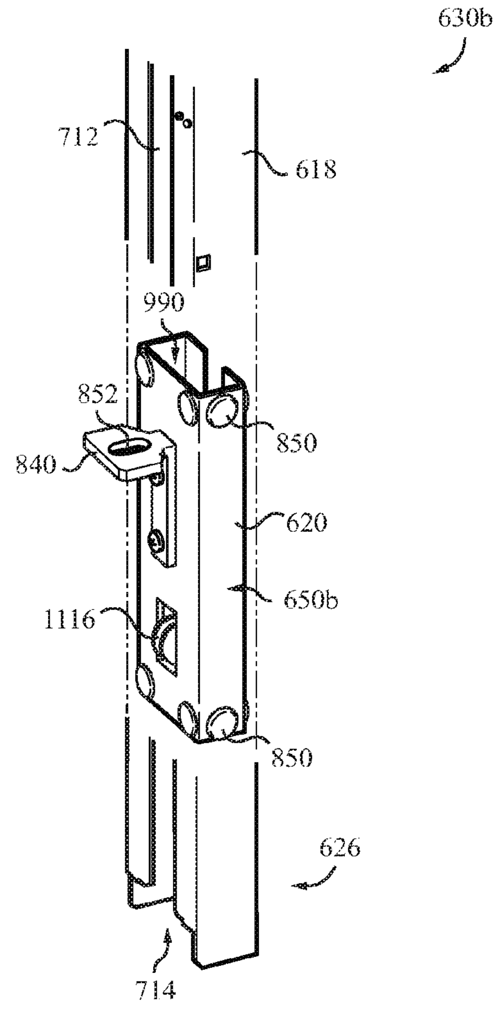

FIG. 164 shows a cut-away perspective view of the lifting assembly which uses a cable to vertically move a bed.

FIGS. 165-169 show perspective views of various embodiments of a system for vertically moving one or more beds which uses cables that wrap on spools positioned underneath the bed.

FIGS. 170-189 show perspective, top, front, and side views of various embodiments of a system for vertically moving one or more beds which uses cables that wrap on spools positioned above the bed.

FIGS. 190-195 show alternating perspective and side views of various embodiments of a system for vertically moving one or more beds which uses cables that extend underneath the bed and wrap on spools positioned above the bed.

Figure 196:
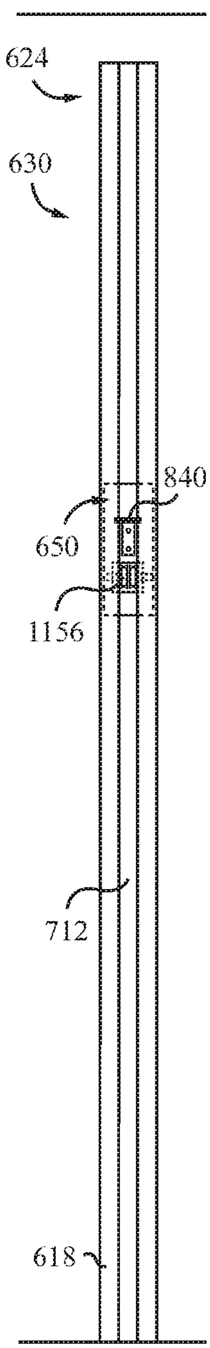
Figure 195:
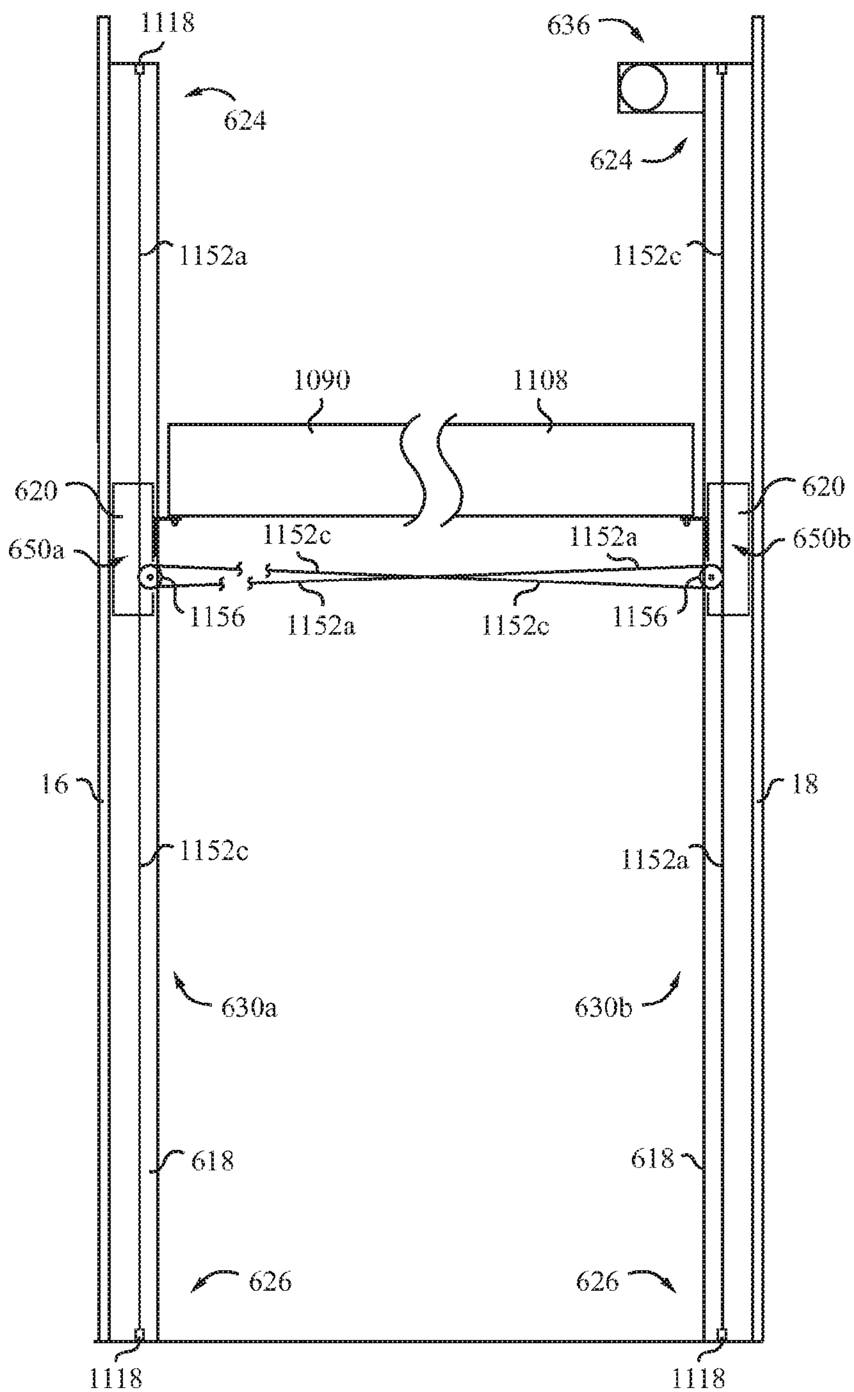

FIG. 196 shows a front view of another embodiment of a lifting assembly which may be used with the system shown in FIG. 195 to vertically move a bed.

Figure 197:
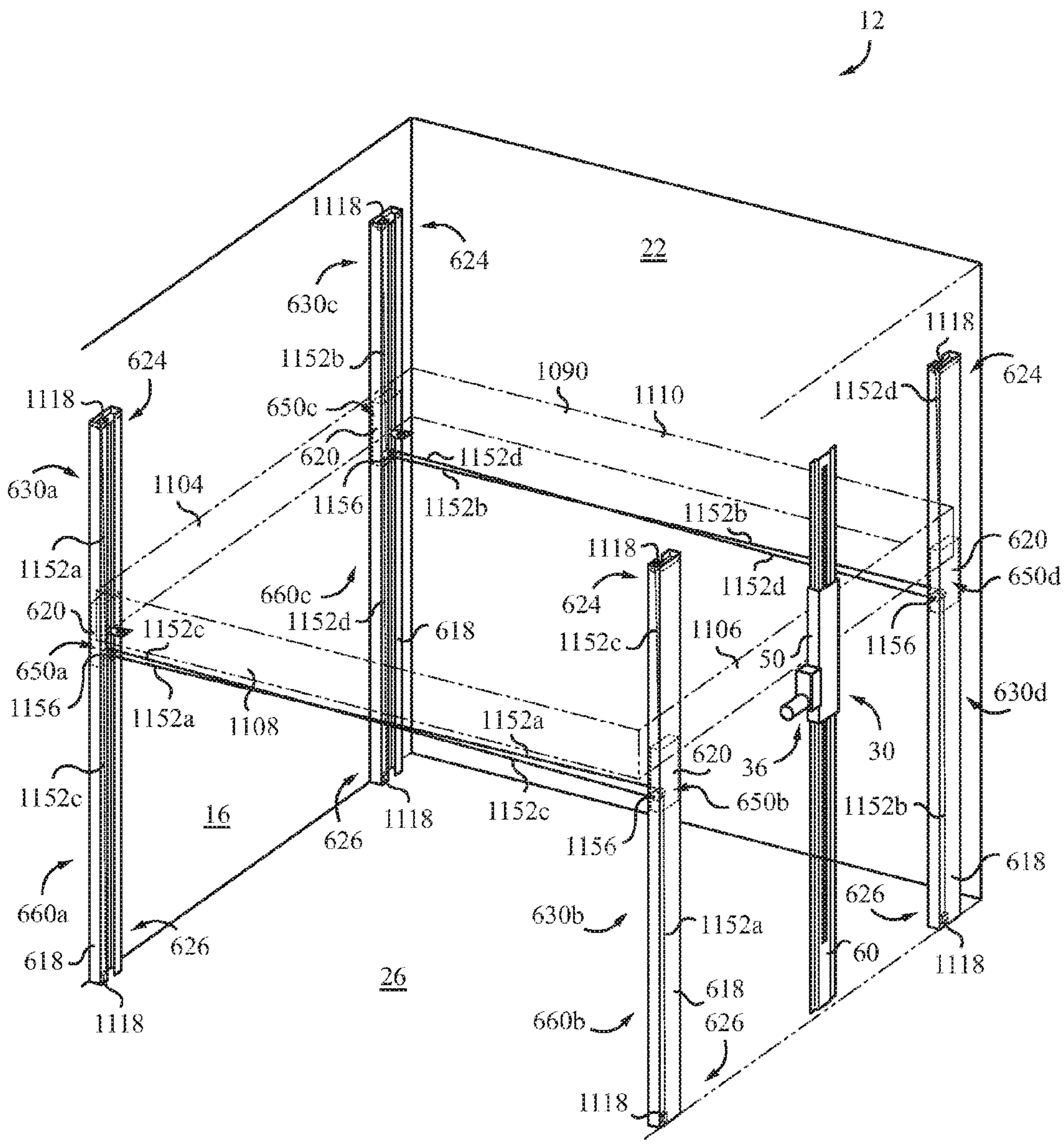

FIG. 197 shows a perspective view of another embodiment of a system for vertically moving one or more beds using cables and a rack and gear lifting assembly.

Figure 198:
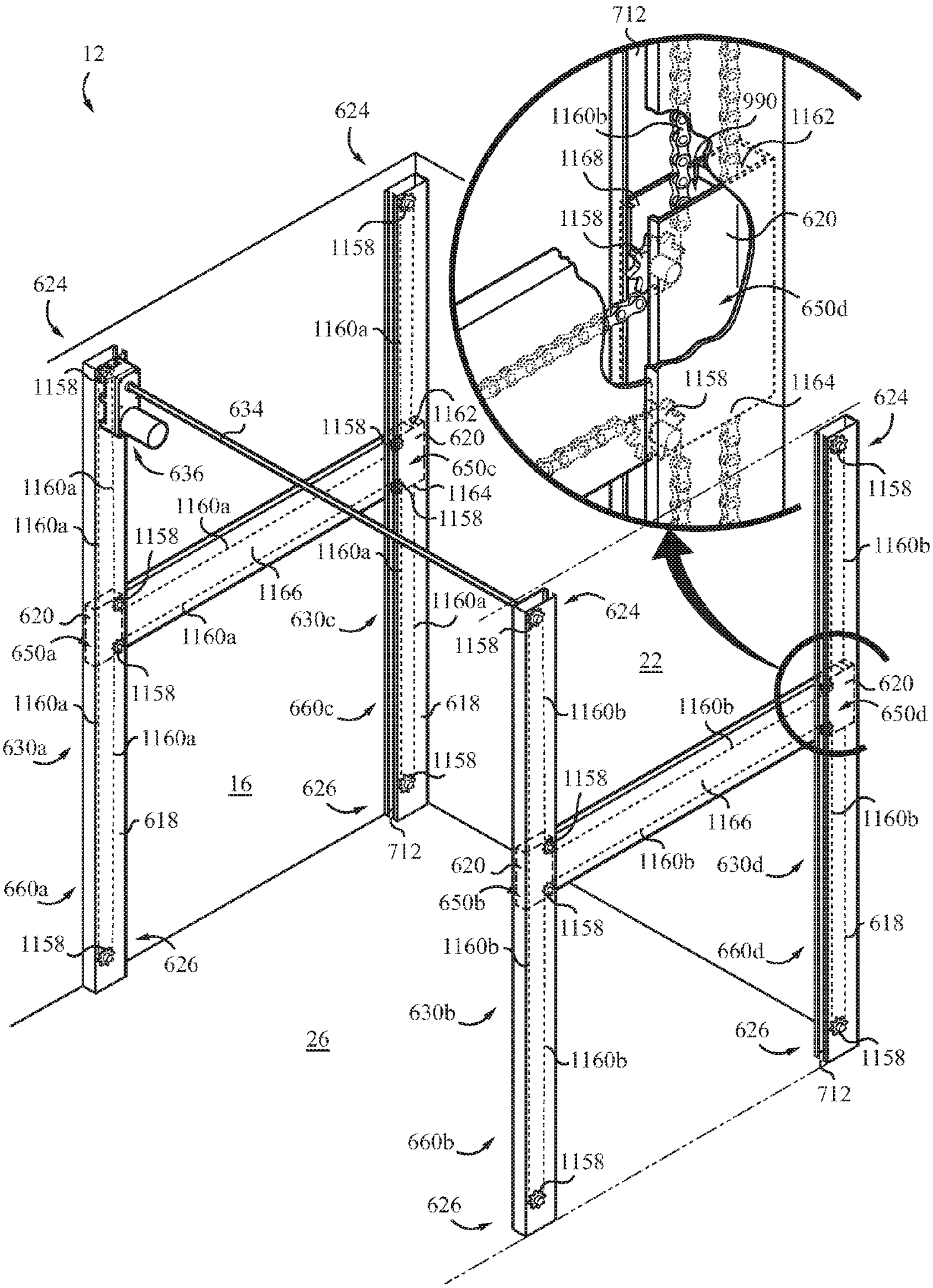

FIG. 198 shows a perspective view of another embodiment of a system for vertically moving one or more beds using chains which move along endless paths.

Figure 199:
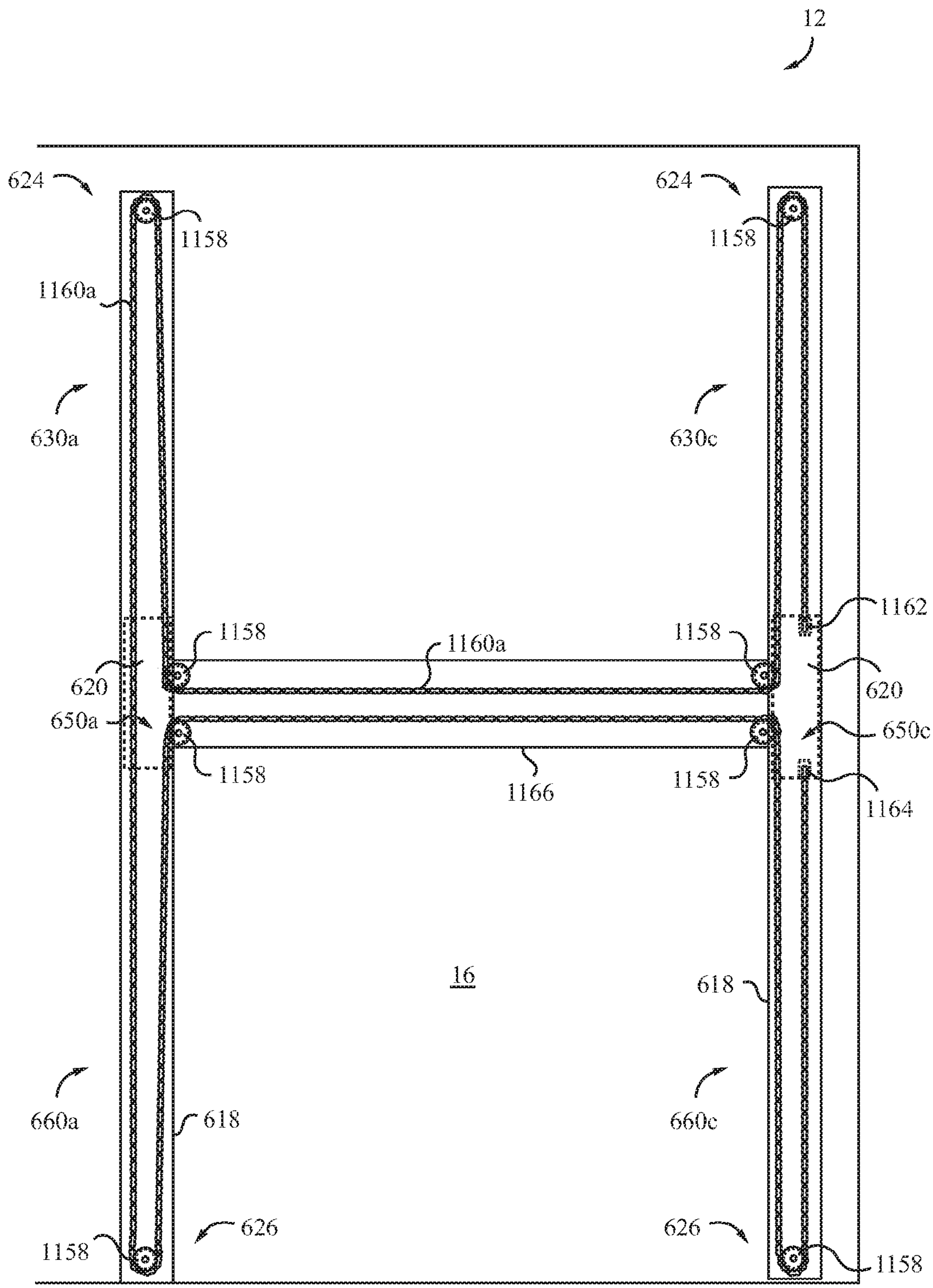
Figure 200:
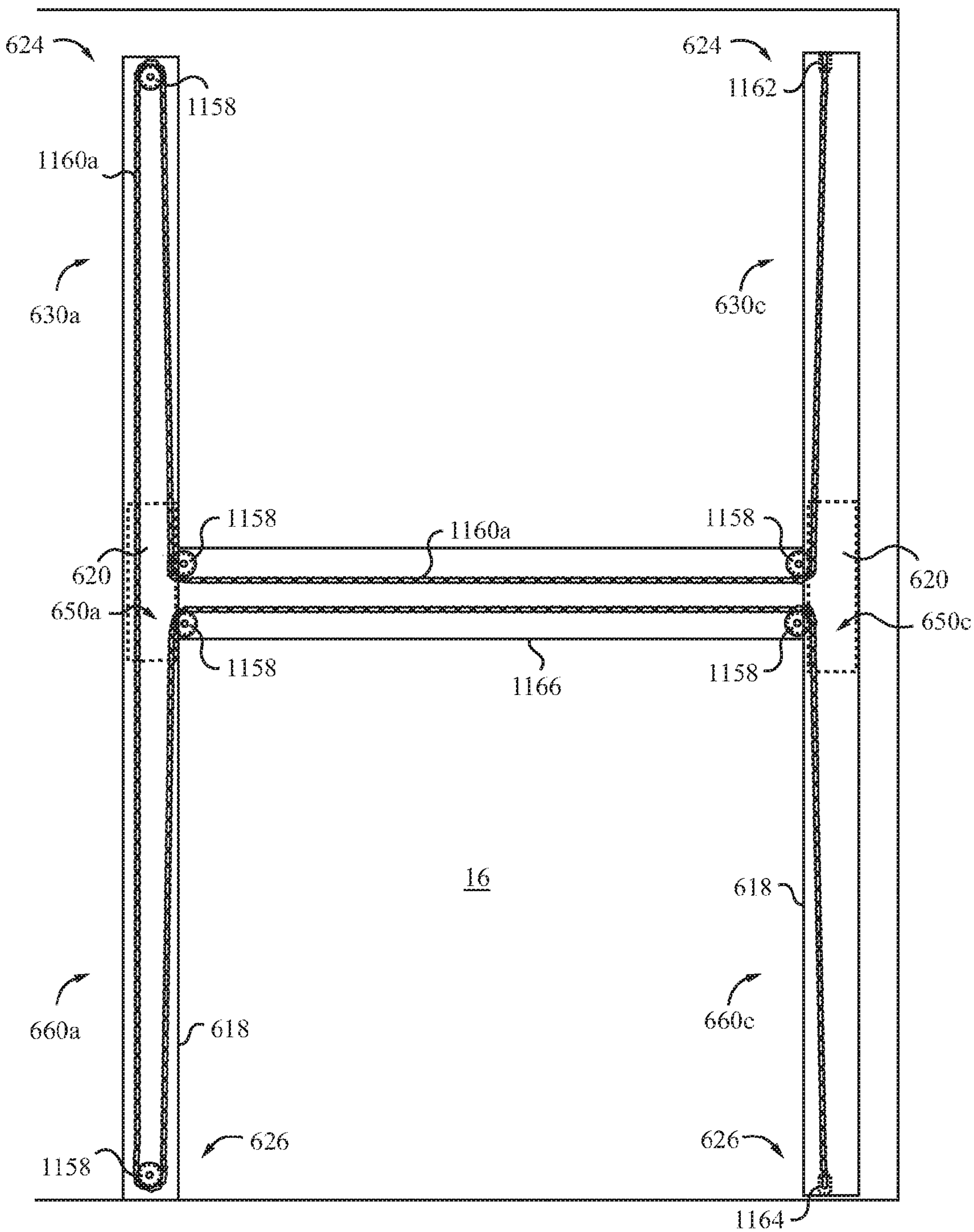

FIGS. 199-200 show front views of various embodiments of lifting assemblies coupled to a wall and used to vertically move one or more beds using chains which move along endless paths.

Figure 201:
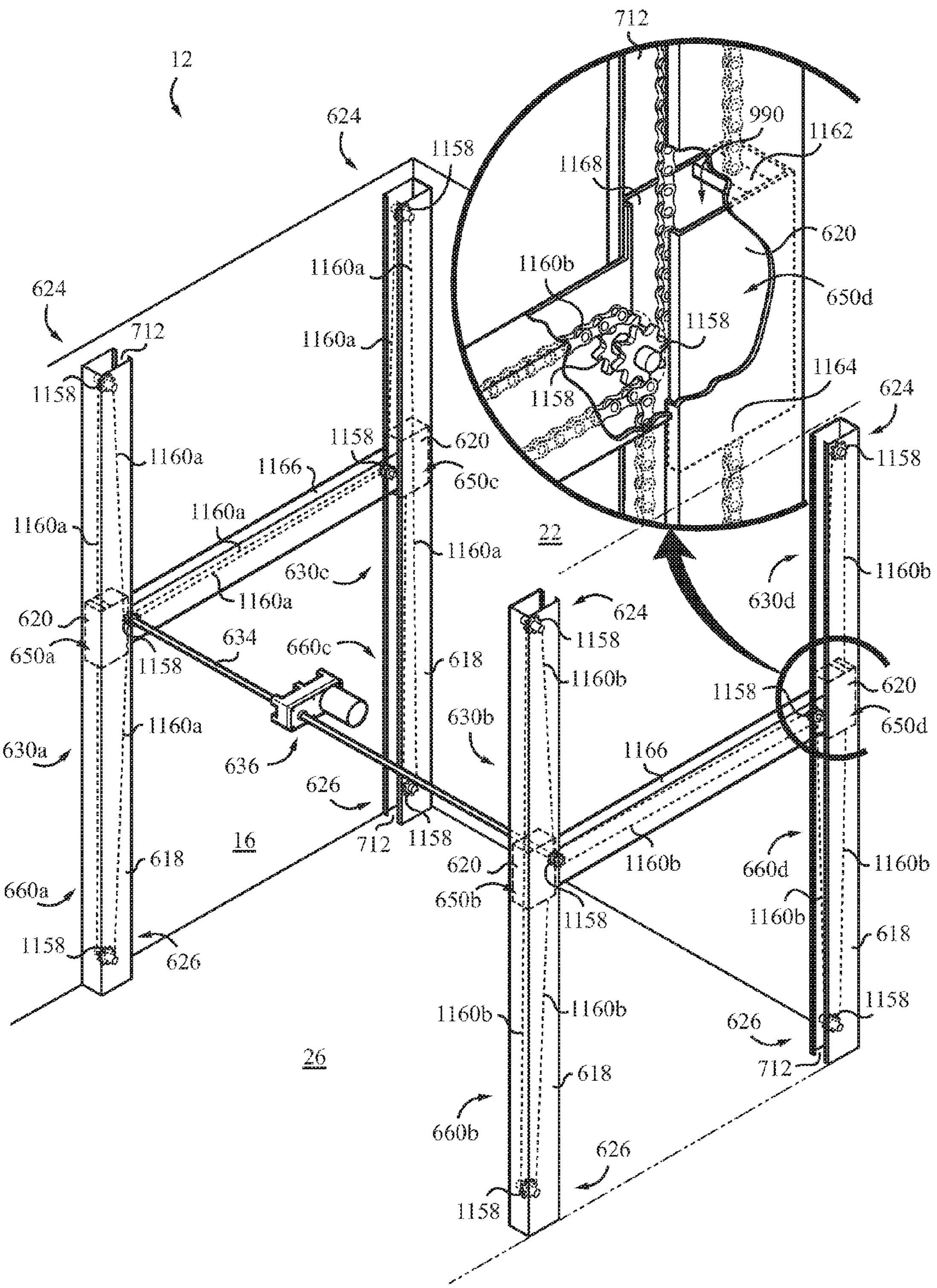

FIG. 201 shows a perspective view of another embodiment of a system for vertically moving one or more beds using chains which move along endless paths.

Figure 202:
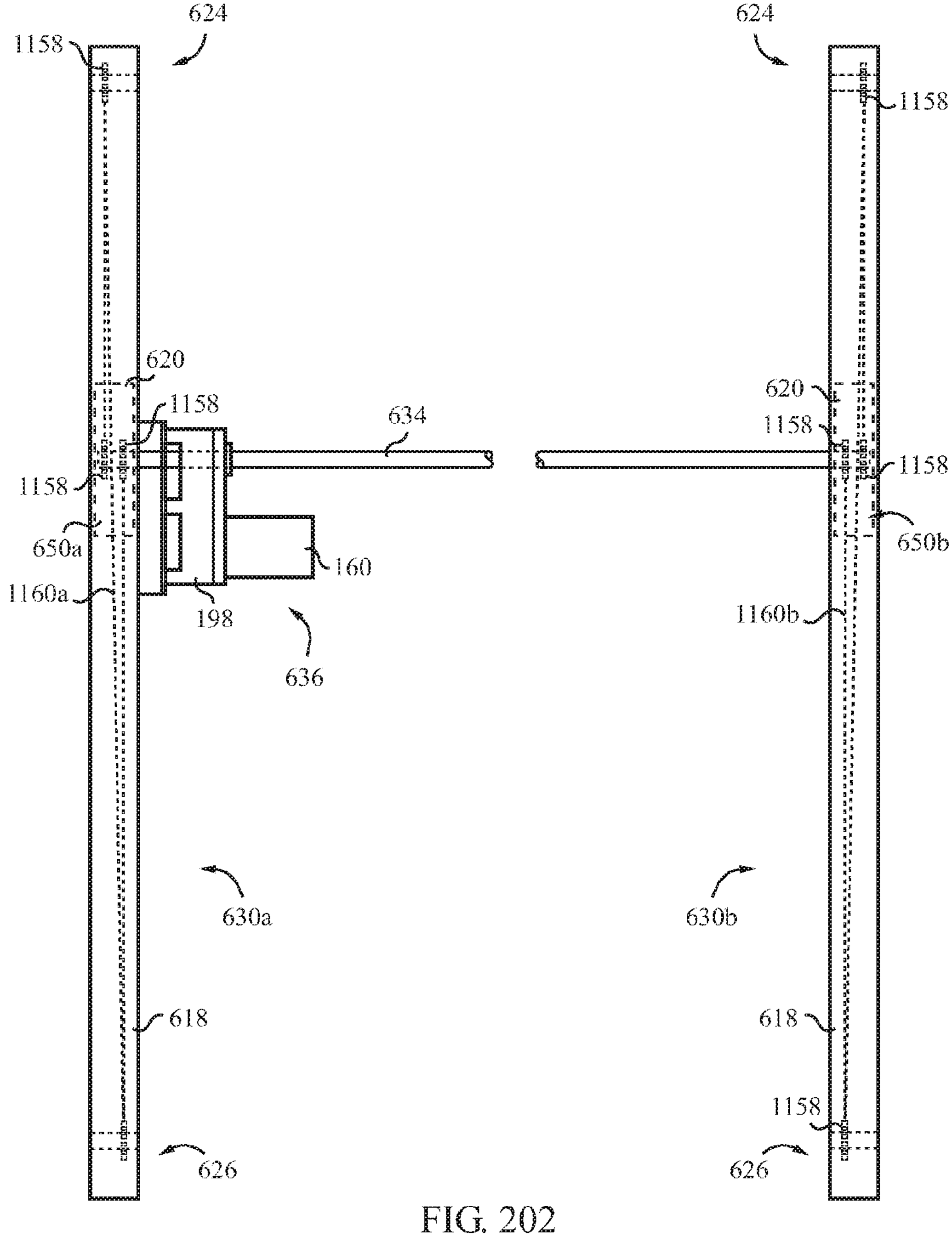

FIG. 202 shows a side view of the system for vertically moving one or more beds using chains which move along endless paths.

Figure 203:
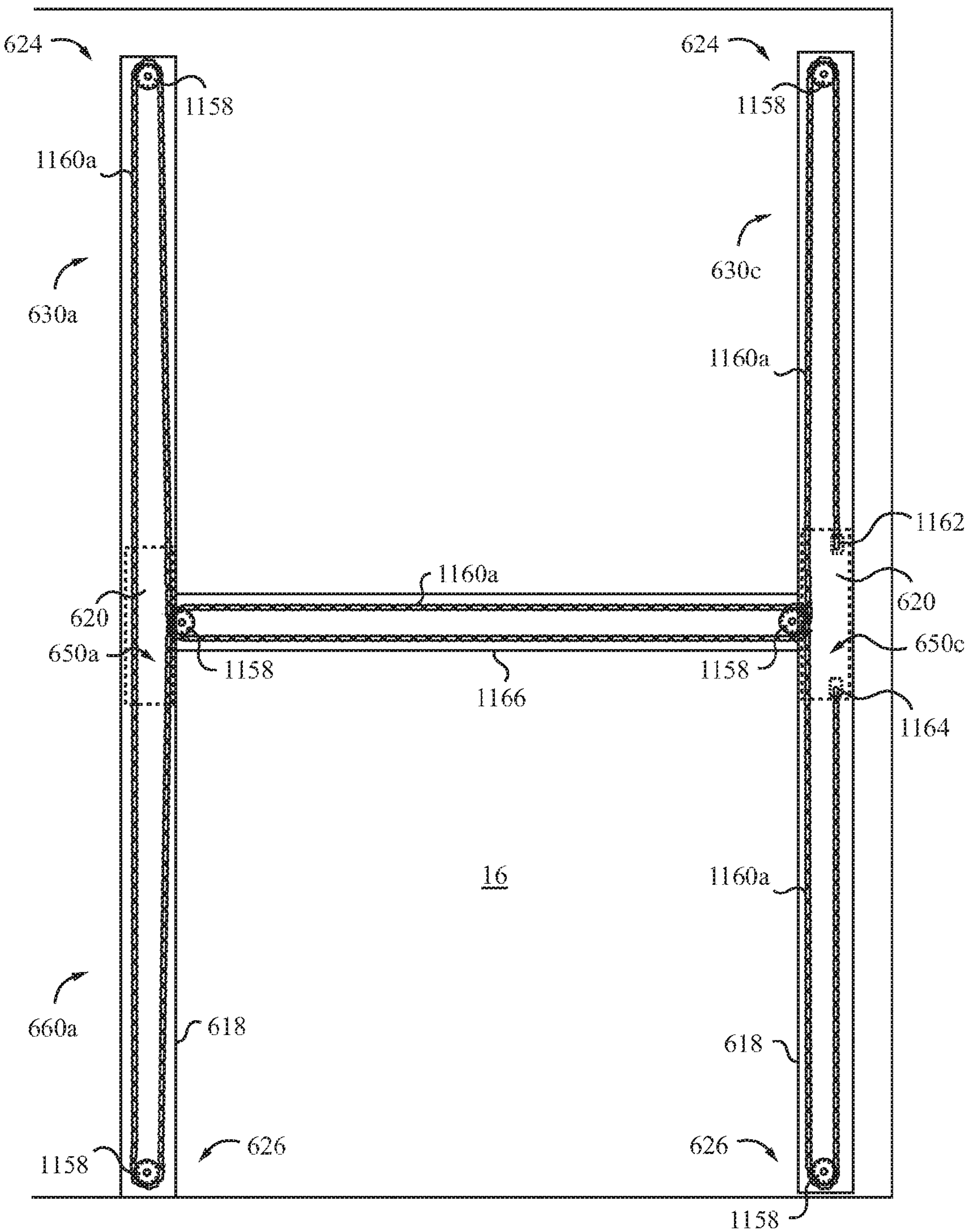
Figure 204:
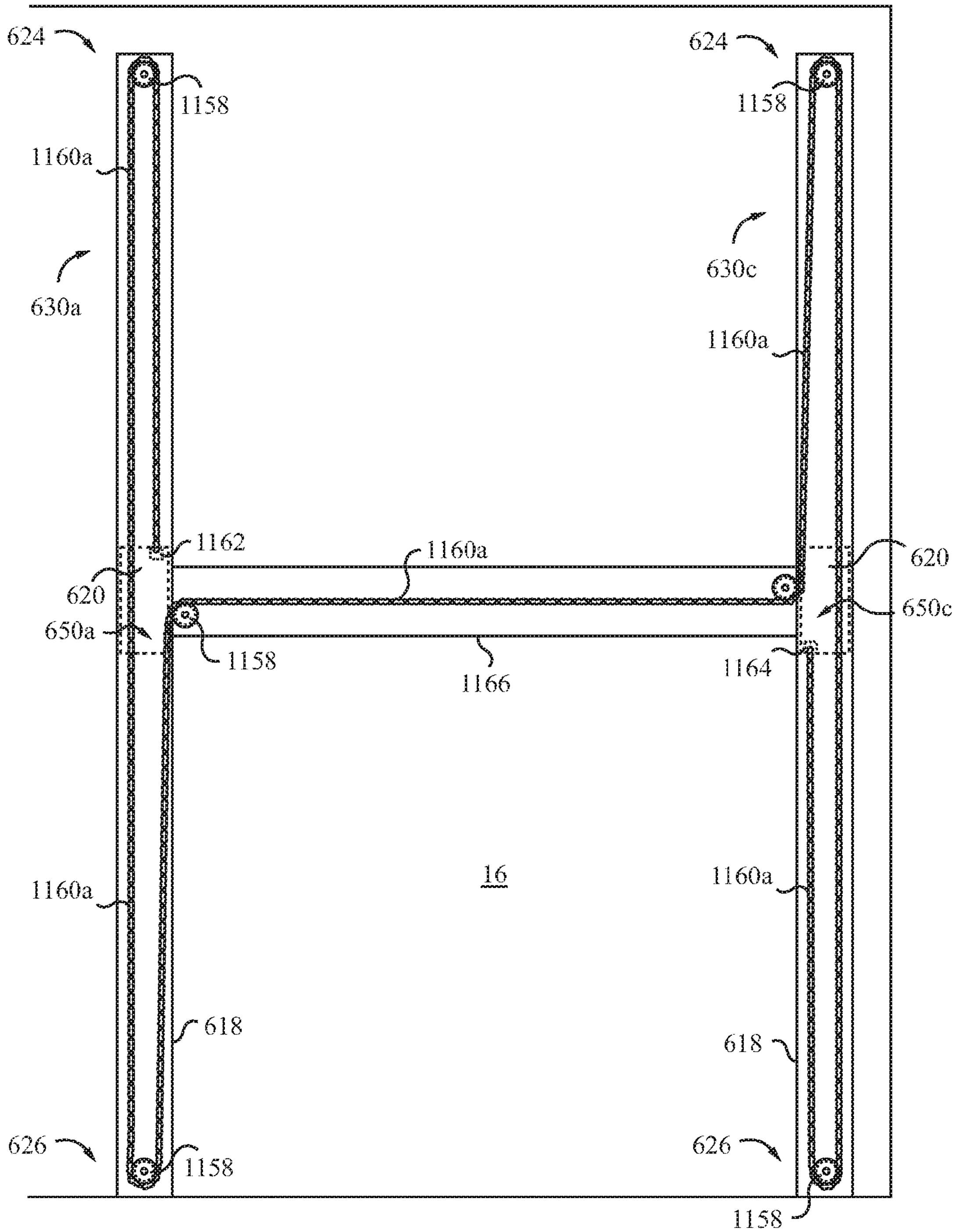

FIGS. 203-204 show front views of various embodiments of lifting assemblies coupled to a wall and used to vertically move one or more beds using chains which move along endless paths.

Figure 205:
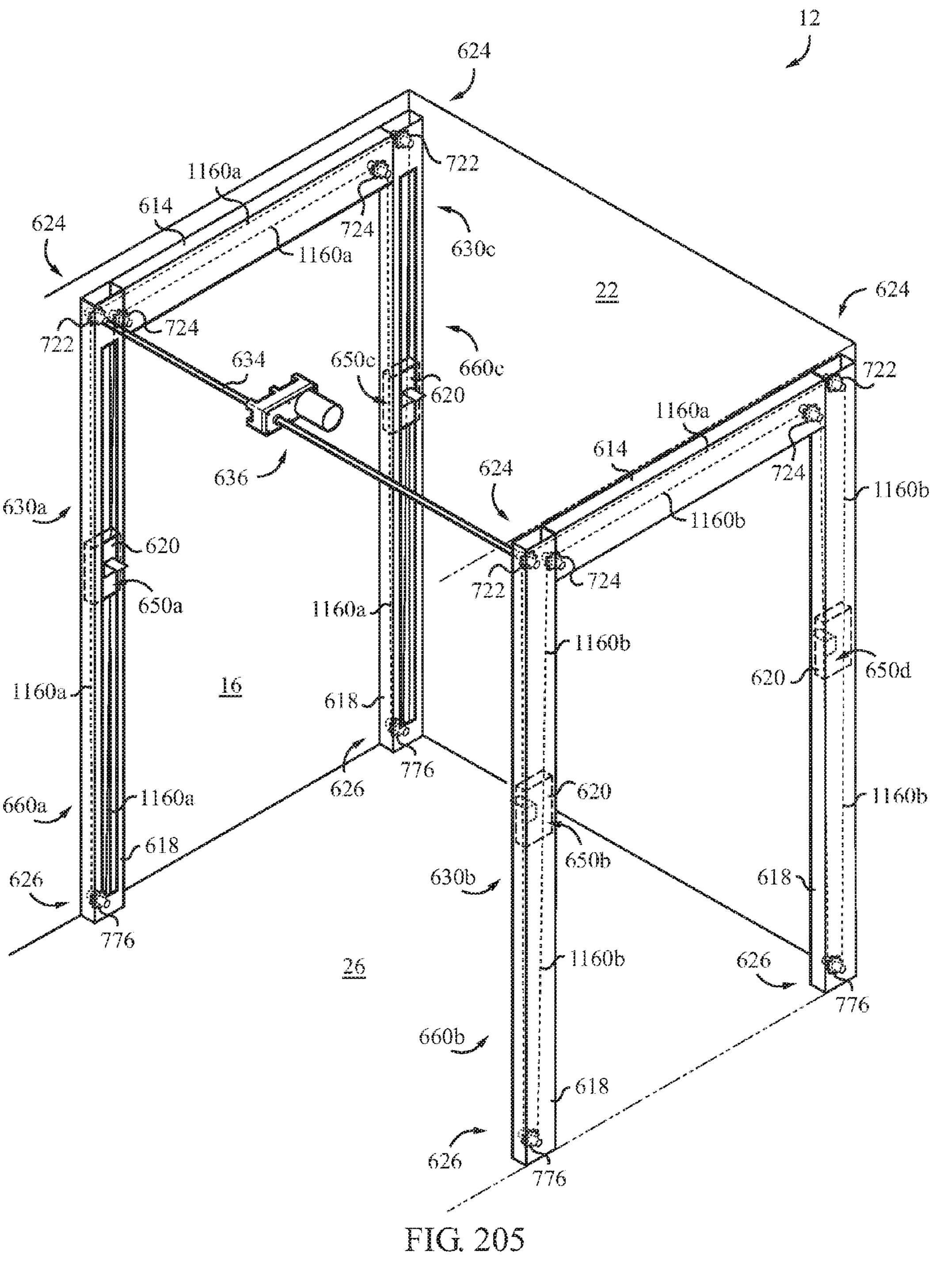

FIG. 205 shows a perspective view of another embodiment of a system for vertically moving one or more beds using chains which move along endless paths.

Figure 206:
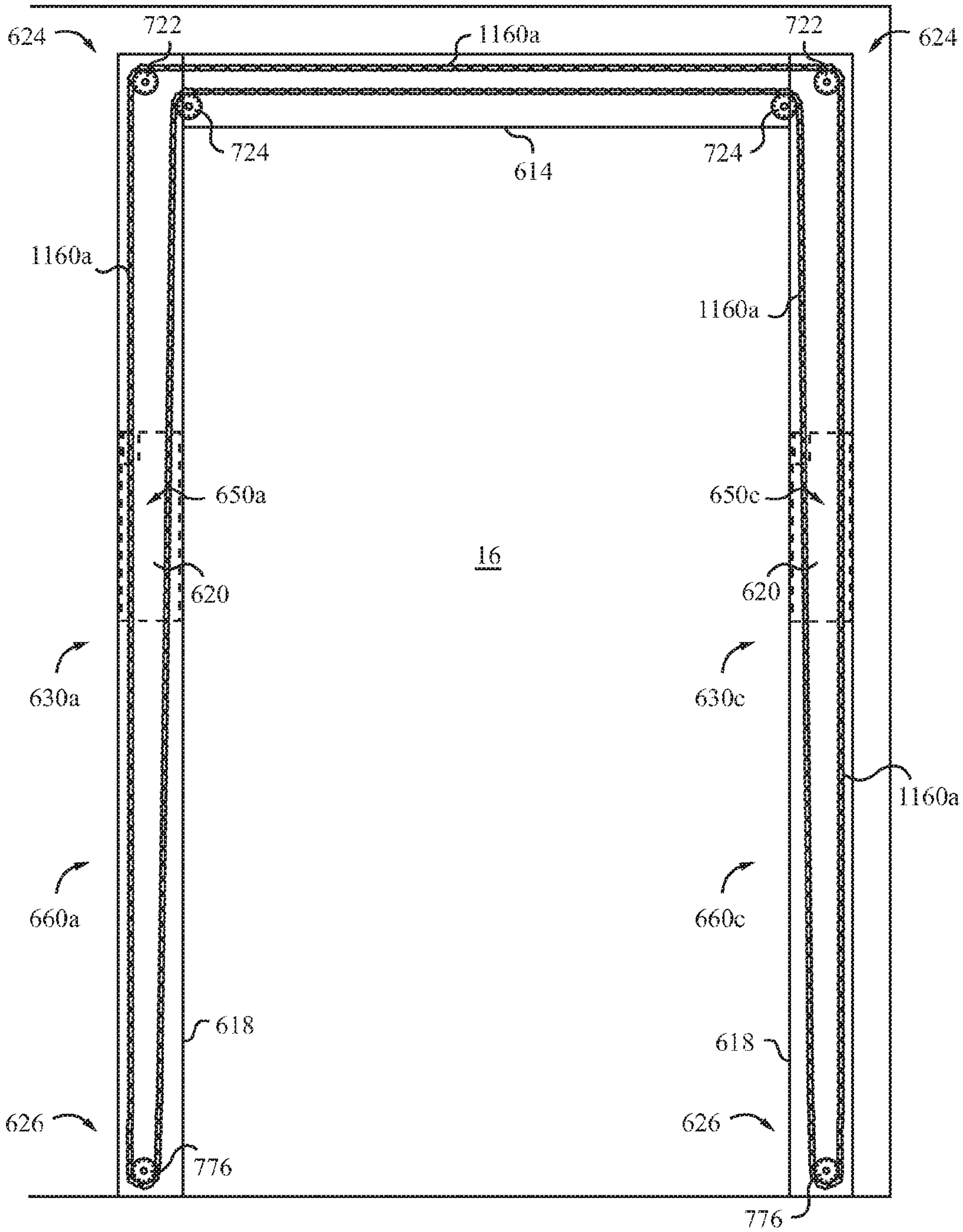

FIG. 206 shows a front view of two lifting assemblies coupled to a wall and used to vertically move one or more beds using chains which move along endless paths.

Figure 207:
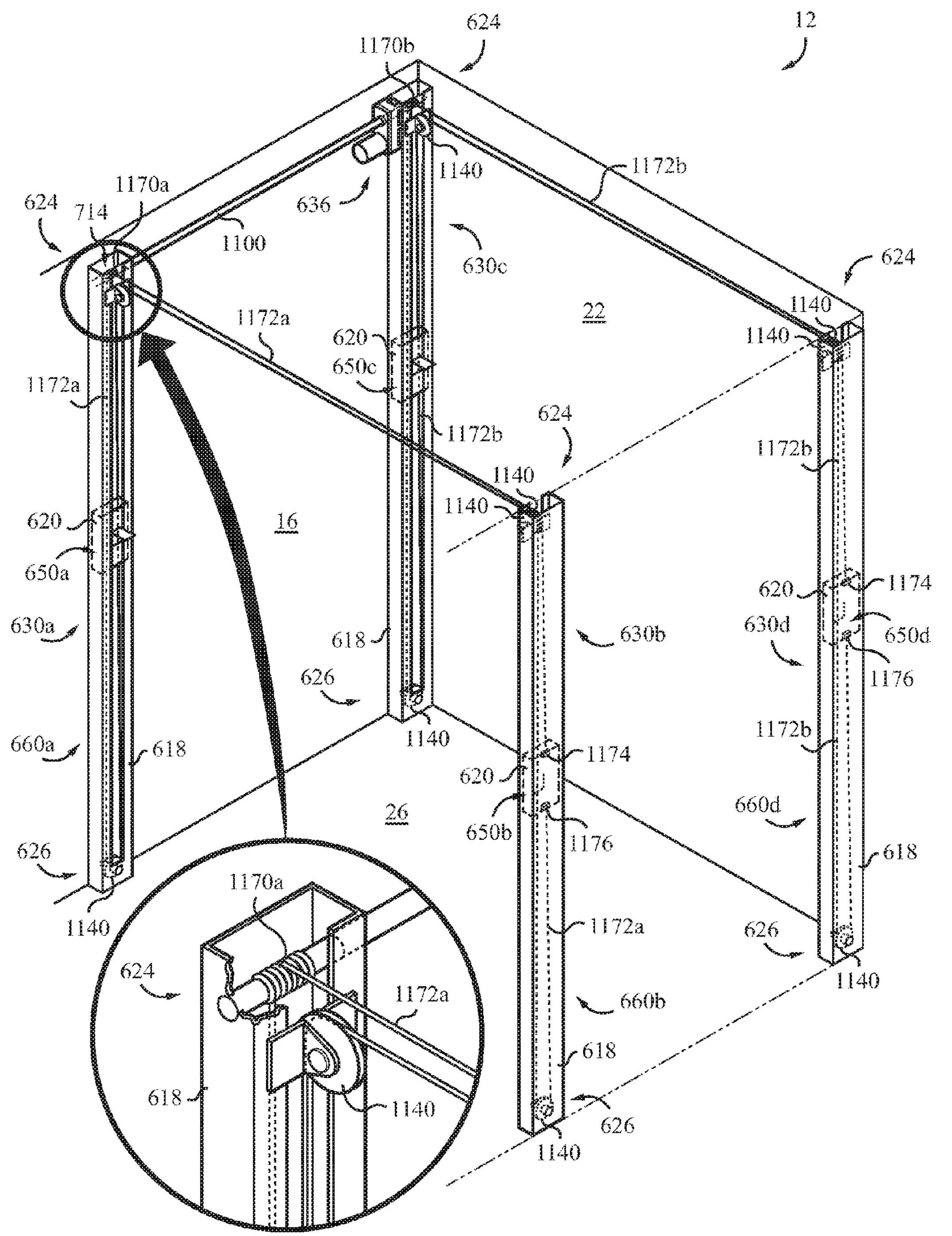

FIG. 207 shows a perspective view of another embodiment of a system for vertically moving one or more beds using cables which move along endless paths.

Figure 208:
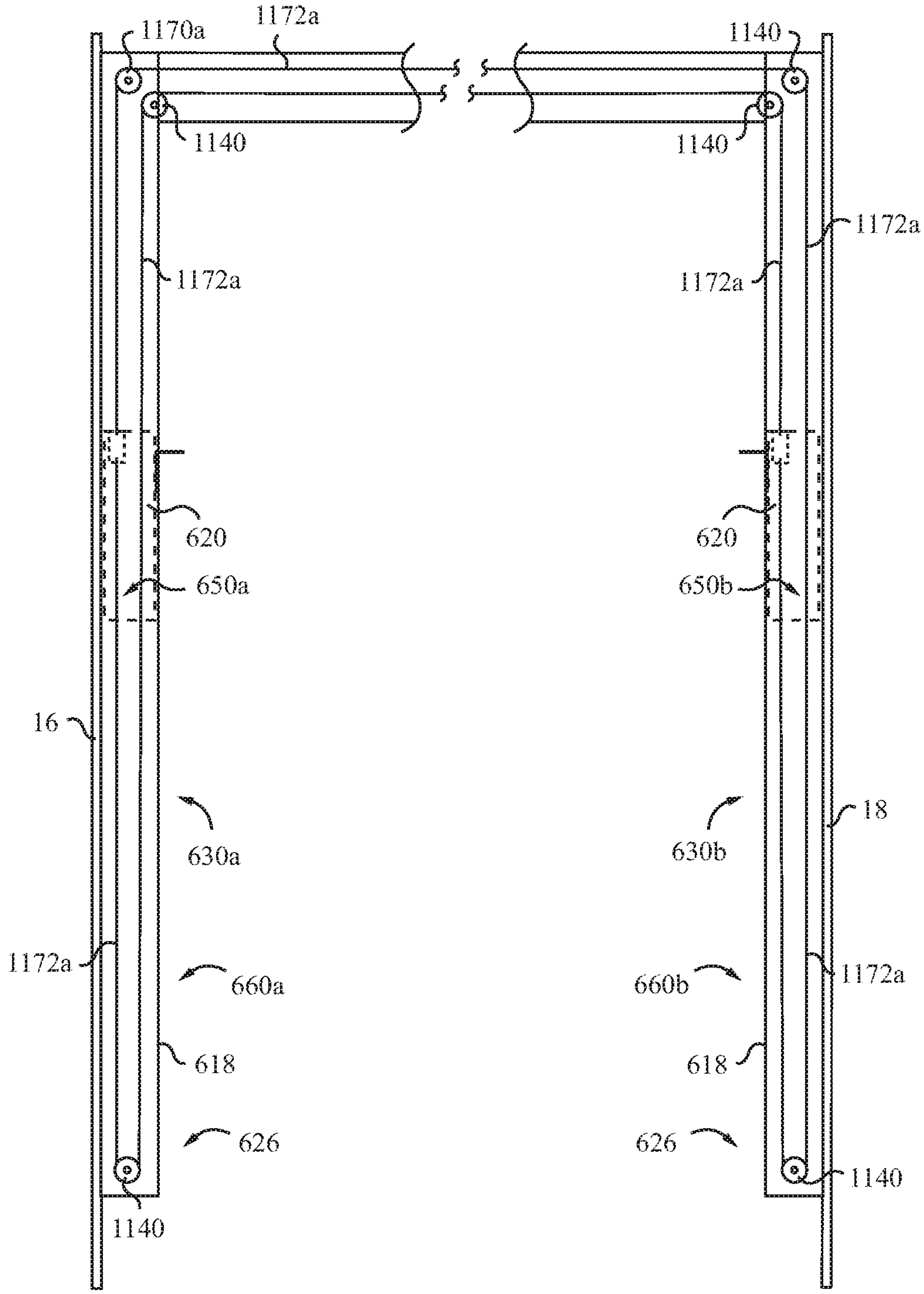

FIG. 208 shows a front view of two lifting assemblies coupled to a wall and used to vertically move one or more beds using cables which move along endless paths.

Figure 209:
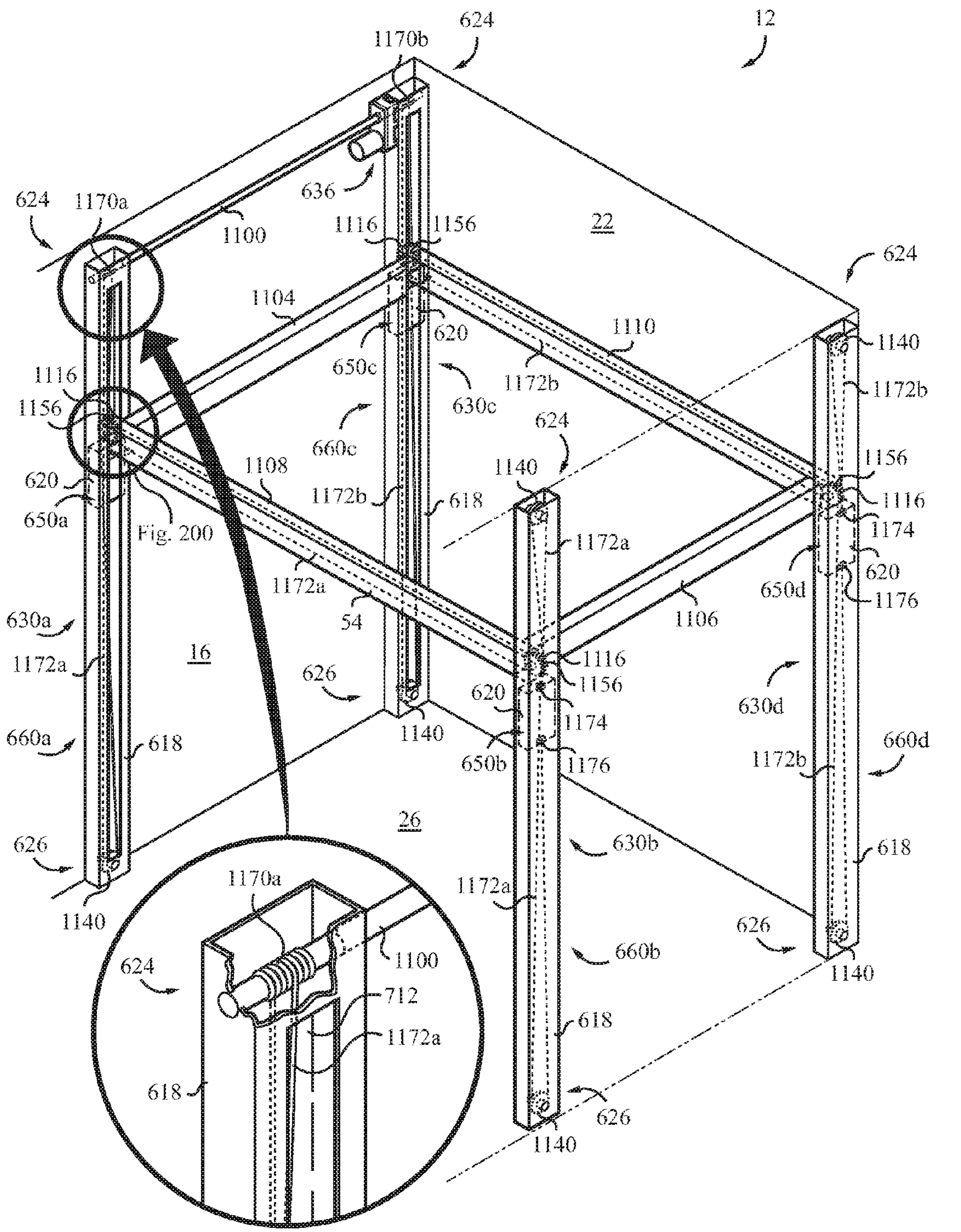

FIG. 209 shows a perspective view of another embodiment of a system for vertically moving one or more beds using cables which move along endless paths.

Figure 210:
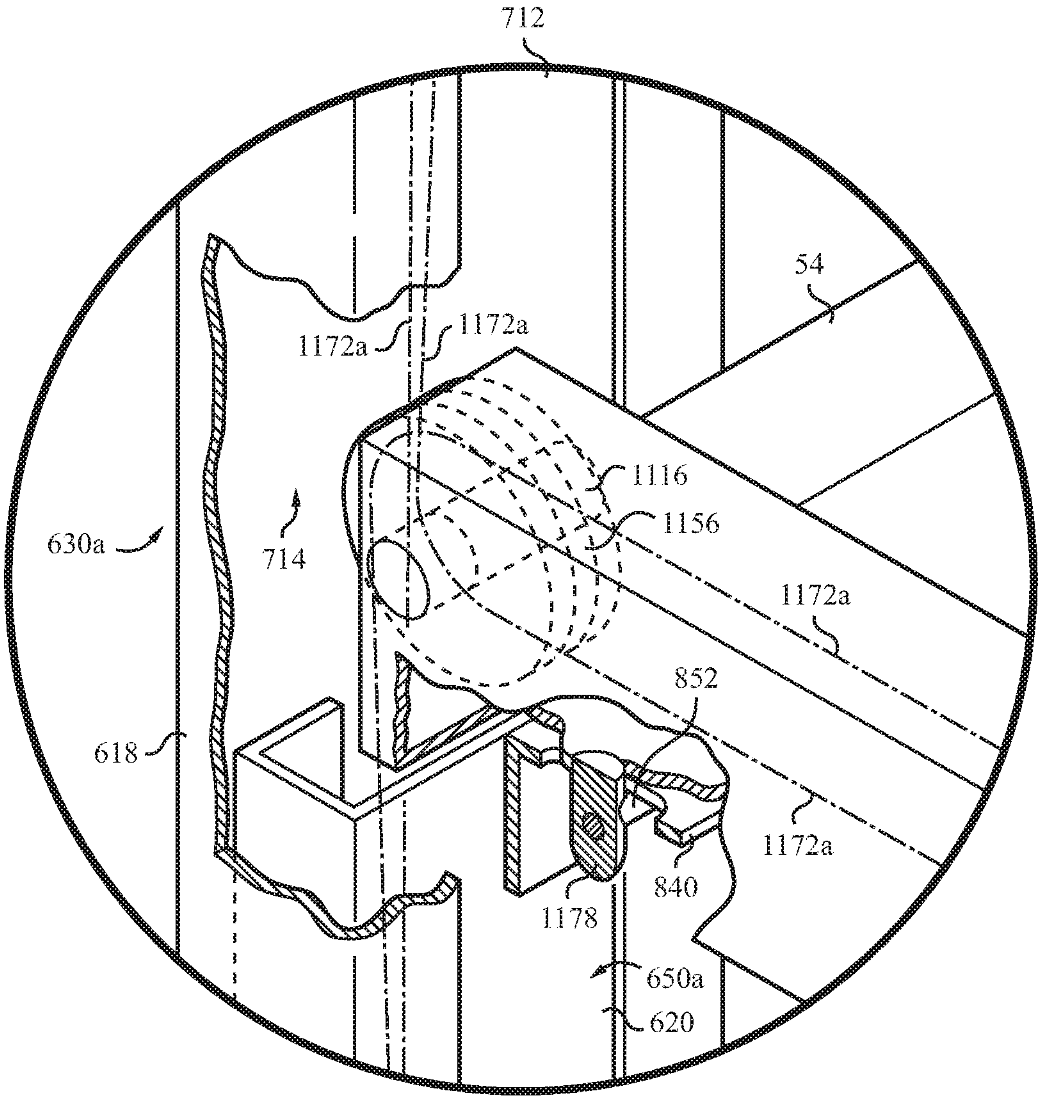

FIG. 210 shows a perspective view of one embodiment of the cables wrapping around pulleys in a bed frame.

Figure 211:
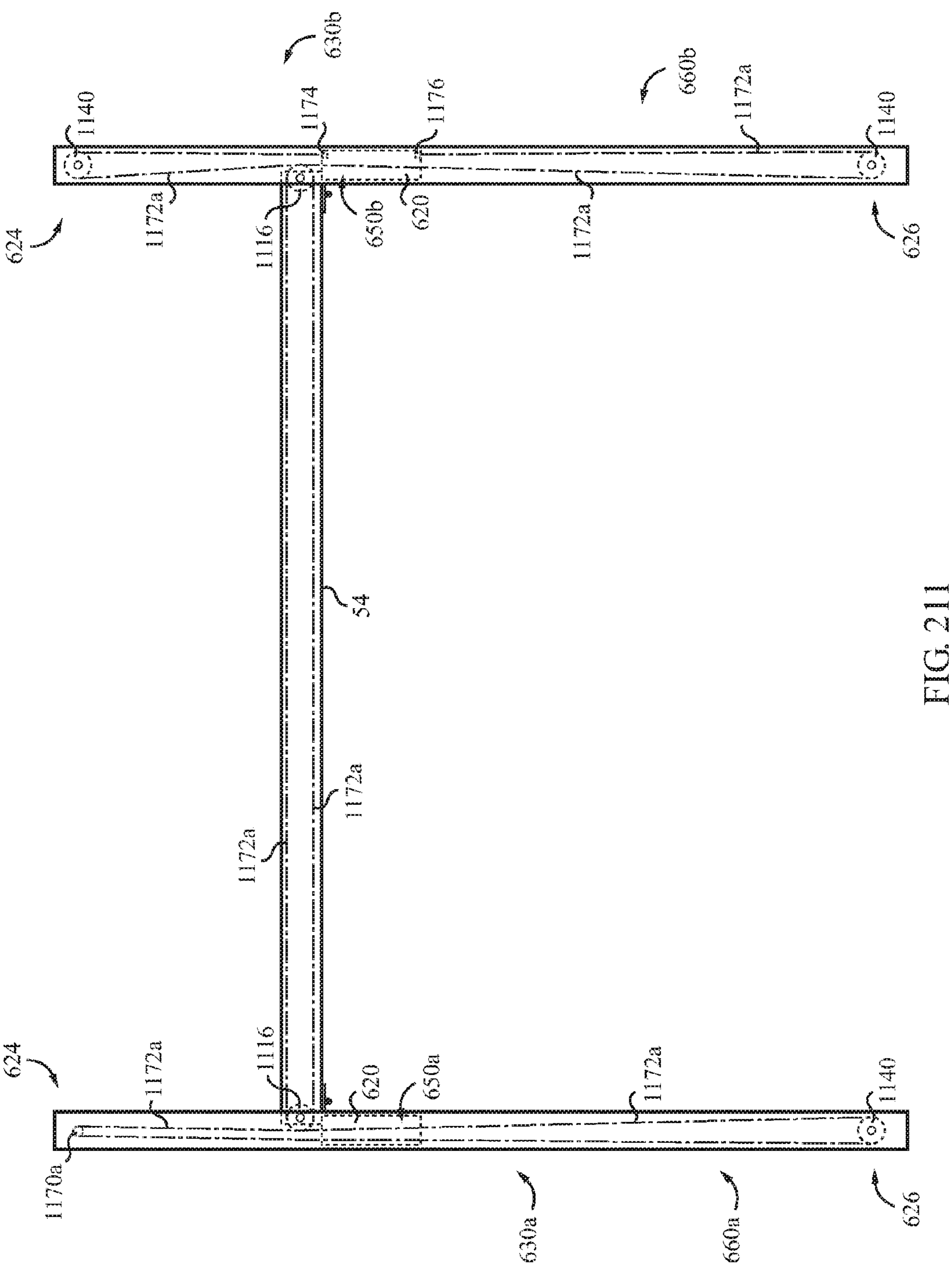

FIG. 211 shows a side view of the system for vertically moving one or more beds using cables which move along endless paths.

Figure 212:
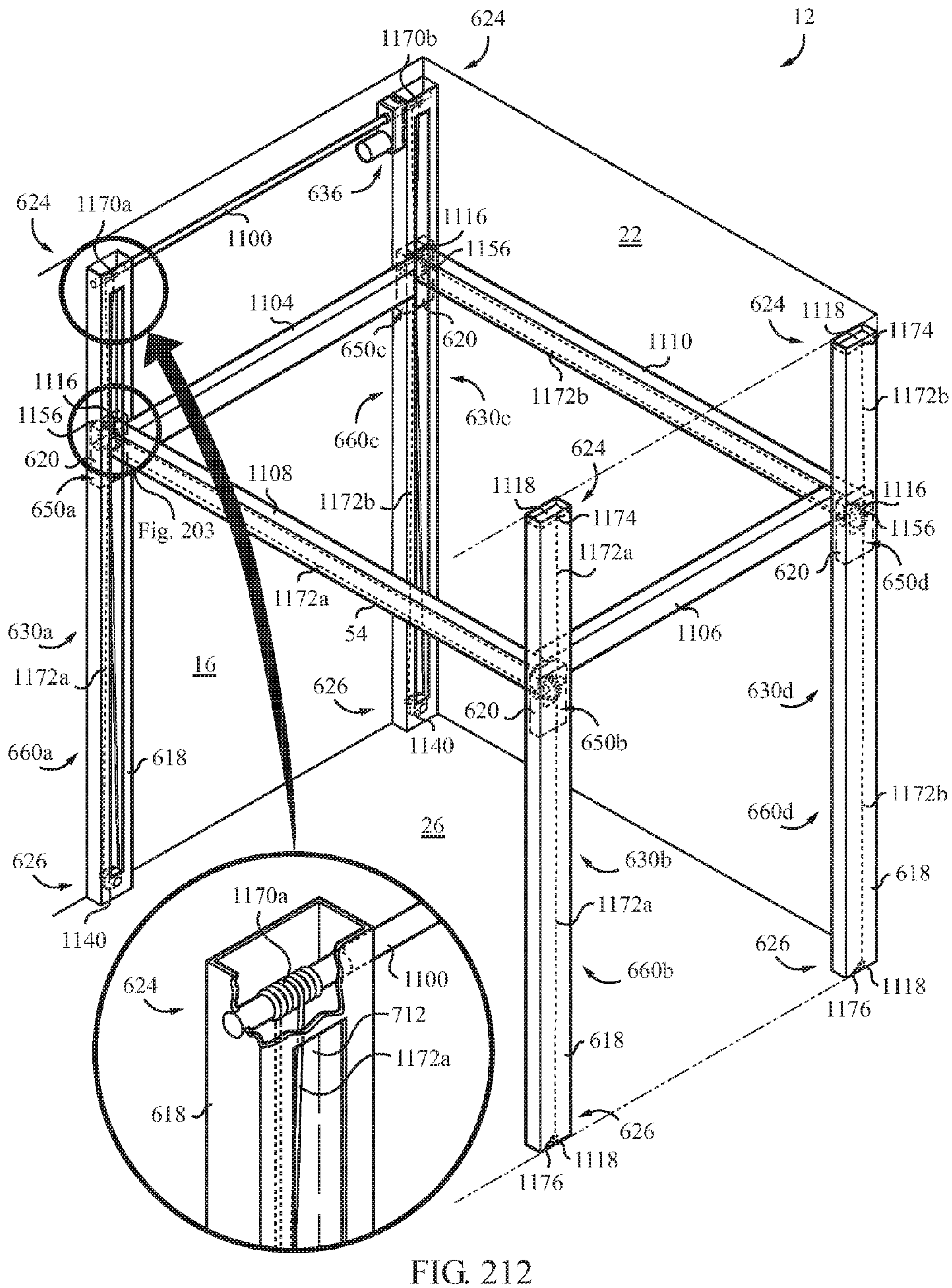

FIG. 212 shows a perspective view of another embodiment of a system for vertically moving one or more beds using cables which move along endless paths.

Figure 213:
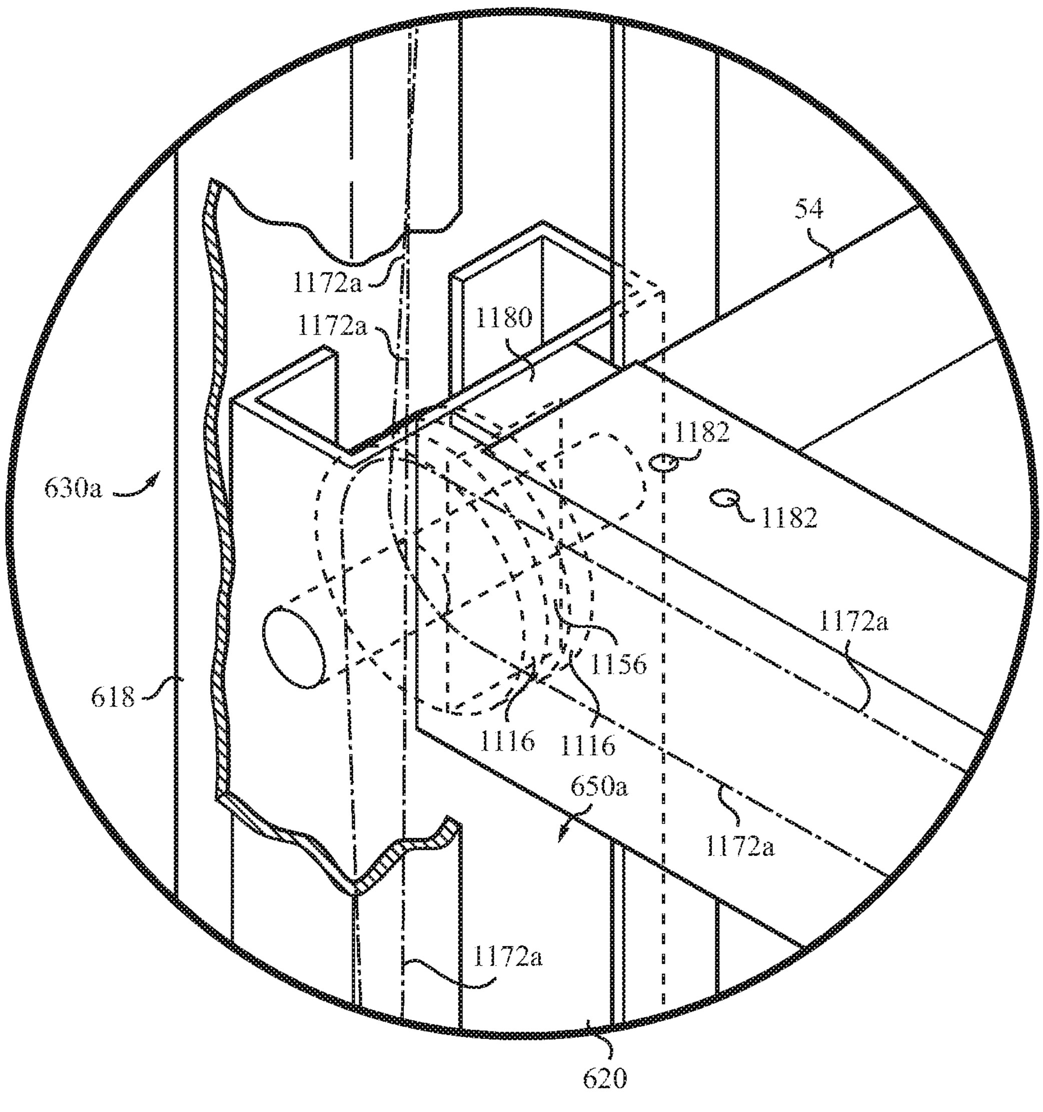

FIG. 213 shows a perspective view of one embodiment of the cables wrapping around pulleys in a moving assembly.

Figure 214:
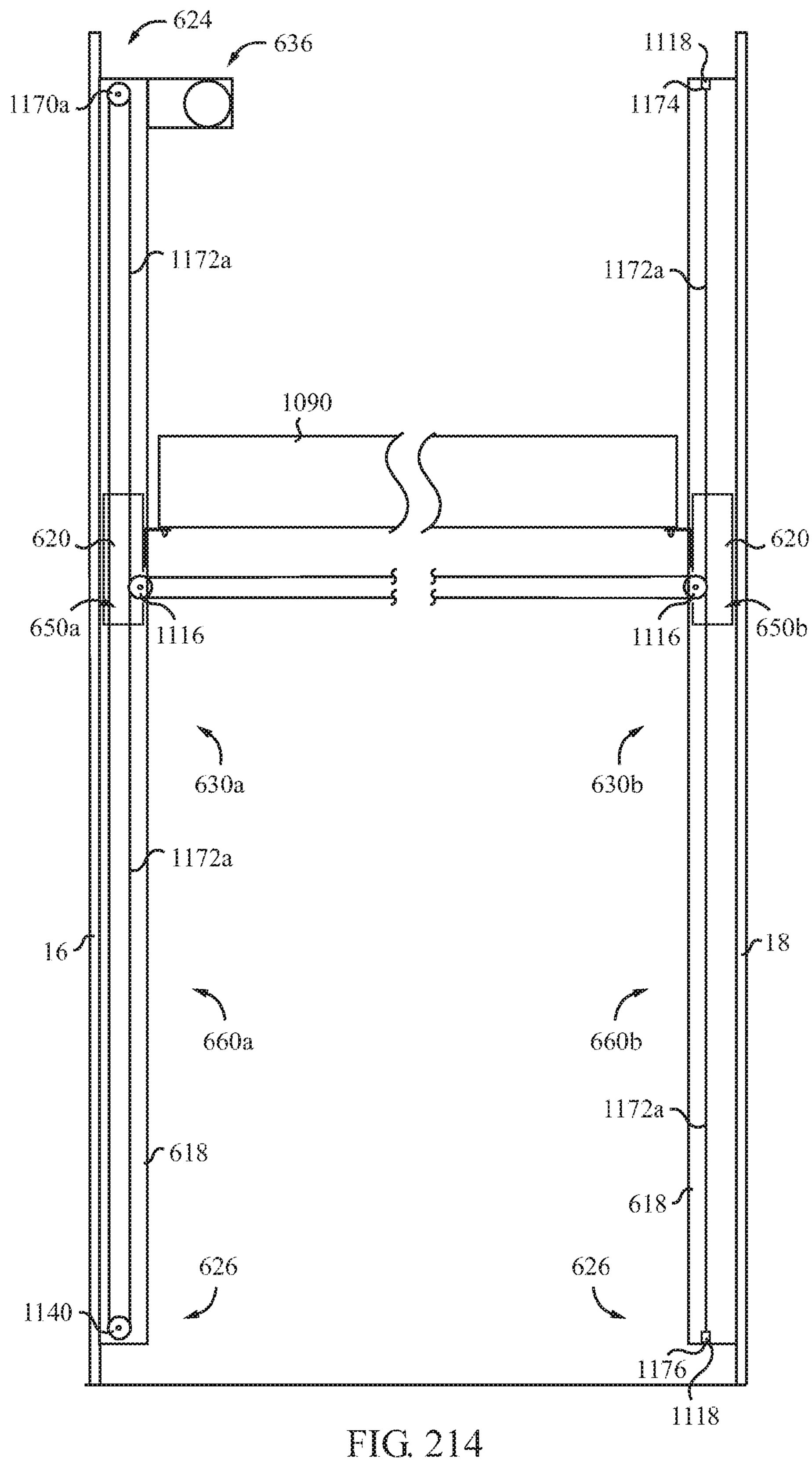

FIG. 214 shows a side view of the system for vertically moving one or more beds using cables which move along endless paths.

Figure 215:
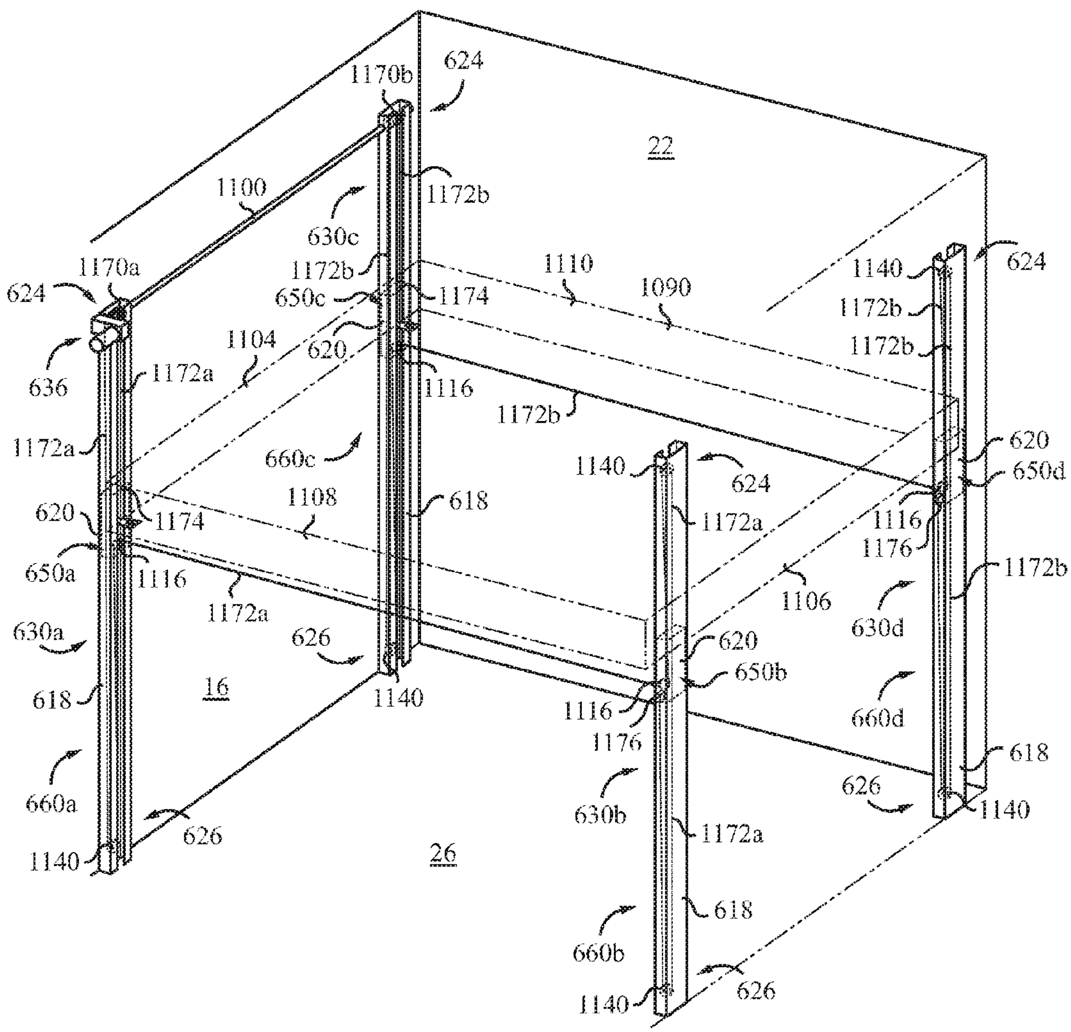

FIG. 215 shows a perspective view of another embodiment of a system for vertically moving one or more beds using cables which move along endless paths.

Figure 216:
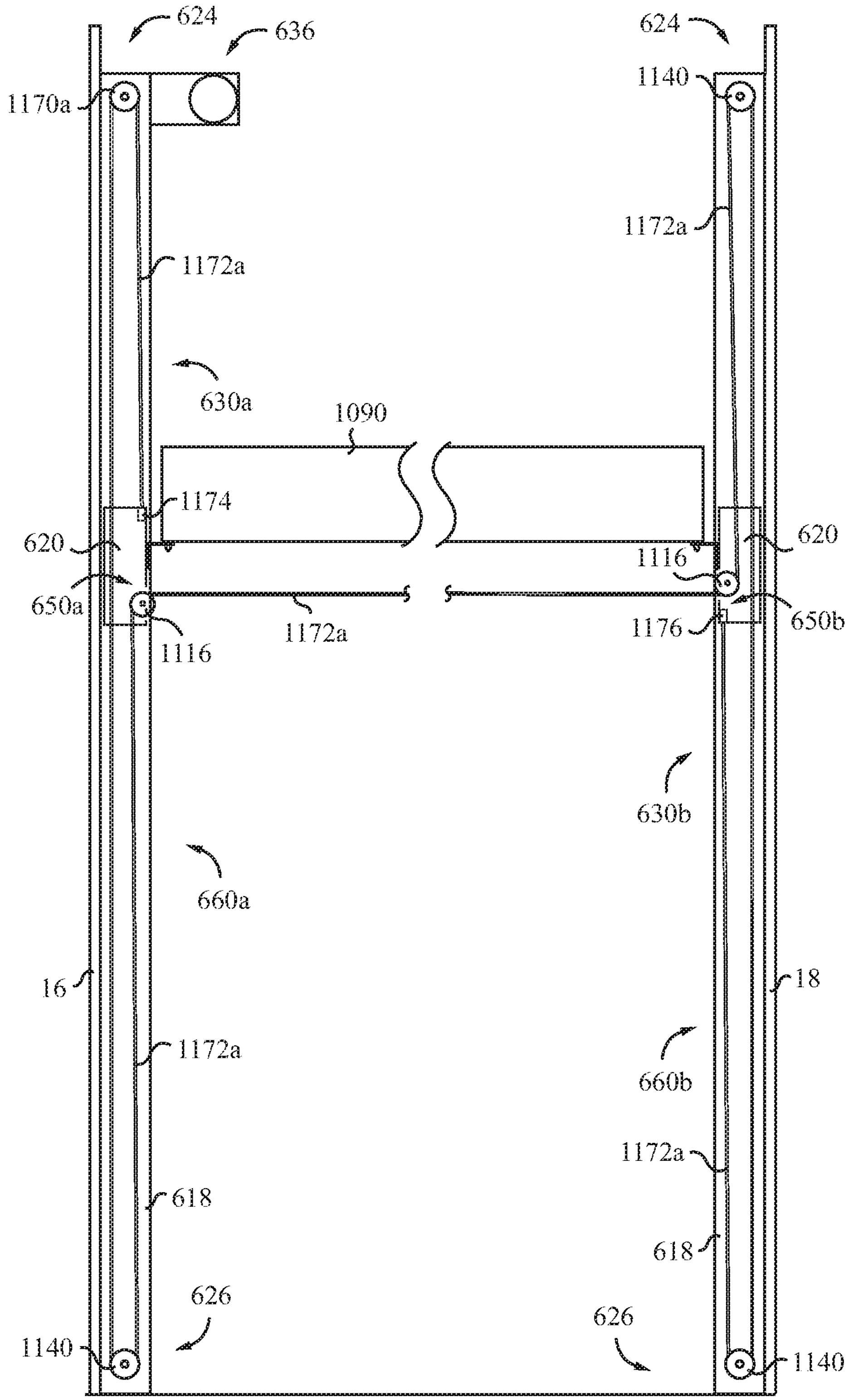

FIG. 216 shows a side view of the system for vertically moving one or more beds using cables which move along endless paths.

Figure 217:
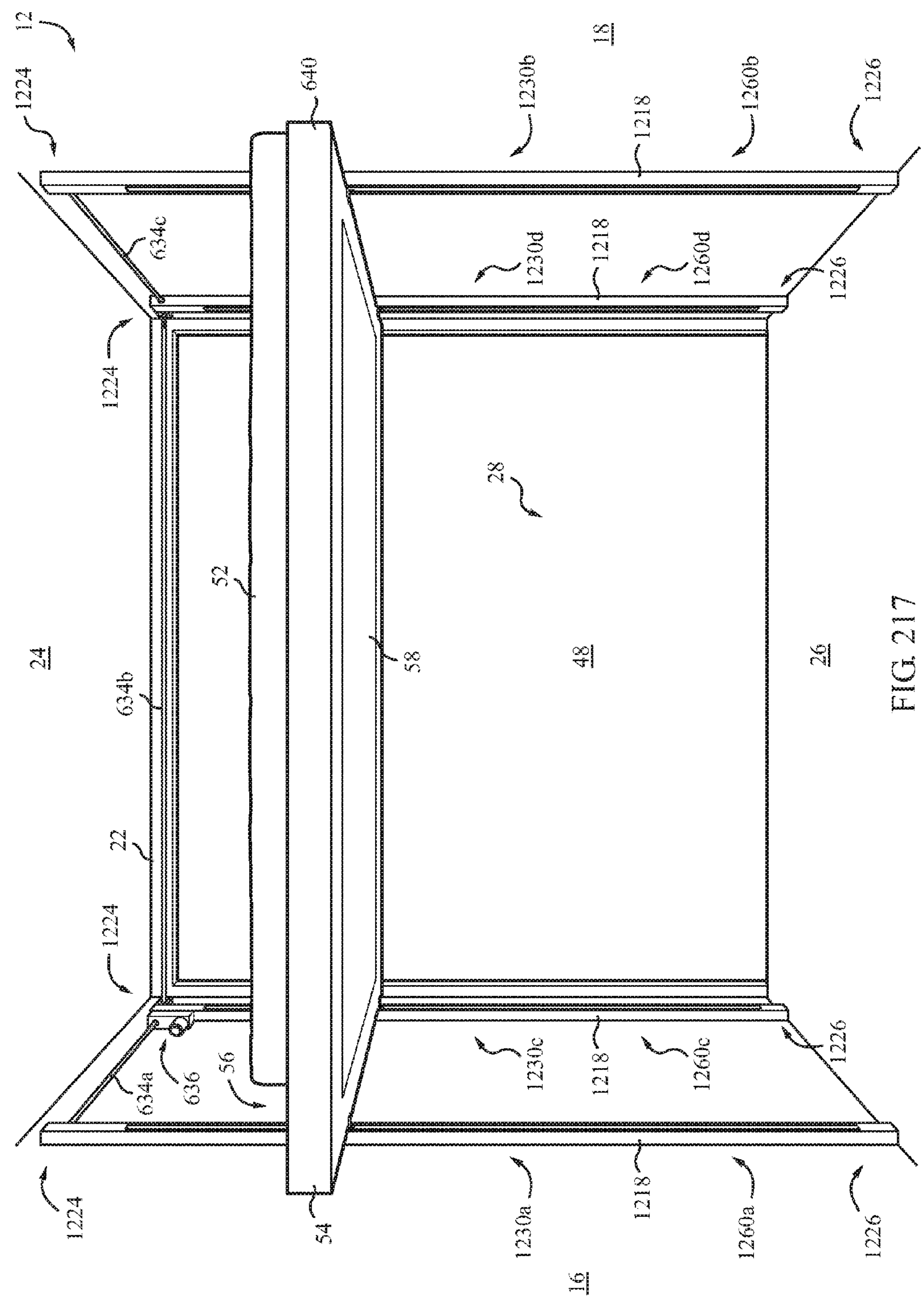

FIG. 217 shows a perspective view from inside a structure of another embodiment of a system for vertically moving one or more beds using screws.

Figure 218:
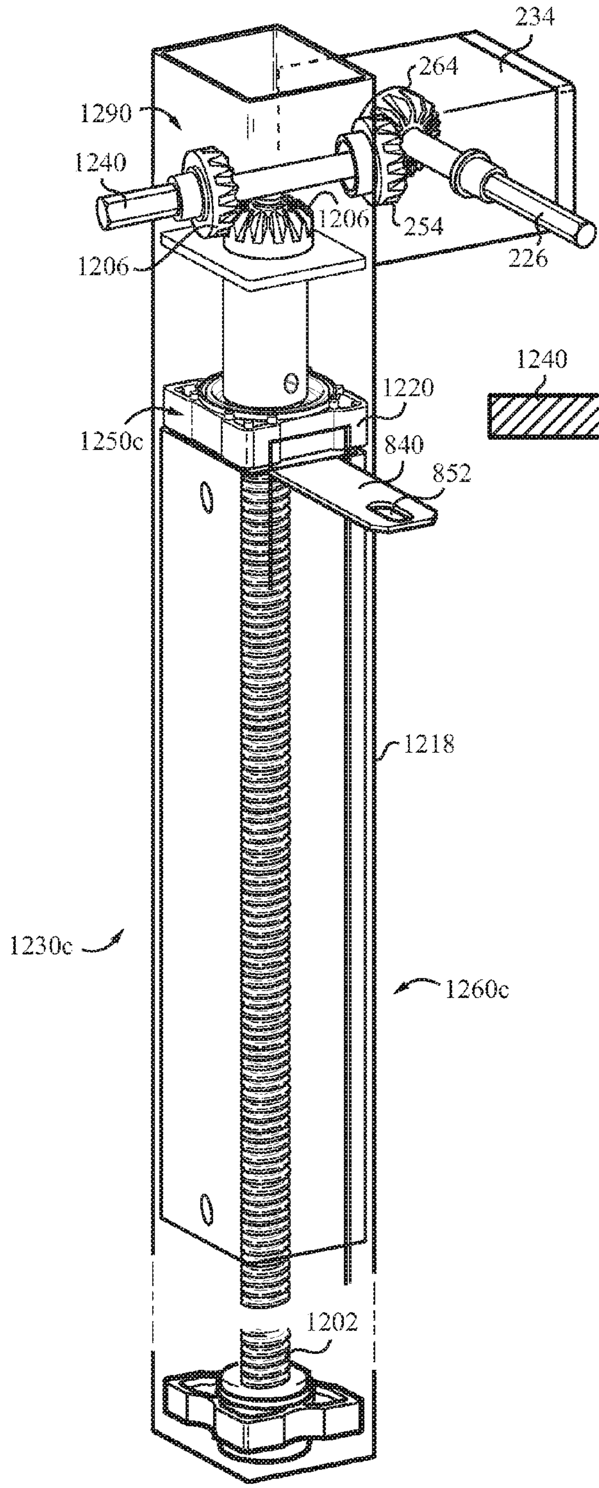

FIG. 218 shows a perspective view of the lifting assembly which uses a screw to vertically move a bed.

Figure 219:
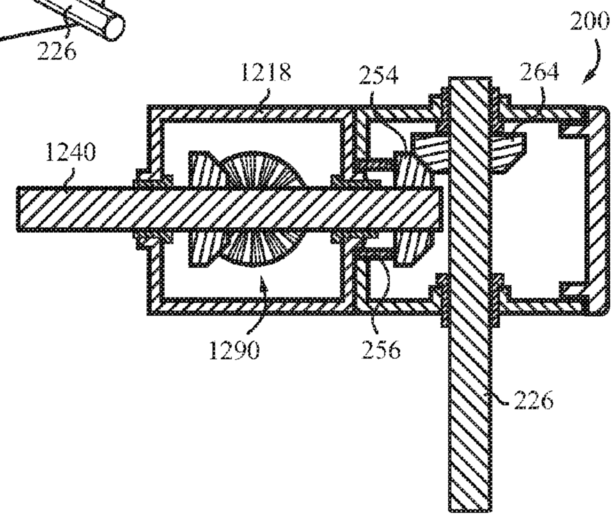

FIG. 219 shows a top cross-sectional view of a drive mechanism used to rotate the screw and thus vertically move a bed.

Figure 220:
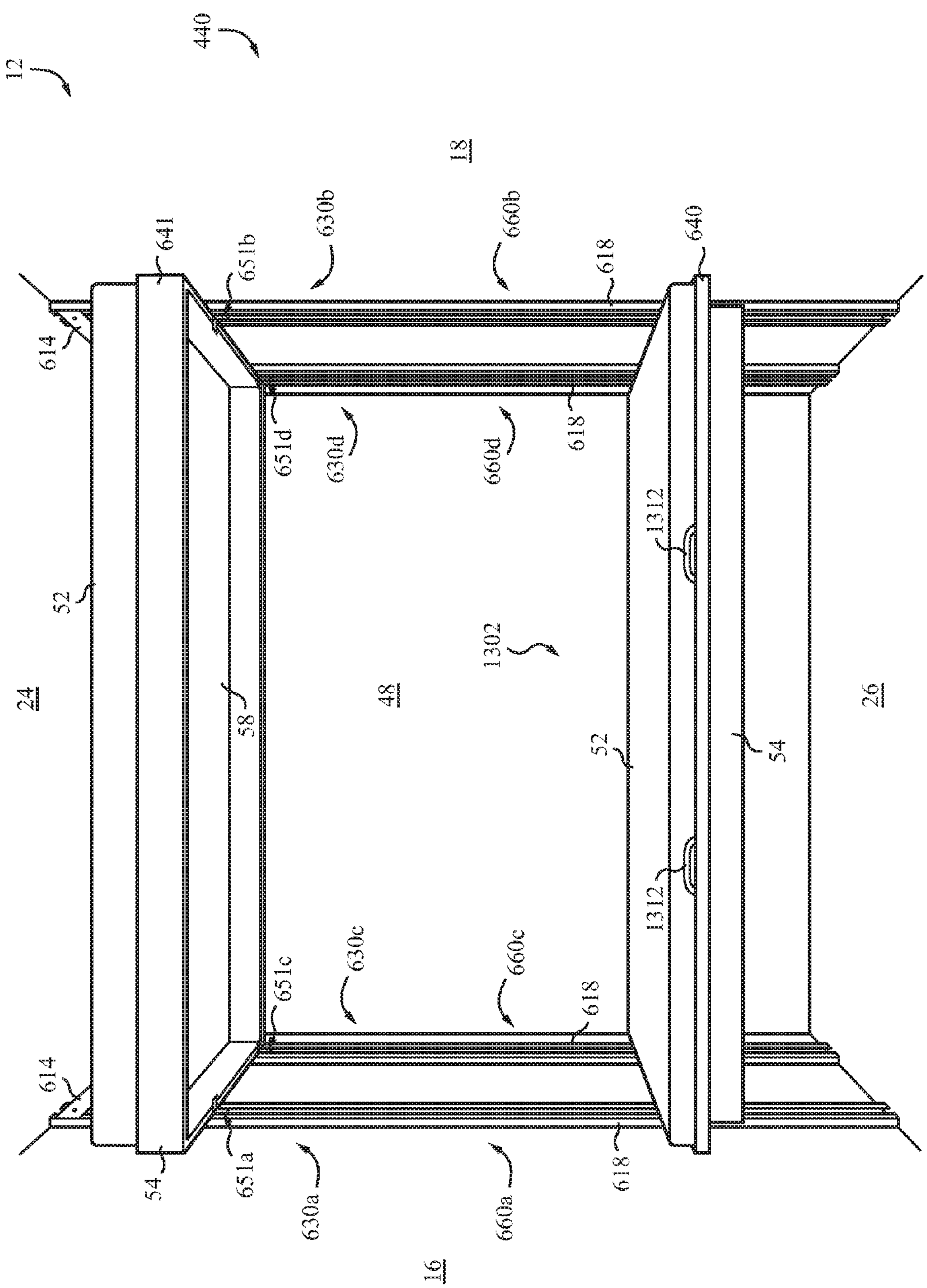
Figure 221:
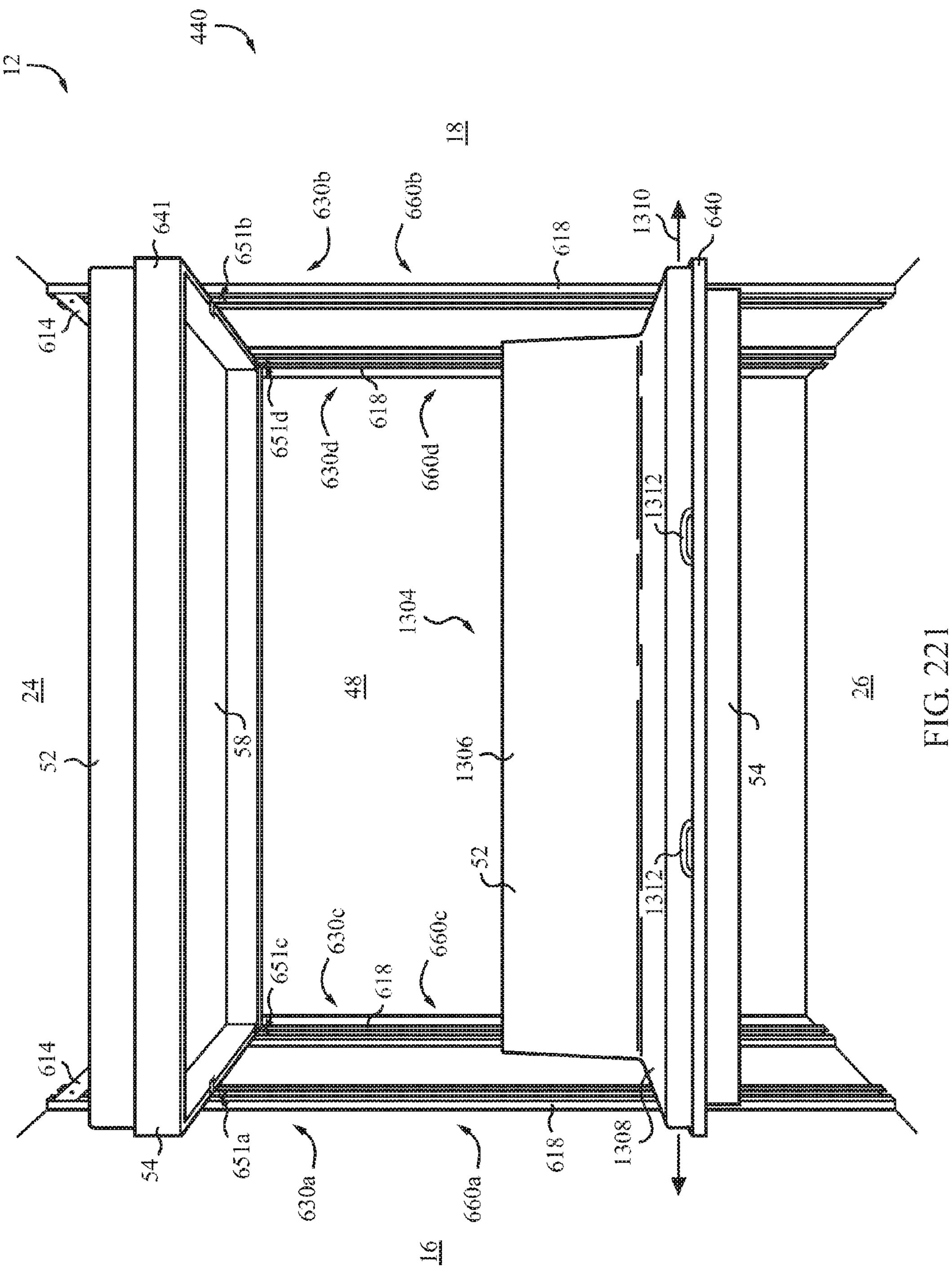

FIGS. 220-221 show perspective views of another embodiment of a system which may be used to vertically move one or more beds where one of the beds can move between a sleeping configuration and a seating configuration.

Figure 222:
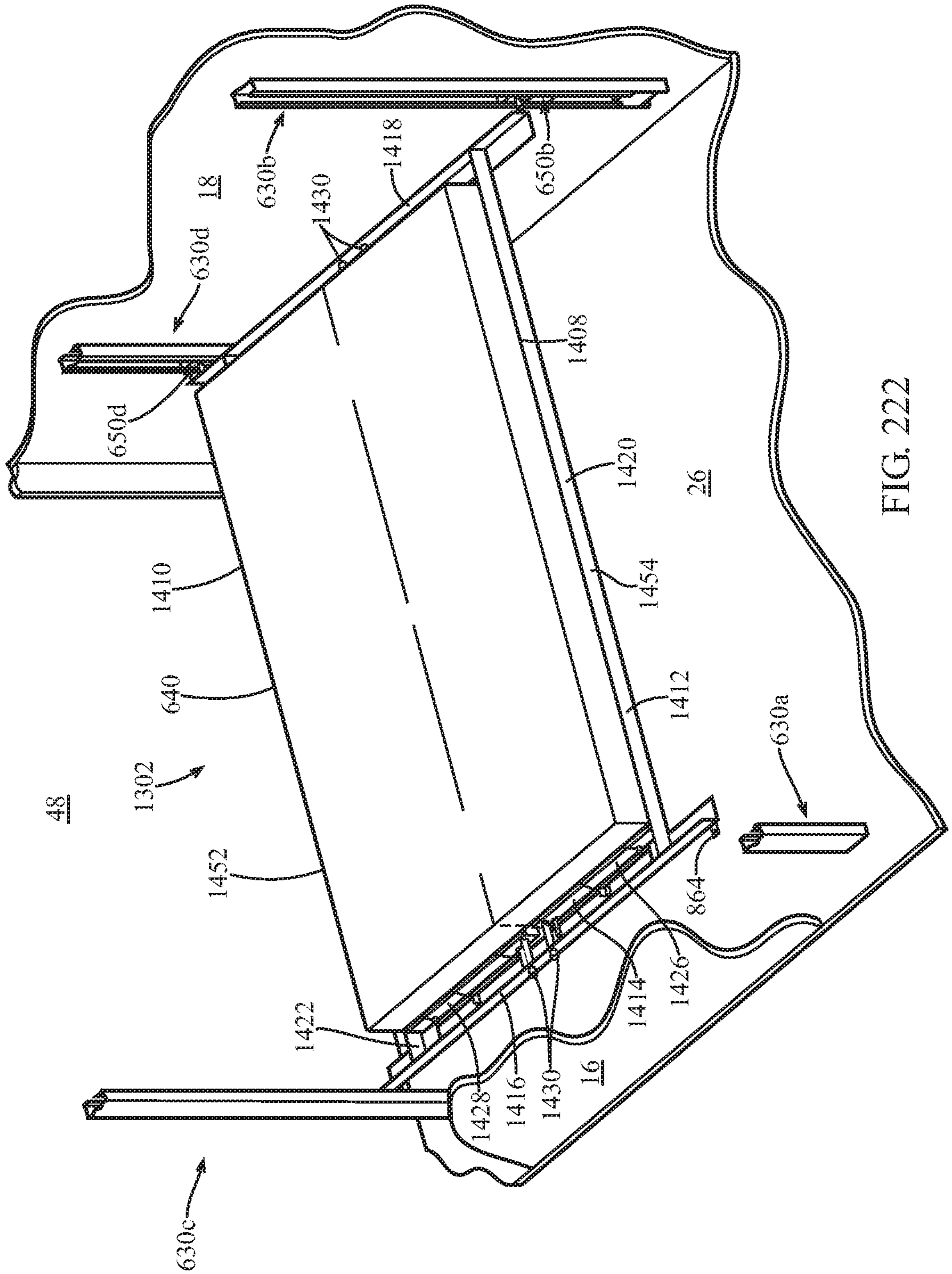

FIG. 222 shows a perspective view of a bed that can move between a sleeping configuration and a seating configuration where the bed is in the sleeping configuration.

Figure 223:
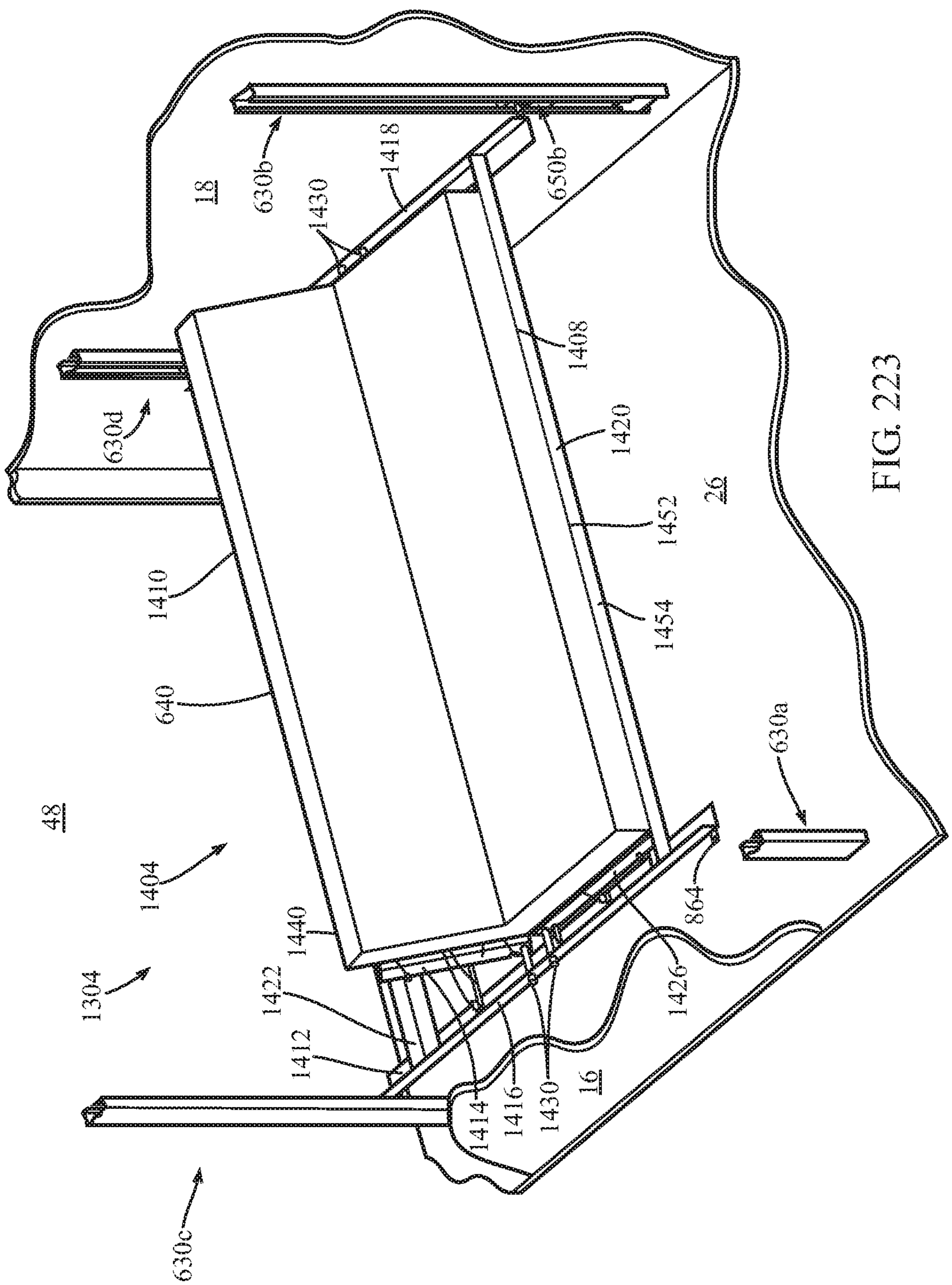

FIG. 223 shows a perspective view of the bed that can move between a sleeping configuration and a seating configuration where the bed is in the seating configuration and facing one direction.

Figure 224:
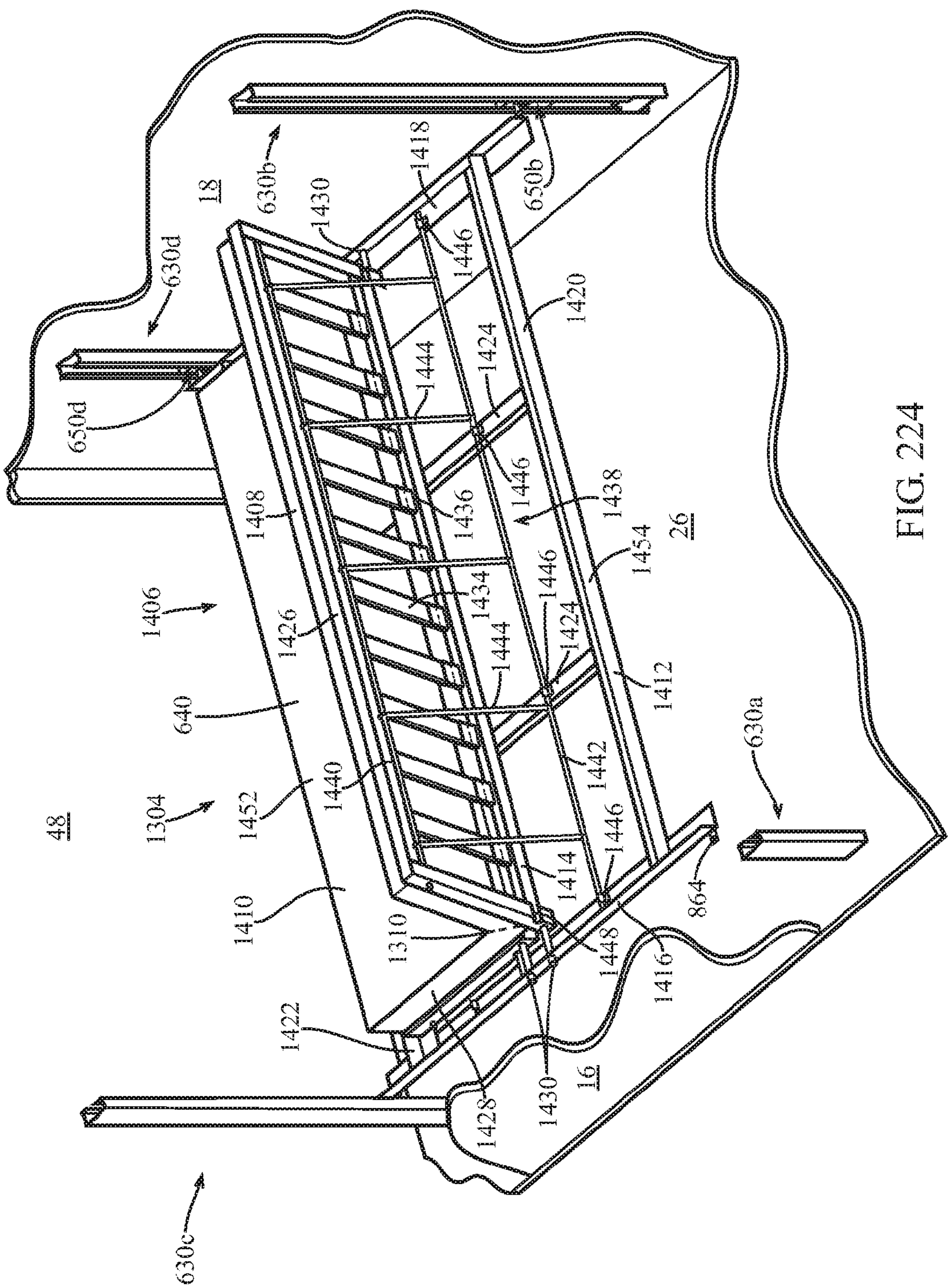

FIG. 224 shows a perspective view of the bed that can move between a sleeping configuration and a seating configuration where the bed is in the seating configuration and facing an opposite direction as that shown in FIG. 223.

Figure 225:
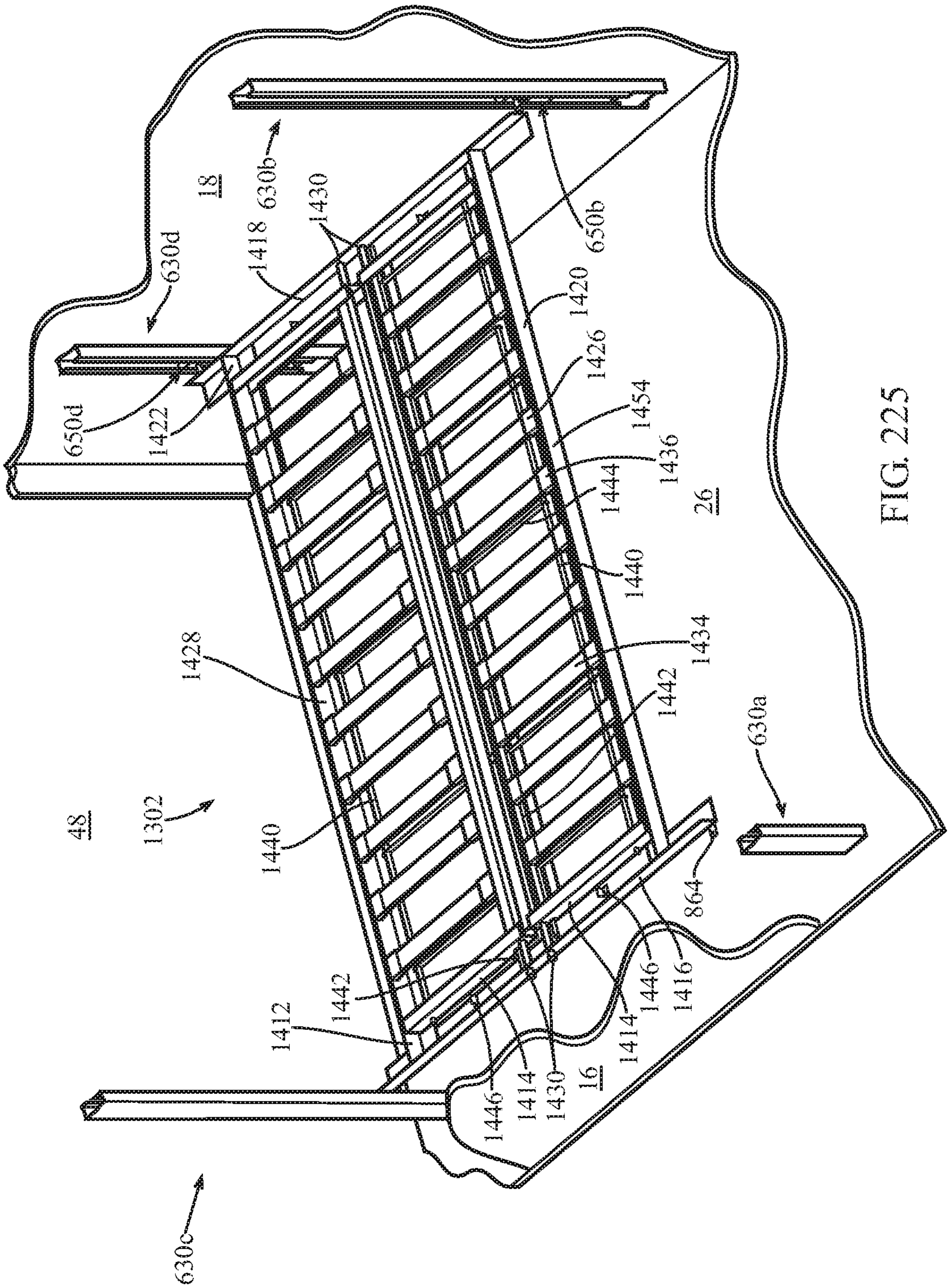

FIG. 225 shows a perspective view of the bed that can move between a sleeping configuration and a seating configuration where the bed is in the sleeping configuration and the mattress is removed.

Figure 226:
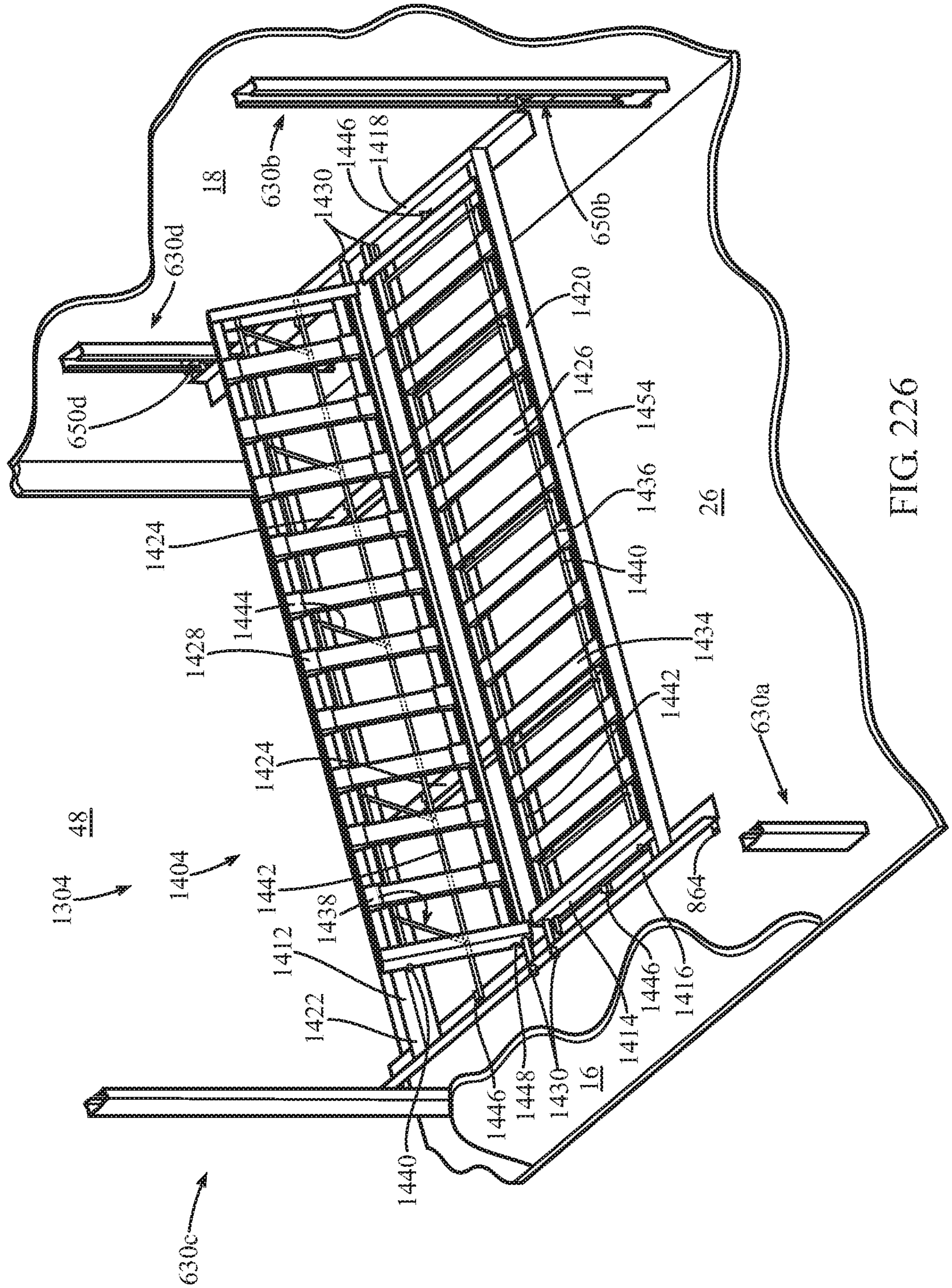

FIG. 226 shows a perspective view of the bed that can move between a sleeping configuration and a seating configuration where the bed is in the seating configuration facing one direction and the mattress is removed.

Figure 227:
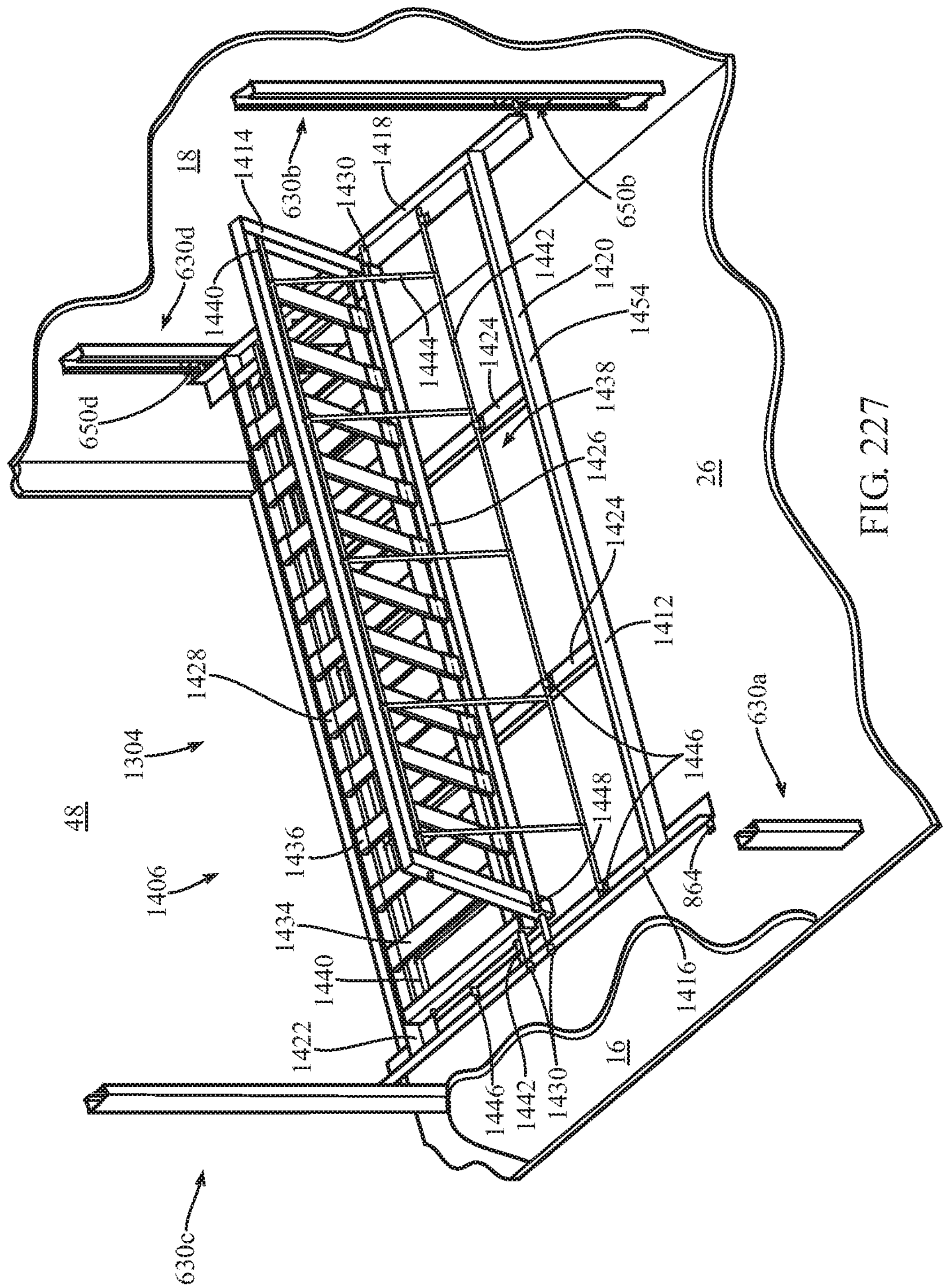

FIG. 227 shows a perspective view of the bed that can move between a sleeping configuration and a seating configuration where the bed is in the seating configuration facing the opposite direction as that shown in FIG. 226 and the mattress is removed.

Figure 228:
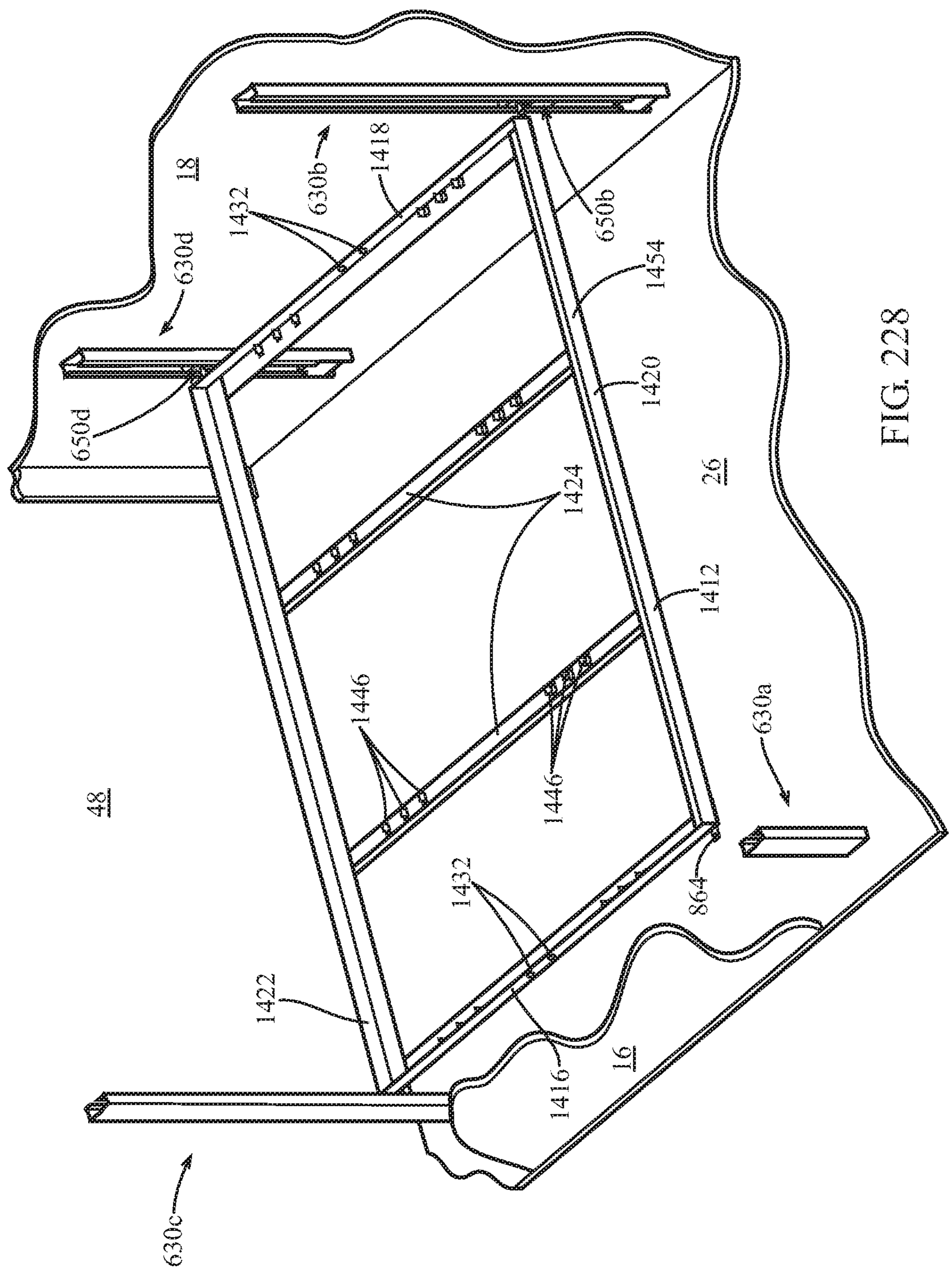

FIG. 228 shows a perspective view of one embodiment of a bed frame, part of which is removed, that may be used with a bed that can move between a sleeping configuration and a seating configuration.

Figure 229:
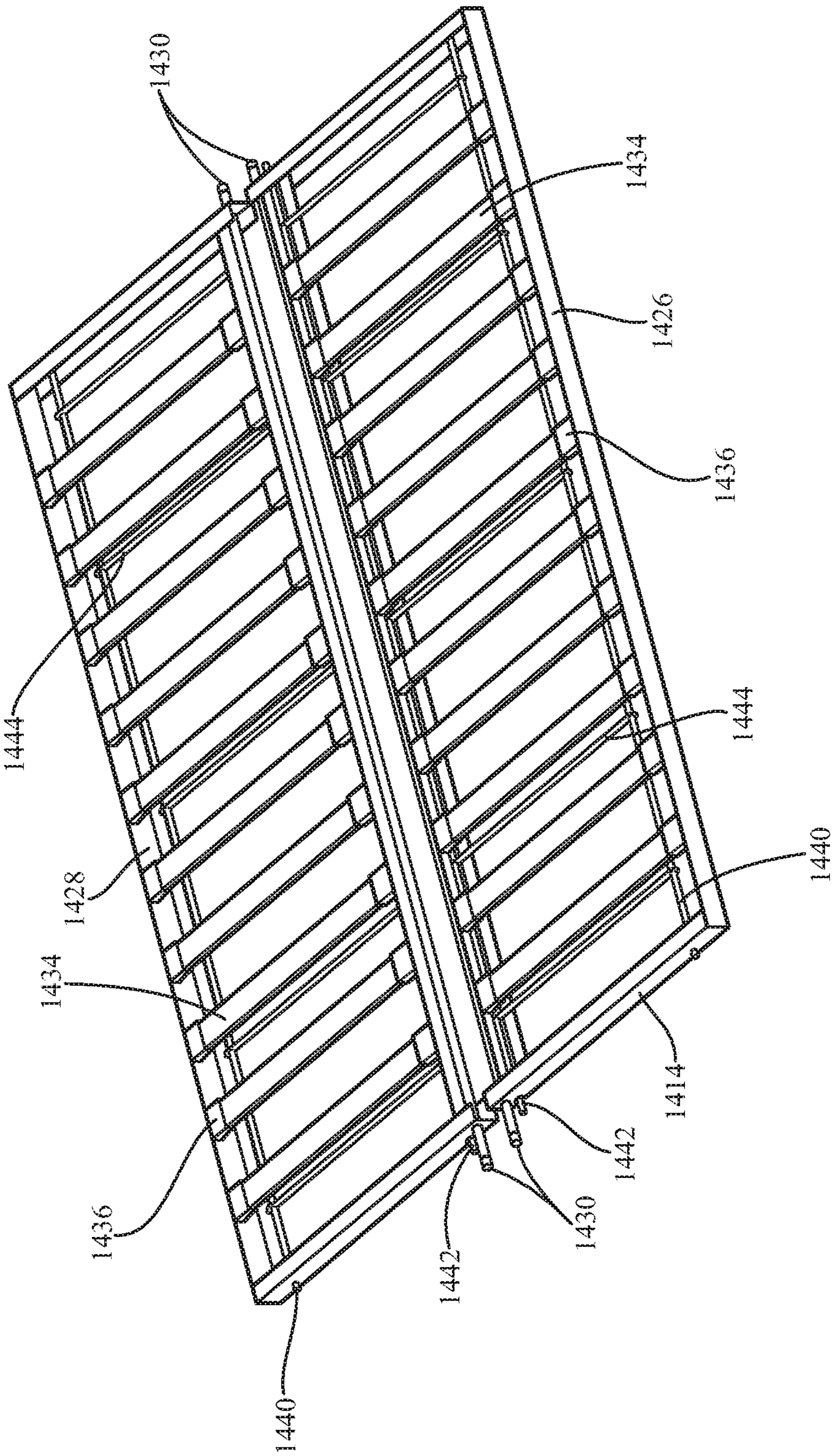

FIG. 229 shows a perspective view of one embodiment of a bed frame, part of which is removed, that may be used with a bed that can move between a sleeping configuration and a seating configuration.

Figure 230:
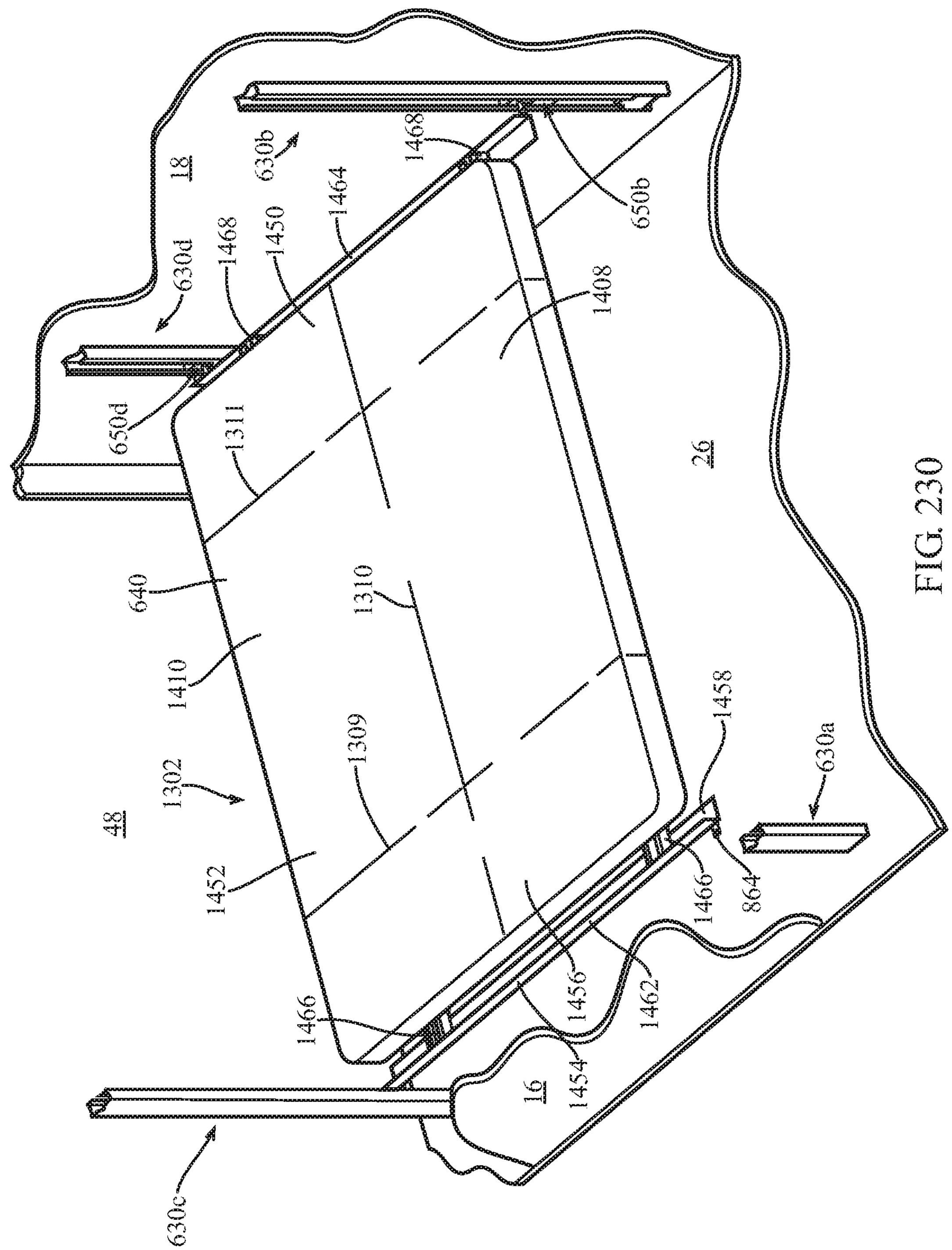

FIG. 230 shows a perspective view of one embodiment of a bed that can move between a sleeping configuration and a seating configuration where a headrest portion can also be raised.

Figure 231:
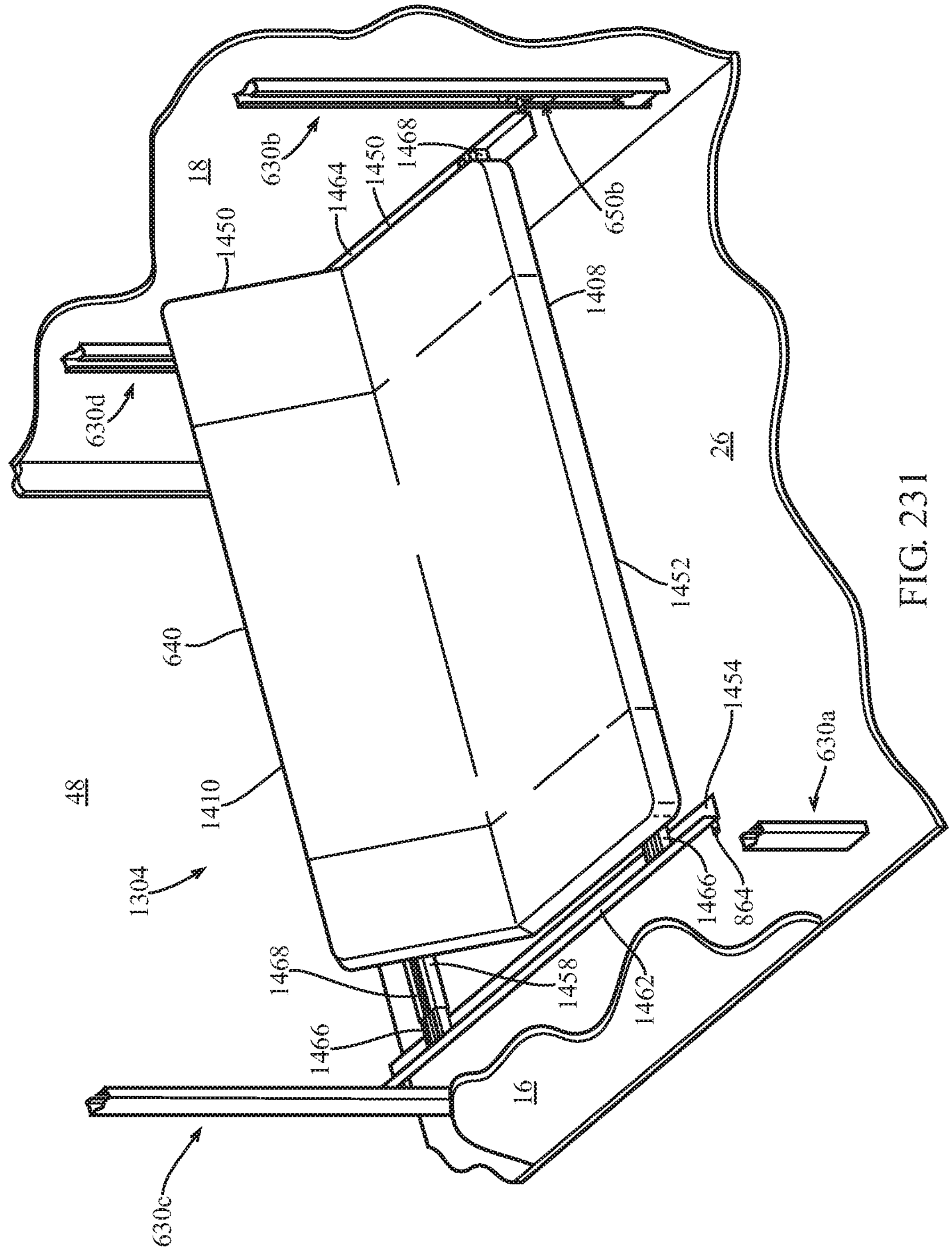

FIG. 231 shows a perspective view of the bed that can move between a sleeping configuration and a seating configuration where the bed is in the seating configuration and facing one direction.

Figure 232:
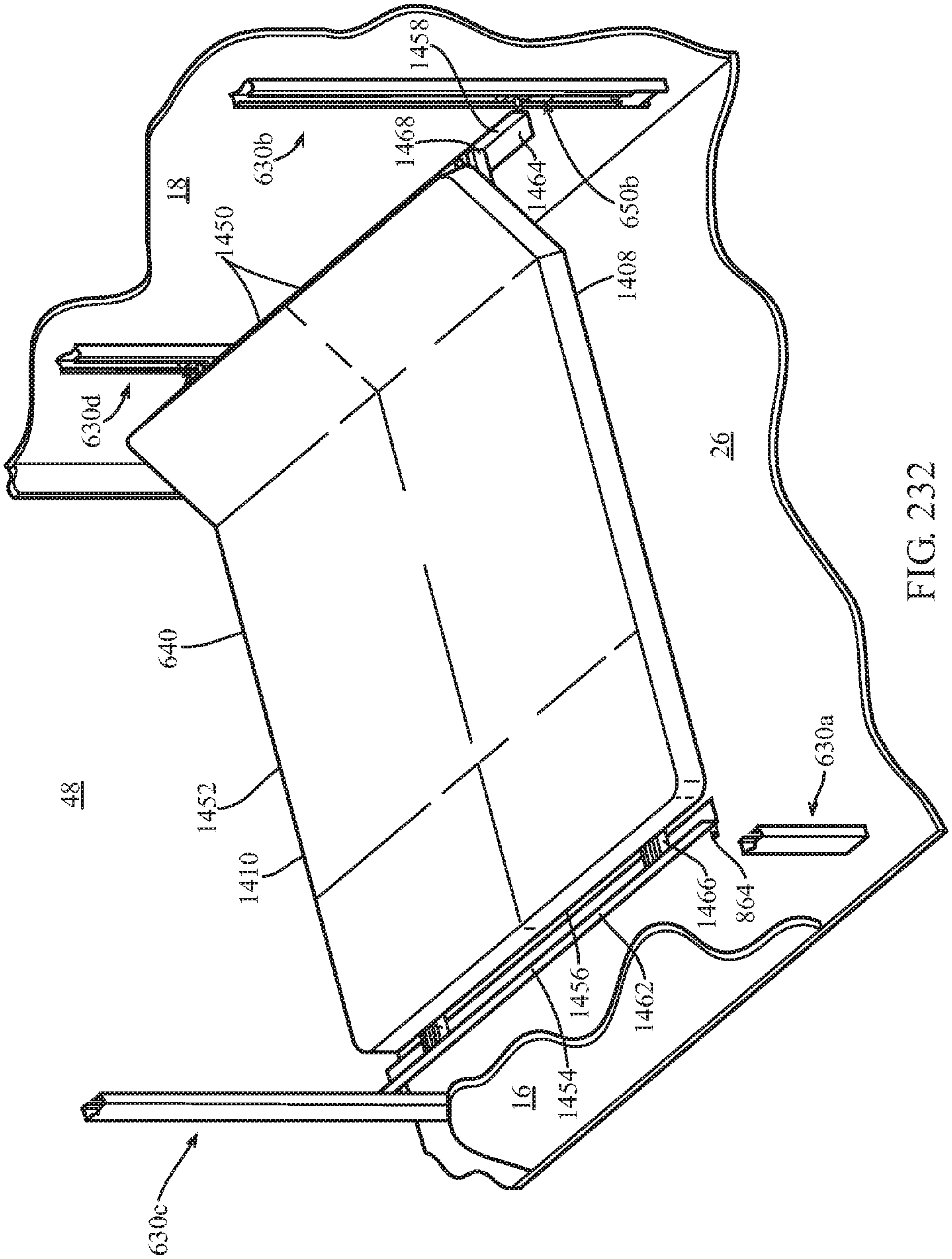

FIG. 232 shows a perspective view of the bed that can move between a sleeping configuration and a seating configuration where the bed is in the sleeping configuration with the headrest portion raised.

Figure 233:
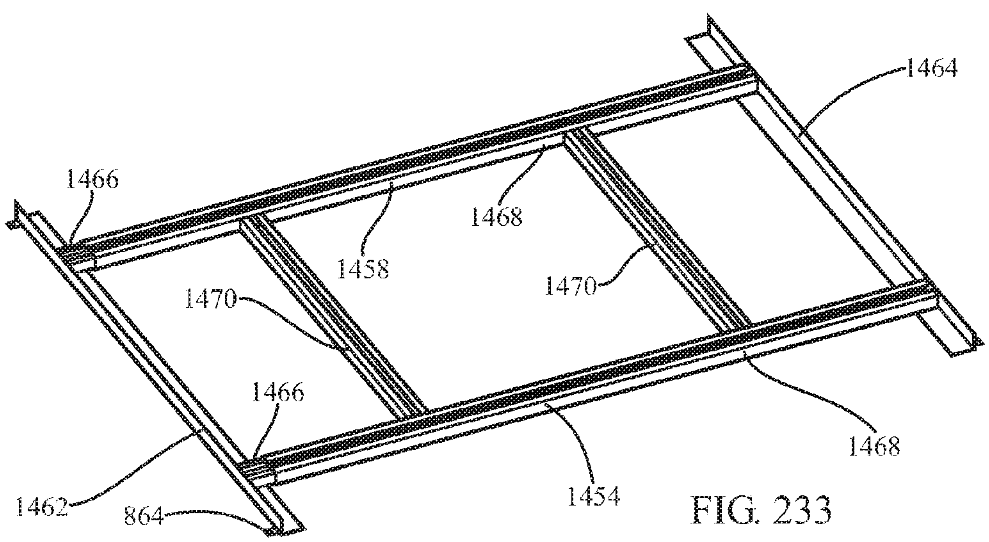

FIG. 233 shows a perspective view of one embodiment of a width adjustable frame section that may be used with a bed that can move between a sleeping configuration and a seating configuration.

Figure 234:
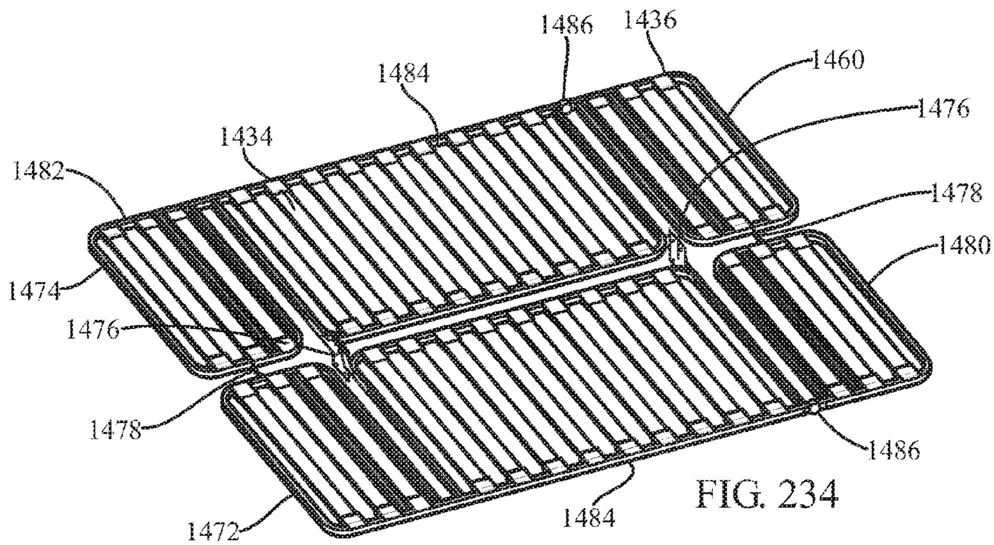

FIG. 234 shows a perspective view of one embodiment of a mattress support section that may be used with a bed that can move between a sleeping configuration and a seating configuration.

Figure 235:
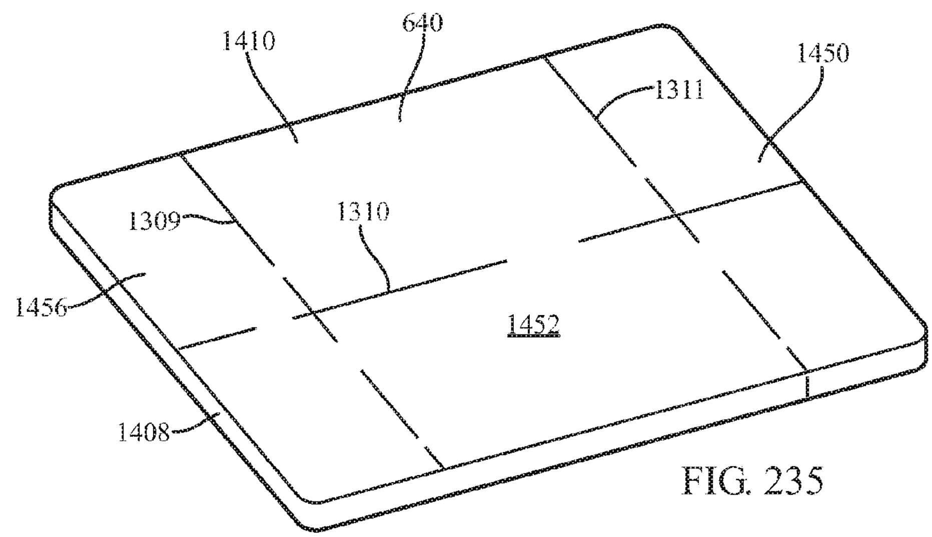

FIG. 235 shows a perspective view of one embodiment of a mattress that may be used with a bed that can move between a sleeping configuration and a seating configuration.

Figure 236:
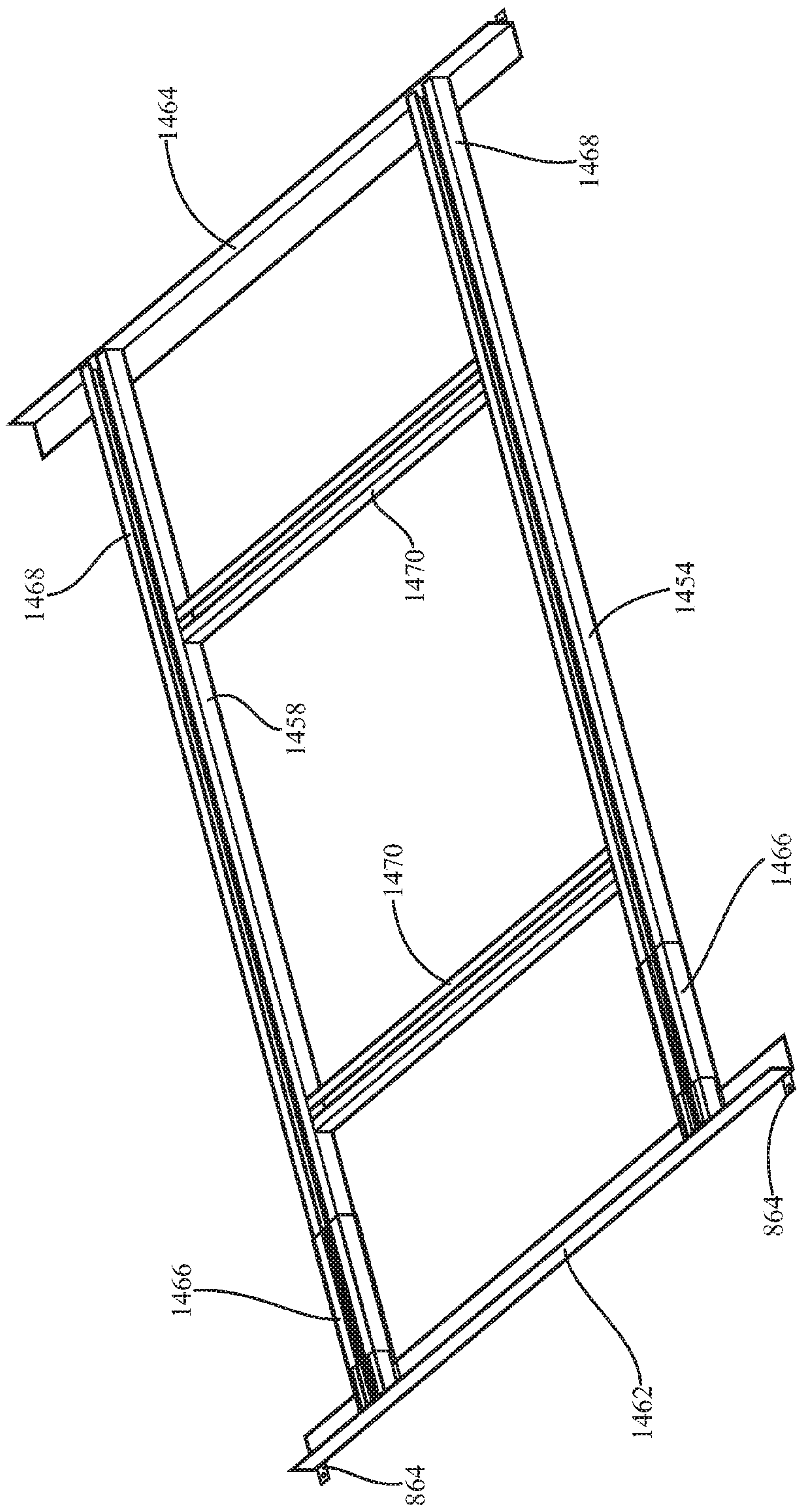

FIG. 236 shows a perspective view of another embodiment of a width adjustable frame section that may be used with a bed that can move between a sleeping configuration and a seating configuration.

Figure 237:
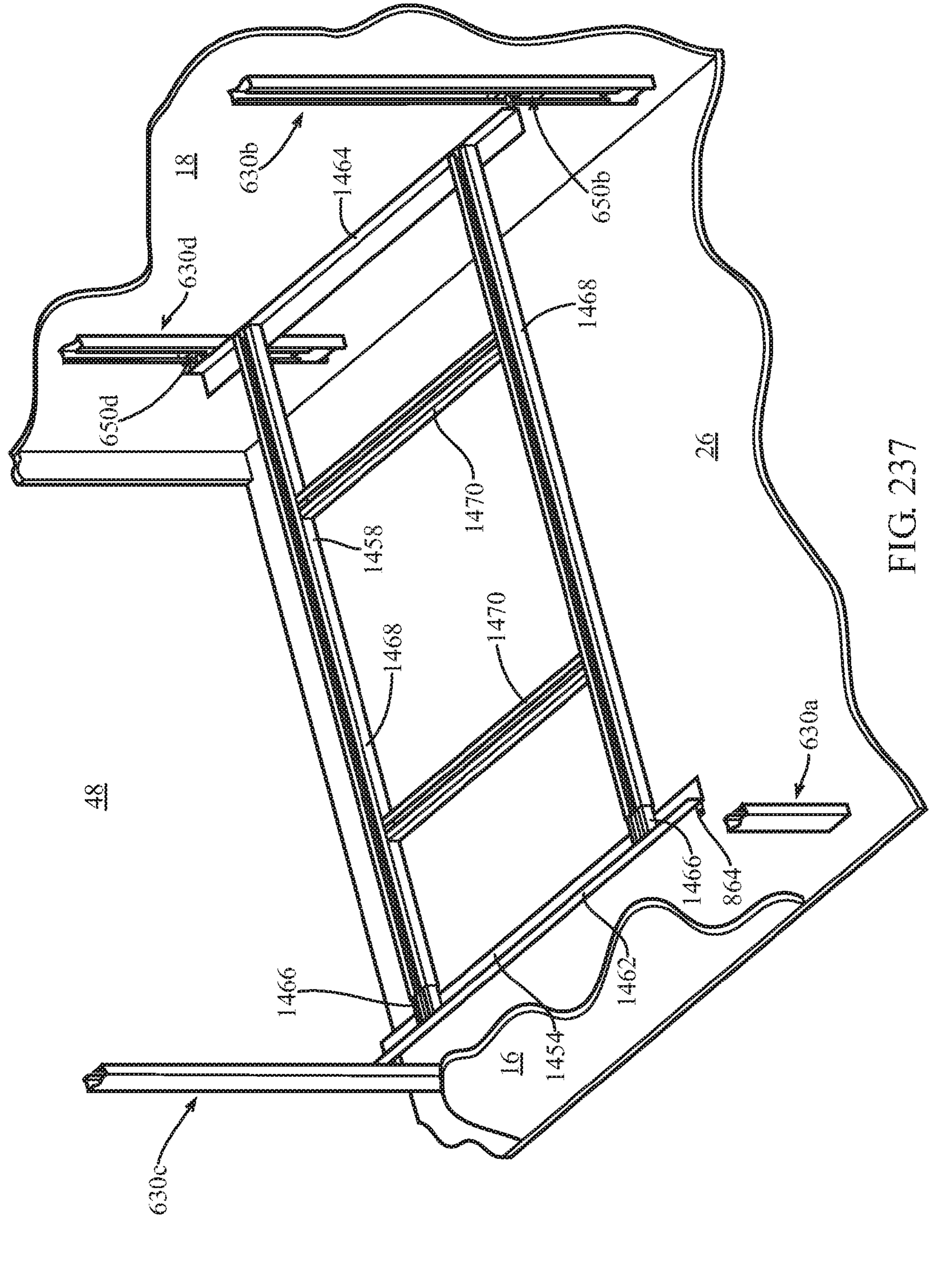

FIG. 237 shows a perspective view of the width adjustable frame section from FIG. 233 coupled to a system that may be used to vertically move the frame section.

Figure 238:
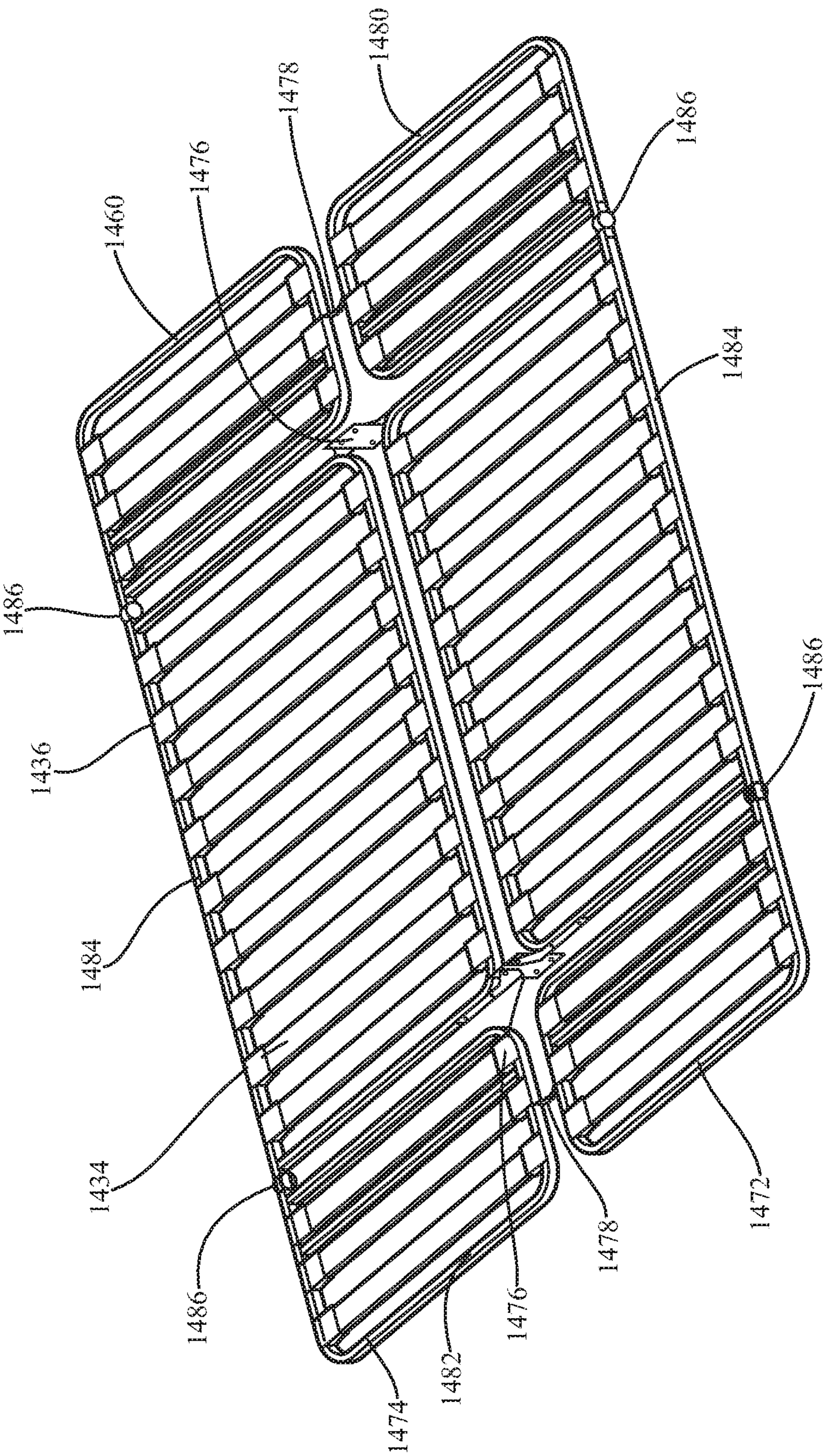

FIG. 238 shows a perspective view of another embodiment of a mattress support section that may be used with a bed that can move between a sleeping configuration and a seating configuration, the mattress support section including a headrest portion and a footrest portion that can be raised.

Figure 239:
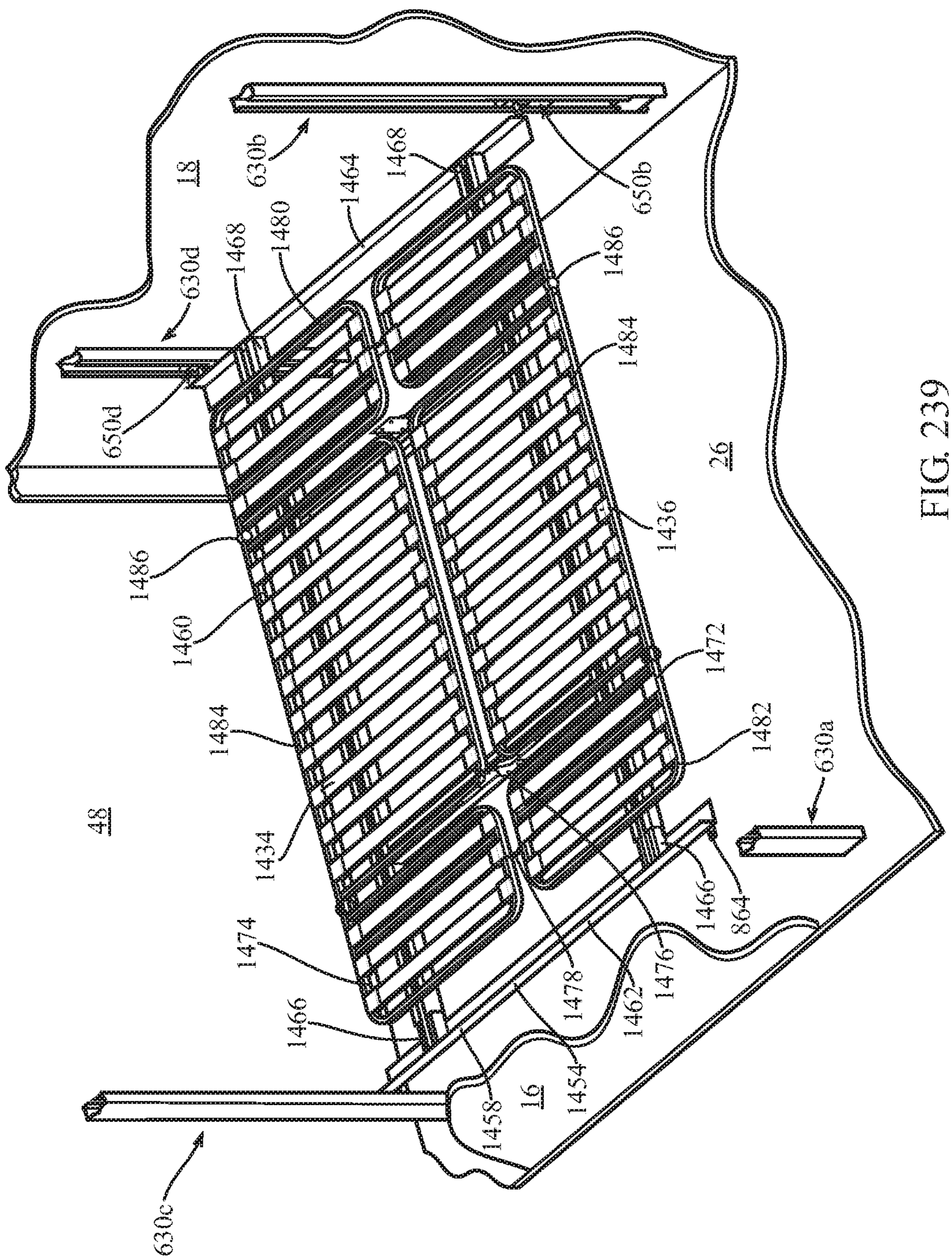

FIG. 239 shows a perspective view of the mattress support section from FIG. 234 coupled to a system that may be used to vertically move the mattress support section.

Figure 240:
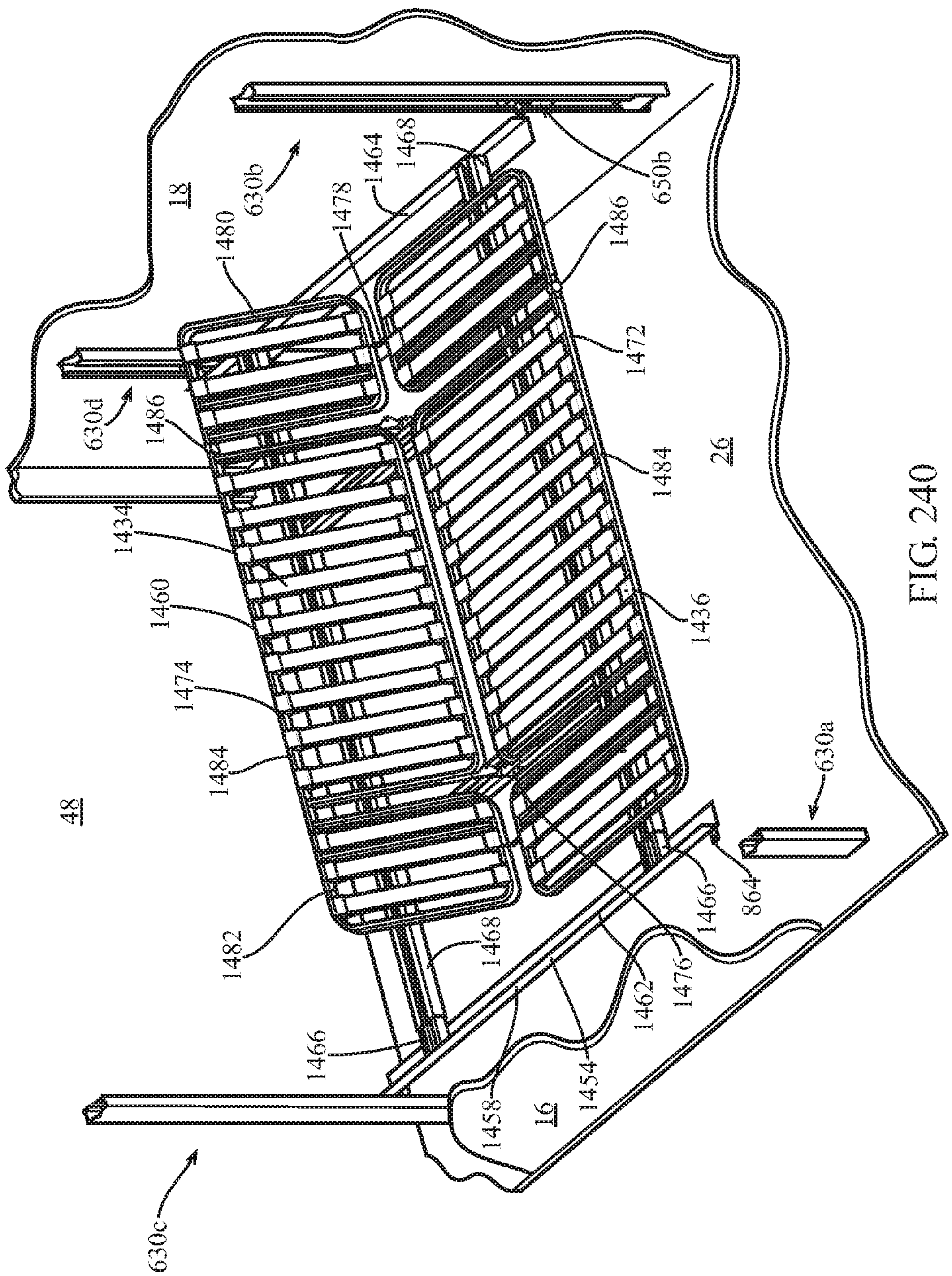

FIG. 240 shows a perspective view of the mattress support section from FIG. 234 with the mattress support section in the seating configuration and facing one direction.

Figure 241:
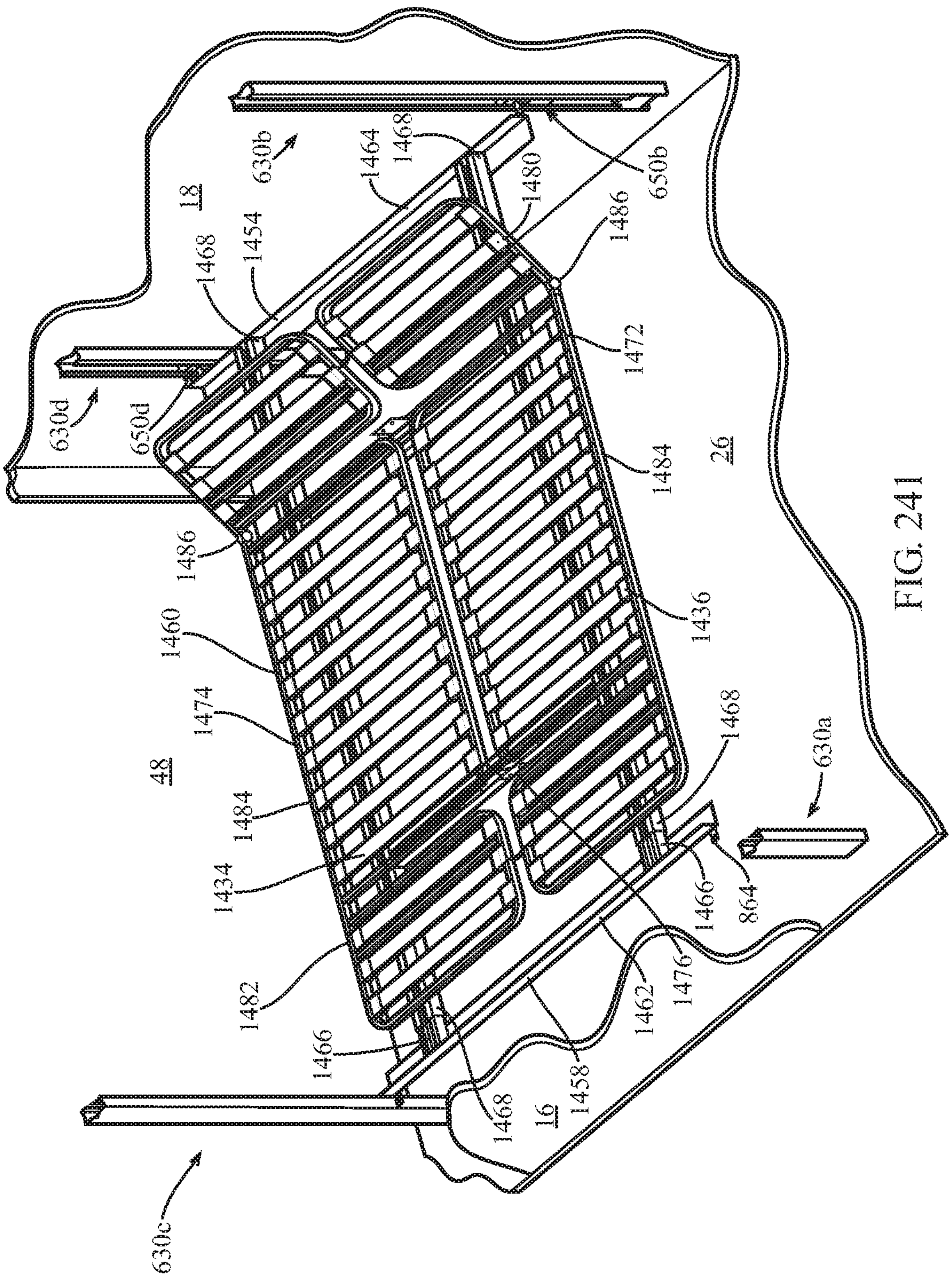

FIG. 241 shows a perspective view of the mattress support section from FIG. 234 with the headrest portion raised.

Figure 242:
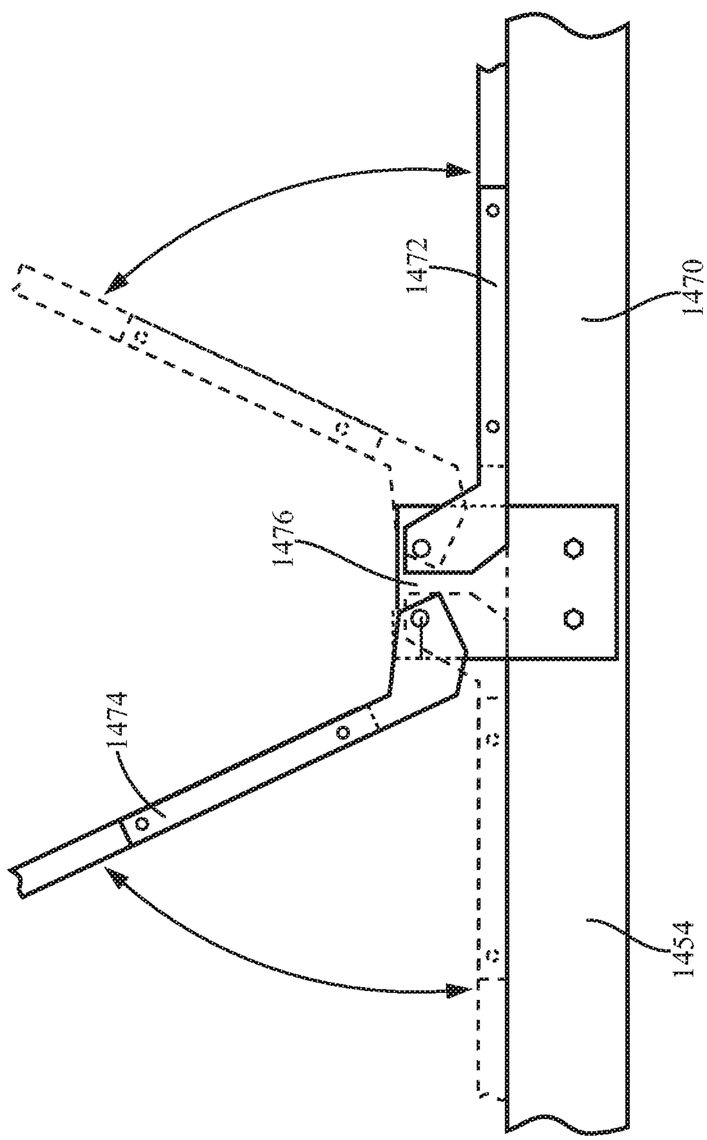

FIG. 242 shows a side view of one embodiment of a bed frame that may be used with a bed that can move between a sleeping configuration and a seating configuration where the bed can be selectively configured to face one direction or an opposite direction.

Figures 243, 244:
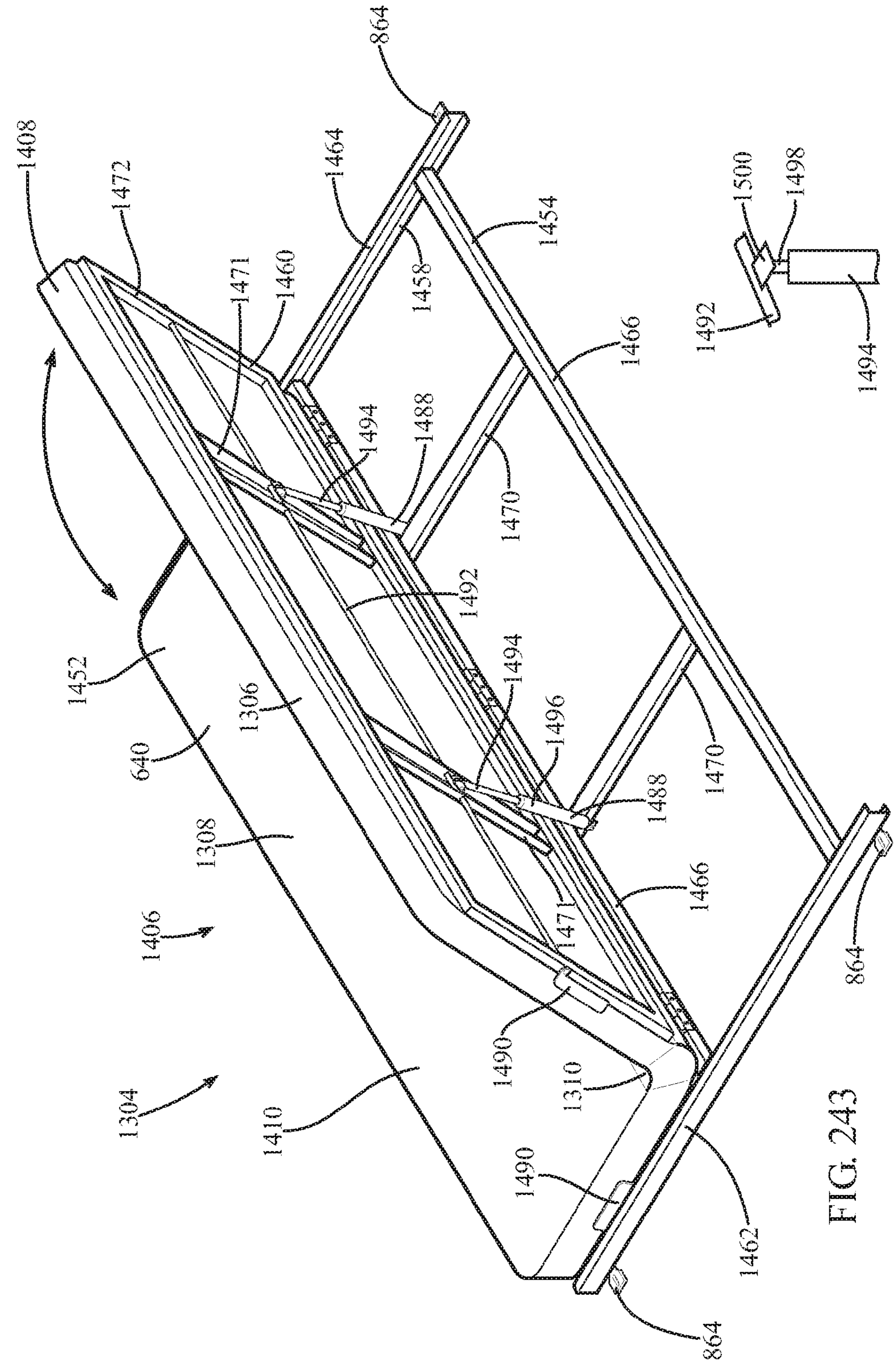

FIG. 243 shows a perspective view of one embodiment of a bed that can move between a sleeping configuration and a seating configuration where the bed can be selectively configured to face one direction or an opposite direction.

FIG. 244 shows a perspective view of one embodiment of an actuation mechanism for moving the bed between a sleeping configuration and a seating configuration.

Figure 245:
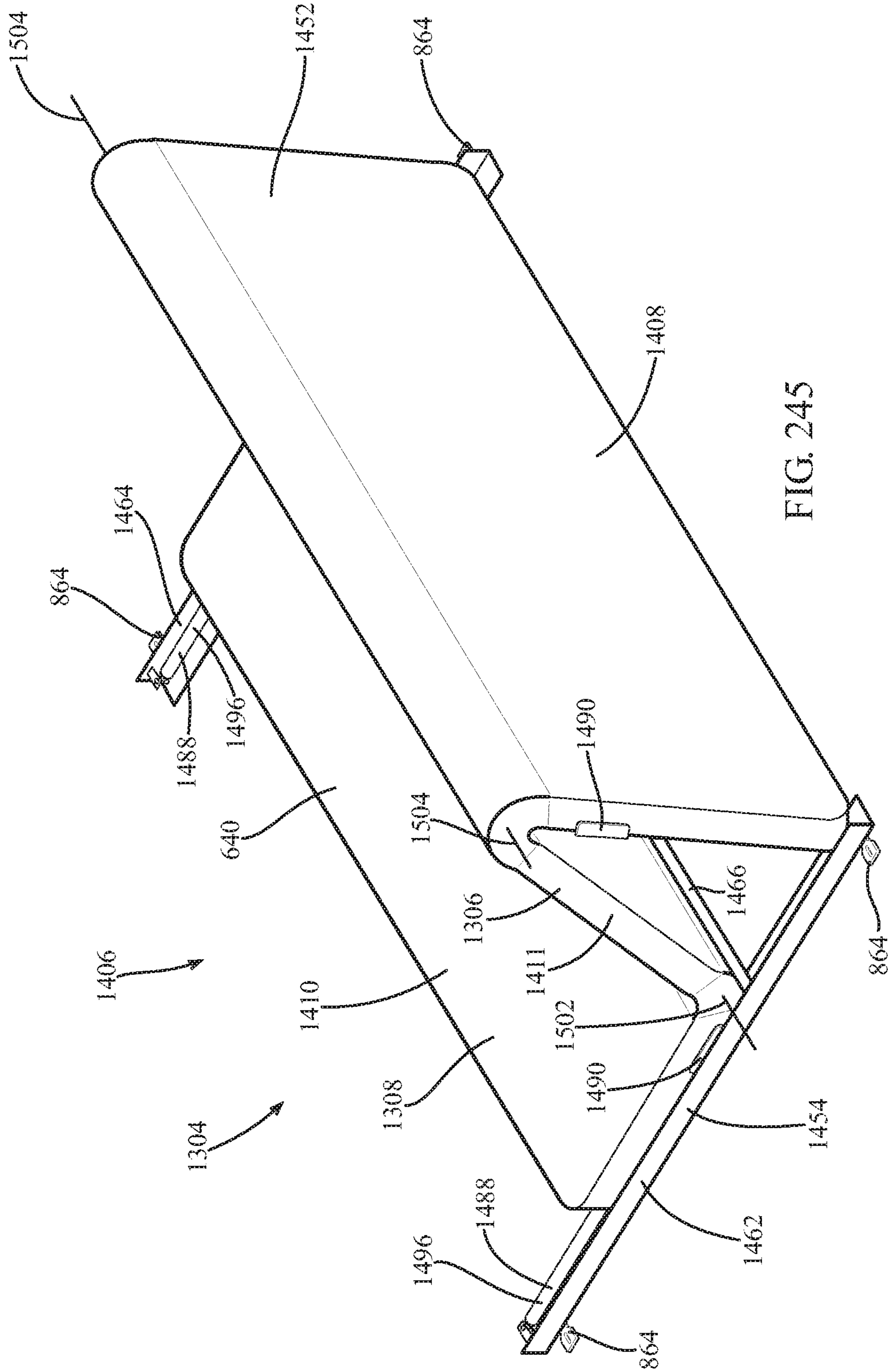

FIG. 245 shows a perspective view of one embodiment of a bed that can move between a sleeping configuration and a seating configuration where the bed is in the seating configuration and facing one direction.

Figure 246:
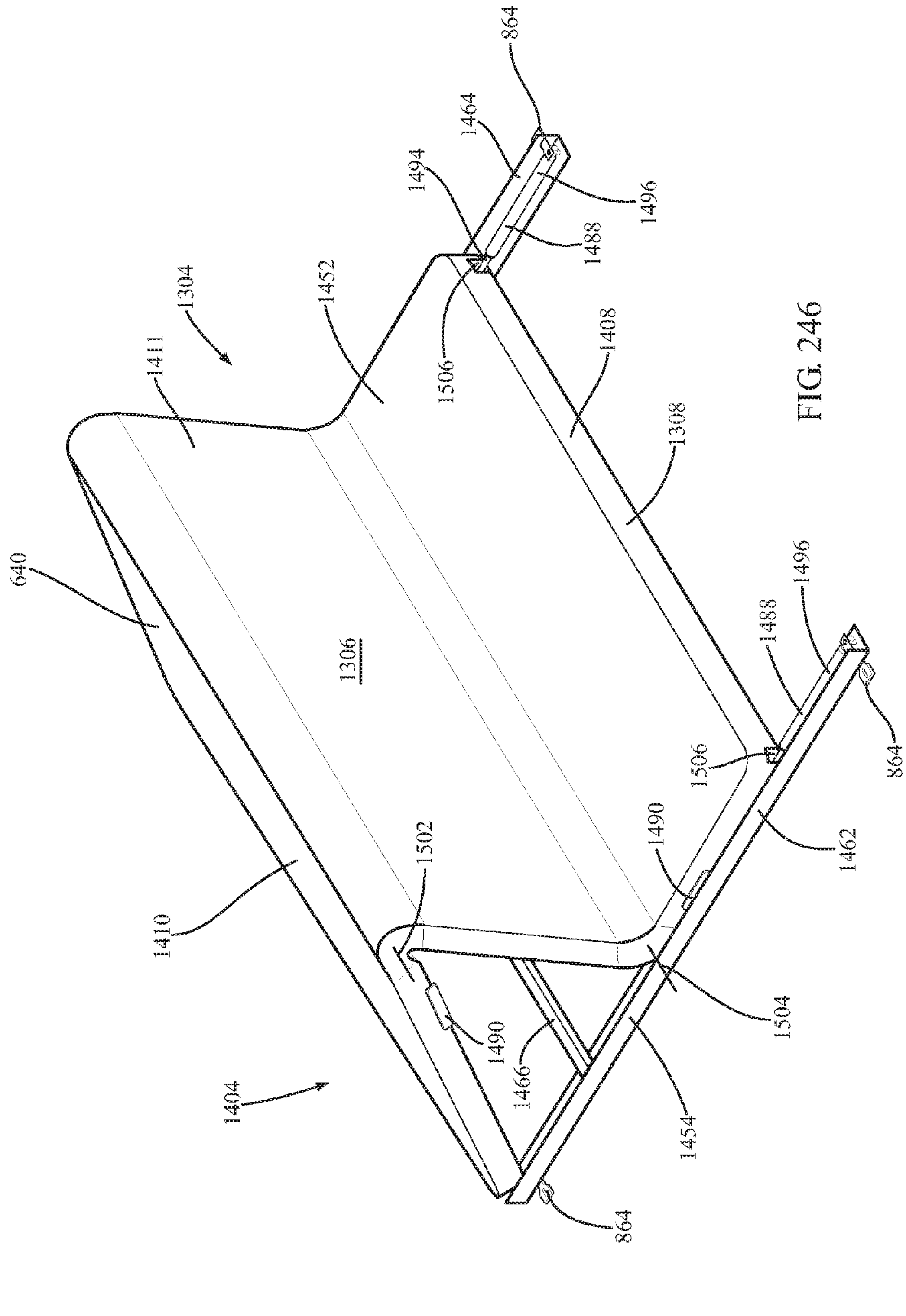

FIG. 246 shows a perspective view of the bed that can move between a sleeping configuration and a seating configuration where the bed is in the seating configuration and facing an opposite direction to that shown in FIG. 245.

Figure 247:
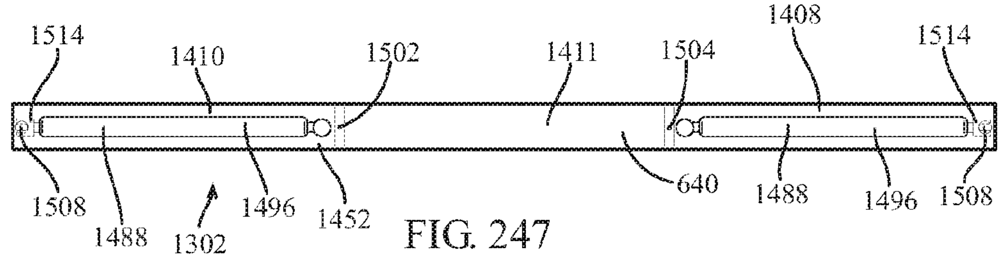
Figure 248:
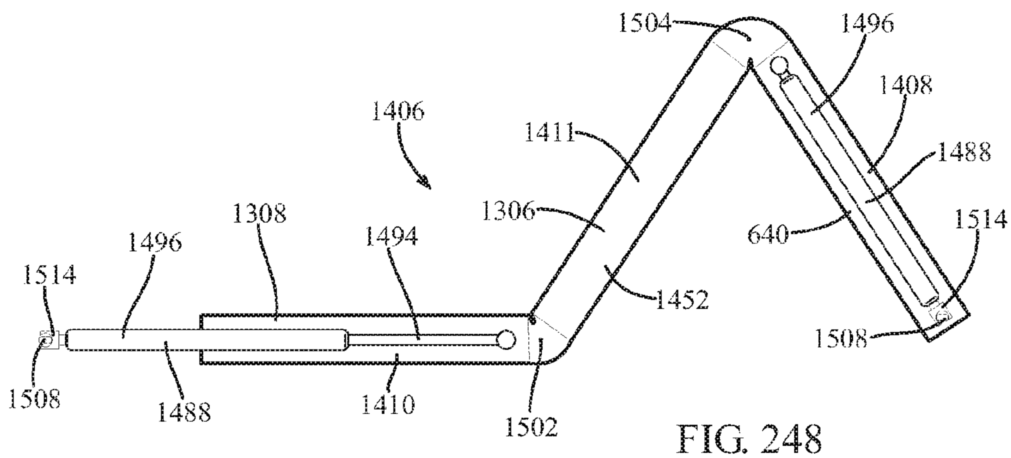
Figure 249:
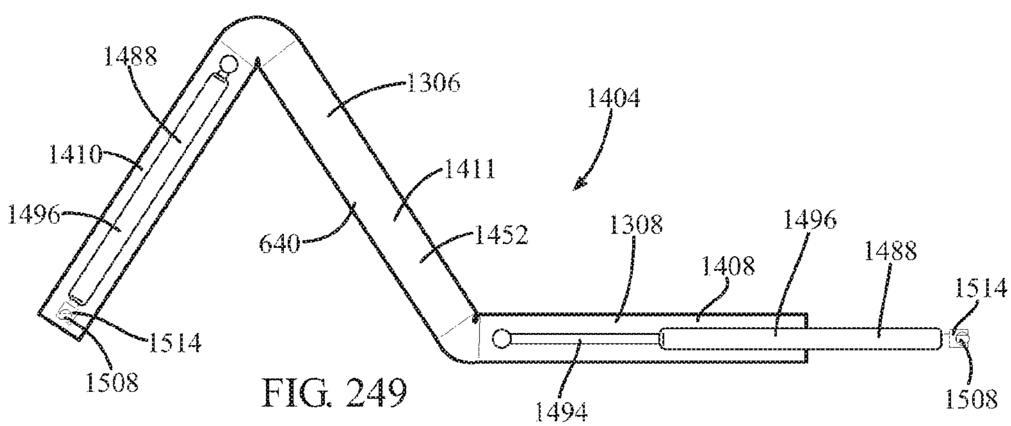

FIGS. 247-249 show side views of the bed that can move between a sleeping configuration and a seating configuration.

Figure 250:
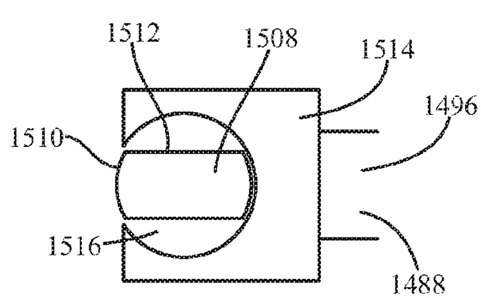
Figure 251:
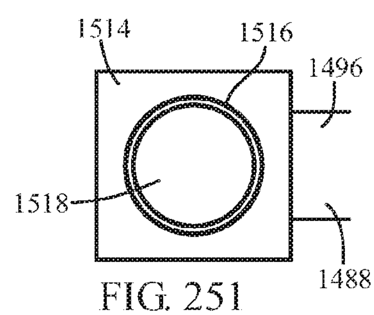

FIGS. 250-251 show side views of various embodiments for coupling the movable mattress to the stationary bed frame.

Figure 252:
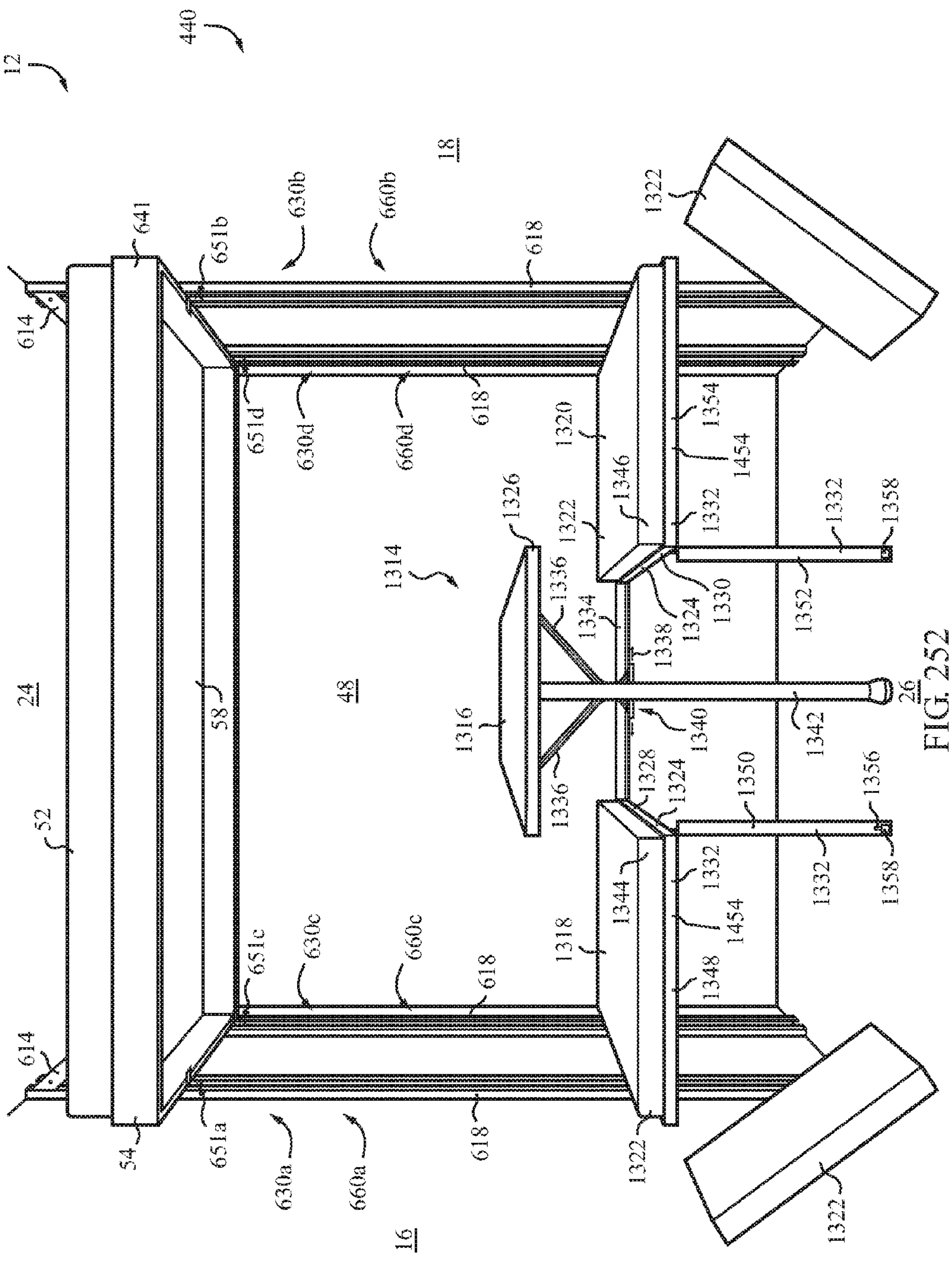

FIG. 252 shows a perspective view of another embodiment of a system which may be used to vertically move one or more beds where one of the beds can move between a sleeping configuration and a dining configuration.

Figure 253:
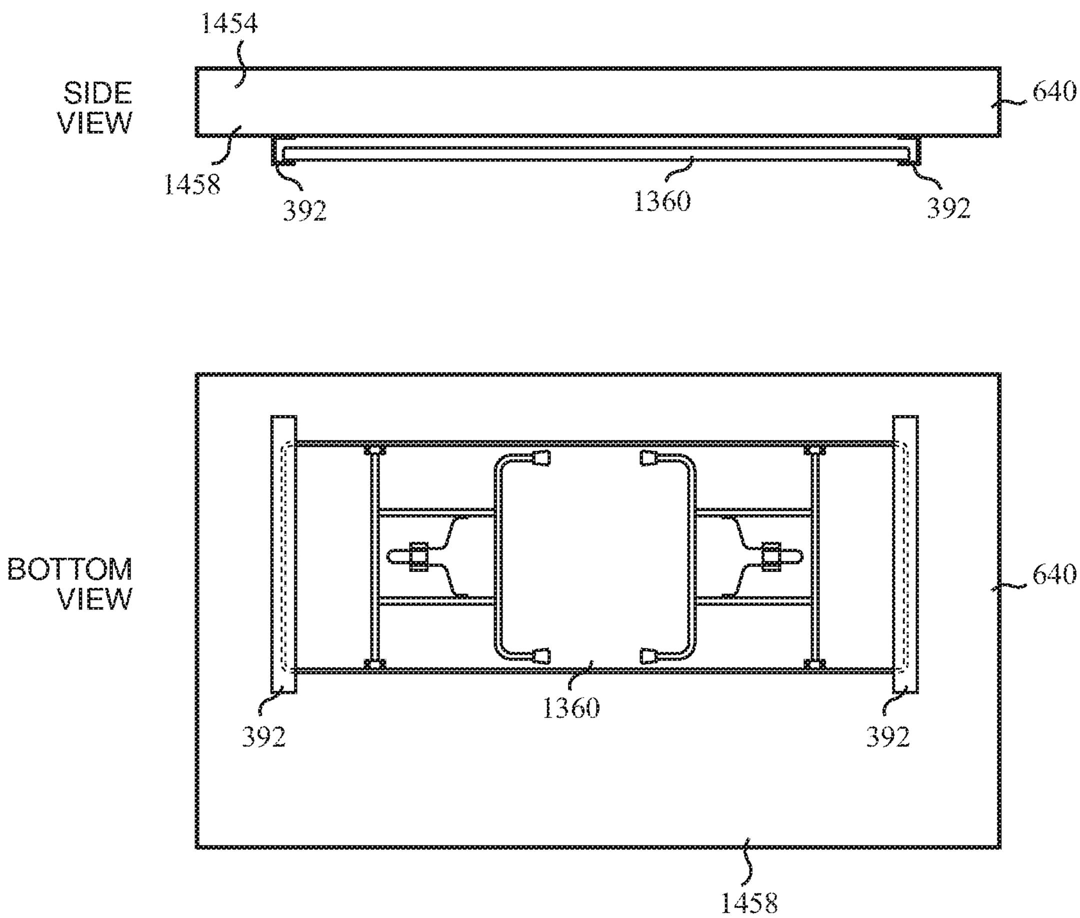

FIG. 253 shows a bottom view and side view of another embodiment of a bed which may be moved vertically with a table stowed underneath the bed.

Figure 254:
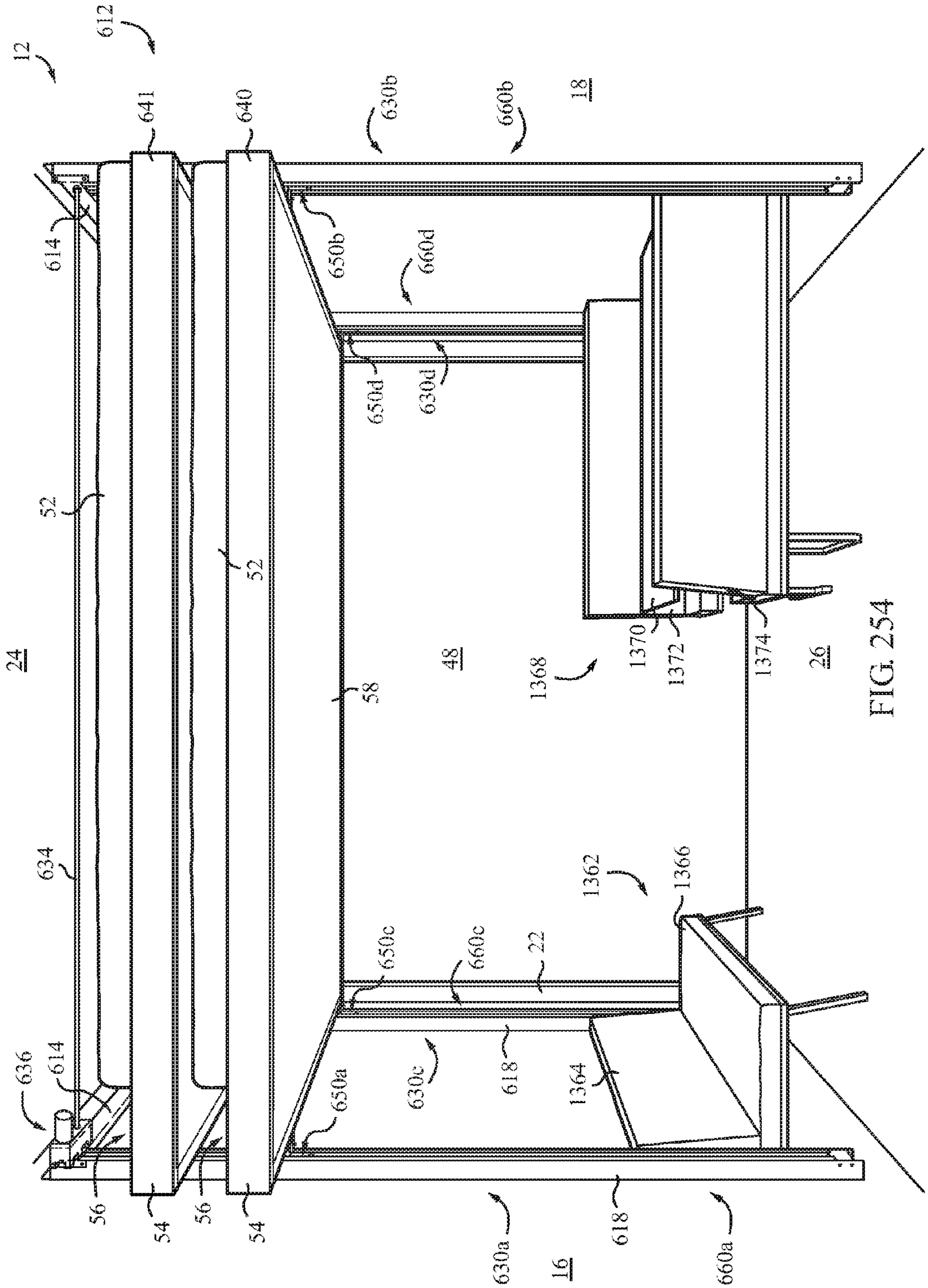

FIG. 254 shows a perspective view of another embodiment of a system which may be used to vertically move one or more beds where the beds are in the stowed configuration and a seating unit and a dining unit are folded down from the walls beneath the beds.

Figure 255:
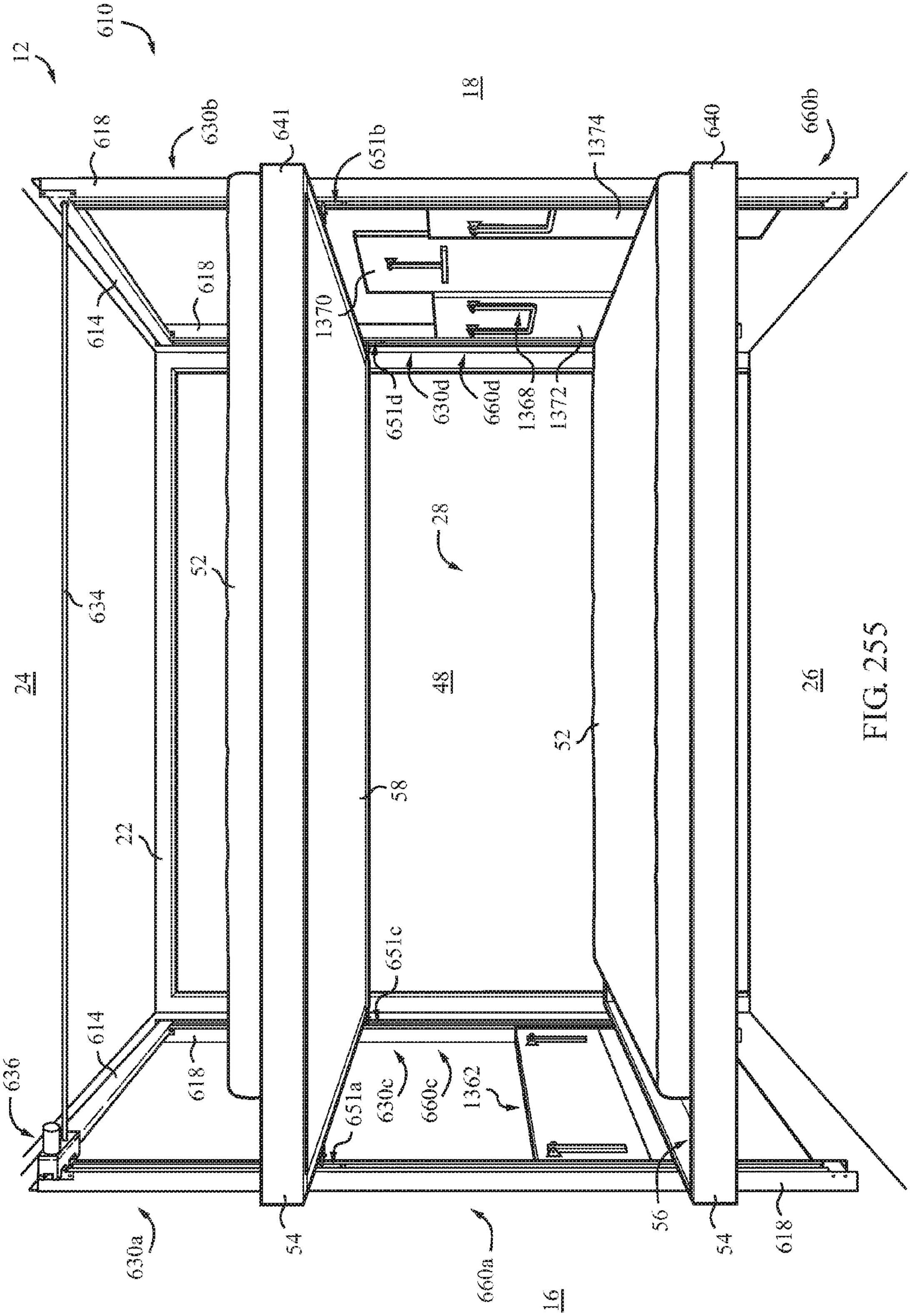

FIG. 255 shows a perspective view of another embodiment of a system which may be used to vertically move one or more beds where the beds are in the use configuration and a seating unit and a dining unit are folded up against the walls with one of the beds being positioned between the seating unit and the dining unit.

Figure 256:
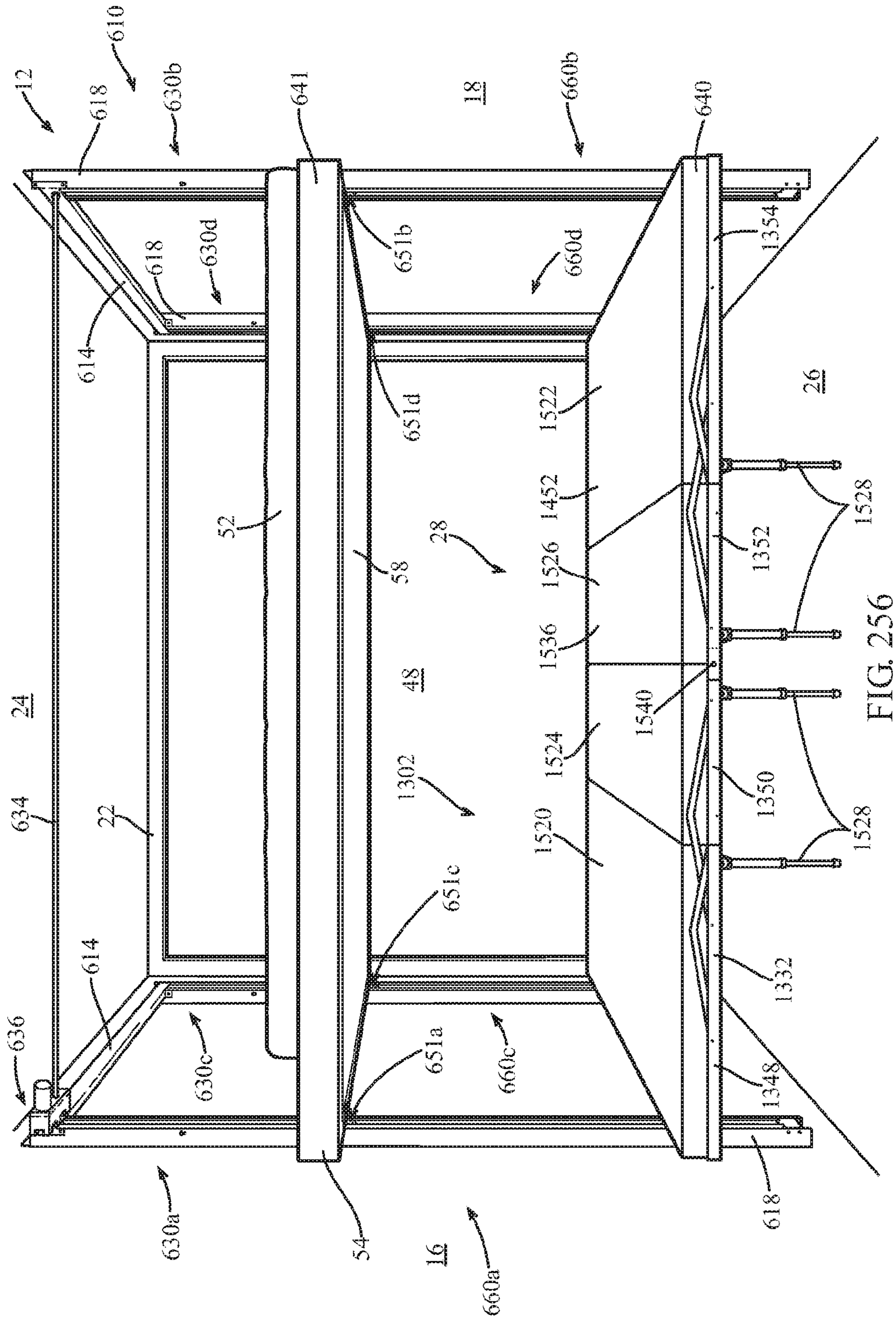

FIG. 256 shows a perspective view of another embodiment of a system which may be used to vertically move one or more beds where the beds are in the use configuration and a lower bed can be moved between a sleeping configuration and a seating configuration where the lower bed forms two opposed seating units.

Figure 257:
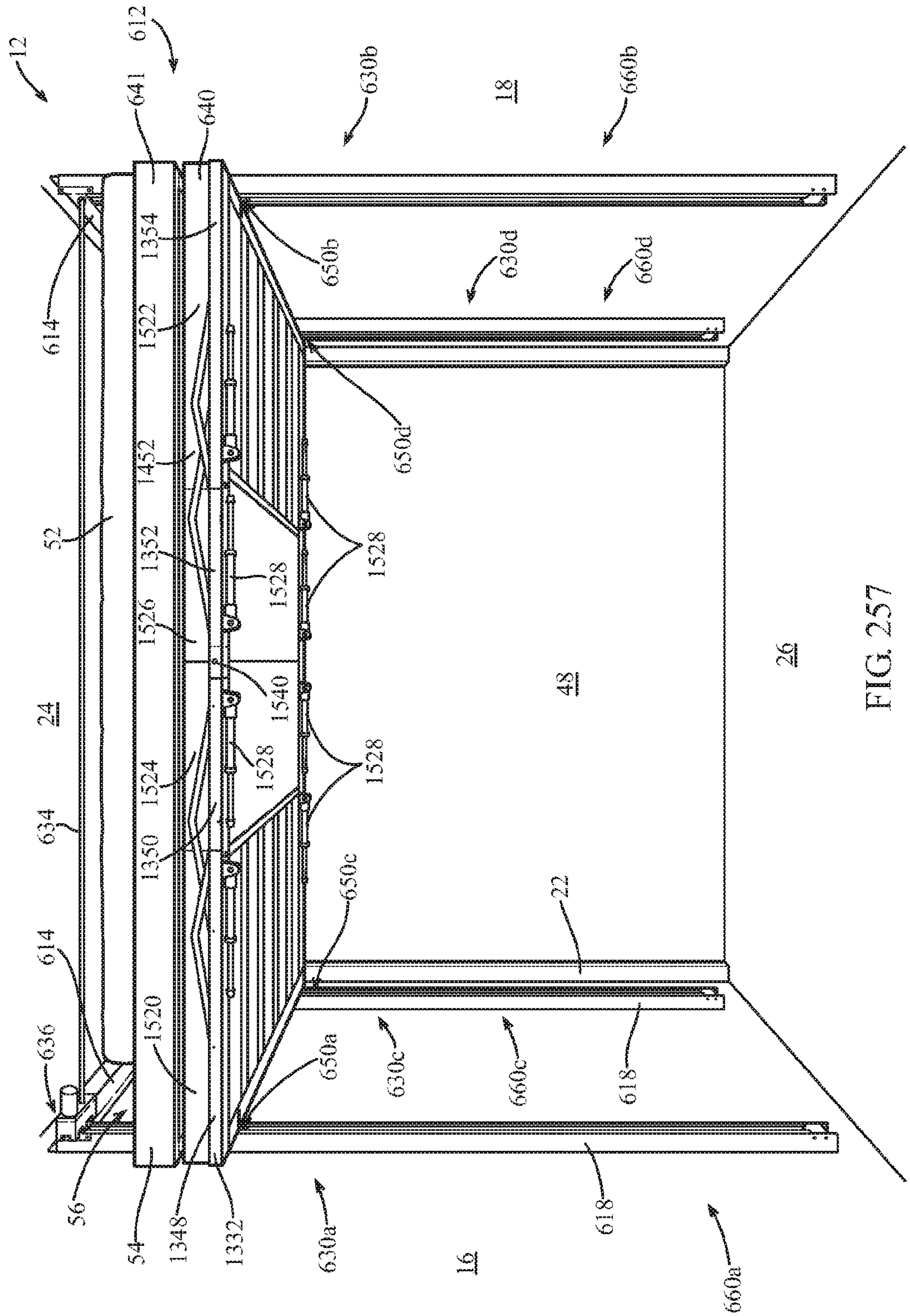

FIG. 257 shows a perspective view of the system which may be used to vertically move one or more beds where the beds are in the stowed configuration.

Figure 258:
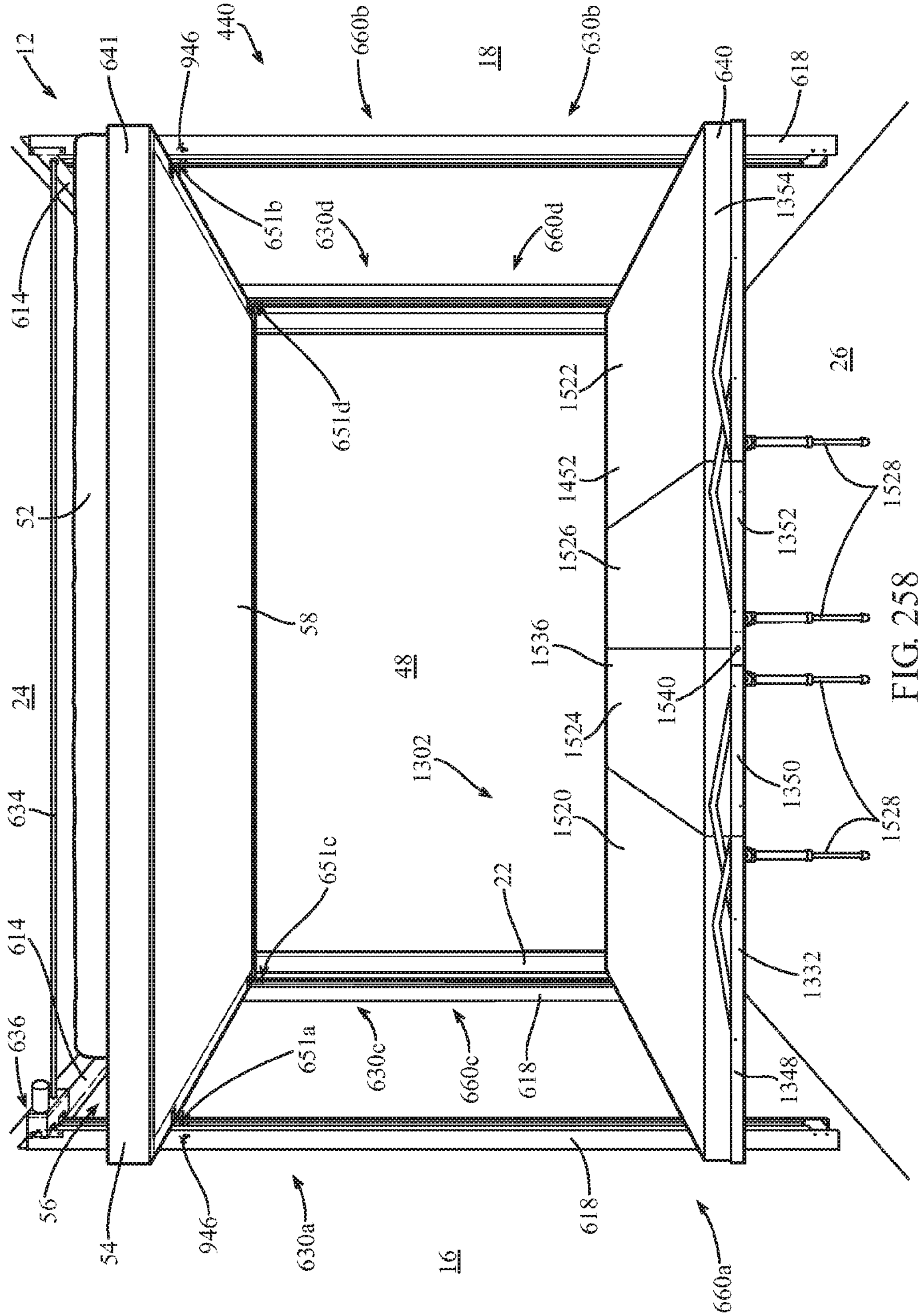

FIG. 258 shows a perspective view of the system which may be used to vertically move one or more beds where the upper bed is in a stowed position and the lower bed is in a use position.

Figure 259:
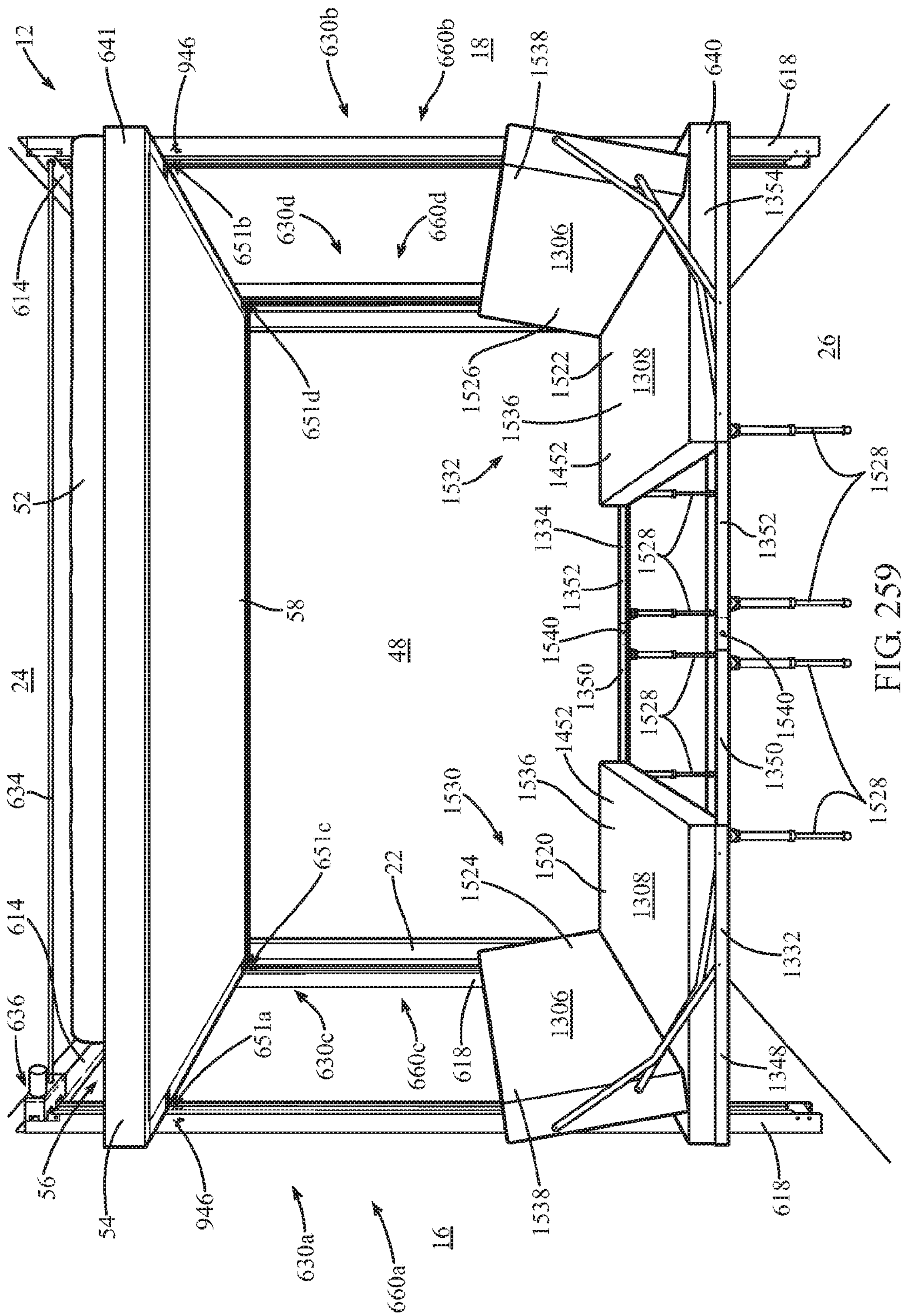
Figure 260:
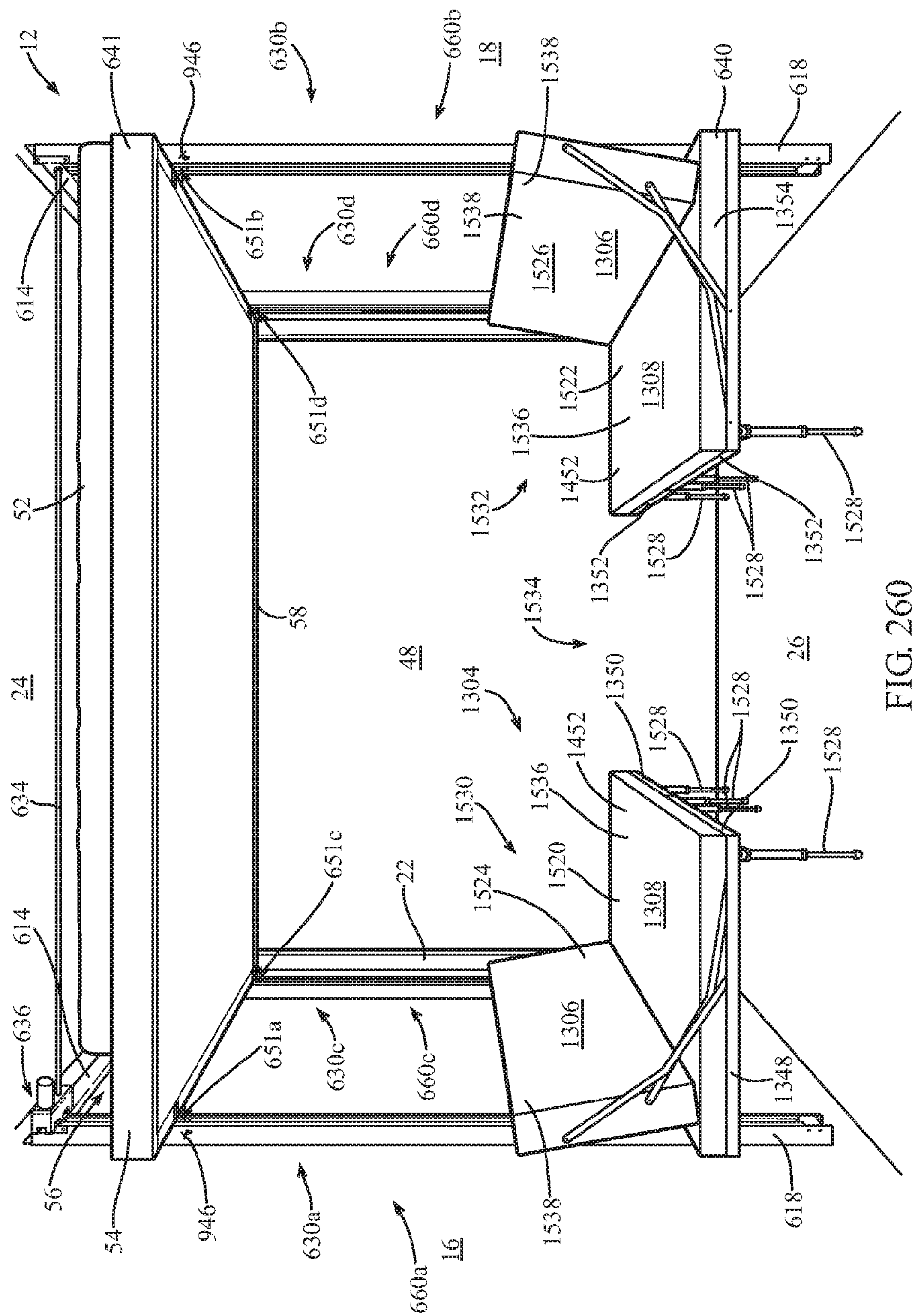

FIGS. 259-260 show perspective views of the system which may be used to vertically move one or more beds where the upper bed is in a stowed position and the lower bed is in a seating configuration.

Figure 261:
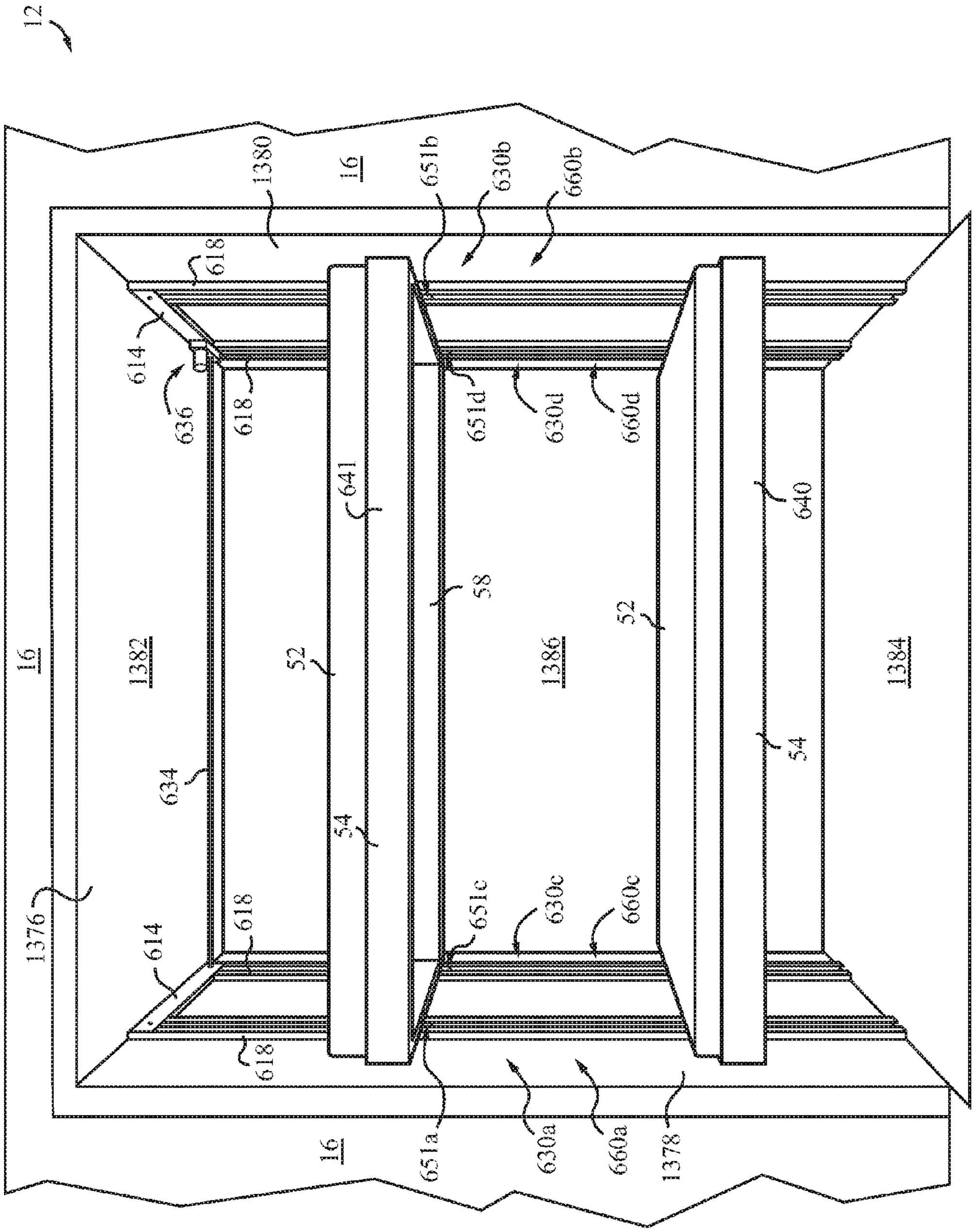

FIG. 261 shows a perspective view of another embodiment of a system which may be used to vertically move one or more beds where the system is coupled to a slide-out compartment.

Figure 262:
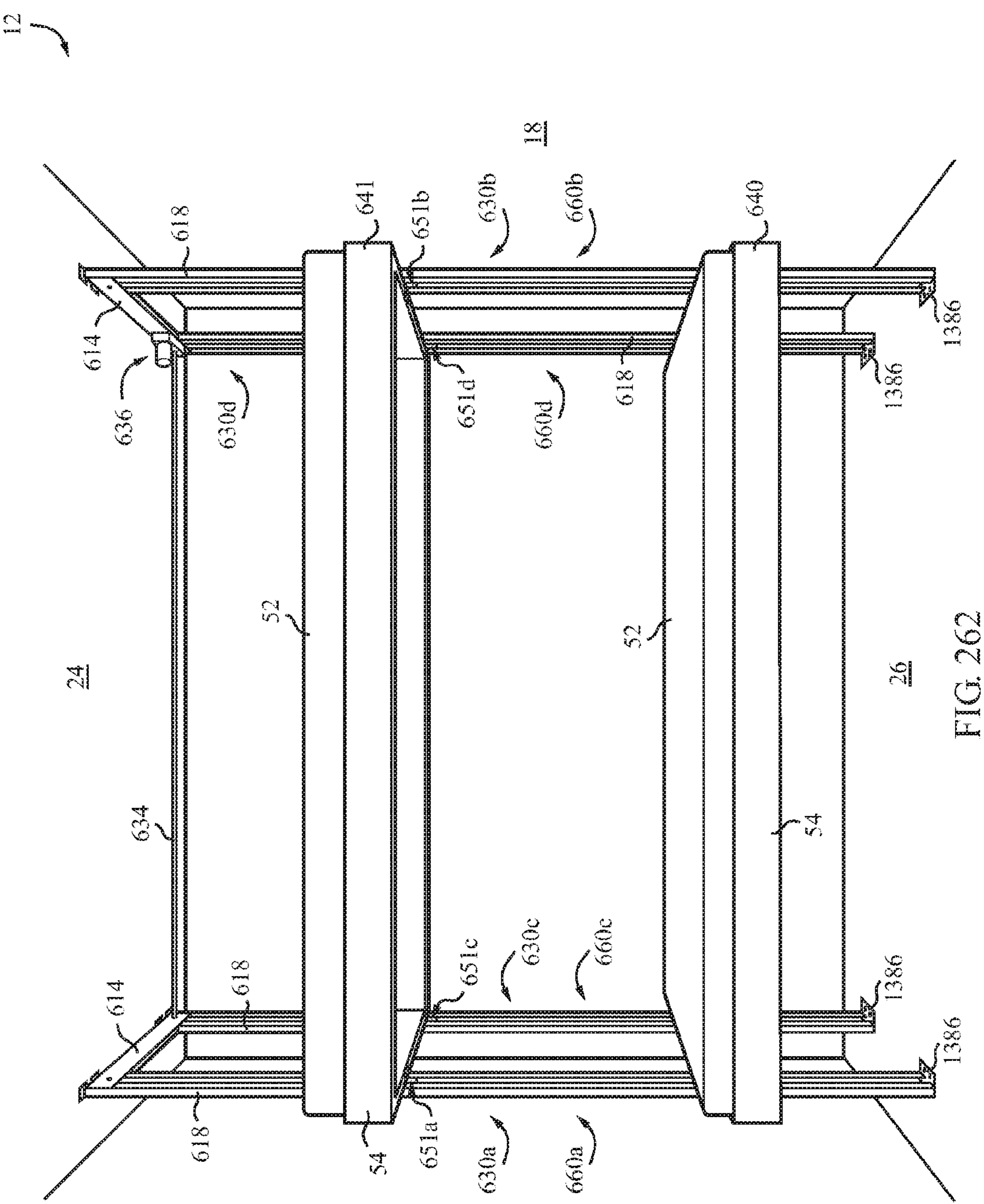

FIG. 262 shows a perspective view of another embodiment of a system which may be used to vertically move one or more beds where the system is coupled to a floor and/or a ceiling of a structure.

Figure 263:
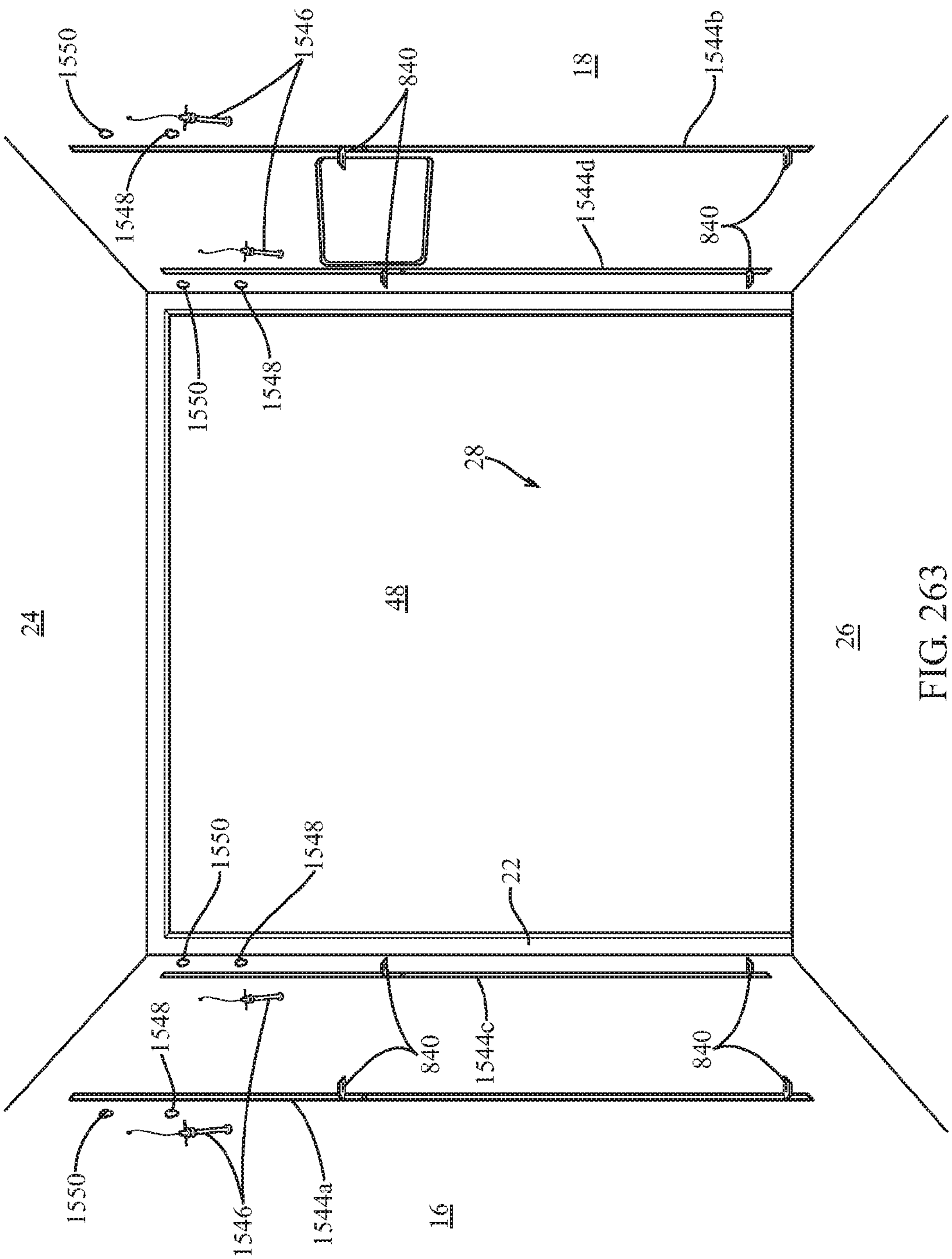

FIG. 263 shows a perspective view of one embodiment of a structure that includes a system for vertically moving one or more beds where the system is built into the walls of the structure.

Figure 264:
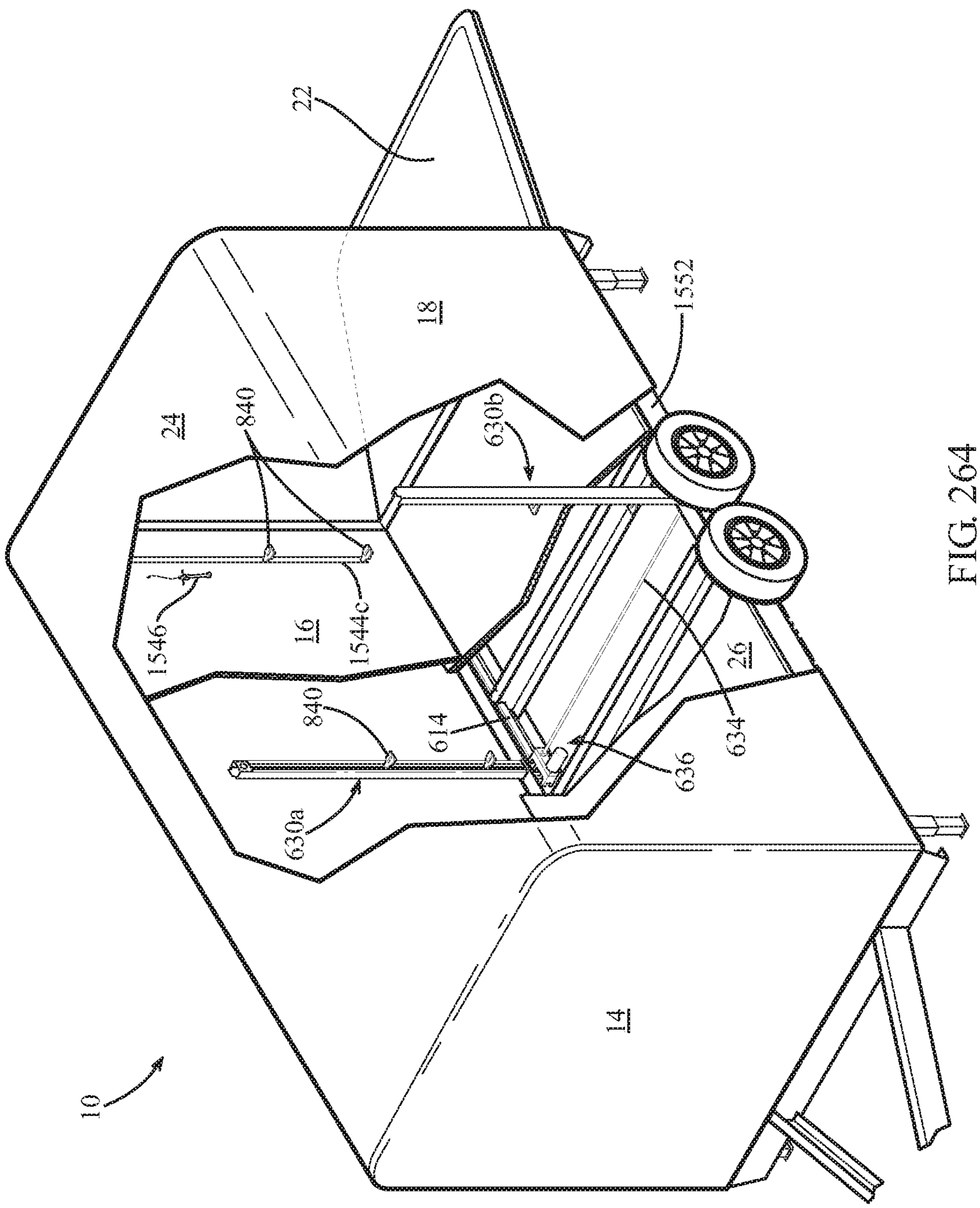

FIG. 264 shows a cut-away perspective view of one embodiment of a toy hauler that includes a system for vertically moving one or more beds where the system is built into the walls of the toy hauler and the motor is mounted underneath the floor.

Figure 265:
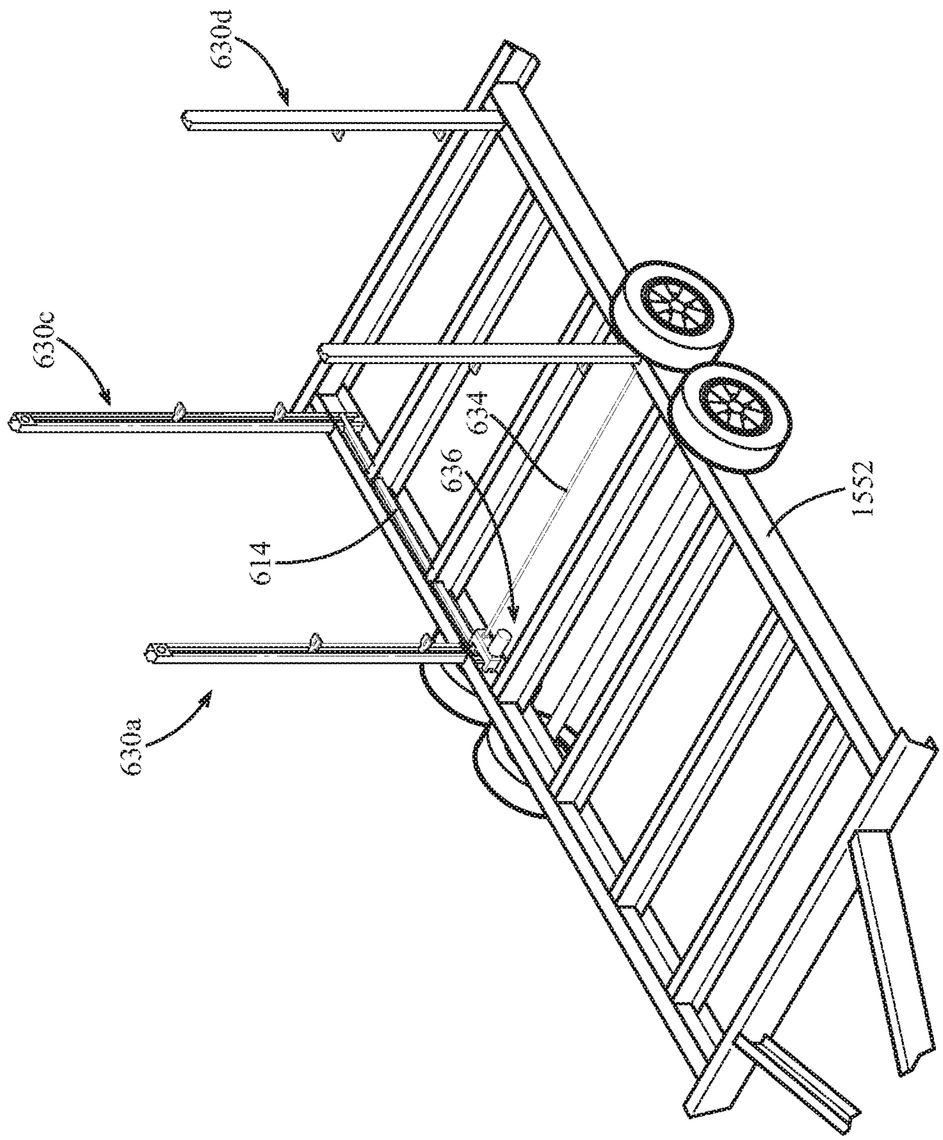

FIG. 265 shows a perspective view of the toy hauler with the walls and ceiling removed to show the system for vertically moving one or more beds that is built into the walls of the toy hauler and has the motor mounted underneath the floor.

Figure 266:
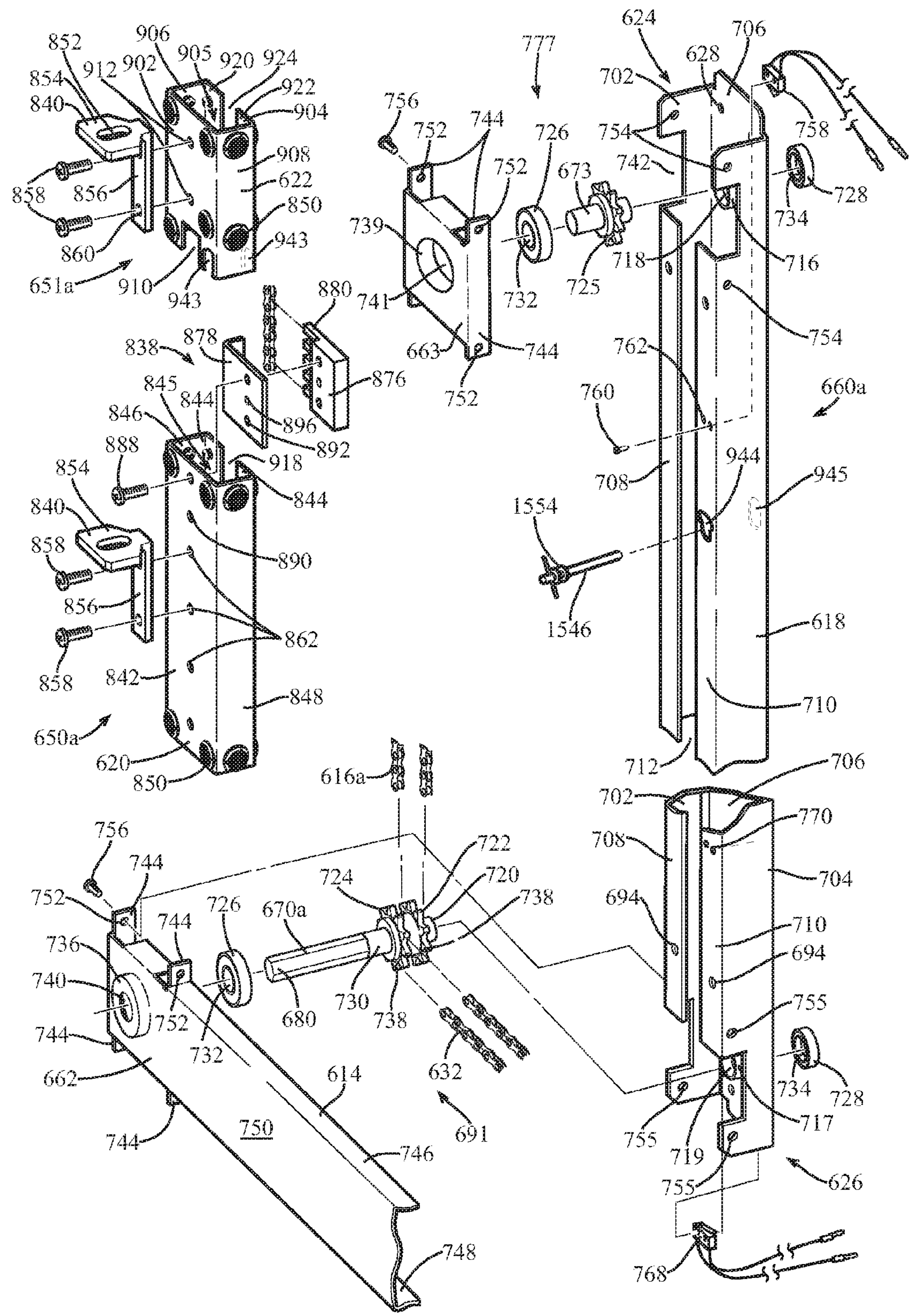

FIG. 266 shows an exploded perspective view of a lifting assembly that may be built into the walls of the toy hauler.

Figure 267:
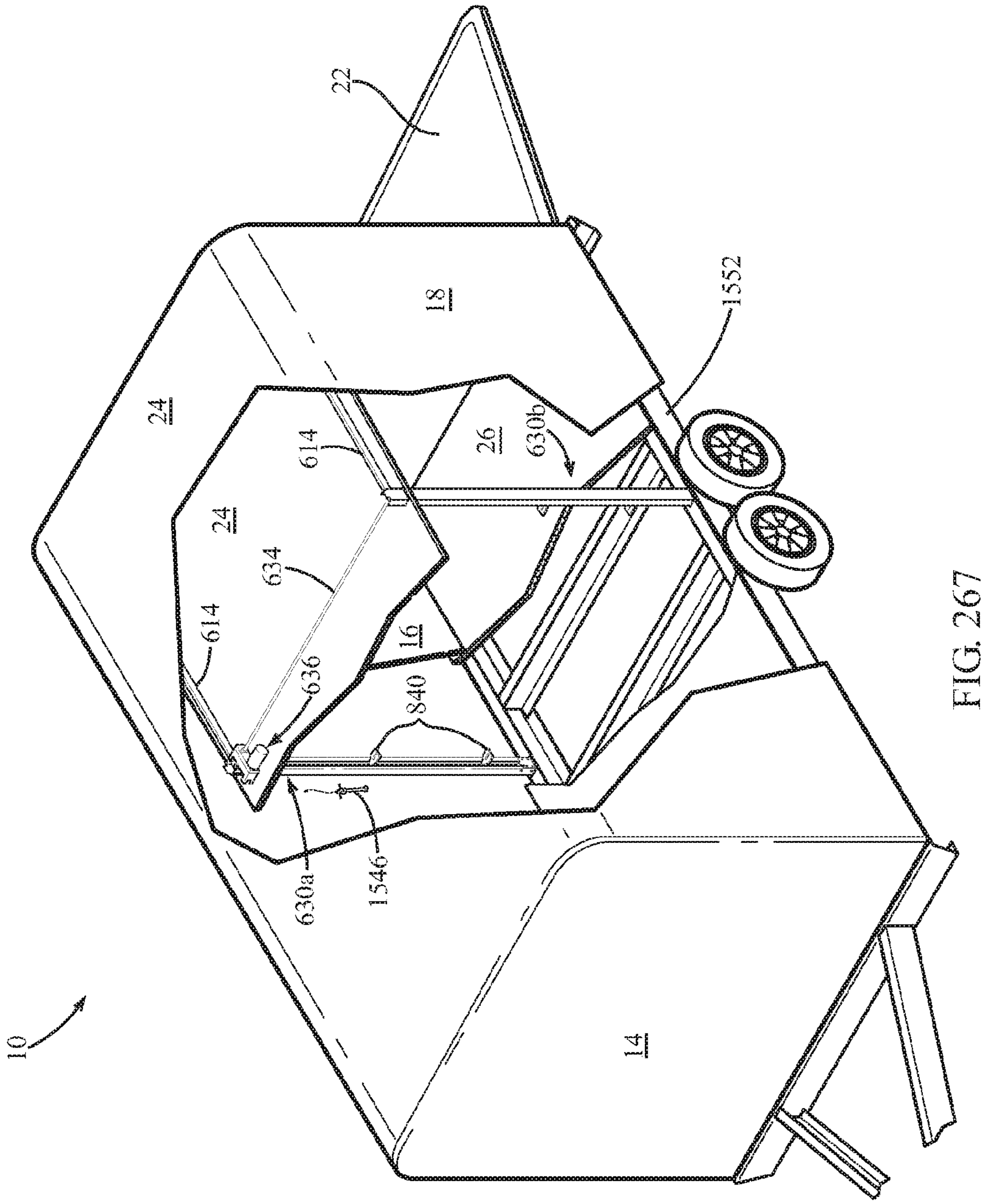

FIG. 267 shows a cut-away perspective view of one embodiment of a toy hauler that includes a system for vertically moving one or more beds where the system is built into the walls of the toy hauler and the motor is mounted in the ceiling.

Figure 268:
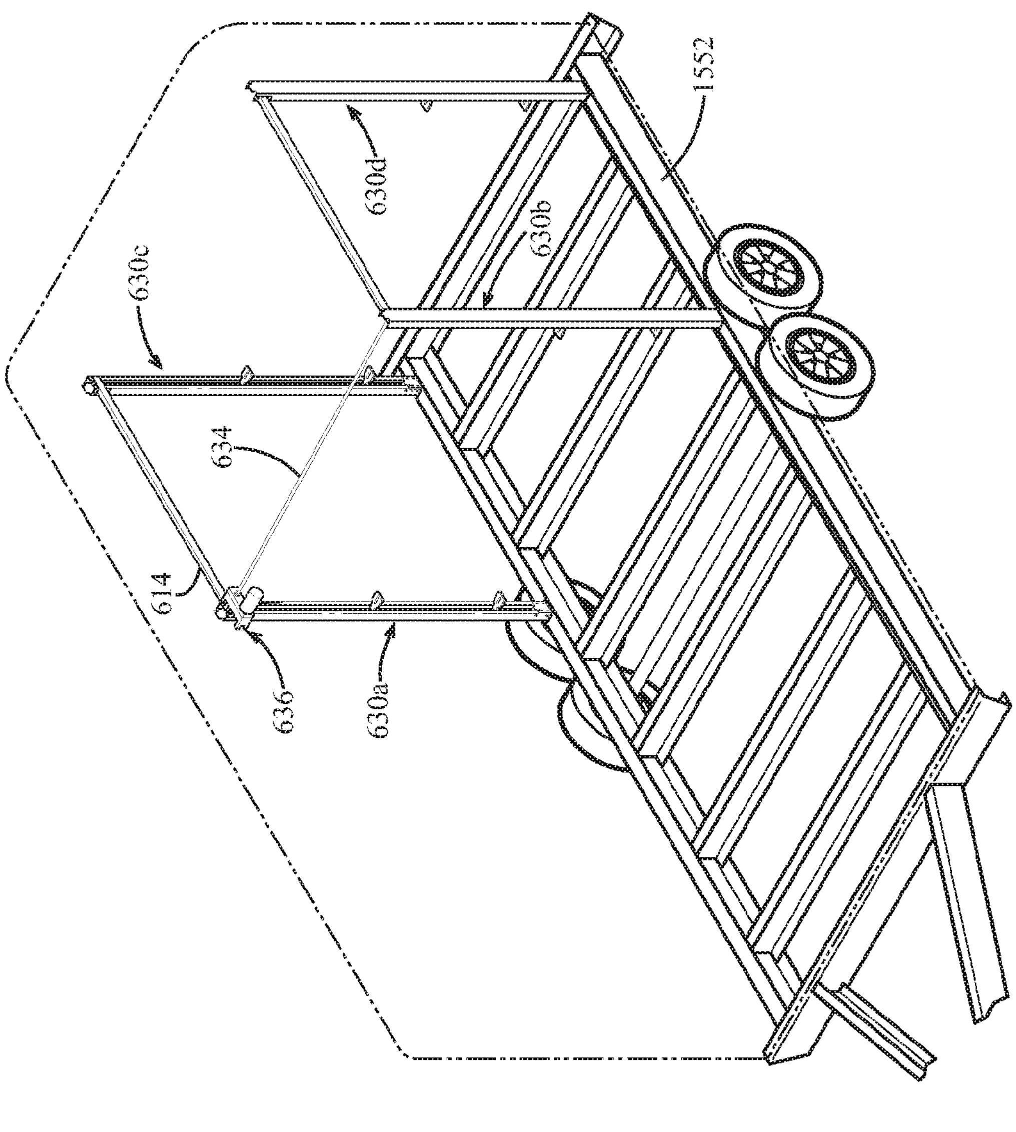

FIG. 268 shows a perspective view of the toy hauler with the walls and ceiling removed to show the system for vertically moving one or more beds that is built into the walls of the toy hauler and has the motor mounted in the ceiling.

Figure 269:
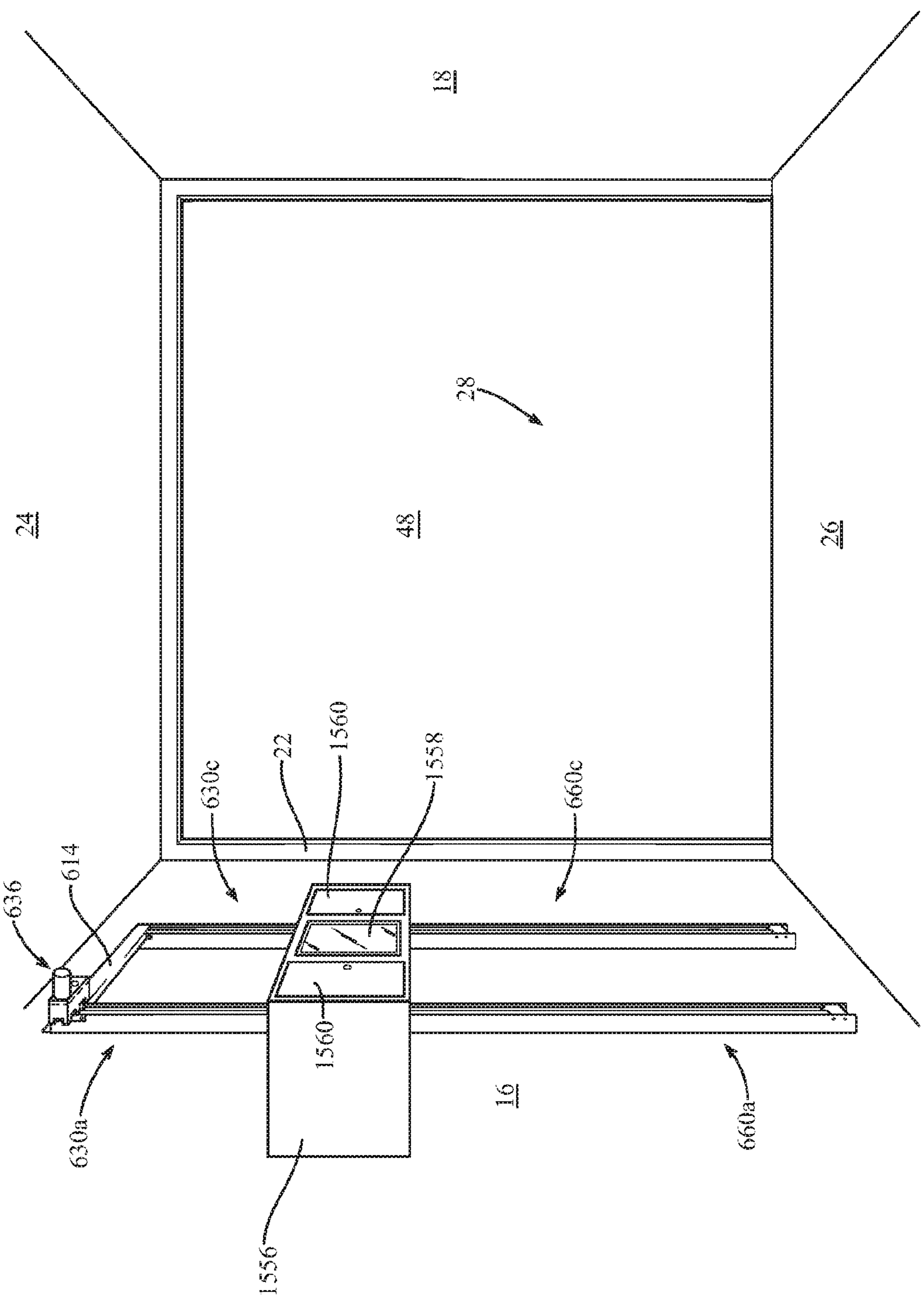

FIG. 269 shows a perspective view of one embodiment of a system which may be used to vertically move wall mounted units (e.g., furniture, appliances, storage units, sink, and so forth) between a stowed configuration and a use configuration, the wall mounted unit being shown in the use configuration.

Figure 270:
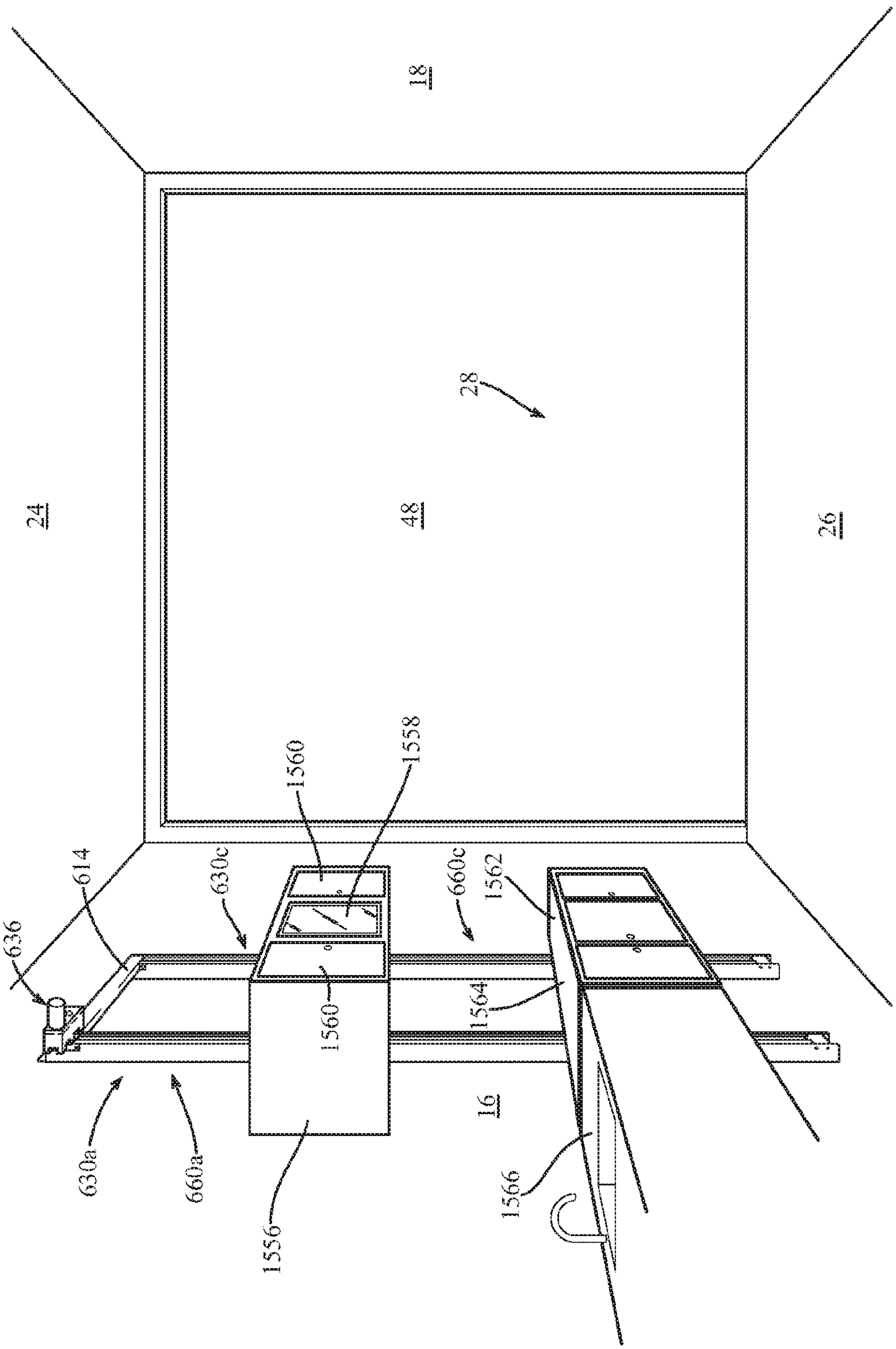
Figure 271:
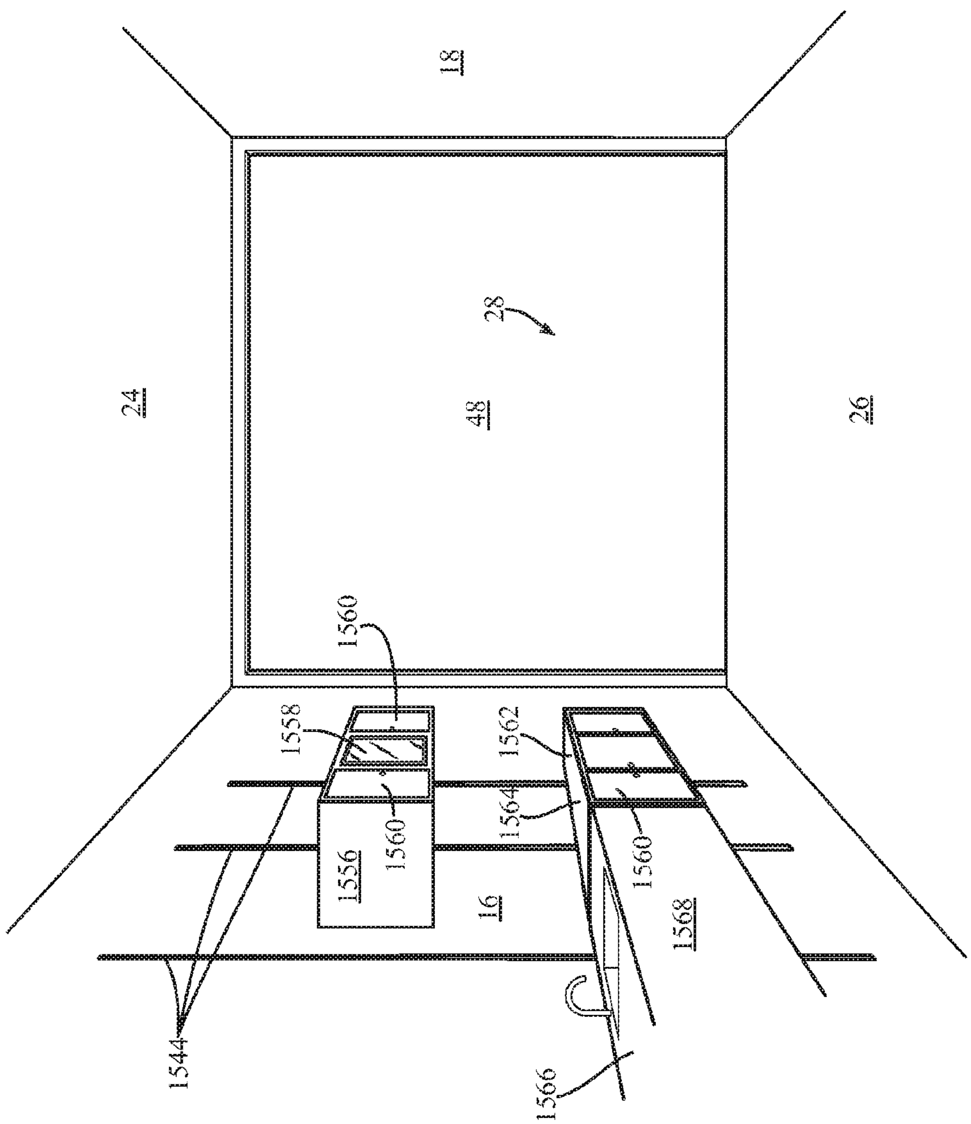

FIGS. 270-271 shows perspective views of various embodiments of a system which may be used to vertically move multiple wall mounted units (e.g., furniture, appliances, storage units, sink, and so forth) between a stowed configuration and a use configuration, the wall mounted units being shown in the use configuration.

Figure 272:
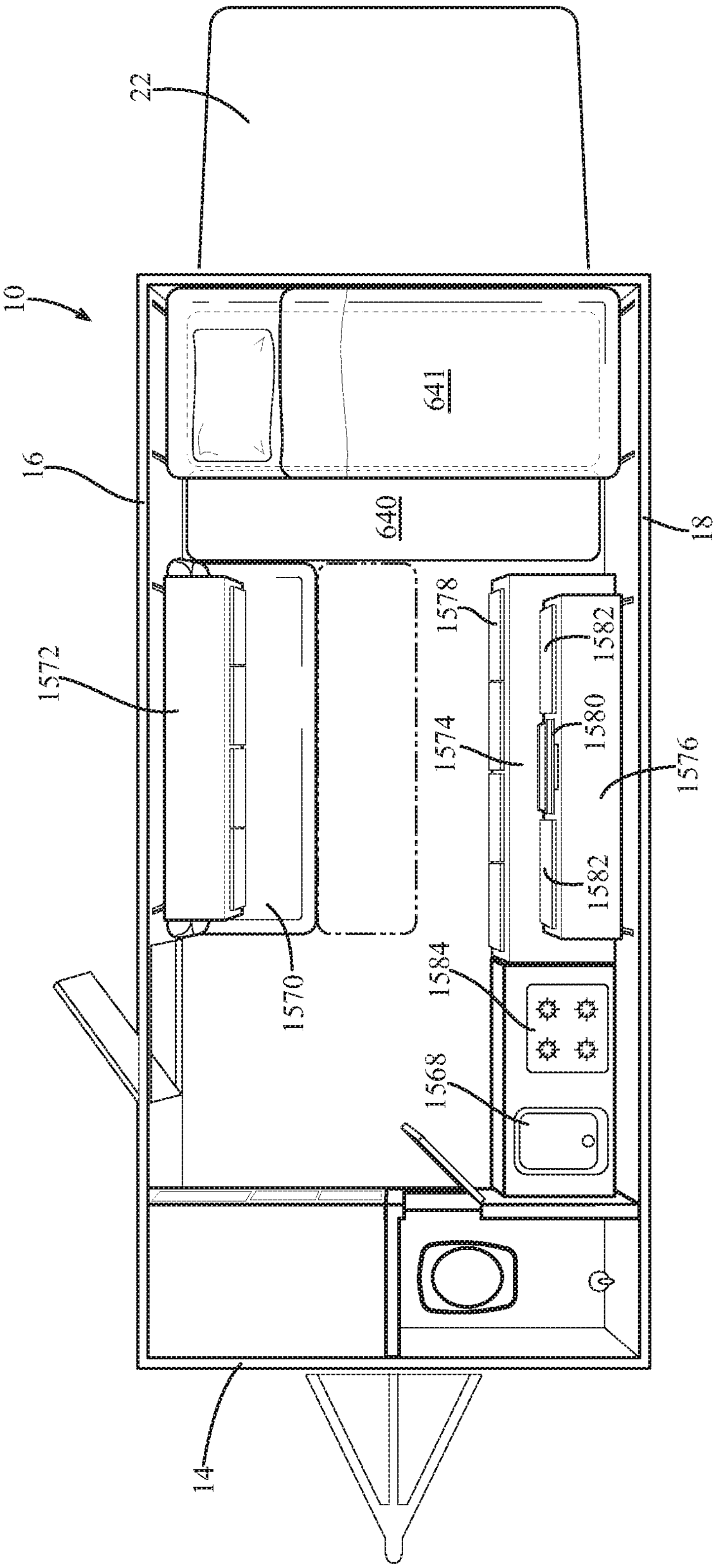

FIG. 272 shows a floor plan of one embodiment of a vehicle that includes multiple items that can move vertically.

Figure 273:
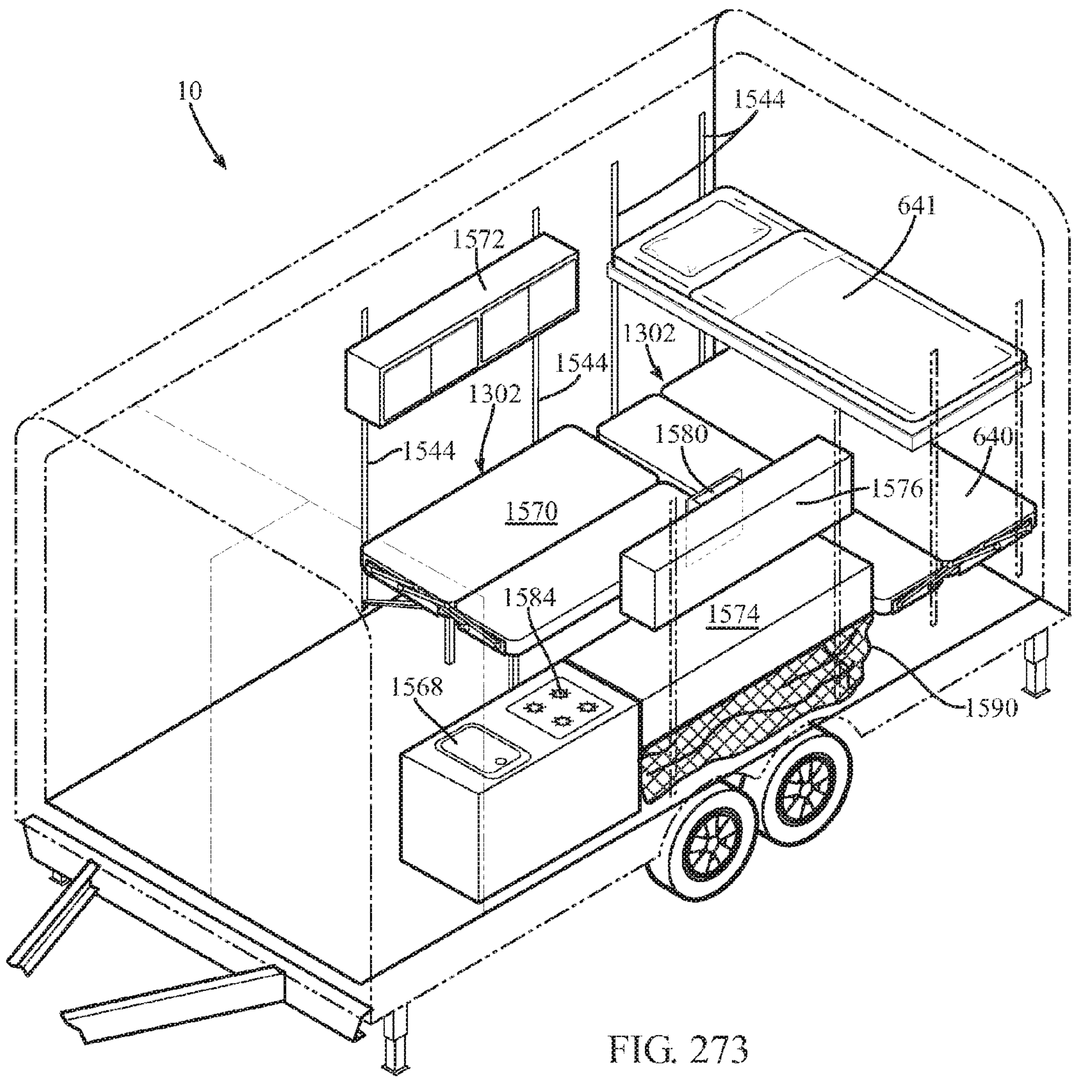

FIG. 273 shows a perspective view of the vehicle with the items being lowered in the use configuration and the beds being in the sleeping configuration.

Figure 274:
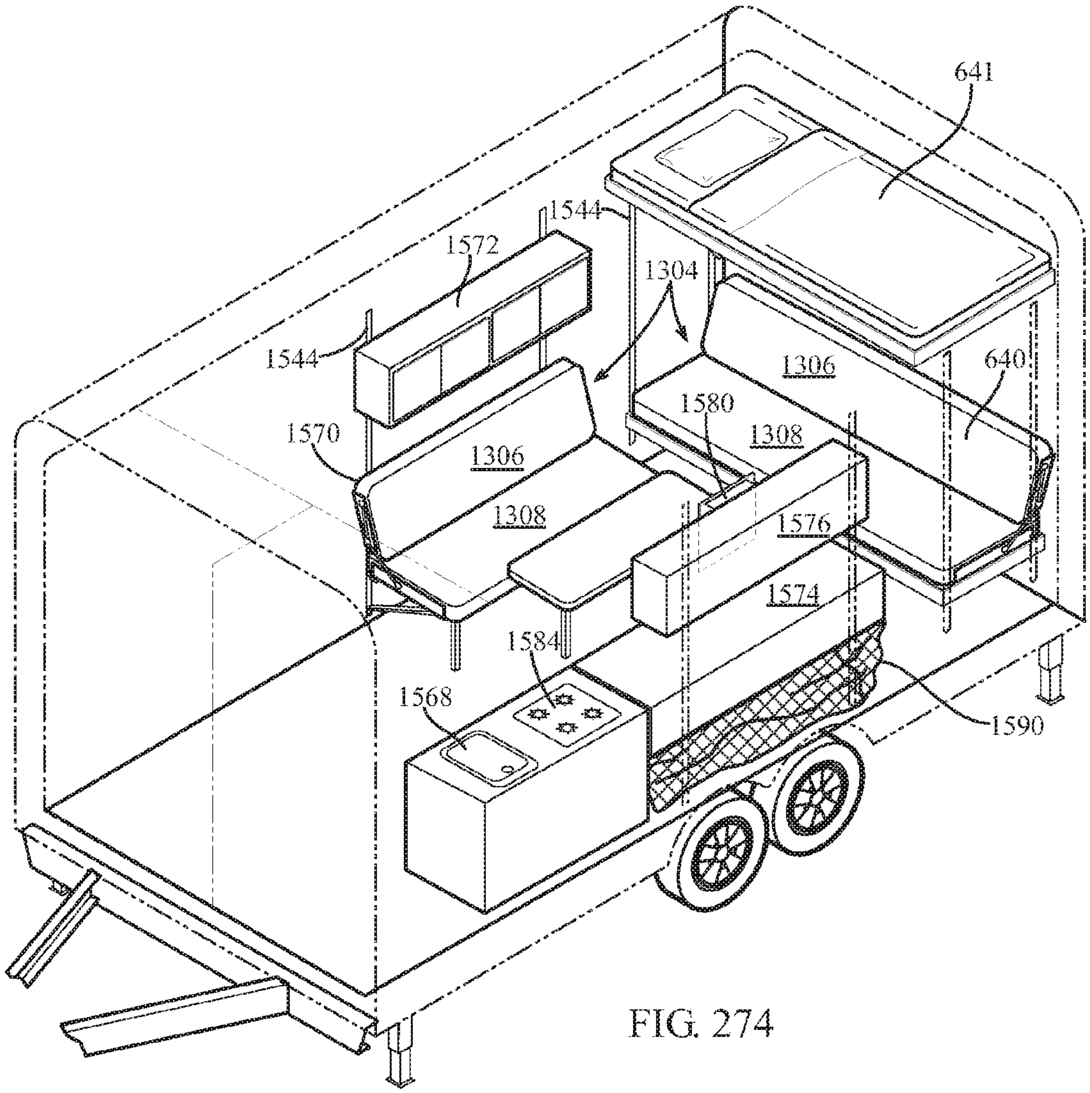

FIG. 274 shows a perspective view of the vehicle with the items being lowered in the use configuration and the beds being in the seating configuration.

Figure 275:
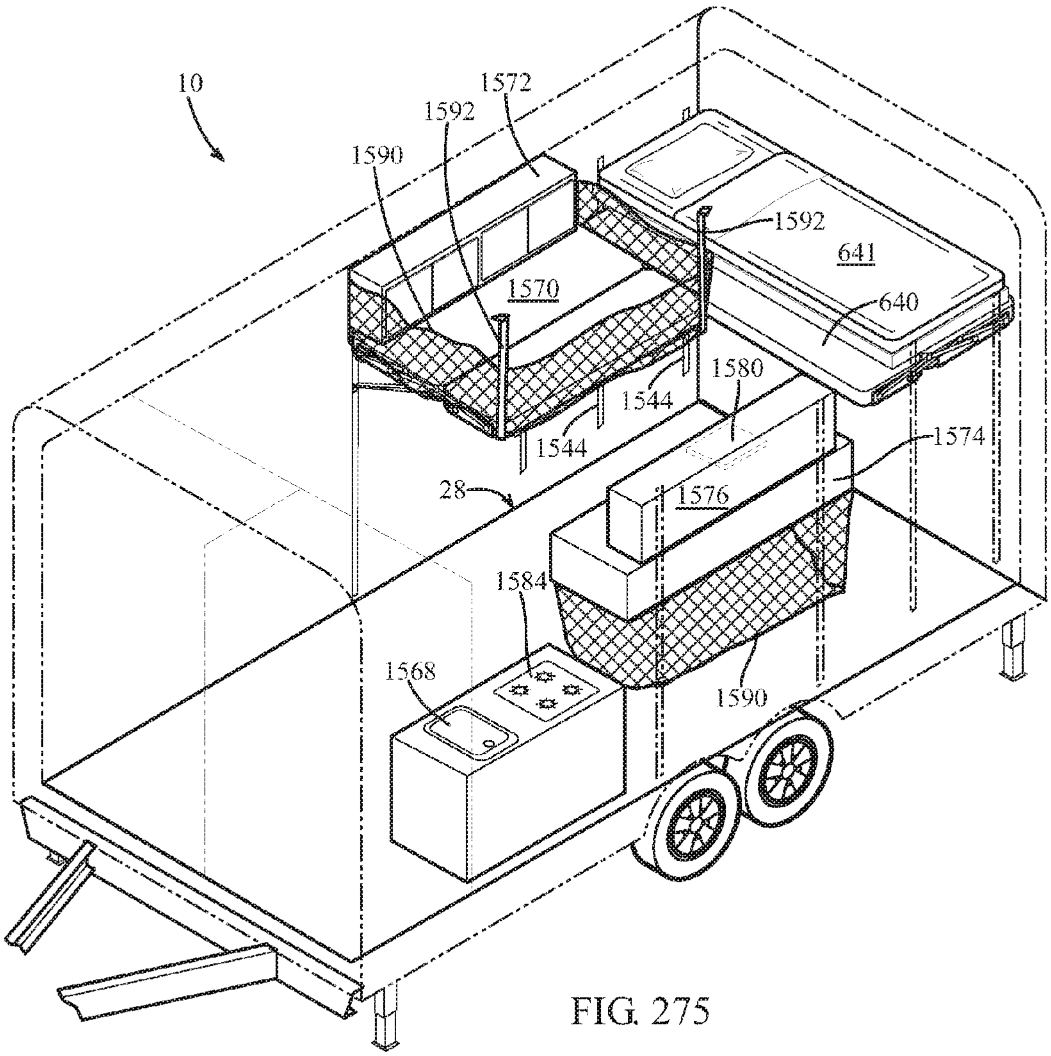

FIG. 275 shows a perspective view of the vehicle with the items being raised in the stowed configuration.

Figure 276:
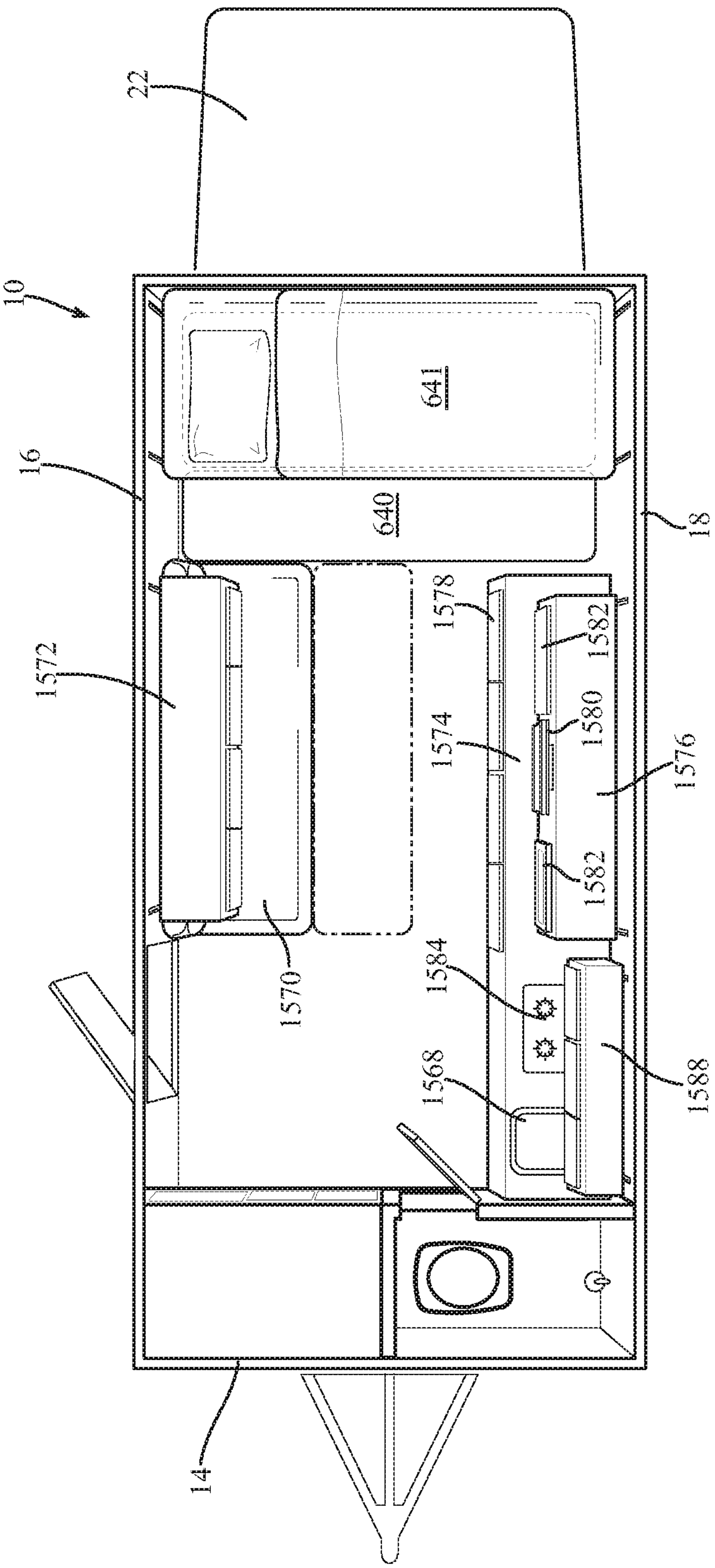

FIG. 276 shows a floor plan of another embodiment of a vehicle that includes multiple items that can move vertically including a sink and/or a stove.

Figure 277:
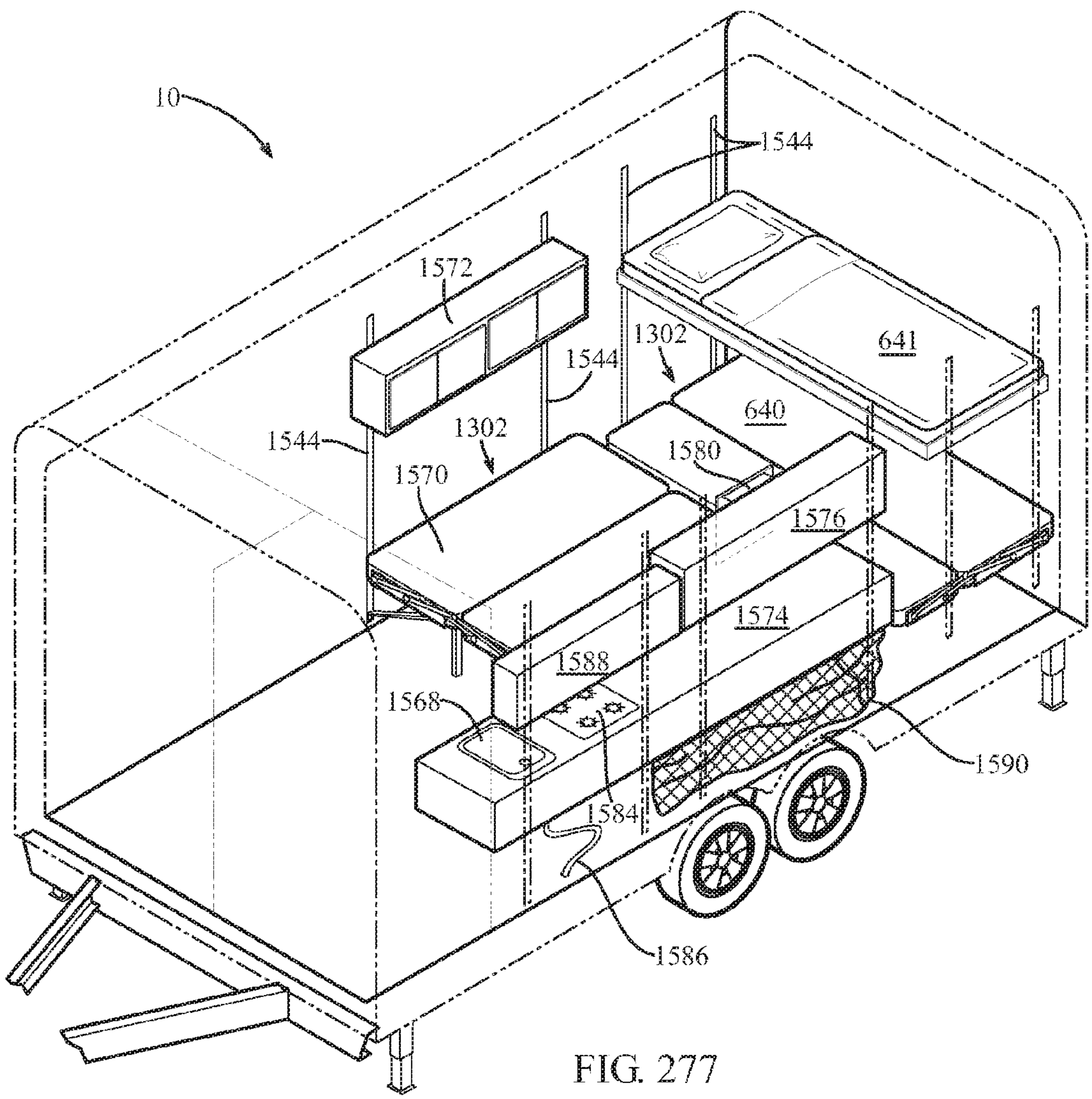

FIG. 277 shows a perspective view of the vehicle with the items being lowered in the use configuration and the beds being in the sleeping configuration.

Figure 278:
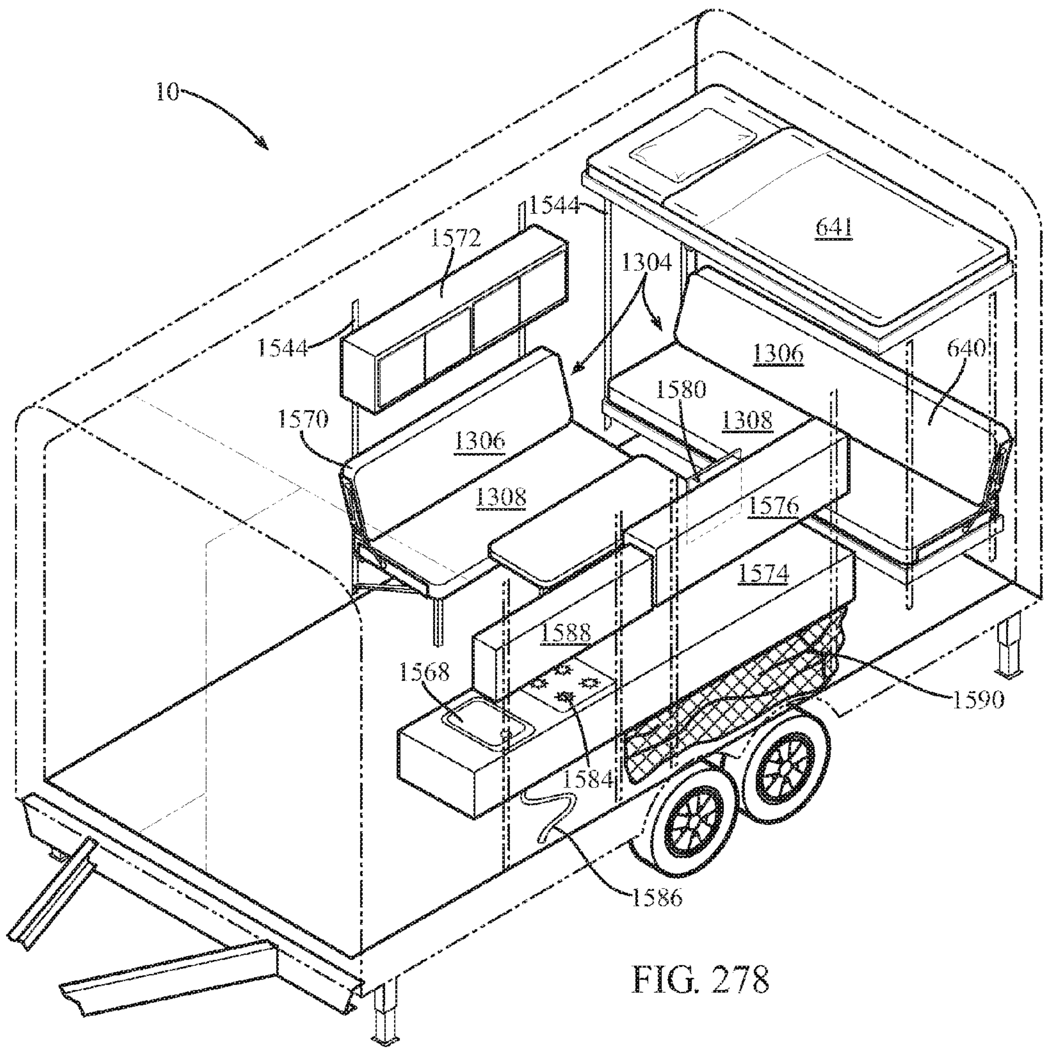

FIG. 278 shows a perspective view of the vehicle with the items being lowered in the use configuration and the beds being in the seating configuration.

Figure 279:
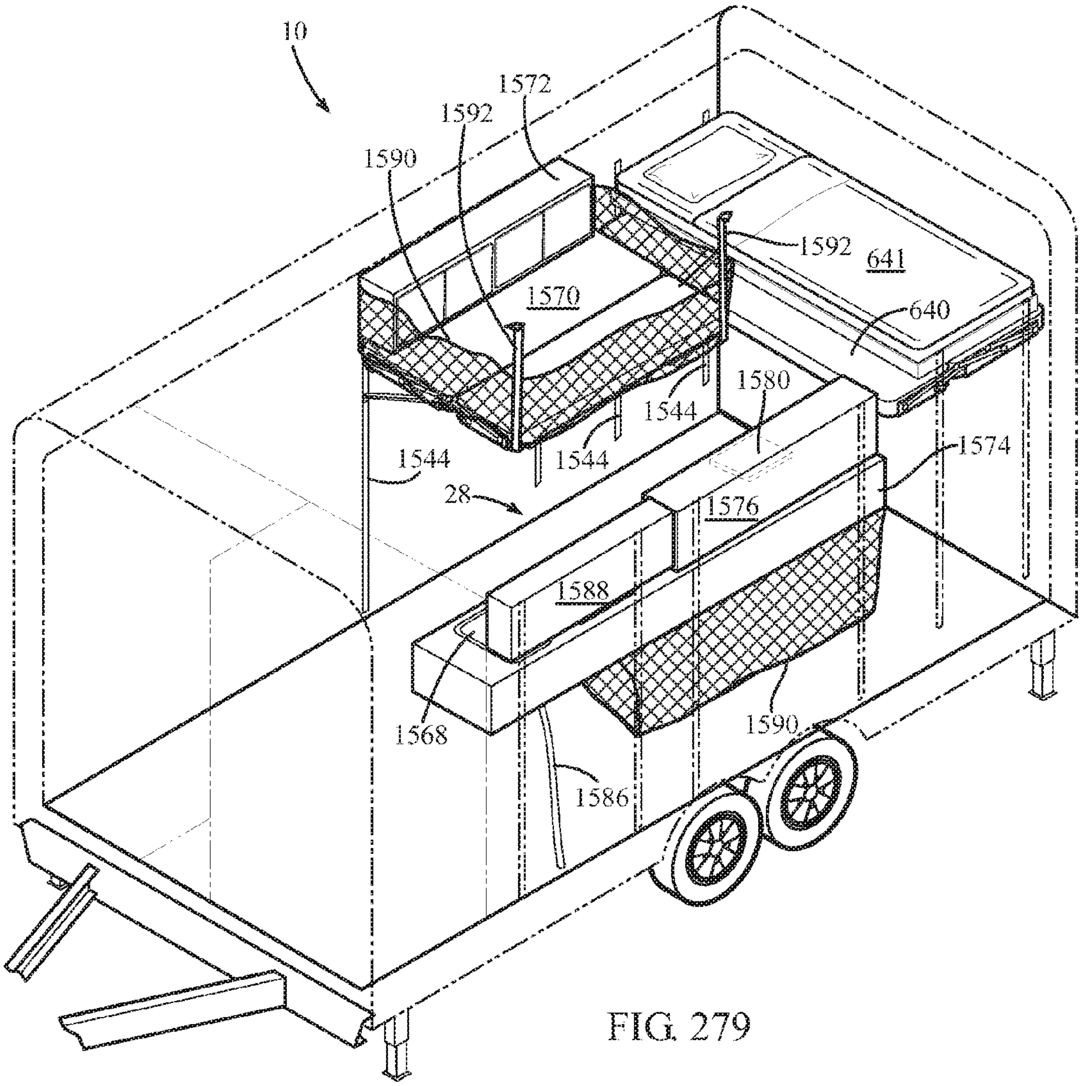

FIG. 279 shows a perspective view of the vehicle with the items being raised in the stowed configuration.

Figure 280:
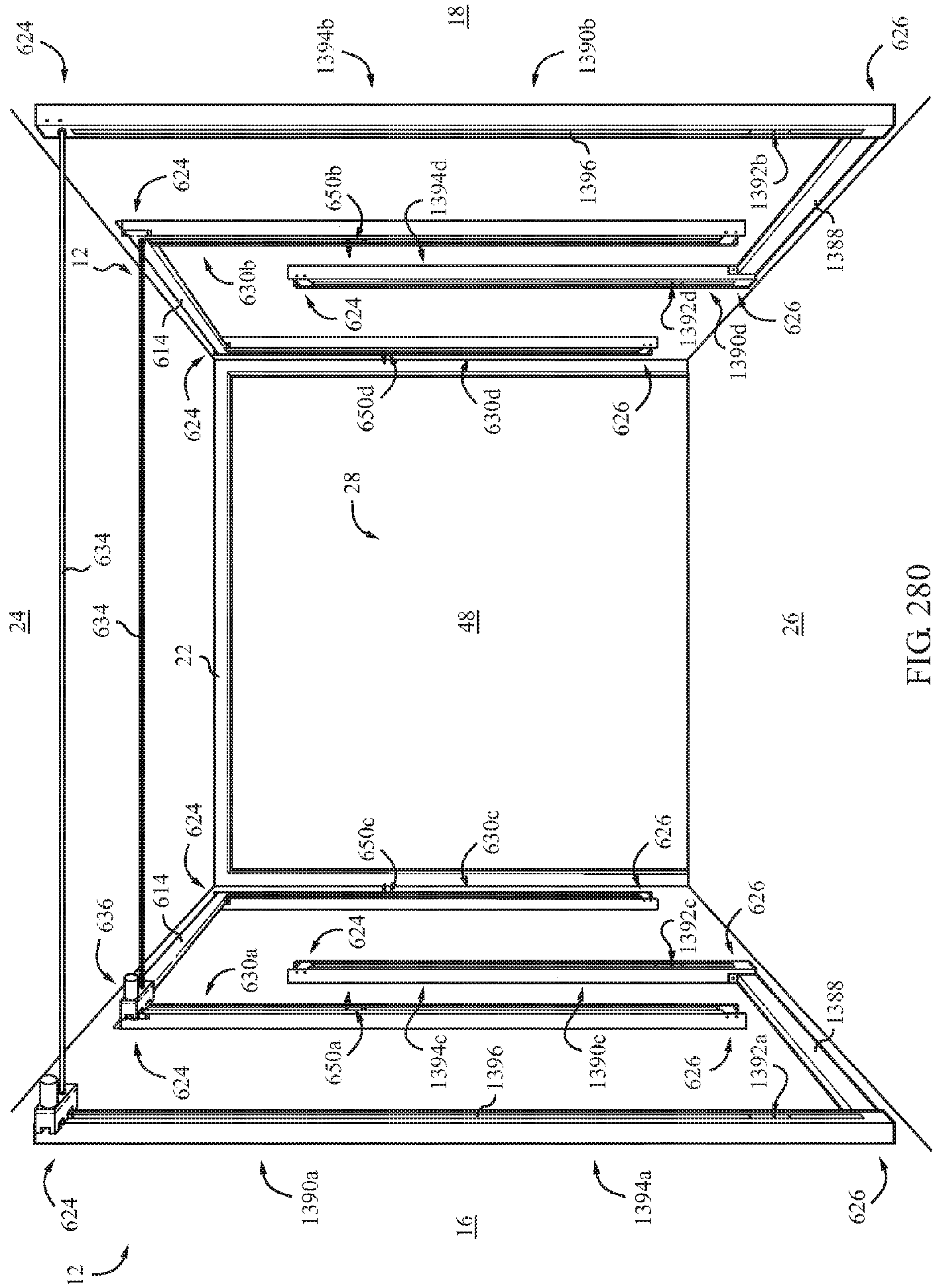

FIG. 280 shows a perspective view of another embodiment of two systems where one of the systems may be used to vertically move one or more beds and the other system may be used to vertically move one or more off-road vehicles.

Figure 281:
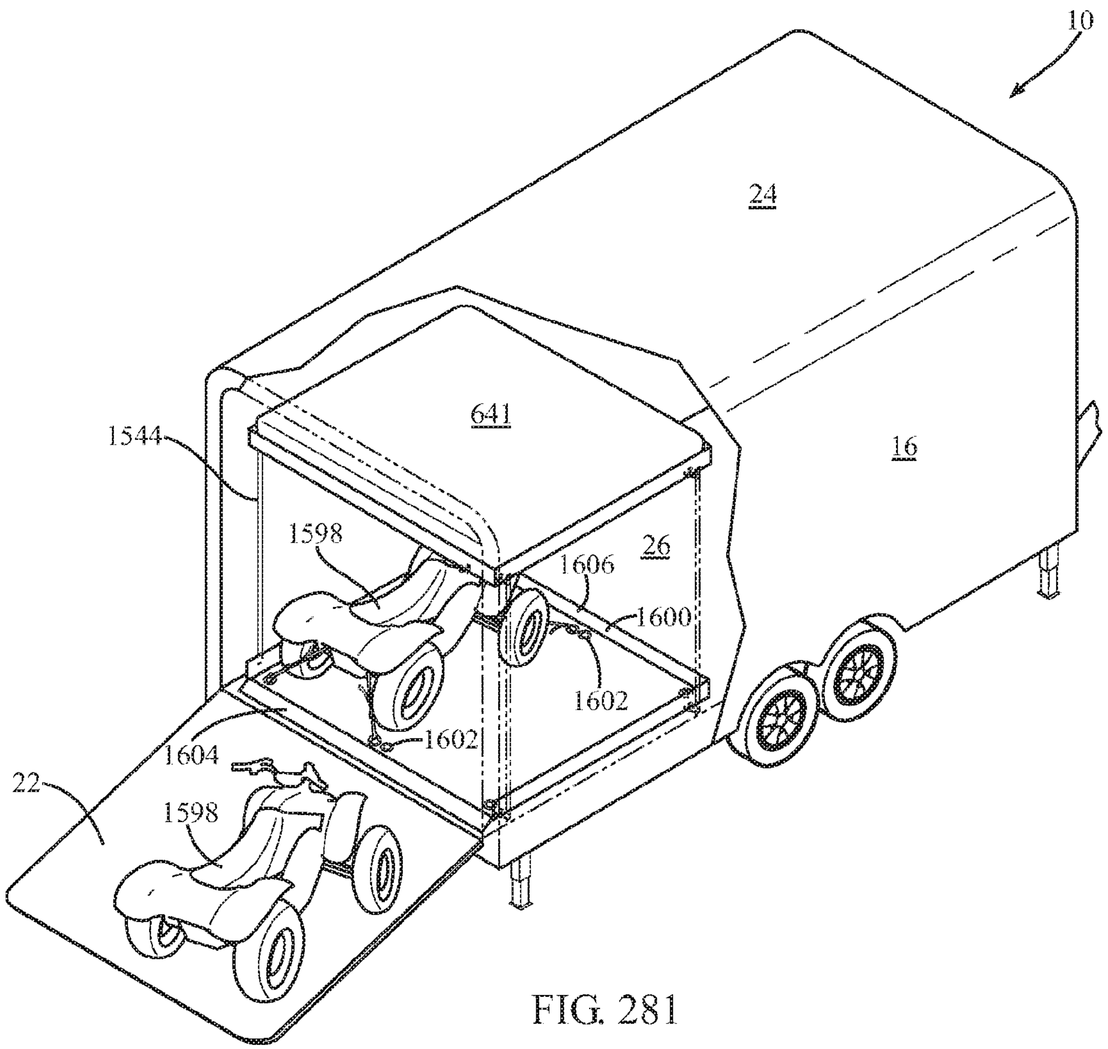
Figure 282:
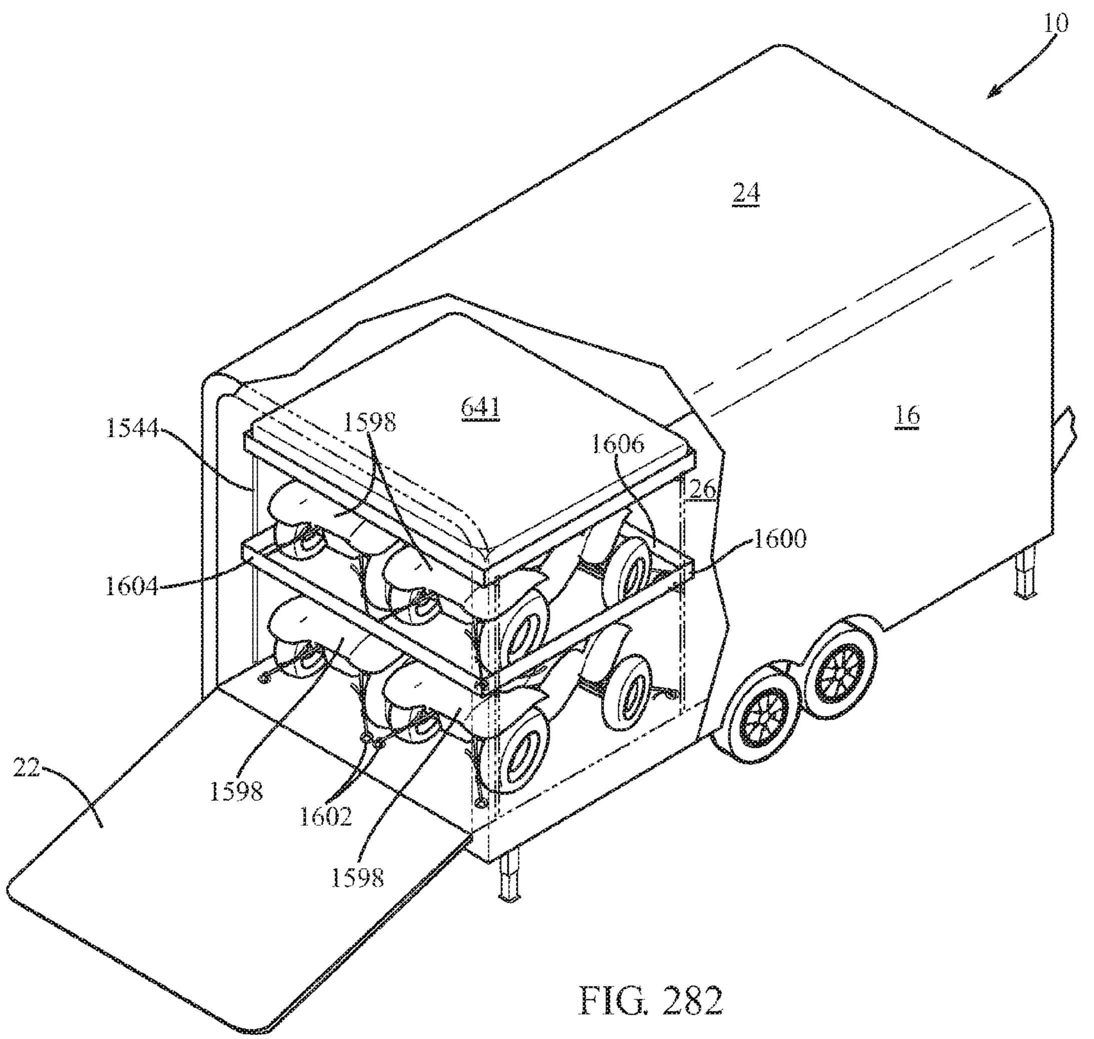

FIGS. 281-282 show perspective views of another embodiment of a system that may be used to vertically move one or more beds and/or one or more off-road vehicles.

Figure 283:
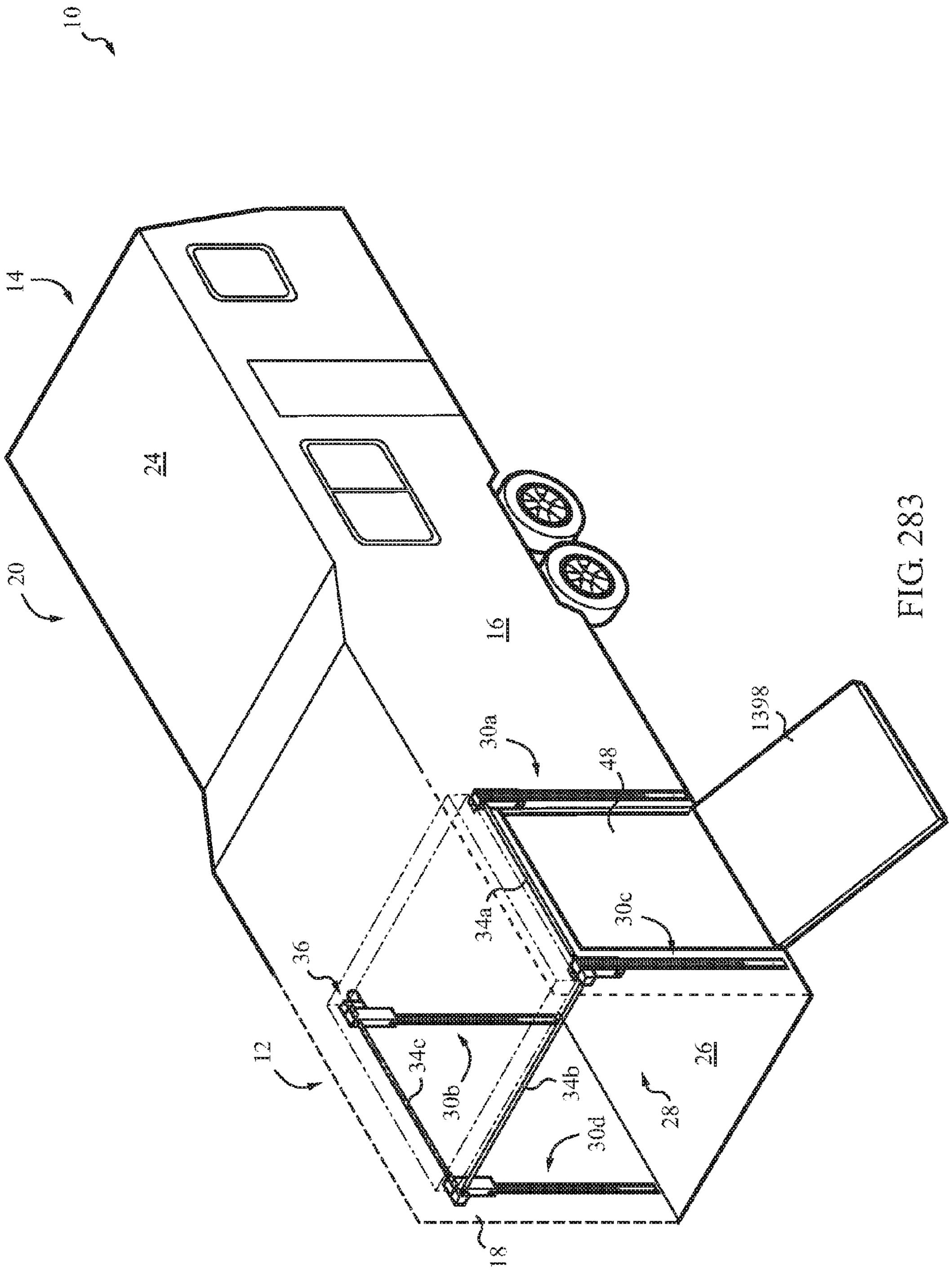

FIG. 283 shows a perspective view of one embodiment of a toy hauler that includes a system for vertically moving one or more beds and a ramp door positioned on the side of the toy hauler so that cargo may be loaded underneath the one or more beds.

Figure 284:
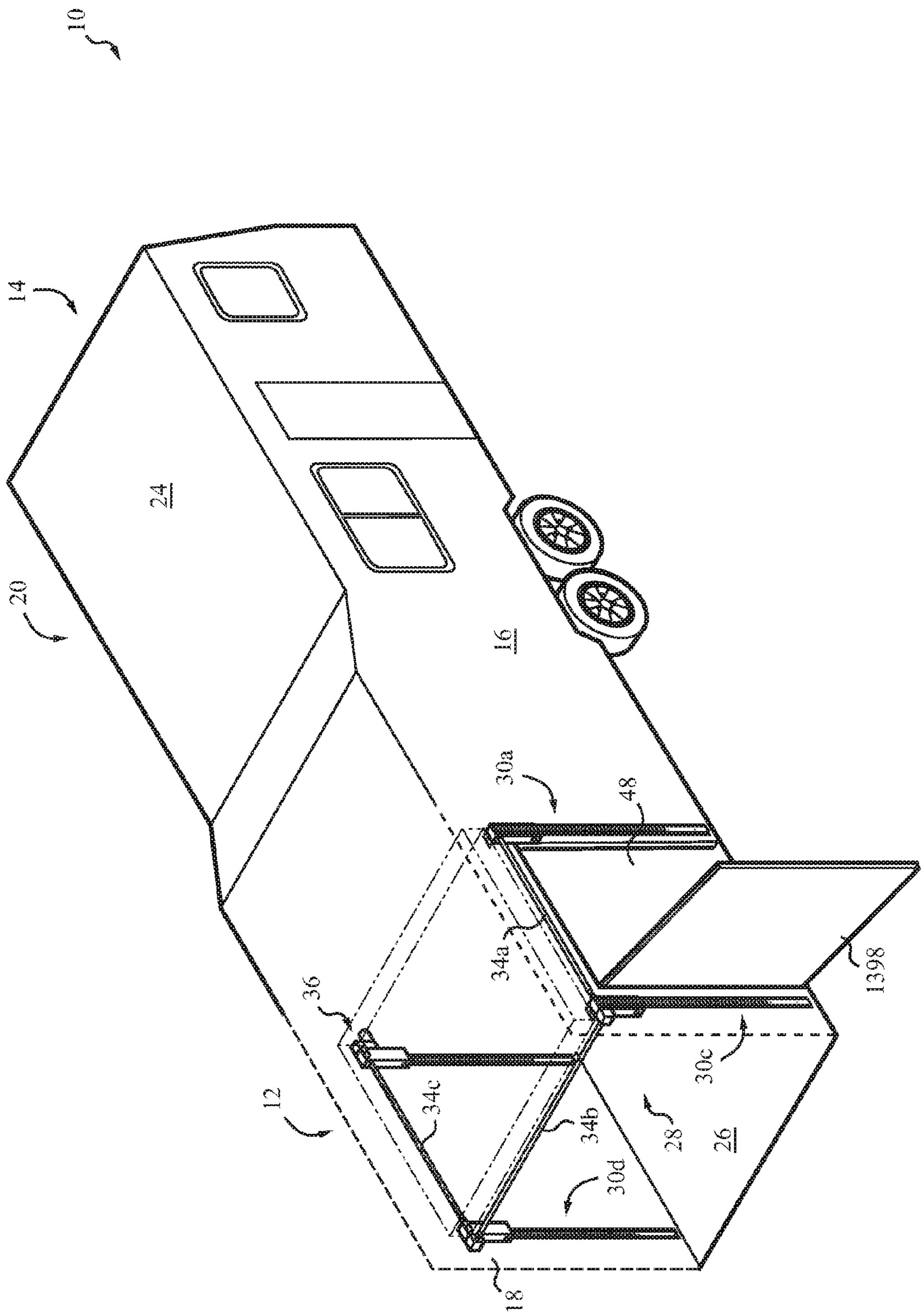

FIG. 284 shows a perspective view of another embodiment of a toy hauler that includes a system for vertically moving one or more beds and a door that pivots open on a vertical axis and is positioned on the side of the toy hauler so that cargo may be loaded underneath the one or more beds.

Figure 285:
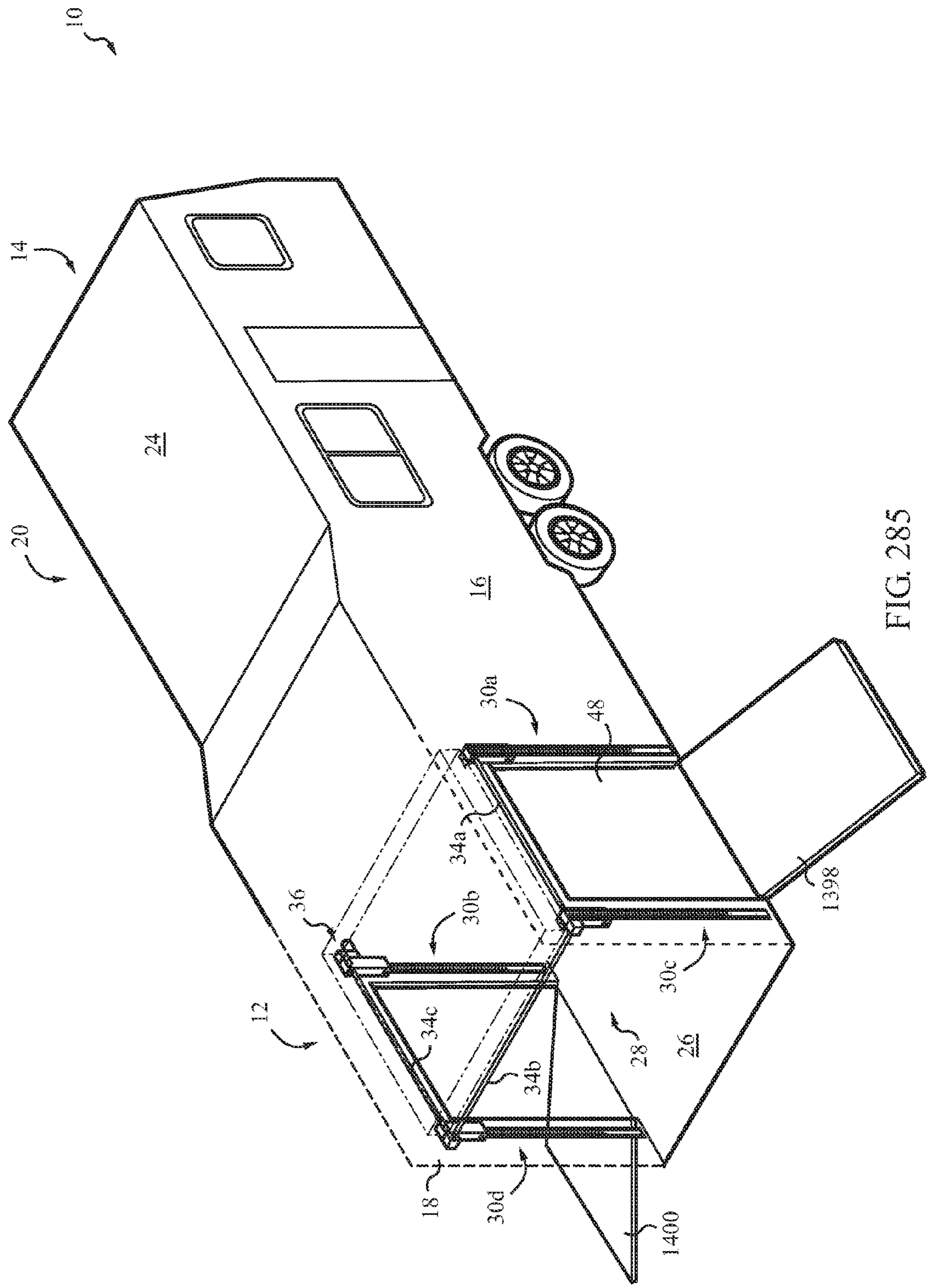

FIG. 285 shows a perspective view of one embodiment of a toy hauler that includes a system for vertically moving one or more beds and two ramp doors positioned on opposing sides of the toy hauler so that cargo may be easily loaded in one ramp door and out the other ramp door.

Figure 286:
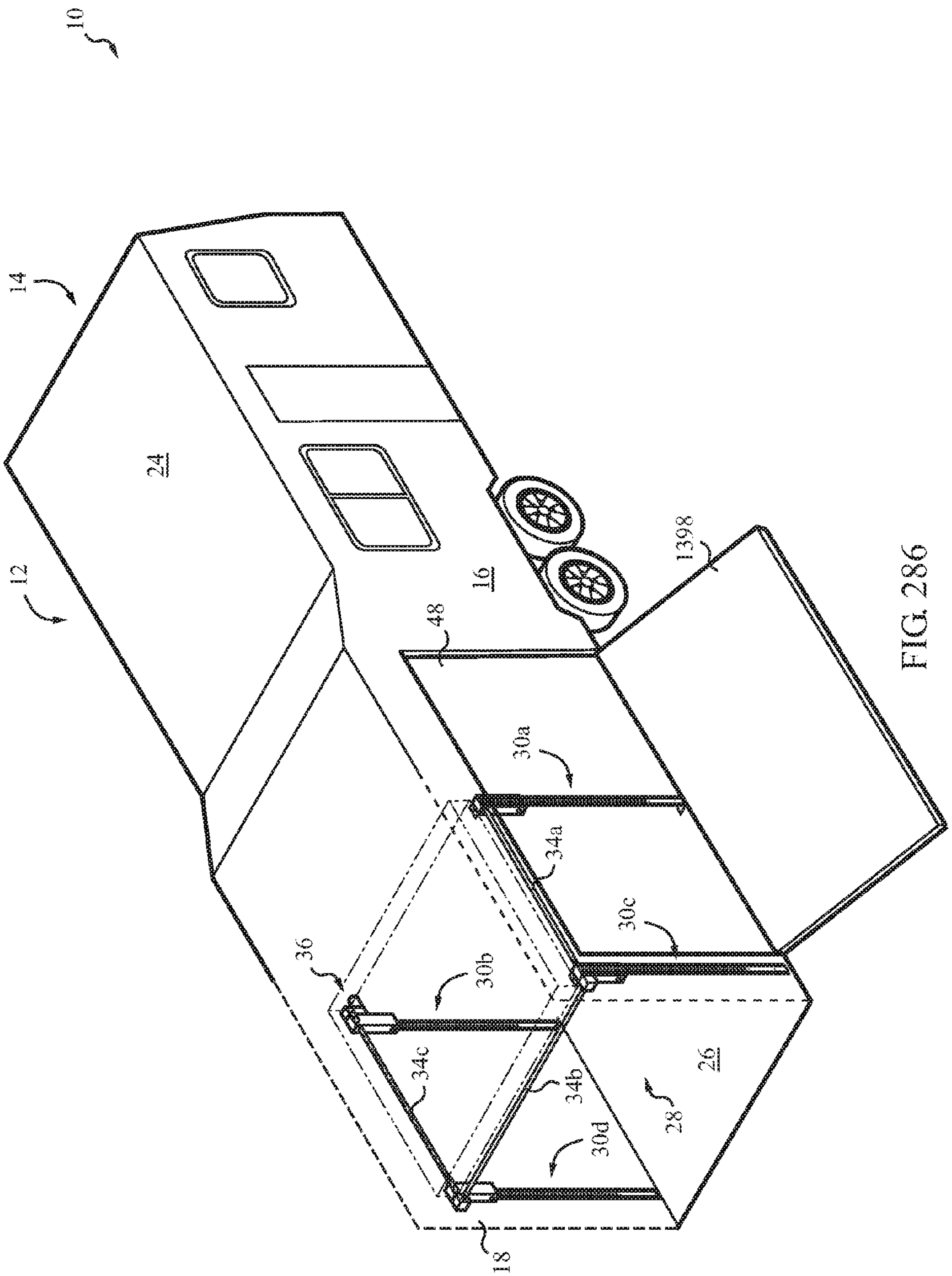

FIG. 286 shows a perspective view of one embodiment of a toy hauler that includes a system for vertically moving one or more beds and a ramp door positioned on the side of the toy hauler so that cargo may be loaded underneath the one or more beds, the system including a lifting assembly positioned in the middle of the opening formed by the ramp door.

Figure 287:
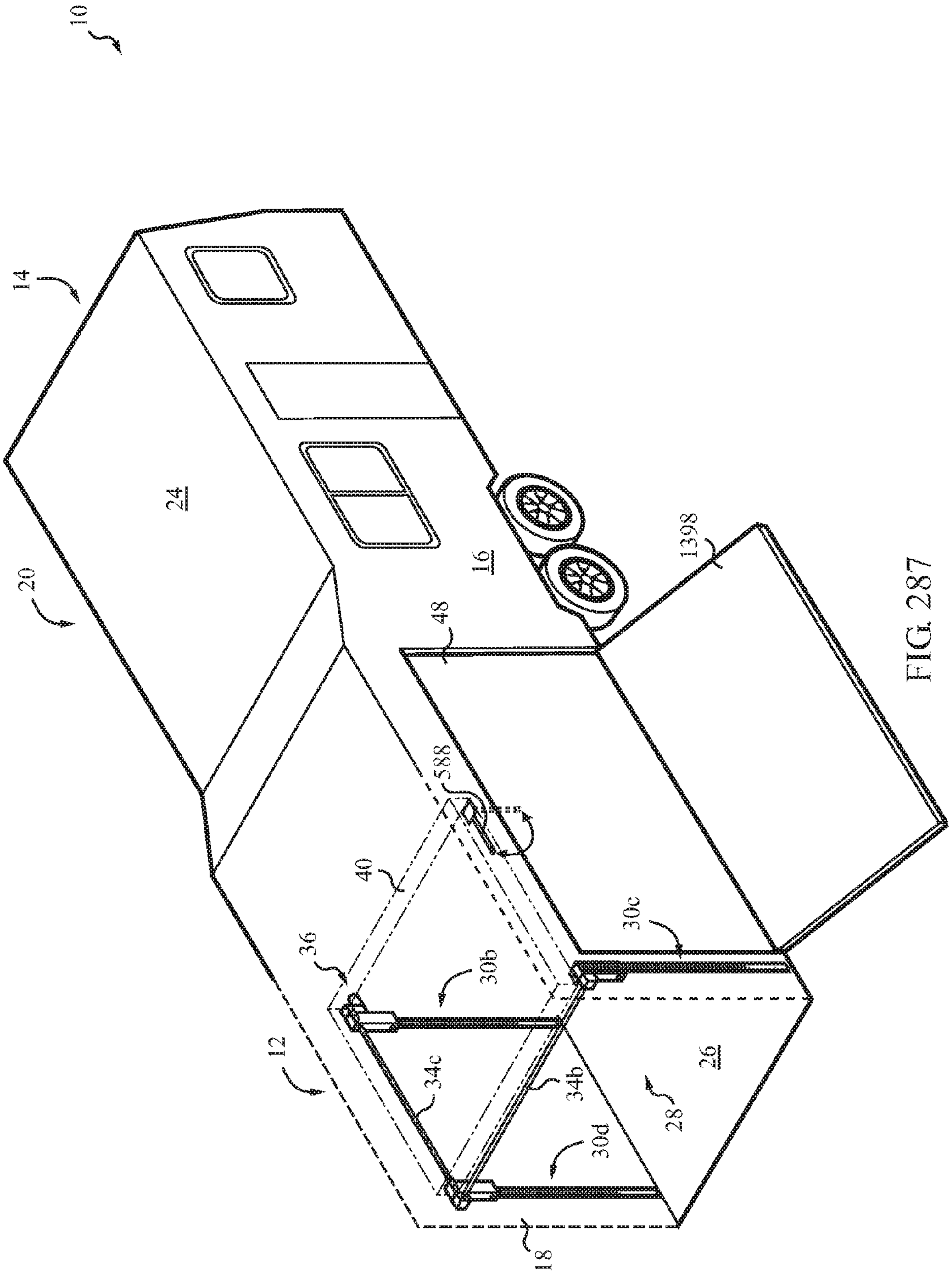
Figure 288:
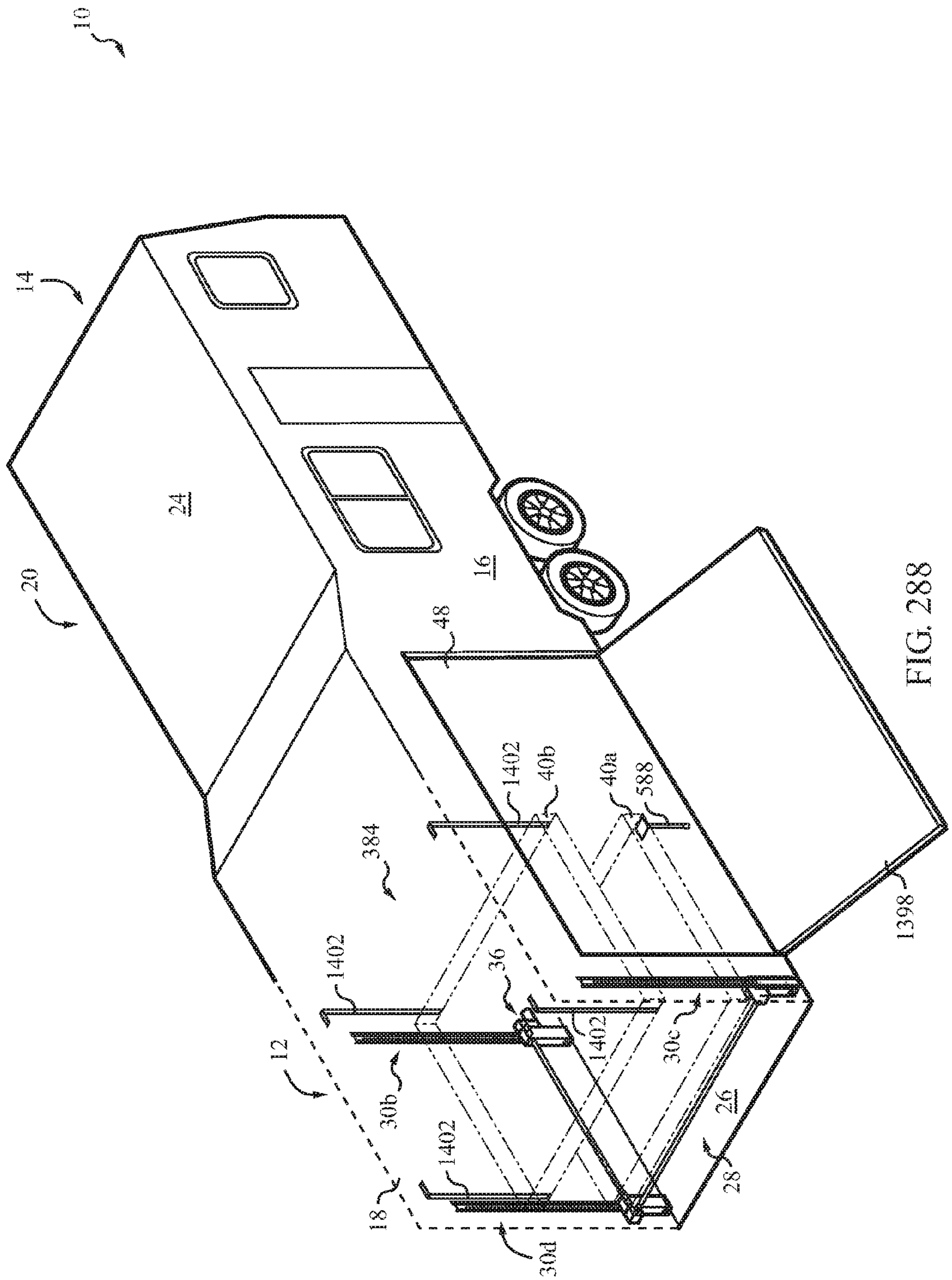
Figure 289:
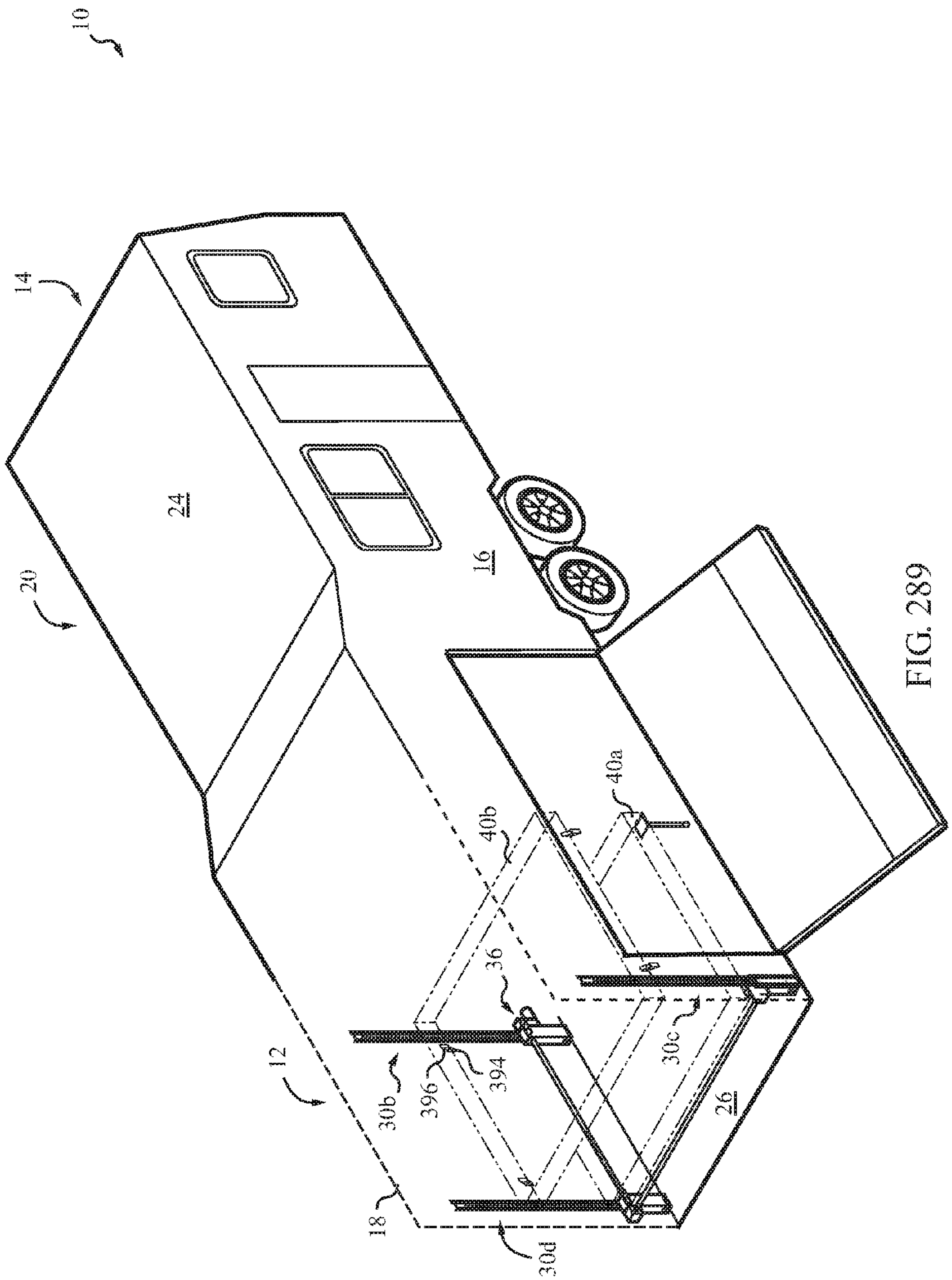

FIGS. 287-289 show perspective views (i.e., stowed configuration and use configuration with various ways to support the upper bed in the use configuration) of one embodiment of a toy hauler that includes a system for vertically moving one or more beds and a ramp door positioned on the side of the toy hauler so that cargo may be loaded underneath the one or more beds, the system being configured so that the opening formed by the ramp door is kept open.

DESCRIPTION

The subject matter described herein generally relates to systems and methods for moving objects in a wide variety of settings. For example, the systems described herein may be used to move objects or items such as furniture (e.g., seating units such as sofas, couches, chairs, benches, and the like; sleeping units such as beds, mattresses, and the like; dining units such as dinettes, tables, counters, and the like; desks; workbenches; entertainment centers; and the like), appliances (e.g., heating units such as stoves, microwaves, toaster ovens, and the like; refrigerators; dishwashers; and the like), storage units (e.g., cupboards, cabinets, counters, shelves, and the like), sinks, platforms (e.g., platform which is used to raise and/or lower an off-road vehicle to allow additional off-road vehicles to be placed in a recreational vehicle commonly referred to as a "toy hauler," a bed, and the like), slide-outs for recreational vehicles (patios, slide-out compartments or rooms, storage compartments, and the like), and the like. The systems may be used to move the objects vertically, horizontally, or any direction in between.

The systems described herein may also be used with a wide variety of mobile and immobile structures. Mobile structures include, but are not limited to, structures such as land vehicles (e.g., recreational vehicles, trailers, motorized vehicles, vehicles used to travel on a road, wheeled vehicles, railroad cars, buses, semi-trucks, and the like), watercraft (e.g., ships, boats, houseboats, cruise ships, yachts, and the like), aircraft, and any other mobile vehicles. Immobile structures include, but are not limited to, structures such as a building, edifice, etc.

In one embodiment, the systems described herein may be used with structures that are used as or include living quarters. For example, the systems may be used with any of the mobile and immobile structures previously described which may be used as living quarters. Structures which may be used as living quarters include, but are not limited to, homes, houses, residences, condominiums, abodes, dwellings, lodgings, recreational vehicles (e.g., travel trailers, fifth wheels, truck campers, "toy haulers," snowmobile trailers, motor homes, car haulers (e.g., vehicles used to haul cars and/or other vehicles to races such as NASCAR races, etc.) and the like), houseboats, cruise ships, and the like. In another embodiment, any structure which is suitable for or designed principally for habitation by people either on a permanent (e.g., a house) or a temporary (e.g., hotel) basis may be used with the described and illustrated systems.

In the following description, reference is made to a number of embodiments which illustrate the use of the system for vertically moving objects. Although only a few embodiments are shown, it should be understood that the systems, concepts, and features described herein may also be used in a variety of settings and situations in addition to those explicitly described. Also, the features, advantages, characteristics, etc. of one embodiment of the system for moving objects may be combined with the features, advantages, characteristics, etc., of any one or more other embodiments to form additional embodiments unless noted otherwise.

Figure 1:
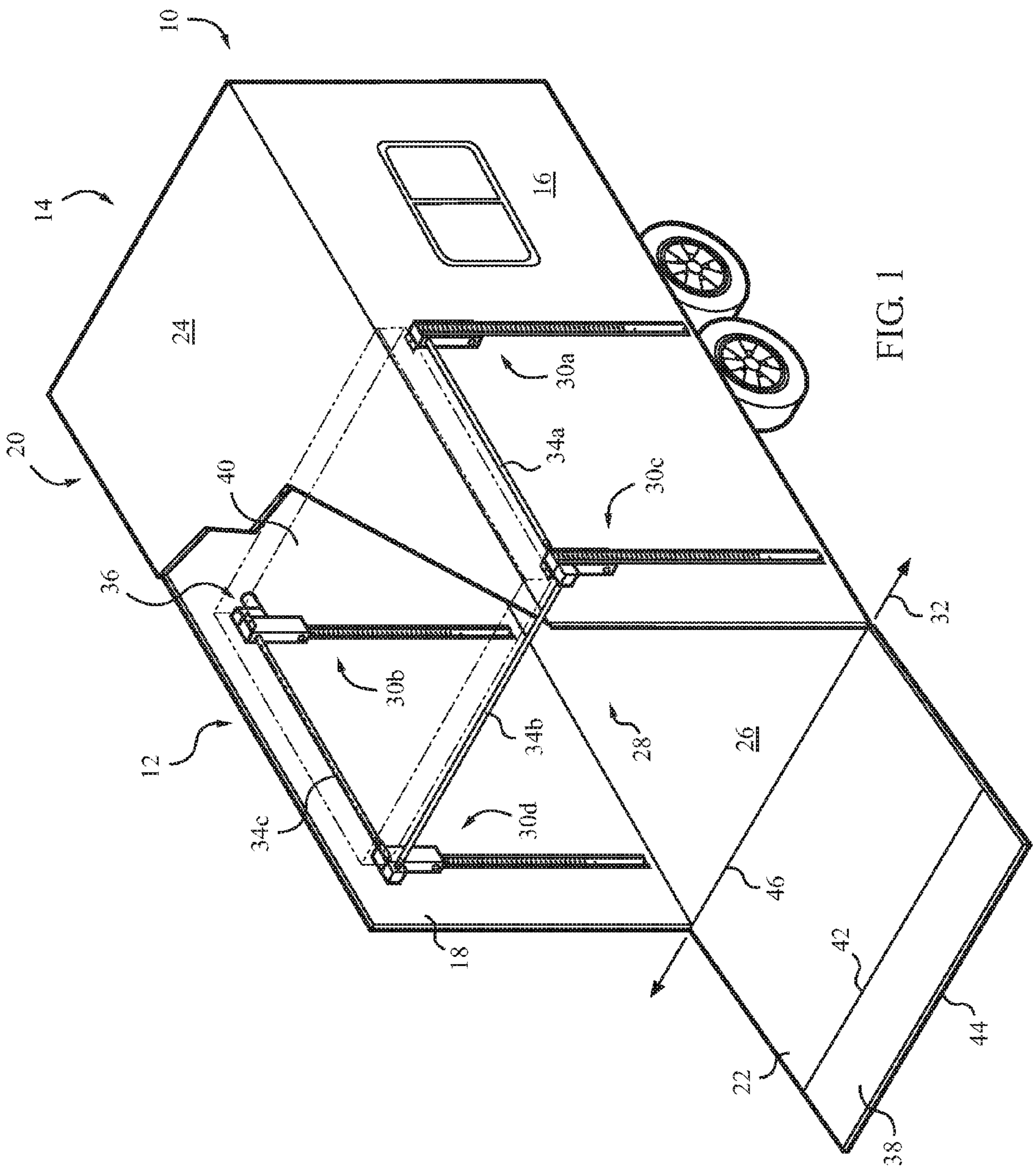
FIG. 1 shows a partially cut-away view of one embodiment of a structure which includes a system for vertically moving one or more objects.

Referring to FIG. 1, a structure which, in this embodiment, is a "toy hauler" type of recreational vehicle 10 includes a system 12 for vertically moving objects—alternatively referred to herein as an apparatus for vertically moving objects, a lifting system, a vertical sliding system, or a vertical support system. The vehicle 10 includes a vehicle body 20 which is coupled to a frame (not shown). The body 20 includes a front wall 14, a first side wall 16, a second side wall 18, a rear wall 22, a ceiling 24, and a floor 26. The vehicle 10 also includes a cargo area 28—alternatively referred to herein as a storage area or a storage compartment—which is used to receive and/or transport off-road vehicles (e.g., four-wheelers, motorcycles, snowmobiles, dune buggies, personal watercraft, and the like)—alternatively referred to herein as personal recreational vehicles—and/or other vehicles (e.g., cars, jeeps, and so forth) to various destinations where they may be used in recreational activities. In the embodiment shown in FIG. 1, the rear wall 22 may be used as both a door to enter the vehicle 10 and as a ramp to move an off-road vehicle into and/or out of the cargo area 28. Although, the entire rear wall 22 is shown as being used as a ramp, in other embodiments, less than all of the rear wall 22 may be used as a door and/or ramp.

Although a vehicle and, in particular, a "toy hauler" type of recreational vehicle is referred to in many of the embodiments described herein, it should be understood that these embodiments are provided as examples of the many structures which may include system 12. Also, using a "toy hauler" as an example of a suitable structure is not meant in any way to restrict or otherwise constrain the applicability of the concepts and features of the embodiments described to other types of structures and, in particular, to other types of recreational vehicles. Accordingly, there are a wide variety of structures which may use the systems described herein.

As shown in FIG. 1, the rear wall 22 pivots on an axis 32 between an open position (shown in FIG. 1) and a closed position (not shown). The axis 32 is generally horizontal and perpendicular to the side walls 16, 18. In the open position, the rear wall 22 may be used as a ramp to drive or otherwise move an off-road vehicle into and/or out of the cargo area 28. Once the off-road vehicle has been moved into and/or out of the cargo area 28, the rear wall 22 pivots upward on the axis 32 to a closed position. When the rear wall 22 is in the closed position and an off-road vehicle is positioned in the cargo area 28, the off-road vehicle is enclosed in the vehicle 10, thus providing protection from the elements, thieves, etc. In this manner, the vehicle 10 may be used to store and/or transport the off-road vehicle as desired.

The rear wall 22 may be pivotally coupled to the remainder of the body 20 at axis 32 using a suitable hinge or other pivoting mechanism (not shown). The rear wall 22 may be held in the closed position using any of a number of suitable latching mechanisms. In one embodiment, the rear wall 22 may be leveled in the open position and used as a floor for an accessory room. The walls of the room may be provided using fabric (e.g., fabric commonly used to make tents, etc.) which is supported by a room frame (e.g., flexible or rigid frame members such as those used for a tent). The room frame may be coupled to one or both of the rear wall 22 and the remainder of the body 20.

In another embodiment, the rear wall 22 may be configured to telescope longitudinally in the open position to reduce the angle of the rear wall 22 relative to the floor 26. Reducing the angle may reduce the likelihood of an off-road vehicle high-centering at the interface of the rear wall 22 and the floor 26 when the off-road vehicle is loaded and/or unloaded. As shown in FIG. 1, the rear wall 22 may include a telescoping portion 38 which telescopes longitudinally relative to the remainder of the rear wall 22 at interface 42. In other embodiments, the rear wall 22 may telescope at a distal edge 44 and/or a proximal edge 46 of the rear wall 22 or anywhere in between. The mechanism used to telescopically extend the rear wall 22 may be any mechanism which is suitable to provide the desired durability and strength to handle the repeated weight of off-road vehicles as they are loaded into and/or unloaded from the vehicle 10. In addition to the telescoping rear wall 22, the vehicle 10 may include a number of other features that are commonly offered on a recreational vehicle (e.g., slide-out compartment, accessory gas tank for "toys," water tanks, barbeque, sound system, etc.).

The system 12, shown in the embodiment of FIG. 1, includes lifting assemblies 30*a*, 30*b*, 30*c*, 30*d* (collectively referred to as "the lifting assemblies 30")—alternatively referred to herein as sliding assemblies or sliding mechanisms—drive members 34*a*, 34*b*, 34*c* (collectively referred to as "the drive members 34")—alternatively referred to herein as synchronizing assemblies, synchronizing members, or timing assemblies—and a motor assembly 36. The lifting assemblies 30*a*, 30*c* are coupled to the first side wall 16, and the lifting assemblies 30*b*, 30*d* are coupled to the second side wall 18. It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members and any additional intermediate member being attached to one another. Such joining may be permanent in nature or alternatively may be removable or releasable in nature. The drive members 34*a*, 34*b*, 34*c* extend between the lifting assemblies 30*a*, 30*c*, the lifting assemblies 30*c*, 30*d*, and the lifting assemblies 30*b*, 30*d*, respectively, and are used to synchronize the operation or movement of the lifting assemblies 30. In this embodiment, the motor assembly 36 is coupled to the lifting assembly 30*b* and is used to drive or move the lifting assemblies 30 in unison.

In general, the lifting assemblies 30 are used to vertically move a bed 40—alternatively referred to herein as a bunk or berth—between a first or use position where the bed 40 is positioned in the cargo area 28 and a second or stowed position where the bed 40 is positioned adjacent to the ceiling 24, as shown in outline in FIG. 1. Although four lifting assemblies 30 are shown in the embodiment of FIG. 1, it should be understood that more or fewer lifting assemblies 30 may be used (e.g., one, two, three, five, six, or more).

In an alternative embodiment, the lifting assemblies 30 may be used to vertically move the bed 40 to a stowed position beneath the floor 26 of the vehicle 10. For example, a storage cavity or recess may be provided beneath the floor 26 which is used to receive the bed 40 in the stowed position. One or more doors may be provided to cover the cavity when the bed 40 is positioned in the floor 26 (e.g., doors may be pivotally or slidably coupled to the floor 26). The lifting assemblies 30 may be configured to extend down into the cavity to lower the bed 40 into the cavity. Alternatively, the lifting assemblies 30 may be configured to move the bed 40 into and/or out of the cavity without the lifting assemblies 30 extending into the cavity. For example, the bed 40 may be coupled to the lifting assemblies 30 at a point which is vertically offset above the bed 40 a sufficient amount to allow the bed 40 to be lowered into the cavity but maintain the point where the bed 40 is coupled to the lifting assemblies 30 above the floor 26. In one embodiment, an L-shaped bracket may be used to provide the offset coupling of the bed 40 to the lifting assemblies 30. When the bed 40 is positioned in the cavity beneath the floor 26, the bracket may extend upward from the bed 40, through a relatively small and inconspicuous opening in the floor 26, and to the point where the bracket is coupled to the lifting assembly 30. Thus, the lifting assemblies 30 may be used to move the bed 40 between a use position and a stowed position in the cavity.

In another embodiment, the ceiling 24 may include a storage cavity or recess which is used to receive the bed 40 in the stowed position. The cavity may be slightly larger than the bed 40 in order to at least substantially conceal the bed 40 in the stowed position. When the bed 40 is positioned in the cavity it may also be substantially flush with the ceiling 24 to provide an aesthetically pleasing and/or hidden appearance. In another embodiment, one or more doors (e.g., doors which pivot downward from the ceiling 24, doors which slide parallel and adjacent to the ceiling 24, and so forth) may also be used to enclose or conceal the bed 40 in the cavity.

Figure 2:
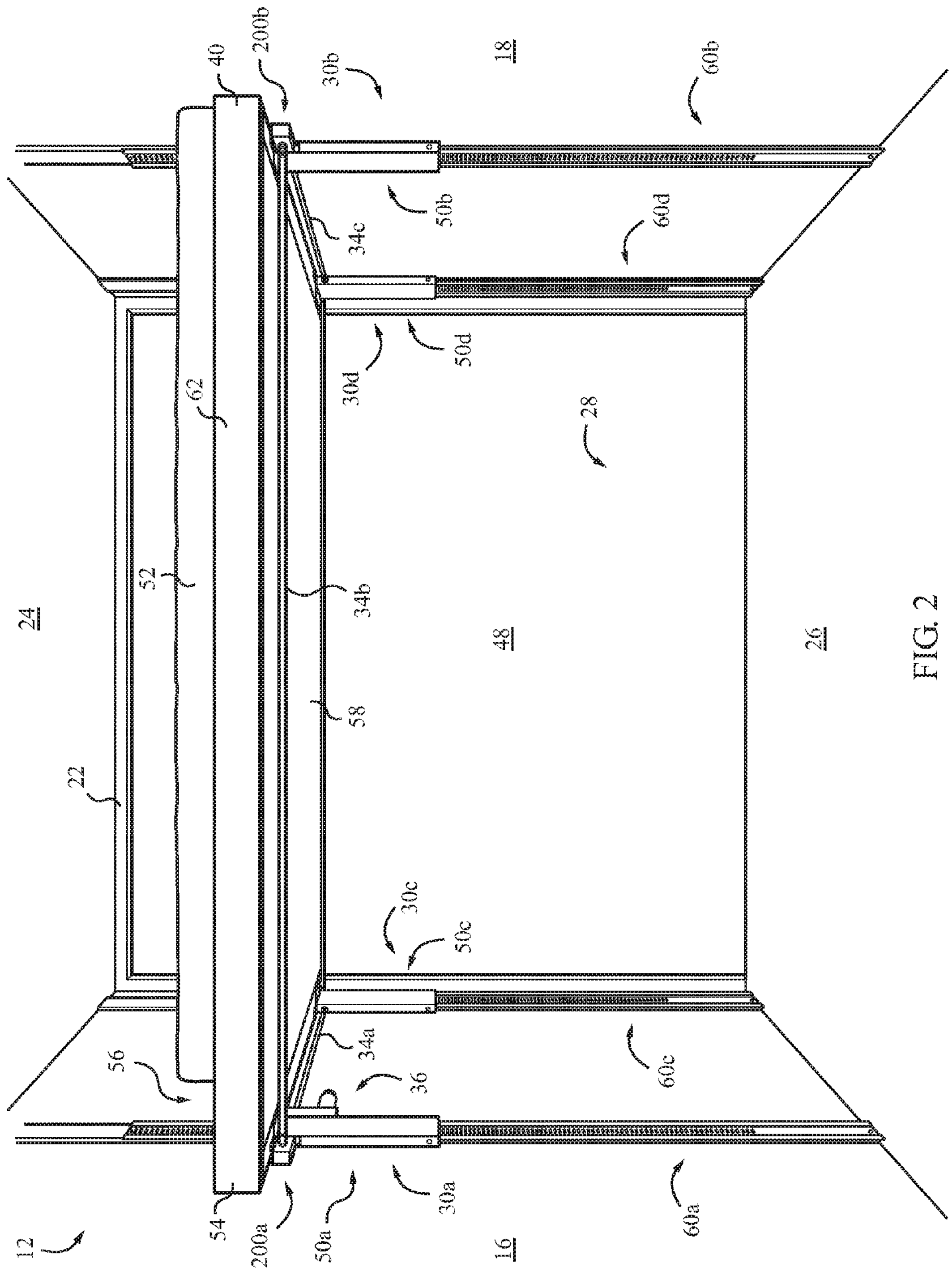
FIG. 2 shows a perspective view from inside a structure of another embodiment of a system for vertically moving one or more beds.

Referring to FIG. 2, a perspective view of the system 12 is shown from inside the vehicle 10. In this embodiment, the rear wall 22 includes a door (not shown in FIG. 2) which may be used to cover or close an opening 48 through which off-road vehicles may be moved into and/or out of the cargo area 28. The door may function as a ramp in a manner similar to the rear wall 22 as explained in connection with FIG. 1. However, unlike FIG. 1, in this embodiment, the entire rear wall 22 is not used as the door. Rather, the rear wall 22 includes a rigid frame portion which frames in the opening 48. This may be desirable to increase the strength and rigidity of the vehicle 10.

In general terms, the system 12 may be used to move the bed 40 between the use position and the stowed position. The bed 40, as shown in FIG. 2, may be considered to be in the use position since the bed 40 is positioned sufficiently far away from the ceiling 24 to receive a person to sleep on the bed 40. However, in a typical situation, the bed 40 is lowered further than what is shown in FIG. 2 to make it easier for the person to get on and off of the bed 40.

Depending on the embodiment, the system 12 may be used to vertically move the bed 40 a variety of distances. For example, in the embodiment shown in FIG. 2, the system 12 may be used to move the bed 40 from within a short distance of the floor 26 all the way to the ceiling 24—even to the point of contacting the ceiling 24. In other embodiments, the system 12 may be configured to move the bed 40 a total distance of 1 foot (or about 30.5 centimeters) or less. The system 12 may also be configured to move the bed 40 within 4 feet (or about 1.2 meters) or less of the floor 26 and/or the ceiling 24, or, desirably, within 3 feet (or about 1 meter) or less of the floor 26 and/or the ceiling 24, or, suitably, within 2 feet (or about 0.6 meters) or less of the floor 26 and/or the ceiling 24, or, more suitably, within 18 inches (or about 45.5 centimeters) or less of the floor 26 and/or the ceiling 24, or, additionally, within 1 foot (or about 30.5 centimeters) or less of the floor 26 and/or the ceiling 24. The system 12 may also be configured to move the bed 40 a total distance of at least 3 feet (or about 1 meter), or, desirably, at least 4 feet (or about 1.2 meters), or, suitably, at least 5 feet (or about 1.5 meters), or, further, at least 6 feet (or about 1.8 meters).

The bed 40, as shown in the embodiment of FIG. 2, includes a mattress 52 and a bed frame 54. The mattress 52 may be any of a number of suitable mattresses such as an air mattress, spring mattress, foam mattress, etc. In one embodiment, the mattress 52 includes viscoelastic or memory foam. The use of memory foam may be desirable because of the high degree of comfort provided using a relatively thin amount of material. However, other materials may also be used that provide a suitable level of comfort while at the same time being relatively thin. The mattress 52 and/or the bed 40 may be any suitable size including, but not limited to, super king, California king, king, California queen, Olympic queen, queen, double, twin, or single. The mattress 52 and/or the bed 40 may also be any custom size (e.g., mattress sized to fit in an odd shaped area in a recreational vehicle). In one embodiment, the mattress 52 is no more than 6 inches (or about 15.2 centimeters) thick, or, desirably, no more than 4 inches (or about 10.2 centimeters) thick, or, suitably, no more than 3 inches (or about 7.6 centimeters) thick, or, further, no more than 2 inches (or about 5.1 centimeters) thick. It should be appreciated that the mattress 52 may be made from any of a number of suitable materials and in any of a number of suitable configurations, according to the desires of the end user and/or manufacturer.

In the embodiment shown in FIG. 2, the bed frame 54 is made of plywood and includes a bottom side or base 58 and four sides 62 extending upward from the bottom side 58. The plywood may be covered with a fabric material to provide a more aesthetically pleasing appearance than just showing bare plywood. Plywood may be desirable to use as the bed frame 54 because of its relatively low cost and high structural integrity. In other embodiments, the bed frame 54 may be made of any of a number of suitable materials and in a wide variety of configurations. For example, the bed frame 54 may be made of metal, plastic, wood, composites, and the like. In one embodiment, the bed frame 54 may include a rectangular metal framework (e.g., made from steel or aluminum) with cross members extending between outer framed members. The metal frame members may be used to support the mattress 52 directly or to support another intermediate bed support structure (e.g., plywood sheet, etc.) which in turn supports the mattress 52. In another embodiment, the bed frame 54 may include a single material or combination of materials (e.g., plywood and metal frame members, etc.).

In another embodiment, at least a portion of the bed frame 54 may be made using a molded plastic. Using molded plastic may provide a lighter bed frame 54 than may be achieved using materials such as plywood. This allows the user to carry more in the vehicle 10 without exceeding weight limits set by the government/manufacturer of the vehicle 10. In one embodiment, the bed frame 54 may be made using blow molding, rotational molding, thermosetting injection molding, or any other suitable plastic molding process. Regardless of the material or combination of materials used, the bed frame 54 may be configured as a lattice like structure, a solid contiguous piece, etc.

As shown in FIG. 2, the mattress 52 may be shorter longitudinally than the bed frame 54 to provide a storage area 56. The storage area 56 may be used to store personal effects, extra bedding, and the like. For example, the storage area 56 may be used to store a watch, glasses, wallet, keys, and the like when a person is sleeping in the bed 40. Thus, those items that are of high value or may be needed immediately upon waking are easily accessible to the user. Also, the storage area 56 may be used to hold bedding such as pillows, blankets, sheets, and the like. This allows the bed 40 to be positioned closer to the ceiling 24 in the stowed position since the bedding is not positioned between the mattress 52 and the ceiling 24. The storage area 56 may also include a number of compartments, trays, etc. which may be used to organize and/or hold the stored materials.

With continued reference to FIG. 2, each of the lifting assemblies 30 includes a corresponding moving assembly 50*a*, 50*b*, 50*c*, 50*d* (collectively referred to as "the moving assemblies 50")—alternatively referred to herein as a carriage, trolley, sliding unit, or moving guide assembly—and a corresponding support assembly 60*a*, 60*b*, 60*c*, 60*d* (collectively referred to as "the support assemblies 60")—alternatively referred to herein as a guide assembly. Each moving assembly 50 cooperates with a corresponding support assembly 60 to move the bed 40 between the use position and the stowed position. The bed 40 is coupled to and moves with the moving assemblies 50. In this embodiment, the drive members 34*a*, 34*b*, 34*c* are coupled between the lifting assemblies 30*a*, 30*c*, the lifting assemblies 30*a*, 30*b*, and the lifting assemblies 30*b*, 30*d*, respectively. Also, the motor assembly 36 is coupled to the lifting assembly 30*a* and the drive member 34*a*.

At a general level, the support assemblies 60 are coupled to the vehicle 10 and are used to support the bed 40 and/or guide the vertical movement of the bed 40. Thus, the support assemblies 60 may be stationary relative to the vehicle 10. The moving assemblies 50 may be coupled to the bed 40 and used to move the bed 40 relative to the vehicle 10. The moving assemblies 50 cooperate with the support assemblies 60 to vertically move the bed 40 in a secure and controlled manner.

In one embodiment, each of the moving assemblies 50 may be identical to and/or interchangeable with the other moving assemblies 50. Using interchangeable moving assemblies 50 may make it easier to manufacture and inventory the moving assemblies 50. In other embodiments, one or more of the moving assemblies 50 may be custom made and/or not be interchangeable with the other moving assemblies 50. For example, the interior features of the vehicle 10 may require the use of different moving assemblies 50. In a similar manner, each of the support assemblies 60 may also be identical to and/or interchangeable with the other support assemblies 60 with the understanding, as previously explained in connection with the moving assemblies 50, that there may be situations where it is desirable to use custom and/or non-interchangeable support assemblies 60.

At a general level, the motor assembly 36 is used to provide the driving force to move the moving assemblies 50 in cooperation with the support assemblies 60. In one embodiment, the motor assembly 36 provides rotational motion (e.g., rotating shaft, rotating sleeve, etc.) which is used to move the moving assemblies 50. The drive members 34 may be used to transmit the driving force provided by the motor assembly 36 to the moving assemblies 50. In this embodiment, the drive members 34 are rigid and transmit rotational motion from the motor assembly 36 to the moving assemblies 50. Examples of suitable rigid drive members may include metal, plastic, or composite, shafts, tubes, beams, rods, etc. In other embodiments, the drive members 34 may be flexible and perform the same function. Examples of suitable flexible drive members may include chains, cables, straps, toothed belts, and the like. The flexible drive members may be configured to extend between rotatable members (e.g., sprockets, pulleys, shafts, etc.) which may be used to transmit the rotary motion through the flexible drive members.

It should be appreciated that the drive members 34 and the motor assembly 36 may be provided in many widely varying configurations. For example, the embodiment shown in FIG. 2 may be modified by positioning the drive member 34*c* between the lifting assemblies 30*c*, 30*d*. In this configuration, two drive members 34 are positioned transverse to the side walls 16, 18 and one drive member 34 is positioned parallel to the side walls 16, 18. In another embodiment, the drive members 34 may include any combination of rigid and flexible drive members including situations where all of the drive members 34 are flexible.

The motor assembly 36 may also be provided in any of a number of configurations such as those shown in the embodiments of FIGS. 1-2. Also, the motor assembly 36 may be coupled to only one moving assembly 50 (e.g., FIG. 1), coupled to only one drive member 34 (e.g., coupled to drive member 34*a* halfway between the moving assemblies 50*a*, 50*c*), coupled to both a moving assembly 50 and a drive member 34 (e.g., FIG. 2), and so on. In one embodiment, it may be desirable to position the motor assembly 36 between at least two of the drive members 34 as shown in FIG. 2 rather than at one end of the drive members 34 as shown in FIG. 1 in order to decrease the distance that the driving force is transmitted from the motor assembly 36. However, either configuration may be used in an effective manner.

In FIGS. 3-10, each of the lifting assemblies 30 from FIG. 2 are shown in greater detail. For each lifting assembly 30, two views are provided. One where the support assembly 60 is exploded and the moving assembly 50 is assembled, and one where both the support assembly 60 and the moving assembly 50 are exploded. The lifting assembly 30*c* is shown and described first and then the remainder of the lifting assemblies 30*a*, 30*b*, 30*d* are described in that order.

Figure 3:
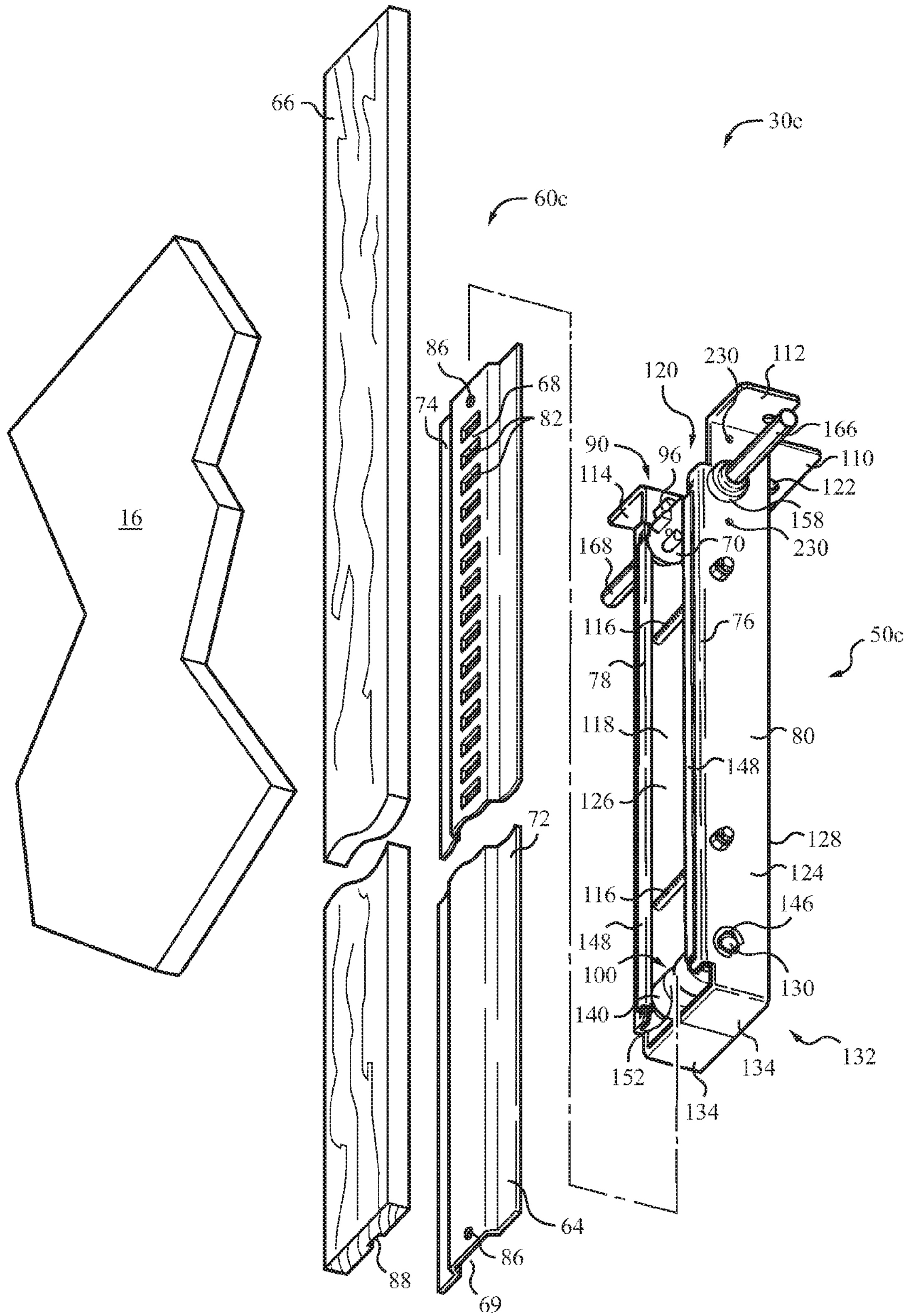
FIGS. 3-10 show alternating assembled and exploded perspective views of the lifting assemblies which may be included as part of a system for vertically moving one or more beds.

In FIG. 3, an exploded view of the lifting assembly 30*c* is shown. The support assembly 60*c* may include a support member 64—alternatively referred to herein as a guide member, stanchion, or rail—and a backing or spacing member 66. The support assembly 60*c* may be coupled to the first side wall 16 using any of a number of suitable fasteners or fastener methods (e.g., nut and bolt, screw, weld, rivets, glue, clamp, etc.). The particular type of fastener is not critical, however, it should be capable of securely coupling the support assembly 60*c* to the first side wall 16. In one embodiment, the fastener extends through the support member 64 and the backing member 66 and into the first side wall 16 to securely couple the support assembly 60*c* to the vehicle 10. In other embodiments, the backing member 66 and the support member 64 may be coupled to the vehicle 10 sequentially rather than as one component (e.g., the backing member 66 is coupled to the vehicle 10 first then the support member 64 is coupled to the vehicle 10).

In another embodiment, the support assembly 60*c* may be coupled to the first side wall 16 in a selectively releasable manner. A person using the vehicle 10 may be able to selectively couple and decouple the support assembly 60*c* from the first side wall 16, and, thus, couple and decouple the lifting assemblies 30 from the vehicle 10. When the system 12 is desired to be used for a particular outing, the system 12 may be coupled to the vehicle 10. However, in situations where the system 12 is not needed, the system 12 may be decoupled or removed from the vehicle 10.

In the embodiment shown in FIG. 3, the support member 64 includes an engaging portion 68 alternatively referred to herein as an interlocking portion, meshing portion, rack portion, or middle portion—a first securing flange 72, and a second securing flange 74—the flanges 72, 74 may alternatively be referred to herein as securing members or securing guides. The support member 64 may also define a recess or channel 69. The recess 69 may be formed by offsetting the engaging portion 68 relative to the flanges 72, 74 so that the flanges 72, 74 extend outwardly from the engaging portion 68 in a plane which is parallel to and slightly offset from the plane of the engaging portion 68. The engaging portion 68 cooperates with a gear 70—alternatively referred to herein as a rotatable member, rotatable wheel, toothed wheel, pinion, cogwheel, or gearwheel—which may be included as part of the moving assembly 50*c*. The first securing flange 72 and the second securing flange 74 respectively cooperate with a first securing flange 76 and a second securing flange 78—the flanges 76, 78 also may alternatively be referred to herein as securing members or securing guides—included as part of the moving assembly 50*c* as shown in FIG. 3. This is one way in which the moving assembly 50*c* movably cooperates with the support member 64.

In one embodiment, the engaging portion 68 may include a plurality of openings 82—alternatively referred to herein as holes, apertures, or slots—which cooperate with the gear 70. As shown in FIG. 3, the openings 82 have a generally rectangular or polygonal form. However, it should be appreciated that in other embodiments, the openings 82 may be round, oval, elliptical, or any other suitable shape. It should also be appreciated that the engaging portion 68 may include a plurality of recesses or indentations (not shown) which cooperate with the gear 70.

Figure 10:
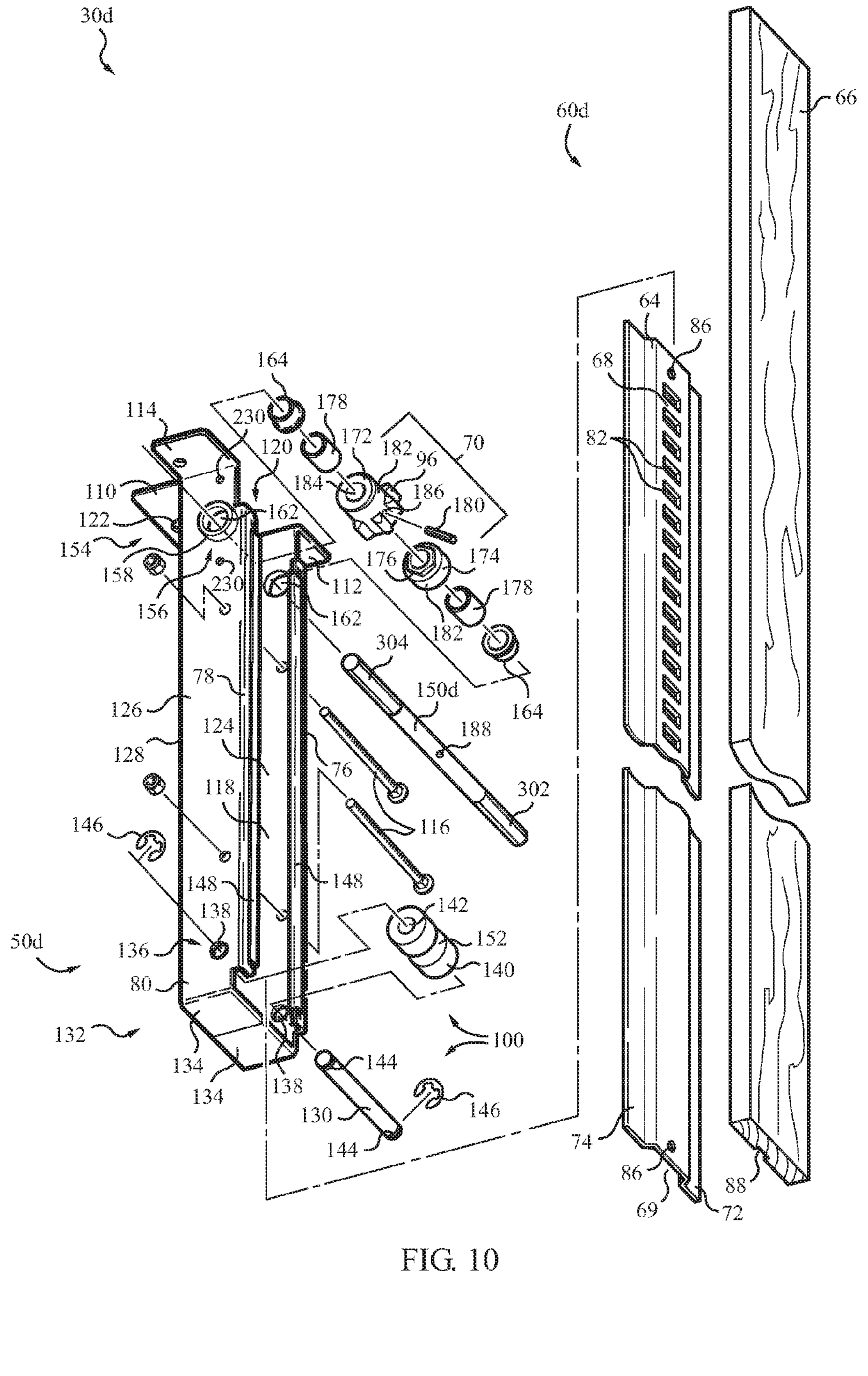
Figure 11:
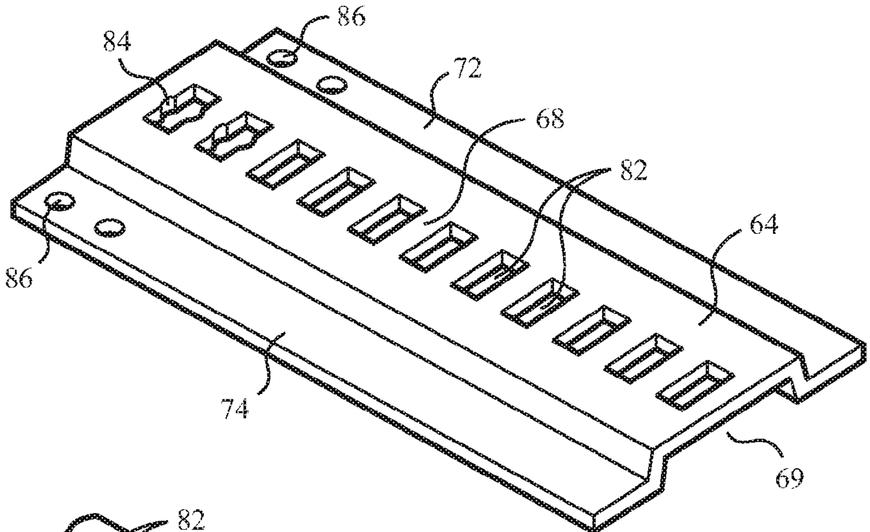
FIG. 11 shows a perspective view of one embodiment of a support member which may be used in a system for vertically moving one or more beds.

Referring to FIG. 11, one or more of the openings 82 may include a curved section 84 that is capable of accommodating a fastener such as a bolt, screw, etc. to couple the support member 64 to the first side wall 16. The fastener may be configured to be received by the curved section 84 of the opening 82, extend through an opening in the backing member 66 and into the first side wall 16. Holes 86 may also be provided in the flanges 72, 74 (FIG. 11) or the engaging portion 68 (FIGS. 3-10) to couple the support member 64 to the first side wall 16. It should be appreciated that the support member 64 may be coupled to the first side wall 16 in numerous ways, including those ways described previously in connection with coupling the lifting assembly 30*c* to the first side wall 16.

Figure 12:
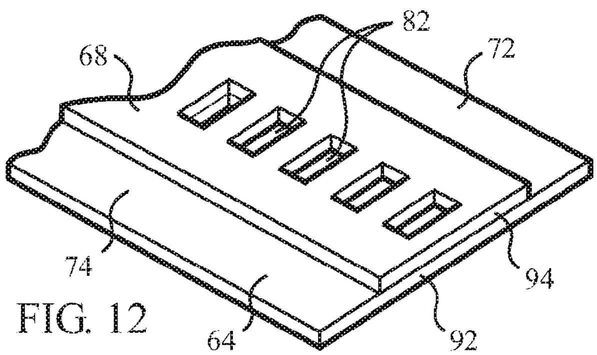
FIG. 12 shows a perspective view of another embodiment of a support member which may be used in a system for vertically moving one or more beds.

Referring to FIG. 12, another embodiment of the support member 64 is shown. In this embodiment, the support member 64 includes a first plate member or first element 92 and a second plate member or second element 94 overlaid on each other. The first plate member 92 is wider than the second plate member 94 so that by coupling the plate members 92, 94 together the portions of the first plate member 92 that extend beyond the edges of the second plate member 94 form the flanges 72, 74. The openings 82 may be provided in both the first plate member 92 and the second plate member 94 so that the support member 64 is capable of cooperating with the gear 70. It should be appreciated that the support member 64 may be made in a number of suitable ways to provide an equally large number of configurations in addition to those described herein.

The cross-section of the support member 64 can be varied as desired and according to the particular use thereof. For example, the support member 64 may have other configurations such as square, rectangular, polygonal, or other configurations so long as the configuration allows the support member 64 to perform the general functions described and shown herein. The support member 64 may be made of any of a number of suitable materials. For example, the support member 64 may include metals, plastics, composites, fibrous materials, or the like so long as the material has sufficient strength to support the raising and lowering of the bed 40 or other objects. In one embodiment, the support member 64 may be made of a steel material of a suitable gauge to perform the general functions described herein yet without being overly heavy (e.g., 11-gauge steel).

In another embodiment, the support member 64 may be integrally formed with and/or recessed within the first side wall 16 of the vehicle 10 in order to provide an aesthetically pleasing appearance and/or to provide additional stability and/or strength. For example, the support member 64 may be formed by directly coupling the first plate member 92, shown in FIG. 12, to a wood or metal (e.g., aluminum) stud in the wall. The stud may function in a manner similar to that of the second plate member 94 referred to in connection with FIG. 12. For example, the stud may be configured similar to the backing member 66 or the second plate member 94 to allow the gear to cooperate with the support member 64.

Referring back to FIG. 3, the backing member 66 may include a groove 88 which is used to provide a space behind the engaging portion 68 of the support member 64 so that teeth 96—alternatively referred to herein as projections, protrusions, or knobs—on the gear 70 may freely extend through the openings 82. The backing member 66 may be made using a variety of materials including metals, plastics, wood, composites, and so on. In one embodiment, the backing member 66 may be a wood board (e.g., pine) which is relatively inexpensive and readily available. Depending on the material used, the groove 88 may be formed using any of a number of conventional techniques (e.g., woodworking techniques, metal processing techniques, etc.).

The support member 64, as previously discussed, supports much of the weight associated with the bed 40, thereby acting as a load bearing member. When the size of the bed 40 increases or additional beds are coupled to the support member 64, the load on the support member 64 increases. Thus, it may be desirable to provide a stronger backing member 66. FIGS. 13-16 show alternative embodiments of the backing members 66 which may provide additional strength.

Figure 13:
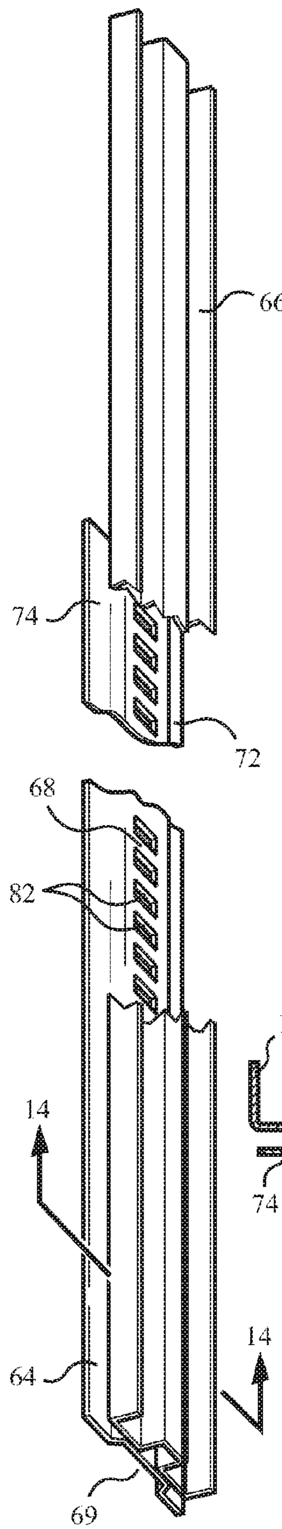
FIG. 13 shows a perspective view of one embodiment of a support assembly which may be used in a system for vertically moving one or more beds.
Figure 14:
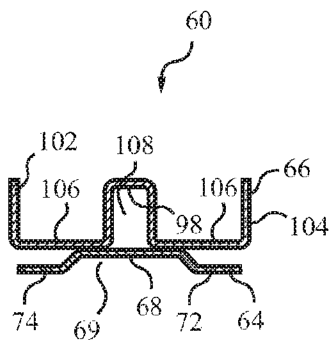
FIG. 14 shows a cross-sectional bottom view of the support assembly from FIG. 13.

FIG. 13 shows a perspective view of one embodiment of the support assembly 60 where the backing member 66 comprises a steel material. FIG. 14 shows a cross-sectional view of the support assembly 60 of FIG. 13. The backing member 66 includes a first side wall 102, a second side wall 104, a mounting surface 106, and a channel or recess 108 in the mounting surface 106. The support member 64 is coupled to the mounting surface 106 so that the channel 108 is positioned on the back side of the engaging portion 68. The backing member 66 may be coupled to the vehicle 10 using fasteners as described previously. Also, the backing member 66 may include flanges (not shown) which extend outward from the side walls 102, 104 and include holes which may be used to receive a fastener to mount the backing member 66 to the vehicle 10. Alternatively, the backing member 66 may be coupled to the vehicle 10 using a fastener that extends through the curved sections 84 of the openings 82 in the support member 64 and through a base portion 98 of the channel 108 and into the vehicle 10.

Figure 15:
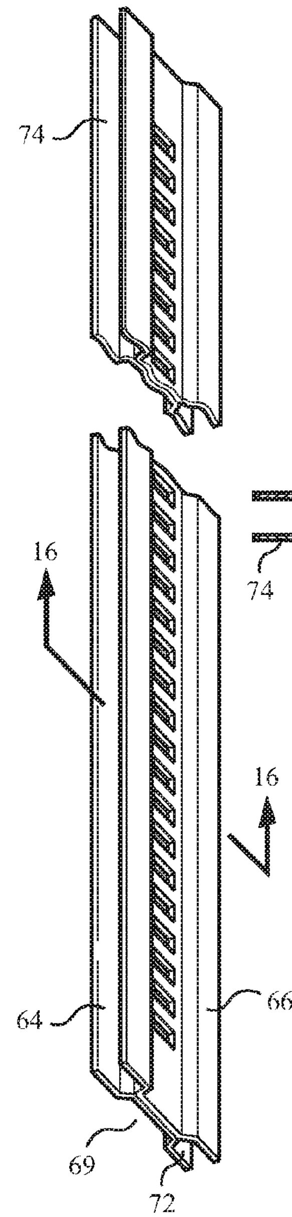
FIG. 15 shows a perspective view of another embodiment of a support assembly which may be used in a system for vertically moving one or more beds.
Figure 16:
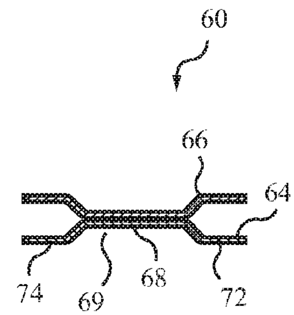
FIG. 16 shows a cross-sectional bottom view of the support assembly from FIG. 15.

FIG. 15 shows a perspective view of another embodiment of the support assembly 60 where the backing member 66 and the support member 64 have the same cross-sectional configuration. FIG. 16 shows a cross-sectional view of the embodiment of FIG. 15. In this embodiment, the engaging portions 68 of two of the support members 64 may be coupled together so that the flanges 72, 74 on each support member 64 are spaced apart from each other. As shown in FIG. 16, the support assembly 60 generally has an "I" shaped cross-section.

As shown in FIGS. 3-10 and 13-16, the cross-sectional shape of the backing member 66 may be vary widely. For example, the backing member 66 may have a cross-section which is oval, rectangular, trapezoidal, polygonal, or the like. It should be appreciated that various other configurations of the backing member 66 may be possible and other methods may be used to increase the strength of the backing member 66 and/or the support member 64.

Referring back to the embodiment of FIG. 3, the support assembly **60*c* includes the support member 64 and the backing member 66. However, it should be appreciated that the support assembly 60*c* may include more or less components than those shown in FIG. 3. For example, the support assembly 60*c* may include only the support member 64 and not include the backing member 66. A groove or channel similar to the groove 88 may be provided in the first side wall 16 to allow the teeth 96 on the gear 70 to extend through the openings 82. Alternatively, the engaging portion 68 of the support member 64 may be sufficiently thick to prevent the teeth 96 from protruding through the openings 82. The support assembly 60*c* may include a single unitary component or a combination of numerous components. Accordingly, a number of embodiments may be provided of the support assembly 60*c*** which include a wide variety of components.

As shown in FIG. 3, the moving assembly **50*c* includes a moving member 80—alternatively referred to herein as a housing, bracket, moving guide member, or sliding member—a drive mechanism 90, a roller assembly 100, and cross braces 116. The moving assembly 50*c* cooperates with the support assembly 60*c* to enable vertical movement of the bed 40. In one embodiment, the moving assembly 50*c* slidably cooperates with the support assembly 60*c* to vertically move the bed 40**.

The moving member 80 includes a first side 124, a second side 126, and a base 128. The first securing flange 76 and the second securing flange 78 extend from the first side 124 and the second side 126, respectively, towards each other to form a gap 118 there between. In one embodiment, the moving member 80 may have a C shaped cross-section (e.g., a C-channel). However, it may be appreciated that a wide variety of cross sectional configurations may be provided for the moving member 80. As previously discussed, the support member 64 may be configured to be positioned in the gap 118 with the flanges 72, 74 of the support member 64 slidably cooperating with the flanges 76, 78 of the moving member 80. In this manner, the moving member 80 may be securely yet movably coupled to the support member 64 and used to move the bed 40. It should be appreciated that other configurations may also be used to provide a secure and movable relationship between the moving member 80 and the support member 64.

Mounting members 110, 112, 114—alternatively referred to herein as mounting brackets or support flanges—extend outwardly from and perpendicularly to the base 128, the first side 124, and the second side 126, respectively. The mounting members 110, 112, 114 are used to couple and/or support the bed 40 on the moving assembly **50*c*. To this end, the mounting member 110 includes an aperture or hole 122 which may be configured to receive a corresponding mounting element (e.g., pin) from the bed 40**.

The first side 124, the second side 126, the base 128, and the flanges 76, 78 all cooperate to define a channel 120 along a longitudinal direction of the moving member 80. The cross braces 116 extend between the first side 124 and the second side 126 to prevent the sides 124, 126 from spreading apart during repeated use. In the embodiment shown in FIG. 3, each cross brace 116 includes a bolt and corresponding nut (e.g., self-locking nut). In other embodiments, a strip of metal or any other suitable component may be coupled between the sides 124, 126 to prevent spreading. It should be appreciated that many different components may be used as the cross braces 116. Although two cross braces 116 are shown in FIG. 3, in other embodiments, one, two, three or more cross braces 116 may also be used.

Figure 4:
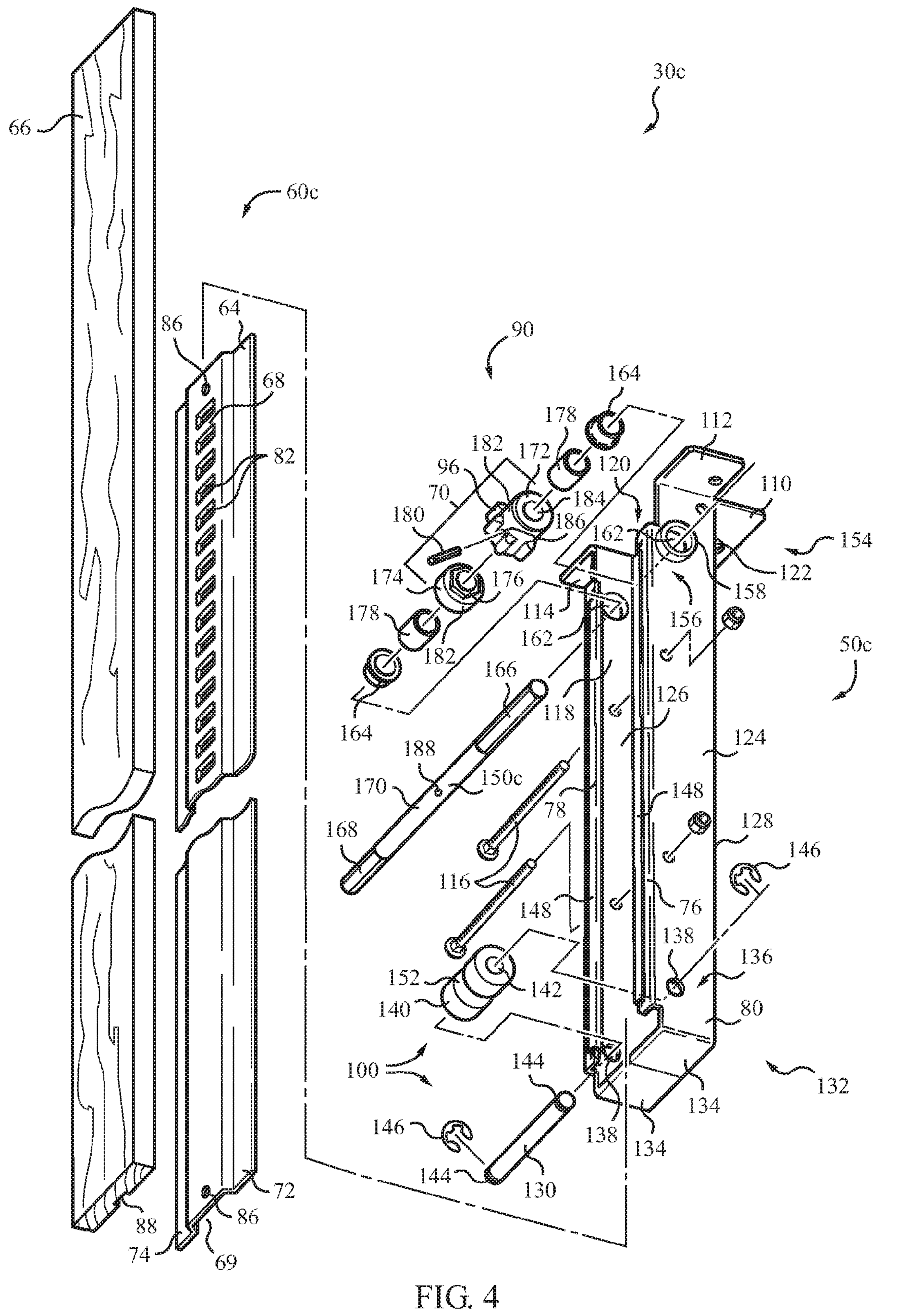

Referring to FIG. 4, the lifting assembly **30*c* from FIG. 3 is shown with the moving assembly 50*c* exploded. Disposed at a lower or first end 132 of moving assembly 50*c* are elements or flanges 134 that close the channel 120 of the moving member 80. The elements 134 may serve to prevent a person from inserting their hand or fingers into the channel 120 while the moving assembly 50***c* is moving the bed 40.

A roller mounting structure or roller mount 136 is also disposed at the lower end 132. The roller mounting structure 136 includes two holes 138 formed in the first side 124 and the second side 126. The holes 138 are capable of cooperating with the roller assembly 100 to secure the roller assembly 100 to the moving member 80. It should be appreciated that various other structure may also be used to couple the roller assembly 100 to the moving member 80 such as brackets, etc. In another embodiment, the holes 138 may be tapered to cause a friction fit with the roller assembly 100. In yet another embodiment, the holes 138 may include bushing protrusions that cooperate with bushings included as part of the roller assembly 100.

The roller assembly 100 includes a support shaft 130 and a roller 140. The support shaft 130 is sized to securely fit within the holes 138 and an axial hole 142 which extends through the roller 140. The holes 138 and axial hole 142 are sized and configured to allow the roller 140 to rotate about the support shaft 130 and/or to allow the support shaft 130 to rotate within the holes 138. In one embodiment, the support shaft 130 includes two fastening grooves 144 formed in the surface thereof, which are adapted to receive fastening clips 146. In one embodiment, as shown in FIG. 4, the fastening clips 146 may be E-clips. The fastening clips 146 and the fastening grooves 144 assist in retaining the support shaft 130 within the holes 138. Various other structure may also be used with or in place of the support shaft 130, the fastening clips 146, and the fastening grooves 144. For example, the support shaft 130 may include pin holes that accommodate split pins or the like, which prevent retraction of the support shaft 130 from within the holes 138. In another embodiment, the roller 140 may be coupled to the base 128 of the moving member using any of a number of suitable brackets or supports. The support shaft 130 can be manufactured from a variety of materials such as metals, composites, plastics, and the like. In one embodiment, the support shaft 130 is composed of steel material.

When the support member 64 is positioned in the gap 118 that is part of the channel 120, the roller 140 is disposed in the recess 69 and cooperates with the engaging portion 68. The roller 140 is sized and positioned to securely hold the flanges 72, 74 of the support member 64 in snug cooperation with the flanges 74, 78 of the moving member 80. In this manner, undesired movement (e.g., excessive play, etc.) between the moving assembly 50*c* and the support assembly 60*c* may be reduced. Because the flanges 72, 74 of the support member 64 may be configured to slide in continual contact with the flanges 76, 78 of the moving member 80, wear guides or wear strips 148 may be placed over (e.g., as a sleeve, etc.) or between any one or more of the flanges 72, 74, 76, 78 to minimize friction, wear, etc. The wear guides 148 may be any suitable low friction material such as a polymeric material, etc. In one embodiment, the wear guides 148 may comprise a nylon material available from Petro Extrusion Technologies, 490 South Avenue, Garwood, N.J. 07027 as "Nyla-Glide with Moly," as item number 06-287-14. The wear guides 148 may be coupled to the flanges 76, 78 using any of a number of suitable fasteners. In one embodiment, the wear guides 148 may be coupled to the flanges 76, 78 using glue or adhesive strips. A mechanical divet may also be placed at each end of the wear guides 148. The divets may extend through the wear guides 148 and into the flanges 76, 78. By configuring the flanges 72, 76 and the flanges 74, 78 to cooperate in sliding contact with each other, it may be possible to attain a tight fit between the support member 64 and the moving member 80 which may otherwise be difficult to obtain using other configurations and methods. That being said, other configurations and methods may also be used to move the moving assembly 50*c* relative to the support assembly 60*c* depending on the desired end use, cost, and manufacturing efficiencies.

With continued reference to FIG. 4, the roller 140 has a generally cylindrical configuration and includes a groove 152. As mentioned above, the roller 140 cooperates with the recessed side of the engaging portion 68 of the support member 64. The roller 140 self-centers in the recess 69 of the support member 64 during movement of the moving member 80. The groove 152 is provided to allow the roller 140 to pass over fasteners (e.g., bolt heads, screw heads, etc.) that may be positioned in the engaging portion 68 of the support member 64. For example, in FIG. 27 a fastener may be provided in the holes 86 over which the roller 140 travels but below where the gear 70 travels. The groove 152 is one way in which the roller 140 may travel unimpeded over the fastener. In another embodiment, the roller 140 may be configured without the groove 152. In this embodiment, the fasteners which cooperate with the holes 86 may be substantially flush with the engaging portion 68 of the support member 64 (e.g., tapered bolt head, etc.).

The roller 140 may be composed of various types of materials such as metal, composites, plastics, and the like. In one embodiment, the roller 140 is composed of a plastic material such as an acetal polymer (e.g., Delrin® available from DuPont). In addition to the embodiments of the roller 140 described herein, additional embodiments are also contemplated. For example, bearing rollers and other like rollers may also be used.

In another embodiment, the flanges 76, 78 may be U-shaped and define a channel which is configured to receive the flanges 72, 74 on the support member 64. Since the flanges 72, 74 are secured in the channels defined by the flanges 76, 78, the roller assembly 100 may be eliminated. The wear guides 148 may also be positioned between the flanges 72, 74 and the U-shaped channel to reduce the friction. Many other embodiments may also be provided to securely guide the movement of the moving members 80 in cooperation with the support members 64.

The mounting members 110, 112, 114, and a drive mounting structure or gear mount 156 are disposed at an upper or second end 154 of the moving assembly 50*c*. The drive mounting structure 156 includes two bushing protrusions 158 which extend outwardly from respective surfaces of the first side 124 and the second side 126 in a direction away from the channel 120. The bushing protrusions 158 define holes 162 in the sides 124, 126 which receive the drive mechanism 90 and cooperate therewith to allow rotation of the gear 70. It should be appreciated that various other configurations of the drive mounting structure 156 may be used. For example, in an alternative embodiment, the drive mounting structure 156 may utilize holes that have the form of an oblong slot extending to the end of the first side 124 or second side 126, distal from the base 128. In this embodiment, the slot may be capped with a securing flange that closes the open end thereof thereby coupling the drive mechanism 90 to the moving assembly 50*c*. In another embodiment, the bushing protrusions 158 may be detachable and secured to the moving member 80 by way of one or more fasteners. In yet another embodiment, the drive mounting structure 156 may include a hole that has an interior tapered form that frictionally retains the drive mechanism 90 to the moving member 80.

With continued reference to FIG. 4, the drive mechanism 90 includes the gear 70 and a drive shaft or drive member 150*c*. The drive shaft 150*c* is configured to be received within the holes 162 of the moving member 80 with the aid of bushings 164, while being capable of freely rotating within the bushings 164. As depicted in FIG. 4, the drive shaft 150*c* has a generally cylindrical configuration. The drive shaft 150*c* includes a first end 166, a second end 168, and an intermediate portion 170. The ends 166, 168 are shaped to allow the drive members 34, motor assembly 36, etc. to be engaged thereto. As shown in this embodiment, the ends 166, 168 are generally hexagonal in shape while the intermediate portion 170 is generally cylindrical in shape. It should be appreciated that the ends 166, 168 and the intermediate portion 170 may have various other cross-sectional shapes, such as square, octagonal, triangular, oval, polygonal, star shaped, or the like.

In one embodiment, the gear 70 comprises a first portion 172 and a second portion 174 which may be coupled together to form the gear 70. The second portion 174 includes a hexagonal shaped protrusion 176 which is received by a corresponding hexagonal shaped recess (not shown) in the first portion 172 to securely hold the portions 172, 174 together. The gear 70 may be provided in two portions to facilitate making the gear from powdered metal. In other embodiments, the gear 70 may be machined or the like to provide a single component. Spacers 178 positioned between the sides 124, 126 and the portions 172, 174 of the gear 70 may be used to hold the portions 172, 174 in engagement with each other. The spacers 178 may also serve to position the gear 70 in the middle of the gap 118 to cooperate with the engaging portion 68 of the support member 64.

The gear 70 may also be configured to include two cylindrical surfaces 182 positioned adjacent to and on each side of the teeth 96. The surfaces 182 cooperate with the engaging portion 68 of the support member 64 to provide a snug or tight fit between the flanges 72, 76 and the flanges 74, 78 in a manner similar to the roller 140. In effect, the gear 70 may also function as a roller. In should be understood that in other embodiments, the gear 70 may be configured without the surfaces 182. For example, another roller 140 may be provided adjacent to the gear 70 to maintain the flanges 72, 74 of support member 64 in cooperation with the flanges 76, 78 of the moving member 80. In another embodiment, the gear 70 may be configured without the surfaces 182, and the moving member 80 may be configured without another roller 140 adjacent to the gear 70. Many other embodiments for accomplishing the same result may also be used.

Figure 17:
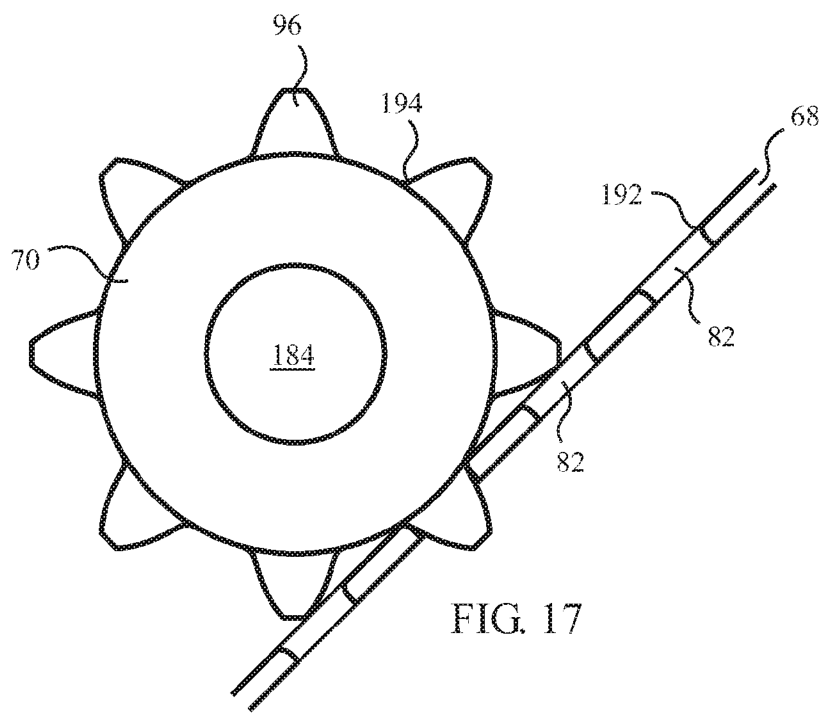
FIG. 17 shows a side view of one embodiment of a toothed member in cooperation with a support member which may be used in a system for vertically moving one or more beds.

The gear 70 is adapted to cooperate with the drive shaft 150*c*. In general, the gear 70 has a generally cylindrical form with a plurality of teeth 96 extending outwardly from a surface thereof. The teeth 96 are configured to cooperate with the openings 82 in the support member 64, as shown in FIG. 17. With continued reference to FIG. 4, the gear 70 includes an axial hole 184 which is sized to cooperate with the drive shaft 150*c*. In this embodiment, the axial hole 184 has a generally cylindrical configuration to match the intermediate portion 170 of the drive shaft 150*c*. However, various other cross-sectional shapes may be used as long as the axial hole 184 and the drive shaft 150*c* cooperate with each other. For example, the intermediate portion 170 and the axial hole 184 may have a hexagonal cross-section. The portion of the drive shaft 150*c* which cooperates with the bushings 164 may be cylindrical and have a smaller diameter than the hexagonal intermediate portion 170. This allows the gear 70 to be received on the intermediate portion 170. The ends 166, 168 may have a smaller diameter hexagonal shaped cross-section than the portion that cooperates with the bushing 164. It may be desirable for the bushings 164 to be inserted from the outside of the channel 120 into the holes 162. A fastener such as the fastener clip 146 may be used to hold the bushings 164 in place.

The gear 70 includes a retaining hole 186 which passes through the gear 70 and is sized similarly to a retaining hole 188 in the drive shaft 150*c*. As shown in FIG. 4, when the gear 70 is coupled to the drive shaft 150*c*, retaining holes 186, 188 align to accommodate a securing pin or member 180. The securing pin 180 prevents the gear 70 from slipping relative to the drive shaft 150*c* as the drive shaft 150*c* rotates to raise and/or lower the bed 40. In another embodiment, as previously mentioned, the drive shaft 150*c* and the axial hole 184 can have complementary shapes (e.g., square, hexagonal, etc.) such that the complementary shape limits any slippage that might occur between the drive shaft 150*c* and the gear 70. The drive shaft 150*c* and/or the gear 70 may be prevented from moving in an axial direction by the securing pin 180 in conjunction with the spacers 178. The securing pin 180 prevents the gear 70 from moving axially relative to the drive shaft 150*c*. The spacers 178 prevent the gear 70 from moving axially relative to the moving member 80. In another embodiment, the fastening clips 146 may be used to prevent axial movement of the drive shaft 150*c* and/or the gear 70 relative to the moving member 80 in a manner similar to the roller 140.

As illustrated in FIG. 17, the teeth 96 of the gear 70 engage the openings 82 in the engaging portion 68 of the support member 64. In this embodiment, the openings 82 are rectangular in shape (e.g., FIGS. 3-10) and about 0.25 inches (6.35 millimeters) in height and about 0.620 inches (15.748 millimeters) in width. The distance from the centers of adjacent openings 82 is about 0.500 inches (12.7 millimeters). The openings 82 may be formed in the support member 64 in a number of suitable ways such as machining, punching, etc. In one embodiment, shown in FIG. 17, the openings 82 are made using a punch press. The force of the punch striking the support member 64 may cause an edge 192 of the opening 82 to break away so that one side of the openings 82 is slightly larger than the other side of the openings 82. Thus, the opening 82 on the side of the support member 64 that faces the gear 70 is slightly larger than the opening 82 on the opposite side of the support member 64. A base portion 194 of the teeth 96 is rounded to cooperate with the edge 192. By designing the teeth 96 and the openings 82 to closely correspond to each other, backlash and otherwise undesirable slop or play between the moving assemblies 50 and the support assemblies 60 may be reduced.

Referring back to FIG. 4, the gear 70, the drive shaft 150*c*, the bushings 164, and the spacers 178 may be manufactured from a variety of materials such as metal, composites, plastics, and the like. In one embodiment, the gear 70, the drive shaft 150*c*, the bushings 164, and the spacers 178 may all be made of steel material. In another embodiment, the spacers 178 may be made of plastic, while the remaining components are made of steel material.

It should be appreciated that various configurations of the drive mechanism 90 may be used as long as the drive mechanism 90 is capable of moving the moving assembly 50*c* in cooperation with the support assembly 60*c*. For example, the gear 70 may be welded, brazed, or joined to the drive shaft 150*c*. In another embodiment, the drive shaft 150*c* may include holes that accommodate split pins that prevent the drive shaft 150*c* from coming out of the holes 162 in the moving member 80. In another embodiment, two gears 70 may be coupled to the drive shaft 150*c* and used to cooperate with a support member having two sets of openings 82. Accordingly, the number and configuration of the components included with the drive mechanism 90 may be widely varied as desired.

It should also be appreciated that various configurations of the moving assembly 50*c* may also be used. For example, in one embodiment, the drive mechanism 90 may be positioned at the lower end 132 of the moving assembly 50*c* and the roller assembly 100 may be positioned at the upper end 154 of the moving assembly 50*c*. In another embodiment, the moving assembly 50*c* may be shorter or longer than the embodiment shown in FIG. 4. Additionally, more or fewer components may be included as part of the moving assembly 50*c* as desired. Accordingly, the moving assembly 50*c* may be widely varied to fit the particular situation and the desires of the user and/or vehicle manufacturer.

FIGS. 5-10 show exploded views of the lifting assemblies 30*a*, 30*b*, 30*d*. The moving assemblies 50*a*, 50*b*, 50*d* are generally similar to the moving assembly 50*c*. The support assemblies 60*a*, 60*b*, 60*d* are also generally similar to the support assembly 60*c*. Accordingly, it should be appreciated that the description of the moving assembly 50*c*, the support assembly 60*c*, and their associated components is also applicable to the moving assemblies 50*a*, 50*b*, 50*d* and the support assemblies 60*a*, 60*b*, 60*d* without repeating the same discussion for each component. Thus, the following description of FIGS. 5-10 focuses on the additional aspects shown in FIGS. 5-10 which have not been described in connection with FIGS. 3-4. However, this is not to say that the additional aspects shown in FIGS. 5-10 are not applicable to the subject matter illustrated and described in connection with FIGS. 3-4. Rather, it is contemplated that, depending on the situation and the desires of the user and/or vehicle manufacturer, many of the additional aspects referred to in FIGS. 5-10 may be, and, indeed, often are, applicable to the subject matter in FIGS. 3-4. In general, it is contemplated that the subject matter shown or described in connection with any of FIGS. 1-10 may be applicable to any of the remainder of FIGS. 1-10.

Figure 5:
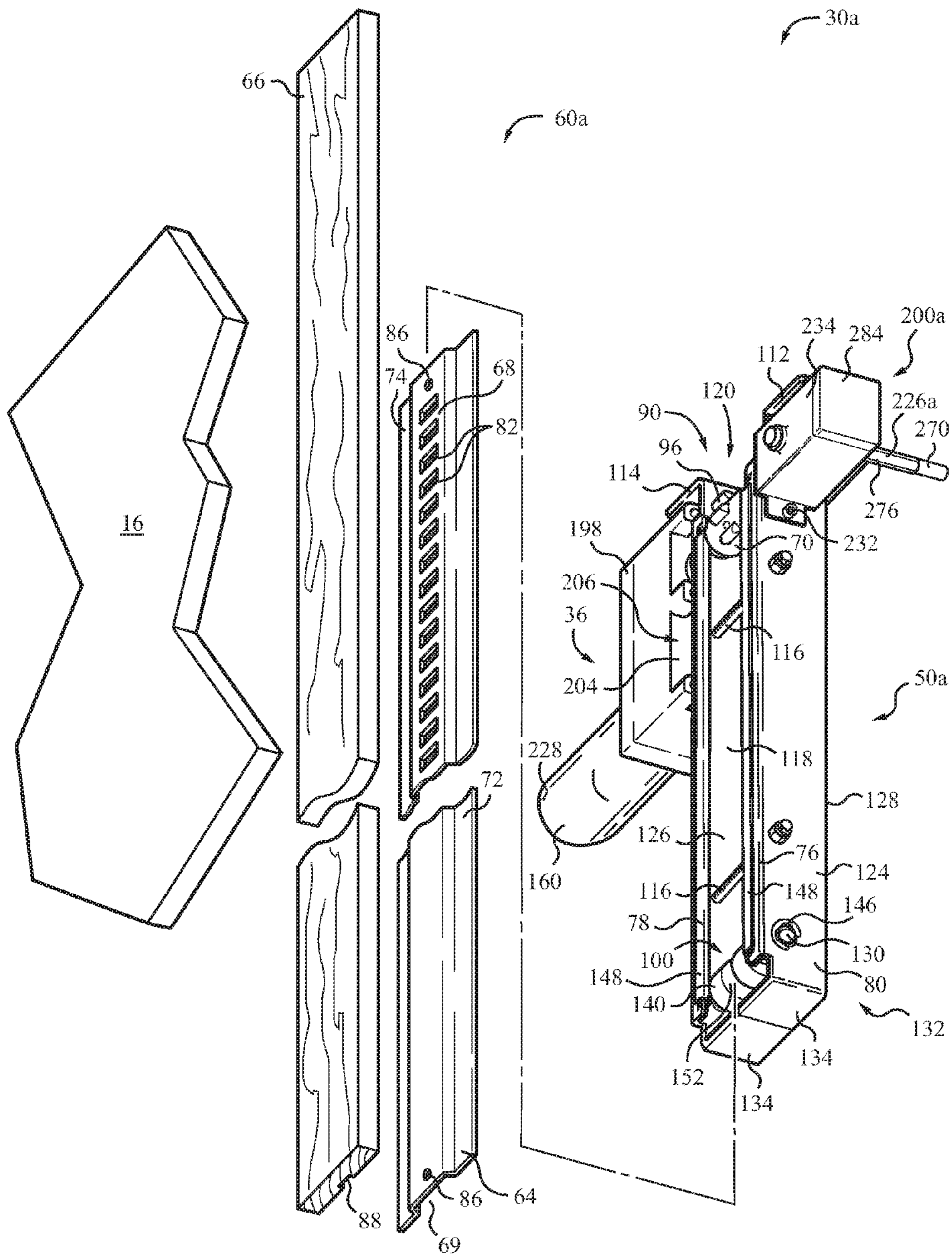
Figure 6:
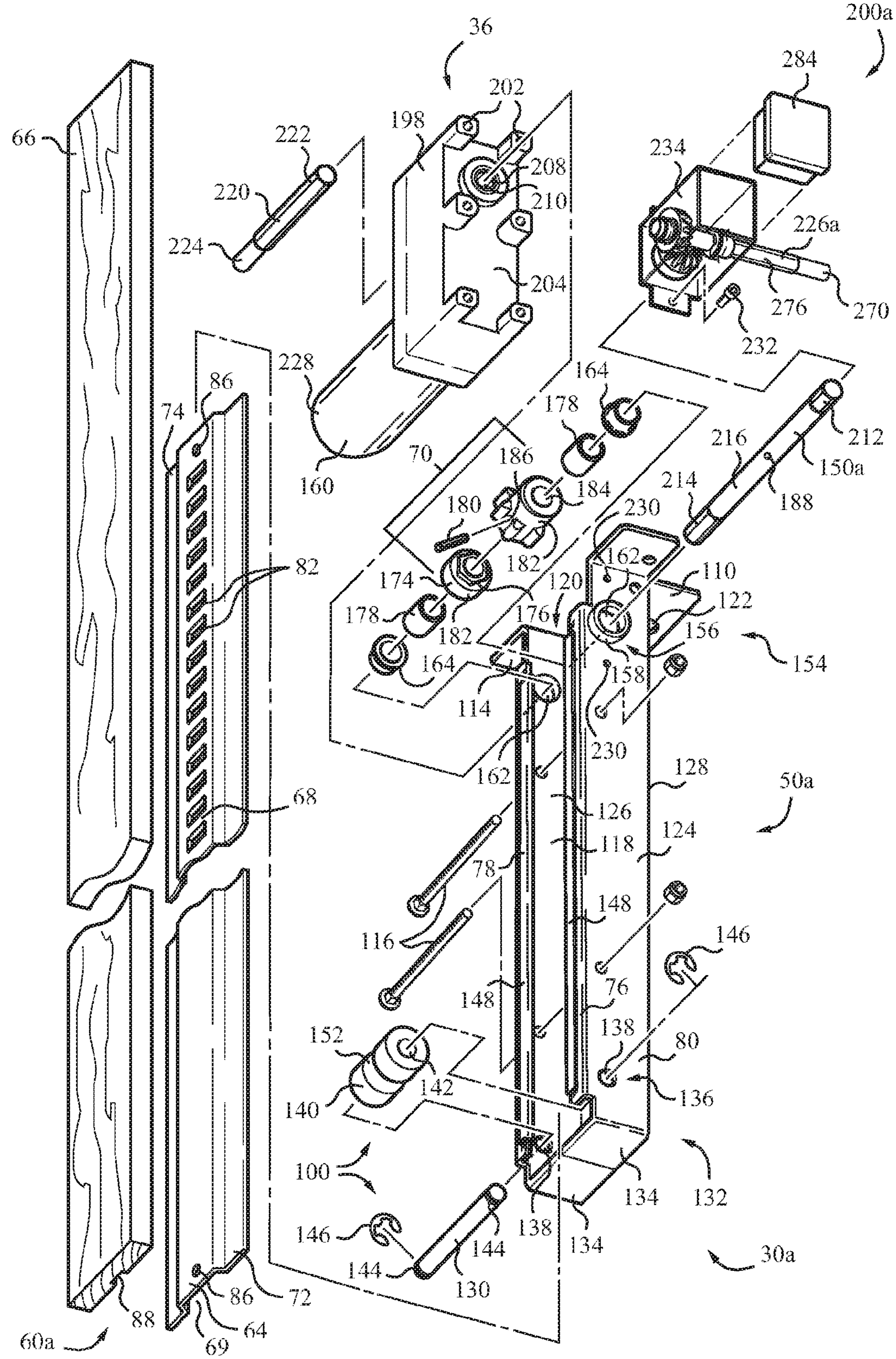

Referring to FIGS. 5-6, the motor assembly 36 may be used to vertically move the bed 40. In one embodiment, the motor assembly 36 is coupled to the second side 126 of the moving assembly 50*a*. However, as mentioned previously, the motor assembly 36 may be disposed at a variety of locations relative to one or more of the moving assemblies 50. For instance, the motor assembly 36 may be disposed half way between two moving assemblies 50. Further, the motor assembly 36 may be coupled to the moving assembly 50 using a bracket, one or more reduction gears, or other structures. In one embodiment, the motor assembly 36 is coupled to the moving assembly 50*a* without the use of a separate reduction gear assembly.

The motor assembly 36 includes an electric motor 160 which is coupled to a motor housing 198. The motor housing 198 includes one or more apertures 202 which can receive fasteners (not shown) to couple the motor housing 198 to the moving assembly 50*a*. Although the motor housing 198 is shown being coupled directly to the moving assembly 50*a*, in another embodiment, apertures 202 may receive fasteners (not shown) which couple the motor housing 198 to a bracket which in turn may be coupled to the moving assembly 50*a*. In general, the motor assembly 36 may be coupled to the moving assembly 50*a* in many different ways.

With continued reference to FIGS. 5-6, the apertures 202 may be raised relative to a surface 204 of the motor housing 198 to provide a space 206 between the second side 126 of the moving assembly 50*a* and the motor housing 198. The space 206 may be used to provide room for the bushing protrusions 158 and the cross brace 116 between the motor housing 198 and the second side 126 of the moving assembly 50*a*.

Disposed within the motor housing 198 are one or more gears or linkages (not shown) which may be used to convert or translate rotary motion of a motor shaft (not shown) of the motor 160 into rotary motion of a drive sleeve 208. The drive sleeve 208 may be used to transmit the rotary motion to a drive shaft 220 and a drive shaft 150*a*, both of which may, in turn, transmit the rotary motion to the drive members 34 and the gears 70 in the lifting assemblies 30. Although reference is made to the use of the electric motor 160, it should be appreciated that various other types of activation assemblies may be used such as pneumatic, hydraulic, gasoline, or the like.

In one embodiment, the motor 160 is at least about a ⅛ horsepower motor, or, desirably, at least about a 3/16 horsepower motor, or, suitably at least about ¼ horsepower motor. Also, the motor assembly 36 may provide a gear reduction ratio of at least about 100:1, or, desirably, at least about 150:1, or, suitably, at least about 200:1. A 200:1 ratio may provide the motor 160 with desirable speed versus torque characteristics for vertically moving the bed 40. The motor 160 may be configured to rotate the drive shafts 150*a*, 220 between about 15 rpm and 35 rpm, or, desirably, between about 20 rpm and 30 rpm, or suitably, about 25 rpm. A motor having these characteristics may be custom designed, or such a motor may be obtained from Stature Electric Inc. of 22543 Fisher Rd. Watertown, N.Y. 13601 as part number 5029.002. The motor 160 may be a direct current motor or an alternating current motor. Typically, but not always, direct current motors are used in mobile structures while alternating current motors are used in immobile structures.

In one embodiment, the motor assembly 36 may be configured to move the moving assemblies 50 between about 2 inches to about 6 inches (or about 5.1 centimeters to about 15.2 centimeters), or, desirably, between about 3 inches to about 5 inches (or about 7.6 centimeters to about 12.7 centimeters), or, suitably, about 4 inches (or about 10.2 centimeters) for each revolution of the drive shafts 150. This may be done without using intermediate reduction gears by configuring the motor assembly 36 with a suitable ratio such as at least about 150:1 or, suitably, 200:1 and by configuring the gear 70 with a suitable diameter such as no more than about 3 inches (or about 7.6 centimeters), or, desirably, no more than about 2 inches (or about 5.1 centimeters), or, suitably no more than about 1.5 inches (or about 3.8 centimeters).

With continued reference to FIGS. 5-6, the drive shaft 150*a* includes a first end 212, a second end 214, and an intermediate portion 216. The ends 212, 214 are generally hexagonal shaped and the intermediate portion 216 is generally cylindrically shaped. The drive shaft 220 includes a hexagonally shaped first end 222 and a cylindrically shaped second end 224. The drive sleeve 208 includes a hexagonally shaped bore 210 which is configured to cooperate with the first end 222 of the drive shaft 220 and the second end 214 of the drive shaft 150*a*. The bore 210 may have a number of varying configurations so long as the bore 210 is capable of cooperating with the first end 222 of the drive shaft 220 and the second end 214 of the drive shaft 150*a*. For example, the bore 210 may be square, octagonal, triangular, oval, star-shaped, polygonal, or other configurations that facilitate engagement between the bore 210 and the drive shafts 150*a*, 220. In an alternative embodiment, the motor housing 198 may include a drive shaft in place of the drive sleeve 208. The drive shaft may be configured to be drivably coupled to the drive members 34 or any other suitable driver member.

In one embodiment, the motor 160 includes a brake or brake member (not shown) which may be used to hold the bed 40 in a fixed position when the motor 160 is not activated. The brake may be coupled to an end 228 of the motor 160 which is distal to the motor housing 198. In one embodiment, the brake is an electrical/mechanical brake that may be used to prevent movement of the motor 160 when electricity is not provided to the brake. When electricity is provided, (e.g., when the motor 160 is activated) the brake is deactivated to allow the motor 160 to move the bed 40. The brake may include a manual actuation device which can be used to selectively deactivate the brake even when electricity is not provided to the brake. For example, if no electricity is available to deactivate the brake, then the manual actuation device may be used to deactivate the brake and allow the user to manually move the bed 40. A suitable brake of this type may be obtained from Stature Electric Inc. as part number 9550-799.

The motor 160 may be activated using a switch device coupled to the interior of the vehicle 10. In one embodiment, the switch device may be any suitable switch such as a three-way rocker switch. In another embodiment, the motor 160 may be controlled using a switch device which includes access control measures. For example, the switch device may be covered by a locked door (e.g., switch is recessed in a wall of the vehicle 10) to prevent access to the switch by those who do not have access privileges to the door. The door may be opened using a corresponding key, combination, etc., so that only those with the key, combination, etc. can access and/or activate the switch device. In another embodiment, the switch device may be coupled to a keypad which is used to receive a security code to allow the switch device to be actuated. In one embodiment, the motor 160 may be configured to allow the switch device to operate for a set time after the code has been entered. Once that set time expires, then the switch device is inoperable and the code must be entered again.

In another embodiment, the motor 160 may be controlled using an electronic control system (not shown). The control system may include a microprocessor and memory. The memory may be used to store set points representing positions of the bed 40. The control system may be configured to use feedback control to move the bed 40 repeatedly to the same position (e.g., use position, stowed position, etc.) with the push of a button (e.g., button labeled stow and button labeled deploy, each of which operate as indicated by their labels). The control system may be configured to allow the user to selectively input the desired position of the bed 40. In another embodiment, the set points in the control system may be set by the manufacturer of the vehicle 10.

The control system may include a number of sensors which are used to measure the position of the bed 40 as it moves vertically. The control system may then be used to repeatedly move the bed 40 between the desired use position and/or stowed position. In one embodiment, an encoder may be coupled to the motor 160 or any of the drive shafts 150, 220 or the drive members 34 to continually monitor the position of the bed 40. The encoder may provide a higher degree of accuracy and control than may otherwise be available using the proximity switch. Other position sensors may also be used such as rotary potentiometers, hall effect sensors, and the like. In one embodiment, the position sensor and the motor 160 may be one integral unit.

In yet another embodiment, the system 12 may include two motor assemblies 36 that are coupled to the control system. For example, one motor assembly 36 may be coupled to moving assembly 50*a* and another motor assembly 36 may be coupled to the moving assembly 50*b*. The vertical movement of the bed 40 may be controlled by monitoring the movement of one of the motors 160 and controlling the movement of the other motor 160 based on the movement of the one motor 160. For instance, an encoder may be coupled to the one motor 160 which provides a feedback signal to the control system indicating the position/rate of movement of the one motor 160. The feedback signal may be used to control the other motor 160 to move similarly to the one motor 160.

In another embodiment, a proximity switch, such as a micro switch, may be used to stop the movement of the bed 40 at the desired use position and/or stowed position. The proximity switch may be vertically adjustable so that the desired final position of the bed 40 may be adjusted accordingly. In one embodiment, the proximity switch may be configured to cut the power to the motor 160. In another embodiment, the proximity switch may be configured to provide feedback to the control system to stop the motor 160.

Referring to FIGS. 5-8, transmissions 200*a*, 200*b* (collectively referred to as the "the transmissions 200")—alternatively referred to herein as motion conversion assemblies, motion translation assemblies, or drive boxes—are included as part of lifting assemblies 30*a*, 30*b*. In general, the transmission 200*a* is used to translate motion between the drive shaft 150*a* and the drive member 34*b*, and the transmission 200*b* is used to translate motion between the drive member 34*b* and a drive shaft 150*b*. In the embodiments shown in FIGS. 5-8, the transmissions 200 use a pair of bevel gears 254, 264 to translate the rotational motion 90 degrees between the drive shafts 150*a*, 150*b* and the drive member 34*b*. However, in other embodiments, the transmissions 200 may be used in any of a number of suitable configurations with an equally wide number of varying components to translate motion or driving force from one direction to another direction (e.g., transmission 200 includes a worm gear that meshes with a spur gear, etc.).

Referring to FIG. 6, the transmission 200*a* may be coupled to the moving member 80 using holes 230 disposed on the first side 124 of the moving member 80. The holes 230 may be configured to receive any of a number of suitable fasteners such as those described previously. In the embodiment shown in FIGS. 5-6, the holes 230 are threaded and configured to receive a fastener 232 (e.g., threaded bolt). It should be appreciated that in other embodiments, the transmissions 200 may be coupled to the moving members 80 in a variety of suitable ways such as welding, brazing, etc. Also, the transmissions 200 may be integrally formed with the moving members 80.

In one embodiment, each of the moving members 80 include holes 230 on both the first side 124 and the second side 126. Holes 230 may be used to couple the transmissions 200 to either or both of the sides 124, 126. Thus, the moving assembly 50*a* may be provided by coupling the transmission 200 to the first side 124, and the moving assembly 50*b* may be provided by coupling the transmission 200 to the second side 126. In this manner, a single configuration for the moving assembly 50*a* may be used to provide both the moving assemblies 50*a*, 50*b*. In other embodiments, the moving member 80 may be configured to be coupled to the transmission 200 on only one side.

Figure 18:
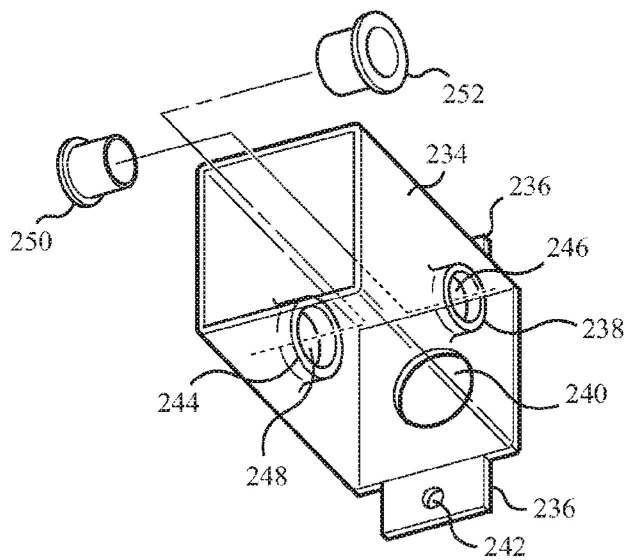
FIGS. 18-23 show perspective views of various stages of assembly of a transmission which may be used in a system for vertically moving one or more beds.

One embodiment of the transmission 200 is shown in greater detail in FIGS. 18-23. Referring to FIG. 18, the transmission 200 comprises a housing 234 which includes securing flanges or members 236, bushing protrusions or shaft mounts 238, 244 and a hole 240. The securing flanges 236 include holes 242 which are sized similarly to the corresponding holes 230 in the moving member 80. The fastener 232 (e.g., bolt, screw, etc.) may cooperate with the holes 230, 242 to couple the transmission 200 to the moving member 80. In other embodiments, the fastener 232 may be any of the fasteners described previously. The housing 234 may be square, as shown in FIGS. 18-23, or may be rectangular, polygonal, cylindrical, or any other suitable shape which is capable of housing or enclosing the components of the transmission 200.

Figure 19:
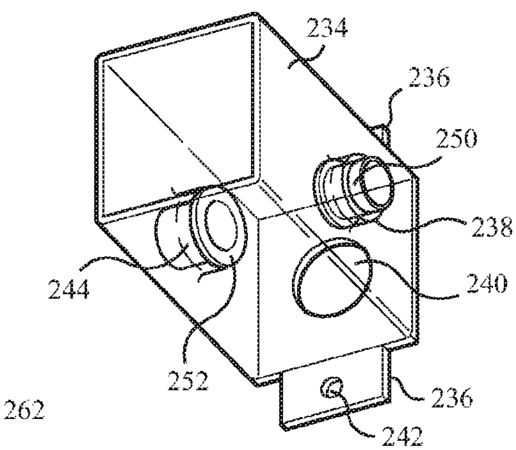
Figure 20:
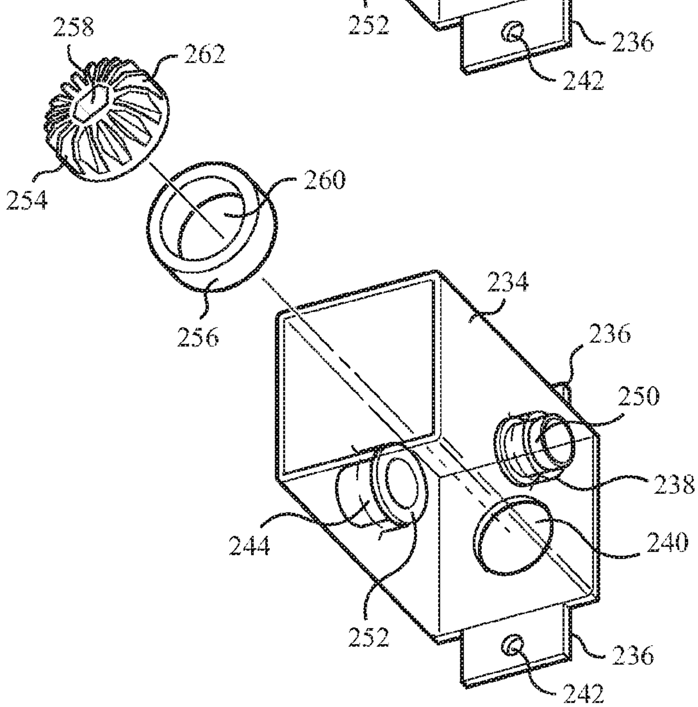
Figure 21:
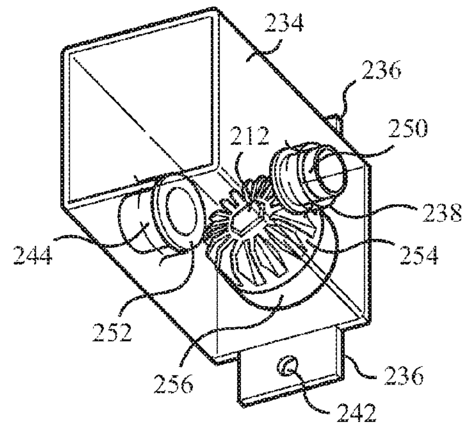

The bushing protrusions 238, 244 define apertures 246, 248, respectively, configured to receive respective bushings 250, 252. FIG. 19 shows the bushings 250, 252 positioned in the apertures 246, 248, respectively. Referring to FIG. 20, the transmission includes a first bevel gear 254 and a spacer 256. The first bevel gear 254 includes an axial hole 258, and the spacer 256 includes an axial hole 260. The axial hole 258 is sized to engage with the first end 212 of the drive shaft 150*a* so that the first bevel gear 254 and the drive shaft 150*a* move together. In one embodiment, the axial hole 258 has a hexagonal cross section which cooperates with the hexagonal first end 212. It should be appreciated that the axial hole 258 may have a variety of configurations so long as it is capable of cooperating with a corresponding drive shaft. For example, the axial hole 258 may have a cross-section which is square, octagonal, hexagonal, polygonal, triangular, oval, star-shaped, or other configurations that facilitate engagement with the first end 212. The axial hole 260 in the spacer 256 may be oversized relative to the drive shaft 150*a* to allow the drive shaft 150*a* to rotate freely in the axial hole 260 and/or allow the first bevel gear 254 to rotate relative to the spacer 256. When assembled, as shown in FIG. 21, the first end 212 of the drive shaft 150*a* extends through the holes 240, 260, 258 to a point just beyond the first bevel gear 254 and adjacent to gear teeth 262.

It should be appreciated that although the transmission 200 in FIGS. 18-23 is described in the context of FIGS. 5-6 (e.g., using the drive shaft 150*a* as examples, etc), the transmission 200 may be used in a wide variety of other configurations with a wide variety of components. Accordingly, the principles described in relation to the transmission 200 transcend the details of the embodiment illustrated in FIGS. 18-23.

Figure 22:
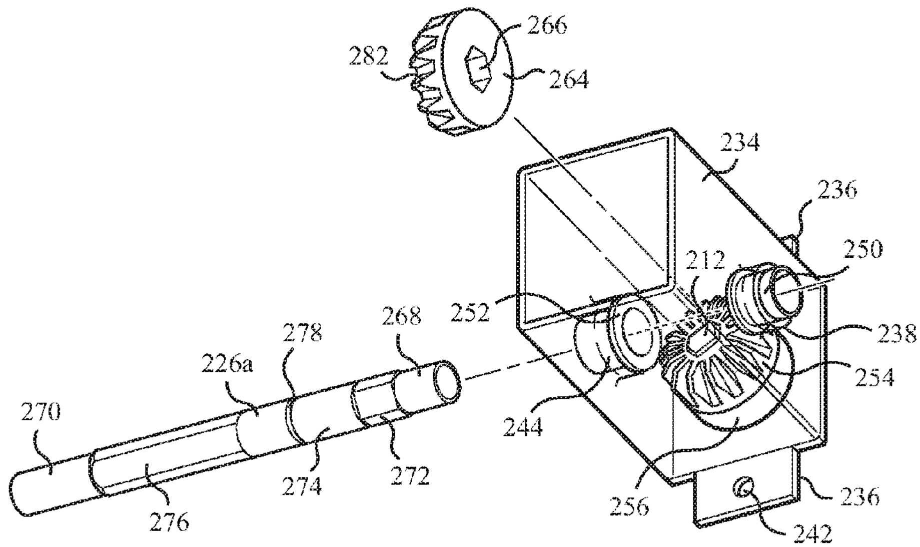

Referring to FIG. 22, the transmission 200 includes the drive shaft 226*a* and a second bevel gear 264 having an axial hole 266. The drive shaft 226*a* includes a first cylindrical end 268, a second cylindrical end 270, a first intermediate portion 272, a second intermediate portion 274, and a third intermediate portion 276. The first end 268 and the second intermediate portion 274 are sized to be received by and freely rotate inside the bushings 250, 252, respectively. The first intermediate portion 272 is configured to cooperate with the second bevel gear 264. In the embodiment shown in FIG. 22, the first intermediate portion 272 has a hexagonal cross-sectional shape which corresponds to the hexagonal shape of the axial hole 266 in the second bevel gear 264. However, the first intermediate portion 272 may have any suitable cross sectional configuration such as square, octagonal, triangular, star-shaped, or other configurations as long as the drive shaft 226*a* is capable of drivably cooperating with the second bevel gear 264. In another embodiment, both the first intermediate portion 272 and the second bevel gear 264 may have a cylindrical cross-section and a roll pin or other suitable fastener may be used to drivably couple the drive shaft 226*a* to the second bevel gear 264. For example, the roll pin may extend through corresponding holes in the first intermediate portion 272 and the second bevel gear 264. The second end 270 and the third intermediate portion 276 are configured to cooperate with the drive members 34.

In one embodiment, the ends 268, 270 and the intermediate portions 272, 274, 276 of the drive shaft 226*a* may be progressively larger in diameter to facilitate positioning the drive shaft 226*a* through the bushings 250, 252 and the second bevel gear 264. For example, the first end 268 may have a diameter which is smaller than the diameter of the first intermediate portion 272, which, in turn, is smaller than the diameter of the second intermediate portion 274. In this manner, the first end 268 may be inserted through the bushing 252 and the second bevel gear 264 before being positioned in the bushing 250. Likewise, the first intermediate portion 272 may be inserted through the bushing 252 before being received by the second bevel gear 264. In this embodiment, the bushings 250, 252 are different sizes to correspond to the different diameters of the first end 268 and the second intermediate portion 274, respectively, of the drive shaft 226*a*.

Figure 23:
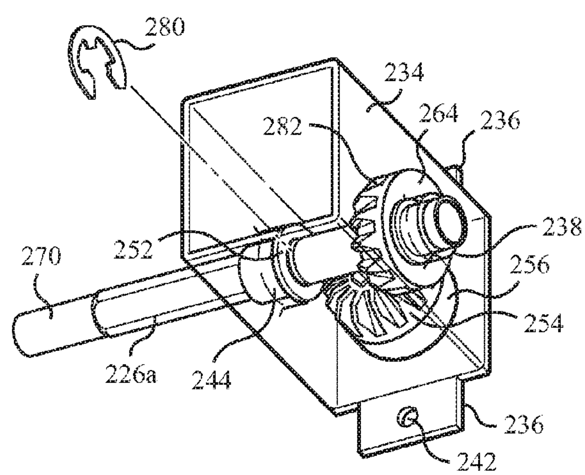

Referring to FIG. 23, a fastening clip 280 may be received by a fastening groove 278 in the drive shaft 226*a* to prevent the drive shaft 226*a* from moving longitudinally. When in place, the fastening clip 280 may be positioned inside the housing 234 and adjacent to or in contact with the bushing 252 to prevent longitudinal movement in a direction away from the second bevel gear 264. In addition, the drive shaft 226*a* may be prevented from moving longitudinally because the larger diameter of the first intermediate portion 272 is unable to fit within the bushing 250 and the larger diameter of the second intermediate portion 274 is unable to fit within the axial hole 266 of the second bevel gear 264. Referring back to FIGS. 5-6, a cap or top 284 is received by the housing to enclose the components of the transmission 200 in the housing 234.

In operation, rotational motion is transmitted from the motor assembly 36 through the drive shaft 150*a* to the first bevel gear 254. The teeth 262 of the first bevel gear 254 cooperate with the teeth 282 of the second bevel gear 264 to rotate the second bevel gear 264 on an axis which is offset 90 degrees from the rotational axis of the first bevel gear 254. The rotational motion is transmitted through the drive shaft 226*a* to the lifting assemblies 30*b*, 30*d* coupled to the second side wall 18 of the vehicle 10.

It should be appreciated that the transmission 200 shown in FIGS. 18-23 may be altered in a number of ways to provide additional embodiments. For example, the number, size, and configuration of the components used in connection with the transmission 200 may be altered as desired. For example, spiral bevel gears may be used in place of the bevel gears 254, 264. Also, the materials used to make the components of the transmission 200 may be altered in numerous ways as desired. For example, the bevel gears 254, 264, the drive shafts 150*a*, 226*a*, which are typically made of metal (e.g., steel) may also be made using injection molded plastic, composites or other suitable materials.

Figure 7:
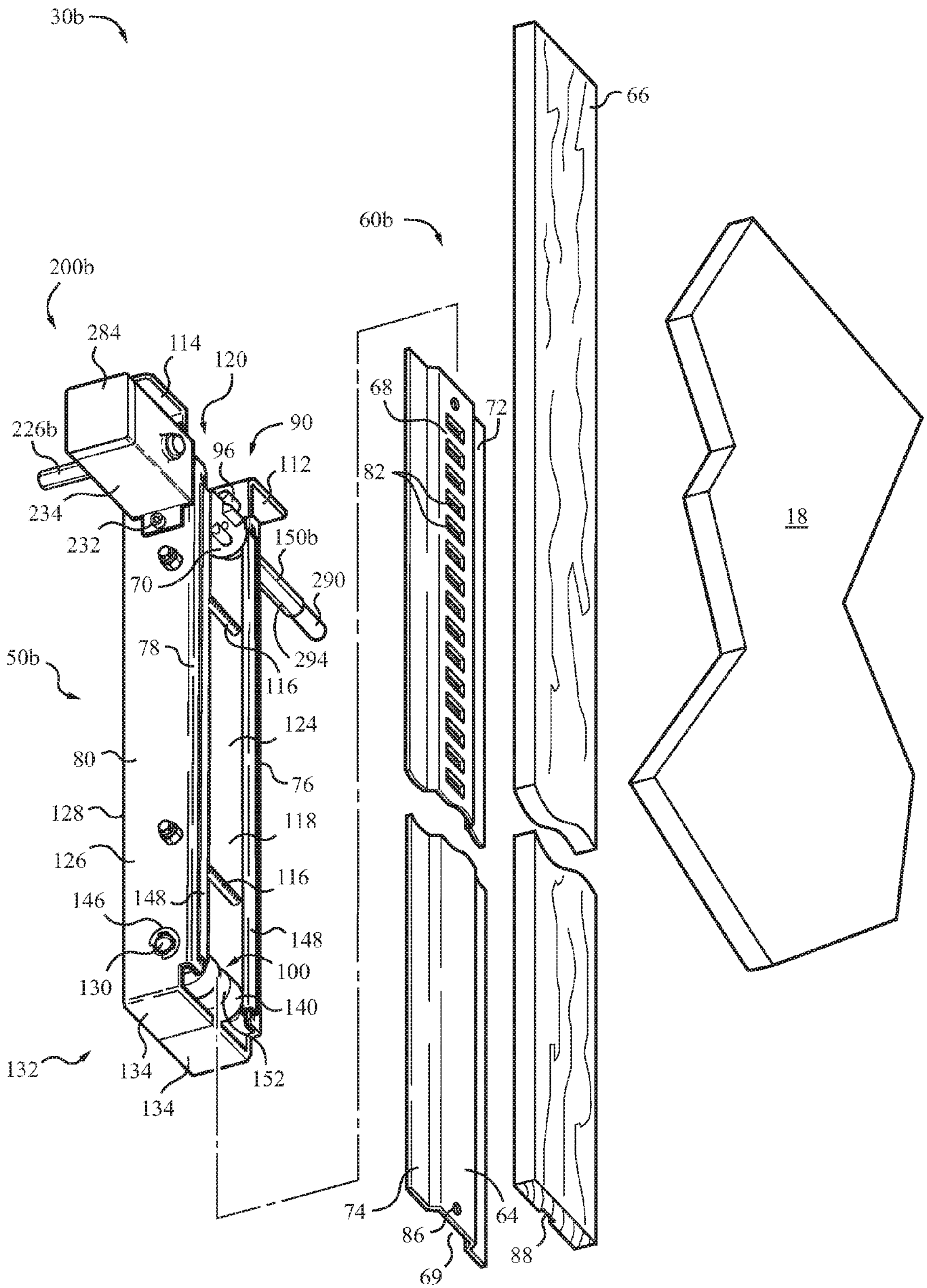
Figure 8:
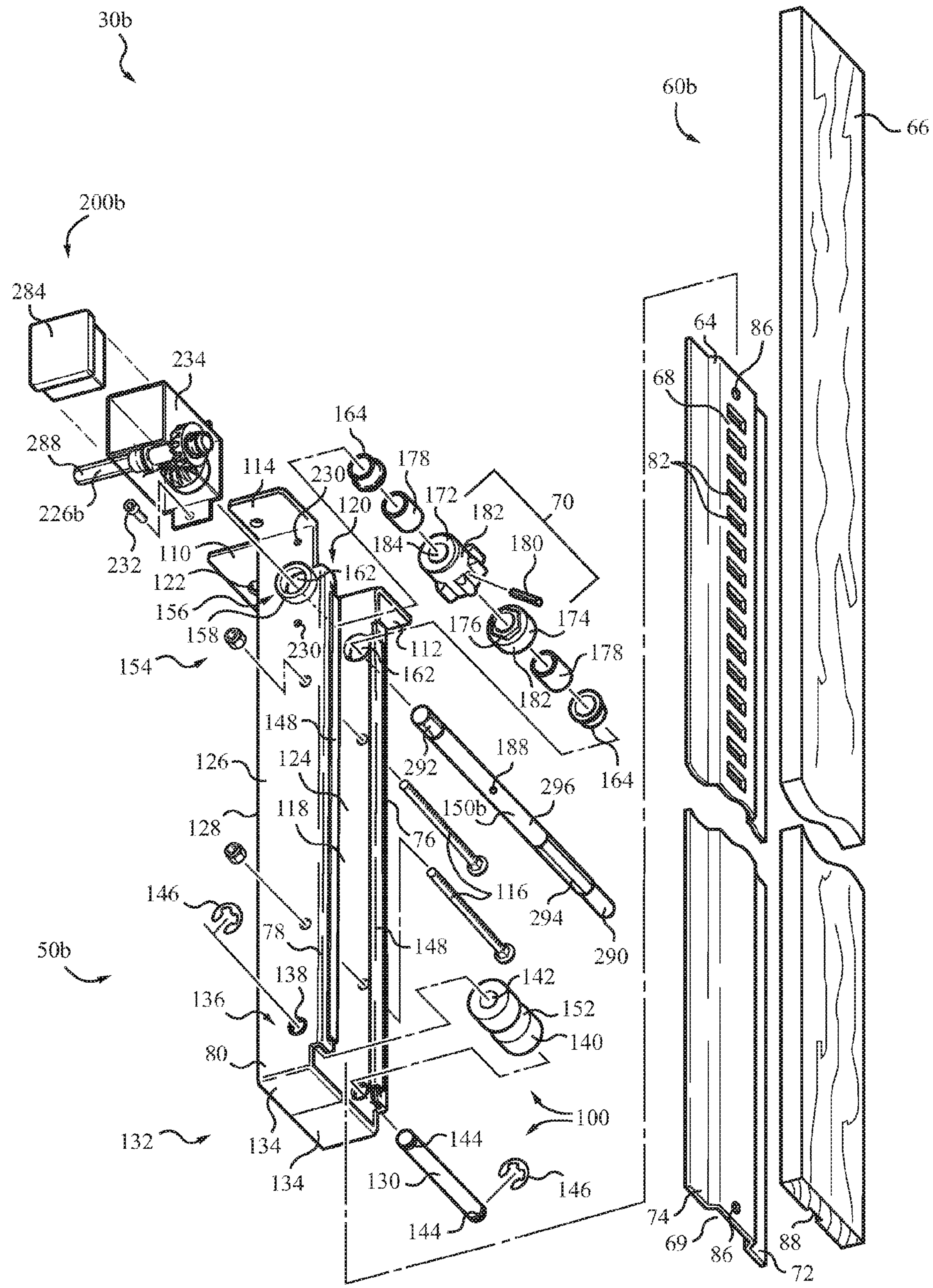

Referring to FIGS. 7-8, the lifting assembly 30*b* is shown with the support assembly 60*b* exploded and the moving assembly 50*a* assembled in FIG. 7 and exploded in FIG. 8.

In this embodiment, the transmission 200*b* is coupled to the second side 126 of the moving member 80. In general, the transmissions 200*a*, 200*b* are configured to be positioned adjacent to the first side wall 16 and the second side wall 18, respectively, in an opposing relationship. The drive member 34*b* extends between the transmissions 200*a*, 200*b* to transmit rotational motion between the lifting assemblies 30*a*, 30*b*.

The transmission 200*b* may be similar to the transmission 200*a*. In the embodiment shown in FIGS. 7-8, the transmission 200*b* includes a drive shaft 226*b* which is similar to the drive shaft 226*a* except that the drive shaft 226*b* does not include the second cylindrical end 270. Rather, an end 288 of the drive shaft 226*b* may be hexagonal like the third intermediate portion 276 of the drive shaft 226*a*. In other embodiments, the end 288 may be any suitable configuration such as those configurations mentioned in the context of other drive shafts. From one aspect, the drive shaft 226*b* may be thought of as the same as the drive shaft 226*a* with the second end 270 removed. It should be appreciated that the configuration of the drive shafts 226 may vary widely and that the illustrated embodiments of the drive shafts 226 show a few of the many suitable configurations for the drive shafts 226.

As noted previously, the moving assembly 50*b* and the support assembly 60*b* are similar to the moving assembly 50*c* and the support assembly 60*c* described in detail previously. However, the moving assembly 50*b* may include a drive shaft 150*b* which has a different configuration than the other drive shafts 150*a*, 150*c*, 150*d*. For example, the drive shaft 150*b* may include a first cylindrical end 290, a second hexagonal end 292, a first hexagonal intermediate portion 294, and a second cylindrical intermediate portion 296. The drive shaft 150*b* cooperates with the gear 70, the moving member 80, and the transmission 200*b* in a manner similar to how the drive shaft 150*a* cooperates with the gear 70, the moving member 80, and the transmission 200*a*.

Figure 9:
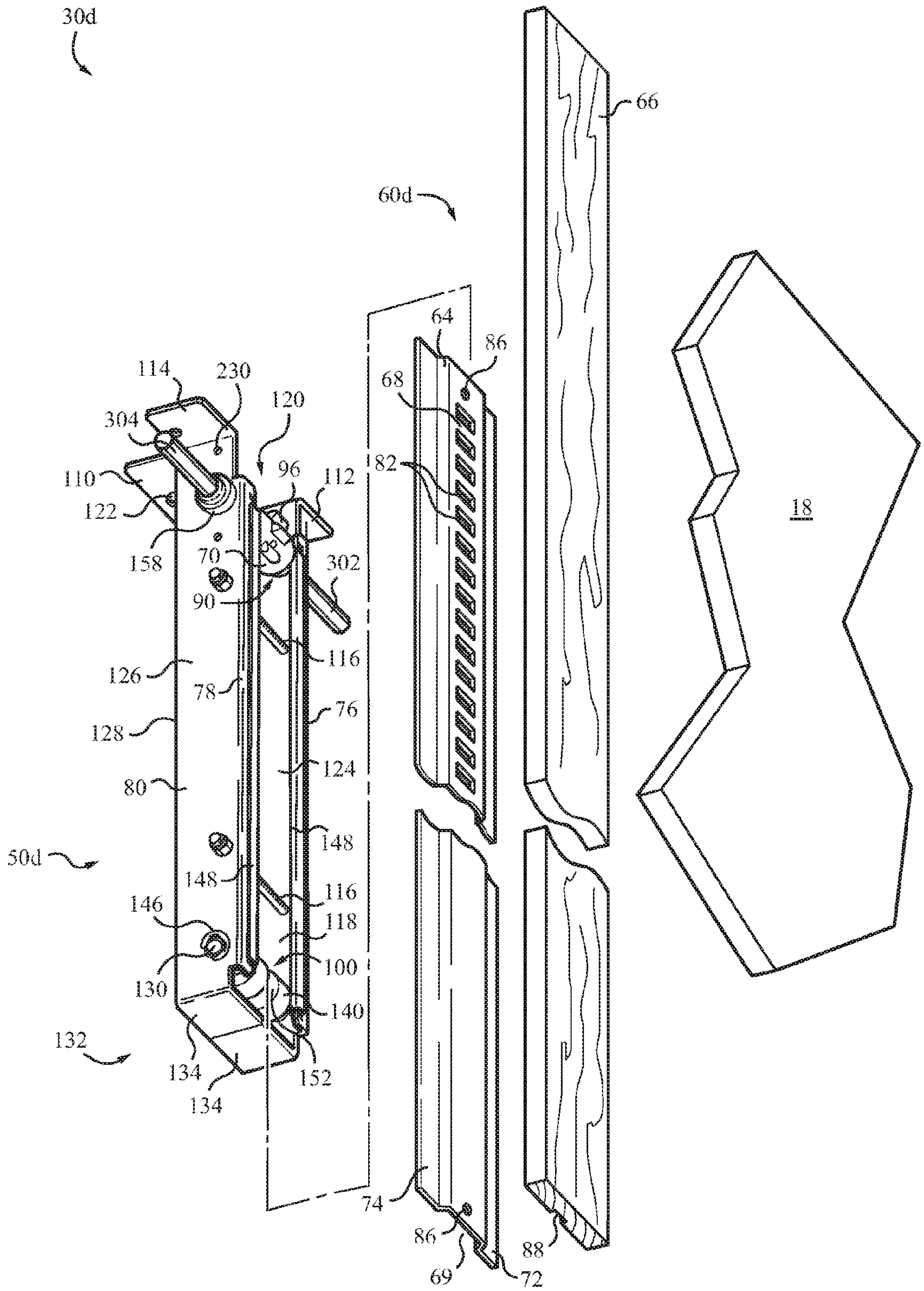

FIGS. 9-10 show the lifting assembly 30*d* with the support assembly 60*d* exploded and the moving assembly 50*d* assembled in FIG. 9 and exploded in FIG. 10. In general, the lifting assembly 30*d* is similar to the lifting assembly 30*c*. The moving assembly 50*d* includes a drive shaft 150*d* having a first end 302 and a second end 304. In this embodiment, the drive shaft 150*d* is similar to the drive shaft 150*c*.

Figure 25:
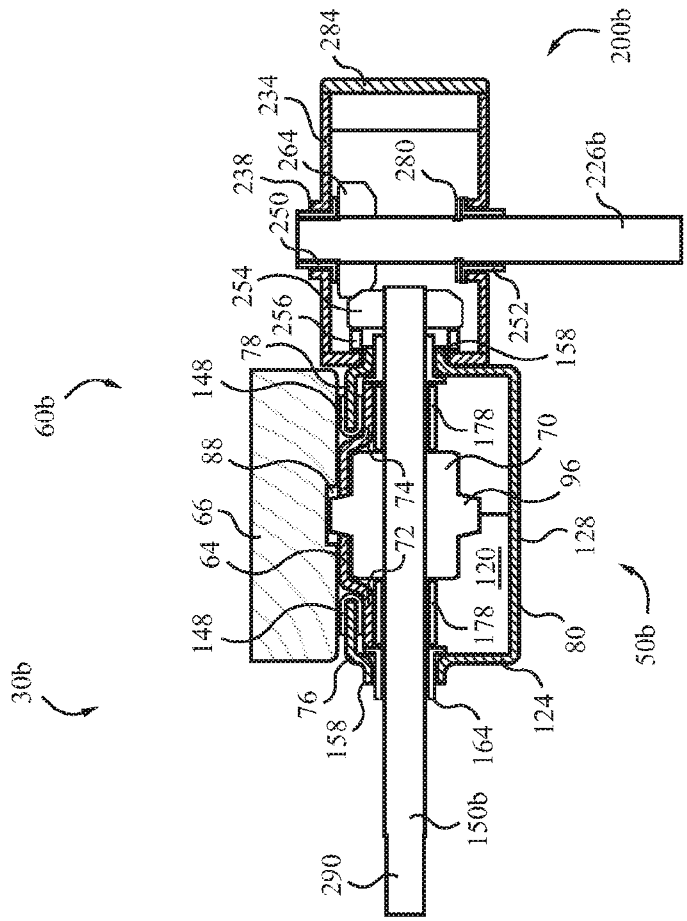
FIGS. 24-26 show cross-sectional top views of various embodiments of lifting assemblies which may be used in a system for vertically moving one or more beds.
Figure 24:
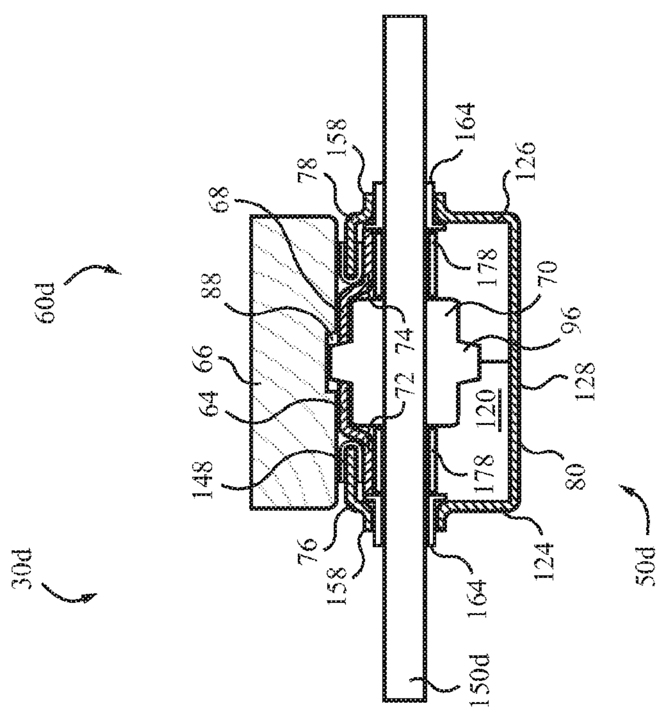

FIGS. 24-25 show a cross sectional view of the lifting assemblies 30*b*, 30*d*, respectively, with the moving assemblies 50*b*, 50*d* being positioned to cooperate with the support assemblies 60*b*, 60*d*. In this view, the manner in which the support member 64 cooperates with the moving assembly 50 can be seen in greater detail. As shown, the flanges 72, 74 prevent movement of the support member 64 away from the gear 70 while the gear 70 prevents movement of the support member 64 towards the channel of the moving member 80. Thus, the support member 64 may be configured to move in close cooperation with the moving assembly 50.

Figure 26:
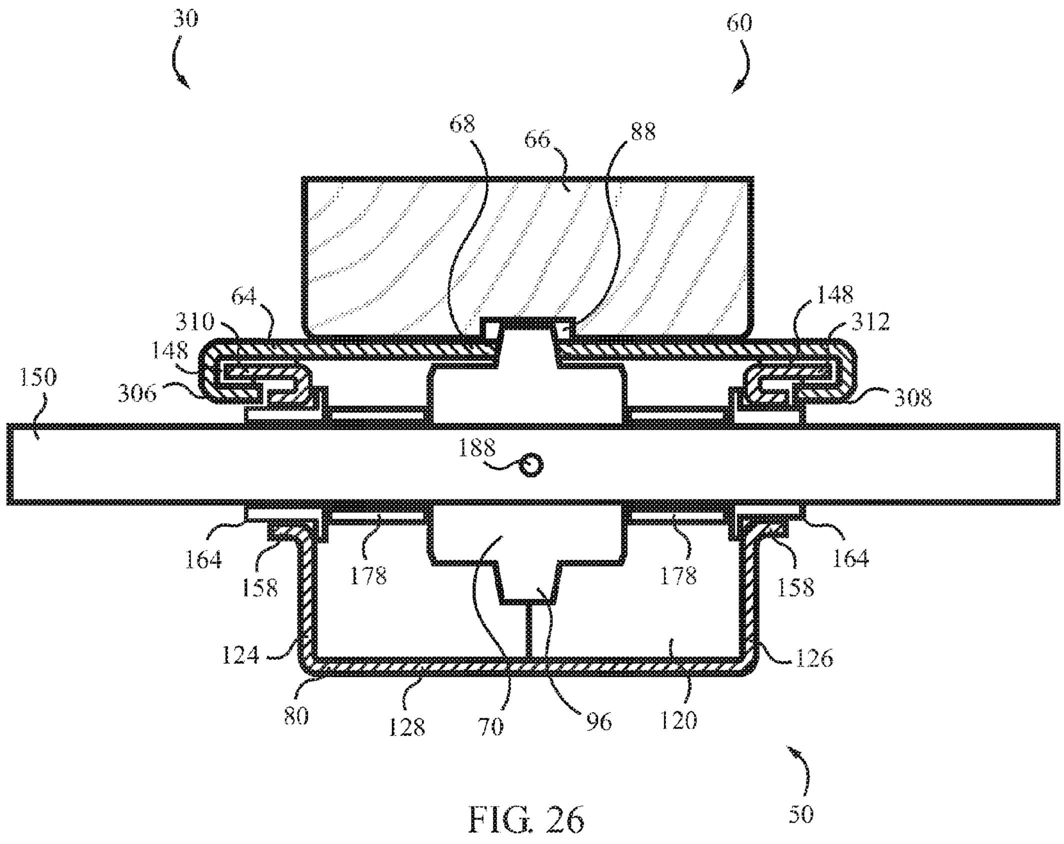

It should be appreciated that the support member 64 may be configured to cooperate with the moving assembly 50 in any of a number of ways. For example, a cross-sectional view of another embodiment of one of the lifting assemblies 30 is shown in FIG. 26. In this embodiment, the support member 64 includes U-shaped securing flanges or members 306, 308 which define a channel. The securing flanges or members 310, 312 on the moving member 80 extend away from each other and are configured to slide inside the channel defined by the flanges 306, 308. Accordingly, the moving member 80 may be configured to move on the outside of the support member 64 as shown in FIGS. 24-25 or on the inside of the support member 64 as shown in FIG. 26.

In another embodiment (not illustrated), the lifting assembly may include a support member which includes a gear rack and a moving assembly which includes a worm gear. The worm gear may be configured to cooperate with the gear rack to vertically move the bed 40. In one embodiment, the worm gear may be configured to rotate on a vertical axis which is generally parallel to the direction of the gear rack. The worm gears in adjacent lifting assemblies coupled to the same side wall may be moved in unison by a chain which rotates in a plane perpendicular to the longitudinal axis and extends between the adjacent worm gears. Another chain or a drive member 34 may be configured to extend between one lifting assembly coupled to one wall and another lifting assembly coupled to an opposite wall. If a drive member 34 is used, transmissions 200 may also be used to translate the rotational motion on the vertical axis to rotational motion of a horizontal drive member 34. It should be appreciated that additional variations and modifications of the various embodiments of the lifting assemblies 30 may also be made.

The combination of the drive mechanisms 90, transmissions 200, motor assembly 36, and drive members 34 provide a drive assembly. In general, the drive assembly refers to those components of the system 12 which may be used to drive movement of the bed 40. Although the drive assembly includes the previously referred to components in the embodiments of FIGS. 3-10, it should be appreciated that many other configurations, combination of components, etc. may be used to provide the drive assembly. For example, in one embodiment, the drive assembly may be operated manually without the use of the motor assembly 36.

Figure 27:
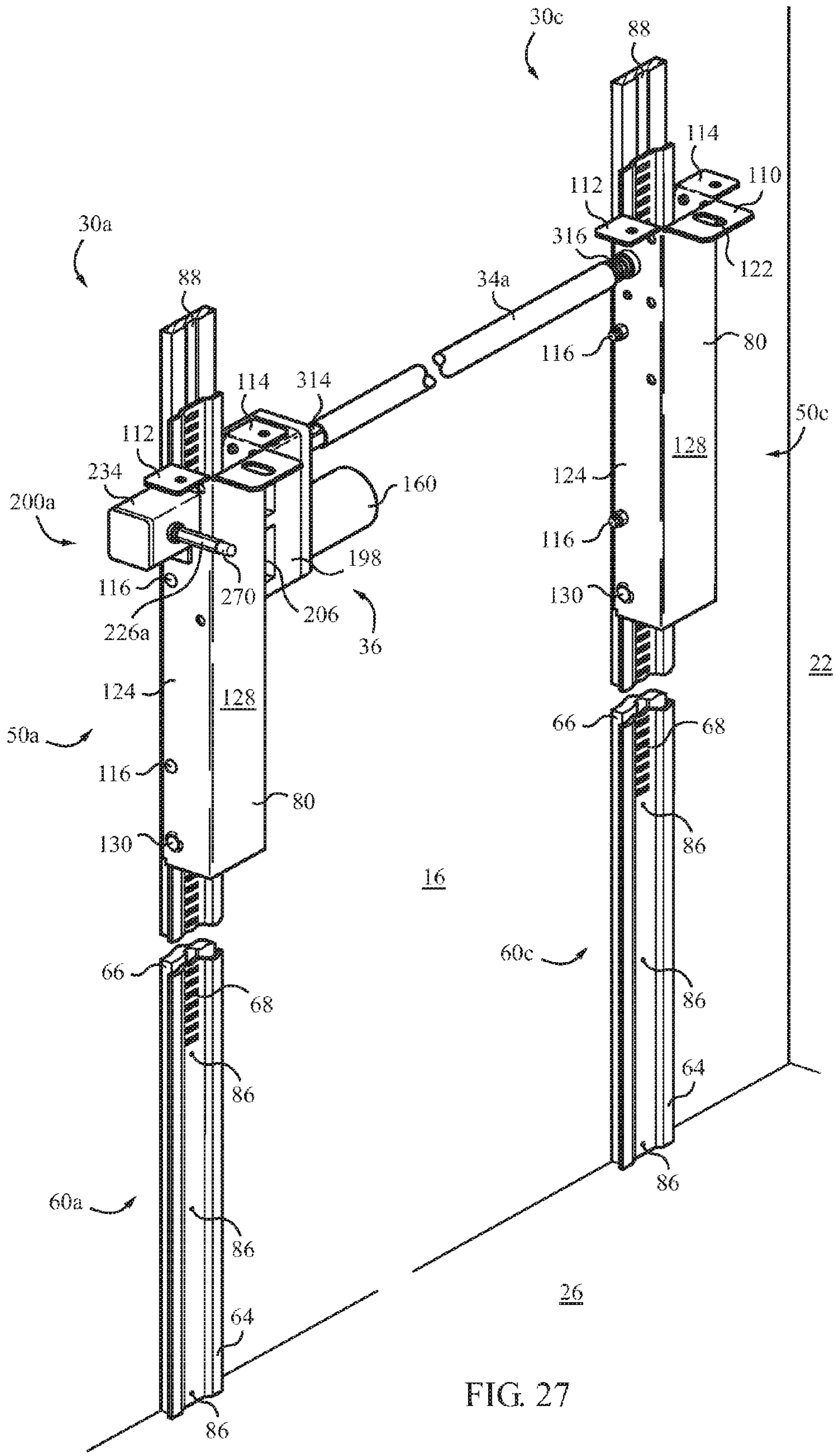
FIG. 27 shows a perspective view of two lifting assemblies coupled to a wall according to another embodiment of a system for vertically moving one or more beds.
Figure 28:
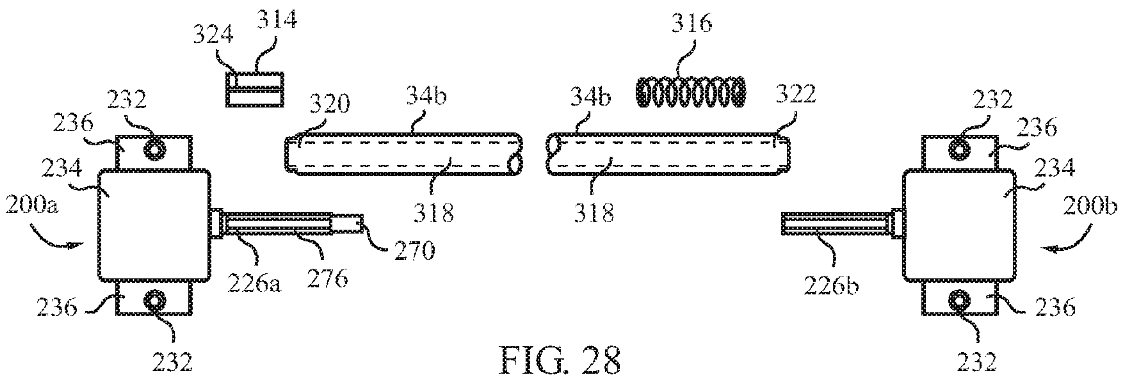
FIGS. 28-31 show front views of one embodiment of a portion of a drive assembly which may be used to move multiple lifting assemblies in unison.

Referring to FIG. 27, a perspective view is shown of the lifting assemblies 30*a*, 30*c* coupled to the first side wall 16. Although not shown in FIG. 27, the lifting assemblies 30*b*, 30*d* may be coupled to the second side wall 18 in a similar manner. The drive member 34*a* is shown being drivably coupled between the lifting assemblies 30*a*, 30*c*. Although the drive members 34*b*, 34*c* are also not shown, it is contemplated that they may be coupled between the lifting assemblies 30*a*, 30*b* and the lifting assemblies 30*b*, 30*d* in a similar manner.

In one embodiment, the drive members 34*a*, 34*b*, 34*c* may be configured to be substantially similar to make it easier to manufacture and/or inventory the drive members 34. For example, in one embodiment, the drive members 34*a*, 34*b*, 34*c* may be different lengths (e.g., the drive member 34*b* may be longer than the drive members 34*a*, 34*c*) but otherwise have the same configuration. In other embodiments, each drive member 34 may be unique and configured to cooperate only with specific lifting assemblies 30.

The drive members 34 may be made of any of a number of suitable materials such as plastics, metals, composites, etc. In one embodiment, the drive members 34 may be rigid and made of steel material. The drive members 34 may also have widely varying cross-sections such as cylindrical, tubular, square, hexagonal, octagonal, polygonal, etc. In one embodiment, the drive members 34 may comprise cylindrical tubular members made from steel material. Any suitable material in a variety of configurations may be used.

FIGS. 28-31 illustrate one embodiment of the drive assembly with the drive member 34*b* coupled between adjacent lifting assemblies 30*a*, 30*b*. Although the drive member 34*b* is shown being coupled between the lifting assemblies 30*a*, 30*b*, it should be appreciated, however, that the drive members 34*a*, 34*c* may be coupled between the lifting assemblies 30*a*, 30*c* and the lifting assemblies 30*b*, 30*d*, respectively, in a like manner.

In FIGS. 28-31, the drive member 34*b* is coupled between the transmissions 200*a*, 200*b* using a spacer 314 and a biasing member 316. In this embodiment, the drive member 34*b* is made from a tubular material (e.g., cylindrical tube, square tube, etc.) which includes a channel or hole 318 extending longitudinally therein. The drive member 34*b* may include a first end 320 and a second end 322 which are configured to drivably engage or cooperate with the drive shafts 226*a*, 226*b*, respectively. In one embodiment, the first end 320 and the second end 322 may each have an interior cross section or connector recess which is capable of engaging the drive shafts 226 so that the drive member 34*b* and the drive shafts 226 rotate together. For example, the ends 320, 322 may have a hexagonal shaped cross-section which corresponds to the hexagonal shaped cross section of the drive shafts 226. In another example, the ends 320, 322 may have any suitable cross-section such as square, star-shaped, oval, polygonal, octagonal, and the like that correspond to the cross section of the drive shafts 226.

In one embodiment, the desired cross-sectional configuration of the ends 320, 322 may be provided by coupling an insert having the desired cross-section into the channel 318 at each of the ends 320, 322. For example, the inserts may be small sections of tubular material which have an interior cross section configured to engage the drive shafts 226 and are sized to be positioned within the channel 318. In one embodiment, the inserts may include a groove so that the inserts may be secured inside the channel 318 by crimping the ends 320, 322 of the drive member 34*b* into the groove as shown in FIGS. 28-31. In another embodiment, the inserts may be coupled to the drive member 34*b* using welding, soldering, screwing (e.g., threads which cooperate with each other on the insert and the drive member 34*b*), and so forth.

Although the embodiment of the drive member 34*b* in FIGS. 28-31 provides a simple and effective way of drivably coupling the adjacent lifting assemblies 30 together, it should be appreciated that the drive member 34*b* may be drivably coupled to the drive shafts 226 in any of a number of suitable ways. For example, in another embodiment, the drive member 34*b* and the drive shafts 226 may each include corresponding apertures which are configured to receive a split pin which extends through both the drive member 34*b* and the drive shafts 226.

Figure 29:
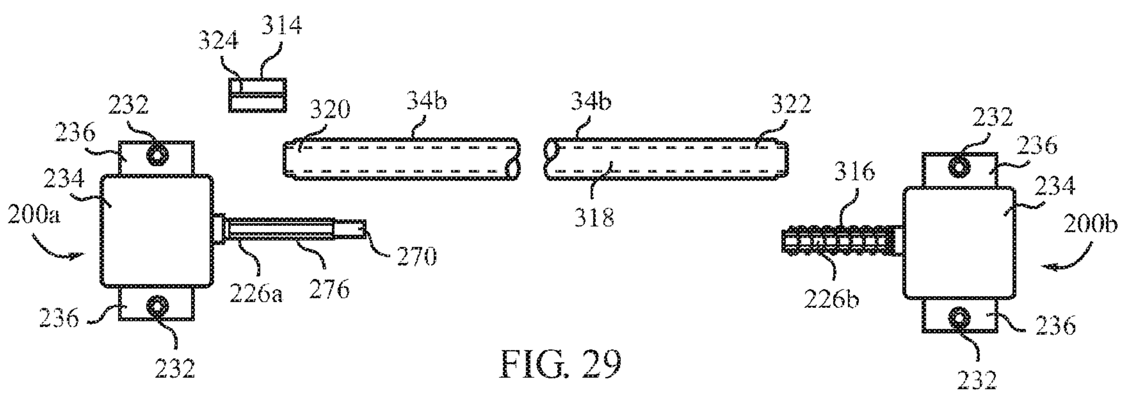

A method for coupling the system 12 to the vehicle 10 may include coupling the lifting assembly 30*a* to the first side wall 16, coupling the lifting assembly 30*b* to the second side wall 18 and then coupling the drive member 34*b* between the lifting assemblies 30*a*, 30*b*. In one embodiment, the drive member 34*b* may be positioned between the lifting assemblies 30*a*, 30*b* as shown in FIGS. 28-31. As shown in FIG. 29, the drive shaft 226*b* receives the biasing member 316, or, in other words, the biasing member 316 is positioned on the drive shaft 226*b*. It should be noted that in this embodiment the biasing member 316 is a spring, but that in other embodiments other suitable biasing members or mechanisms may be used. Also, the biasing member 316 may be made of any of a number of suitable materials such as steel, plastic, elastomeric material, etc.

Figure 30:
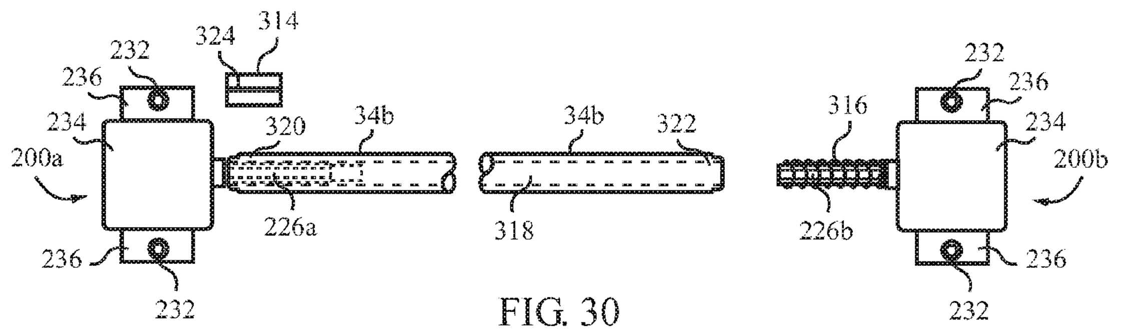

Once the biasing member 316 is positioned in engagement with the drive shaft 226*b*, the first end 320 of the drive member 34*b* may be moved into cooperation with the drive shaft 226*a*. In general, this is done by moving the drive member 34*b* longitudinally in the direction of the drive shaft 226*a* so that the drive shaft 226*a* is received in the channel 318, as shown in FIG. 30. When the drive member 34*b* is moved onto the drive shaft 226*a* a sufficient distance, the second end 322 may be positioned in line with the drive shaft 226*b*. The drive member 34*b* may then be moved longitudinally toward the drive shaft 226*b* so that the drive shaft 226*b* is received in the channel 318 at the second end 322 of the drive member 34*b*.

Figure 31:
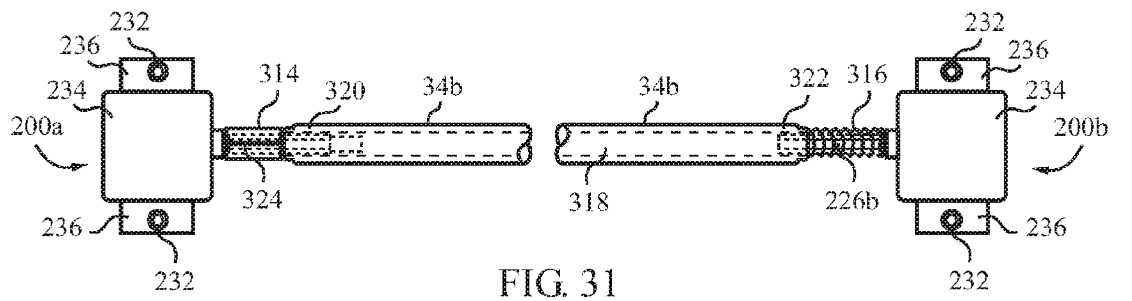

Referring to FIG. 31, once the drive member 34*b* is coupled to the drive shafts 226, the spacer 314 may be positioned over the drive shaft 226*a* to prevent the drive member 34*b* from moving longitudinally towards the transmission 200*a* and causing the second end 322 to disengage from the drive shaft 226*b*. The spacer 314 may be made from a relatively resilient material and may include a slit 324 which may be spread apart to allow the spacer 314 to fit over the drive shaft 226*a*. Once the spacer has been positioned on the drive shaft 226*a*, the slit 324 narrows to its previous configuration. In order to flex and bounce back to its original shape, the spacer 314 may be made from a resilient material such as DELRIN.

In one embodiment, the biasing member 316 may be used to bias the drive member 34*b* towards the spacer 314. This may be desirable for a number of reasons. For example, when the drive member 34*b* rotates, the drive shafts 226 may move longitudinally away from each other in a screw type motion. When this happens, the transmissions 200*a*, 200*b* may be forced away from each other. In extreme situations, the longitudinal displacement of the transmissions 200*a*, 200*b* may be sufficient to allow the drive member 34*b* to become disengaged from one or both of the drive shafts 226. The biasing member 316 may be used to prevent this screw type motion by biasing the drive member 34*b* towards the spacer 314 and, thus, maintaining the drive member 34*b* in an engaged configuration with the drive shaft 226*a*. Also, the screw type motion is prevented because the drive member 34*b* is being biased towards the drive shaft 226*a*.

In some situations, the distance between the first side wall 16 and the second side wall 18 of the vehicle 10 varies as the bed 40 is raised and lowered. This may especially be a problem with recreational vehicles, but may also be a problem in other vehicles and even in buildings and other fixed structures. These variations in width between the side walls 16, 18 may be accounted for using the biased drive member 34*b*. As the width changes, the drive member 34*b* moves toward and away from the transmission 200*b* on the drive shaft 226*b*. In other words, the drive member 34*b* telescopes in and out relative to the drive shaft 226*b* to compensate for the changes in the width between the first side wall 16 and the second side wall 18. As the drive member 34*b* moves in this manner, the biasing member 316 is compressed and decompressed. However, regardless of the width changes, the biasing member 316 maintains the drive member 34*b* in engagement with the drive shaft 226*a*.

In one embodiment, the distance between the side walls 16, 18 may change at least about 0.125 inches (or about 3.2 millimeters), or at least about 0.25 inches (or about 6.4 millimeters), or at least about 0.385 inches (or about 9.8 millimeters), or at least about 0.5 inches (or about 12.7 millimeters), or at least about 0.625 inches (or about 15.9 millimeters), or at least about 0.75 inches (or about 19.1 millimeters), as the bed 40 is moved vertically. Depending on the amount of change in the distance between the side walls 16, 18, the length of the drive shaft 226*b* may be configured to be sufficient to accommodate any of these variations in width and even larger variations in width.

The variations in width between the side walls 16, 18 may also be accounted for in any of a number of additional ways. For example, in another embodiment, shims may be placed between the side walls 16, 18 and one or both of the support assemblies 60*a*, 60*b* until the support assemblies 60*a*, 60*b* are substantially the same distance apart.

It should be appreciated that the configuration shown in FIGS. 28-31 may be altered and modified in a number of ways. For example, the drive member 34*b* may be a flexible drive member such as a toothed belt that extends between pulleys coupled to the drive shafts 150*a*, 150*b*. In another embodiment, the biasing member may be a resilient polymeric material. Numerous additional modifications may be made.

Figure 32:
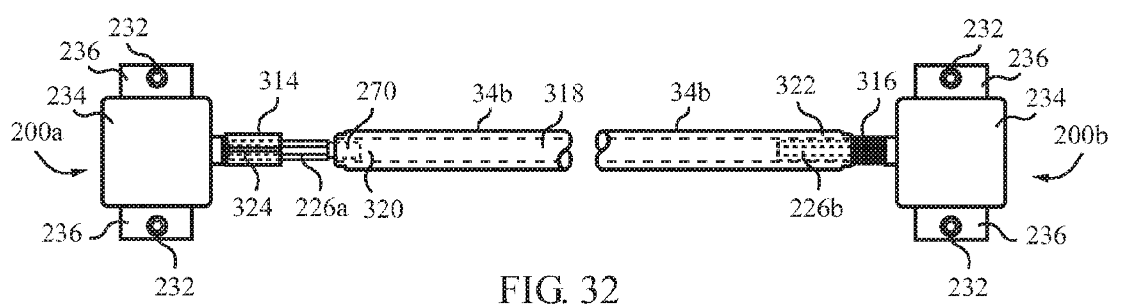
FIG. 32 shows a front view of a portion of a drive assembly which may be adjusted between a first orientation where adjacent lifting assemblies move together and a second orientation where the adjacent lifting assemblies may be moved independently of each other.
Figure 33:
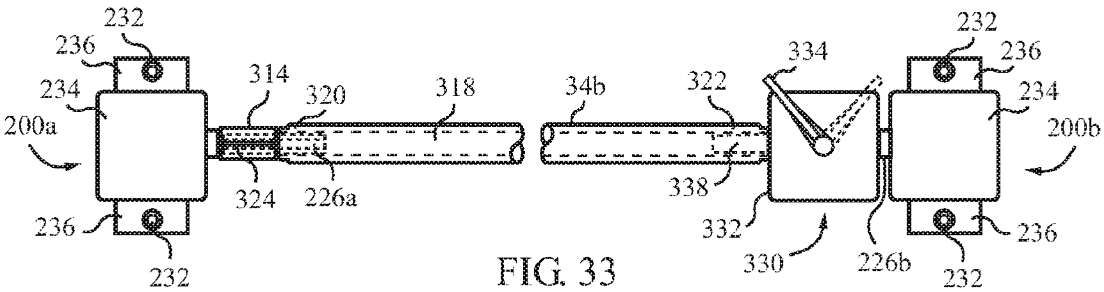
FIG. 33 shows a front view of a portion of a drive assembly which may be adjusted between a first orientation where adjacent lifting assemblies move together and a second orientation where the adjacent lifting assemblies may be moved independently of each other using a camming device.

Referring to FIGS. 31-32, it may be desirable to move one moving assembly 50 separately from the other moving assemblies 50 in order to move the portion of the bed 40 coupled to each of the moving assemblies 50 independent of the other portions of the bed 40 (e.g., level the corners of the bed 40, etc.). In one embodiment, the drive member 34*b* may be adjustable between a first orientation where the lifting assemblies 30*a*, 30*b* move in unison and a second orientation where the lifting assemblies 30*a*, 30*b* move independently of each other. The first orientation may be provided as shown in FIG. 31 where the drive member is engaged with the hexagonal shaped third intermediate portion 276 of the drive shaft 226*a* and with the hexagonal shaped end 288 of the drive shaft 226*b*.

As shown in FIG. 32, the second orientation may be provided by moving the drive member 34*b* longitudinally in the direction of the transmission 200*b* thereby compressing the biasing member 316. In this position, the second cylindrical end 270 of the drive shaft 226*a* is positioned in the first end 320 of the drive member 34*b*. However, the second cylindrical end 270 may be configured to be a smaller diameter than the adjacent hexagonal shaped third intermediate portion 276 to allow the first end 320 of the drive member 34*b* to rotate freely relative to the drive shaft 226*a*. Therefore, when the drive member 34*b* is in the second orientation, the moving assemblies 50*a*, 50*b* may be moved independently of each other. Additionally, the drive member 34*b* is supported by the second end 270 while the moving assemblies 50*a*, 50*b* are moved independently of each other. After the moving assemblies 50*a*, 50*b* have been moved to their desired positions, the drive member 34*b* may be moved back into engagement with the hexagonal portion of the third intermediate portion 276 so that the moving assemblies 50*a*, 50*b* move together.

The degree of adjustment provided using the configuration shown in FIGS. 31-32 may depend on the cross-section of the drive shaft 226*a* and the corresponding cross-section of an interior surface 326 of the channel 318 (FIG. 39) at the first end 320 of the drive member 34*b*. For example, if the cross section of both the interior surface 326 and the third intermediate portion 276 are hexagonal then the moving assembly 50 may be adjustable in increments of ⅙th of a turn of the drive member 34*b* and/or the drive shaft 226*a*. A finer increment of adjustment may be provided by using higher order polygonal shaped cross sections for the interior surface 326 and the drive shaft 226*a*.

Figure 39:
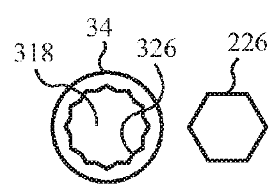
FIG. 39 shows a cross-sectional view of one embodiment of a drive member and a drive shaft which may be used with the drive assembly.
Figure 40:
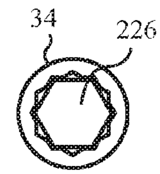
FIG. 40 shows a cross-sectional view of one embodiment of a drive shaft cooperating with a drive member to drive motion in the drive assembly.

Referring to FIGS. 39-40, in one embodiment, a finer increment of adjustment may be achieved by providing a 12-sided star shaped interior surface 326 of the drive member 34*b* (e.g., the insert referred to previously may have a 12-sided interior cross section) which cooperates with the hexagonal third intermediate portion 276 of the drive shaft 226*a*. The use of the 12-sided interior surface 326 allows the moving assembly 50 to be adjusted in increments of 1/12th of a turn of the drive member 34*b* and/or the drive shaft 226*a*. The drive shaft 226*a* may have the same hexagonal shaped cross section as the other shafts to reduce inventory requirements and raw material cost, while at the same time being capable of engaging the 12-sided interior surface 326 of the drive member 34*b*.

Numerous other configurations of the interior surface 326 and the drive shaft 226 may also be used. For example, the drive shaft 226 may include a 12-sided cross section and the interior surface 326 may be hexagonal. In another embodiment, the drive shaft 226 may be square and the interior surface 326 may be square or octagonal. Numerous additional embodiments of this type are also contemplated as being used.

Referring back to FIG. 27, the drive member 34*a* may be coupled to the drive shafts 150*c*, 220 with the biasing member 316 positioned on the drive shaft 150*c* and the spacer 314 positioned on the drive shaft 220. As shown in FIG. 6, the cylindrical second end 224 of the drive shaft 220 may have a smaller diameter than the hexagonal first end 222. Therefore, when the drive member 34*a* moves longitudinally to the second orientation, the drive member 34*a* cooperates with the second end 224 to rotate freely relative to the drive shaft 220. Also, the drive member 34*c* is configured to cooperate with drive shafts 150*b*, 150*d* in much the same manner as that shown for the drive members 34*a*, 34*b*.

In one embodiment, when two drive shafts 150, 226 (shown in FIG. 6) are coupled together using one of the drive members 34, the drive shaft 150, 226 which is closest to the motor assembly 36, in terms of receiving rotational motion, may be configured to include the cylindrical portion to allow the drive members 34 to rotate freely. Since the motor assembly 36 prevents movement of the bed 40 when power is not provided (either by way of the brake or just through backdriving), it may be desirable for the drive member 34 to remain engaged with the drive shaft 150, 226 furthest from the motor assembly 36 so that the drive member 34 may be used to assist in adjusting the moving assembly 50. For example, with reference to FIG. 27, when the drive member 34*a* is moved to the second orientation, the drive member 34*a* is capable of being freely rotated relative to the drive shaft 220. In this embodiment, the moving assembly 50*a* is held stationary by the motor assembly 36. Therefore, the drive member 34*a* when in the second orientation may be capable of being rotated by hand to move the moving assembly 50*c*. The same general principles may apply to the drive members 34*b*, 34*c*.

It should be appreciated that the various configurations of the drive shafts 150, 226 and the drive members 34 may be varied in a number of ways. For example, the cylindrical portions of the drive shafts 150, 226 which may be used to allow the drive members 34 to rotate freely relative to the drive shafts 150, 226 may be provided on any suitable drive shaft 150, 226. For example, the drive shaft 150*c* and the drive shaft 220 may be configured so that the cylindrical portion is on the drive shaft 150*c* and the biasing member is positioned in cooperation with the drive shaft 220. In another embodiment, all or substantially all of the drive shafts 150, 226 may be configured to be interchangeable. Thus, each of the drive shafts 150, 226 may include a cylindrical portion. In yet another embodiment, the drive shafts 150, 226 may be provided without a cylindrical portion. In this embodiment, the first end 320 of the drive member 34 completely disengages the drive shafts 150, 226 when moved to the second configuration.

In one embodiment, the second end 168 of the drive shaft 150*c* may be used to receive a manual actuation device (not shown). The manual actuation device may be something as simple as a socket wrench sized to cooperate with the second end 168. In another embodiment, the manual actuation device may include a crank which is sized to cooperate with the second end 168.

As mentioned previously, the manual actuation device may be used to move the bed 40 when the motor assembly 36 is not available such as when the battery of the vehicle 10 is dead or the motor assembly 36 is not included. In some situations, operating the manual actuation device may require driving through the force of the motor 160. However, one potential advantage of this configuration is that the backdriving effect of the motor 160 may act as a brake to prevent the bed 40 from suddenly and unexpectedly lowering. In another embodiment, the system 12 may be provided without the motor assembly 36. In this embodiment, a pawl and sector or ratchet may be provided to allow the bed 40 to be raised with the manual actuation device while also preventing the bed 40 from falling unexpectedly.

Referring to FIGS. 33-38 another embodiment is shown which may be used to allow adjacent moving assemblies 50 to be selectively moved in unison or independent of each other. In this embodiment, a camming device 330—alternatively referred to herein as a quick release device or coupling system—may be used to selectively alternate between moving the moving assemblies 50 in unison or independent of each other. Also, the camming device 330 may be used to provide a manual override mechanism to the motor 160. For example, the camming device 330 may be positioned between the motor 160 and drive shafts and/or drive members which transmit the rotary motion of the motor 160 to move the bed 40 up and down. Thus, the camming device 330 may be used to selectively disengage the motor 160 to allow the user to move the bed 40 manually. A manual override mechanism of this nature may be included on any of the embodiments described herein.

In one embodiment, the camming device 330 includes a body portion 332 and a cam lever 334. The camming device 330 may include flanges, apertures, and the like so that the camming device 330 may be coupled to the transmissions 200, the moving members 80, or any other component of the system 12. For example, the camming device 330 may be coupled to the transmissions 200 and/or the moving members 80 using a flange in a manner similar to how the transmissions 200 are coupled to the moving members 80. Although the camming device 330 is shown as being square or rectangular in FIGS. 33-38, other configurations may also be used such as circular, triangular, and so forth. The body portion 332 of the camming device 330 has a generally square cross-section with an interior 336. The interior 336 is adapted to accommodate a quick release arrangement that selectively engages and disengages the drive shaft 226*b* with a drive shaft 338.

Figure 34:
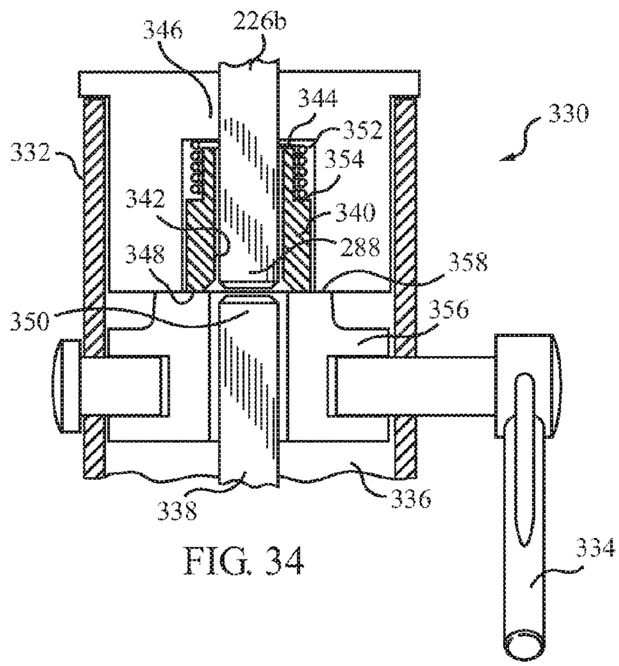
FIG. 34 shows a side view of the camming device in a disengaged configuration where adjacent lifting assemblies may be moved independently of each other.

FIG. 34 depicts a cross-sectional view of one embodiment of the camming device 330. A coupler 340 having a bore 342 is adapted at a top end 344 to engage the end 288 of the drive shaft 226*b*. The drive shaft 226*b* can rotate on its longitudinal axis but is fixed against longitudinal movement within the body portion 332. The drive shaft 226*b* extends a short distance from the coupler 340 and passes through an opening surrounded by a stationary flange 346 and on to the transmission 200*b*.

The coupler 340 has a bottom end 348 adapted to slidably engage a first end 350 of the drive shaft 338. The drive shaft 338 can also rotate on its longitudinal axis but is fixed against longitudinal movement within the camming device 330. The drive shaft 338 may be fixed against longitudinal movement in a number of ways. For example, the drive shaft 338 may be fixably coupled to the second end 322 of the drive member 34*b*. Also, the drive shaft 338 may include a fastening recess configured to receive a fastening clip. The fastening clip may be received in a bracket coupled to the outside of the body portion 332 to prevent longitudinal movement of the drive shaft 338. The coupler 340 is configured to cooperate with the drive shaft 226*b* and the first end 350 of the drive shaft 338 such that, in a first orientation, the drive shaft 226*b* and the drive shaft 338 move together. The coupler 340 is also adapted to slide along the longitudinal axis of the drive shaft 226*b* and the first end 350 of the drive shaft 338 so that in a second orientation, the drive shaft 226*b* and the drive shaft 338 move independently of each other. When the coupler 340 is in the first orientation, the lifting assemblies 30*a*, 30*b* may move in unison, and when the coupler is in the second orientation, the lifting assemblies 30*a*, 30*b* may move independently of each other.

It should be appreciated that various components and configurations for providing the slidable engagement of the coupler 340 and the drive shafts 226*b*, 338 could be used. For example, the bore 342 may have a 12 sided star cross section (see FIG. 39) that may cooperate with the drive shafts 226*b*, 338 which have a hexagonal cross-section. Also, the bore 342 of the coupler 340 may be tapered at the bottom end 348 to facilitate engagement with the first end 350 of the drive shaft 338. The first end 350 may also have beveled edges which cooperate with the bottom end 348 of the bore 342 to facilitate engagement with the coupler 340. The coupler 340 may be made using a steel material, plastic, or any other suitable material.

A spring or biasing member 352 may be positioned to bias the coupler 340 into engagement with the first end 350 of the drive shaft 338. It should be appreciated that various other ways for providing the biasing force could be used. In one embodiment illustrated in FIG. 34, the flange 346 forms the stop for a top end of the spring 352, while a shoulder 354 formed on the coupler 340 forms a stop for the bottom end of the spring 352. The biased coupler 340, in turn, is stopped by a cam member 356 pivotally supported within the body portion 332 of the camming device 330. The cam member 356 is coupled to the cam lever 334 which extends outside of the body portion 332.

Figure 35:
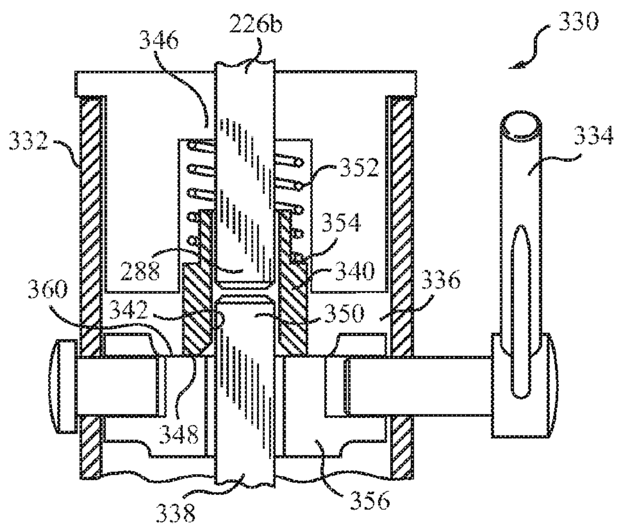
FIG. 35 shows a side view of the camming device in an engaged configuration where adjacent lifting assemblies move in unison.
Figure 36:
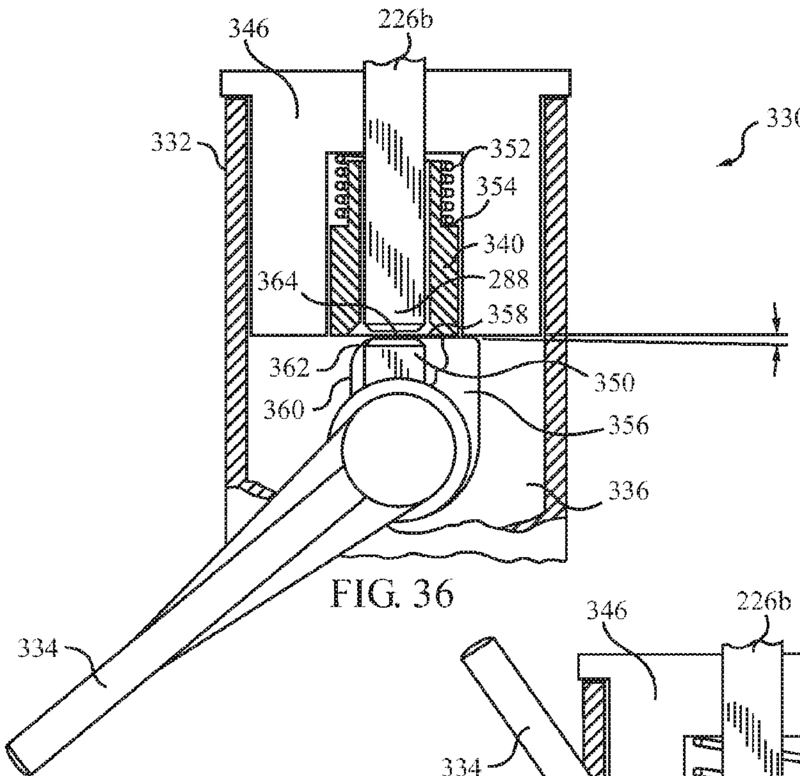
FIG. 36 shows another side view of the camming device in a disengaged configuration where adjacent lifting assemblies may be moved independently of each other.
Figure 37:
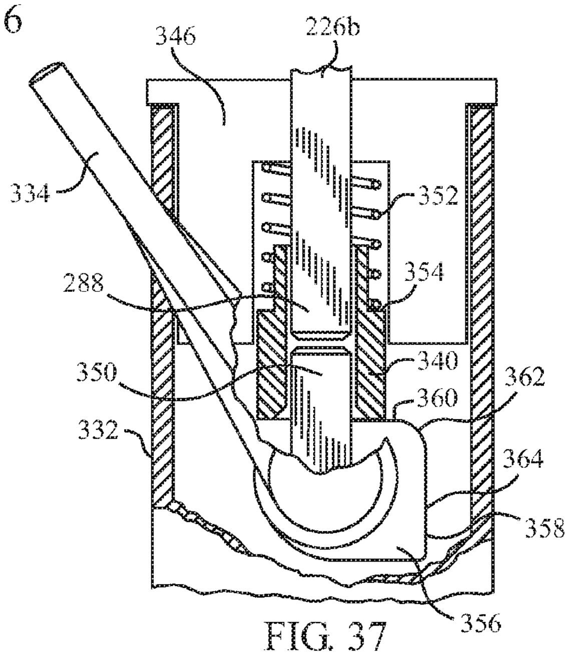
FIG. 37 shows another side view of the camming device in an engaged configuration where adjacent lifting assemblies move in unison.

The cam member 356 is illustrated in the cammed orientation in FIG. 34 and in the uncammed orientation in FIG. 35. FIGS. 36-37 show the relative positions of the cam member 356 and the first end 350 of the drive shaft 338 in the cammed orientation and the uncammed orientation, respectively. The relative position of the cam lever 334 on the exterior of the body portion 332 is also illustrated in FIGS. 36-37.

As shown in FIGS. 34 and 36, when the cam member 356 is pivoted 90° into the cammed orientation, a cam surface 358 is rotated towards the drive shaft 226*b* as a support surface 360 is rotated towards the first end 350 of the drive shaft 338. Since the cam surface 358 is farther than the support surface 360 from the axis of rotation of the cam member 356, as the cam member 356 pivots, the cam surface 358 forces biased coupler 340 to be cammed against the spring bias force and made to slide along the drive shaft 226*b* and, thus, to slide out of engagement with the drive shaft 338. As shown in FIGS. 34 and 36, the cam surface 358 ends up supporting the coupler 340 at a position slightly above the first end 350 of the drive shaft 338. In this manner, the lifting assemblies 30*a*, 30*b* may be moved independently of each other. It will be appreciated, that the lifting assemblies 30*a*, 30*b* should only be moved a relatively small distance independently of each other since the drive member 34*b* may disengage if one of the lifting assemblies 30*a*, 30*b* is lowered or raised substantially above the other lifting assembly 30*a*, 30*b*. In another embodiment, the drive member 34*b* may be telescopic and a U-joint assembly provided to allow the lifting assemblies 30 to be vertically offset a larger amount.

The cam member 356 is configured to partially encircle the drive shaft 338 in both the cammed and uncammed orientations. When uncammed, the support surface 360 of the cam member 356 is located slightly below the first end 350 of the drive shaft 338 (FIGS. 35 and 37) such that the coupler 340 is supported in the engaged position with the drive shaft 338. Thus, when the cam member 356 is uncammed, the spring bias force normally affects coupling of the drive shafts 226*b*, 338 through the coupler 340 such that both the drive shafts 226*b*, 338 may be moved in unison.

The bias force applied by the spring 352 on the coupler 340 should be sufficient to keep the coupler 340 in engagement with the drive shaft 338, but not so great as to prevent the cam member 356 from pivoting to disengage the drive shaft 338 from the coupler 340. The tension of the spring 352 may be adjusted, for example, by selecting the thickness and flexibility of the material forming the spring 352 to prevent inadvertent release or camming (i.e., disengagement of the drive shaft 338 from the coupler 340) due to normal vibration, jolting, and jarring, and, in particular, the normal vibration, bouncing, and bumping that may occur during travel of the vehicle 10. The cam member 356 should be constructed to securely support the coupler 340 in the cammed orientation.

As shown in FIGS. 36-37, in one embodiment, the cam member 356 may be configured to have a rounded edge 362 between the support surface 360 and the cam surface 358. Surfaces 358, 360 may be smooth and just slightly resilient to permit the cam member 356 to smoothly pivot along the bottom end 348 of the coupler 340. The cam member 356 may be made using a number of suitable materials. For example, the cam member 356 may be may be made using nylon or plastic material. One type of material that may be used is DELRIN.

As shown in FIG. 36, the cam surface 358 is configured to have a slight slope 364 toward the rounded edge 362 between the cam surface 358 and the support surface 360 (the amount of slope is shown by the opposing arrows in FIG. 36). If the cam lever 334 is operated upon partially, the force of the coupler 340 upon the sloped surface of the cam surface 358 tends to cause the cam member 356 to "flip" back into the uncammed orientation. In this manner, the cam member 356 may be prevented from resting in a relatively undesirable position that is between the fully cammed orientation and the fully uncammed orientation. When the cam lever 334 is operated fully, however, the cam member 356 is securely positioned in the cammed orientation.

Figure 38:
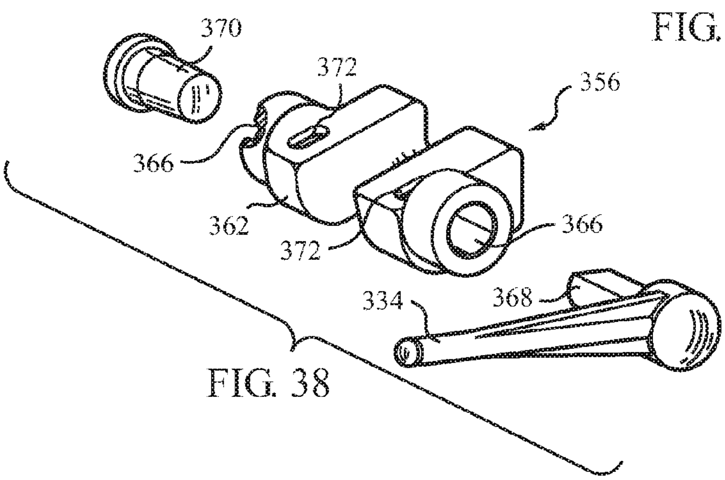
FIG. 38 shows a perspective view of a cam mechanism which may be used with the camming device.

It should be appreciated that various means for pivotally supporting the cam member 356 within the body portion 332 could be used. As shown in FIG. 38, one embodiment of the cam member 356 may be adapted to be added to the body portion 332 that may be previously unprepared for use with the quick release arrangement. The cam member 356 is formed with receiving holes 366 for securely receiving a connecting end 368 of the cam lever 334 on one side and a bolt-type connector 370 on the opposite end. The bolt-type connector 370, in one embodiment, is made of a sturdy smooth material such as hard nylon or plastic. It should be understood that holes may be provided or may be made in the body portion 332 to correspond to the receiving holes 366 and the cam member 356 may then be positioned within the body portion 332 with the receiving holes 366 aligned with the holes in the body portion 332. The bolt-type connector 370 and the connecting end 368 of the cam lever 334 are passed through holes in the body portion 332 and into respective receiving holes 366 to thereby provide the pivotally supported cam member 356 of the quick release arrangement. In addition, for ease of removal of the cam member 356, small access holes 372 are provided within the cam member 356 to connect with the receiving holes 366 in a manner that permits the tip of a screwdriver or other small object to be inserted into the access holes 372 such that the connecting end 368 of the cam lever 334 or bolt-type connector 370 may be pushed out of engagement with the respective receiving hole 366. In one embodiment, the cam lever 334 and the bolt-type connector 370 may be composed of steel, nylon, or plastic material.

It should be appreciated that the embodiments described as being used to adjust the drive assembly between a first orientation where adjacent lifting assemblies 30 and/or moving assemblies 50 may be moved together and a second orientation where adjacent lifting assemblies 30 and/or moving assemblies 50 may be moved independently of each other are provided as selected examples of the many configurations that may be used. In one embodiment, the first orientation and the second orientation are provided through telescopic movement of one component of the drive assembly relative to another component of the drive assembly.

Figure 41:
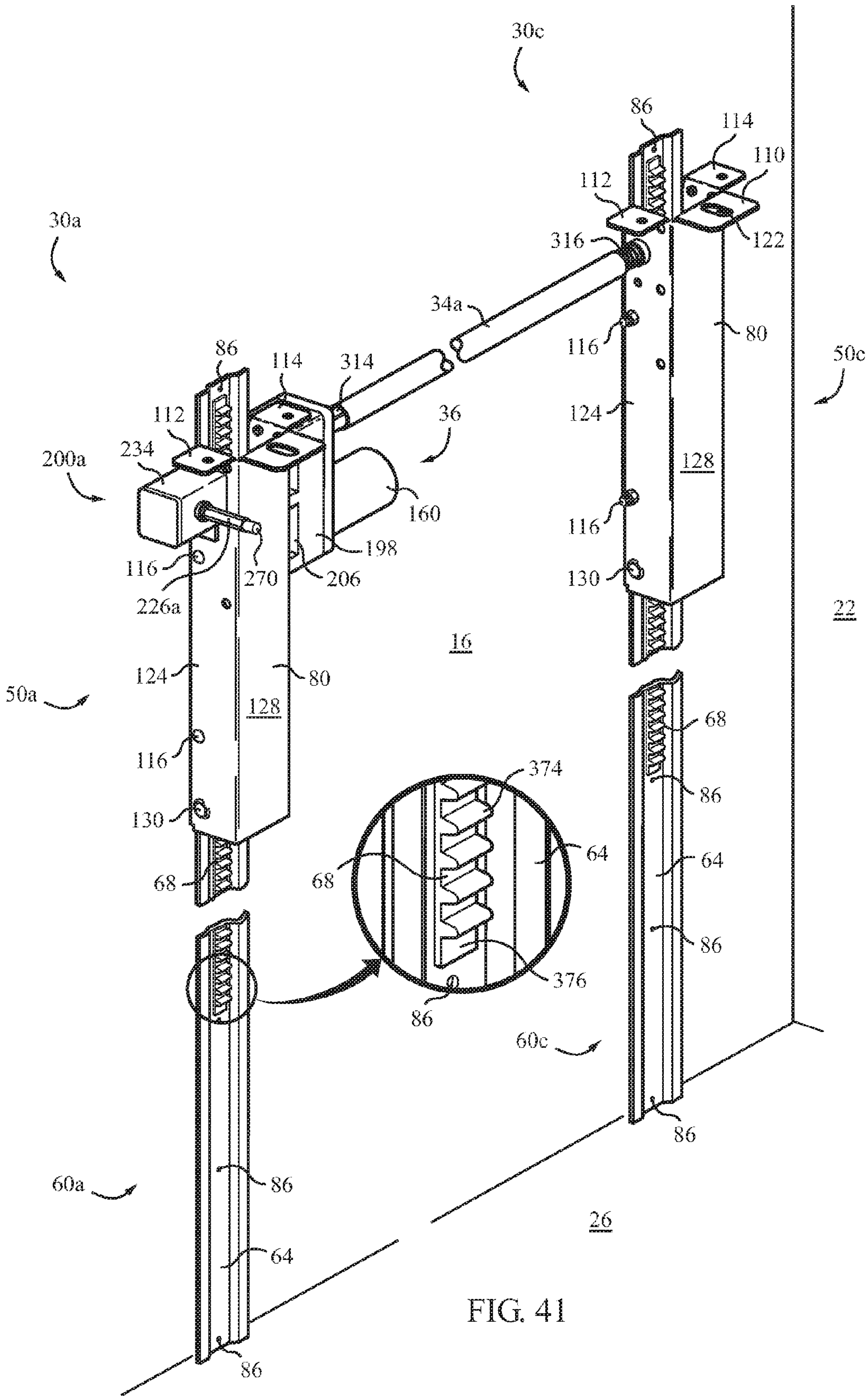
FIG. 41 shows a perspective view of one embodiment of two lifting assemblies coupled to a wall and used to vertically move a bed using a gear rack.

Referring to FIG. 41, another embodiment of the system 12 for moving an object vertically is shown. This embodiment is similar in many ways to the embodiment shown in FIG. 27, and, accordingly, the discussion of the components, configurations, etc. of the embodiment in FIG. 27 may apply equally to this embodiment. However, in this embodiment, the engaging portion 68 of the support member 64 includes a gear rack 376 having a plurality of teeth 374. The gear 70 may be modified in a suitable manner to cooperate with the gear rack 376. The gear 70 may also be positioned sufficiently close to the gear rack 376 to maintain the flanges 72, 74 of the support member 64 in engagement with the flanges 76, 78 of the moving member 80. Also, in one embodiment, the roller 140 may be configured to include teeth which cooperate with the teeth 374 of the gear rack 376 to allow the roller 140 to pass overt the teeth 374 and to maintain the flanges 72, 74 in engagement with the flanges 76, 78, and, thus, prevent disengagement of the moving assembly 50 from the support assembly 60.

In another embodiment, the flanges 76, 78 on the moving member 80 may be configured to define a channel. The flanges 76, 78 may be similar to flanges 306, 308 of the support member 64 shown in FIG. 26 except that the flanges are part of the moving member 80 rather than the support member 64. The support member 64 may be a flat rail that includes the gear rack 376 with each side of the rail cooperating with the channels defined by the flanges 76, 78. Since the channels in the flanges 76, 78 prevent transverse movement of the support member 64 relative to the moving assembly 50, the roller assembly 100 may be eliminated.

It should be noted that in this embodiment, the support assemblies 60 may be configured without the use of the backing member 66 since the teeth 96 of the gear 70 do not pass through the support member 64. Rather, the support assemblies 60 may be comprised solely of the support member 64. In other embodiments, the backing member 66 may be used with the configuration shown in FIG. 41 to provide additional support to the support member 64.

The gear rack 376 and the gear 70 may be any suitable size and configuration so long as they are capable of cooperating with each other to vertically move the bed 40. For example, the gear rack 376 may be a separate component made from a steel material which is coupled to the support member 64 using a suitable fastener such as a bolt and the like or fastening method such as welding and the like. In another embodiment, the gear rack 376 may be integrally formed as part of the support member 64. Also, the gear rack 376 may be made from steel, plastic, composites, polymeric material, and the like.

Figure 42:
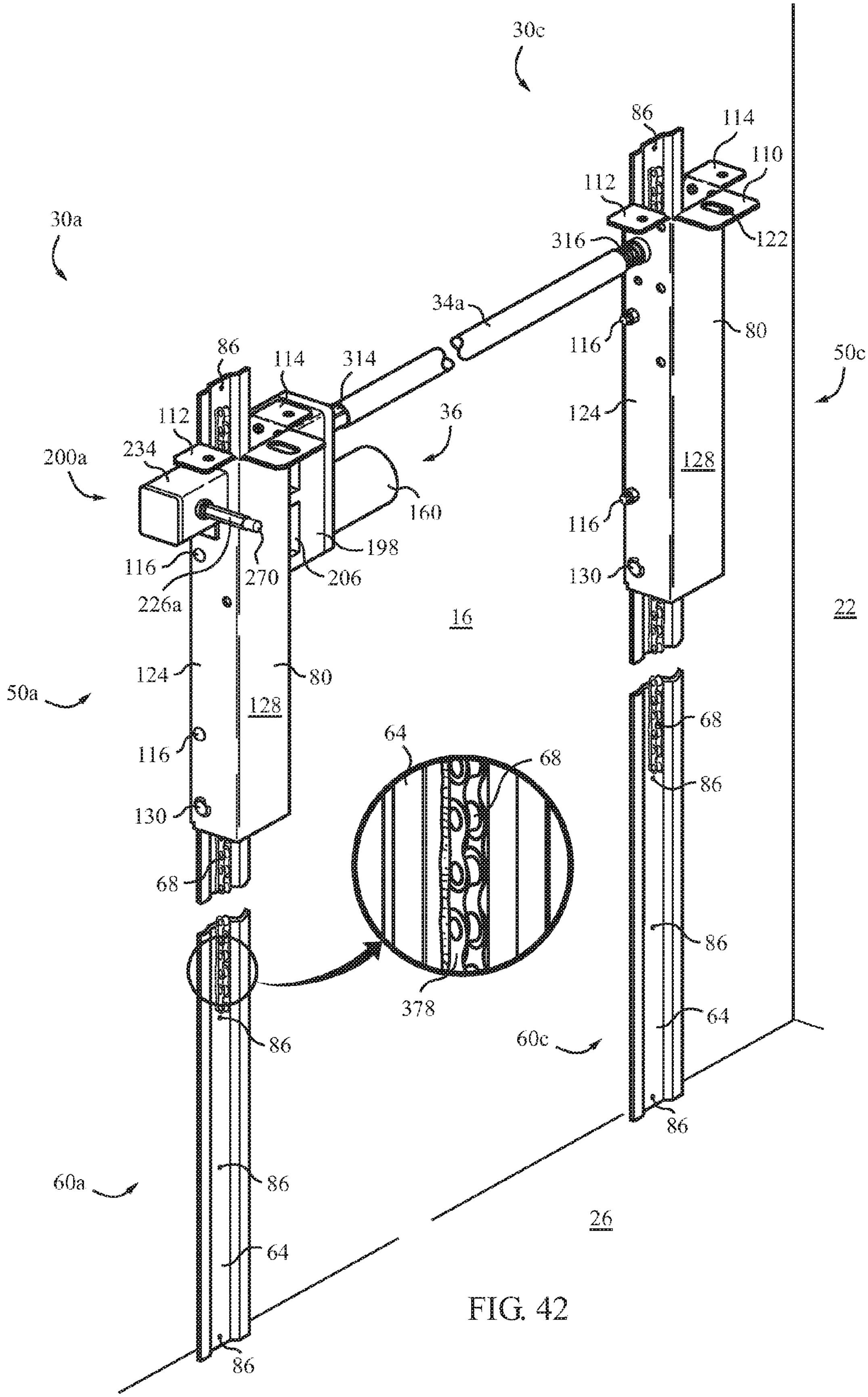
FIG. 42 shows a perspective view of one embodiment of two lifting assemblies coupled to a wall and used to vertically move a bed using a stationary chain.

Referring to FIG. 42, another embodiment of the system 12 for moving an object vertically is shown. This embodiment is also similar in many ways to the embodiment shown in FIG. 27, and, accordingly, the discussion of the components, configurations, etc. of the embodiment in FIG. 27 may also equally apply to this embodiment. In this embodiment, however, the engaging portion 68 of the support member 64 includes a chain 378 that extends vertically along the first side wall 16 and is stationary. A sprocket—alternatively referred to herein as a rotatable member, rotatable wheel or toothed wheel—may be substituted for the gear 70 in the drive mechanism 90. The sprocket may be sized and configured to cooperate with the chain 378 to vertically move the bed 40. Also, the sprocket may be positioned sufficiently close to the chain 378 to maintain the flanges 72, 74 of the support member 64 in engagement with the flanges 76, 78 of the moving member 80. Also, the roller 140 may be configured to include teeth which cooperate with the chain 378 to allow the roller 140 to pass over the chain 378 and maintain the flanges 72, 74 in sliding engagement with the flanges 76, 78. The moving assembly 50 may also be maintained in sliding engagement with the sliding assembly using the flanges 76, 78 that define a channel as explained in connection with FIG. 41.

It should also be noted that in the embodiment shown in FIG. 42, the support assemblies 60 may be configured without the use of the backing member 66 since the teeth of the sprocket do not pass through the support member 64. Rather, the support assemblies 60 may be comprised solely of the support member 64.

The chain 378 may be coupled to the support member 64 in any of a number of suitable ways. For example, as shown in FIG. 42, the chain 378 may be welded to the support member 64. In another embodiment, the chain 378 may be configured to include one or more links each of which includes a flange portion which extends outwardly from one side of the link to allow the flange to be coupled to the support member 64 using a fastener. The flange portions may include holes to receive a fastener. Other suitable ways of coupling the chain 378 to the support member 64 may also be used.

The chain 378 and the sprocket may be any suitable size and configuration so long as they are capable of cooperating with each other to vertically move the bed 40. For example, the chain 378 may be a roller chain which has sufficient strength to support the weight of the bed 40. The chain 378 may be nickel plated to prevent corrosion and may have a lightweight food grade oil coating on it. Also, the chain 378 may be made from steel and/or any other suitable material (e.g., plastic, composites, polymeric material, and the like).

Figure 43:
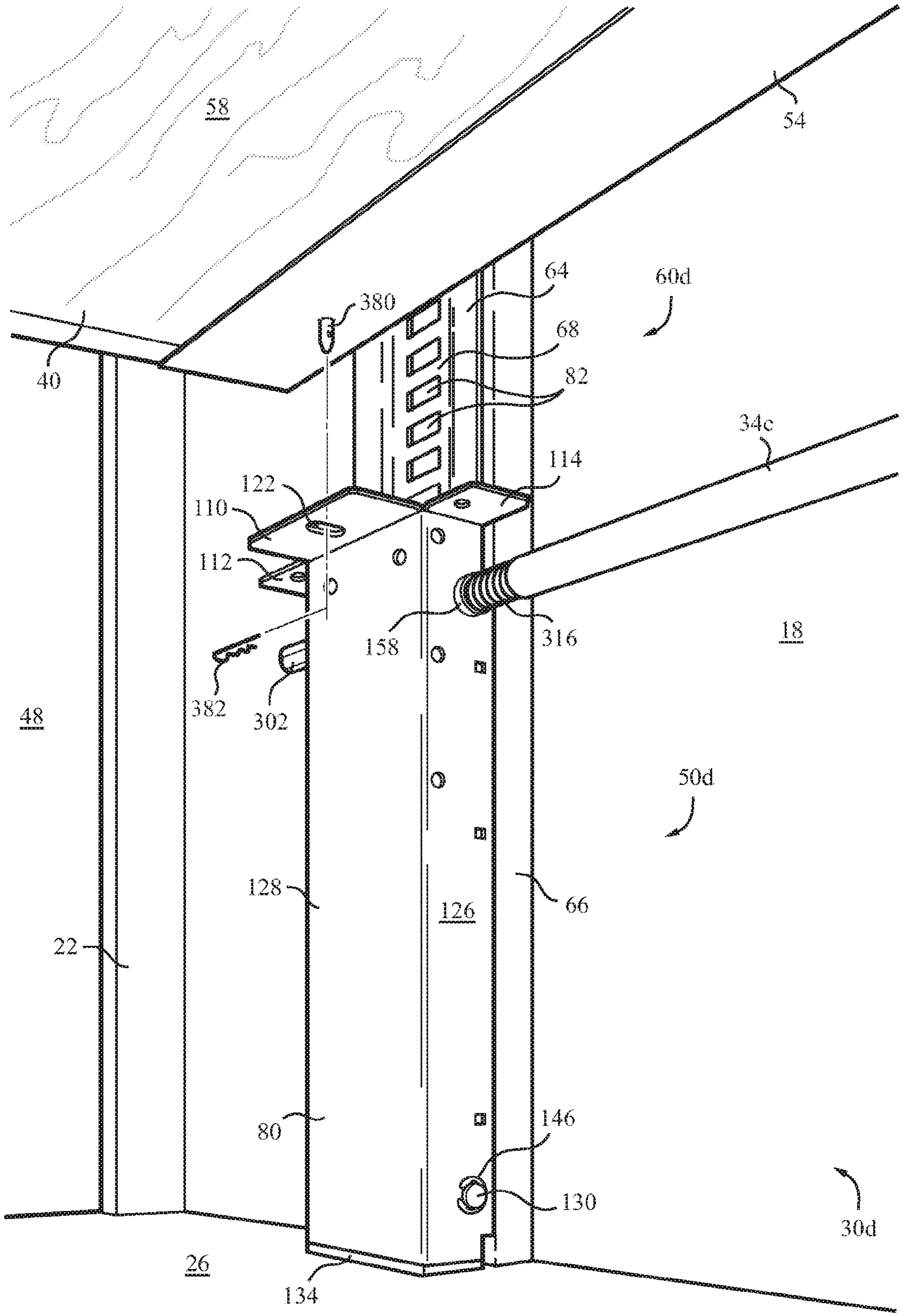
FIG. 43 shows a perspective view of one embodiment of an arrangement for coupling a bed to a lifting assembly in a disengaged configuration.
Figure 44:
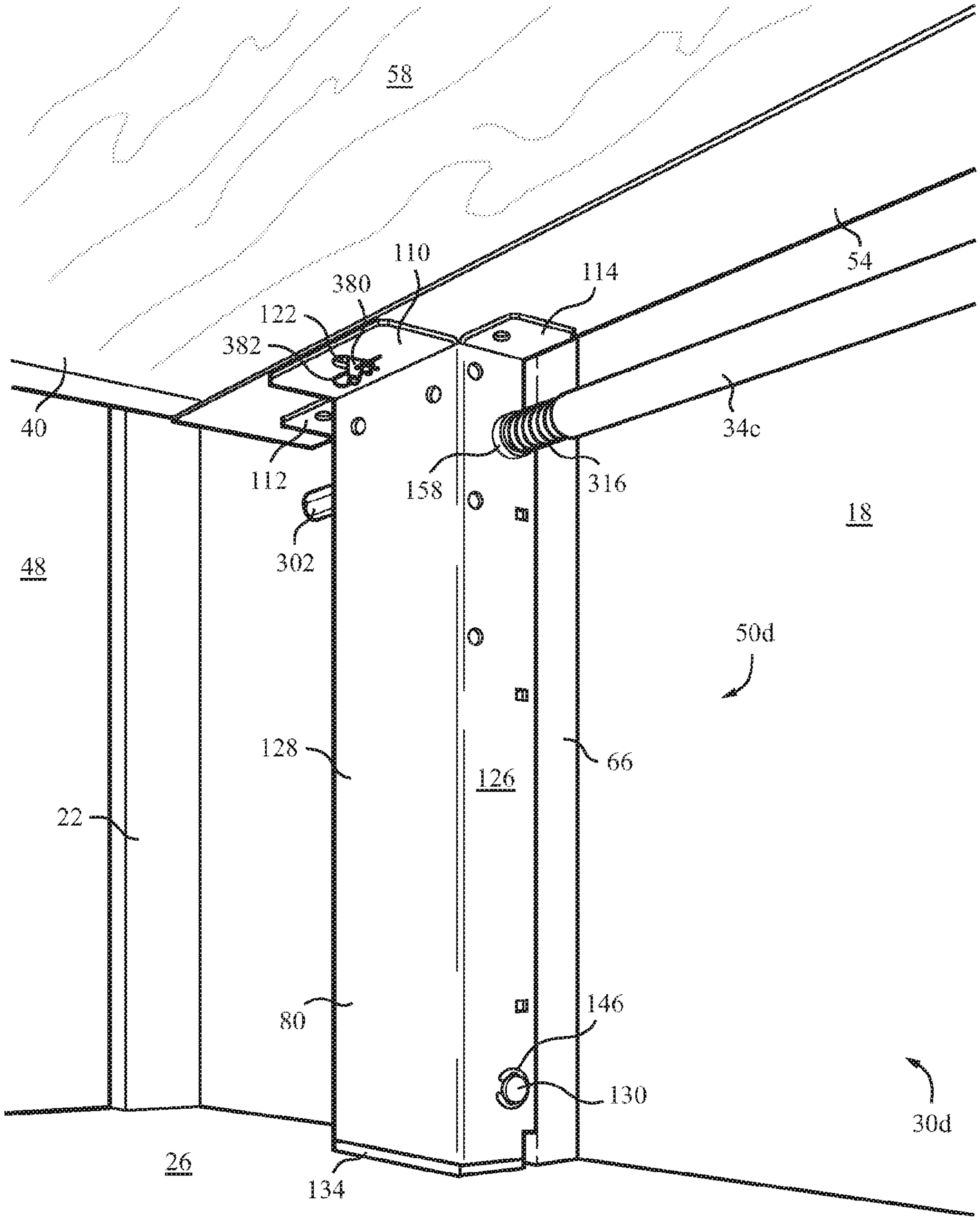
FIG. 44 shows a perspective view of the arrangement for coupling a bed to a lifting assembly in an engaged configuration.

FIGS. 43-44 show one way that the bed 40 may be coupled to the moving assemblies 50. Moving assembly 50*d* is used to illustrate how this can be done. However, it should be appreciated that the other moving assemblies 50*a*, 50*b*, 50*c* may also be coupled to the bed 40 in this or a similar manner.

As shown in FIGS. 43-44, the bed frame 54 includes a mounting element 380 which is configured to cooperate with the mounting member 110 on the moving assembly 50*d* to securely couple the bed 40 to the moving assembly 50*d*. In this embodiment, the mounting element 380 is a pin and the mounting member 110 is a flange including the aperture 122. Also, the mounting members 112, 114 may be used to provide additional support to the bed 40. FIG. 43 shows the mounting element 380 and the mounting member 110 before being coupled together, and FIG. 44 shows the mounting element 380 and the mounting member 110 coupled together.

As mentioned previously, in some instances, the distance between the first side wall 16 and the second side wall 18 in the vehicle 10 may vary as the bed 40 moves vertically. In one embodiment, the aperture 122 in the mounting member 110 is oversized to allow the mounting element 380 to move within the aperture 122 in the longitudinal direction of the bed 40. Thus, the width variations between the side walls 16, 18 may be accounted for by the longitudinal movement, relative to the bed 40, of the mounting element 380 in the aperture 122. Thus, in this embodiment, play is provided where the bed 40 is coupled to the moving assembly 50*d* to account for the width variations of the side walls 16, 18.

It should be appreciated that the width variations between the side walls 16, 18 may be compensated for using a number of arrangements and techniques. For example, in another embodiment, the bed frame 54 may include an oversized aperture which is configured to receive a protrusion included as part of the mounting member 110. The aperture on the bed frame 54 may be configured to allow the protrusion to move in the aperture in a direction which is perpendicular to the side walls 16, 18 of the vehicle 10 as the bed 40 moves vertically.

In another embodiment, the bed 40 may be coupled to opposed moving assemblies 50 using an arrangement similar to how the drive member 34*b* is coupled between the moving assemblies 50*a*, 50*b*. For example, the bed frame 54 may include a tubular portion on each end which receive a mounting member in the form of a shaft coupled to the moving assemblies 50. The bed 40 may be coupled between the moving members using a biasing member (e.g., spring) and a spacer in a similar way to how the drive member 34*b* is coupled between the moving assemblies 50*a*, 50*b*. Once the bed 40 is coupled to the moving assemblies 50 in this manner, the width variations between the side walls 16, 18 may be accounted for by the telescopic movement of the tubular portions and the mounting members. A number of additional configurations may also be provided to securely couple the bed 40 to the moving assembly 50 and also compensate for the width variations between the side walls 16, 18.

As shown in FIGS. 43-44, the first end 302 of the drive shaft 150*d* (FIGS. 9-10) extends outwardly from the moving member 80 and may provide a suitable location to use the manual actuation device to vertically move the bed 40. As explained previously, a manual actuation device such as a crank or socket may be positioned on the first end 302 to drive the drive assembly.

It should be appreciated that numerous other ways may be provided to couple the bed 40 to the lifting assemblies 30 in addition to those previously described. For example, the bed frame 54 and the moving member 80 may be provided as one integral structure which cooperates with the support assemblies 60. In another embodiment, the bed 40 may be coupled to the lower end 132 of the moving assembly 50. Any of a number of additional ways may be used so long as the bed 40 is securely coupled to the moving assemblies 50.

Figure 45:
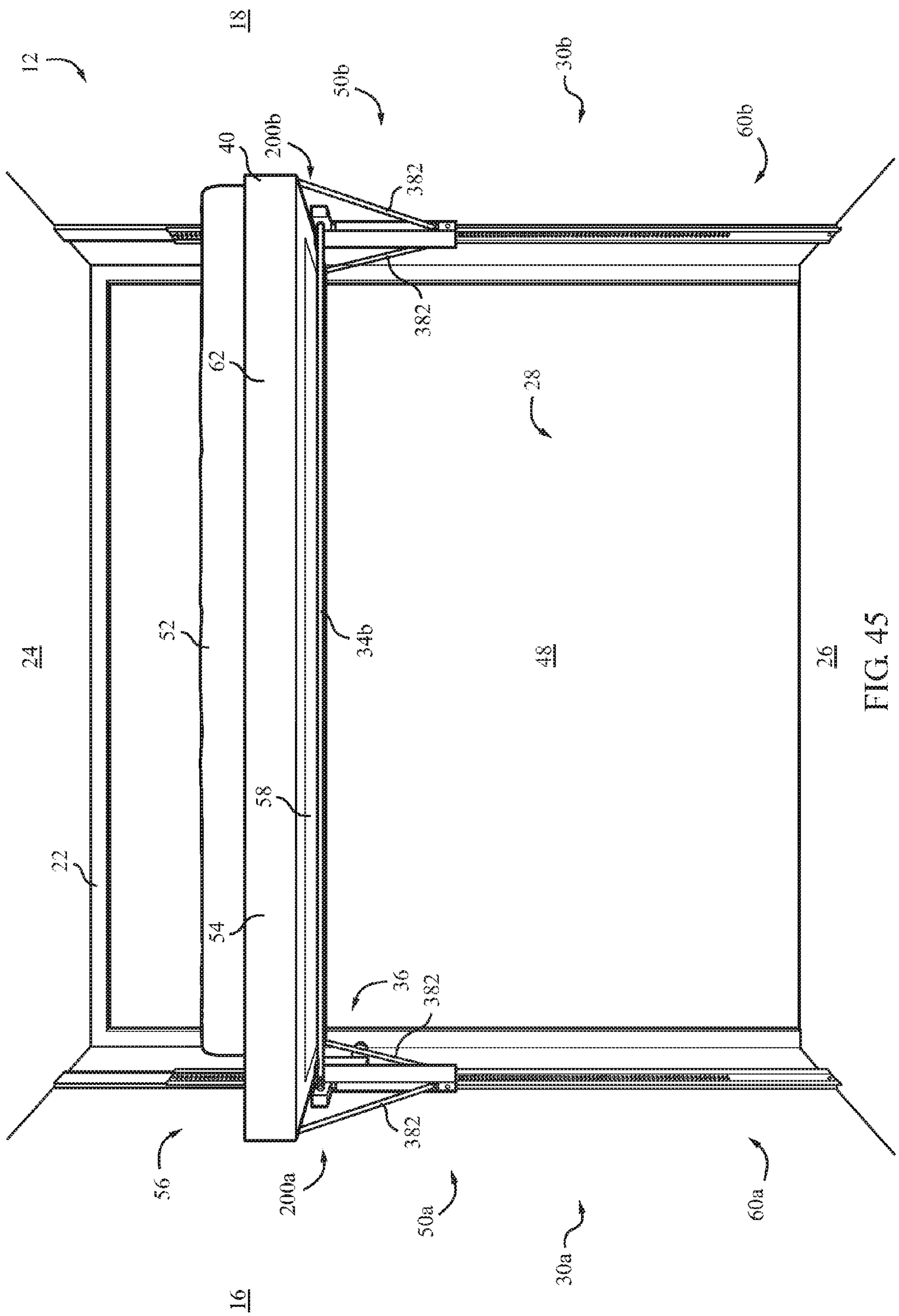
FIG. 45 shows a perspective view of another embodiment of a system for vertically moving one or more beds using one lifting assembly coupled to each opposing wall.

Referring to FIG. 45, another embodiment is shown of the system 12 for moving objects vertically. This embodiment is similar in many ways to the embodiment shown in FIG. 2. However, in this embodiment, two lifting assemblies 30*a*, 30*b* have been provided to lift the bed 40 without the use of the lifting assemblies 30*c*, 30*d*. It should be appreciated that the number of lifting assemblies 30 used to vertically move the bed 40 may vary widely according to the particular situation. In some instances, it may be desirable to reduce weight and cost by using fewer lifting assemblies. Generally, in situations where fewer lifting assemblies 30 are used, the bed 40 tends to be smaller. For example, the bed 40 shown in FIG. 2 may be a queen size or larger bed while the bed 40 in FIG. 45 may be a double size or smaller. That being said, there may be situations where a queen sized or larger bed may be raised and lowered using two lifting assemblies 30, shown in FIG. 45, or a double sized or smaller bed may be raised and lowered using four or more lifting assemblies 30.

The number of lifting assemblies 30 may be greater than four. For example, the configuration shown in FIG. 2 may be modified so that the rear wall 22 of the vehicle is fixed and two additional lifting assemblies 30 are coupled thereto for a total of six lifting assemblies 30. The drive member 34*b* may be coupled between the lifting assemblies 30*c*, 30*d* and split into three sections. The drive shafts 150 of the additional lifting assemblies 30 coupled to the rear wall 22 may be in line with and coupled together by the three sections of the drive member 34*b*. Thus, all of the six lifting assemblies 30 may be moved together.

Referring back to FIG. 45, the bed 40 may be steadied using braces or supports 382 which extend diagonally from the sides 62 or the bottom side 58 of the bed 40 to the moving assemblies 50. The braces 382 may be any suitable material such as plastic, composites, steel, etc. Also, the braces 382 may be coupled to the moving member 80 in any of a number of suitable ways such as welding, brazing, and the like or with the use of any suitable fastener such as screws, bolts, and the like. In one embodiment, the braces 382 are coupled to the sides 124, 126 of the moving member 80 using bolts.

The braces 382 may extend from the bed 40 to the moving assemblies 50 in a plane that is generally parallel to the plane of the side walls 16, 18, as shown in FIG. 45. In another embodiment, the braces 382 may extend from the bed 40 to the moving assemblies 50 in a plane which is generally perpendicular to the side walls 16, 18, or in any plane between being perpendicular or parallel to the side walls 16, 18. Although the braces 382 are shown extending downwardly to the moving assemblies 50, it is also contemplated that the bed 40 may be coupled to the lower end 132 of the moving assemblies 50 and the braces 382 extend upward from the bed 40 to the upper end 154 of the moving assemblies 50.

In another embodiment, dummy support assemblies and moving assemblies may be coupled to the side walls 16, 18 parallel to the lifting assemblies 30*a*, 30*c*. Thus, the bed 40 may be supported by the dummy support assemblies so that the braces 382 may be eliminated. The support assemblies and moving assemblies are referred to as dummy support assemblies and dummy moving assemblies because they are generally not used to lift the bed 40, either manually or with the use of the motor assembly 36. Rather, the dummy assemblies may be used to guide the movement of the bed using a dummy moving assembly which cooperates with a dummy support assembly. For example, the dummy moving assembly may be a flange on the bed 40 which cooperates with a C-channel coupled to the side wall of the vehicle 10. The dummy support assemblies and moving assemblies may be less costly and simpler in operation and assembly than other support assemblies or moving assemblies. It should be understood that the use of the term support assembly, moving assembly, and the like without the term "dummy" includes both dummy assemblies and other assemblies.

Figure 46:
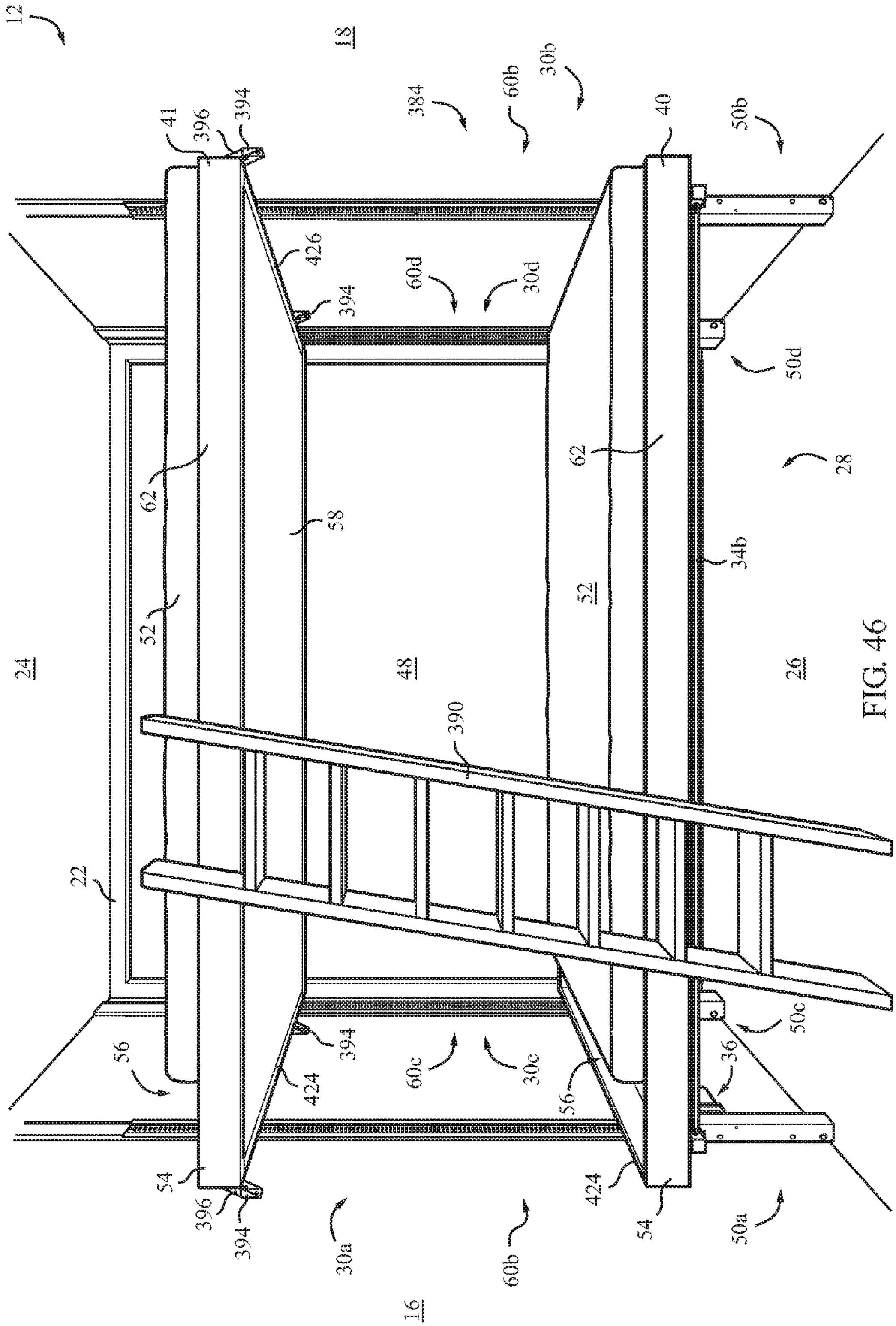
FIG. 46 shows a perspective view of another embodiment of a system for vertically moving superposed beds where the beds are in a use configuration.
Figure 47:
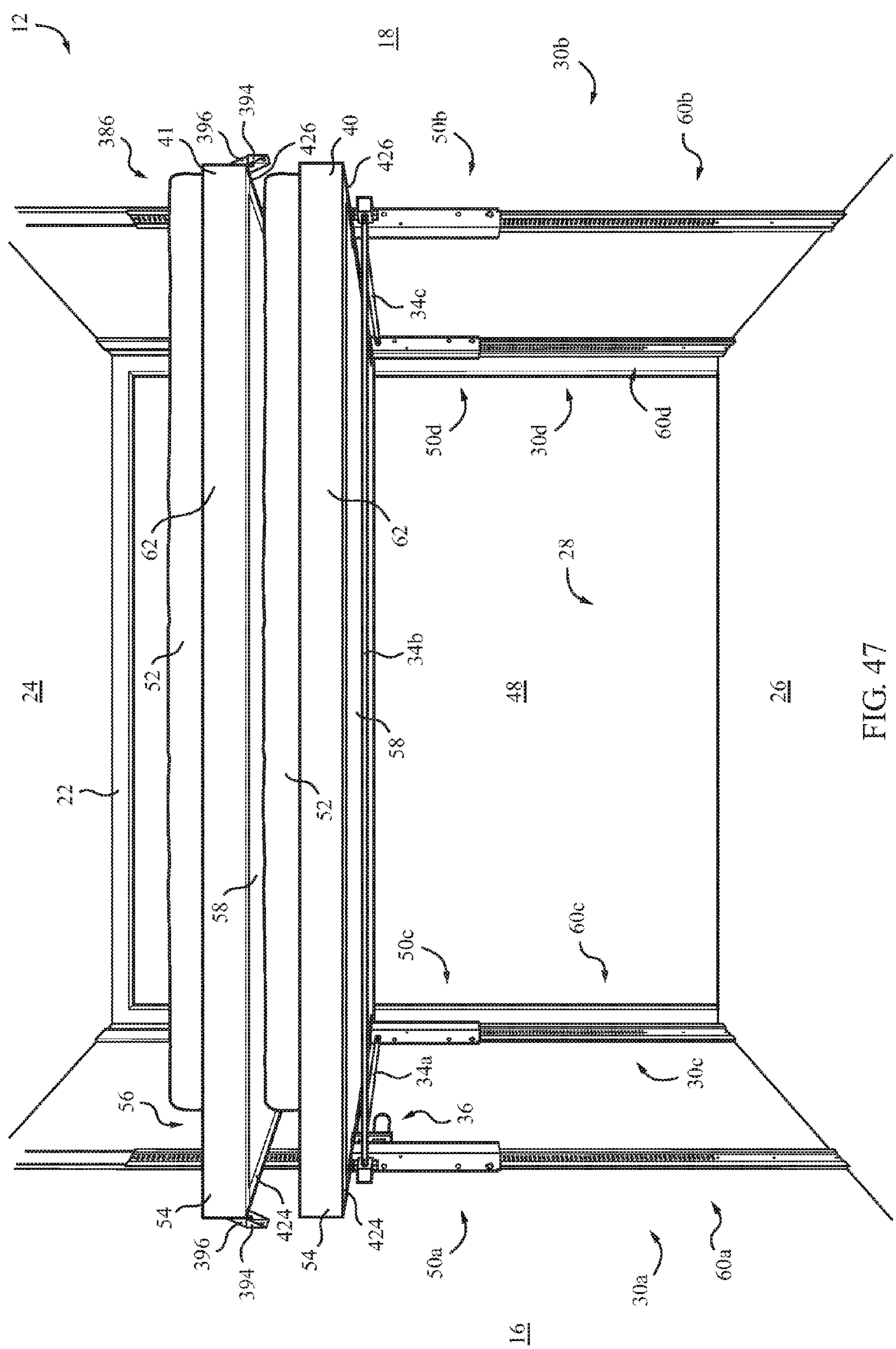
FIG. 47 shows a perspective view of the system for vertically moving superposed beds where the beds are positioned adjacent to each other.
Figure 48:
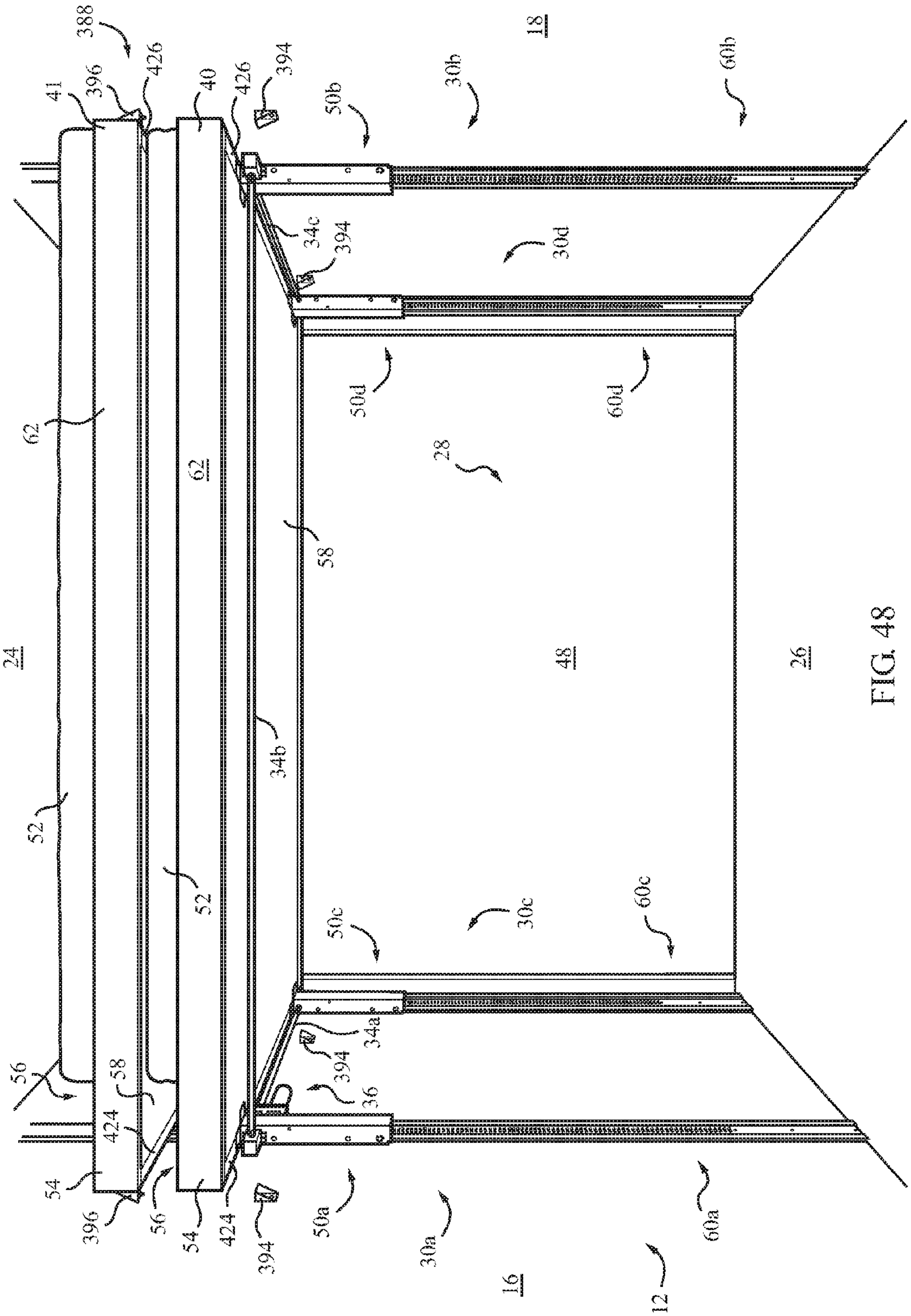
FIG. 48 shows a perspective view of the system for vertically moving superposed beds where the beds are positioned adjacent to each other and adjacent to a ceiling.

FIGS. 46-48 show another embodiment of the system 12 which may be used to vertically move or lift two or more beds 40, 41 in the vehicle 10. As shown in FIGS. 46-48, a first or lower bed 40 and a second or upper bed 41 may be vertically moved between a use configuration 384—alternatively referred to herein as a first configuration, a first orientation, or a lowered configuration—where the beds 40, 41 are spaced apart (FIG. 46), an intermediate configuration 386—alternatively referred to herein as a fourth configuration—where the beds 40, 41 are positioned adjacent to each other with the upper bed 41 being in the same position as in the use configuration 384 (FIG. 47), and a stowed configuration 388—alternatively referred to herein as a second configuration, a second orientation, or a raised configuration—where the beds 40, 41 are stowed adjacent to the ceiling 24 of the vehicle 10.

In general, when the beds are in the stowed configuration 388, off-road vehicles may be received and transported in the cargo area 28 of the vehicle 10. When the off-road vehicles have been moved out of the cargo area 28, the beds may be moved to the use configuration 384. Typically, the beds 40, 41 are in the use configuration 384 when the vehicle 10 is stationary and being used for camping and the like. In this manner, the cargo area 28 may serve dual purposes—receiving and/or transporting off-road vehicles and sleeping.

The lower bed 40 may be moved and otherwise configured in a manner similar to the bed 40 referred to in FIG. 2. Accordingly, many of the same principles apply to the embodiment shown in FIGS. 46-48.

In one embodiment, the upper bed 41 is moved between the use configuration 384 and the stowed configuration 388 using the lower bed 40. For example, when the motor assembly 36 is activated, the lower bed 40 moves upward until it contacts the bottom side 58 of the upper bed 41 at the intermediate configuration 386 shown in FIG. 47. The lower bed 40 continues moving upward while bearing the weight of both the beds 40, 41 until the beds 40, 41 reach the stowed configuration 388. Many variations may be made on this embodiment to provide additional embodiments. For example, rather than the lower bed 40 contacting the bottom side 58 of the upper bed 41, the moving assemblies 50 may contact the bed frame 54 of the upper bed 41.

In another embodiment, both of the beds 40, 41 are coupled to moving assemblies 50 which cooperate with the support assemblies 60. A separate drive assembly, including separate motor assemblies 36 may be provided to move the moving assemblies coupled to each of the upper bed 41 and the lower bed 40 separately. Many other suitable configurations may also be provided.

A wide variety and configurations of the beds 40, 41 may be used. In one embodiment, the beds 40, 41 may be identical or nearly identical to each other. Using identical or very similar configurations for the lower bed 40 and the upper bed 41 may make it easier to inventory, manufacture, and install the beds 40, 41. However, in some embodiments, the beds 40, 41 may be configured to be different from each other. For example, the upper bed 41 may be a double sized bed while the lower bed 40 may be a queen-sized bed or vice versa. Also, the bed frame 54 of the upper bed 41 may be different than the bed frame 54 of the lower bed 40 to allow the upper bed 41 to be supported in a spaced apart position from the lower bed 40 in the use configuration 384.

In another embodiment, the upper bed 41 may be provided with a railing around the periphery of the upper bed 41 to prevent persons sleeping thereon from rolling off. The railing may be stationary or may itself be movable to a stowed position. For example, the railing may slide downward relative to the upper bed 41 to allow the upper bed 41 to be positioned closer to the ceiling 24 in the stowed configuration 388. Also, the railing may pivot downward on an axis which extends longitudinally along the side of the upper bed 41.

As shown in FIG. 46, a ladder 390 may be used to access the upper bed 41. The ladder may be configured in any of a number of suitable ways and may be made from any of a number of suitable materials such as steel, wood, etc. In one embodiment, the ladder 390 may include hooks which fit over the sides 62 of the upper bed 41 or other suitable structure to securely couple the ladder 390 to the upper bed 41. Thus, the ladder 390 may be less likely to slide or move while a person is using it to get on the upper bed 41.

Figure 49:
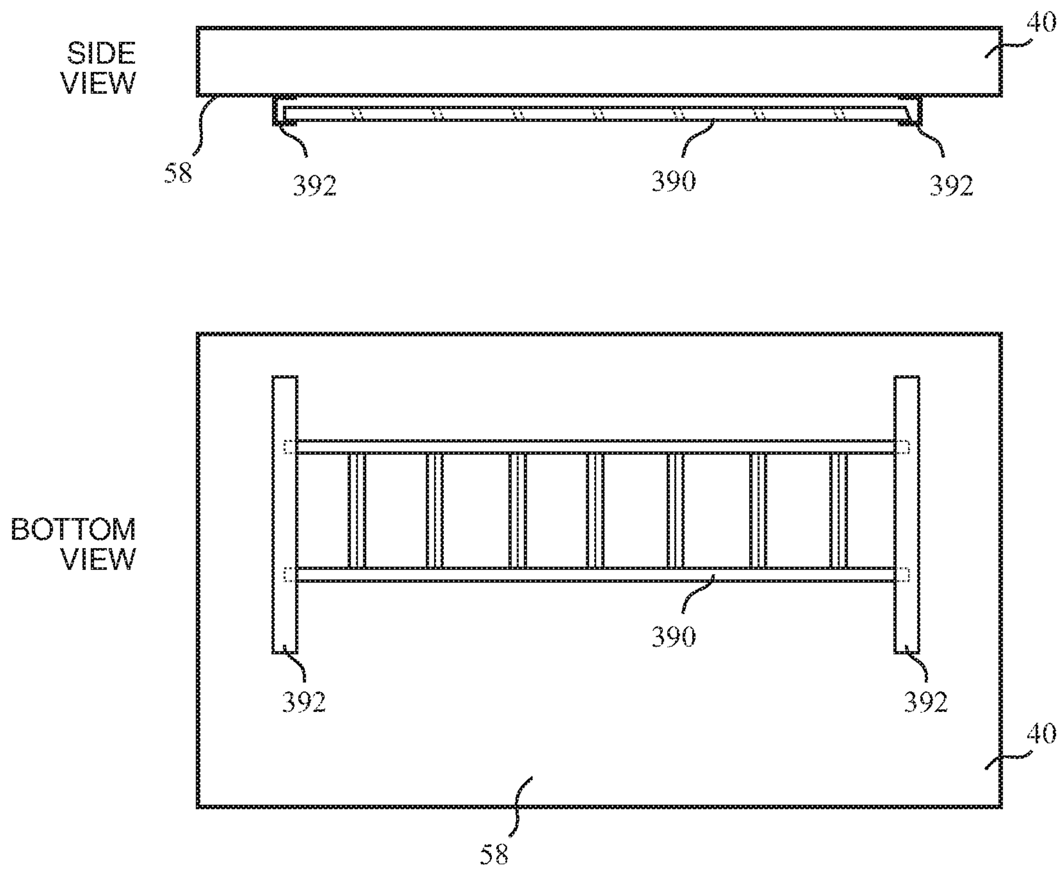
FIG. 49 shows a bottom view and a side view of one embodiment for stowing a ladder which may be used to enter and exit an upper bed.

Referring to FIG. 49, the ladder 390 may be stowed using support brackets 392 coupled to the bottom side 58 of the lower bed 40 when the beds 40, 41 are in the stowed configuration 388. The support brackets 392 may be made from a number of suitable materials such as wood, plastic, metal, etc. In one embodiment, the support brackets 392 may have a U-shaped cross section and may be coupled to the bottom side 58 of the lower bed 40 so that the open portions of the support brackets 392 face each other. The ladder 390 may be placed between the support brackets 392 and in the channel defined by each U-shaped support bracket 392. The ladder 390 may be secured to the support brackets 392 and/or the bottom side 58 of the lower bed 40 using a wide variety of fasteners, brackets, couplers, etc. For example, biased detents positioned on the brackets may be used to allow the ladder 390 to be easily and securely stowed (e.g., detent is sloped to allow the ladder 390 to bias it when being put in the stowed position, but requires a user to push the detent down to remove the ladder 390). In another embodiment, the ladder 390 may also be stowed on the top or bottom of the upper bed 41.

As shown in FIGS. 46-48, the upper bed 41 may be supported in the use configuration 384 by one or more stops or brackets 394 coupled to the side walls 16, 18. The lower bed 40 is designed, dimensioned, and disposed such that when the lower bed 40 is raised and lowered, it is not affected by the stops 394. For example, the sides 62 of the beds 40, 41 may include a first side or end 424 and a second side or end 426 where the sides 424, 426 on the lower bed 40 are disposed a distance from the side walls 16, 18 to miss contacting the stops 394 as the lower bed 40 is moved vertically.

In contrast, the upper bed 41 may be configured to engage the stops 394 using a complementary support bracket 396 coupled to the upper bed 41 as shown in FIGS. 46-48. Engagement of the stops 394 with the support brackets 396 may be achieved through frictional contact, latches, or a pin and hole engagement as illustrated in FIGS. 46-48. With continued reference to FIGS. 46-48, the support bracket 396 coupled to the upper bed 41 extends from the sides 424, 426 toward the side walls 16, 18, respectively so that as the upper bed 41 is lowered, the support brackets 396 contact or engage the stops 394. The upper bed 41 stops descending when the stops 394 contact or engage the support brackets 396. The stops 394 securely support the upper bed 41 in a fixed position as the lower bed 40 continues to move downward.

Figure 50:
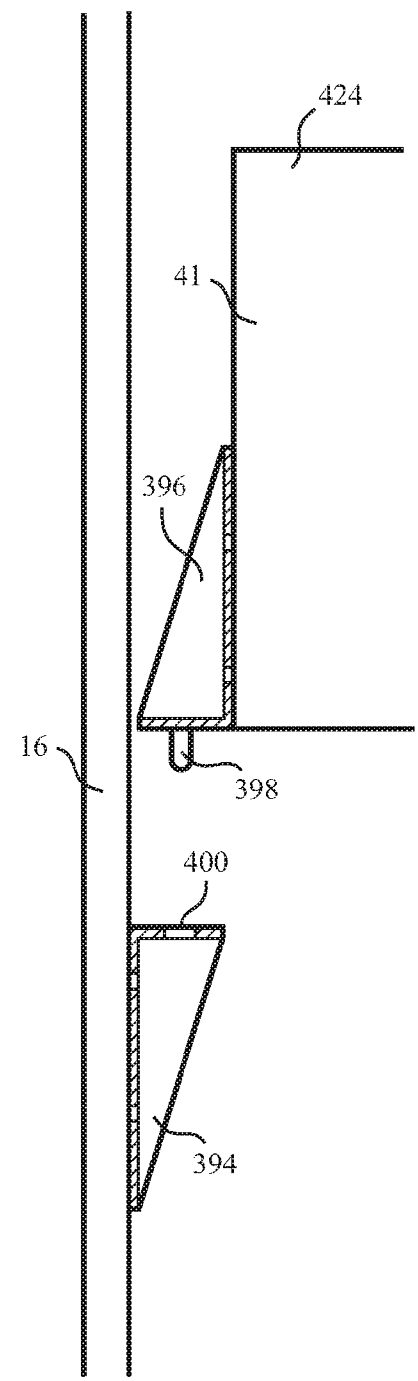
FIG. 50 shows a side view of one embodiment of a stop or stop assembly which is used to support an upper bed in the use configuration.
Figure 51:
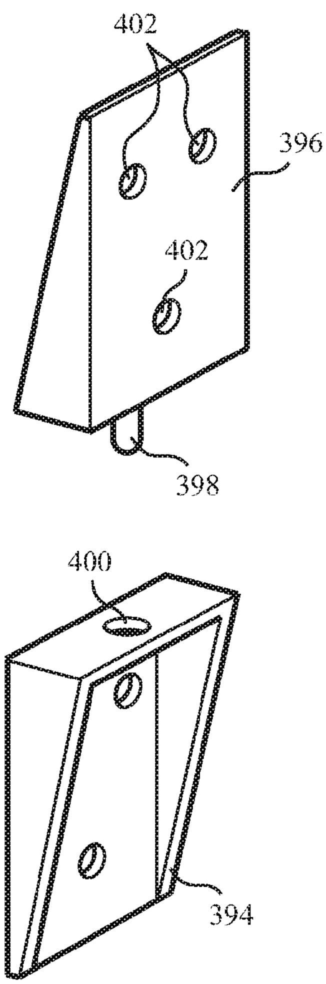
FIGS. 51-52 show perspective views of the stop in a disengaged configuration and an engaged configuration, respectively, the stop being used to support the upper bed in the use configuration.
Figure 52:
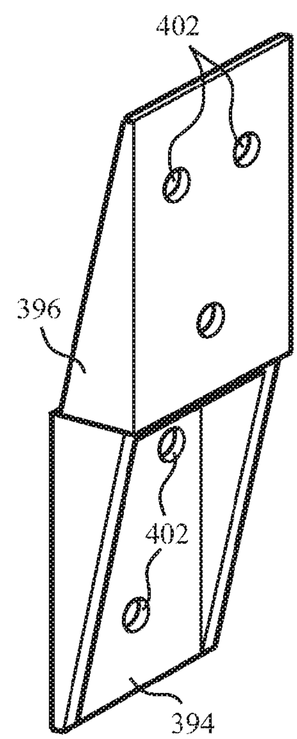

Referring to FIGS. 50-52, one embodiment of the stops 394 and corresponding support brackets 396 is shown as a pin in hole arrangement that includes pins 398 cooperating with holes 400 to stop the upper bed 41 from descending further and support the upper bed 41 in the use configuration 384. FIG. 50 shows a side view of the stop 394 coupled to the first side wall 16 of the vehicle 10 and the support bracket 396 coupled to the first side 424 of the upper bed 41. In this embodiment, the pin 398 protrudes from the support bracket 396 and engages the hole 400 in the stop 394. However, in other embodiments, the pin 398 may be part of the stop 394 and the hole 400 may be included in the support bracket 396. FIGS. 51-52 show the stops 394 disengaged with the support brackets 396 and engaged with the support brackets 396, respectively.

In one embodiment, the stops 394 and the support brackets 396 may be identical or at least substantially identical to each other. For example, the stops 394 and the support brackets 396 may be the same except that the stop 394 includes the pin 398 and the support bracket includes the hole 400. This may make it easier to inventory and manufacture the stops 394 and the support brackets 396. The stops 394 and the support brackets 396 may also include mounting holes 402 which receive a suitable fastener such as a bolt, screw, clamp, etc. to couple the stops 394 to the side walls 16, 18 and the support brackets 396 to the upper bed 41.

It should be appreciated that the stops 394 and the support brackets 396 may be provided in a wide number of configurations using an equally wide number of materials. For example, the stops may be coupled to or integrally formed with the support assembly 60, thus eliminating the need to separately couple the stops 394 to the side walls 16, 18 of the vehicle 10. Also, the stops 394 and the support brackets 396 may be made from plastic, composites, wood, metal, and so forth.

The upper bed 41 may include guides or flanges which extend from the bed frame 54 on each of the first side 424 and the second side 426 towards the side walls 16, 18, respectively, so that a guide extends around each of the support assemblies 60 to guide the movement of the upper bed 41. Thus, when the upper bed 41 is lowered, the support brackets 396 may be aligned to engage the stops 394. In another embodiment, the upper bed 41 may not be guided as it moves up and down.

Figure 53:
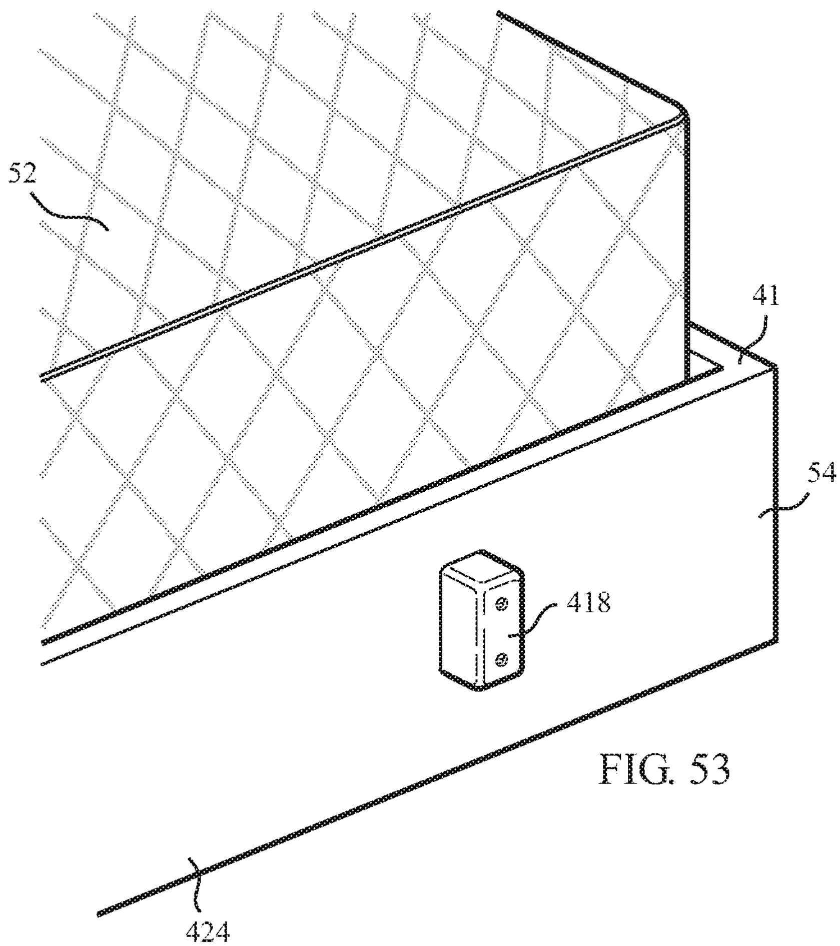
FIG. 53 shows a perspective view of one embodiment of a guide used to guide movement of a bed as it moves vertically.
Figure 54:
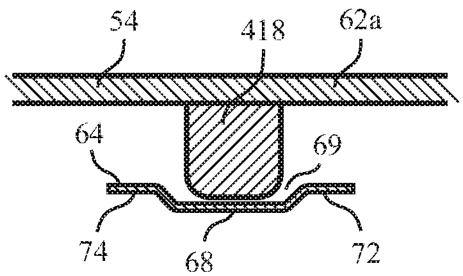
FIG. 54 shows a top view of the guide positioned in cooperation with a support member to guide the movement of the bed as it moves vertically.

In another embodiment, shown in FIGS. 53-54, the upper bed 41 may use a guide 418 which cooperates with the recess 69 formed in the support member 64. The flanges 72, 74, which are offset from the engaging portion 68, serve to prevent the guide 418 from moving out of the recess 69 and, thus, guide the upper bed 41 as it moves between the use configuration 384 and the stowed configuration 388.

Figure 55:
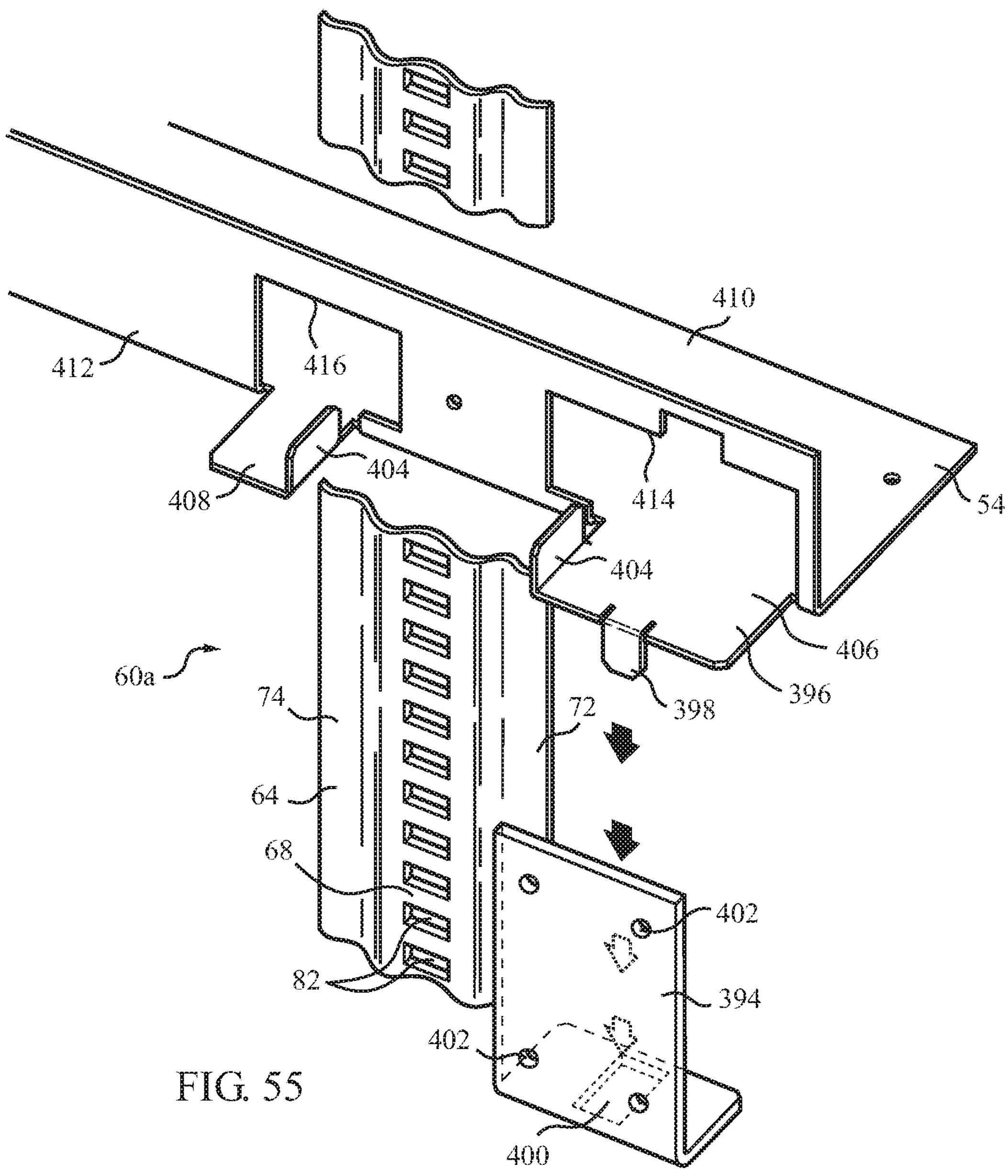
FIGS. 55-56 show perspective views of another embodiment of a guide and/or stop used to guide vertical movement of an upper bed and/or support an upper bed in the use configuration.
Figure 56:
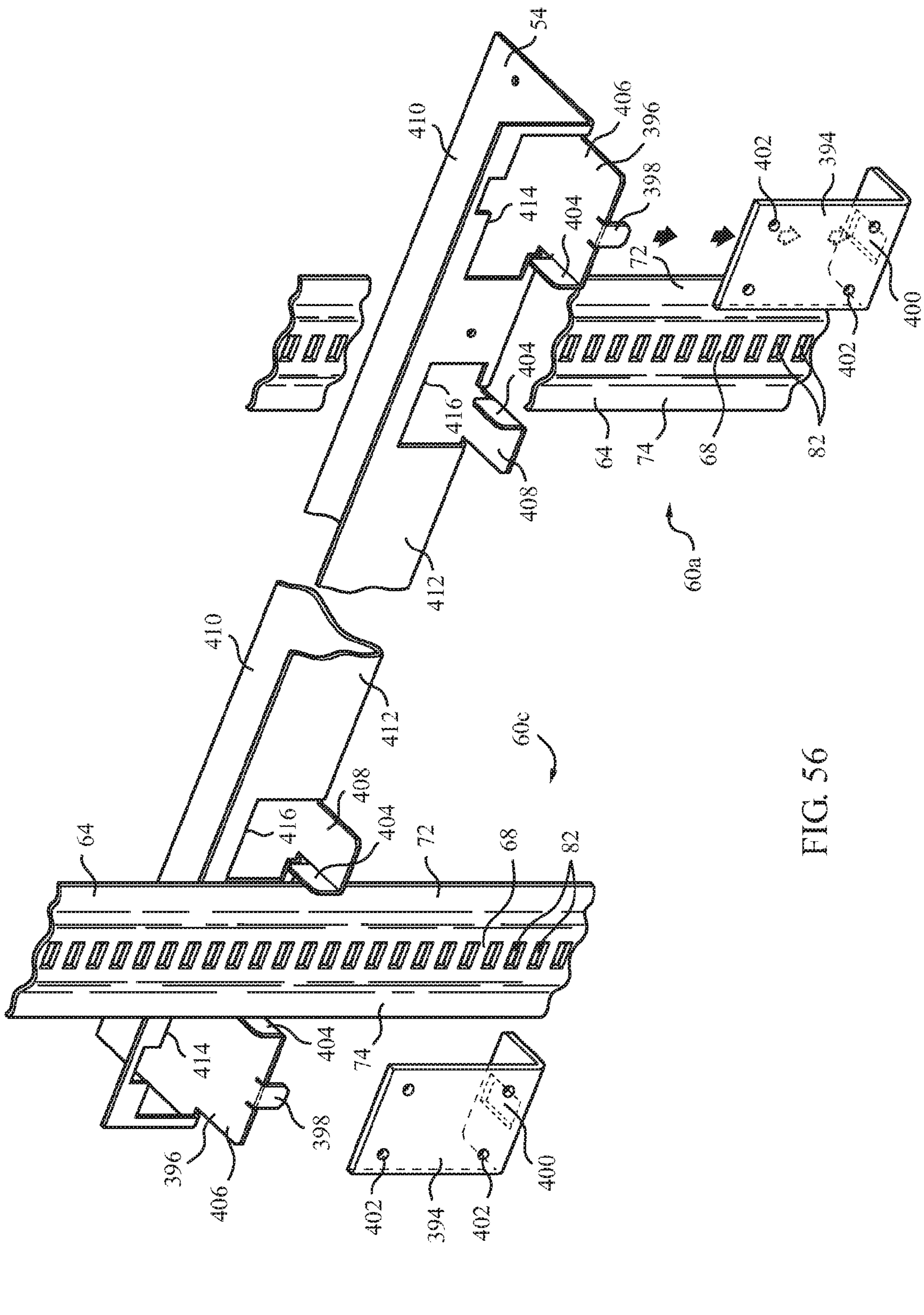

Referring to FIGS. 55-56, another embodiment for supporting the upper bed 41 in the use configuration 384 is shown. In this embodiment, the support bracket 396 is formed integrally with the bed frame 54 and is used to support the upper bed 41 in the use configuration 384 and, at least in part, to guide the upper bed 41 as it moves between the use configuration 384 and the stowed configuration 388. Because the support bracket 396 guides the upper bed 41 as it moves, it may also be appropriately referred to as a guide or guide member.

In this embodiment, the support bracket 396 includes a guide portion 404, a base portion 406, and the pin 398. As mentioned previously, the pin 398 may be configured to engage a corresponding hole 400 in the stop 394 to support the upper bed 41 in the use configuration 384. The guide portion 404 may be positioned adjacent to one of the flanges 72, 74 of the support member 64 to guide the upper bed 41 as it moves between the use configuration 384 and the stowed configuration 388. The guide portion 404 may be used to prevent the upper bed 41 from rotating in a horizontal plane. A guide 408, which also includes a guide portion 404, may be positioned adjacent to the other one of the flanges 72, 74 of the support member 64 to guide the upper bed 41 as it moves between the use configuration 384 and the stowed configuration 388 and/or prevent rotation of the upper bed 41 in the horizontal plane. As shown in FIGS. 55-56, the guide portion 404 of the guide 408 is positioned adjacent to flange 74 and the guide portion 404 of the support bracket 396 is positioned adjacent to flange 72 of the support member 64 so that the support member 64 is positioned between the guide 408 and the support bracket 396. The combination of the guide 408 and the support bracket 396 serve to guide the upper bed 41 along the support member 64 as it moves between the use configuration 384 and the stowed configuration 388.

As shown in FIGS. 55-56, the support bracket 396 and the guide 408 may be integrally made from the bed frame 54. In this embodiment, the bed frame 54 may include a base portion 410 which is positioned in a horizontal plane so that the base portion 410 is perpendicular to the side walls 16, 18 and a side portion 412 positioned vertically so that the side portion 412 is parallel to the side walls 16, 18. The support bracket 396 and the guide 408 may be made by stamping or otherwise cutting patterns 414, 416 in the side portion 412. In one embodiment, the patterns 414, 416 may be stamped into the bed frame 54 before the side portion 412 is bent to a generally perpendicular position relative to the base portion 410. Thus, in this embodiment, the stamped out portions (the precursors to the guide 408 and the support bracket 396) remain in the same general plane as the base portion 410. In another embodiment, the side portion 412 may be bent to be generally perpendicular to the base portion 410, or purchased in this configuration, and then the patterns 414, 416 are stamped into the side portion 412. Once the patterns 414, 416 have been stamped, the stamped out portions may be bent along an axis which is parallel to the side portion 412 and adjacent to the base portion 410 until the stamped out portions are perpendicular to the side portion 412.

The pin 398 may be formed by bending a segment of the stamped out portion along a horizontal axis which is parallel to the side portion 412 until the pin 398 is positioned downward and perpendicular relative to the base portion 410. The final position of the pin 398 is shown in FIGS. 55-56. The guide portions 404 of the guide 408 and the support bracket 396 may be formed by bending the appropriate segments of the stamped-out portions upward along an axis which is perpendicular to the side portion 412. In another embodiment, the guide portions 404 may be generally perpendicular to the side portion 412 and extend downward relative to the base portion 410.

It should be appreciated that the embodiment shown in FIGS. 55-56 may be modified in a number of ways to provide additional embodiments for supporting and/or guiding the movement of the upper bed 41. For example, the stops 394 may be vertically adjustable to vary the position of the upper bed 41 in the use configuration 384. The stops 394 may be configured to slide in tracks coupled to the side walls 16, 18 of the vehicle 10. Thus, a user may adjust the position of the stops 394 in the track to raise or lower the position of the upper bed 41 in the use configuration 384.

In another embodiment, the stops 394 shown in FIGS. 55-56 may be rotated 180 degrees so that the hole 400 is on the top of the stops 394. In yet another embodiment, the upper bed 41 may be guided as it moves vertically without the use of the guides 408. Rather, the upper bed 41 may be guided using the guide portion 404 of the support bracket 396 positioned adjacent to the flange 72 of the support assembly 60*a* and the guide portion 404 of the support bracket 396 positioned adjacent to the flange 74 of the support assembly 60*c*. In this manner, the guide portions 404 are positioned adjacent to the outside flanges of both the support assemblies 60*a*, 60*c* so that the support assemblies 60*a*, 60*c* are positioned snugly between the guide portions 404. This configuration can be seen in FIG. 56 if one imagines that the guides 408 are removed. Typically, the bed frame 54, the stops 394, and the support brackets 396 are made from steel. However, it should be appreciated that they may also be made from a plastic material, composites, etc. For example, the bed frame 54 may be made from a molded plastic material.

Figure 57:
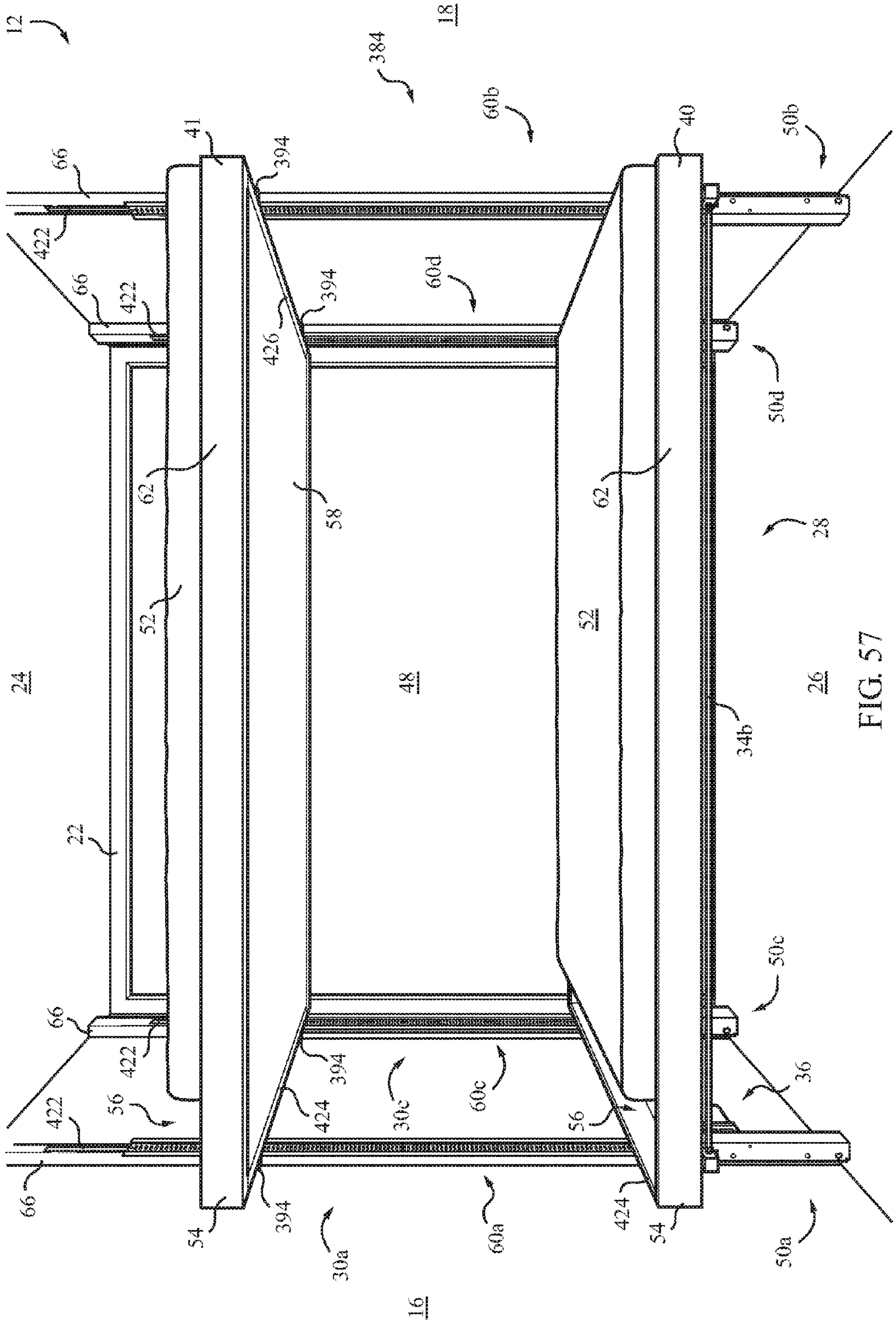
FIG. 57 shows a perspective view from inside a structure of another embodiment of a system for vertically moving one or more beds.

FIG. 57 shows a perspective view of another embodiment of the system 12 that uses another stop arrangement to support the upper bed 41 in the use configuration 384. In this embodiment, each of the backing members 66 in the support assemblies 60 are tubes having a square cross section and an elongated slot or gap 422 in a front side 428 of the backing members 66. The slots 422 may be provided so that the teeth 96 of the gear 70 can protrude through the openings 82 in the support member 64. It should be appreciated that in embodiments where the teeth 96 do not protrude through the openings 82, such as when a chain or gear rack are used, the slots 422 may not be needed. Also, in other embodiments, the slots 422 may be replaced with openings which correspond to the openings 82 in the support member 64. In addition, although the backing members 66 are shown having a square cross-section, the backing members 66 may be shaped like a rectangular, polygonal, hexagonal, cylindrical, etc. The backing members 66 may also be made from other materials besides tubes.

Figure 58:
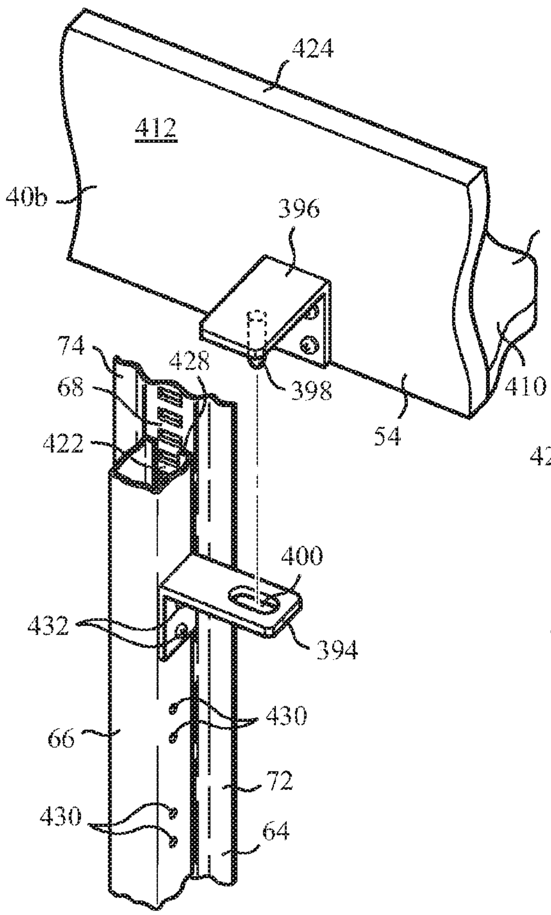
FIGS. 58-59 show perspective views of another embodiment of a stop in a disengaged configuration and an engaged configuration, respectively, the stop being used to support an upper bed in the use configuration.
Figure 59:
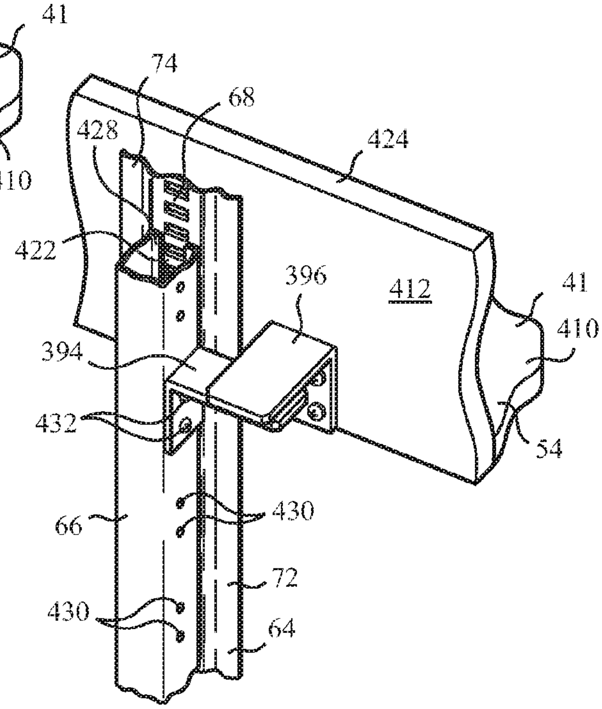

FIGS. 58-59 show the stops and corresponding components from FIG. 57 in greater detail. FIG. 58 shows the support bracket 396 disengaged from the stop 394, and FIG. 59 shows the support bracket 396 engaged with the stop 394. The stop 394 may be coupled to the backing member 66 so that the stop 394 extends outward from backing member 66 in a direction parallel to the side walls 16, 18. Coupling the stops 394 to the backing member 66 or other suitable portion of the support assembly 60 may be desirable because doing so eliminates the step of separately coupling the stops 394 to the side walls 16, 18. Instead, the stops 394 may be coupled to and included with the lifting assemblies 30. This may make it easier, simpler, and/or more efficient to install the lifting assemblies 30 since all of the stops 394 are at the same height when the support assemblies 60 are aligned with each other. This eliminates the need to align each stop 394 separately so that the stops 394 are all at the same height.

The stops 394 may be coupled to the backing member 66 using any number of suitable fasteners or fastening methods such as bolts, screws, clamps, welding, brazing, and so on. In one embodiment, the stops 394 may be coupled to the backing member 66 using fasteners 432 which are received in holes 430 in the backing member 66. As shown in FIGS. 58-59, two fasteners 432 are used to couple the stop 394 to the backing member 66. However, it should be understood that more or less than two fasteners 432 may also be used.

The height of the upper bed 394 in the use configuration 384 may be adjusted in a number of ways. In one embodiment, the position of the stop 394 may be adjusted relative to the backing member 66 and/or the support member 64 in order to adjust the position of the upper bed 394 in the use configuration 384. For example, the position of the stop 394 may be adjusted by fastening the stop 394 to the backing member 66 in a plurality of locations represented in FIGS. 58-59 by the additional holes 430 in the backing member 66. Also, the stop 394 may be slidably coupled to the backing member 66 so that adjusting the height of the stop 394 is simply a matter of sliding the stop 394 to another position. In another embodiment, the position of the support bracket 396 relative to the bed frame 54 may be adjusted in order to adjust the position of the upper bed 394 in the use configuration 384. For example, the stop 394 may be configured to be stationary and the support bracket 396 may be movably coupled to the bed frame 54. The support bracket 396 may be configured to slide relative to the bed frame 54. The support bracket 396 may also be selectively coupled to the bed frame 54 at a number of different locations. Typically, the position of the stop 394 may be fixed relative to the backing member 66 by welding and so forth. However, it should be understood that both the support bracket 396 and the stop 39 may be movable relative to the backing member 66 and/or the support member 64.

The support brackets 396 shown in FIGS. 58-59 may also be used to guide the upper bed 41 as it moves between the use configuration 384 and the stowed configuration 388. For example, the support brackets 396 may be coupled to the bed frame 54 so that the support assemblies 60*a*, 60*c* are positioned snugly between the support brackets 396 on one of the side walls. One of the support brackets 396 moves adjacent to and potentially in contact with the flange 72 of the support member 64 from one of the support assemblies 60 while the other one of the support brackets 396 moves adjacent to and potentially in contact with the flange 74 of the support member 64 from the other one of the support assemblies 60. As the upper bed 41 moves upward, the support brackets 396 cooperate with the support members 64 to guide the movement of the upper bed 41 and prevent the upper bed 41 from moving out of alignment with the lower bed 40.

Figure 60:
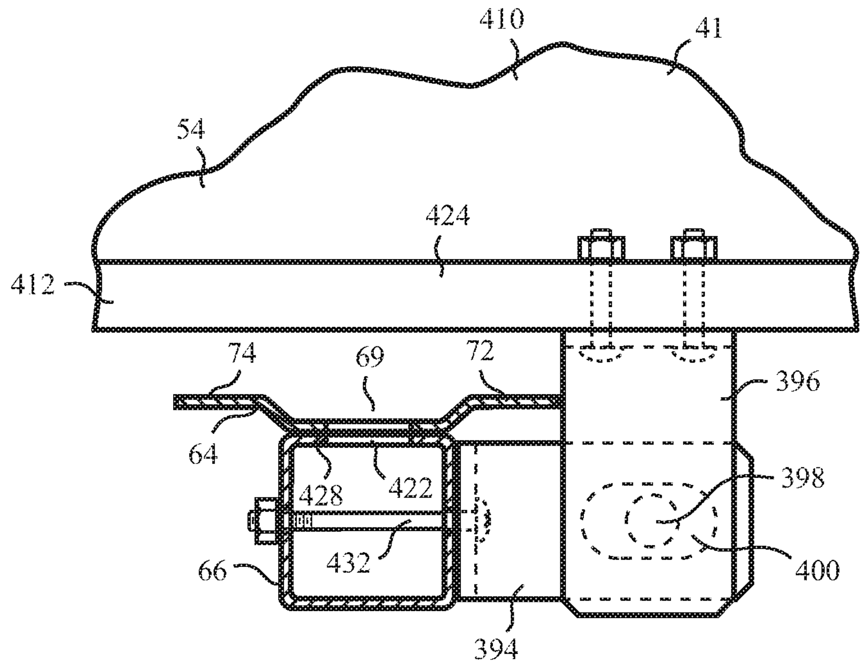
FIG. 60 shows a cross-sectional top view of the stop in an engaged configuration, the stop being used to support the upper bed in the use configuration.
Figure 61:
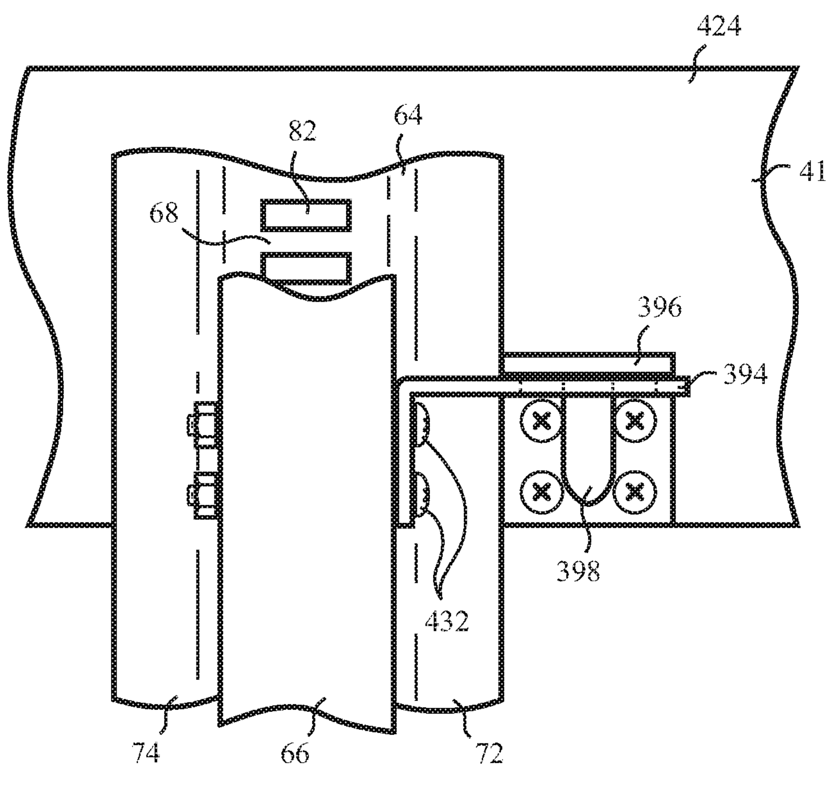
FIG. 61 shows a back view of the stop in an engaged configuration, the stop being used to support the upper bed in the use configuration.

Referring to FIG. 60, a cross-sectional top view is shown of the stop 394 and corresponding components from FIGS. 58-59. As shown in FIGS. 58-59, the hole 400 may be oversized to make it easier for the pin 398 to engage the hole 400 as the upper bed 41 is lowered. FIG. 61 provides an additional rear view of the components shown in FIGS. 58-59 in an engaged configuration.

Figure 62:
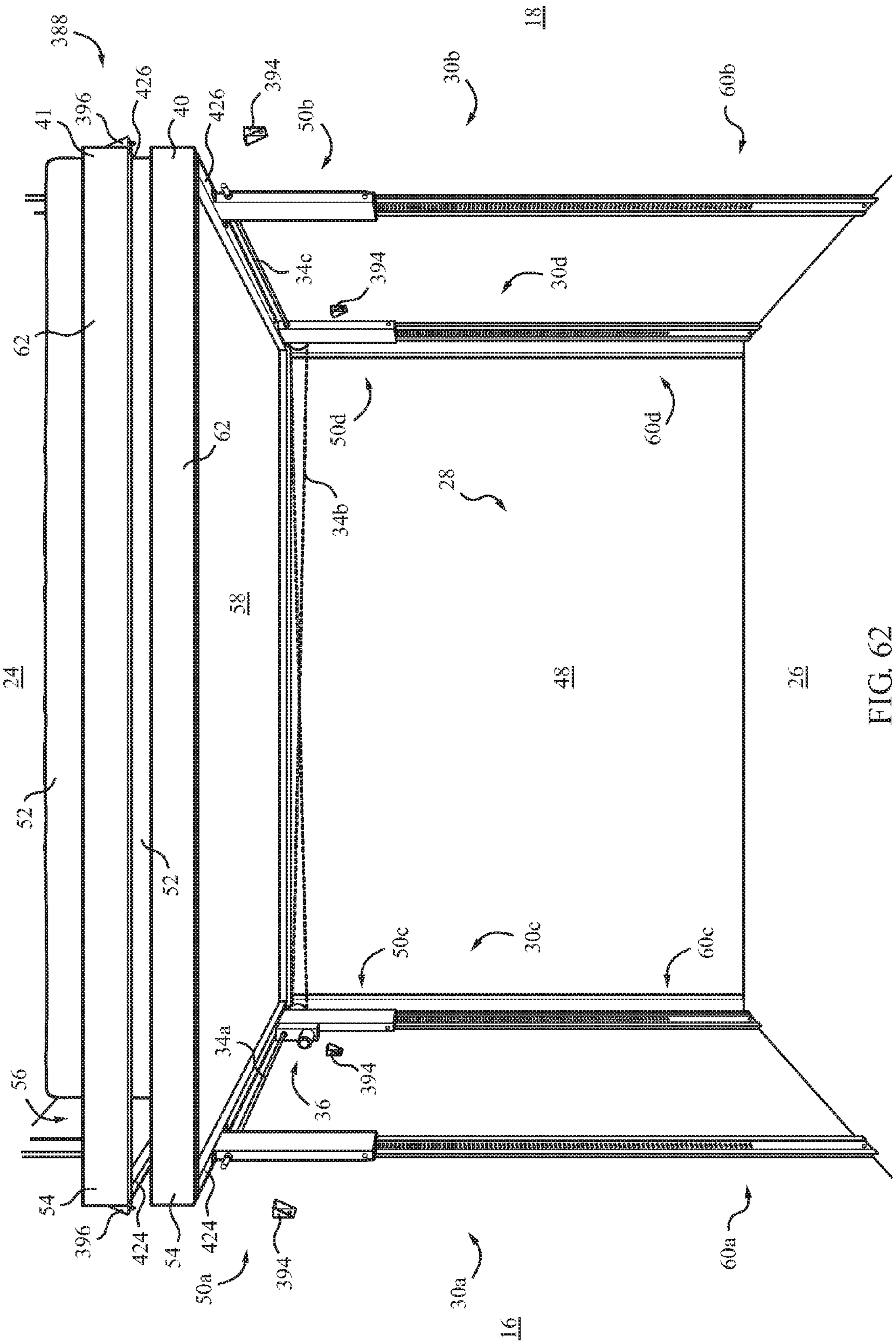
FIG. 62 shows a perspective view of another embodiment of a system for vertically moving one or more beds where a chain is used to synchronize movement of two or more lifting assemblies.

FIG. 62 shows a perspective view of another embodiment of the system 12 viewed from the inside of the vehicle 10. In this embodiment, the motor assembly 36 is coupled to the moving assembly 50*c*, and the drive member 34*b* extends between the lifting assembly 30*c* and the lifting assembly 30*d*. The drive member 34*b* is a chain. It should be appreciated that other flexible drive member such as a cable, toothed belt, or the like, may be used as the drive member 34*b*. Using a chain may be desirable because the transmissions 200, shown in FIG. 2, may be eliminated. However, in order to use a chain, it may be desirable to reduce any variations in the width between the support members 64 coupled to the opposing side walls 16, 18. As shown in FIG. 62, the drive member 34*b* may be referred to as a loop of chain which includes two lengths of chain which extend between the drive shafts 150*c*, 150*d*. The two lengths of chain may cross in the middle so that the moving assemblies 50*a*, 50*c* and the moving assemblies 50*b*, 50*d* move in the same direction when the motor 160 is activated.

Figure 63:
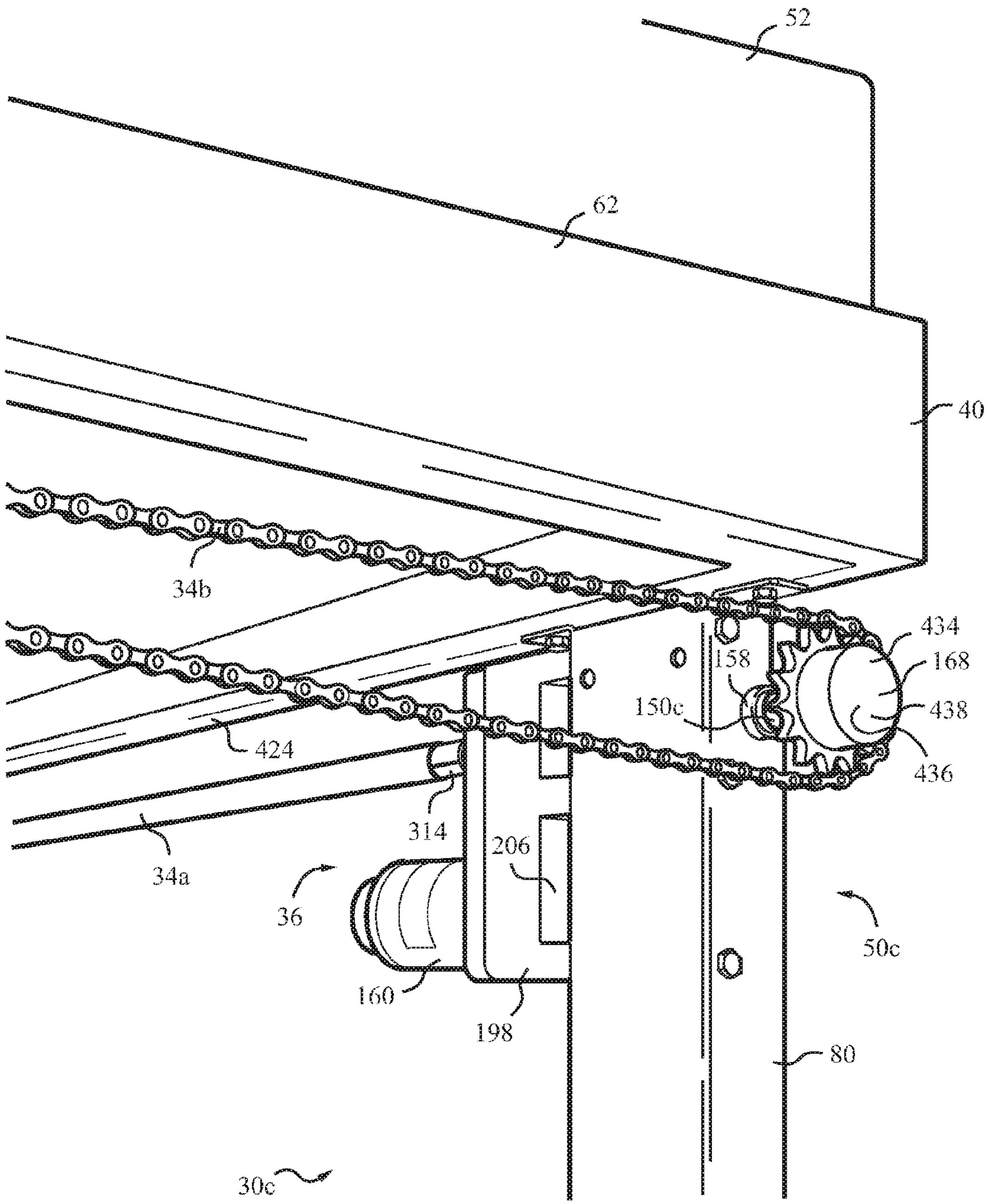
FIG. 63 shows a perspective view of one embodiment of a lifting assembly which may be used to vertically move a bed where the lifting assembly uses a chain to synchronize movement of another lifting assembly.

Referring to FIG. 63, a perspective view of one embodiment of the lifting assembly 30*c* is shown. In this embodiment, the second end 168 of the drive shaft 150*c* may be coupled to a sprocket 434 which is used to drive the drive member 34*b*. The second end 168 of the drive shaft 150*c* may include a fastening groove 436 which receives a fastening clip 438 to prevent the sprocket 434 from coming off of the drive shaft 150*c*. Although not shown, a corresponding sprocket may also be coupled to the drive shaft 150*d* of the moving assembly 50*d* in a similar manner as the sprocket 434 is coupled to the drive shaft 150*c*.

It should be appreciated that the drive members 34*a*, 34*b*, 34*c* and any additional drive members 34 which may be included may be configured in a number of suitable ways. For example, in another embodiment, the drive member 34*b* may be a toothed belt that cooperates with pulleys in the place of the sprockets 434. Accordingly, many variations may be made to the drive members 34.

Figure 64:
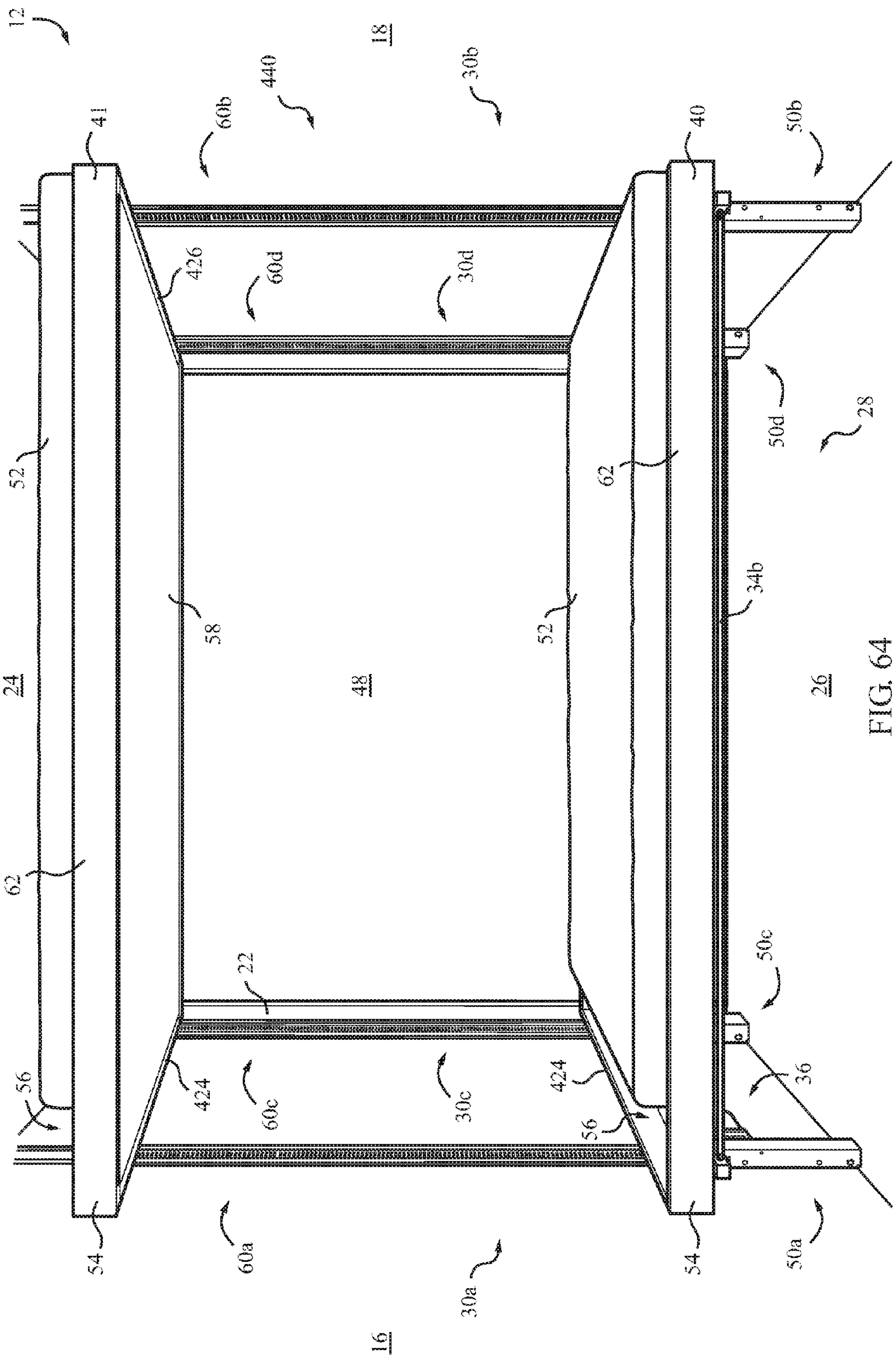
FIG. 64 shows a perspective view of another embodiment of a system for vertically moving one or more beds where one of the beds is in a use position and another bed is in a stowed position.

Referring to FIG. 64, a perspective view is shown of another embodiment of the system 12 from inside the vehicle 10. In this embodiment, the upper bed 41 and the lower bed 40 are shown in a third configuration 440 where the upper bed 41 is in the stowed position and the lower bed 40 is in the use position. This configuration may be desirable for those situations where the user wants to use the lower bed 40 without using the upper bed 41. The beds 40, 41 may be positioned in the third configuration 440 by moving the beds 40, 41 to the stowed configuration 388. The user may then fix the upper bed 41 in the stowed position and then lower the lower bed 40 to the use position. Thus, the beds 40, 41 may be movable between the use configuration 384 where the beds 40, 41 are spaced apart in the cargo area 28, the stowed configuration 388 where the beds 40, 41 are positioned adjacent to the ceiling 24, and the third configuration 440 where one of the beds 40, 41 is in the use position and another one of the beds 40, 41 is in a stowed position.

Figure 65:
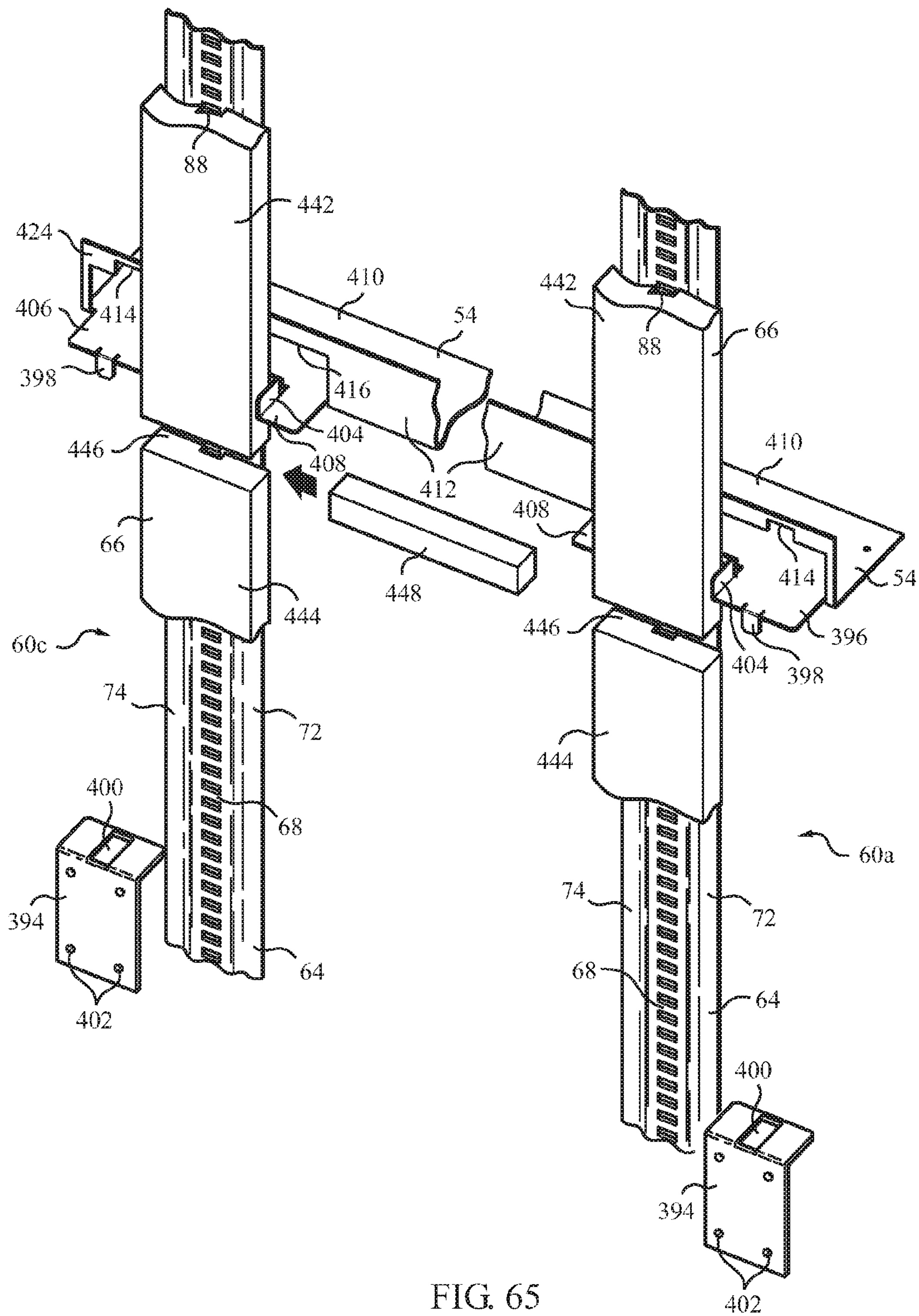
FIGS. 65-66 show perspective views of one embodiment of a stop in a disengaged configuration and an engaged configuration, the stop being used to support an upper bed in a stowed position while the lower bed is in a use position.
Figure 66:
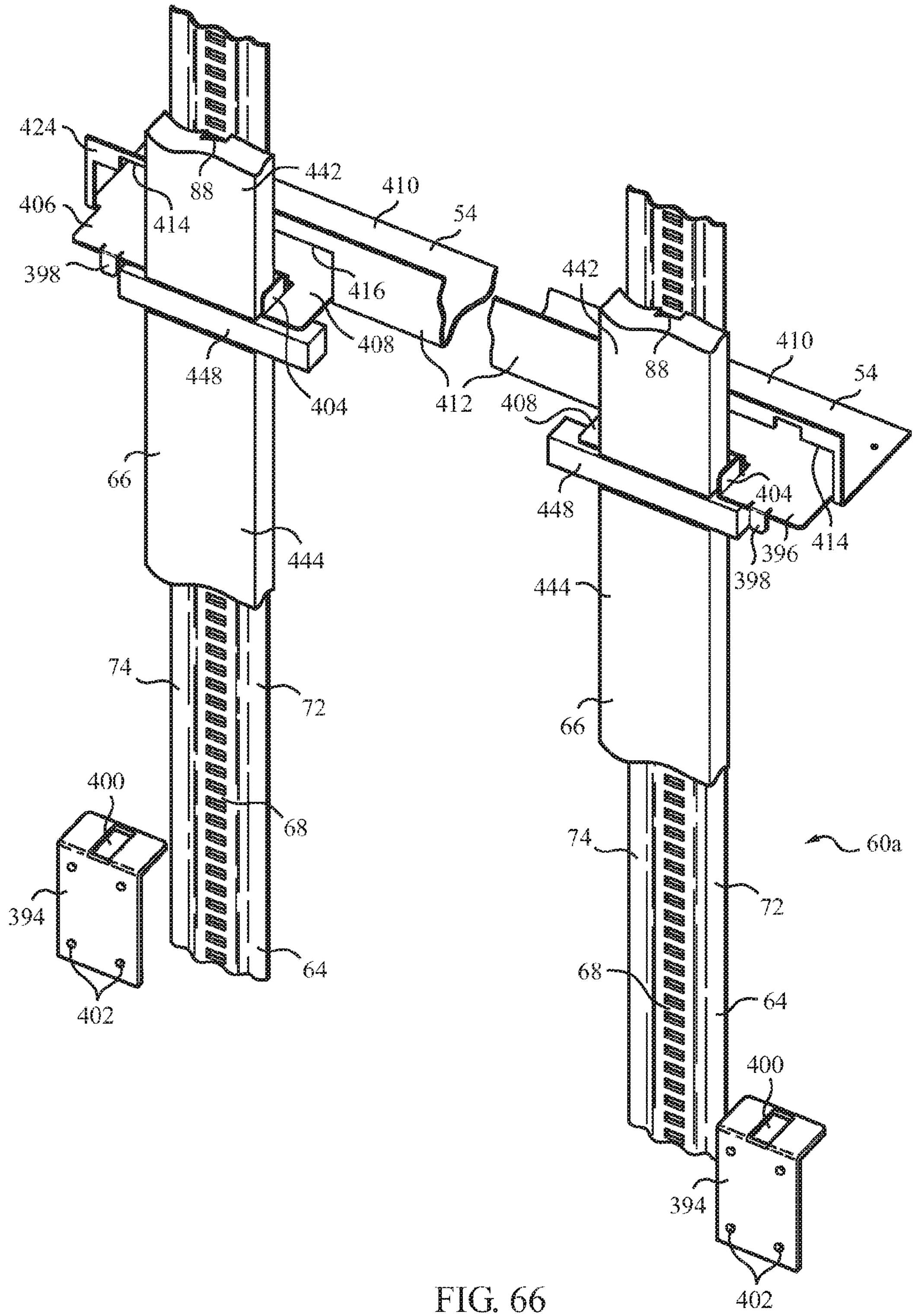

FIGS. 65-66 show one embodiment of the system 12 where the upper bed 41 may be configured to remain in the stowed position at the same time the lower bed 40 is in the use position. The configuration of the bed frame 54, the support assemblies 60, and the stops 394 in FIGS. 65-66 are similar to the embodiment described in connection with FIGS. 55-56. However, in this embodiment, the backing member 66 is divided into an upper segment 442 and a lower segment 444 with a space 446 separating the segments 442, 444. The segments 442, 444 may be coupled to the first side wall 16 in a number of suitable ways. For example, in one embodiment, the segments 442, 444 may be coupled to the first side wall 16 separately from the support member 64 using fasteners such as bolts, screws, etc. The support member 64 may then be coupled to the segments 442, 444 of the backing member 66 using the same or different fasteners as used for the segments 442, 444. In another embodiment, the backing member 66 may be a single segment and be configured to include the space 446. The configuration of the backing member 66 and the support member 64 and the methods of mounting either of them may be widely varied as desired by the vehicle manufacturer and/or user.

In one embodiment, the space 446 extends transversely through the backing member 66 in a direction parallel to the first side wall 16. When the beds 40, 41 are both positioned in the stowed configuration 388, a stop 448 may be positioned through the space 446 so that the stop 448 protrudes from each side of backing member 66 in a direction parallel to the first side wall 16. When the lower bed 40 is lowered, the support bracket 396 and/or the guide 408 coupled to the upper bed 41 engages the stop 448. In this manner, the stop 448 supports the upper bed 41 in the stowed position while the lower bed 40 may be lowered and used for sleeping thereon. Thus, the upper bed 41 may independently supported in the stowed position while at the same time the lower bed 40 may be raised and lowered as desired.

It should be understood that the embodiment shown in FIGS. 65-66 may be varied in a number of ways. For example, the space 446 may be configured to only extend part of the way between the segments 442, 444, or, if a one-piece backing member 66 is used, part of the way into the backing member 66. The stop 448 may be positioned in the space 446 so that only one of the support bracket 396 or the guide 408 engages the stop 448 at each support assembly 60. Although the space 446 and the stop 448 are shown as being square, other cross sectional configurations may be used such as polygonal, hexagonal, cylindrical, and so on. For example, in another embodiment, the space 446 may be a hole which is drilled through the backing member 66 and the stop 448 may be a nail which is sized to extend through the space 446 so that the support bracket 396 or the guide 408 engage the nail and support the upper bed 41 in the stowed position. In yet another embodiment, the stop 448 may be configured to engage the openings 82 in the support member at a position below the bed frame 54 so that the stop 448 contacts the bed frame 54 and prevents the upper bed 41 from being lowered. In this embodiment, the stop 448 may be configured with a plurality of hooks or tabs extending from a vertical surface. The hooks or tabs may be moved into engagement with the support member 64 by moving the hooks or tabs through the openings 82 in the support member and then moving the stop 448 down so that the hooks or tabs engage the support member 64. Also, the stop 448 may be made from any of a number of suitable materials including steel, plastic, composites, wood, etc. Many other variations may be made so long as the upper bed 41 is securely supported in the stowed position at the same time that the lower bed 40 can be raised and lowered.

Figure 67:
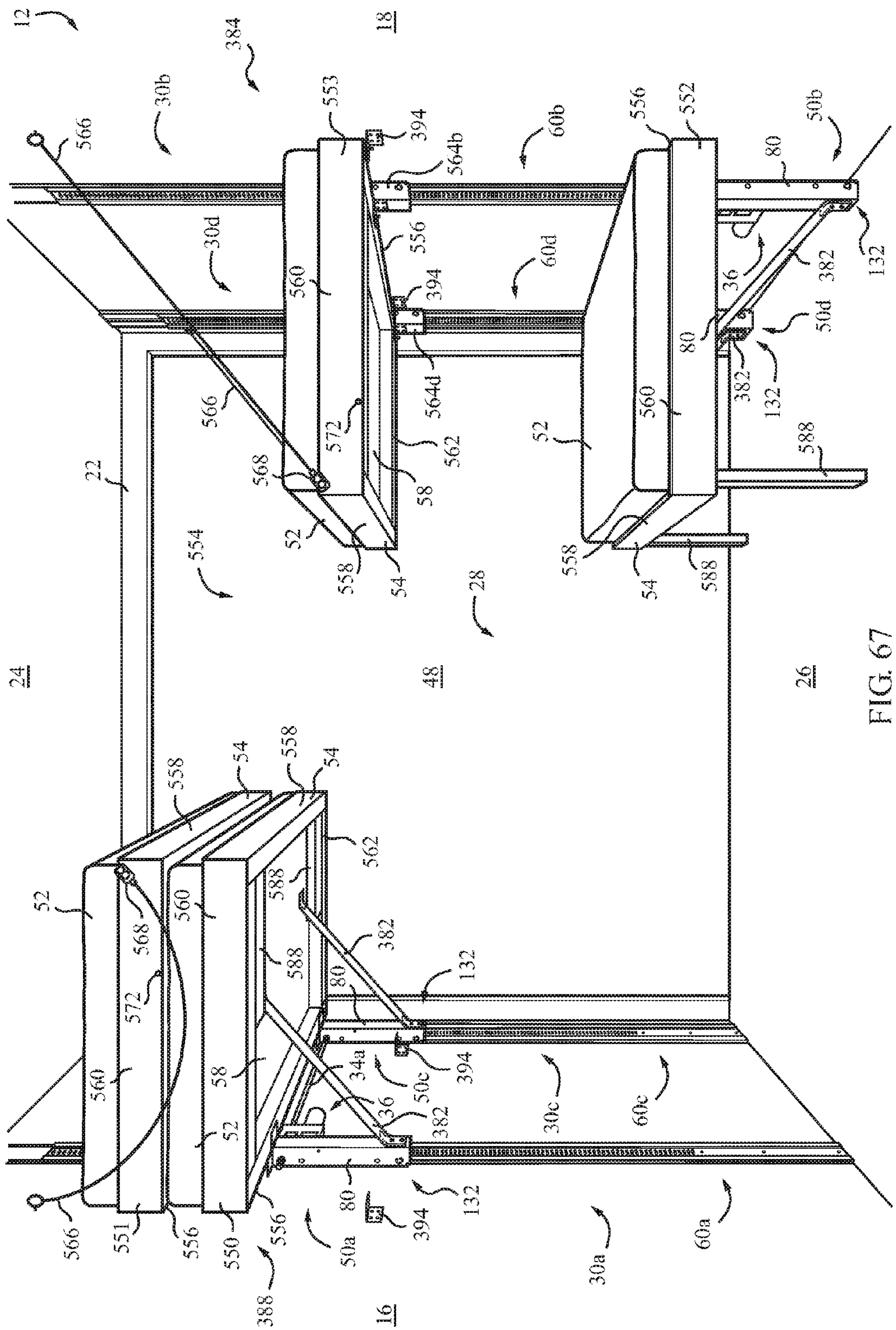
FIG. 67 shows a perspective view of another embodiment of a system for vertically moving two pairs of beds, each of which is coupled to a single wall where one pair of beds is shown in a use configuration and another pair of beds is shown in a stowed configuration.

FIG. 67 shows a perspective view of another embodiment of system 12 from the inside of the vehicle 10. In this embodiment, the lifting assemblies 30*a*, 30*c* are used to move a first pair of beds 550, 551 coupled to the first side wall 16, and the lifting assemblies 30*b*, 30*d* are used to move a second pair of beds 552, 553 coupled to the second side wall 18. Each pair of beds may be moved independently. Both pairs of beds are coupled to the side walls 16, 18 so that the longitudinal direction of the beds 550, 551, 552, 553 (collectively referred to as "the beds 550-553") is parallel to the side walls 16, 18. An aisle 554 is provided between the first pair of beds 550, 551 and the second pair of beds 552, 553 so allow ready access to the pairs of beds.

The beds 550-553 may be configured similarly to the beds 40, 41. For example, the mattresses 52 and the bed frames 54 may be made from similar materials and in similar configurations as the beds 40, 41. Although the beds 550-553 may be any suitable size, in many instances, because the beds 550-553 are coupled to the opposing side walls 16, 18, it may be desirable for the beds 550-553 to be double size or smaller. For example, in one embodiment, each of the beds 550-553 may be twin, single, or smaller sized beds and configured to sleep one person thereon. In another embodiment, the first pair of beds 550, 551 may be coupled to the first side wall 16 without any beds being coupled to the second side wall 18. In this embodiment, the beds 550, 551 may be larger since the space between the beds 550, 551 and the second side wall 18 is open. It should be appreciated that the configuration of the beds 550-553 may vary in a number of ways.

Each of the beds 550-553 includes a first side 556, a second side 558, a first end 560, and a second end 562. In general, the first sides of the beds 550-553 are coupled to the side walls 16, 18 while the second sides 558 are positioned adjacent to the aisle 554, or at least sufficiently far away from any walls of the vehicle 10 to allow a person to get on the beds 550-553 by way of the second sides 558. In the embodiment shown in FIG. 67, the first sides 556 of the first pair of beds 550, 551 are coupled to the first side wall 16. The first pair of beds 550, 551 is shown in the stowed configuration 388 where the beds 550, 551 are positioned adjacent to each other and adjacent to the ceiling 24. The second sides 558 of the first pair of beds 550, 551 are open to the aisle 554. The first sides 556 of the second pair of beds 552, 553 are coupled to the second side wall 18. The second pair of beds 552, 553 is shown in the use configuration 384 where the beds 552, 553 are spaced apart and configured to receive one or more persons to sleep thereon. The second sides 558 of the second pair of beds 552, 553 are also open to the aisle 554 to allow a person to get on the beds 552, 553.

In one embodiment, each pair of beds may be configured to move independently of the other pair of beds. For example, a separate drive assembly including separate motor assemblies 36 may be provided for each pair of beds. As shown in FIG. 67, a motor assembly 36 may be coupled to the moving assembly 50*a*, and the drive member 34*a* may extend between the moving assembly 50*a* and the moving assembly 50*c* to move the moving assemblies 50*a*, 50*c* together. Another motor assembly 36 may be coupled to the moving assembly 50*b*, and the drive member 34*c* (not shown in FIG. 67) may extend between the moving assembly 50*b* and the moving assembly 50*d* to move the moving assemblies 50*b*, 50*d* in unison. In this manner, each pair of beds may be moved separately.

The first sides 556 of the lower beds 550, 552 may be coupled to the moving assemblies 50 in any of a number of ways. In one embodiment, it may be desirable to couple the lower beds 550, 552 to the moving assemblies 50 in an immovable manner. For example, in one embodiment, the lower beds 550, 552 may be immovably coupled to the moving assemblies 50 using any suitable fastener such as bolts, screws, pin and hole arrangements, etc. Immovably coupling the lower beds 550, 552 to the moving assemblies 50 may reduce undesired cantilevered movement of the second sides of the lower beds 550, 552. Also, since the lower beds 550, 552 are not coupled to both of the side walls 16, 18, the impact of the width variations between the side walls 16, 18 is diminished. Given these considerations, it may be desirable to couple the lower beds 550, 552 to the moving assemblies 50 so that play between the lower beds 550, 552 and the moving assemblies 50 is reduced. In one embodiment, this may be accomplished using a threaded member (e.g. threaded rod, threaded portion of a bolt, etc.) coupled to the lower beds 550, 552 which is received by the hole 122 in the mounting member 110 of the moving assemblies 50. The threaded member may be secured in place using a nut thereby securing the mounting member 110 to the lower beds 550, 552. Although the hole 122 may be oversized to make it easier to receive the threaded member, once the nut is tightened, there may be little, or, desirably, no play between the lower beds 550, 552 and the moving assemblies 50.

In another embodiment, the lower beds 550, 552 may be coupled to the moving assemblies 50 so that play is provided at the interface of the lower beds 550, 552 and the moving assemblies 50. This may be desirable to take into account variations in the distance between the adjacent lifting assemblies 30 coupled to the same side wall as the lower beds 550, 552 move vertically.

With continued reference to FIG. 67, braces 382 may be provided to support the second sides 558 of the lower beds 550, 552. In one embodiment, the braces 382 may extend upward and outward from the lower ends 132 of the moving members 80 to the bottom side 58 of the lower beds 550, 552 in a manner which provides support to the lower beds 550, 552 and especially to the second sides 558 of the lower beds 550, 552. In another embodiment, the braces may form a rectangular structure which is coupled to the moving member 80 and extends under and is coupled to the bottom side 58 of the lower beds 550, 552. In another embodiment, the second sides 558 of the lower beds 550, 552 may be supported from above using an arrangement similar to how the upper beds 551, 553 are supported in the use configuration 384, as explained in greater detail below.

Figure 72:
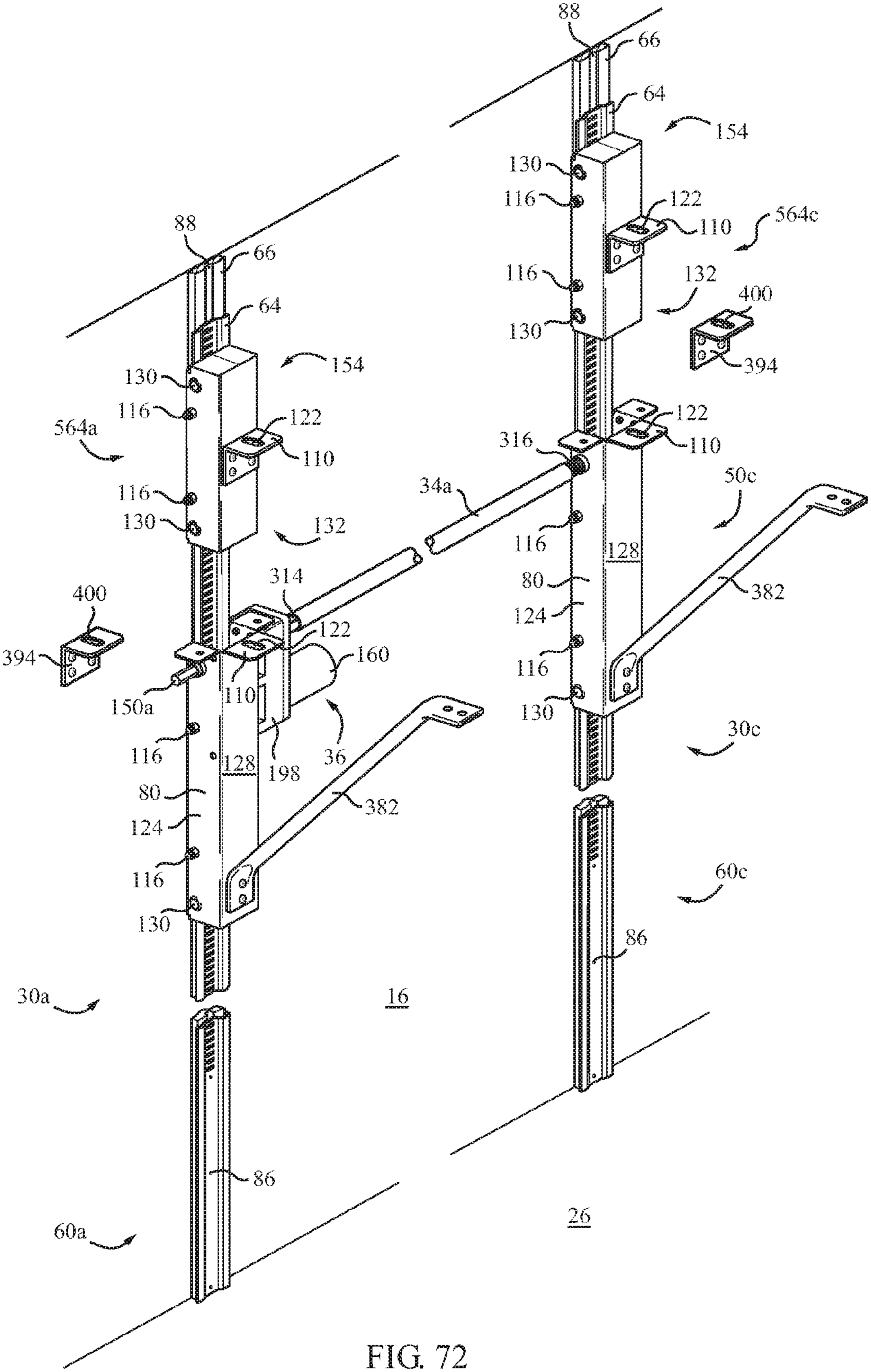
FIG. 72 shows a perspective view of two lifting assemblies coupled to a wall and which may be used to vertically move one or more beds.

The braces 382 may be made from any suitable material and may have a wide variety of configurations. For example, in one embodiment, the braces 382 comprise a cylindrical tubular steel material which has been flattened and bent at each end so that the braces 382 may be coupled to the moving members 80 and the lower beds 550, 552. FIG. 72 shows one example of this embodiment. In another embodiment, the braces 382 may be made from a piece of steel plate which is sized and configured to be coupled to the moving members 80 and the bottom side 58 of the lower beds 550, 552. In further embodiments, the braces 382 may be made from metal, wood, plastics, composites, etc., in a wide variety of configurations so long as the braces 382 are capable of supporting the second sides 558 of the lower beds 550, 552.

It should be appreciated that many other configurations may be used to provide additional support to the lower beds 550, 552 beyond what has been described and illustrated herein. For example, in another embodiment, a cross brace may be configured to be coupled to and extend between the lower ends 132 of the moving members 80 in a direction which is parallel to the side walls 16, 18. Additional braces 382 may be configured to extend from the cross brace to the bottom side 58 of the lower beds 550, 552 in a similar fashion as the braces 382 extend from the moving members 80 to the bottom side 58 of the lower beds 550, 552.

With continued reference to FIG. 67, the upper beds 551, 553 may be movably coupled to the lifting assemblies 30 in a wide variety of ways. In the embodiment shown in FIG. 67, moving assemblies 564*a*, 564*b*, 564*c*, 564*d* (collectively referred to as "the moving assemblies 564") may be configured to cooperate with the support assemblies 60 to guide the upper beds 551, 553 as the upper beds 551, 553 move vertically. In one embodiment, the moving assemblies 564 may be dummy moving assemblies. In another embodiment, the moving assemblies 564 may include a drive assembly (e.g., a drive member similar to drive member 34*c* and a motor assembly 36) which powers the upper beds 551, 553 separately from the lower beds 550, 552.

Figure 68:
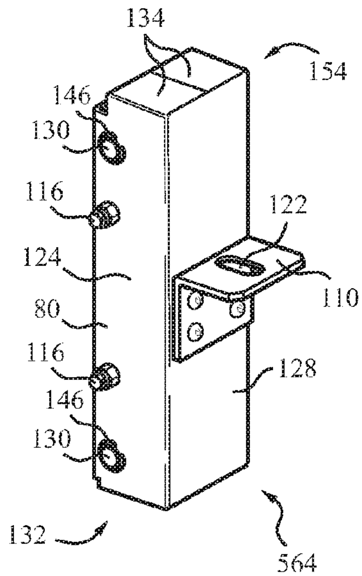
FIGS. 68-70 show various perspective views of one embodiment of a moving assembly which may be used in a system for vertically moving one or more beds.
Figure 70:
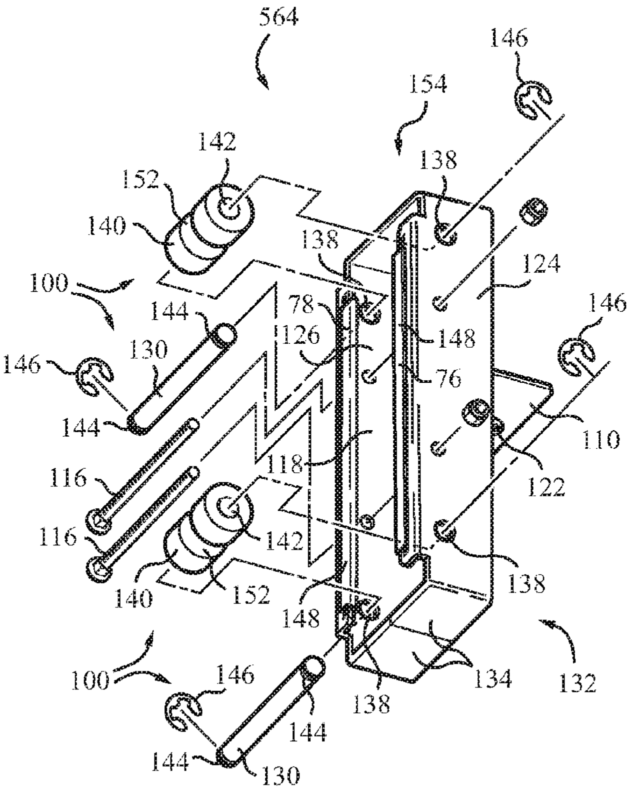
Figure 69:
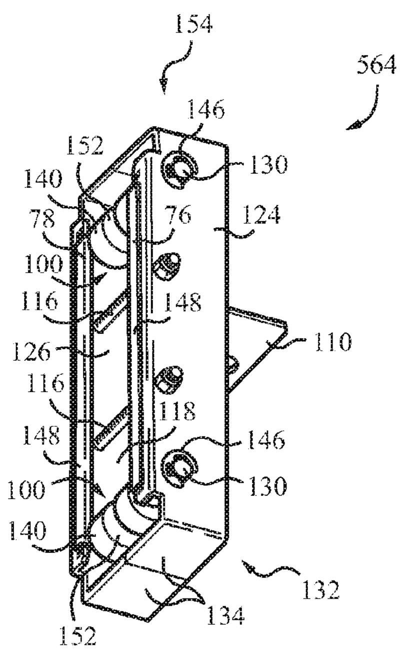

Referring to FIGS. 68-70, a front perspective assembled view, a back perspective assembled view, and a back perspective exploded view, respectively, are shown of one embodiment of the moving assembly 564. The moving assembly 564 may cooperate with the support member 64 in a manner which is similar to how the moving assembly 50 cooperates with the support member 64 described previously. However, rather than using a drive mechanism 90 and a roller assembly 100 to cooperate with the support member 64, the moving assembly 564 uses two roller assemblies 100.

As shown in FIGS. 68-70, one roller assembly 100 is positioned at the upper end 154 of the moving assembly 564 and another roller assembly 100 is positioned at the lower end 132 of the moving assembly 564. During operation, the rollers 140 are disposed in the recess 69 and in contact with the engaging portion 68 of the support members 64. The rollers 140 are generally configured to rotate in cooperation with the support member 64. The flanges 76, 78 of the moving assemblies 564 cooperate with the corresponding flanges 72, 74 on the support member 64 to prevent the support member 64 from separating from the moving assembly 564. The combination of the rollers 140 cooperating with the engaging portion 68 and the flanges 76, 78 cooperating with the corresponding flanges 72, 74 securely holds the support member 64 and the moving assembly 564 in cooperation with each other.

The mounting member 110 may be positioned in any suitable location relative to the moving assembly 564. For example, as shown in FIG. 67, the mounting member 110 may be coupled to the middle of the moving assembly 564. In other embodiments, the mounting member 110 may be coupled to the upper end 154, the lower end 132, or any place in between. Also, the mounting member 110 may be coupled to the first side 124 or the second side 126. It is also contemplated that more than one mounting member 110 may be used. For example, one mounting member 110 may be configured to extend outward from the first side 124 and another mounting member 110 may be configured to extend outward from the second side 126 in the opposite direction of the mounting member 110 coupled to the first side 124.

Figure 71:
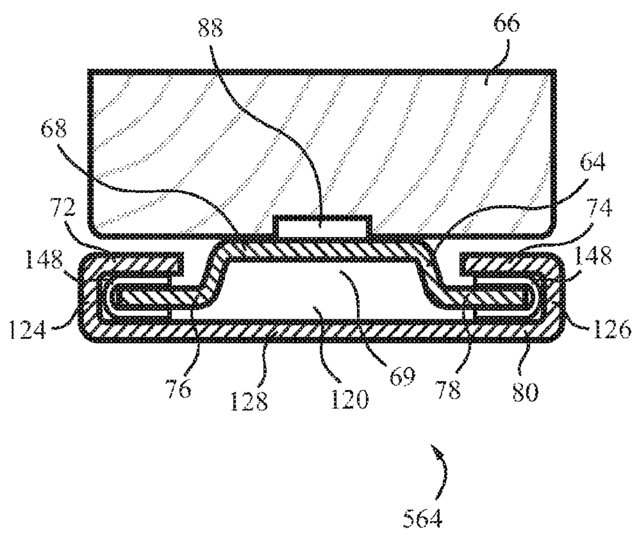
FIG. 71 shows a cross-sectional top view of another embodiment of a moving assembly which may be used in a system for vertically moving one or more beds.

Referring to FIG. 71, a cross sectional view is shown of another embodiment of the moving assembly 564. In this embodiment, the moving assembly 564 is configured similarly to the embodiment shown in FIGS. 68-70 except that the moving assembly 564 is provided without the roller assemblies 100. By not using the roller assemblies 100, the distance that the moving assembly 564 extends outward from the support member 64 towards the bed may be reduced. Thus, a wider bed may be provided without encroaching further into the aisle 554. The sides 124, 126 of the moving member 80 are sized so that the flanges 76, 78 on the support member 64 fit between and engage both the flanges 72, 74 and the base 128 of the moving member 80. The wear guide 148 may be positioned on the flanges 76, 78 to reduce the friction and/or wear between the flanges 76, 78 on the support member 64 and the flanges 72, 74 and the base 128 of the moving member 80. In another embodiment, the moving assembly 564 may be configured to move inside a channel defined by the support member 64 in a manner similar to that shown in FIG. 26.

It should be appreciated that many additional embodiments of the moving assembly 564 may be provided beyond those described and illustrated herein so long as the moving assembly 564 is capable of guiding the movement of the upper beds 551, 553. For example, in another embodiment, the support brackets 396 and the guides 408 illustrated in FIG. 56 may be modified to include flanges which cooperate with the flanges 76, 78 of the support member 64 in a similar manner as the flanges 72, 74 of the moving assembly 564 from FIGS. 68-70 engage the flanges 76, 78. Numerous additional embodiments may be provided as well.

Referring to FIG. 72, a perspective view is shown of the lifting assemblies 30*a*, 30*c* from the first pair of beds 550, 551 coupled to the first side wall 16. The beds 550, 551 are not shown in this illustration to better illustrate the lifting assemblies 30*a*, 30*c*. In general, the moving assemblies 50, 564 cooperate with support assemblies 60 to move the beds 550, 551 between the use configuration 384 and the stowed configuration 388.

During operation, the lower beds 550, 552 may be used to lift the upper beds 551, 553 in a manner similar to how the lower bed 40 is used to lift the upper bed 41. In one embodiment, the lower beds 550, 552 may be configured to contact the bottom side 58 of the upper beds 551, 553 to raise the upper beds 551, 553 to the stowed configuration 388. In another embodiment, the moving assemblies 50 may contact the moving assemblies 564 to raise the upper beds 551, 553 to the stowed configuration 388 with little or no contact between the lower beds 550, 552 and the upper beds 551, 553.

Referring to FIGS. 67 and 72, the first sides 556 of the upper beds 551, 553 may be supported in the use configuration 384 using the stops 394 coupled to the side walls 16, 18 of the vehicle 10. The stops 394 engage the support brackets 396 (not shown in FIGS. 67 and 72) coupled to the first sides 556 of the upper beds 551, 553. In FIG. 67, the first side 556 of the upper bed 553 is supported by the stops 394 in the use configuration 384. It should be understood that the first sides 556 of the upper beds 551, 553 may be supported in a number of suitable ways so long as the upper beds 551, 553 are held securely.

The second sides 558 of the upper beds 551, 553 may also be supported in the use configuration 384 in a number of ways. For example, in one embodiment, one or more support elements 566 such as a strap (e.g., woven nylon, etc.), chain, cable, rod, etc. may be used to support the upper beds 551, 553 in the use configuration 384. In one embodiment, the support elements 566 extend from the ceiling 24 of the vehicle 10 to the second sides 558 of the upper beds 551, 553. In another embodiment, the support elements 566 may extend from the respective side wall 16, 18 which the upper bed 551, 553 is coupled to the second sides 558.

In the embodiment shown in FIG. 67, the support elements 566 are cables which are coupled to the side walls 16, 18 and extend diagonally relative to the side walls 16, 18 to the second sides 558 of the upper beds 551, 553. Although in this embodiment the support elements 566 are shown being coupled to the side walls 16, 18, the support elements 566 may also be coupled to the support assemblies 60 or, as previously mentioned, the ceiling 24. The support elements 566 may be coupled to the second sides 558 of the upper beds 551, 553 using a coupler 568. The coupler 568 may be any suitable device which securely couples the support elements 566 to the upper beds 551, 553.

Figure 73:
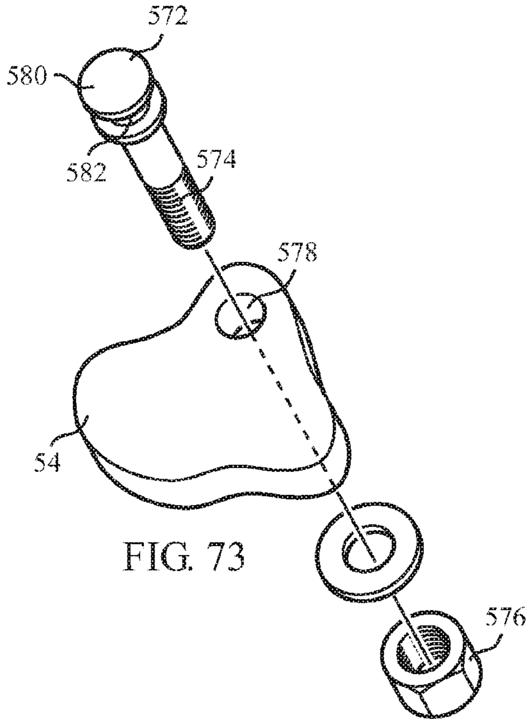
FIGS. 73-76 show various perspective views of one embodiment of an arrangement which may be used to couple a support element to a bed to support the bed in a use position and/or stowed position.
Figure 74:
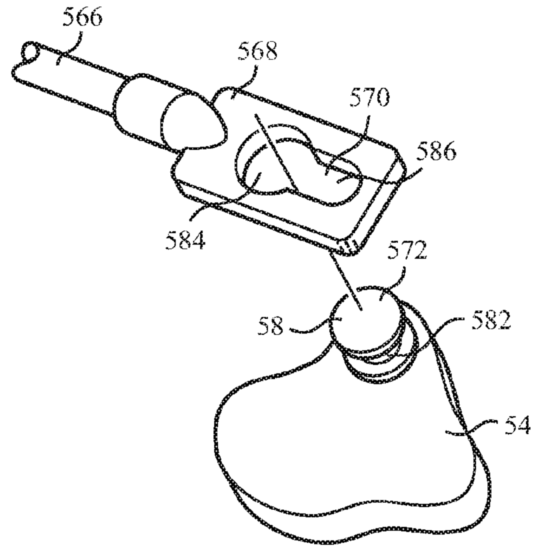
Figure 75:
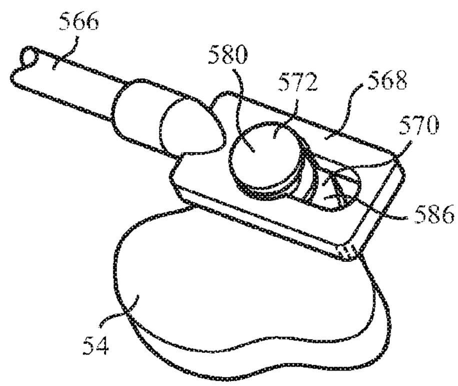
Figure 76:
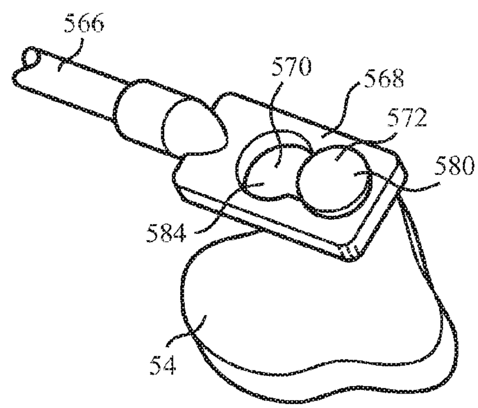

Referring to FIGS. 73-76, one embodiment of the coupler 568 is shown. The coupler 568 may include an opening or slot 570 which is sized to receive a corresponding support pin 572 attached to the upper beds 551, 553. As shown in FIG. 73, the support pin 572 may include a threaded portion 574 which extends through a hole 578 in the bed frame 54 and is received by a nut 576 which, upon tightening, secures the support pin 572 to the bed frame 54. The opening 570 in the coupler 568 is shaped to include a large or first portion 584 which is capable of fitting over the head 580 of the support pin 572 and a small or second portion 586 which is capable of receiving the body 582 of the support pin 572 but not the head 580. The coupler 568 may be coupled to the support pin 572 by inserting the head 580 of the support pin 572 through the large portion 584 of the opening 570 and then sliding the support pin 572 so that the body 582 engages the small portion 586 of the opening 570.

It should be appreciated that many other devices and configurations may be used to couple the support element 566 to the upper beds 551, 553. For example, in another embodiment, the support element 566 may include a pin which is received by an opening in the bed frame 54 of the upper beds 551, 553. Numerous other embodiments may also be used.

Figure 77:
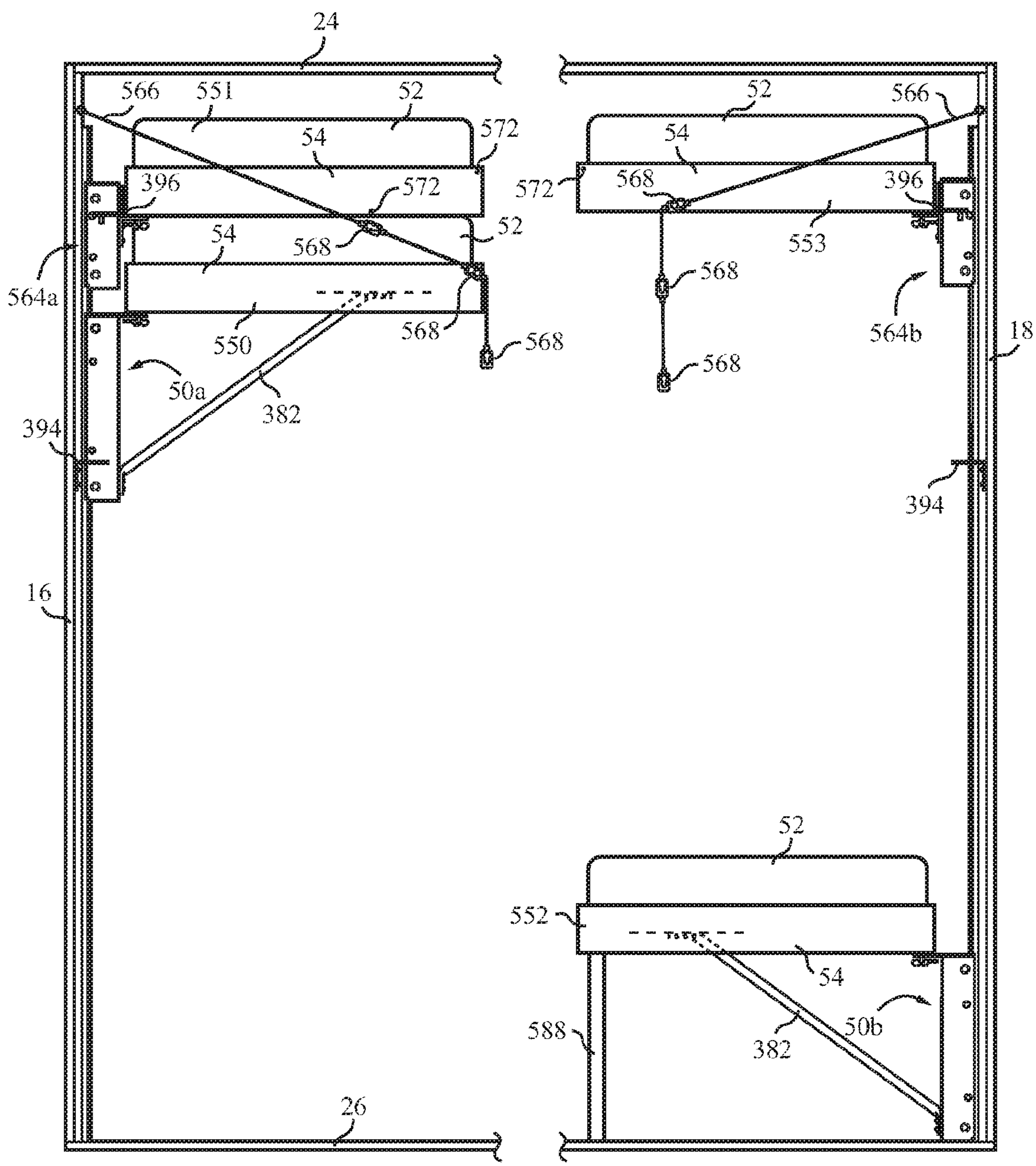
FIG. 77 shows a side view of another embodiment of a system for vertically moving two pairs of beds, each of which is coupled to a single wall where one pair of beds is shown in a stowed configuration and another pair of beds is shown with one bed in a use position and another bed in a stowed position.

Referring to FIG. 77, a side view of the system 12 is provided from a vantage point inside the vehicle 10. In general, the configuration of the first pair of beds 550, 551 and the second pair of beds 552, 553 may be similar to that shown in FIG. 67. In this embodiment, however, the support elements 566 may be used to support the upper beds 551, 553 and the lower beds 550, 552 in the stowed configuration 388.

In one embodiment, the support elements 566 include multiple couplers 568 positioned at locations along the support elements 566 which are suitable to support the upper beds 551, 553 and/or the lower beds 550, 552. For example, as shown in FIG. 77, both the upper bed 551 and the lower bed 550 of the first pair of beds 550, 551 may be supported in the stowed configuration 388. This may be desirable to provide additional support for the first pair of beds 550, 551 as the vehicle 10 travels along a road. In another embodiment, also shown in FIG. 77, the upper bed 553 of the second pair of beds 552, 553 may be supported in a stowed position by the support element 566 while the lower bed 552 is lowered for use. In addition to the support element 566, a stop 394 may be provided which engages the engaging portion 68 of the support member 64 to also support the upper bed 553 in the stowed position. In another embodiment, the first side 556 of the upper bed 553 may be supported by another support element 566 which extends from the ceiling 24 or the second side wall 18, and the second side 558 may be supported by the support element 566 as shown. Numerous other embodiments may also be provided.

Referring to FIGS. 67 and 77, the second sides 558 of the lower beds 550, 552 may be supported in the use configuration 384 using supports or legs 588. When the lower beds 550, 552 are in the use position, the supports 588 extend from the second sides 558 of the lower beds 550, 552 to the floor 26. The supports 588 may be a fold-up leg which folds up against the bottom side 58 of the lower beds 550, 552 when not in use. The supports 588 may also be independently adjustable (e.g., telescopic) to allow the supports 588 to be moved into contact with the floor 26. It should be appreciated that the supports 588 may have any of a number of suitable configurations including many which are not explicitly described herein.

It should be appreciated that the second sides 558 of the lower beds 550, 552 may be supported in the use configuration 384 in a number of other ways as well. For example, the support elements 566 may be coupled to the second sides 558 of the lower beds 550, 552 and anchored to the corresponding side wall 16, 18 or to the ceiling 24. Also, the support elements 566 may be coupled between the second sides 558 of the lower beds 550, 552 and the upper beds 551, 553, respectively. The upper beds 551, 553 may, in turn, be coupled to the corresponding side wall 16, 18 or the ceiling. In this manner, the upper beds 551, 553 may be used to support the lower beds 550, 552 using the support elements 566. It should be appreciated that the lower beds 550, 552 may be supported in any of a number of suitable ways.

Figure 78:
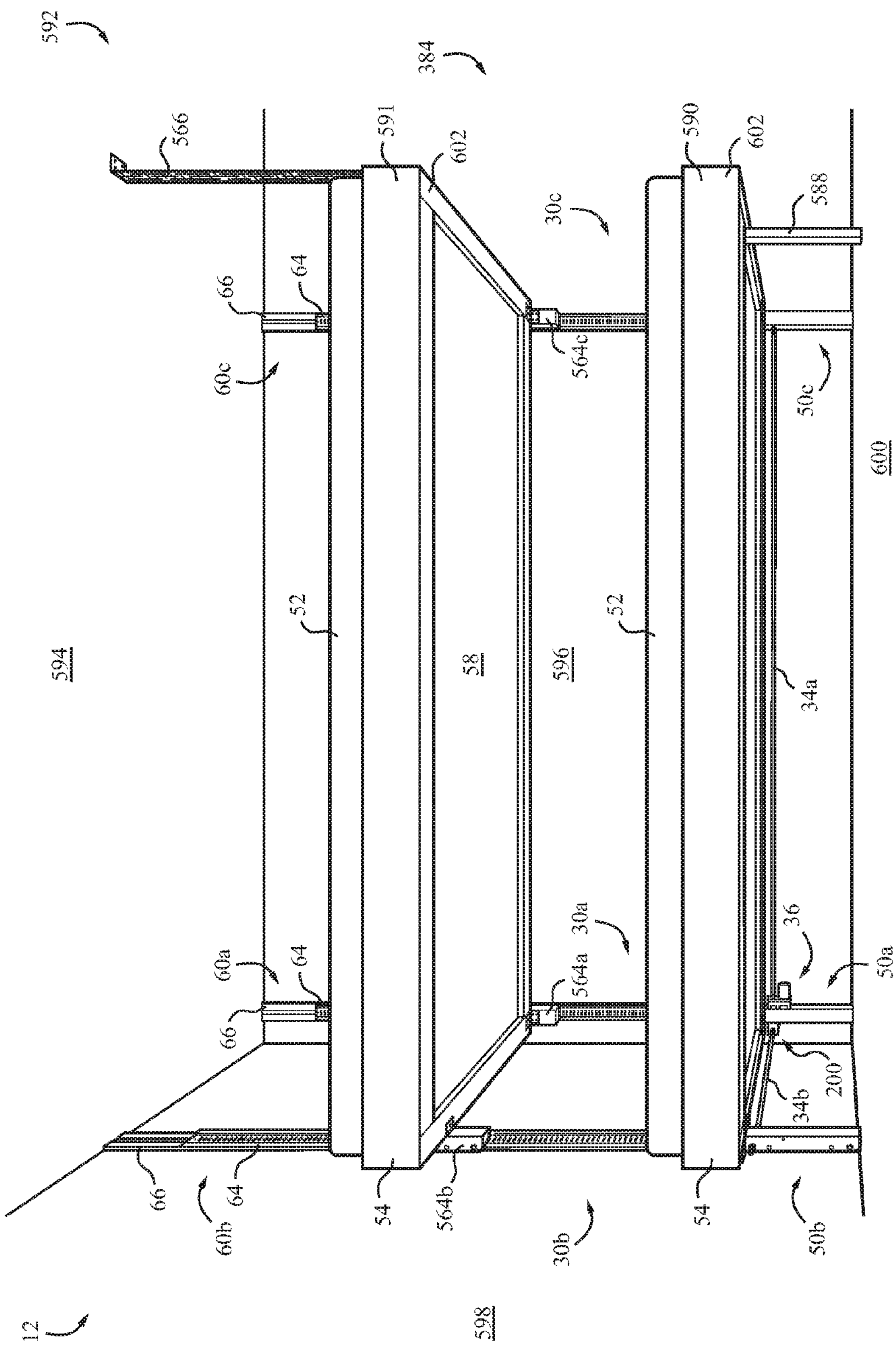
FIG. 78 shows a perspective view of one embodiment of a system for moving one or more beds in a corner (e.g., a room, back of an RV, and so forth).

Referring to FIG. 78, another embodiment of the system 12 is shown being used in the corner of a room 592. The room 592 includes a first side wall 596, a second side wall 598, a ceiling 594, and a floor 600. The first side wall 596 and the second side wall 598 meet together in a corner of the room 592. The room 592 may be part of a mobile structure such as the vehicle 10, or it may be part of an immobile structure such as a building. In this embodiment, a lower bed 590 and an upper bed 591 are coupled to the first side wall 596 and the second side wall 598 using the lifting assemblies 30*a*, 30*b*, 30*c*. In general, the lifting assemblies 30*a*, 30*c* are configured to be coupled to the first side wall 596 in a similar manner to how the lifting assemblies 30*a*, 30*c* are coupled to the first side wall 16 in FIG. 67.

As shown in FIG. 78, the lifting assembly 30*b* may be coupled to the second side wall 598 so that the lifting assembly 30*b* faces in a direction which is about 90 degrees from the direction that the lifting assemblies 30*a*, 30*c* face. In one embodiment, the drive member 34*b* may be configured to extend from the transmission 200, which is coupled to the moving assembly 50*a*, directly to the drive shaft 150*b* of the moving assembly 50*b*. In this embodiment, the lifting assembly 30*a* may be coupled adjacent to the second side wall 598 so that the drive member 34*b* is configured to extend directly from the transmission 200 to the drive shaft 150*b* of the moving assembly 50*b*.

Although three lifting assemblies 30 are shown in FIG. 78, it should be appreciated that more or less may be used to raise and/or lower the beds 590, 591. For example, in one embodiment, two lifting assemblies 30 may be coupled to the first side wall 596 and two lifting assemblies 30 may be coupled to the second side wall 598. Additional numbers and configurations of the lifting assemblies 30 may be used as well.

The corners 602 of the beds 590, 591 may be supported in the use configuration 384 using the support 588 and/or the support element 566. In one embodiment, shown in FIG. 78, the support element 566 may be a fabric strap such as an interwoven nylon fabric strap. The support 588 may be a folding-leg similar to that shown in FIG. 67. It should be appreciated, that the beds 590, 591 may also be supported in the use configuration 384 and/or the stowed configuration (not shown in FIG. 78) using the braces 382 and/or any other suitable support structure. For example, the braces 382 may be positioned between the lower ends 132 of the moving assemblies 50*b*, 50*c* and the bottom side 58 of the lower bed 590. Many other additional configurations may also be used.

The beds 590, 591 may be moved between a use configuration 384 where the beds 590, 591 are spaced apart from each other and configured to receive a person to sleep thereon and a stowed configuration (not shown in FIG. 78) where the beds 590, 591 are positioned adjacent to each other near the ceiling 594 in any of a number of suitable ways such as, for example, any of the ways described previously. For example, the lower bed 590 may be configured to contact the bottom side 58 of the upper bed 591 so that the weight of the upper bed 591 is borne by the lower bed 590.

Many additional embodiments may also be provided for moving the beds 590, 591 between the use configuration 384 and the stowed configuration 388. For example, the embodiments described and illustrated previously using four lifting assemblies 30 may also be used to vertically move the beds 590, 591 in the corner of the room 592. In this situation, the lifting assemblies 30*a*, 30*c* may be positioned opposite the lifting assemblies 30*b*, 30*d* so that the drive member 34*b* extends between the transmissions 200. The lifting assemblies 30*a*, 30*c* may be coupled to the first side wall 596 as shown in FIG. 78 and positioned opposite the lifting assemblies 30*b*, 30*d*. The arrangement of the lifting assemblies 30 may be similar to that shown in FIG. 2, except that the lifting assemblies 30*b*, 30*d* are not backed by a wall. Rather, the lifting assemblies 30*b*, 30*d* may be supported in an upright position in a number of ways. For example, in one embodiment, the lifting assemblies 30*b*, 30*d* may be coupled together using cross members to provide a rigid free standing structure. In another embodiment, the lifting assembly 30*b* may be coupled to the second side wall 598 with the lifting assembly 30*b* facing the lifting assembly 30*a*. The lifting assembly 30*d* may be coupled to the lifting assembly 30*b* using cross members to support the lifting assembly 30*d* in an upright position. In yet another embodiment, the lifting assemblies 30*b*, 30*d* may be coupled to the floor 600 and/or the ceiling 594. Numerous additional embodiments may also be used to support the lifting assemblies 30*b*, 30*d*. It should be appreciated that many of the configurations and principles described in relation to earlier embodiments may also apply in these embodiments. For example, in the embodiment where the lifting assemblies 30*b*, 30*d* are not backed by a wall, the stops 394 may be coupled to the support assemblies 60 as shown in FIGS. 58-61 to support the upper bed 591 in the use configuration 384.

Figure 79:
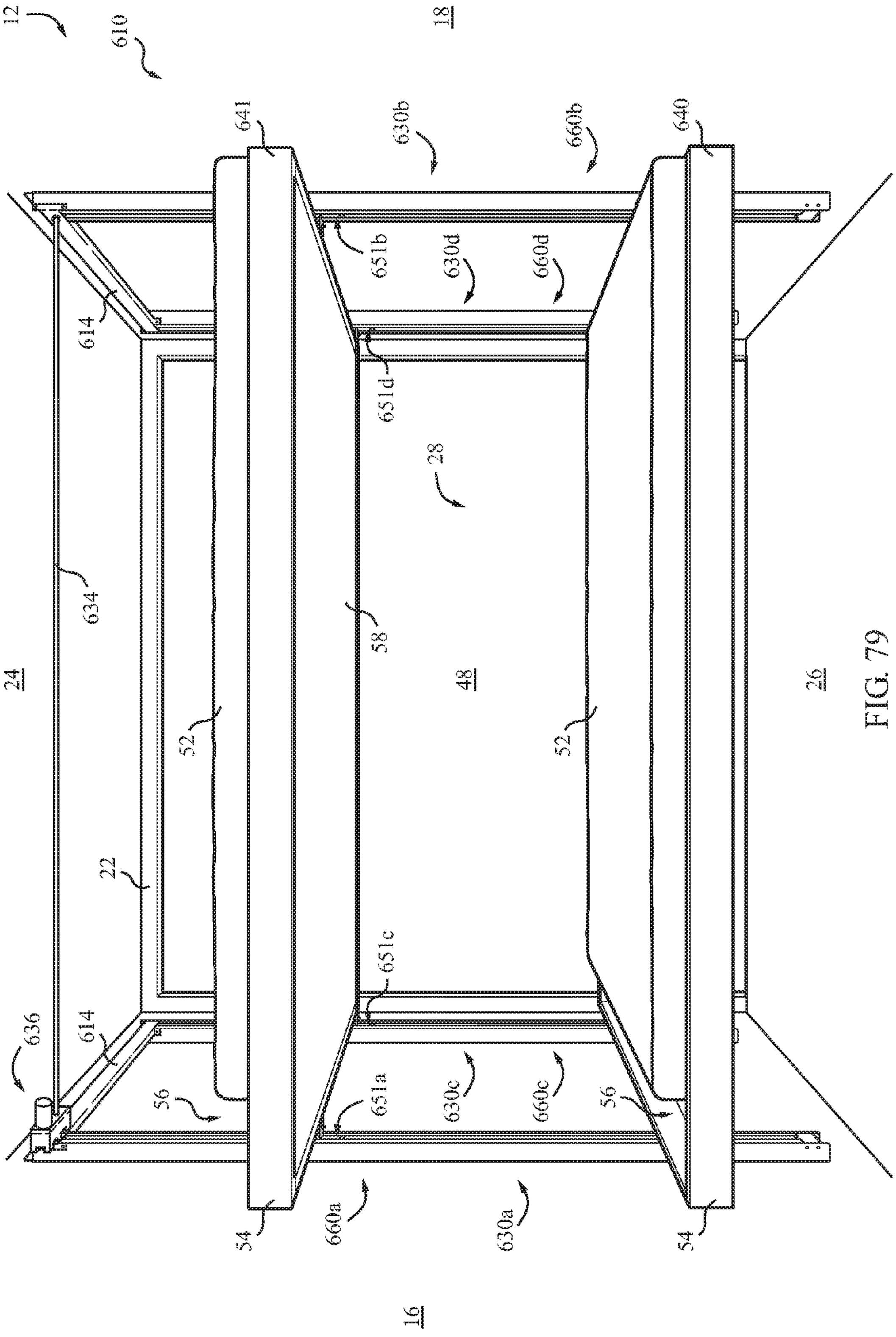
FIG. 79 shows a perspective view of another embodiment of a system for vertically moving one or more beds, the beds being shown in a use configuration.
Figure 80:
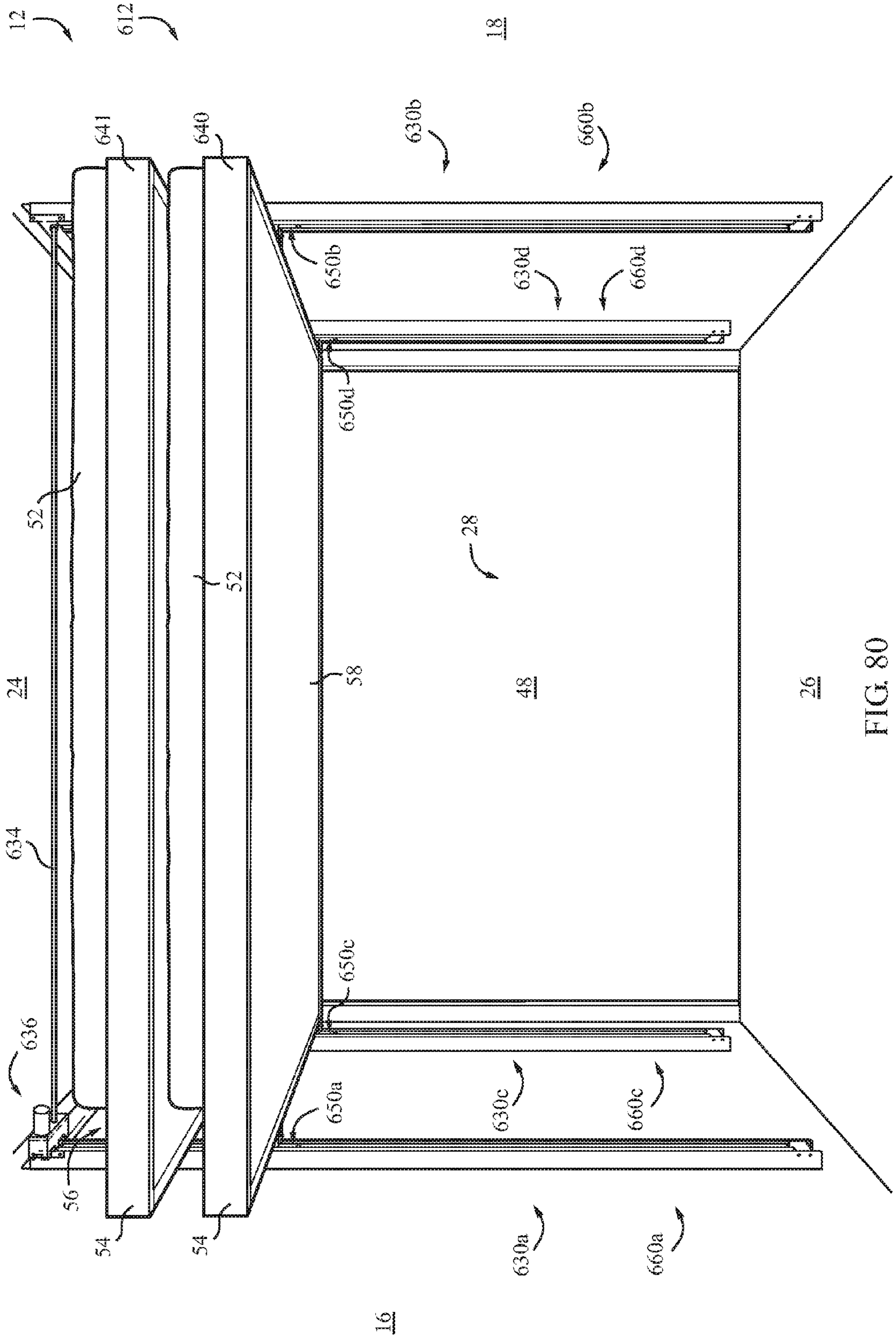
FIG. 80 shows a perspective view of the system for vertically moving one or more beds, the beds being shown in a stowed configuration.

Referring to FIG. 79, a perspective view of another embodiment of the system 12 is shown from inside the vehicle 10. In this embodiment, the system 12 includes lifting assemblies 630*a*, 630*b*, 630*c*, 630*d* (collectively referred to as "the lifting assemblies 630")—alternatively referred to herein as sliding assemblies or sliding mechanisms—a drive member 634—alternatively referred to herein as synchronizing assemblies, synchronizing members, or timing assemblies—cross members 614, and a motor assembly 636. The lifting assemblies 630*a*, 630*c* are coupled to the first side wall 16, and the lifting assemblies 630*b*, 630*d* are coupled to the second side wall 18. The lifting assemblies 630 may be used to vertically move a first or lower bed 640 and a second or upper bed 641 between a use configuration 610 where the beds 640, 641 are spaced apart and a stowed configuration 612 where the beds 640, 641 are positioned adjacent to the ceiling 24. A perspective view of the stowed configuration 612 is shown in FIG. 80. The drive member 634 may be used to move the pair of lifting assemblies 630*a*, 630*c* coupled to the first side wall 16 and the pair of lifting assemblies 630*b*, 630*d* coupled to the second side wall 18 together. The motor assembly 636 may be used to drive the lifting assemblies 630.

It should be appreciated that in describing the components in the embodiment in FIGS. 79-80, and, at a general level, any alternative or additional embodiment described herein, that a description of the same or similar component, feature, or configuration in connection with any previous or later embodiment should be considered to be applicable to the components in the present embodiment without explicitly stating the same. Also, situations where it is explicitly stated that a component may be similar to another component or that a component may have a particular feature or configuration of another component should not be taken as implying that the component may not be similar to other similar components or may not have other features or configurations of other similar components which are not explicitly mentioned. Also, it should be appreciated that many components, features, and/or configurations are described herein only in connection with one particular embodiment, but these same components, features, and/or configurations are applicable to many other embodiments and should be considered applicable to the other embodiments, unless stated otherwise or unless such a component, feature, and/or configuration is technically impossible to use with the other embodiment. Accordingly, components such as, for example, the beds 640, 641 in FIG. 79 may be configured similarly to the beds 40, 41 described previously, and the beds 640, 641 may also move in a similar fashion as the beds 40, 41.

Referring to FIG. 79, four lifting assemblies 630 may be used to vertically move the beds 640, 641. In other embodiments, one, two, three, five, six, or more lifting assemblies 630 may be used to vertically move the beds 640, 641. The lifting assemblies 630 may be coupled to the same side wall, opposing side walls, or on side walls which are perpendicular to each other. Thus, many configurations of the lifting assemblies 630 may be provided to vertically move the beds 640, 641.

As shown in FIG. 79, a cross member 614 may be coupled between the lifting assemblies 630*a*, 630*c* and the lifting assemblies 630*b*, 630*d*. The combination of each pair of the lifting assemblies 630 and the cross member 614 may form a rigid structure which can be coupled to the side walls 16, 18. Also, the cross member 614 may be used to conceal a flexible drive member 632, 638 (FIGS. 81-82) such as a chain, cable, toothed belt, or strap which moves behind or inside the cross member 614.

The lifting assemblies 630*a*, 630*b*, 630*c*, 630*d* each include a moving assembly 650*a*, 650*b*, 650*c*, 650*d* (collectively referred to as "the moving assemblies 650"), a moving assembly 651*a*, 651*b*, 651*c*, 651*d* (collectively referred to as "the moving assemblies 651")—the moving assemblies 650, 651 may alternatively be referred to herein as carriages, trolleys, sliding units, or moving guide assemblies—and a guide assembly 660*a*, 660*b*, 660*c*, 660*d* (collectively referred to as "the guide assemblies 660")—alternatively referred to herein as a support assembly. In this embodiment, the moving assemblies 651 may be coupled to the upper bed 641 and the moving assemblies 650 may be coupled to the lower bed 640. The moving assemblies 650, 651 may be configured to cooperate with the corresponding guide assemblies 660 to vertically move the beds 640, 641 between the use configuration 610 and the stowed configuration 612. In one embodiment, the moving assemblies 650, 651 slidably cooperate with the guide assemblies 660 to vertically move the beds 640, 641.

Although the lifting assemblies 630 are shown being configured to vertically move two beds, it should be appreciated that the lifting assemblies 630 may be used to vertically move one, three, or more beds. For example, in one embodiment, three beds may be moved between the use configuration 610 where the beds are spaced apart to receive one or more persons to sleep thereon and the stowed configuration 612 where the beds are positioned adjacent to the ceiling 24. Of course, any number of the beds in widely varying configurations may be provided.

The system 12, shown in FIG. 79, may be installed in the vehicle 10 in any of a number of ways. In one embodiment, the system 12 may be installed by first coupling at least one of the lifting assemblies 630*a*, 630*c* to the first side wall 16. The lifting assemblies 630*a*, 630*c* and the cross member 614 may be coupled as an assembled unit to the first side wall 16. At least one of the lifting assemblies 630*b*, 630*d* may then be coupled to the second side wall 18. Desirably, the lifting assemblies 630*b*, 630*d* and the cross member 614 may also be coupled as an assembled unit to the second side wall 18. The drive member 634 may then be coupled between the pairs of lifting assemblies 630 coupled to each side wall 16, 18. The process of installing the system 12 is be simple and efficient.

It should be appreciated that many additional ways may be used to install or couple the system 12 to the vehicle 10. For example, the order in which the lifting assemblies 630 are coupled to the side walls 16, 18 may be varied. Also, in another embodiment, the lifting assemblies 630 may be coupled to the side walls 16, 18 before the cross members 614 are coupled between the lifting assemblies 630. Numerous additional modifications may be made in the method for installing the system 12.

In the embodiment shown in FIGS. 79-80, the lifting assemblies 630 are shown being coupled to the outside of the side walls 16, 18. However, in other embodiments, the system 12 may be configured so that the lifting assemblies 630 are built into the side walls 16, 18. For example, a slit may be provided in the side walls 16, 18 through which the beds 640, 641 may be coupled to the moving assemblies 650, 651. The moving assemblies 650 may be configured to move vertically inside the side walls 16, 18 and, thus, vertically move the beds 640, 641. The motor assembly 636 and the drive member 634 may be positioned in the interior of the vehicle 10, underneath the floor 26, or in the ceiling 24. Further details of one embodiment where the lifting assemblies 630 are inside the side walls 16, 18 can be found in the description of FIGS. 263-268. It should be appreciated that the use of the lifting assemblies 630 inside the side walls 16, 18 may take on numerous other configurations as well.

Referring to FIGS. 81-82, FIG. 81 shows a perspective view of the lifting assemblies 630*a*, 630*c* coupled to the first side wall 16 and coupled to each other using the cross member 614, and FIG. 82 shows a perspective view of the lifting assemblies 630*b*, 630*d* coupled to the second side wall 18 and coupled to each other using the cross member 614. The moving assemblies 650, 651 each include a moving member 620, 622, respectively,—the moving members 620, 622 may alternatively be referred to herein as housings, brackets, moving guide members, or sliding members—and the guide assemblies 660 each include a guide member 618—alternatively referred to herein as a support member, a channel member, rail, or a stanchion.

As shown in this embodiment, each lifting assembly 630*a*, 630*b*, 630*c*, 630*d* may include a flexible drive member 616*a*, 616*b*, 616*c*, 616*d* (collectively referred to as "the flexible drive members 616") which may be used to vertically move the moving members 620, 622 in cooperation with the guide members 618. Also, flexible drive members 632, 638 may be used to move the adjacent lifting assemblies 630*a*, 630*c* and the adjacent lifting assemblies 630*b*, 630*d*, respectively, together. The drive member 634 may be used to move the lifting assemblies 630*a*, 630*c* and the lifting assemblies 630*b*, 630*d* together. Thus, the flexible drive members 632, 638 and the drive member 634 may be used to move all of the lifting assemblies 630 in unison.

It should be appreciated that the configuration of the drive members 632, 634, 638 may be varied in a number of ways. For example, in another embodiment, the flexible drive member 632 may be configured to move the lifting assemblies 630*a*, 630*c* together with one drive member 634 extending between the lifting assemblies 630*a*, 630*b* and another drive member 634 extending between the lifting assemblies 630*c*, 630*d*. Thus, in this embodiment, two drive members 634 may be used and the flexible drive member 638 may be eliminated. Also, the flexible drive member 632 may be positioned anywhere as long as it extends between and is capable of moving the two drive members 634 together. For example, the flexible drive member 632 may be positioned in the middle of the ceiling 24 and configured to extend between the two drive members 634. Numerous additional configurations of the drive members 632, 634, 638 may also be provided so long as the lifting assemblies are capable of moving in unison.

In the embodiments shown in FIGS. 81-82, the flexible drive members 616 form endless loops in each of the guide members 618. The flexible drive member 616 in each endless loop travels along an endless path. For example, as shown in FIG. 81, the flexible drive member 616*a* forms an endless loop which extends between an upper or first end 624 of the lifting assembly 630*a* and a lower or second end 626 of the lifting assembly 630*a*. The flexible drive members 616*b*, 616*c*, 616*d* form endless loops in the lifting assemblies 630*b*, 630*c*, 630*d*, respectively, in a similar manner. The endless loops formed by the flexible drive members 616 are generally oriented vertically in a plane which is parallel to the side walls 16, 18.

It should be understood that the flexible drive members 616 may be used to form the entire endless loop, such as when the flexible drive members 616 are continuous loops of chain, or to form a part of the endless loop such as when the flexible drive members 616 are chains where a rigid component (e.g., moving member 620) is coupled between the ends of each of the chain. Either way, an endless loop is provided which travels along an endless path.

Each endless loop formed by the flexible drive members 616 includes a load bearing or first side 642 and a return or second side 644. The flexible drive members 616 each include a load bearing portion 652—alternatively referred to herein as a load bearing length or load bearing segment—on the load bearing side 642 of the endless loop, which extends from the location of the load, the moving assembly 650 in this embodiment, vertically to the upper end 624 of the lifting assemblies 630 where the load is supported. The load bearing portion 652 is generally that portion of the flexible drive members 616 which bears the load as the beds 640, 641 are moved vertically. The flexible drive members 616 also each include a return portion 654—alternatively referred to herein as a slack portion, return length, or return segment—on the return side 644 of the endless loop, which, in general, is the portion of the flexible drive members 616 that do not bear the load as the beds 640, 641 are raised and lowered. The load bearing side 642, in the embodiment shown in FIGS. 81-82, includes the load bearing portion 652 and part of the return portion 654 (i.e., the portion of the flexible drive member 616 that extends downward from the moving assembly 650 to the lower end 626 of the lifting assembly 630). The return side 644, in this embodiment, only includes return portion 654. It should be appreciated that the load bearing portion 652 gets smaller as the moving assembly 650 is raised and that the flexible drive member 616 that was formerly part of the load bearing portion 652 becomes part of the return portion 654.

As shown in FIGS. 81-82, the load bearing sides 642 and the return sides 644 of the flexible drive members 616 extend vertically lengthwise relative to the side walls 16, 18 and are, more or less, parallel to each other. In one embodiment, the load bearing portions 652 are coupled to the moving assemblies 650 so that the moving assemblies 650 and the flexible drive members 616 move along the endless paths defined by the endless loops at the same rate. The return portions 654 of the flexible drive members 616 are configured to move in the opposite direction of the moving assemblies 650, 651. For example, as the moving assemblies 650 are being raised, the return portions 654 move downwardly.

The flexible drive members 632, 638 are used to move the respective lifting assemblies 630 in unison. Each of the flexible drive members 632, 638 includes a load bearing or first side 646 and a return or second side 648. A taught portion or length 656 of the flexible drive members 632, 638 on the load bearing side 646 bears the weight of the beds 640, 641 at any given time. A slack portion or length 658 of the flexible drive members 632, 638 on the return side 648 serves to close the endless loop. Both the taught portions 656 and the slack portions 658 extend between the upper ends 624 of adjacent lifting assemblies 630 and are generally parallel to each other. The taught portions 656 are the portion of the flexible drive members 632, 638 which, at any given time, are in tension due to the weight of the moving assemblies 650 and the beds 640, 641.

It should be appreciated that the configuration of the flexible drive members 616, 632, 638 may be varied in a number of ways. For example, the load bearing sides 642 and the return sides 644 of the flexible drive members 616 may be switched with each other. This can be done by coupling the flexible drive members 616 to the moving assemblies 650 using what was previously the return sides 644. Thus, the return sides 644 become the load bearing sides 642 and what was once the load bearing sides 642 become the return sides 644. Also, by switching the load bearing sides 642 and the return sides 644 of the flexible drive members 616 with each other, the load bearing sides 646 and the return sides 648 of the flexible drive members 632, 638 are switched as well.

In operation, the motor assembly 636 is used to move the flexible drive members 616 along the endless paths. Since the moving assemblies 650 are coupled to the flexible drive members 616, the moving assemblies 650 also move along the endless path. For example, as shown in FIGS. 81-82, as the load bearing portion 652 of the flexible drive member 616*a* moves upward, the moving assembly 650*a* is raised and the flexible drive member 632 in the taught portion 656 moves toward the upper end 624 of the lifting assembly 630*a*. As the flexible drive member 632 moves in this manner, the load bearing portion 652 of the flexible drive member 616*c* also moves upward, thus raising the moving assembly 650*c*. At the same time, the rotary motion provided by the motor assembly 636 is transmitted by the drive member 634 to the flexible drive member 616*b*. The load bearing portion 652 of the flexible drive member 616*b* moves upward as the drive member 634 rotates, thus raising the moving assembly 650*b*. As the flexible drive member 616*b* moves in this manner, the flexible drive member 638 in the taught portion 656 moves toward the upper end 624 of the lifting assembly 630*b*. By moving the flexible drive member 638 in this manner, the load bearing portion 652 of the flexible drive member 616*d* moves upward, thus raising the moving assembly 650*d*. In this manner, the moving assemblies 650 may be moved in unison to move the beds 640, 641 to any vertical position as desired.

In one embodiment, the flexible drive members 616 may be roller chains. In this embodiment, one or more sprockets may be provided at the upper end 624 and/or the lower end 626 to facilitate movement of the flexible drive members 616 along the endless path. In one embodiment, the roller chain may be #35 roller chain. The roller chain may also be corrosion resistant (e.g., nickel plated, stainless steel, etc.). In another embodiment, the flexible drive members 616 may be toothed belts as shown and described in connection with FIGS. 111-112. The toothed belts may have straight teeth or may have helical offset teeth. The toothed belts may be configured to cooperate with a corresponding sprocket having the same tooth design. In one embodiment, the toothed belt may be a polyurethane toothed belt such as the Goodyear Eagle PD polyurethane toothed belt.

It should be appreciated that the flexible drive members 616 may be configured in a number of suitable ways beyond what is shown in FIGS. 81-82. For example, the flexible drive members 616 may be any suitable flexible material such as a V-shaped belt, etc. Also, in another embodiment, the flexible drive members 616 and the cross members 614 may extend between the lower ends 626 of the lifting assemblies 630. Further still, the flexible drive members 632, 638 which extend between the lifting assemblies 630*a*, 630*c* and the lifting assemblies 630*b*, 630*d*, respectively, may be substituted with a rigid drive member. For example, the rigid drive member may be configured to extend between the transmissions 200 which may be coupled to the upper ends 624 of the lifting assemblies 630. Many additional embodiments may also be provided.

In one embodiment, as shown in FIGS. 81-82, the drive member 634 may be used to move the lifting assemblies 630*a*, 630*c* and the lifting assemblies 630*b*, 630*d* in unison. In this embodiment, the drive member 634 extends between the drive shaft 670*b* and a drive shaft 671 which extends into the bore 210 of the drive sleeve 208. The drive member 634 is used to move the drive shafts 670*b*, 671 in unison and may be configured in a manner similar to that described for drive member 34.

The drive member 634 may be positioned between the motor assembly 636 and the drive shaft 670*b* as follows. First, the second end 322 of the drive member 634 engages the drive shaft 670*b*. The drive shaft 671 is then inserted into the first end 320 of the drive member 634 as shown in FIG. 86. The drive member 634 is then positioned in line with the drive sleeve 208 of the motor assembly 636. The drive shaft 671 is extended telescopically from the hole 318 in the first end 320 of the drive member 634 and into the drive sleeve 208 until the end of the drive shaft 671 abuts the first end 680 of the drive shaft 670*a*. Typically, the drive shafts 670*a*, 671 each extend approximately halfway through the drive sleeve 208. The drive shaft 671 is fixed in position using a fastener or securing device 633. The fastener 633 may be any suitable fastener such as, for example, a screw that extends through drive member 634 and abuts against the drive shaft 671 to preventing the drive shaft 671 from moving relative to the drive member 634.

Holes 628 in the upper ends 624 of the lifting assemblies 630 may be used to couple the lifting assemblies 630 to the side walls 16, 18. The holes 628 may be used to receive any of a number of suitable fasteners which are used to couple the lifting assemblies 630 to the first side wall 16. For example, in one embodiment, bolts or screws may extend through the holes 628 and into the side walls 16, 18 to securely hold the lifting assemblies 630*a*, 630*c* in place. Also, the lower ends 626 of the lifting assemblies 630 may include the holes 628 and, thus, may be capable of being coupled to the side walls 16, 18 as well.

It should be appreciated that the ways in which the lifting assemblies 630 may be coupled to the side walls 16, 18 are numerous. For example, in another embodiment, the holes 628 may be included in the middle of the lifting assemblies 630. Also, flanges may be included which extend outward from the guide members 618 adjacent to and parallel with the side walls 16, 18. The flanges may include the holes 628 so that fasteners may be used to couple the flanges and, thus, the lifting assemblies 630 to the side walls 16, 18.

Referring to FIGS. 83-84, a perspective view of one embodiment of the cross member 614 is shown assembled in FIG. 83 and exploded in FIG. 84. In this embodiment, the cross member 614 is configured to be adjustable lengthwise in order to provide the desired amount of tension in the flexible drive members 632, 638. The cross member 614 includes a first end section 662, a second end section 664, and an intermediate section 666. In this embodiment, the intermediate section 666 fits over corresponding portions of the first end section 662 and the second end section 664. The first end section 662 and the second end section 664 include holes 668, and the intermediate section 666 includes holes 672. Fasteners such as bolts, screws, pins, and the like may be received by the holes 668, 672 to couple the end sections 662, 664 to the intermediate section 666. The holes 672 in the intermediate section 666 may be oversized in the longitudinal direction of the intermediate section 666 so that intermediate section 666 may be moved longitudinally relative to at least one of the end sections 662, 664 to adjust the tension in the flexible drive members 632, 638. In one embodiment, the holes 668 in the end sections 662, 664 may be threaded to receive a corresponding threaded portion of a fastener (e.g., bolt, screw, etc.). The intermediate section 666 may also include holes 674 which are configured to receive a fastener to hold the intermediate section 666 in place relative to one or both the end sections 662, 664. For example, a self-tapping screw may be received by the holes 674 and used to create corresponding holes in the end sections 662, 664 to secure the intermediate section 666 to the end sections 662, 664.

It should be appreciated that many other configurations may be provided for the cross member 614. For example, in another embodiment, rather than using three sections, the cross member 614 may include two sections which may be adjusted lengthwise relative to each other. The two sections may be coupled together in a manner similar to that shown in FIGS. 83-84. In another embodiment, the cross member 614 may be a one-piece structure which is sized to provide the desired tension in the flexible drive members 632, 638. In another embodiment, an idler, tensioner, or take-up may be used to provide the desired tension in the flexible drive members 632, 638. The idler, tensioner, or take-up may be a sprocket, roller, or the like. It may be made from plastic, metal, composites, or any other suitable material. In another embodiment, the cross member 614 may be omitted so that the flexible drive members 632, 638 are in open view. Many additional configurations may be provided.

Referring to FIGS. 85 and 87, FIG. 85 shows a cut-away, assembled perspective view of the lifting assembly 630*a*. FIG. 87 shows an exploded perspective view of the lifting assembly 630*a*. The lifting assembly 630*a* is used in the following description as an example of the configuration, operation, and use of the lifting assemblies 630 in the system 12 shown in FIGS. 79-80. Accordingly, unless noted otherwise, the following description, features, etc. should be understood to also apply to the lifting assemblies 630*b*, 630*c*, 630*d*. It should be noted that in the configuration of the lifting assembly 630*a* shown in FIGS. 85 and 87, the load bearing side 642 and the return side 644 have been reversed relative to the embodiment shown in FIG. 81. Also, the load bearing side 646 and the return side 648 of the flexible drive member 632 have also been reversed relative to the embodiment shown in FIG. 81.

As shown in FIG. 85, in one embodiment, the motor assembly 636 may be coupled to the lifting assembly 630*a* using a mounting bracket 682. The mounting bracket 682 includes holes 684 which are configured to receive a fastener 686. The mounting bracket 682 is configured so that the fasteners 686 may extend through the holes 684 and be received by the apertures 202 in the motor housing 198 to secure the motor housing 198 to the mounting bracket 682. In one embodiment, both the fasteners 686 and the apertures 202 may include corresponding threaded portions so that the fasteners may cooperate with the apertures to securely hold the mounting bracket 682 to the motor housing 198. It should be appreciated that many other ways may be used to couple the mounting bracket 682 to the motor housing 198 such as welding, brazing, etc.

The mounting bracket 682 also includes holes 688 which may be configured to receive a fastener 692. The guide member 618 may also include holes 694 which correspond to the holes 688 and are also configured to receive the fastener 692. Thus, the mounting bracket 682 may be coupled to the guide member 618 by positioning the fastener 692 in the holes 688 in the mounting bracket 682 and the holes 694 in the guide member 618. In this manner, the motor assembly 636 may be coupled to the guide member 618.

It should be appreciated that the motor assembly 636 may be coupled to the lifting assembly 630*a* in a number of suitable ways. For example, in another embodiment, the motor assembly 636 may be coupled to the cross member 614. This may be done by rotating the motor assembly 636 180 degrees from the configuration shown in FIG. 85 and along an axis defined by the drive sleeve 208 so that the apertures 202 are positioned lengthwise relative to the cross member 614. The apertures 202 may be configured to receive a fastener 686 which extends through holes in the cross member 614.

In other embodiments, the motor assembly 636 may be coupled to the side walls 16, 18, the ceiling 24 or any other suitable location. For example, another embodiment of the mounting bracket 682 may be provided which facilitates coupling the motor assembly 636 to the ceiling 24 and/or the first side wall 16. In yet another embodiment, the drive member 634 may be provided as two separate sections with the motor assembly 636 coupled to the ceiling 24 at a position between the two sections. Numerous additional configurations may also be used.

As shown in FIG. 85, a first end 680 of a drive shaft 670*a* extends outwardly from the upper end 624 of the lifting assembly 630*a*. The drive shaft 670*a* may be used to move the flexible drive members 616*a*, 632. The first end 680 of the drive shaft 670*a* may be received in the bore 210 defined by the drive sleeve 208 of the motor assembly 636. As shown in FIG. 85, the first end 680 of the drive shaft 670*a* is hexagonally shaped and sized to be received by the corresponding hexagonally shaped drive sleeve 208. In this manner, the drive sleeve 208 may engage the drive shaft 670*a* so that when the motor 160 is activated the drive shaft 670*a* rotates. The mounting bracket 682 includes an opening 696 through which the drive shaft 670*a* is positioned when the motor assembly 636 is coupled to the guide member 618. The opening 696 is sized to allow the drive shaft 670*a* to rotate freely therein.

Referring to FIG. 87, the lifting assembly 630*a* includes an upper group of components 676, a lower group of components 678, the moving assembly 650*a*, and the moving assembly 651*a*. The upper group of components 676 are shown separately in FIG. 88, and the lower group of components 678 are shown separately in FIG. 89. Also, the moving assemblies 650*a*, 651*a* are shown separately in FIGS. 90-91, respectively. The groups of components 676, 678 are referred to as such in order to facilitate description of the various components included as part of the lifting assembly 630*a*. Accordingly, it should be understood that the components provided in the upper group of components 676 or the lower group of components 678 may be located anywhere in the lifting assembly 630*a* and do not necessarily have to be located at the upper end 624 or the lower end 626 of the lifting assemblies 630.

In FIGS. 87-88, the upper group of components 676 includes the guide member 618, the cross member 614, and an upper drive mechanism 690. In this embodiment, the guide member 618 is coupled to the first side wall 16 so that the guide member 618 is positioned vertically. The guide member 618 includes a first side 702, a second side 704, and a base 706. The first side 702 and the second side 704 extend outwardly from the base 706 in a direction that is away from the first side wall 16. In general, the first side 702 and the second side 704 are parallel to each other. Securing flange 708 and securing flange 710 extend from the first side 702 and the second side 704, respectively, towards each other to form a gap 712 between the flanges 702, 704. In the embodiment shown in FIGS. 87-88, the securing flanges 708, 710 are generally parallel to the base 706. The combination of the first side 702, the second side 704, the base 706, and/or the securing flanges 708, 710 defines a channel 714 extending lengthwise through the guide member 618. In one embodiment, the guide member 618 may be configured to have a C shaped cross section (e.g., C-channel) which includes the channel 714. As shown in FIGS. 85 and 87, the channel may be sized and otherwise configured to receive the moving assemblies 650*a*, 651*a* to allow the moving assemblies 650*a*, 651*a* to move vertically inside the channel 714.

In one embodiment, the guide members 618 used in the various lifting assemblies 630 shown in FIG. 79 may be substantially similar or identical to each other. Thus, when the lifting assemblies 630 are assembled, the same guide member 618 may be used in the lifting assembly 630*a* as those used in the lifting assemblies 630*b*, 630*c*, 630*d*. However, in other embodiments, one configuration of the guide member 618 may be used for one lifting assembly 630 while another configuration may be used for another one of the lifting assemblies 630. Thus, the guide members 618 may be configured differently from each other depending on which lifting assembly 630 uses the guide member 618.

As shown in FIGS. 87-88, the guide member 618 includes a bushing protrusion 716 which defines a hole 718 to receive a second end 720 of the drive shaft 670*a*. In this embodiment, the bushing protrusion 716 extends from the base 706 into the channel 714. This may be desirable to allow the base 706 to fit flush against the first side wall 16.

In one embodiment, the drive mechanism 690 includes the drive shaft 670*a*, a first sprocket 722, a second sprocket 724—the first and second sprockets may alternatively be referred to herein as a rotatable member, rotatable wheel, or toothed wheel—a first bearing 726, and a second bearing 728—the first and second bearings may alternatively be referred to herein as bushings, sleeves, or friction reducing members. The drive shaft 670*a* includes the hexagonally shaped first end 680, the cylindrical second end 720, and a cylindrical intermediate portion 730. The first bearing 726 and the second bearing 728 include an axial hole 732 and an axial hole 734, respectively. The drive shaft 670*a* is positioned to rotate on an axis which is perpendicular to the first side wall 16 of the vehicle 10.

The cylindrical second end 720 is sized and configured to be received in the axial hole 734 in the second bearing 728. The second bearing 728 is sized to be received in the hole 718 in the guide member 618. In one embodiment, the second bearing 728 is secured in the hole 718 by the friction between the second bearing 728 and the hole 718.

In one embodiment, the sprockets 722, 724 may be coupled to the intermediate portion 730 of the drive shaft 670*a*. This may be done in any of a number of suitable ways. For example, in one embodiment, the sprockets 722, 724 may be provided as a double sprocket which is coupled to the drive shaft 670 using a pin and hole arrangement. In another embodiment, the intermediate portion 730 may be hexagonally shaped and configured to cooperate with an axial hole in the double sprocket which is also hexagonally shaped. In yet another embodiment, the drive shaft 670*a* and the sprockets 722, 724 may be made as an integral piece. For example, the drive shaft 670*a* and the sprockets 722, 724 may be made as one integral piece using powdered metal.

In yet another embodiment, the intermediate portion 730 of the drive shaft 670*a* may include a raised portion having a diameter which is larger than the axial hole in the sprockets 722, 724. The first sprocket 722 may be configured to be positioned adjacent to one side of the raised portion and the second sprocket 724 may be configured to be positioned adjacent to the other side of the raised portion. The length of the raised portion may be adjusted to provide the desired distance between the sprockets 722, 724. The sprockets 722, 724 may be coupled to the drive shaft 670*a* using soldering, brazing, or any other suitable process. The sprockets 722, 724 used in this embodiment may be provided using conventional metal stamping techniques. Also, in another embodiment, the sprockets 722, 724 may be soldered or otherwise coupled to a drive sleeve having the raised portion rather than a drive shaft having the raised portion. The drive sleeve may be configured to include a hexagonal bore which is capable of receiving a corresponding hexagonal drive shaft. The drive sleeve engaged with the hexagonal drive shaft may be used to form the drive shaft 670*a* as shown in FIGS. 87-88. Thus, in one embodiment, the drive shafts 670*a*, 670*b*, which engage the motor assembly 636 and the drive member 634, may be provided by coupling the drive sleeve to the corresponding hexagonal drive shaft and the drive shafts 670*c*, 670*d* may be a solid drive shaft.

With continued reference to FIGS. 87-88, the intermediate portion 730 of the drive shaft 670*a* may be configured to be positioned in the axial hole 732 of the first bearing 726. The first bearing 726 may be configured to be positioned in the recess defined by the bushing protrusion 736 in the cross member 614 so that the first end 680 extends through a hole 740 in the cross member 614. Thus, when assembled, the first end 680 may extend outward from the cross member 614 to be received by the drive sleeve 208 in the motor housing 198. The bearings 726, 728 may be any suitable bearing which reduces the friction as the drive shaft 670*a* rotates. For example, the bearings may be ball bearings, roller bearings, etc. In other embodiments, the bearings 726, 728 may be made from plastic, metal, composites, or any other suitable material. For example, the bearings 726, 728 may be plastic bushings sized to be received in the recess defined by the bushing protrusion 736 and in the hole 718 in the guide member 618. Many other embodiments may also be used.

When assembled, the drive mechanism 690 is supported at the upper end 624 of the lifting assembly 630*a* by the bushing protrusions 716, 736 and is used to vertically move the moving assembly 650*a*. In one embodiment, teeth 738 of the sprocket 722 are sized and configured to engage the flexible drive member 616 so that as the sprocket 722 is rotated, the moving assembly 650*a* may be moved vertically. In a similar fashion, the teeth 738 of the sprocket 724 are sized and configured to engage the flexible drive member 632 so that as the sprocket 724 is rotated, the moving assembly 650*c* in the lifting assembly 630*c* moves in unison with the moving assembly 650*a*. The first side 702 and the second side 704 of the guide member 618 each include a recess 742 through which the flexible drive member 632 travels when the lifting assembly 630 is assembled. Although in the embodiment shown, the flexible drive member 632 only travels through the recess 742 on the second side 704, the recess 742 in the first side 702 is provided so that the same guide member 618 may be used in any of the lifting assemblies 630. For example, when the guide member 618 is used in the lifting assembly 630*c* then the flexible drive member 632 travels through the recess 742 in the first side 702.

The drive shaft 670*b* may be configured similarly to the drive shaft 670*a*. The other drive shafts 670*c*, 670*d* may be provided without the first end 680 protruding through the hole 740 in the cross member 614 since these drive shafts 670*c*, 670*d* are not configured, in this embodiment, to engage a drive member 634 extending between the lifting assemblies 630*c*, 630*d*. It should be appreciated, however, that the drive shafts 670 may be configured in many suitable ways so long as the drive shafts 670 are capable of supporting and moving the moving assemblies 650.

It should be appreciated that the drive mechanism 690 and how the drive mechanism is coupled to the guide member 618 may be altered in a number of ways to provide additional embodiments. For example, in another embodiment, the guide member 618 may be configured to include two opposing holes which receive the drive shaft 670*a*. In this embodiment, the cross member 614 may be configured without the bushing protrusion 736 since the drive shaft 670 is supported entirely by the guide member 618. Also, the cross member 614 may be configured so that the first end section 662 and the second end section 664 do not extend over the face of the guide members 618. Rather, the cross member 614 may be configured to only extend between the guide members 618 and be used to cover the flexible drive member 632. Numerous additional embodiments may also be provided.

With continued reference to FIGS. 87-88, the cross member 614 may be configured to include a top or first side 746, a bottom or second side 748, and a front or face side 750. In this embodiment, the cross member 614 may have a U-shaped cross section to allow the cross member 614 to fit over the flexible drive member 632 and conceal it from view. In another embodiment, the cross member 614 may have a tubular cross section. In this embodiment, the flexible drive member 632 is inserted through the cross member 614 before being engaged with the sprockets 724 on the drive shafts 670*a*, 670*c*. Numerous additional embodiments may also be provided.

In one embodiment, shown in FIGS. 87-88, the first end section 662 of the cross member 614 may be configured to include mounting flanges 744 which are used to couple the cross member 614 to the guide member 618. In one embodiment, the mounting flanges 744 may be formed by bending portions of the top side 746 and the bottom side 748 outward until the portions are perpendicular to the top side 746 and the bottom side 748. Holes 752 may be provided in the mounting flanges 744 which correspond to holes 754 in the guide member. A fastener 756 may be positioned in the corresponding holes 752, 754 to securely couple the cross member 614 to the guide member. Although the fastener 756 is shown as being threaded (e.g., bolt, screw, etc.), it should be understood that other embodiments of fasteners 756 may be used. In other embodiments, the cross member 614 may be coupled to the guide member 618 using welding, brazing, etc.

In one embodiment, shown in FIGS. 87-88, a switch or sensor 758 may be coupled to the guide member 618 to detect when the moving assemblies 650*a*, 651*a* have reached an upper limit. When the upper limit is reach, the switch 758 deactivates the motor 160. In one embodiment, the switch 758 may be a micro switch which shuts off the power to the motor 160 when the micro switch is closed. The switch 758 may be positioned so that the moving member 622 from the moving assembly 651*a*, or, if only one moving assembly is used with the guide member 618, the moving member 620 contacts and closes the switch when the upper limit is reached.

The switch 758 may be coupled to the inside of the guide member 618 using fasteners 760 which extend through holes 762 in the securing flange 710. As shown in FIGS. 87-88, the guide member 618 includes two sets of holes 762 so that the switch 758 may be coupled at various vertical locations on the guide members 618. For example, in situations where only the lower bed 640 is being raised, it may be desirable to couple the switch 758 to the guide member 618 using the uppermost set of holes 762 since the upper bed 641 is not present and, thus, the lower bed 640 may be positioned closer to the ceiling 24. For those situations where both the lower bed 640 and the upper bed 641 are being used, it may be desirable to couple the proximity switch 758 to the guide member 618 using the lower set of holes 762 since additional space may be needed to accommodate both of the beds 640, 641.

Referring to FIGS. 87 and 89, the lower group of components 678 includes a switch or sensor 768, a yoke or tension adjusting assembly 764, and a guard 766. The switch 768 may be configured similarly to the switch 758 used at the upper end 624 of the lifting assembly 630*a* except that the switch 768 detects when the moving assembly 650*a* has reached a lower limit and deactivates the motor 160 accordingly. Holes 770 are provided in the embodiment shown in FIGS. 87 and 89 to couple the switch 768 to the inside of the guide member 618 in a manner similar to how the switch 758 is coupled to the guide member 618. It should be appreciated that multiple sets of the holes 770 may be provided to couple the switch 768 to different locations at the lower end 626 of the guide member 618. In another embodiment, the switches 758, 768 may be slidably coupled to the guide member 618 so that the upper limit and/or lower limit of movement of the moving assemblies 650 may be adjusted as desired. It should be appreciated that due to cost considerations, the switches 758, 768 are typically only included with one of the lifting assemblies 630. However, the switches 758, 768 may also be included with more than one lifting assembly 630 or even all of the lifting assemblies 630 if desired.

It should be appreciated that the moving assemblies 650, 651 may be prevented from moving beyond an upper or lower limit using a number of alternative devices and/or systems. For example, the control system, described previously, may be used to continuously monitor the position of the beds 640, 641 and prevent the beds 640, 641 from moving beyond the upper limit and/or the lower limit. In general, all of the features of the earlier control system may be applicable to the present embodiment.

In the embodiment shown in FIGS. 87 and 89, the yoke assembly 764 includes a mounting bracket 772 and a yoke mechanism 774. The yoke mechanism 774 includes a wheel 776 and a bracket 778. The bracket 778 includes a base 780, a first side 782, and a second side 784. The first side 782 and the second side 784 extend upward from the base 780. The first side 782 and the second side 784 each include a hole 786 which is sized to receive a pin 788. The wheel 776 may be coupled to the bracket 778 by inserting the pin 788 through the hole 786 in the first side 782, through an axial hole 790 in the wheel 776, and on through the hole 786 in the second side, as shown in FIGS. 87 and 89. Once the pin 788 is positioned in the holes 786, 790, a fastening clip 792 may be used to engage a fastening groove 794 in the pin 788 to prevent the pin 788 from coming out of the holes 786, 790. The wheel 776 may be coupled to the bracket 778 so that the wheel 776 can rotate freely relative to the bracket 778. In should be appreciated that the wheel 776 may be coupled to the bracket 778 and/or the mounting bracket 772 in any of a variety of ways.

In the embodiment shown in FIGS. 87 and 89, the flexible drive member 616*a* extends down and around an outer surface 796 of the wheel 776. The position of the wheel may be adjusted up and down to provide the desired amount of tension to the flexible drive member 616*a*. The outer surface 796 of the wheel 776 may include a raised portion 798 which cooperates with the flexible drive member 616*a*, which, in this embodiment, may be a chain, to align the flexible drive member 616*a* in the center of the outer surface 796.

It should be appreciated that various configurations of the wheel 776 may be used to provide the desired tension in the flexible drive member 616*a* and to guide the movement of the flexible drive member 616*a* along the endless path. For example, in another embodiment, the wheel 776 may include teeth which engage the flexible drive member 616*a*. In yet another embodiment, the outer surface 796 may include a groove or channel which is sized so that the flexible drive member 616*a* moves in the groove. The groove may be used to prevent the flexible drive member 616*a* from coming off or becoming misaligned with the wheel 776. Also, the wheel 776 may be made from plastic, metal, composites, or any other suitable material. In one embodiment, the wheel 776 may be made from plastic. Many other suitable configurations may also be used.

With continued reference to FIGS. 87 and 89, the mounting bracket 772 includes a base 804, a first side 806, and a second side 808. The first side 806 and the second side 808 are parallel to each other and extend upward from the base 804. The yoke mechanism 774 may be coupled to the mounting bracket 772 using a fastener 800 which extends through a hole 802 in the base 780 of the bracket 778, extends through a hole 810 in the base 804 of the mounting bracket 772, and engages a nut 812. In one embodiment, the fastener 800 is a bolt which includes a threaded portion which engages a corresponding threaded portion in the nut 812. A washer 814 and a shock absorbing member or bumper 816 may be positioned between the nut 812 and the base 804 of the mounting bracket 772. The shock absorbing member 816 may be used to absorb sudden spikes in the tension of the flexible drive member 616*a* which may occur, for example, when the motor 160 is switched from being activated to deactivated, or vice versa. In one embodiment, the shock absorbing member 816 is made of neoprene. In other embodiments, the shock absorbing member 816 may be made from any suitable material. The tension in the flexible drive member 616*a* may be adjusted by tightening the nut 812 on the fastener 800 to move the yoke mechanism 774 downward.

In one embodiment, the shock absorbing member 816 may be made from an elastomeric material which is capable of absorbing shocks. The shock absorbing member 816 may be shaped like a washer and have sufficient thickness to provide the desired shock absorbing capabilities. In another embodiment, the shock absorbing member 816 may be a metal or plastic spring coupled between the washer 814 and the base 804 of the mounting bracket 772. It should be appreciated that the configuration and materials used for the shock absorbing member 816 may vary widely.

The mounting bracket 772 may be coupled to the lower end 626 of the guide member 618 using holes 818 in the mounting bracket 772 and corresponding holes 820 in the guide member 618. The mounting bracket 772 may be coupled to the guide member 618 by sliding the mounting bracket 772 upward in the channel 714 until the holes 818, 820 are aligned. A fastener 822 may be inserted into the holes 818, 820 to securely couple the mounting bracket 772 to the guide member 618. It should be noted that the second side 808 of the mounting bracket 772 may include a notch 824 to accommodate the switch 768 when both the switch 768 and the mounting bracket 772 are coupled to the guide member 618.

It should be appreciated that the yoke assembly 764 may be varied in a number of ways. For example, the mounting bracket 772 in the yoke mechanism 774 may be configured to slide on a track inside the guide member 618 (e.g., raised portions in the first side 702 and the second side 704 cooperate with grooves or channels in the mounting bracket 772) to allow the tension in the flexible drive member 616*a* to be adjusted. Numerous additional embodiments may also be used.

The guard 766 may be provided to conceal, cover, and/or protect the yoke mechanism 774. For example, the guard 766 may include a cover portion 828 which covers the wheel 776 and extends between the load bearing side 642 and the return side 644 of the endless loop. In this manner, the cover portion 828 may be used to prevent objects from becoming lodged between the flexible drive member 616*a* and the wheel 776.

The guard 766 may be coupled to the guide member 618 in any of a number of suitable ways. In one embodiment, the guard 766 includes three tabs 830 which are configured to be received by corresponding slots 832 in the securing flanges 708, 710 of the guide member 618. In one embodiment, the tabs 830 are configured to be inserted into the slots 832 and then moved downwardly to engage the slots 832. Once the tabs 830 have engaged the slots 832, a fastener 826 may be inserted through a hole 834 in the guard 766 and through a hole 836 in the guide member 618 to securely couple the guard 766 to the guide member 618 and prevent the tabs 830 from moving upwardly and disengaging the slots 832.

Referring to FIGS. 87 and 90, a perspective view of one embodiment of the moving assembly 650*a* is shown. The moving assembly 650*a* includes a coupling device 838, a mounting member or bracket 840, and the moving member 620. The moving member 620 includes a front side or first side 842, a rear side or second side 844, a third side 846, and a fourth side 848. The front side 842 is positioned opposite and parallel to the rear side 844 and the third side 846 is positioned opposite and parallel to the fourth side 848 so that the moving member 620 has a box shape with a passage or hollow portion 845 in the center. As shown in FIG. 87, the moving member 620 may be sized to move in the channel 714 defined by the guide member 618. In this embodiment, the front side 842 is configured to move adjacent to the securing flanges 708, 710 of the guide member 618, and the rear side 844 is configured to move adjacent to the base 706 of the guide member 618.

It should be appreciated that the configuration of the moving member 620 may be varied in a number of ways. For example, in one embodiment, the moving member 620 may be shorter or longer lengthwise than what is shown in FIGS. 87 and 90. In another embodiment, the moving member 620 may be made from plastic material. In yet another embodiment, the moving member 620 may be made from steel material. In general, the moving member 620 may have any configuration which is suitable to cooperate with the guide member 618 to move and/or support the lower bed 640.

In one embodiment, wear guides 850 may be coupled to the moving member 620. The wear guides 850 contact the interior surfaces of the guide member 618 (e.g., interior surfaces of the first side 702, the second side 704, the base 706, and/or the securing flanges 708, 710) as the moving member 620 moves in the channel 714. The wear guides 850 may be used to reduce the wear and/or friction between the moving member 620 and the guide member 618 as the moving member 620 moves vertically.

In one embodiment, the wear guides 850 may be made from a durable plastic material such as a thermoplastic urethane material. In one embodiment, the wear guides 850 may be made using TEXIN 270, available from General Polymers, 4860 Joliet St., Denver, Colo. 80239. In other embodiments, the wear guides 850 may be made using any suitable materials including composites, metal, plastic, or any other material capable of reducing friction and/or wear.

The wear guides 850 may be coupled to the moving member 620 in a number of ways. For example, in one embodiment, each of the wear guides 850 may be configured to include a flat base portion and a cylindrical protrusion portion. The moving member 620 may be provided with a number of holes which are sized to securely receive the protrusion portion. The protrusion portions of the wear guides 850 may be inserted into the holes until the base portion is flush with the moving member 620. The protrusion portions may be slightly oversized so that once the protrusion portions are in the holes, the wear guides 850 are secured in place. In use, the base portion of the wear guides 850 move adjacent to and in contact with the interior surfaces of the guide member 618. Numerous other ways may be used to couple the wear guides 850 to the moving member 620 such as by using fasteners, injection molding the wear guide 850 to the moving member 620, and the like.

The mounting member 840 is generally used to support the lower bed 640 and to couple the lower bed 640 to the front side 842 of the moving member 620. The mounting member 840 may be positioned on the front side 842 of the moving member 620 so that the mounting member 840 extends through the gap 712 between the securing flanges 708, 710 of the guide member 618 as the moving member 620 moves vertically.

In one embodiment, the mounting member 840 includes a mounting or first portion 854, which includes an opening 852, and a side or second portion 856. The side portion 856 may be coupled to the front side 842 of the moving member 620 using fasteners 858 which extend through holes 860 in the side portion 856 and engage holes 862 in the front side 842 of the moving member 620. In one embodiment, shown in FIGS. 87 and 90, the mounting member 840 may be an L-shaped bracket which includes the opening 852. In other embodiments, the mounting member 840 may be a plate, a box, etc. Also, the mounting member 840 may be made from plastic, metal, composites and the like.

In one embodiment, the position of the mounting member 840 and/or the mounting portion 854 may be adjusted relative to the moving member 620. For example, in one embodiment, the mounting member 840 may be inverted and coupled to the moving member 620 so that the mounting portion 854 is positioned below the side portion 856. In another embodiment, additional holes 862 may be provided in the moving member 620 to allow the mounting member 840 to be coupled to the moving member 620 at multiple locations. In yet a further embodiment, the mounting member 840 may be slidably coupled to the moving member 620 using a track. Thus, the position of the mounting member 840 may be adjusted relative to the moving member 620 as desired.

The mounting member 840 may be used to couple the lower bed 640 to the moving assembly 650*a*. There are numerous ways that this may be accomplished. One embodiment of an arrangement for coupling the lower bed 640 to the moving assembly 650*a* is shown in FIGS. 92-93. FIG. 92 shows the mounting member 840 decoupled from the lower bed 640, and FIG. 93 shows the mounting member 840 coupled to the lower bed 640. As shown in FIGS. 92-93, the bed frame 54 may include a mounting member 864 which includes an opening 866. The moving assembly 650*a* may be coupled to the lower bed 640 by aligning the opening 852 in the mounting portion 854 of the mounting member 840 with the opening 866 in the mounting member 864 and inserting a pin 868 through the openings 852, 866. The pin 868 may include a hole 870 which receives a fastening clip 872 to prevent the pin 868 from coming out of the openings 852, 866.

It should be appreciated that the lower bed 640 may be coupled to the moving assembly 650*a* in a number of suitable ways. For example, in another embodiment, the pin 868 may be included as part of the bed frame 54. In another embodiment, the pin 868 may be included as part of the mounting member 840. The opening 866 in the bed frame 54 may receive the pin 868.

In yet another embodiment, the moving member 620 may be coupled to the lower bed 640 without the use of the mounting member 840. For example, a cross member may be provided which extends between the front side 842 and the rear side 844 of the moving member 620 and between the load bearing side 642 and the return side 644 of the flexible drive member 616*a*. The cross member may be positioned at the top of the moving member 620 and may include an opening 852. The mounting member 864 on the bed frame 54 may be configured to extend through the gap 712 in the guide member 618 so that the opening 852 in the cross member and the opening 866 in the mounting member 864 may be aligned. The pin 868 may be inserted through the openings 852, 866 to couple the moving member 620 to the lower bed 640. Numerous other embodiments may be provided to couple the moving assembly 650*a* to the lower bed 640 including some embodiments which may use complex coupling mechanisms.

As shown in FIGS. 90, 92-93, the opening 852 in the mounting portion 854 of the mounting member 840 may be oversized to compensate for variations in the width of the side walls 16, 18 as the lower bed 640 moves vertically. By oversizing the opening 852, the pin 868 may be able to move towards and away from the first side wall 16 as the lower bed 640 moves vertically.

It should be appreciated that the variations in the width between the side walls 16, 18 as the lower bed 640 moves vertically may be accounted for in a number of ways. FIG. 94 shows a front view of the system 12 which includes another embodiment for accounting for the width variations between the side walls 16, 18. As shown in FIG. 94, the moving members 620, 622 may be configured so that there is sufficient space 874 provided to allow the moving members 620, 622 to move back and forth between the base 706 and the securing flanges 708, 710 of the guide member 618 to compensate for the variation in width. Thus, as the moving members 620, 622 move vertically, variations in the distance between the side walls 16, 18 may be accounted for by the moving members 620, 622 moving towards and away from the base 706 of the guide member 618.

It should be appreciated that numerous embodiments may be used to compensate for the width variations between the side walls 16, 18. For example, the many ways described previously in connection with FIGS. 43-44 may also be used. In one embodiment, the frame members of the bed frame 54 which extend between the side walls 16, 18 may be configured to telescope in and out as the lower bed 640 is raised and lowered. Numerous additional embodiments may also be provided.

Figure 96:
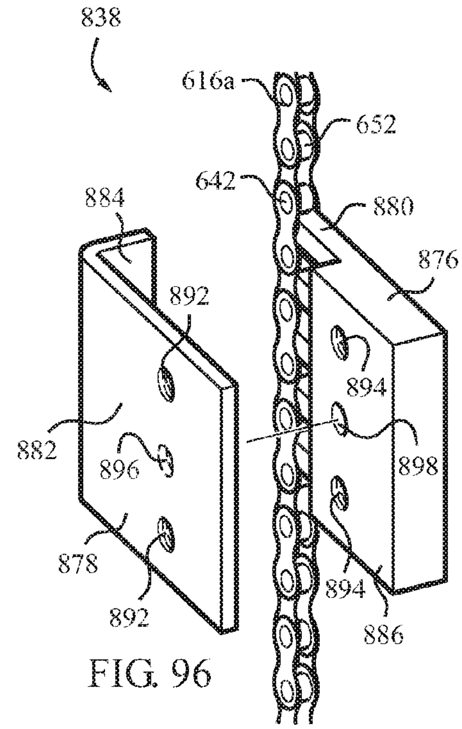
Figure 97:
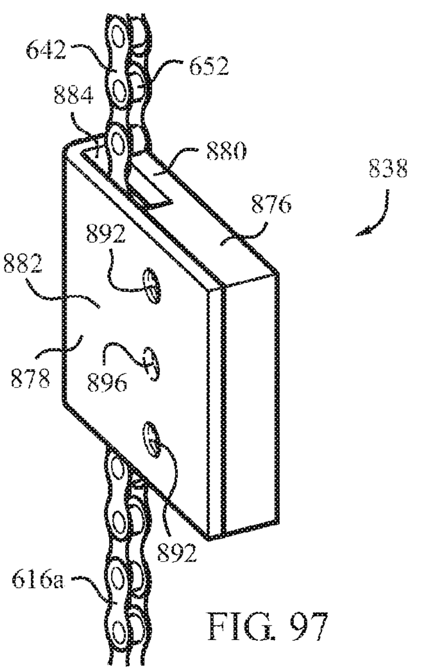
Figure 98:
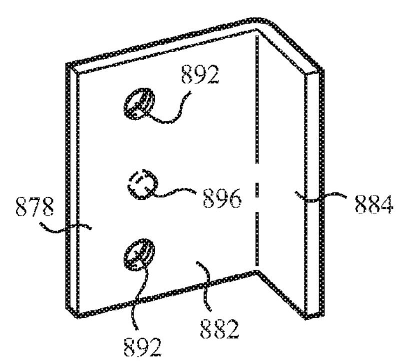

Referring back to FIGS. 87 and 90, the coupling device 838 may be used to couple the moving assembly 650*a* to the flexible drive member 616*a*. Additional views of the embodiment of the coupling device 838 in FIGS. 87 and 90 are shown in FIGS. 95-98. In this embodiment, the coupling device 838 includes an engaging member 876 and a retaining member 878. The engaging member 876 includes a plurality of fingers 880 which engage the flexible drive member 616*a*. In one embodiment, the flexible drive member 616*a* is a roller chain and the fingers 880 extend through the links of the roller chain, as shown in FIG. 96. Once the fingers have engaged the flexible drive member 616*a*, the retaining member 878 is coupled to the engaging member 876 to prevent the flexible drive member 616*a* from disengaging from the engaging member 876, as shown in FIG. 97. In one embodiment, the retaining member 878 is L-shaped and includes a first side 882 and a second side 884 which are perpendicular to each other. When the retaining member 878 is coupled to the engaging member 876, the second side 884 is positioned over the ends of the fingers 880 to prevent the flexible drive member 616*a* from coming off the fingers 880.

The coupling device 838 may be coupled to the moving member 620 in any of a number of suitable ways. For example, in one embodiment, the first side 882 of the retaining member 878 may be coupled on one side to the moving member 620. As shown in FIGS. 87 and 90, the coupling device 838 may be configured to be coupled to the inside of the moving member 620. This may be done using a fastener 888, which may be a screw, bolt, etc. which passes through holes 890 in the moving member 620 and holes 892 in the first side of the retaining member 878 and engages holes 894 in the first side 886 of the engaging member 876. For ease of assembly, the first side 882 of the retaining member 878 may include a projection 896 which extends into a corresponding recess 898 in the first side 886 of the engaging member 876 when the retaining member 878 and the engaging member 876 have been assembled. This may assist in aligning the holes 892 in the retaining member 878 with the holes 894 in the engaging member 876 to receive the fastener 888.

In one embodiment, the coupling device 838 may be configured to be coupled to either of the two vertical lengths of the flexible drive member 616*a*. For example, the load bearing side 642 and the return side 644 of the flexible drive member 616*a* may be reversed by coupling the moving member 620 to what was formerly the return side 644. In one embodiment, this may be done by inverting the coupling device 838 so that the fingers 880 face the opposite direction as shown in FIGS. 87, 90, and 97-98. The fingers 880 may then engage what was formerly the return side 644.

It should be appreciated that many additional embodiments of the coupling device 838 may be used. For example, in one embodiment, the coupling device 838 may be a bolt which extends through the moving member 620 and the flexible drive member 616*a*. In another embodiment, multiple coupling devices 838 may be used. For example, each end of the flexible drive member 616*a* may be coupled to the moving member 620 using a coupling device 838. Also, as shown in FIGS. 99-101, the coupling device 838 may include an intermediate member 900 which may be coupled between the retaining member 878 and the engaging member 876. In this embodiment, the retaining member 878, the engaging member 876, and the intermediate member 900 may be stamped out of steel material using conventional metal stamping techniques. Of course, the coupling device 838 may be made from any of a number of suitable materials such as plastic, metal, composites, etc. using any of a number of suitable techniques such as injection molding, casting, etc.

In addition, it should be appreciated that the coupling device 838 may be used to couple the flexible drive member 616*a* to the moving member 620 at any of a number of suitable locations. For example, in one embodiment, the flexible drive member 616*a* may be coupled to third side 846 of the moving member 620. In another embodiment, the load bearing side 642 and the return side 644 may be reversed so that the flexible drive member 616*a* may be coupled to the fourth side 848 of the moving member 620. In yet another embodiment, the flexible drive member 616*a* may be coupled to the rear side 844 of the moving member 620.

Referring to FIG. 91, a perspective view of one embodiment of the moving assembly 651*a* is shown. FIGS. 85 and 87 also provide additional views showing the moving assembly 651*a* in cooperation with the guide member 618. In general, the moving assembly 651*a* may be coupled to the upper bed 641 so that the upper bed 641 moves with the moving assembly 651*a*. In this embodiment, the moving assembly 651*a* includes the mounting member 840 coupled to the moving member 622.

The moving member 622 includes a front or first side 902, a rear or second side 904, a third side 906, and a fourth side 908. The front side 902 is positioned opposite and parallel to the rear side 904 and the third side 906 is positioned opposite and parallel to the fourth side 908 so that the moving member 622 has a box shape with a passage or hollow portion 905 in the center. The moving member 622 is also sized to move inside the channel 714 of the guide member 618 in a manner similar to the moving member 620. In order to reduce friction and/or wear between the moving member 622 and the guide member 618, the wear guides 850 may also be coupled to the moving member 622, as shown in FIG. 91.

Referring back to FIG. 85, the moving assemblies 650*a*, 651*a* may be configured to vertically move the lower bed 640 and the upper bed 641 by sliding in cooperation with the interior of the guide member 618. As shown in FIG. 85, the flexible drive member 616*a* extends through the passages 845, 905 of the moving members 620, 622, respectively. The flexible drive member 616*a* is coupled to the moving member 620 so that the moving member 620 moves as the flexible drive member 616*a* moves. In this embodiment, the moving member 622 may be configured to move independently of the flexible drive member 616*a*.

In one embodiment, a drive assembly may be used to move the beds 640, 641 vertically between the use configuration 610 and the stowed configuration 612. The drive assembly includes those components which are used to drive the vertical movement of the beds 640, 641. For example, in this embodiment, the drive assembly includes the flexible drive members 616, 632, 638, the drive member 634, the drive mechanisms 690, and the motor assembly 636.

With continued reference to FIG. 85, in one embodiment, the drive assembly may be used to vertically move the beds 640, 641 from the use configuration 610 to the stowed configuration 612. This may be done by raising the lower bed 640 while the upper bed 641 is stationary until the lower bed 640 and the upper bed 641 are positioned adjacent to each other in an intermediate configuration. As the lower bed 640 moves, the moving member 620 slides upward inside the channel 714 of the guide member 618 until the moving member 620 is positioned adjacent to the moving member 622. In general, the beds 640, 641 move together from the intermediate configuration to the stowed configuration 612. In one embodiment, the moving member 620 may contact the moving member 622 so that the beds 640, 641 are moved together but do not contact each other. In another embodiment, the lower bed 640 may contact the upper bed 641 so that the beds 640, 641 are moved together. In this manner, the lower bed 640 may be used to move the upper bed 641 from the use configuration 610 to the stowed configuration 612.

In one embodiment, as shown in FIG. 91, the moving member 622 may include a recess 910 to prevent the moving member 620 from contacting the moving member 622 in the area that is exposed by the gap 712 between the securing flanges 708, 710 of the guide member 618. This may prevent foreign objects from becoming lodged between the moving members 620, 622 and/or prevent a user's fingers from being pinched.

The mounting member 840 is used to couple the upper bed 641 to the moving assembly 651*a*. The mounting member 840 may be identical to or interchangeable with the mounting member 840 in the moving assembly 650*a*. Using interchangeable components may make it easier to manufacture and/or inventory the moving assemblies 650, 651 and their associated components. The mounting member 840 may be coupled to the moving member 622 in a manner similar to how the mounting member 840 is coupled to the moving member 620. Accordingly, the fasteners 858 may extend through the holes 860 of the mounting member 840 and engage the holes 912 in the front side 902 of the moving member 622.

As shown in FIG. 90, the rear side 844 of the moving member 620 includes flanges 914, 916 which extend from the third side 846 and the fourth side 848 toward each other to form a gap 918. Also, as shown in FIG. 91, the rear side 904 of the moving member 622 includes flanges 920, 922 which extend from the third side 906 and the fourth side 908 toward each other to form a gap 924.

In one embodiment, the gap 918 in the rear side 844 of the moving member 620 is wider than the gap 924 in the rear side 904 of the moving member 622. Referring to FIG. 102, a stop 926 may be coupled to the base 706 of the guide member 618. The gap 918 may be wide enough to allow the moving member 620 to pass by the stop 926 while the gap 924 is too small to allow the moving member 622 to pass by. Thus, as the beds 640, 641 are moved from the stowed configuration 612 to the use configuration 610, the moving member 620 is able to pass by the stop 926 while the flanges 920, 922 of the moving member 622 engage the stop 926. With the flanges 920, 922 resting on the stop 926, the upper bed 641 may be securely supported in the use position.

It should be appreciated that the upper bed 641 may be supported in the use configuration 610 in a number of other ways as well. For example, in one embodiment, the upper bed 641 may be supported in a manner similar to that shown in FIGS. 55-56. Also, the movement of the upper bed 641 may be guided using the bed frame 54 of the upper bed 641 in a manner similar to that shown in FIGS. 55-56. Thus, because the upper bed 641 is guided using the bed frame 54, the moving assemblies 651 may be omitted. In another embodiment, the upper bed 641 may be supported using stops coupled to the outside of the guide member 618. Numerous other configurations may also be used.

In one embodiment, the stop 926 may be coupled to the base 706 of the guide member 618 at any one of a number of locations in order to adjust the use position of the upper bed 641. For example, the guide member 618 may include multiple holes 928 in the base 706 which may be used to couple the stop 926 to the guide member 618. In one embodiment, the stop 926 may be coupled to the guide member 618 using fasteners 930 which may be inserted through holes 936 in the stop 926 and the holes 928 in the guide member 618.

It should be appreciated that the holes 928 may be provided in a number of suitable configurations. For example, in one embodiment, the holes 928 may be extruded to form a protrusion 934 which extends into the channel 714 of the guide member 618. The protrusion 934 may provide a sufficient amount of material defining the hole 928 to enable the hole 928 to be threaded. The stop 926 may include corresponding holes 932 which are configured to receive the protrusion 934 so that the stop 926 is flush with the base 706 of the guide member 618. In other embodiments, the holes 928 may be flush with the base 706 and/or configured without threads. In these embodiments, the stop 926 may be coupled to the guide member 618 using fasteners which extend through the holes 936, 928 and into the corresponding side wall 16, 18 of the vehicle 10. It should be appreciated that any suitable fastener may be used such as bolts, screws, anchors, and the like.

In one embodiment, shown in FIG. 102, some of the holes 928 may include the threaded protrusions 934 and some of the holes 928 may not. Typically, the holes 928 with the threaded protrusions 934 may be provided in locations which correspond to some of the more common use positions of the upper bed 641. Also, the holes 928 without the threaded protrusions 934 may be provided to locations which correspond to some of the less common use positions of the upper bed 641. In another embodiment, the holes 928 with or without the protrusions 934 may be used at any suitable location in the guide member 618.

With continued reference to FIG. 102, in another embodiment, the holes 928 may be provided near the upper end 624 of the guide member 618 to support the lower bed 640 and/or the upper bed 641 in the stowed position. For example, in one embodiment, the upper bed 641 may be configured to remain in the stowed position when the lower bed 640 is in the use position by coupling the stop 926 to the upper end 624 of the guide member 618. In another embodiment, the stop 926 may be configured to be wider than the gap 918 in the moving member 620. In this embodiment, the stop 926 may be coupled to the upper end 624 of the guide member 618 when the beds 640, 641 are in the stowed configuration to prevent the beds 640, 641 from being lowered. This may be desirable, for instance, when the vehicle 10 is transported a long distance and/or stored.

Referring to FIG. 103, a perspective view is shown of another arrangement which may be used to support the upper bed 641 in the use position. In this embodiment, the stop 926 may be coupled to the inside surface of the second side 704 of the guide member 618. In this embodiment, the distance between the third side 846 and the fourth side 848 of the moving member 620 is less than the distance between the third side 906 and the fourth side 908 of the moving member 622. Thus, when the moving member 620 is positioned in the guide member 618, there is a space 938 between the moving member 620 and the first side 702 and/or the second side 704 of the guide member 618. The space 938 can be seen in FIG. 105 which shows a downward looking cross sectional view of the guide member 618 from FIG. 103 along the line 105-105. The space allows the moving member 620 to move past the stop 926. In contrast, the moving member 622 is configured to fit in the guide member 618 without any space for side to side movement between the first side 702 and/or the second side 704. This can be seen in FIG. 104, which shows an upward looking cross sectional view of the guide member 618 from FIG. 103 along the line 104-104. Because the moving member 622 moves in close cooperation with the first side 702 and the second side 704 of the guide member 618, the fourth side 908 of the moving member 622 catches on or engages the stop 926 to prevent further downward movement of the moving member 622. In this manner, the upper bed 641 may be securely supported in the use position.

The moving member 620 may include guide flanges 940 coupled to the fourth side 848 of the moving member 620. The guide flanges 940 extend outward from the fourth side 848 in a direction which is angled slightly toward the interior of the channel 714 of the guide member 618. The guide flanges 940 may be used to prevent the moving member 620 from catching on the stop 926.

In another embodiment, the system 12 may be configured to move between the use configuration 610, the stowed configuration 612, and a third configuration where the upper bed 641 is in the stowed position and the lower bed 640 is in the use position. In this embodiment, the upper bed 641 may be configured to remain in the stowed position when the lower bed 640 is positioned to be used for sleeping thereon.

Referring to FIGS. 85, 87, and 91, one embodiment is shown where the upper bed 641 may remain in the stowed position while the lower bed is used for sleeping. In this embodiment, the moving member 622 includes a notch or recess 942 in both the third side 906 and the fourth side 908. The guide member 618 includes holes 944 in both the first side 702 and the second side 704, which are used to receive a pin or stop member 946, as shown in FIG. 106. When the upper bed 641 is in the stowed position, the pin 946 may be inserted through the holes 944, as shown in FIG. 107, so that when the lower bed 640 is lowered, the pin 946 engages the notch 942 in the moving member 622, as shown in FIG. 108.

It should be appreciated that the configuration of the holes 944 and the pin 946 may vary widely. For example, the holes 944 in FIGS. 85 and 87 are square while the holes 944 in FIG. 106 are keyhole shaped and include a wide portion 948 and a narrow portion 950. Also, the pin 946 may be any of a number of suitable configurations. In one embodiment, the pin 946 may include a body 952 and securing end 954 as shown in FIG. 106. When used with the keyhole shaped holes 944, the body 952 of the pin 946 may be received in the narrow portion 950 of the holes 944, as shown in FIG. 107. The securing end 954 of the pin 946 prevents the pin 946 from coming out of the keyhole shaped holes 944 because the securing end 954 is larger than the narrow portion 950 of the holes 944. In another embodiment, the pin 946 may be a nail. Numerous other embodiments may also be used to support the upper bed 641 in the use position.

Referring to FIGS. 109-110, another embodiment of the lifting assembly 630*a* is shown. FIG. 109 shows an assembled perspective view of the lifting assembly 630*a*, and FIG. 110 shows an exploded perspective view of the lifting assembly 630*a*. In many respects, the lifting assembly 630*a* shown in FIGS. 109-110 is similar to the lifting assembly 630*a* shown in FIG. 85. Accordingly, much of the description of the lifting assembly 630*a* shown in FIG. 85 applies to this embodiment as well. However, in this embodiment, the flexible drive member 616*a* has a first end 956 coupled to the moving assembly 650*a* and a second end 958 coupled to the drive mechanism 690. The second end 958 is configured to wrap on a spool, drum, or cylinder 960 which is coupled to and rotates with the drive shaft 970*a*.

In the embodiment shown in FIGS. 109-110, the flexible drive member 616*a* is a strap which wraps on the spool 960 to raise the beds 640, 641. The strap may be made from any suitable material such as nylon, polymeric materials, fabric, or any other suitable material. It may be desirable to provide a strap which is strong and thin so that the strap can carry the weight of the beds 640, 641 and so that the increase in the diameter of the strap wrapped on the spool 960 is minimized. As the diameter of the strap on the spool 960 increases, the speed at which the beds 640, 641 move increases. If the diameter of the strap on the spool 960 becomes too large, the motor 160 may become overworked. It should be appreciated that the flexible drive member 616*a* may be any suitable material which is capable of wrapping on the spool 960. For example, in another embodiment, the flexible drive member 616*a* may be a cable.

In one embodiment, the first end 956 of the flexible drive member 616*a* may be coupled to the moving assembly 950*a* so that the position of the flexible drive member 616*a* may be adjusted relative to the moving assembly 950*a*. Thus, the corners of the lower bed 640 may be adjusted independently to level the lower bed 640. In one embodiment, the moving member 620 may include multiple holes which are used to couple the first end 956 of the flexible drive member 616*a* to the moving assembly 650*a* at any one of multiple locations. In another embodiment, the first end 956 of the flexible drive member 616*a* may be slidably coupled to the moving assembly 650*a*. Numerous other embodiments may also be provided.

FIGS. 111-112 show another embodiment of the lifting assembly 630*a*. The lifting assembly 630*a* shown in this embodiment is similar in many respects to the lifting assembly 630*a* shown in FIG. 85. Thus, much of the description of the lifting assembly 630*a* shown in FIG. 85 is also applicable to this embodiment. FIGS. 111-112 are provided to illustrate the use of an endless toothed belt as the flexible drive member 616*a*. It should be noted that in FIGS. 111-112, the load bearing side 642 and the return side 644 of the endless loop have been switched relative to the embodiment shown in FIG. 85. In this sense, the embodiment shown in FIGS. 111-112 is configured similar to the flexible drive member 616*a* in FIG. 81.

As shown in FIGS. 111-112, the sprockets 722, 724 include teeth which cooperate with the teeth of the toothed belt to vertically move the moving assembly 650*a*. At the lower end 626 of the lifting assembly 630*a*, the toothed belt moves in a groove 775 in the wheel 776. Thus, the sprockets 722, 724 and the wheel 776 serve to guide the movement of the flexible drive member 616*a* along the endless path.

Referring to FIG. 113, a cut-away perspective view is shown of another embodiment of the lifting assembly 630*a*. The lifting assembly 630*a* shown in this embodiment is also similar in many ways to the lifting assembly 630*a* shown in FIG. 85. However, in this embodiment, the load bearing portion 652 and the return portion 654 of the flexible drive member 616*a* may be provided using different types of flexible drive members. Because the beds 640, 641 reciprocate between the use configuration 610 and the stowed configuration 612, the return portion 654 of the flexible drive member 616*a* may not be engage the first sprocket 722 at any point during the total range of movement of the beds 640, 641. Thus, since the return portion 654 may not cooperate with the first sprocket 722, the return portion 654 may be provided using another, potentially less costly, flexible drive material such as a cable. For example, in the embodiment shown in FIG. 113, the load bearing portion 652 may be a chain (e.g., roller chain) which cooperates with the first sprocket 722 in the drive mechanism 690, and the return portion 654 may be a cable.

In the embodiment shown in FIG. 113, the load bearing portion 652 of the flexible drive member 616*a* is provided by coupling one end of the chain to the moving member 620 and wrapping the chain over the first sprocket 722. The load bearing portion 652 should be long enough to allow the chain to engage the first sprocket 722 over the full range of motion of the beds 640, 641. The chain in the load bearing portion 652 is coupled to the cable in the return portion 654 using a connector 962. The connector 962 may be any suitable device or structure which is capable of connecting the different types of flexible drive members together. In the embodiment shown in FIG. 113, the cable is coupled to the chain by passing the cable through a link of the chain. The cable in the return portion 654 is configured to wrap around the pulley 964 in the pulley or yoke assembly 966 at the lower end 626 of the lifting assembly 630*a* and extend to where the cable is coupled to the moving member 620. In addition to guiding the movement of the flexible drive member 616*a*, the pulley assembly 966 may also be used to adjust the tension in the flexible drive member 616*a*.

It should be appreciated that additional embodiments using two different types of flexible drive members may also be used. For example, in another embodiment, the load bearing portion 652 may be a toothed belt (e.g., polyurethane belt) and the return portion 654 may be a strap (e.g., nylon). In this embodiment, the toothed belt may be sewn to the strap or coupled to the strap in any suitable manner. Numerous additional embodiments may also be used.

Referring to FIG. 114, a cut-away perspective view of another embodiment of the lifting assembly 630*a* is shown. In this embodiment, a cover, cover member, or concealing member 968 is coupled to the guide member 618 so that the cover 968 fills or covers the gap 712 between the securing flanges 708, 710 to conceal the components such as the flexible drive member 616*a* inside the guide member 618. Thus, the cover 968 may be used to provide a more aesthetically appealing appearance to the lifting assembly 630*a*.

In the embodiment shown in FIG. 114, the cover 968 is coupled to the securing flanges 708, 710 at the upper end 624 and the lower end 626 of the guide member 618. The cover 968 includes securing plates 970, 972 coupled to each end of a strap 973. The securing plates 970, 972 are sized to extend between and be coupled to the securing flanges 708, 710. The securing plates 970, 972 may be coupled to the securing flanges 708, 710 using any suitable fastener such as a bolt, screw, etc. As shown in FIG. 114, the securing plate 970 may be coupled to the upper end 624 of the guide member 618 and the securing plate 972 may be coupled to the lower end 626 of the guide member 618. The securing plate 972 includes elongated holes 974 which receive a fastener used to couple the securing plate 972 to the guide member 618. The elongated holes 974 may be provided to allow the tension in the cover 968 to be adjusted. For example, the tension in the cover 968 may be increased by sliding the securing plate 972 downward and tightening the fastener to secure the securing plate 972 to the guide member 618.

With continued reference to FIG. 114, the cover 968 may be slightly wider than the gap 712 between the securing flanges 708, 710. The cover 968 may also be positioned just inside the guide member 618. In another embodiment, the cover 968 may be positioned on the outside of the guide member 618. In one embodiment, the cover 968 extends through the passages 845, 905 in the moving members 620, 622, respectively. Thus, when the moving members 620, 622 move vertically, the cover 968 moves adjacent to and, potentially, in contact with the inside surface of the front sides 842, 902 of the moving members 620, 622, respectively. In one embodiment, the flexible drive member 616*a* may be coupled to the rear side 844, the third side 846, and/or the fourth side 848 of the moving member 620 in order to allow the cover 968 to move adjacent to the front side 842 of the moving member 620. In another embodiment, the mounting member 840 may be coupled to the front sides 842, 902 of the moving members 620, 622 without a fastener extending through the front sides 842, 902 and interfering with the movement of the cover 968 (e.g., mounting member 840 is welded to front sides 842, 902 of the moving members 620, 622, or the fastener is flush with the inside surface of the front sides 842, 902 of the moving members 620, 622).

It should be appreciated that numerous additional embodiments of the cover 968 may be provided. Also, the cover 968 may be made from a number of suitable materials such as fabric, nylon, polymeric material, and the like. The cover 968 may also include a number of aesthetically pleasing patterns or designs which may match the decor of the area where the system 12 is being used.

Referring to FIGS. 115-117, another embodiment of the system 12 is shown. FIGS. 115-116 show perspective views of the lifting assemblies 630. FIG. 117 shows an exploded view of the lifting assembly 630*a*. This embodiment is similar in many ways to the embodiment shown in FIGS. 81-82 and 87. Accordingly, many of the principles discussed in connection with the embodiment shown in FIGS. 81-82 and 87 are equally applicable to the embodiment shown in FIGS. 115-117.

In the embodiment shown in FIGS. 115-117, the flexible drive members 616*a*, 616*b* form an endless loop, and the flexible drive members 616*c*, 616*d* do not form an endless loop. The flexible drive members 616*c*, 616*d* are coupled to the moving assemblies 650*c*, 650*d* and extend upward to the upper end 624 of the lifting assemblies 630*c*, 630*d*, respectively. The flexible drive members 616*c*, 616*d* wrap around a rotatable member, pulley, or sheave 629 at the upper end 624 of the lifting assemblies 630*c*, 630*d* and extend across to the lifting assemblies 630*a*, 630*b*, respectively. The cross members 614 may be used to conceal the flexible drive members 616*c*, 616*d* where they extend between the lifting assemblies 630*a*, 630*c* and the lifting assemblies 630*d*, 630*b*, respectively. Once the flexible drive members 616*c*, 616*d* reach the lifting assemblies 630*a*, 630*b*, the flexible drive members 616*c*, 616*d* wrap around another rotatable member, pulley, or sheave 723 and extend downward to a location 665, 667 where the flexible drive members 616*c*, 616*d* are coupled to the return sides 644 of the flexible drive members 616*a*, 616*b*, respectively.

The flexible drive members 616*c*, 616*d* are coupled to the return sides 644 of the flexible drive members 616*a*, 616*b*, respectively, so that when the motor 160 is activated, the moving assemblies 650 move in the same direction. For example, when the motor 160 is activated to raise the moving assembly 650*a*, the load bearing side 642 of the flexible drive member 616*a* moves lengthwise in an upward direction, which causes the moving assembly 650*a* to also move upward. At the same time, the return side 644 of the flexible drive member 616*a* moves lengthwise in a downward direction. Since the flexible drive member 616*c* is coupled to the return side 644 of the flexible drive member 616*a*, the length of the flexible drive member 616*c* in the lifting assembly 630*c* becomes shorter which causes the moving assembly 650*c* to also move upward. When the motor 160 is activated to lower the moving assemblies 650, the moving assemblies 650*a*, 650*b* are affirmatively moved downward due to the movement of the endless loop to which they are coupled. The moving assemblies 650*c*, 650*d*, however, move downward due to the effects of gravity. In this sense, the embodiment shown in FIGS. 115-117 can be thought of as a hybrid since two moving assemblies 650*c*, 650*d* move downward by gravity and the other two moving assemblies 650*a*, 650*b* are affirmatively moved downward.

One advantage to the embodiment of the system 12 shown in FIGS. 115-117 is that the amount of flexible drive material can be reduced since the flexible drive members 616*c*, 616*d* do not form endless loops and the flexible drive members 632, 638 have been eliminated. In addition, the flexible drive members 616*c*, 616*d* may be made from a lower cost flexible drive material (e.g., a cable, strap, and the like) than the flexible drive material used in the flexible drive members 616*a*, 616*b*. It should be appreciated that numerous other flexible drive materials may also be used (e.g., roller chain, etc.). Further, it should be appreciated that additional advantages may be realized from the configuration shown in FIGS. 115-117

The cross member 614 may have any of a number of suitable configurations. The cross member 614 may be configured similarly to the cross member 614 shown in FIGS. 81-82, or, as shown in FIGS. 115-117, the cross member 614 may be configured to have a smaller cross-section. The cross member 614 may be a tube or may have an open channel shape like what is shown in FIGS. 115-117.

Referring to FIG. 117, each lifting assembly 630 may include a cover member 735, which is similar to the first end section 662 and/or the second end section 664 of the embodiment of the cross member 614 shown in FIGS. 83-84. The cover member 735 is coupled to each lifting assembly 630 and supports the drive shaft 670. The cover member 735 includes an opening 737 that the flexible drive member 616*c*, 616*d* can pass through to extend between the lifting assemblies 630*a*, 630*c* and the lifting assemblies 630*b*, 630*d*, respectively. The cross member 614 may include mounting flanges 745, which include holes 747. The cross member 614 may be coupled between the lifting assemblies 630 by aligning the holes 747 with the holes 752 in the mounting flange 744 and the holes 754 in the guide member 618 and inserting a fastener such as a bolt or screw through the holes 747, 752, 754. It should be appreciated that the configuration of the cover member 735 and cross member 614 may be varied in a number of ways from what is shown in FIGS. 115-117.

Referring to FIGS. 115-117, an idler assembly 777 may be positioned at the lower end 626 of the lifting assemblies 630*a*, 630*b*. The idler assembly 777 includes a cover member 663, the first bearing 726, the second bearing 728, and an idler shaft 673 with a sprocket 725 mounted thereon—the sprocket may alternatively be referred to herein as a rotatable member, rotatable wheel, or toothed wheel. The cover member 663 is similar in many respects to the cover member 735 and the end sections 662, 664 of the cross member 614 shown in FIGS. 83-84. However, the cover member 663 includes a bushing recess 739 in place of the bushing protrusion 736 on the cover member 735. The bushing recess 739 may be used to minimize the distance that the lifting assemblies 630 protrude into the cargo area 28 of the vehicle 10. The cover member 663 may be coupled to the guide member using holes 755. It should be appreciated that the cover member 663 may also be configured to include a bushing protrusion 736 or have any of a number of suitable configurations.

The bushing recess 739 and the bushing protrusion 717 each include a hole 741, 719, respectively. The holes 741, 719 are sized to receive the bearings 726, 728 therein. The idler shaft 673 is sized to be securely received in the holes 732, 734 of the bearings 726, 728. Thus, the idler assembly 777 provides a secure mounting location for the sprocket 725.

It should be appreciated that the idler assembly 777 may be replaced with the yoke assembly 764 or any other suitable assembly. It may be desirable to use the idler assembly to provide additional strength to the lifting assemblies 630*a*, 630*b* because the weight on the flexible drive members 616*c*, 616*d* is translated to the flexible drive members 616*a*, 616*b* as upward tension on the return side 644 of the flexible drive members 616*a*, 616*b*. It should also be appreciated that the idler assembly 777 may be provided in the form of a yoke assembly that allows the tension on the flexible drive members 616*a*, 616*b* to be adjusted. For example, the bushing protrusion 717 may be coupled to the guide member 618 in a manner that allows it to be moved vertically (e.g., bushing protrusion 717 may be coupled to the guide member 618 using a bolt in a slotted hole, etc.). The cover member 663 may also be coupled to the guide member 618 in a manner that allows it to move vertically (e.g., holes 755 in the guide member may be slotted, etc.). Thus, the tension on the flexible drive members 616*a*, 616*b* may be adjusted by adjusting the vertical position of the cover member 663 and the bushing protrusion 717.

Referring to FIG. 117, a coupling device 839 may be used to couple the flexible drive member 616*a* to the flexible drive members 616*c*. The coupling device 839 includes an engaging member 877 and a retaining member 879. The engaging member 877 includes a plurality of fingers 881 which engage the flexible drive member 616*a*. In one embodiment, the flexible drive member 616*a* is a roller chain and the fingers 881 extend through the links of the roller chain, as shown in FIG. 117. Once the fingers have engaged the flexible drive member 616*a*, the retaining member 879 is coupled to the engaging member 877 to prevent the flexible drive member 616*a* from disengaging the engaging member 877, as shown in FIG. 117. In one embodiment, the retaining member 879 is a plate. When the retaining member 879 is coupled to the engaging member 877, retaining member 879 may be positioned over the ends of the fingers 881 to prevent the flexible drive member 616*a* from coming off the fingers 881. The engaging member 877 includes a groove 883 that is sized to receive the flexible drive member 616*c*. The flexible drive member 616*c* may be compressed between the engaging member 877 and the retaining member 879 to hold the flexible drive member 616*c* in place. The flexible drive member 616*c* may also include an enlarged portion at the end that prevents the flexible drive member 616*c* from disengaging from the coupling device 839.

It should be appreciated that the flexible drive member 616*c* may be coupled to the flexible drive member 616*a* in any of a number of ways. For example, the flexible drive member 616*c* may be welded, bolted, or the like to the flexible drive member 616*a*. Numerous other ways may also be used to couple the flexible drive members 616*c*, 616*a* together.

Referring to FIGS. 118-119, another embodiment of the system 12 is shown. This embodiment is similar in many ways to the embodiment shown in FIGS. 115-117 except that, in this embodiment, the flexible drive members 616*c*, 616*d* each form an endless loop. Each flexible drive member 616*c*, 616*d* has a first end 795 and a second end 797. The first end 795 of the flexible drive members 616*c*, 616*d* is coupled to the return side 644 of the flexible drive members 616*a*, 616*b* and extend upward and over the pulley 723 to the lifting assemblies 630*c*, 630*d*, respectively. It should be appreciated that the rotatable member 723 is being referred to as the pulley 723 because the embodiment shown in FIGS. 118-119 uses a cable as the flexible drive members 616*c*, 616*d*. Other flexible drive materials may be used, which may result in the rotatable member 723 having some other configuration such as a sprocket, etc.

At the upper end 624 of the lifting assemblies 630*c*, 630*d*, the flexible drive members 616*c*, 616*d* wrap around pulleys 723 and extend downward to the moving assemblies 650*c*, 650*d* where the flexible drive members 616*c*, 616*d* are coupled to the moving assemblies 650*c*, 650*d*, respectively. The flexible drive members 616*c*, 616*d* extend downward from the moving assemblies 650*c*, 650*d* to the pulleys 723 at the lower end 626 of the lifting assemblies 630*c*, 630*d* and back upward to pulleys 723 at the upper end 624 of the lifting assemblies 630*c*, 630*d*. From here, the flexible drive members 616*c*, 616*d* extend across to the lifting assemblies 630*a*, 630*b*, over the pulleys 723, and downward to a location where the second end 797 of the flexible drive members 616*c*, 616*d* are coupled to the flexible drive members 616*a*, 616*b*, respectively. The ends 795, 797 of the flexible drive members 616*c*, 616*d* are coupled to the flexible drive members 616*a*, 616*b* at locations that allow the moving assemblies 650 to move along their full range of motion.

The flexible drive members 616*c*, 616*d* may be configured as shown in FIGS. 118-119 in an effort to reduce cost by using a more economical flexible drive material for the flexible drive members 616*c*, 616*d*. Although the flexible drive material may cost less, the configuration of the flexible drive members 616 affirmatively moves the moving assemblies 650 up and/or down without relying on gravity to lower the moving assemblies 650. In a sense, this embodiment may provide many of the same features and advantages of the embodiment shown in FIGS. 81-82 at a lower cost. It should be appreciated that numerous changes may be made to the embodiment shown in FIGS. 118-119 so long as it is still capable of effectively raising and/or lowering a bed or other object.

Referring back to FIGS. 79-80, although the system 12 is shown with the guide members 618 coupled to an outer surface of the side walls 16, 18, it should be appreciated that the guide members 618 or the equivalent of the guide members 618 may be positioned inside the side walls 16, 18. For example, in one embodiment, a channel may be provided in the side walls 16, 18 which is similar to the channel 714 in the guide member 618. The moving members 620, 622 may move in cooperation with the channel inside the side walls 16, 18 to move the beds 640, 641 between the use configuration 610 and the stowed configuration 612. The guide members 618 may be used to form the channel 714 or the channel may be formed between the inner and outer surfaces of the sides walls 16, 18.

Referring to FIGS. 120-121, another embodiment of the system 12 is shown. FIG. 120 shows a perspective view of the system 12 from inside the vehicle 10 with the lower bed 640 and the upper bed 641 in the stowed configuration 612. The system 12 includes lifting assemblies 630*a*, 630*b*, 630*c*, 630*d* each of which include a guide assembly 660*a*, 660*b*, 660*c*, 660*d* and a moving assembly 650*a*, 650*b*, 650*c*, 650*d*, respectively. Each of the guide assemblies 660 includes the guide member 618 which may be configured similarly to the guide member 618 shown in FIGS. 81-82.

As shown in FIG. 121, flexible drive members 976*a*, 976*b* extend from the upper ends 624 of the lifting assemblies 630*a*, 630*b* to the lower ends 626 of the lifting assemblies 630*a*, 630*b*. Although only the flexible drive members 976*a*, 976*b* are shown in FIG. 121, it should be appreciated that the lifting assemblies 630*c*, 630*d* include similar flexible drive members 976*c*, 976*d*, respectively. The flexible drive members 976 may be coupled to the upper end 624 and the lower end 626 of each guide member 618 so that the flexible drive members 976 are stationary relative to the guide members 618.

In this embodiment, each of the moving assemblies 650 includes a moving member 980 which is sized to vertically move in the channel 714 of the guide member 618. The lower bed 640 may be coupled to the moving members 980 so that the lower bed 640 is moved with the moving members 980. Each moving member 980 includes a front side 982, a rear side 984, a third side 986, and a fourth side 988. The front side 982 is positioned opposite and parallel to the rear side 984, and the third side 986 is positioned opposite and parallel to the fourth side 988. The front side 982, rear side 984, third side 986, and fourth side 988 combine to define a channel or passage 990 through the moving member 980.

The moving member 980 includes a plurality of sprockets which cooperate with the flexible drive member 976*a* to vertically move the moving member 980 and, thus, the beds 640, 641. In one embodiment, the moving member 980 includes an upper or first sprocket 992, an intermediate or second sprocket 994, and a lower or third sprocket 996, all of which are positioned in a vertically oriented row. The sprockets 992, 994, 996 are coupled to drive shafts which are coupled to the front side 982 and the rear side 984 of the moving member 980. Thus, the sprockets 992, 994, 996 rotate on respective axes which are generally perpendicular to the front side 982 and the rear side 984 of the moving member 980. In one embodiment, the sprockets 992, 994, 996 may be coupled to each respective drive shaft using a pin and hole arrangement. In another embodiment, the axial holes of the sprockets 992, 994, 996 and the drive shafts may have complementary shapes (e.g., hexagonal). Also, the drive shafts may be coupled to the moving member 980 using a fastening clip which is received in a fastening groove in the drive shaft. It may be desirable to couple wear guides 850 to the moving member 980 to provide space between the moving member 980 and the inside of the guide member 618 for the fastening clips to engage the fastening grooves.

The flexible drive member 976 weaves through the sprockets 992, 994, 996 so that the flexible drive member 976 engages the same side of the upper sprocket 992 and the lower sprocket 996—in this embodiment, the side of the upper sprocket 992 and the lower sprocket 994 which is nearest to the third side 986 of the moving member 980—and the opposite side of the intermediate sprocket 994—in this embodiment, the side of the intermediate sprocket 994 which is nearest to the fourth side 988 of the moving member 980. Thus, as the moving member 980 moves in the guide member 618, the upper sprocket 992 and the lower sprocket 996 rotate in the same direction while the intermediate sprocket 994 rotates in the opposite direction. Also, in this embodiment, the moving member 980 moves relative to the flexible drive member 976.

In one embodiment, the flexible drive member 976 is a chain such as a roller chain. It should be understood, however, that any suitable flexible drive member 976 may be provided. For example, the flexible drive member 976 may be a toothed belt configured so that the teeth cooperate with the teeth in the intermediate sprocket 994. The upper sprocket 992 and the lower sprocket 996 may be rollers having a flat surface which cooperates with the side of the toothed belt which does not include teeth. Other embodiments and configurations may also be used. Also, although three sprockets are shown being used in the moving member 980, in other embodiments, two, four, or more sprockets may be used to cooperate with each of the flexible drive members 976 to vertically move the beds 640, 641.

With continued reference to FIGS. 120-121, the moving assemblies 650*a*, 650*b*, 650*c*, 650*d* include drive shafts 998*a*, 998*b*, 998*c*, 998*d*, respectively. The drive shafts 998 may be coupled to the intermediate sprockets 994 so that as the drive shafts 998 rotate, the intermediate sprockets 994 rotate, thus, raising or lowering the moving assemblies 650.

In one embodiment, the lifting assemblies 630 may be moved together using a drive sprocket 1000 coupled to each of the drive shafts 998, as shown in FIG. 120. The drive sprockets 1000 on the drive shafts 998*a*, 998*c* may be moved in unison using a flexible drive member 1002 which forms a loop that extends between and engages the drive sprockets 1000. In a similar manner, the drive sprockets on the drive shafts 998*b*, 998*d* may be moved in unison using a flexible drive member 1004 which also forms a loop that extends between and engages the drive sprockets 1000. A motor assembly 636 may be coupled to any of the drive shafts 998 to drive the lifting assemblies 630 in unison. In one embodiment, as shown in FIGS. 120-121, the motor assembly 636 may be coupled to the drive shaft 998*a*. Drive member 634 is used to synchronize the movement of the pair of lifting assemblies 630*a*, 630*c* coupled to the first side wall 16 and the pair of lifting assemblies 630*b*, 630*d* coupled to the second side wall 18.

In one embodiment, the flexible drive members 1002, 1004 may be chains such as roller chains. In another embodiment, the flexible drive members 1002, 1004 may be toothed belts. Numerous other configurations of the flexible drive members 1002, 1004 may also be provided. Also, it should be appreciated that the drive shafts 998 and the motor assembly 636 may be supported by brackets or other support structure coupled to the moving members 980 and/or to the bed frame 54.

It should be appreciated that the embodiment of system 12 shown in FIGS. 120-121 may be modified in a number of ways. For example, as shown in FIGS. 122-123, drive members 634, 635 may be configured to extend between the lifting assemblies 630*a*, 630*b* and the lifting assemblies 630*c*, 630*d*, respectively, to synchronize the movement of the lifting assemblies 630. Thus, the flexible drive member 1004 and the drive sprockets 1000 coupled to drive shafts

998*b*, 998*d* may be eliminated. Numerous other modifications and changes may also be made to the system 12.

Referring to FIGS. 124-125, another embodiment of the system 12 is shown. FIG. 124 shows a perspective view of the system 12 from inside the vehicle 10, and FIG. 125 shows a partially exploded view of the lifting assembly 630*a* from the system. As shown in FIG. 125, in this embodiment, the moving member 980 has been configured so that sprockets 992, 994, 996 rotate on an axis which is perpendicular to the third side 986 and the fourth side 988 of the moving member 980 and is parallel to the first side wall 16. The sprockets 992, 994, 996 engage the flexible drive member 976*a* in a similar manner to that shown in FIGS. 121 and 123.

In one embodiment, the front side 982 of the moving member 980 includes a U-shaped portion 1006 which protrudes through the gap 712 of the guide member 618 and opens into the channel 990 of the moving member 980. The sprockets 992, 994, 996 are coupled to drive shafts which are coupled to the sides of the U-shaped portion 1006. The sprockets 992, 994, 996 may be coupled to the U-shaped portion 1006 in a manner similar to how the sprockets 992, 994, 996 are coupled to the front side 982 and the rear side 984 of the moving member 980 as explained in connection with FIGS. 121 and 123. The intermediate sprocket 994 is coupled to the drive shaft 998*a* which extends through the U-shaped portion 1006 in a direction which is parallel to the side walls 16, 18 of the vehicle 10. In one embodiment, the sprockets 992, 994, 996 may be sized and positioned so that the flexible drive member 976*a* extends vertically between the upper end 624 and the lower end 626 of the lifting assembly 630*a* in the channel 714. The sprockets 992, 994, 996 may also be sized so that the drive shaft 998*a* has sufficient clearance from the securing flanges 708, 710 of the guide member 618 to extend outward from the U-shaped portion 1006 in a direction parallel to the first side wall 16 to engage the transmission 200*a* and the motor assembly 636.

In one embodiment, the distance between the drive shaft 998*a* and the securing flanges 708, 710 may be insufficient to allow the motor assembly 636 to be positioned up against the U-shaped portion 1006. In this situation, a motor mounting bracket 1008 may be coupled to the U-shaped portion 1006 using fasteners which extend through holes 1010 in the motor mounting bracket 1008 and are received by holes 1012 in the U-shaped portion 1006. The motor mounting bracket 1008 also includes holes 1014, which may be used to couple the motor housing 198 to the motor mounting bracket 1008, and a hole 1016 which the drive shaft 998*a* passes through.

As shown in FIG. 124, the drive members 1018*a*, 1018*b*, 1018*c* may be used to synchronize movement of the lifting assemblies 630*a*, 630*c*, the lifting assemblies 630*a*, 630*b*, and the lifting assemblies 630*b*, 630*d*, respectively. The drive members 1018 may be configured similar to the drive members 34 which are shown and described in connection with the embodiment shown in FIG. 2.

Referring to FIG. 126, a cut-away perspective view is shown of another embodiment of the system 12. Although FIG. 126 only shows the lifting assembly 630*a*, it should be understood that the remaining lifting assemblies 630*b*, 630*c*, 630*d* have a similar configuration. In this embodiment, the guide member 618 is configured similar to the guide member 618 shown in FIGS. 81-82. The moving assemblies 650*a*, 651*a* include moving members 1020, 1022, respectively, which are configured to cooperate with the guide member 618 to vertically move the beds 640, 641. In this embodiment, the moving members 1020, 1022 each include a first plate 1024 which is positioned opposite and parallel to a second plate 1026. The plates 1024, 1026 may be spaced apart a sufficient distance so that the securing flanges 708, 710 of the guide member 618 may be positioned between the plates 1024, 1026. Thus, the securing flanges 708, 710 of the guide member 618 cooperate with the plates 1024, 1026 of the moving members 1020, 1022 to guide vertical movement of the moving members 1020, 1022. In one embodiment, the second plate 1026 of the moving member 1020 (or the moving member 1022) may be coupled to the flexible drive member 616*a* using the coupling device 838 shown in FIG. 87. Numerous other configurations may also be used to couple the moving member 1020 to the flexible drive member 616*a*.

Referring to FIG. 127, an exploded perspective view is shown of one embodiment of the moving member 1022. In this embodiment, spacers 1028 may be used to space apart the plates 1024, 1026 as desired. The plates 1024, 1026 may be coupled together using fasteners (e.g., bolts, etc.) which extend through the spacers and the corresponding holes 1030 in the plates 1024, 1026. The spacers 1028 may be positioned between the plates 1024, 1026 so that the spacers 1028 move adjacent to and, potentially, in contact with the edges of the securing flanges 708, 710. In this manner, the spacers 1028 may be used to prevent undesired side to side movement of the moving members 1020, 1022. In one embodiment, the spacers 1028 may be made using nylon. However, in other embodiments, the spacers 1028 may be made from any of a number of suitable materials such as metal, plastics, composites, etc.

It should be appreciated that the moving assemblies 650*a*, 651*a* may be used to move the beds 640, 641 between the use configuration 610 and the stowed configuration 612 in a number of ways. Many of the ways that may be used have been explained previously (e.g., the upper moving member is held in the use position using a stop and the lower moving member contacts the upper moving member or the lower bed contacts the upper bed to lift both of the beds, etc.). Accordingly, it should be appreciated that the various ways of moving the beds 640, 641 described previously may be used in this embodiment and, for that matter, in any other embodiment disclosed herein. In one embodiment, the stops used to support the upper bed 641 in the use position may be positioned on the outside of the guide member 618. For example, the stop may be coupled to the securing flanges 708, 710. In this embodiment, the plate 1024 of the moving member 1022 may be wider than the plate 1024 of the moving member 1020 so that the moving member 1020 passes by the stop and the plate 1024 of the moving member 1022 engages the stop.

In another embodiment, the second plate 1026 of the moving member 1022 may be configured to include a hook or other protrusion which extends into the channel 714 of the guide member 618. The guide member 618 may be configured to include a plurality of holes in the first side 702 and the second side 704 which are configured to receive a pin 946 (FIGS. 106-108). The pin 946 extends through the holes so that a portion of the pin 946 is in the channel 714 of the guide member 618. The moving member 1020 may be configured to pass by the pin 946. However, the hook or protrusion from the second plate 1026 of the moving member 1022 may be configured to engage the pin 946 as the moving members 1020, 1022 are lowered. Thus, the pin 946 may be used to support the upper bed 641 in the use position. Of course, numerous additional embodiments may also be used.

Figure 128:
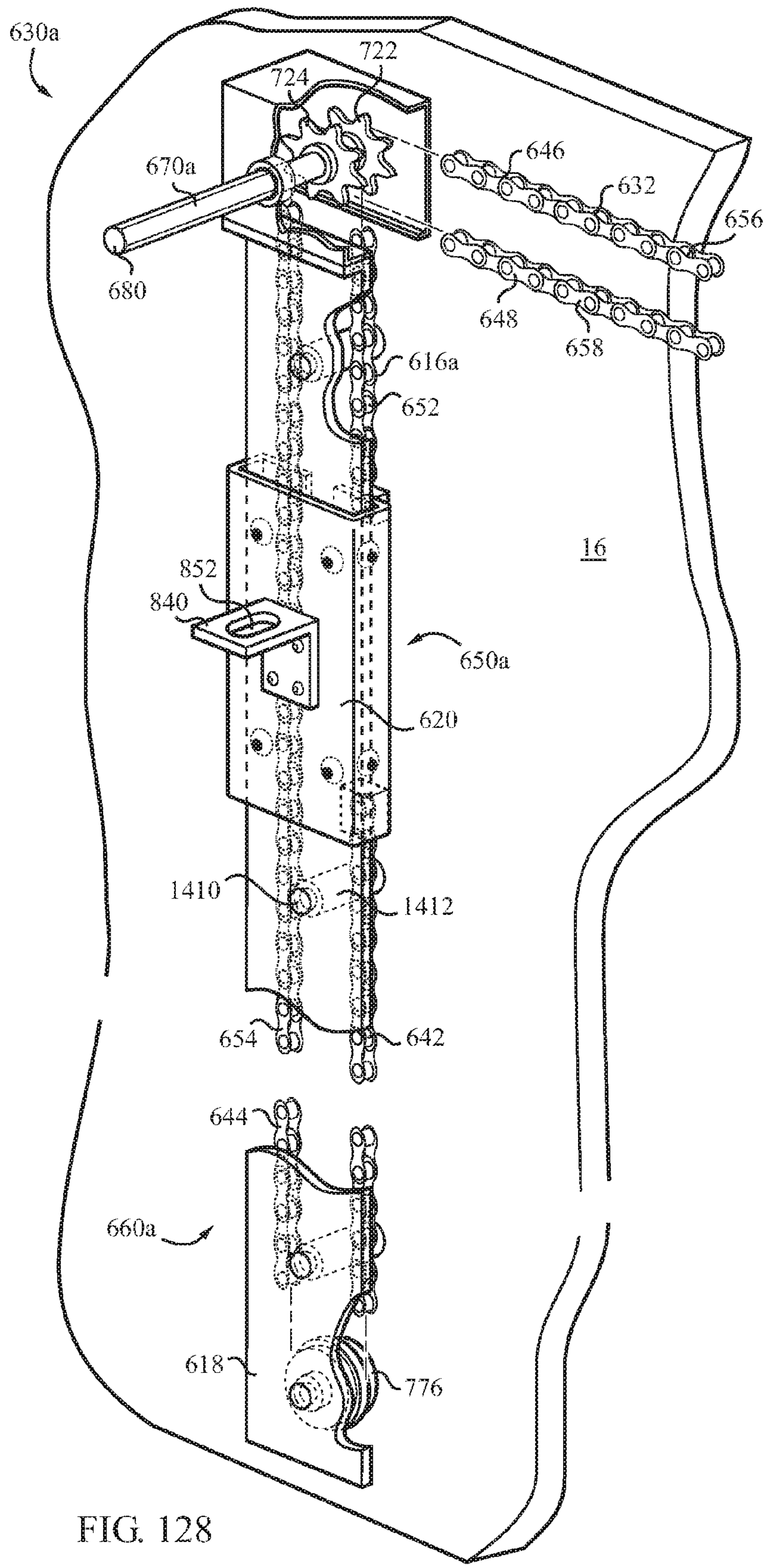
Figure 131:
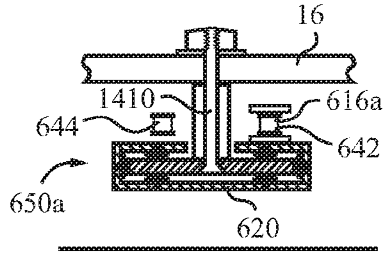
Figure 129:
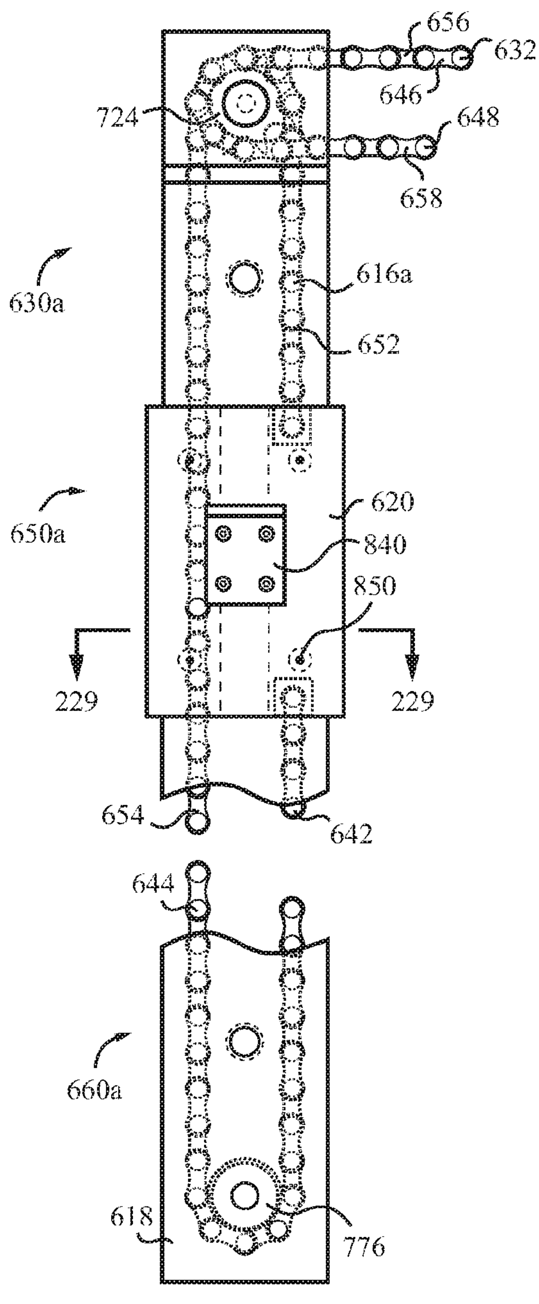
Figure 130:
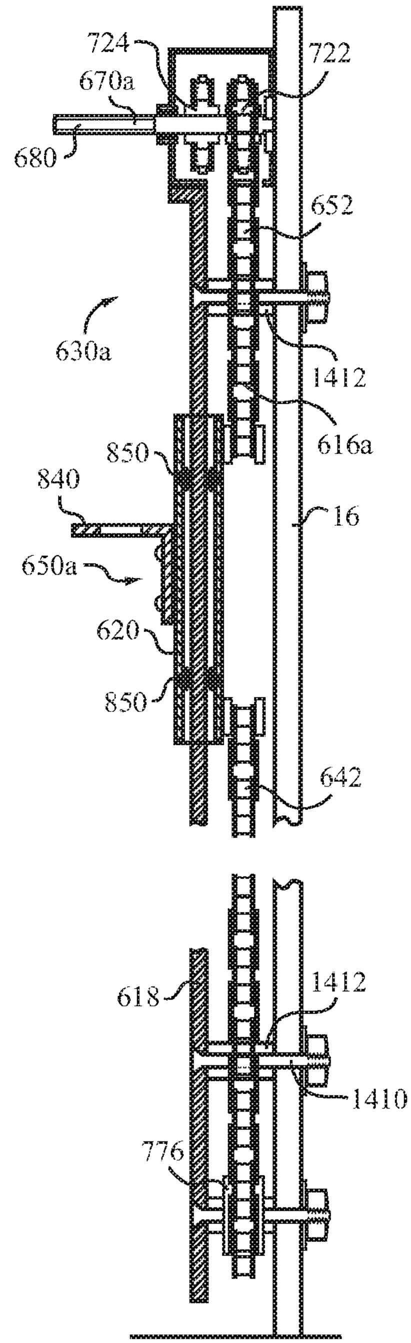

Referring to FIGS. 128-131, another embodiment is shown of the lifting assembly 630*a*. In this embodiment, the guide member 618 may be a plate with is coupled to the side walls 16, 18 using fasteners 1410 which mount flush with the guide member 618. As shown in FIG. 128, the fasteners extend through the guide member 618, through spacers 1412, and into the first side wall 16. The spacers 1412 serve to space the guide members 618 apart from the side walls 16, 18 to allow the flexible drive members 616 to be positioned between the guide members 618 and the side walls 16, 18. The moving member 620 has a C-channel shaped cross-section which is sized to move on the outside of the guide member 618. The flexible drive member 616*a* is coupled to the moving member at a position between the first side wall 16 and the guide member 618. The configuration of the flexible drive members 616, 632 may be similar to that described in connection with FIGS. 85 and 87.

Referring to FIGS. 133-134, perspective views of another embodiment of the system 12 are shown from inside the vehicle 10 with the beds 640, 641 in the use configuration 610 and the stowed configuration 612, respectively. As shown in this embodiment, the lifting assembly 630*a* is coupled to the first side wall 16 and the lifting assembly 630*b* is coupled to the second side wall 18. The lifting assemblies 630*a*, 630*b* may be used to move the beds 640, 641 between the use configuration 610 and the stowed configuration 612 without the use of any other lifting assemblies 630.

In the embodiment shown in FIGS. 133-134, the lifting assemblies 630*a*, 630*b* may be configured similarly to the lifting assemblies 630*a*, 630*b* shown in FIGS. 81-82. Also, many of the same principles and configurations described in connection with FIG. 45 apply to the present configuration of the system 12. Thus, the configuration of the system 12 shown in FIGS. 133-134 may be varied in a number of ways.

Referring to FIG. 133, the upper bed 641 may be supported in the use configuration 610 using stops 394 coupled to the side walls 16, 18. The support brackets 396 coupled to the upper bed 641 engage the stops 394 when the upper bed 641 is lowered. In another embodiment, the configuration shown in FIGS. 55-56 may be used to support the upper bed 641 in the use configuration 610. In yet another embodiment, the moving assembly 651*a* may be configured to engage the stops 926 coupled to the inside of the guide member 618 without the use of the stops 394. In yet another embodiment, both the stops 394 and the stops 926 may be used to support the upper bed 641 in the use configuration 610. The use of the stops 394 may be desirable to provide support at the corners of the upper bed 641. Many additional configurations may be provided to support the upper bed 641 in the use configuration 610.

In one embodiment, the lower bed 640 may be supported using braces 382 which extend from the lower bed 640 (e.g., from the bed frame 54, bottom side 58, etc.) to the moving assemblies 650*a*, 650*b*. As shown in FIG. 135, the moving assemblies 650 (FIG. 135 shows the moving assembly 650*a* as an example of the moving assemblies 650*a*, 650*b*) may include a mounting member 1032 which extends outward from the moving member 620. The mounting member 1032 is positioned and sized so that the mounting member 1032 extends through the gap 712 in the guide member 618. The mounting member 1032 may extend outward from the moving member 620 to allow the braces 382 to extend from the lower bed 640 in a plane which is parallel to the side walls 16, 18 to the mounting member 1032. It should be appreciated that numerous configurations of the mounting member 1032 may be provided so long as the mounting member 1032 is capable of being coupled to the braces 382. For example, in another embodiment, the mounting member 1032 may be formed integrally with the moving member 620.

Referring to FIG. 136, a perspective view of another embodiment of the system 12 is shown from inside the vehicle 10. In this embodiment, the lifting assemblies 630*a*, 630*c* are used to raise and lower the first pair of beds 550, 551, and the lifting assemblies 630*b*, 630*d* are used to raise and lower the second pair of beds 552, 553. The first pair of beds 550, 551 are coupled to the first side wall 16, and the second pair of beds 552, 553 are coupled to the second side wall 18. An aisle 554 is provided between the pairs of beds. In many respects, this embodiment is similar to the embodiment shown in FIG. 67. For example, the beds 550-553, the braces 382, the support elements 566, etc. may all be configured as described in connection with the embodiment shown in FIG. 67. It should be appreciated that many other components may also be similar and/or configured as described in connection with the embodiment of FIG. 67.

In one embodiment, the lifting assemblies 630 may be configured in a manner similar to the embodiment described in connection with FIGS. 79-80. It should be appreciated that other embodiments described herein may also be configured as shown in FIG. 136. In this embodiment, the lifting assemblies 630*a*, 630*c* and the lifting assemblies 630*b*, 630*d* may be moved independently. In one embodiment, this may be done using two motor assemblies 636—one for each pair of lifting assemblies 630. Also, the stops 926 may be used to support the upper beds 551, 553 in the use position. It should be appreciated that the embodiment shown in FIG. 136 may be modified in a number of ways to provide additional embodiments.

Referring to FIG. 132, a perspective view of another embodiment of the system 12 is shown. In this embodiment, the system 12 is shown being used in the corner of the room 592 in a manner similar to the embodiment shown in FIG. 78. It should be understood that much of the description related to the embodiment shown in FIG. 78 is also relevant to this embodiment. The room 592 includes the first side wall 596, the second side wall 598, the ceiling 594, and the floor 600. The room 592 may be part of a mobile structure such as the vehicle 10, or it may be part of an immobile structure such as a building. In this embodiment, the lower bed 590 and the upper bed 591 are coupled to the first side wall 596 and the second side wall 598 using the lifting assemblies 630*a*, 630*b*, 630*c*. As shown in FIG. 132, the lifting assemblies 630*a*, 630*c* may be configured to be coupled to the first side wall 596 in a similar manner to how the lifting assemblies 630*a*, 630*c* are coupled to the first side wall 16 in FIGS. 79-80.

The lifting assembly 630*b* may be coupled to the second side wall 598 so that the lifting assembly 630*b* is perpendicular to the lifting assemblies 630*a*, 630*c*. In one embodiment, the drive member 634 may be configured to extend from the motor assembly 636 coupled to the lifting assembly 630*a* to the transmission 200 coupled to the lifting assembly 630*b*. In this embodiment, the lifting assembly 630*a* may be coupled sufficiently close to the second side wall 598 that the drive member 634 can be positioned between the motor assembly 636 and the transmission 200. The operation and movement of the lifting assemblies 630*a*, 630*b*, 630*c* may be similar to any analogous embodiments described herein, including, but not limited to, the embodiment shown in FIGS. 79-80. Also, the corners 602 of the beds 590, 591 may be supported as described in connection with the embodiment of FIG. 78.

Referring to FIGS. 137-138, a front perspective view of another embodiment of the system 12 is shown. Specifically, FIG. 137 shows the system 12 with the beds 640, 641 in the use configuration 610, and FIG. 138 shows the system 12 with the beds 640, 641 in the stowed configuration 612. The embodiment shown in FIGS. 137-138 is similar in many ways to the embodiment shown in FIGS. 79-80. For example, in this embodiment, the moving assemblies 650 cooperate with the guide members 618 in a similar manner. Also, the upper bed 641 may be supported in the use configuration 610 and moved between the use configuration 610 and the stowed configuration 612 in a similar manner. It should be appreciated that other features and configurations of the embodiment shown in FIGS. 137-138 may also be similar the embodiment shown in FIGS. 79-80 and other embodiments previously described.

In this embodiment, the lifting assemblies 630 are used to vertically move the beds 640, 641 between the use configuration 610 and the stowed configuration 612. The drive members 634*a*, 634*b*, 634*c* (collectively referred to as "the drive members 634") are used to move the adjacent lifting assemblies 630 in unison. It should be understood that the drive member 634 in FIGS. 79-80 may correspond to the drive member 634*b* in this embodiment. In this embodiment, the drive member 634*b* is coupled between the lifting assemblies 630*c*, 630*d*. It should be appreciated that in other embodiments, the drive member 634*b* may be coupled between the lifting assemblies 630*a*, 630*b*, or positioned in any other suitable position.

The drive shafts 670 of each respective lifting assembly 630 rotate on axes which are parallel to the base 706 and the securing flanges 708, 710 of the guide member 618. The axes of rotation of the drive shafts 670 are also parallel to the first side wall 16 of the vehicle 10. The drive members 634 may be used to move the drive shafts 670 in unison. In this embodiment, the drive member 634*a* extends between and engages the drive shafts 670*a*, 670*c*. The drive member 634*b* extends between and engages the drive shafts 226 of the transmissions 200. One of the transmissions 200 may be coupled to each of the drive shafts 670*c*, 670*d* of the lifting assemblies 630*c*, 630*d* to translate the rotary motion of the drive shafts 670*c*, 670*d* to the drive shafts 226 and on to the drive member 634*b*. The drive member 634*c* extends between and engages the drive shafts 670*d*, 670*b*. The configuration of the drive members 634 and the drive shafts 670 may be similar to that described previously for the drive members 34 and the drive shafts 150.

The motor assembly 636 may be positioned in any of a number of suitable locations. For example, in one embodiment, the motor assembly 636 may be coupled to one of the lifting assemblies 630 and engage one of the drive shafts 670. As shown in FIG. 137, the motor assembly 636 may be coupled to the lifting assembly 630*c* and engaged with the drive shaft 670*c*. In another embodiment, the motor assembly 636 may be coupled to the side walls 16, 18, the ceiling 24, and/or the rear wall 22. For example, the motor assembly 636 may be coupled to the first side wall 16. The drive member 634*a* may be provided in two sections with a section extending from each side of the motor assembly 636 to the drive shafts 670*a*, 670*c* of the lifting assemblies 630*a*, 630*c*, respectively. It should be appreciated that the position and configuration of the motor assembly 636 may be varied widely.

FIG. 139 shows a cut-away perspective view of one embodiment of the lifting assembly 630*a* which may be used in the system 12 shown in FIGS. 137-138. The lifting assembly 630*a* is described as being representative of any one of the lifting assemblies 630. Thus, the principles, configurations, and features described in connection with the lifting assembly 630*a* may equally apply to the lifting assemblies 630*b*, 630*c*, 630*d*. In addition, the lifting assembly 630*a* may be identical, interchangeable and/or at least substantially similar to the other lifting assemblies 630*b*, 630*c*, 630*d* shown in FIGS. 137-138.

In this embodiment, the sprocket 722 which cooperates with the flexible drive member 616*a* to vertically move the moving assembly 650*a* may be coupled to the drive shaft 670*a* so that the sprocket 722 rotates on the longitudinal axis of the drive shaft 670*a*. As mentioned previously, the longitudinal axis of the drive shaft 670*a* is parallel to the base 706 and the securing flanges 708, 710 of the guide member 618. The axis of rotation of the sprocket 722 is also parallel to the first side wall 16. Thus, the axis of rotation of the sprocket 722 has been rotated 90 degrees relative to the axis of rotation of the sprocket 722 shown in FIG. 87.

The sprocket 722 is used to move the flexible drive member 616*a* along an endless path. By coupling the moving assembly 650*a* to the flexible drive member 616*a*, the moving assembly 650*a* also moves along the endless path with the flexible drive member 616*a*. In one embodiment, the flexible drive member 616*a* includes a first end 1034 which is coupled to the top of the moving member 620 and a second end 1036 which is coupled to the bottom of the moving member 620. In this manner, the combination of the flexible drive member 616*a* and the moving member 620 form the endless path which the flexible drive member 616*a* travels along. The load bearing portion 652 is that portion of the flexible drive member 616*a* which extends from the first end 1034 of the flexible drive member 616*a* upward and engages the sprocket 722 as the moving member 620 is raised and lowered. The return portion 654 is that portion of the flexible drive member 616*a* which extends from the second end 1036 and does not engage the sprocket 722 as the moving member 620 is raised and lowered. Also, as shown in FIG. 139, the flexible drive member 616*a* forms a loop which lies in a plane that is parallel with the first side 702 and the second side 704 of the guide member 618 and which is perpendicular to the first side wall 16. The load bearing side 642 of the flexible drive member 616*a* is positioned adjacent to the securing flange 708, and the return side 644 of the flexible drive member 616*a* is positioned adjacent to the base 706.

In one embodiment, the sprocket 722 and the yoke assembly 764 may be positioned so that the flexible drive member 616*a* moves behind one of the securing flanges 708, 710 in the channel 714 of the guide member 618. This may be desirable to provide a more aesthetically pleasing appearance for the lifting assembly 630*a*. However, in other embodiments, the flexible drive member 616*a* may be positioned in the middle of the channel 714 directly behind the gap 712 in the guide member 618. Also, the stops 926 may be used as explained previously. In one embodiment, one of the stops 926 may be used to support the moving assembly 650*a* when the lower bed 640 is in the use position. In another embodiment, the moving assembly 650 may be supported in the use position by the brake on the motor 160.

As shown in FIGS. 137-139, the first end 680 of the drive shaft 670*a* may be sized and configured to receive a manual crank to move the beds 640, 641 by hand. In one embodiment, the crank may be a ratcheting crank (e.g., standard socket wrench, etc.). The manual crank may be used in those situations where electrical power is not available or has been lost. It should be appreciated, that numerous other configurations may be provided where the manual crank can be drivingly coupled to the driving assembly. The second end 720 of the drive shaft 670*a* may be configured to engage the drive member 634*a*.

Referring to FIG. 140, a cut-away perspective view of another embodiment of the lifting assembly 630*a* is shown. In this embodiment, the flexible drive member 616*a* may include two different types of flexible drive material or members. For example, as shown in FIG. 140, the load bearing portion 652 may be a roller chain and the return portion 654 may be a cable. In another embodiment, the load bearing portion 652 may be a toothed belt and the return portion 654 may be a strap. It should be appreciated that numerous additional embodiments of the flexible drive member 616*a* using two or more different types of flexible drive material may be provided.

As shown in FIG. 140, the wheel 776 in the yoke assembly 764 may be a pulley which cooperates with the cable that is used as the return portion 654 of the flexible drive member 616*a*. In one embodiment, a biasing member 1038, such as a spring, may be positioned between the mounting bracket 772 and the nut 812 on the fastener 800 to bias the wheel 776 towards the lower end 626 of the lifting assembly 630*a*, and, thus, provide the desired tension in the flexible drive member 616*a*.

Referring to FIG. 141, a cut-away perspective view is shown of another embodiment of the lifting assembly 630*a* which may be used in the system 12 shown in FIGS. 137-138. In this embodiment, the flexible drive member 616*a* is a cable which forms an endless loop. The cable moves along an endless path defined by the endless loop. The cable is configured to wrap on a spool, drum, or cylinder 1040 coupled to the drive shaft 670*a*. In this embodiment, the spool 1040 rotates an axis which is parallel to the side walls 16, 18 of the vehicle 10 and is parallel to the base 706 and the securing flanges 708, 710 of the guide member 618. In other embodiments, the spool 1040 may be configured to rotate on an axis which is perpendicular to the side walls 16, 18 of the vehicle 10. The cable is wrapped around the spool 1040 so that as the drive shaft 670*a* rotates, one of the load bearing portion 652 or the return portion 654 of the flexible drive member 616*a* wraps on the spool 1040 while the other one of the load bearing portion 652 or the return portion 654 wraps off the spool 1040.

In the embodiment shown in FIG. 141, the drive shaft 670*a* may be rotated so that the load bearing portion 652 wraps on the spool 1040 and the return portion 654 wraps off spool 1040. When the drive shaft 670*a* is rotated in the opposite direction, the load bearing portion 652 wraps off the spool 1040 and the return portion 654 wraps on the spool 1040. In this manner, the flexible drive member 616*a* may be used to provide the endless loop which moves the moving assembly 650*a* along the endless path. The endless loop configuration may be desirable because it holds the moving assembly 650*a* in place from above and below.

Referring to FIGS. 142-144, one embodiment of the spool 1040 is shown. The spool 1040 includes an axial hole 1044 which is sized and configured to receive the drive shaft 670*a*. In one embodiment, the axial hole 1044 and the corresponding portion of the drive shaft 670*a* may be cylindrical. The spool 1040 may include a hole 1042 which can be used to couple the spool 1040 to the drive shaft 670*a*. For example, a pin may be inserted through the hole 1042 in the spool 1040 and through a corresponding hole in the drive shaft 670*a* to securely hold the spool 1040 to the drive shaft 670*a*. In another embodiment, the axial hole 1044 of the spool 1040 may be shaped to securely engage the drive shaft 670*a* without the use of the pin and the hole 1042. For example, the axial hole 1044 may have a hexagonal shape which corresponds to the hexagonal shape of the drive shaft 670*a*. The spool 1040 may also be coupled to the drive shaft 670*a* in a number of other ways as well.

In one embodiment, the spool 1040 may also include a bore or hole 1046 which extends longitudinally from a first end 1048 of the spool 1040 to a second end 1050 of the spool 1040. The bore 1046 may also be parallel to the axial hole 1044. The bore 1046 is sized to receive the flexible drive member 616*a*, which in this embodiment is a cable. A length of cable may be provided which is sufficient to provide the endless loop and to wrap on the spool 1040 as shown in FIG. 141. Referring back to FIGS. 142-144, the cable may be inserted through the bore 1046 so that spool 1040 is positioned somewhere in the middle of the cable. At the first end of the spool 1040, the cable may be wrapped from the bore 1046 to the outer surface 1052 of the spool 1040 using the groove 1054. Once on the outer surface 1052, the cable may be wrapped the entire length of the spool 1040. In one embodiment, the outer surface 1052 of the spool 1040 may be spiral grooved to provide a better fit for the cable. Once the cable has been wrapped the entire length of the spool 1040, the cable at the second end 1050 may be wrapped from the bore 1046 to the outer surface 1052. Although not shown, the second end 1050 includes a corresponding groove which is similar to the groove 1054. The groove in the second end 1050 is oriented so that the cable at the second end 1050 may be wrapped on the spool in the opposite direction of the cable at the first end 1048. The cable at the second end 1050 may then be wrapped on to the spool 1040 at the same time the cable from the first end 1048 wraps off the spool 1040. In this manner, the cable may be placed on the spool 1040. It should be appreciated that the cable may be wrapped on the spool 1040 in any of a number of suitable ways.

FIGS. 145-147 show one embodiment of the cable after it has been wrapped on the spool 1040. As shown in FIG. 141, the portion of the cable which wraps from the first end 1048 is referred to as the load bearing portion 652 and the portion of the cable which wraps from the second end 1050 is referred to as the return portion 654. Of course, it should be appreciated that the load bearing portion 652 and the return portion 654 may be switched with each other by coupling the moving assembly 650*a* to the side of the cable which extends adjacent to the base 706 of the guide member 618.

As shown in FIGS. 145-147, as the spool 1040 is rotated, one of the load bearing portion 652 or the return portion 654 winds on to the spool 1040 and the other of the load bearing portion 652 or the return portion 654 winds off the spool 1040. In the embodiment shown in FIGS. 145-147, a space is provided between the load bearing portion 652 and the return portion 654 where the outer surface 1052 of the spool is visible. In other embodiments, the load bearing portion 652 and the return portion 654 are positioned next to each other so that the outer surface 1052 of the spool is not visible. This configuration may be desirable since the overall length of the spool 1040 may be decreased by the amount of the space between the load bearing portion 652 and the return portion 654 without decreasing the length of travel of the flexible drive member 616*a*. In general, the diameter and length of the spool 1040 may be sized to provide the desired length of travel of the flexible drive member 616*a* along the endless path and to provide the desired raising and/or lowering speed for the moving assembly 650*a*. The desired speed may be affected by the strength and configuration of the motor 160 used to drive the movement of the beds 640, 641.

In one embodiment, shown in FIG. 148, the first end 1034 and the second end 1036 of the flexible drive member 616*a* may be coupled to a timing mechanism 1056. In general, the timing mechanism includes a spool, drum, or cylinder 1058 which the flexible drive member 616*a* wraps onto. The load bearing portion 652 and the return portion 654 of the flexible drive member 616*a* wrap on the spool 1058 in a manner similar to how the flexible drive member 616*a* wraps on the spool 1040. Thus, as the spool 1058 rotates, one of the load bearing portion 652 or the return portion 654 wraps on the spool 1058 while the other one of the load bearing portion 652 or the return portion 654 wrap off the spool 1058. By rotating the spool 1058, the position of the moving assembly 650*a* can be adjusted relative to the other moving assemblies 650*b*, 650*c*, 650*d*. This may be desirable to allow the corners of the lower bed 640 to be adjusted relative to each other. For example, if the lower bed 640 is not level, the position of the corners (e.g., the system 12 includes four of the lifting assemblies 630) or sides (e.g., the system 12 includes two of the lifting assemblies 630) of the lower bed 640 may be adjusted using the timing mechanism 1056.

Referring to FIGS. 149-151, various perspective views of the timing mechanism 1056 are shown. In FIG. 149, an exploded perspective view of the timing mechanism 1056 is shown. In one embodiment, the timing mechanism 1056 includes the spool 1058, a fastener 1060, a first end plate 1062, and a second end plate 1064. The first end 1034 and the second end 1036 of the flexible drive member 616*a* each include a bead 1066 which is larger than the cross-sectional size of the flexible drive member 616*a*. The beads 1066 may be received in a corresponding recess 1068 in the sides of the spool 1058. The sides of the spool 1058 also include a groove 1070 which is used to guide the flexible drive member 616*a* to the outer surfaces 1072 of the spool 1058. The shape of the groove 1070 in the sides of the spool 1058 generally correspond to the shape of the first end 1034 and the second end 1036 shown in FIG. 149. When assembled, the end plates 1062, 1064 secure the beads on the ends 1034, 1036 in the recess 1068.

In one embodiment, the fastener 1060 includes a threaded portion 1074 and an engaging portion 1076. The fastener 1060 is configured to extend through axial holes in the end plates 1062, 1064, the spool 1058, and the side of the moving member 620. The cross-section of the engaging portion 1076 of the fastener 1060 is shaped to engage the axial holes in the end plates 1062, 1064 and the spool 1058 so that the fastener 1060 rotates together with the end plates 1062, 1064 and the spool 1058. In one embodiment, the engaging portion 1076 of the fastener 1060 and the axial holes in the end plates 1062, 1064 and the spool 1058 may have square cross-sections. It should be appreciated that the engaging portion 1076 and the axial holes may have any suitable configuration so long as they move together. For example, in another embodiment, the engaging portion 1076 and the axial holes may have corresponding hexagonal shapes. The fastener 1060 is sized so that the threaded portion extends through the axial hole in the moving member 620. The fastener 1060 is configured to rotate independently of the moving member 620. The fastener 1060 engages a nut 1078 and washers 1080 to couple the timing mechanism 1056 to the moving member 620.

The operation of the timing mechanism 1056 may be as follows. In one embodiment, the moving member 620 includes a plurality of protrusions or bumps 1082 which engage recesses or indentations 1084 in the second end plate 1064. Thus, when the nut 1078 is tightened onto the fastener 1060, the protrusions 1082 cooperate with the recesses 1084 to prevent the timing mechanism 1056 from rotating relative to the moving member 620. In order to use the timing mechanism 1056 to adjust the position of the moving assembly 650*a*, the nut 1078 and fastener 1060 are loosened sufficiently to allow the timing mechanism 1056 to be rotated relative to the moving member 620. The timing mechanism 1056 may be rotated using an opening 1086 at the end of the threaded portion 1074. The torque required to rotate the timing mechanism 1056 may be adjusted by tightening or loosening the nut 1078. As shown in FIGS. 150-151, the opening 1086 is accessible when the timing mechanism 1056 is coupled to the moving member 620. In one embodiment, the opening 1086 may have a cross section which is sized to receive an allen wrench. In other embodiments, a protrusion may be provided on the end of the threaded portion 1074 which can be used to rotate the timing mechanism 1056 relative to the moving member 620.

It should be appreciated that although this embodiment shows the use of a cable as the flexible drive member 616*a*, other flexible drive materials may also be used. For example, in another embodiment, the flexible drive member 616*a* may be a chain which is configured to wrap on the spool 1040 so that one of the load bearing portion or the return portion wraps on the spool 1040 while the other of the load bearing portion or the return portion wraps off the spool 1040. Other types of flexible drive material may be used as well.

In another embodiment of the lifting assembly 630*a*, shown in FIG. 152, the flexible drive member 616*a* is a cable which extends from the spool 1040 to the moving assembly 650*a*. In this configuration, the flexible drive member 616*a* is not endless. Rather, the first end 1034 of the flexible drive member 616*a* is coupled to the moving member 620 and the second end 1036 wraps on the spool 1040. When the flexible drive member 616*a* wraps on the spool 1040, the moving assembly 650*a* moves upward, and when the flexible drive member 616*a* wraps off the spool 1040, the moving assembly 650*a* moves downward because of gravity.

The moving assemblies 650*a*, 651*a* may be supported in the use configuration in any of the ways previously described. As shown in FIG. 152, the moving assemblies 650*a*, 651*a* may be supported using stops 926. It should be appreciated that the embodiment shown in FIG. 152 may be modified in a number of ways. For example, in one embodiment, the flexible drive member 616*a* may be a strap as shown in FIG. 153. The second end 1036 of the strap may be configured to wrap on a spool portion of the drive shaft 670*a*, and the first end 1034 may be coupled to the moving assembly 650*a*. It should be appreciated that a spool with side walls that guide the strap as it wraps may be provided at the drive shaft 670*a*. Numerous other configurations are possible as well.

Referring to FIG. 154, a perspective view of another embodiment of the system 12 is shown. In this embodiment, the lifting assemblies 630 may be used to vertically move a bed 1090 between a use position and a stowed position. The bed 1090 includes a first side 1104, a second side 1106, a third side 1108, and a fourth side 1110. Although only one bed is shown in FIG. 154, it should be understood that additional beds may be may be raised and/or lowered using the lifting assemblies 630 in a manner similar to that described previously. At a broad level, the guide members 618 and the moving members 620 in the lifting assemblies 630 may be configured similarly to the previous embodiments of the lifting assemblies 630.

The drive assembly in the embodiment shown in FIG. 154 includes the motor assembly 636, rigid drive members 1100*a*, 1100*b* (collectively referred to as "the rigid drive members 1100") and flexible drive members, which in this embodiment are cables 1102a, 1102b, 1102c, 1102d (collectively referred to as the "the cables 1102"). It should be appreciated that other flexible drive members may also be used such as straps, and the like.

As shown in FIG. 154, the rigid drive members 1100 and the motor assembly 636 may be coupled to the bed 1090. In one embodiment, the motor assembly 636 may be coupled in the middle of the bottom side 58 of the bed 1090. The rigid drive members 1100a, 1100b engage the motor assembly 636 and extend in opposite directions from the motor assembly toward the third side 1108 and the fourth side 1110, respectively, of the bed 1090. It should be understood that the rigid drive members 1100 may be configured to include various combinations and configurations of rigid drive shafts and rigid drive members as described previously. For example, in one embodiment, the rigid drive members 1100 may be configured to be adjustable between a first orientation where the rigid drive members 1100 move in unison and a second orientation where the rigid drive members 1100 may move independently of each other. Numerous other embodiments of the rigid drive members 1100 may be provided.

Spools 1112a, 1112b are coupled to the rigid drive member 1100a at a location adjacent to the third side 1108 of the bed 1090. Likewise, spools 1112c, 1112d are coupled to the rigid drive member 1100b at a location adjacent to the fourth side 1110 of the bed 1090. In one embodiment, the rigid drive members 1100 may include a drive shaft similar to the drive shafts 670 which is coupled to the spools 1112 (e.g., the drive shaft may extend through axial holes in the spools 1112). The rigid drive members 1100 may include a drive member similar to drive member 34b (FIGS. 28-33) which extends from the motor assembly 636 to the drive shaft which the spools 1112 are coupled to. Other embodiments of the rigid drive members 1100 may also be used. Each cable 1102 extends from the respective spool 1112a, 1112b, 1112c, 1112d (collectively referred to as "the spools 1112"), through the bed frame 54, and up to the upper end 624 of the lifting assemblies 630. The cables 1102 wrap on the spools 1112 as the rigid drive members 1100 rotate to raise and/or lower the bed 1090. The cables 1102 may wrap on the spools 1112 in a manner similar to that described in connection with FIG. 152. In one embodiment, the spools 1112 may be grooved. In other embodiments, the spools 1112 may be portions of the rigid drive members 1100 which the cables 1102 wrap onto.

Referring to FIG. 155, a side view is shown of one embodiment which may be used to couple the bed 1090 to the lifting assembly 630a. A similar configuration may also be provided for coupling the bed 1090 to the remaining lifting assemblies 630b, 630c, 630d. As shown in FIG. 155, in one embodiment, the bed frame 54 may include a frame member 1114 which extends through the gap 712 and into the channel 714 of the guide member 618. A pulley or sheave 1116 may be coupled to the frame member 1114 so that the pulley 1116 extends into the channel 714 of the guide member 618. Thus, the cable 1102a extends between the upper end 624 of the guide member 618 and the pulley 1116 inside the channel 714 of the guide member 618.

Referring to FIG. 156, a perspective view is shown of one embodiment of the frame member 1114 of the bed 1090. In this view, the lifting assembly 630b is shown, however, it is contemplated that the other lifting assemblies 630a, 630c, 630d may be similarly configured. In this embodiment, the moving member 620 includes a slot or gap 1094 which is open at the top and extends downward to about where the mounting member 840 is coupled to the moving member 620. The frame member 1114 extends through the gap 712 in the guide member, through the slot 1094 in the moving member, and into the channel 714. The bed 1090 may be coupled to the moving assembly 950b using the pin 1092 which is received by the opening 852 in the mounting member 840.

In one embodiment, variations in the width between the side walls 16, 18 may be accounted for using the pin 1092 and the oversized opening 852 in a manner similar to that described previously. The bed 1090 moves toward and away from the guide member 618 as the width varies between the side walls 16, 18. As the bed 1090 moves toward and away from the guide member 618, the frame member 1114 also moves back and forth in the channel 714 of the guide member 618. In this manner, the width variations between the side walls 16, 18 may be compensated for.

In another embodiment, illustrated in FIG. 157, the variations in the width between the side walls 16, 18 as the bed 1090 is moved vertically may be compensated for by allowing the moving member 620 to move toward and away from the side walls 16, 18. In this embodiment, the bed 1090 may be coupled to the moving assembly 650a so that there is little or no movement of the bed 1090 relative to the moving assembly 650a. However, the moving member 620 may be sized so that a space 1096 may be provided in the channel 714. The space 1096 allows the moving member 620 to move laterally in the channel 714 to compensate for the variations in the width of the side walls 16, 18 as the bed 1090 moves vertically.

Referring to FIGS. 155 and 157, the cable 1102a may be coupled to the upper end 624 of the guide member 618 using an anchor assembly 1118. Referring to FIGS. 158-159, various perspective views are shown of one embodiment of the anchor assembly 1118. In this embodiment, the anchor assembly 1118 includes an anchor bracket 1120 and a cable anchor 1122. The anchor bracket 1120 is sized and configured to be received in the channel 714 of the guide member 618. Fasteners 1124 are used to secure the anchor bracket 1120 to the guide member 618. The anchor bracket 1120 includes a hole 1126 which receives the cable anchor 1122. The cable anchor 1122 includes an elongated threaded portion which is configured to receive a nut 1128. The nut 1128 is sized so that it is unable to pass through the hole 1126. Once the cable 1102a has been coupled to the anchor bracket 1120 and the guide member 618, the nut 1128 may be tightened to increase the tension in the cable 1102a as desired.

It should be appreciated that numerous embodiments may be used to couple the cables 1102 to the upper ends 624 of the lifting assemblies 630. For example, in another embodiment, the anchor bracket 1120 may be integrally formed with the guide member 618. In yet another embodiment, the cable 1102a may be coupled to a spool at the upper end 624 of the guide member 618. The spool may rotate on a shaft and be used to selectively adjust the tension of the cable 1102a. Numerous other embodiments may also be used.

Referring to FIG. 160, another embodiment is shown of the frame member 1114 of the bed 1090. In this embodiment, the moving member 620 and the frame member 1114 are one integral piece. For reference purposes, the combination of the frame member 1114 and the moving member 620 is referred to as simply the moving member 620. The moving member 620 includes flanges 1130 which extend outward in opposite directions from each other. The flanges 1130 are sized and configured so that the flanges move inside the channel 714 of the guide member 618 without being able to pass through the gap 712 and out of the guide member 618. The flanges 1130 may initially be received in the channel 714 of the guide member 618 in a receiving area 1132 where the gap 712 in the guide member 618 is sufficiently enlarged relative to the remainder of the gap 712 to allow the flanges 1130 to pass through. It should be appreciated that the bed 1090 may move in cooperation with the guide member 618 in numerous other ways.

In another embodiment, the pulley 1116 may be included as part of the moving assemblies 650 as shown in FIG. 161. The cables 1102 may extend from the spools 1112 to the pulley 1116 and on to the anchor assembly 1118. Thus, the bed frame (not shown in FIG. 161) may be provided without the frame member 1114. FIG. 162 shows a side view of the lifting assembly 630*a* from FIG. 161. FIGS. 163-164 show various perspective views of the moving assembly 650 which includes the pulley 1116.

It should be appreciated that the rigid drive members 1100, the motor assembly 636, and/or the spools 1112 may be coupled to the bed 1090 in any of a number of suitable ways. Numerous configurations of mounting brackets, bearings, as well as other components and/or mounting structures which are suitable to couple the rigid drive members 1100, the motor assembly 636, and/or the spools 1112 to the bed 1090 may be used. The specific configuration of the mounting structures used may depend on the particular configuration of the bed 1090 and the rigid drive members 1100, the motor assembly 636, and/or the spools 1112. Accordingly, the details of how these components are coupled to the bed 1090 are not shown in FIG. 161, as well as many of the other Figs. going forward, in order to more clearly show the operation and configuration of the components of the drive assembly.

In one embodiment, as shown in FIGS. 162-164, the pulley 1116 may be coupled to the moving member 620 so that the cable 1102 passes through the gap 712 in the guide member 618 and is received by the pulley 1116. From the pulley 1116, the cable 1102 extends upward to the upper end 624 of the lifting assembly 630. The pulley 1116 may be coupled to the moving member 620 so that the pulley 1116 rotates on an axis which is positioned in the channel 990 of the moving member 620.

Figure 165:
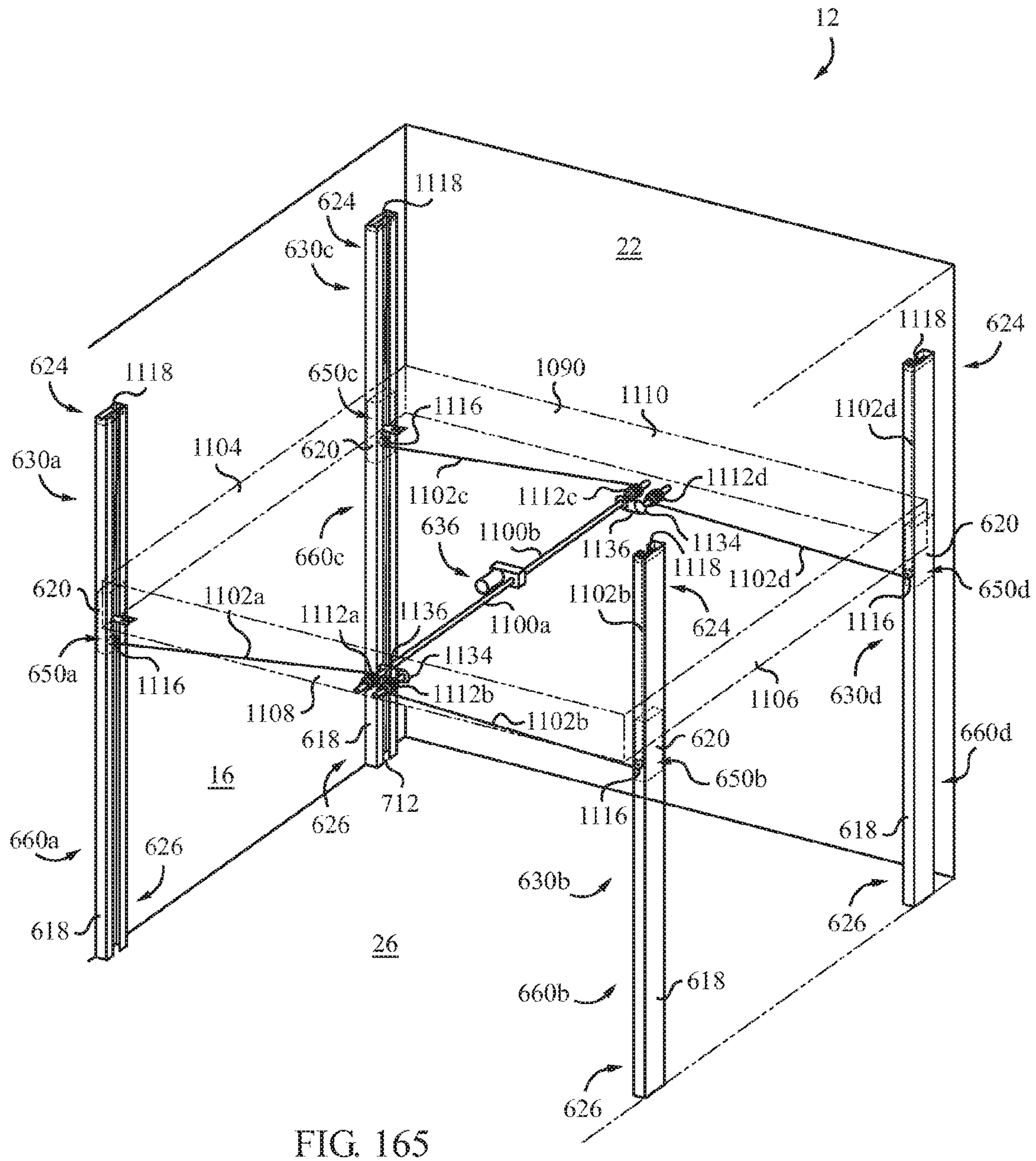

In another embodiment, as shown in FIG. 165, the spools 1112*a*, 1112*b* may be positioned so that the spool 1112*a* is coupled to the rigid drive member 1100*a* and the spool 1112*b* is offset from the rigid drive member 1100*a* and parallel to the spool 1112*a*. In this manner, the spools 1112*a*, 1112*b* may be positioned directly in front of the pulleys 1116 and the gap 712 in the guide member 618. By positioning the spools 1112*a*, 1112*b* in this manner, the amount that the cables 1102*a*, 1102*b* are laterally offset from the center of the guide members 618 may be reduced. Reducing the lateral offset of the cables 1102*a*, 1102*b* may reduce some problems associated with the cables 1102*a*, 1102*b* wrapping on the spools 1112*a*, 1112*b* (e.g., cables 1102 not tracking properly on the spools 1112, etc.). As shown in FIG. 165, a similar configuration is provided for the spools 1112*c*, 1112*d* and the cables 1102*c*, 1102*d*.

In one embodiment the rotation of the spools 1112*a*, 1112*b*, and the spools 1112*c*, 1112*d* may be synchronized using sprockets 1134 and chains 1136. For example, one of the sprockets 1134 may be coupled to the rigid drive members 1100*a*, 1100*b* and another sprocket 1134 coupled to the offset rigid drive members used with the offset spools 1112*b*, 1112*d*. The chains 1136 cooperate with the respective sprockets 1134 on the rigid drive members 1100*a*, 1100*b* to rotate the spools 1112*a*, 1112*b* and the spools 1112*c*, 1112*d* in unison. It should be appreciated that the spools 1112*a*, 1112*b* and the spools 1112*c*, 1112*d* may be rotated together in a number of ways. For example, in another embodiment, a gear may be coupled to the rigid drive members 1100 and a corresponding gear coupled to the offset rigid drive members used with the offset spools 1112*b*, 1112*d*. The gears may be configured to mesh with each other to rotate the spools 1112 together. Numerous additional embodiments may also be used.

It should be appreciated that the cables 1102 may be configured to wrap on the spools 1112 in any of a number of ways so that when the rigid drive members 1100 rotate the bed 1090 moves in the same direction at each lifting assembly 630. For example, as shown in FIG. 165, the chain 1136, which is used to synchronize movement of the spools 1112*a*, 1112*b*, rotates the spools 1112*a*, 1112*b* in the same direction. The cable 1102*a* may be configured to wrap over the top of the spool 1112*a*, and the cable 1102*b* may be configured to wrap under the spool 1112*b*. Thus, as the spools 1112*a*, 1112*b* rotate in unison, both of the cables 1102*a*, 1102*b* wrap on or wrap off the spools 1112*a*, 1112*b*. If the spools 1112*a*, 1112*b* are rotated in unison using meshing gears then the spools 1112*a*, 1112*b* rotate in opposite directions. In this situation, the cables 1102*a*, 1102*b* may both be configured to wrap over the top (or bottom) of the spools 1112*a*, 1112*b*, respectively. It should be appreciated that the direction which the cables 1102 wrap on the spools 1112 may be varied according to the particular configuration so that when the spools 1112 are rotated in unison, the bed 1090 moves in the same direction at each lifting assembly 630.

Figure 166:
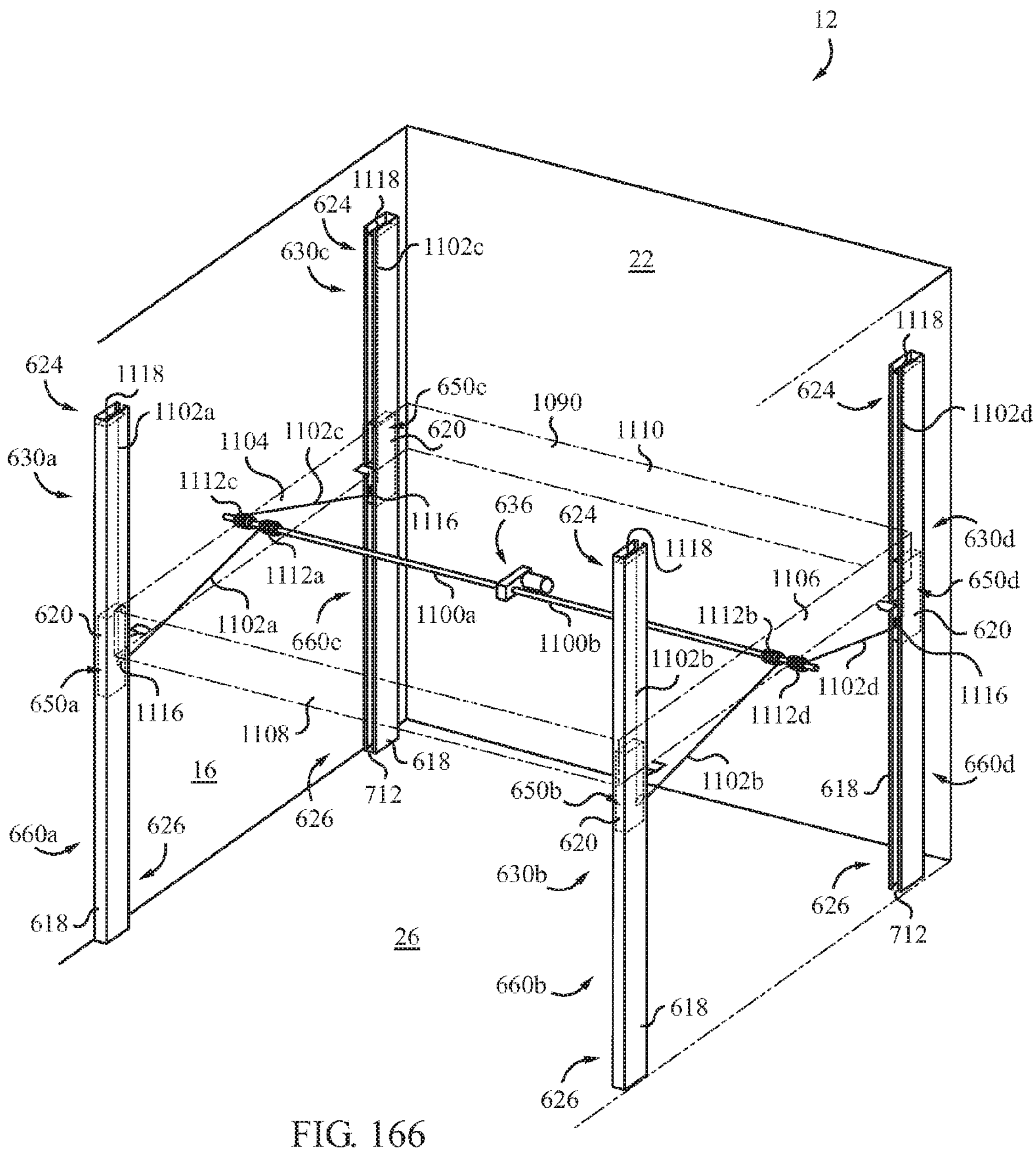

Referring to FIG. 166, another embodiment of the system 12 is shown. In this embodiment, the motor assembly 636, the rigid drive members 1100, and the spools 1112 are configured similar to the embodiment shown in FIG. 161. However, as shown in FIG. 166, the rigid drive members 1100 extend between the first side 1104 and the second side 1106 of the bed 1090. The spools 1112*a*, 1112*c* are positioned adjacent to the first side 1104, and the spools 1112*b*, 1112*d* are positioned adjacent to the second side 1106.

As shown in FIG. 166, in this embodiment, the gaps 712 in the guide members 618 of the lifting assemblies 630*a*, 630*c* face each other. Likewise, the gaps 712 in the guide members 618 of the lifting assemblies 630*b*, 630*d* also face each other. The moving assemblies 650 are configured so that the mounting members 840 extend through the gaps 712. The mounting members 840 may be used to couple the bed 1090 to the moving assemblies 650 in any of the ways previously described.

The cables 1102 are configured to extend from the spools 1112 to the pulleys 1116 and upward to the anchor assemblies 1118. In the embodiment shown in FIG. 166, the pulleys 1116 are coupled to the moving member 620. However, in other embodiments, the pulleys may be coupled to a frame member of the bed 1090 as explained previously. In operation, the motor assembly 636 drives the rigid drive members 1100, which, in turn, rotate the spools 1112. As the spools 1112 rotate, the cables 1102 wrap on or wrap off the spools 1112, thus, raising or lowering the bed 1090.

Figure 167:
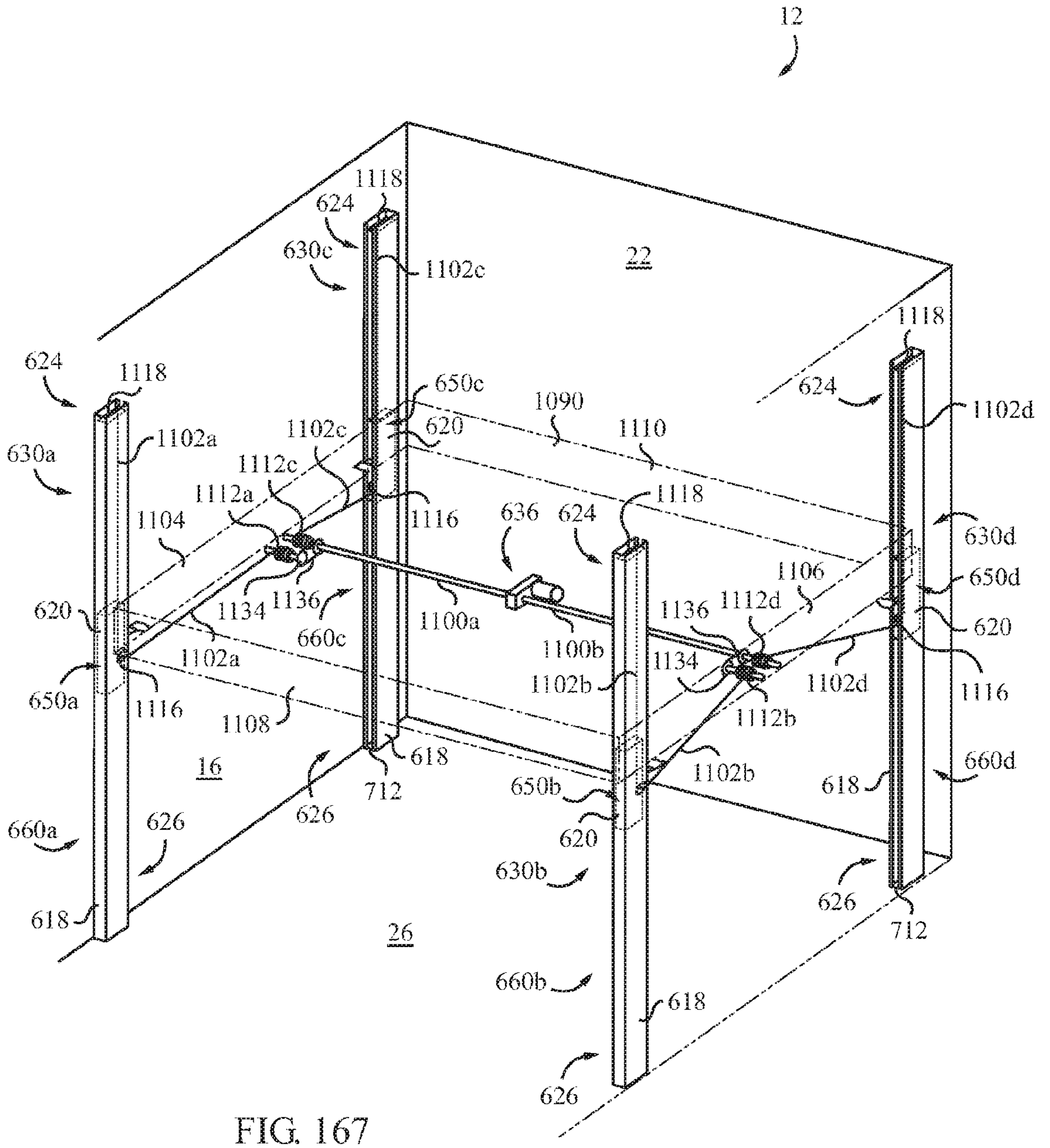

In another embodiment, shown in FIG. 167, the configuration of the embodiment of the system 12 shown in FIG. 166 may be modified so that the spools 1112*a*, 1112*c* and the spools 1112*b*, 1112*d* are offset and parallel to each other in a manner similar to that shown in FIG. 165. This may reduce the amount that the cables 1102 are laterally offset from the center of the gaps 712 in the guide members 618. As explained previously, the spools 1112*a*, 1112*c* and the spools

1112*b*, 1112*d* may be moved in unison using the sprockets 1134 and the chains 1136, as shown in FIG. 167, or using intermeshing gears.

Figure 168:
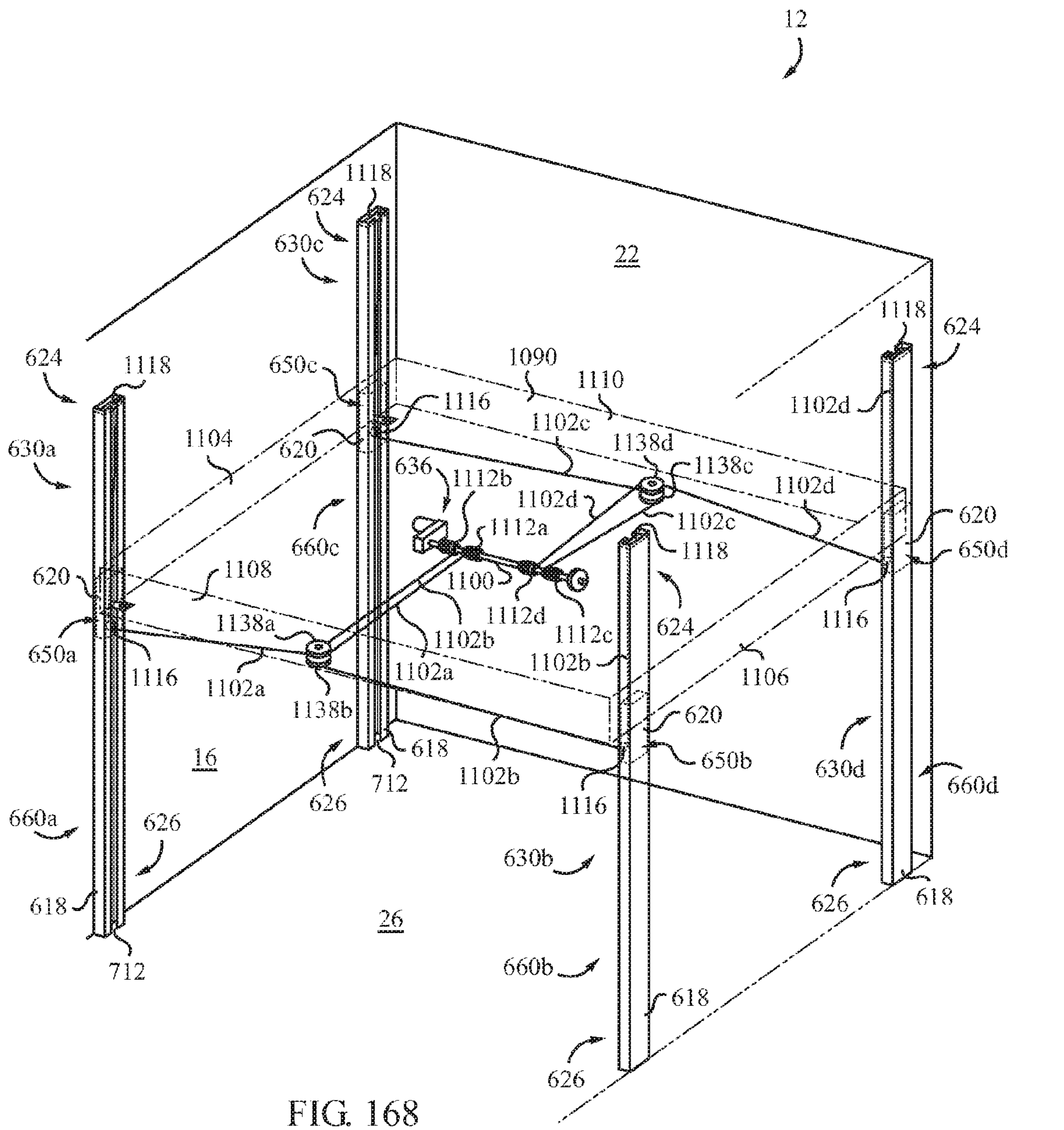

Another embodiment of the system 12 is shown in FIG. 168. In this embodiment, the cables 1102 are coupled to the upper ends 624 of the guide members 618 using the anchor assemblies 1118. The cables 1102 extend downward from the upper ends 624 of the guide members 618 through the channel 714 to the pulleys 1116. At the pulleys 1116, the cables extend outward from the guide members 618 in a direction which is generally parallel to the third side 1108 and the fourth side 1110 of the bed 1090 to pulleys or sheaves 1138*a*, 1138*b*, 1138*c*, 1138*d* (collectively referred to as "the pulleys 1138"). At the pulleys 1138, the cables 1102 change direction so that the cables 1102 extend in a direction which is generally parallel to the first side 1104 and the second side 1106 of the bed 1090. The cables 1102 extend in this direction until they reach the spools 1112. The spools 1112 are coupled to the rigid drive member 1100 which is rotated using the motor assembly 636. In this embodiment, a single rigid drive member 1100 is provided with the motor assembly 636 being coupled to the end of the single rigid drive member 1100. The rigid drive member 1100 extends perpendicular to the first side 1104 and the second side 1106 under the bed 1090.

In one embodiment, the pulleys 1138*a*, 1138*b* and the pulleys 1138*c*, 1138*d* may be provided as a double pulley assembly, respectively, with one double pulley assembly being positioned adjacent to the fourth side 1110 of the bed 1090 and another double pulley assembly being positioned adjacent to the third side 1108 of the bed 1090. The pulleys in each double pulley assembly may be positioned one above another as shown in FIG. 168. The use of the pulleys 1138 may be desirable in order to maintain the cables 1102 directly in front of the gap 712 in the guide members 618. Thus, the lateral movement of the cables 1102 occurs between the pulleys 1138 and the spools 1112.

Figure 169:
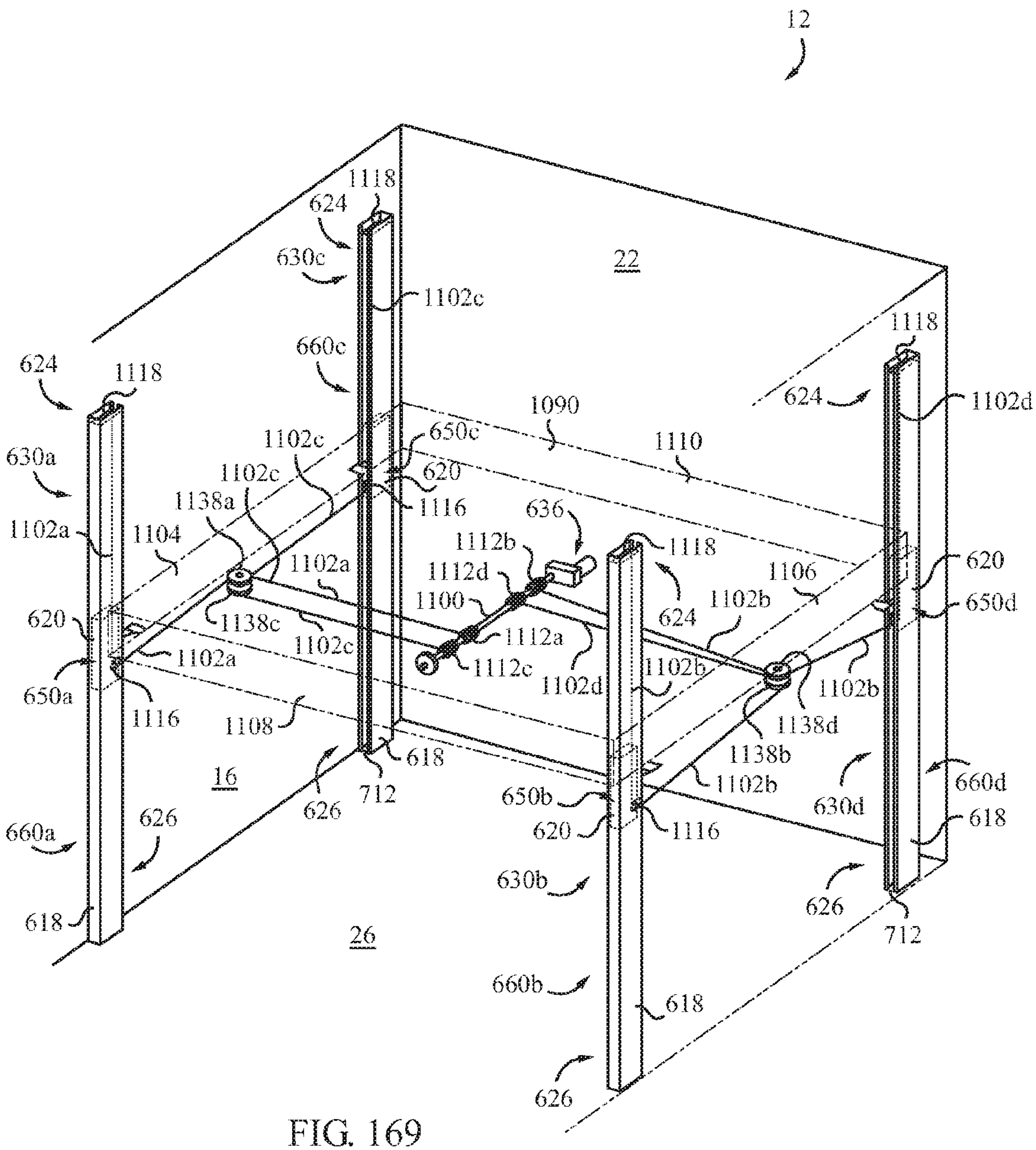

In another embodiment, shown in FIG. 169, the lifting assemblies 630 may be configured as shown in FIG. 166, and the pulleys 1138*a*, 1138*c* and the pulleys 1138*b*, 1138*d* may be positioned adjacent to the first side 1104 and the second side 1106, respectively, of the bed 1090. Also, the rigid drive member 1100 may be perpendicular to the third side 1108 and the fourth side 1110 of the bed 1090. In operation, the cables 1102 wrap on or wrap off the spools 1112 to raise and lower the bed 1090. In general, this embodiment is similar to the embodiment shown in FIG. 168 except that in this embodiment, the pulleys 1138, the rigid drive member 1100, and the motor assembly 636 have been rotated 90 degrees.

Figure 170:
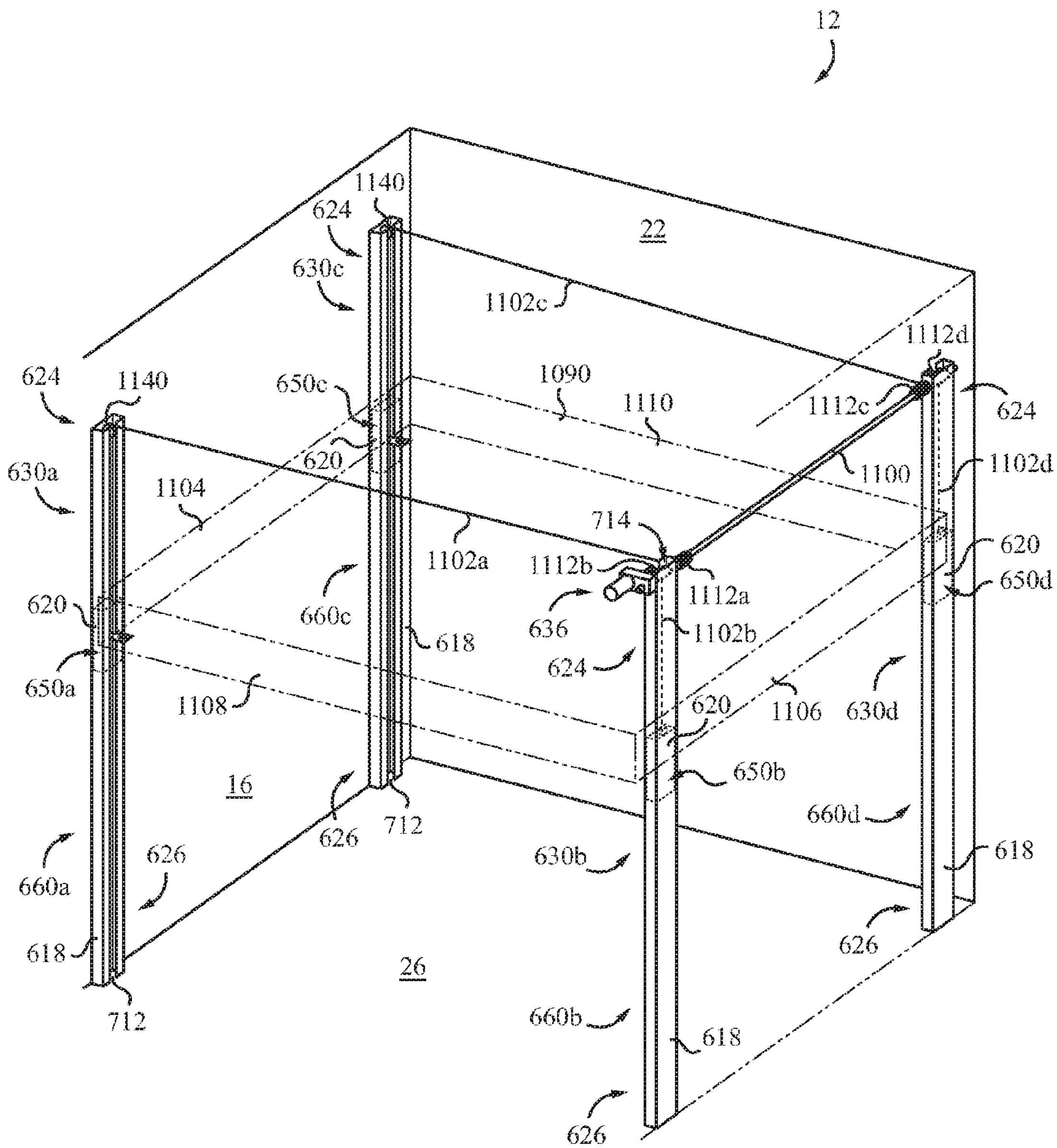
Figure 171:
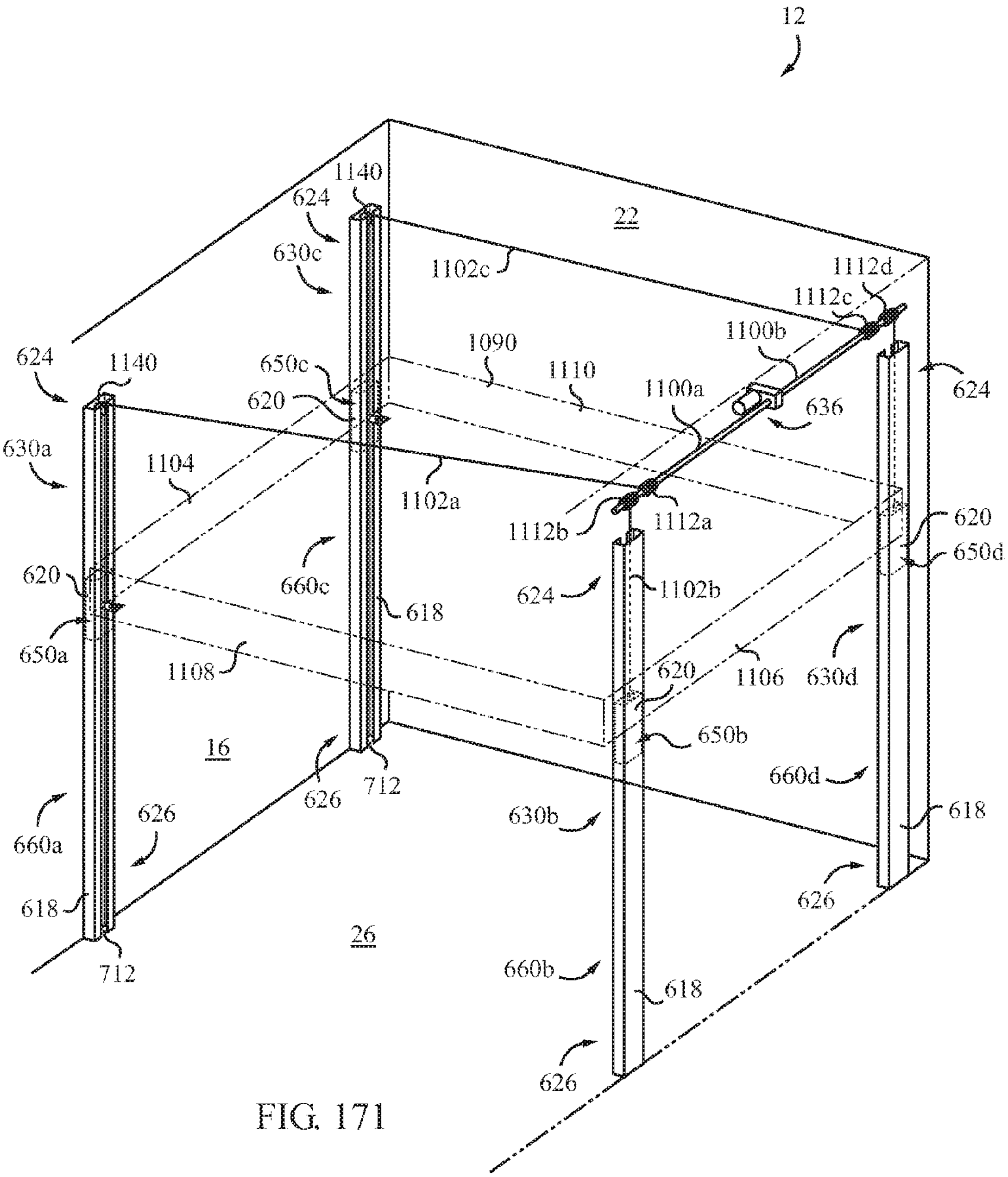

Referring to FIGS. 170-171, another embodiment is shown of the system 12. In this embodiment, the rigid drive member 1100 and the motor assembly 636 are positioned adjacent to the ceiling 24 (FIG. 1). Specifically, as shown in this embodiment, the rigid drive member 1100 extends between the upper ends 624 of the lifting assemblies 630*b*, 630*d*. The spools 1112*b*, 1112*d* are coupled to the rigid drive member 1100 and are positioned in the channels 714 of the guide members 618 of the respective lifting assemblies 630*b*, 630*d*, as shown in FIG. 171. The spools 1112*a*, 1112*c* are coupled to the rigid drive member 1100 at a location adjacent to the guide members 618 of the lifting assemblies 630*b*, 630*d*.

Cables 1102*b*, 1102*d* extend from the spools 1112*b*, 1112*d*, respectively, downward through the channels 714 of the guide members 618 to the moving members 620 of the moving assemblies 650*b*, 650*d*. The Cables 1102*b*, 1102*d* may be coupled to the moving members 620 in any suitable manner. Cables 1102*a*, 1102*c* extend from the spools 1112*a*, 1112*c*, respectively, to pulleys 1140 coupled to the upper ends 624 of the lifting assemblies 630*a*, 630*c*. The cables 1102*a*, 1102*c* wrap around the pulleys 1140 and extend downward through the channels 714 of the guide members 618 and are coupled to the moving members 620 of the moving assemblies 650*a*, 650*c*, respectively.

The motor assembly 636 may be coupled to the guide member 618 of the lifting assembly 630*b*, as shown in FIG. 170. The motor assembly 636 may also be coupled to the second side wall 18 or the ceiling 24 at a position between the rigid drive members 1100*a*, 1100*b* as shown in FIG. 171. It should be appreciated that the motor assembly 636 may be positioned in any suitable location so long as the motor assembly 636 is capable of engaging the rigid drive member 1100.

In operation, the bed 1090 may be raised and lowered as the cables 1102 wrap on or off the spools 1112. This embodiment may be desirable due to its simplicity and relatively low cost.

Figure 172:
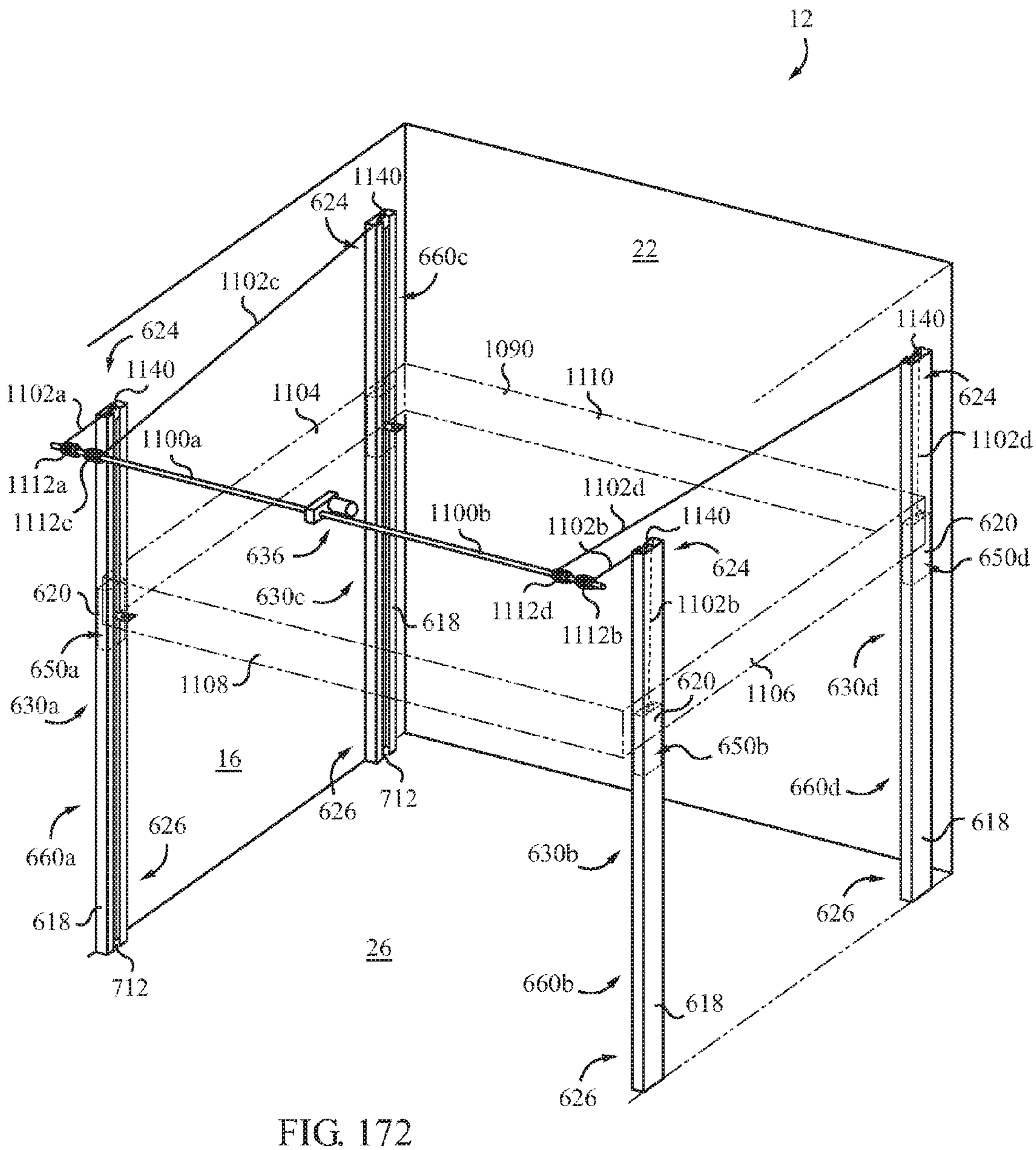
Figure 173:
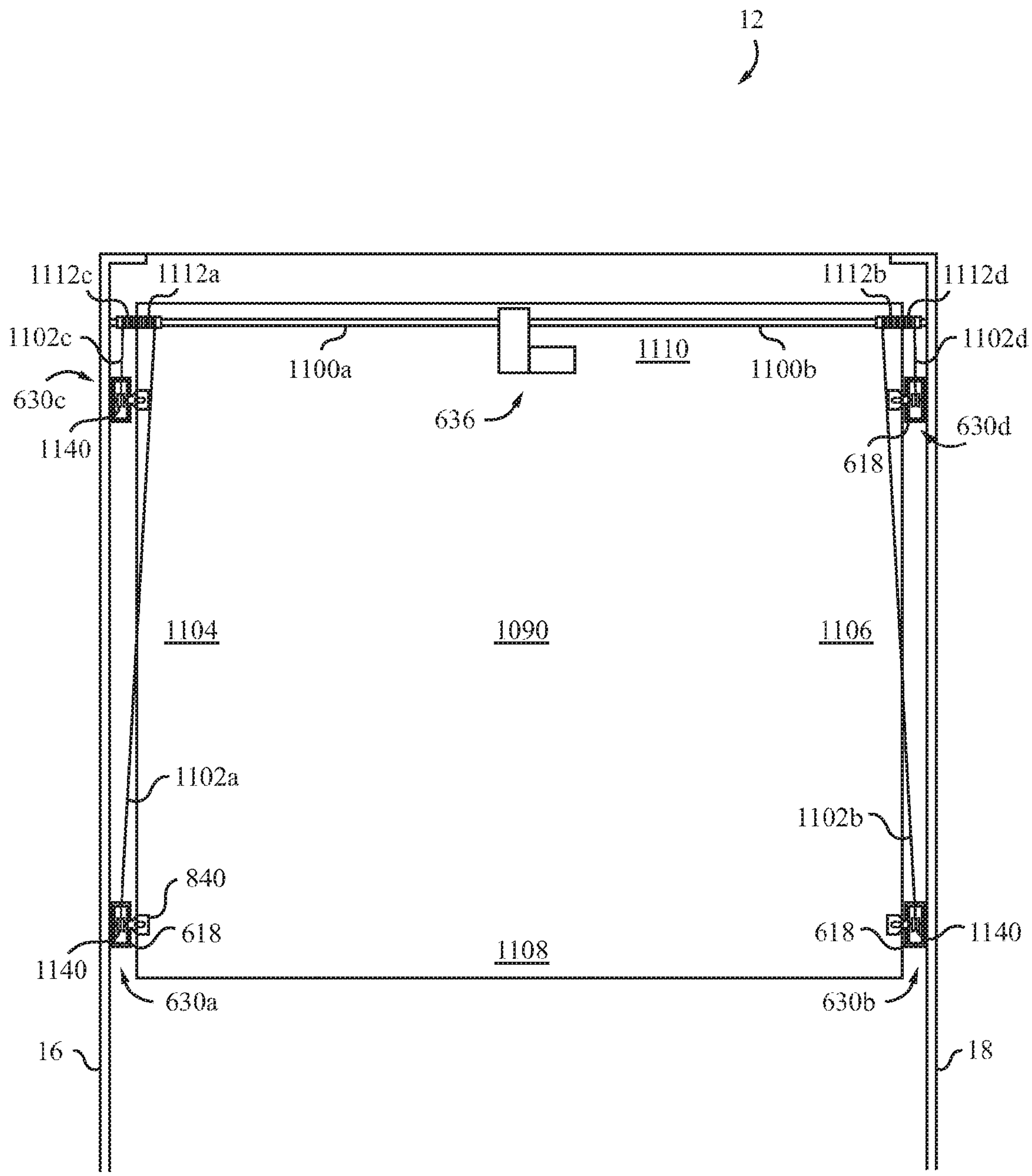

Referring to FIGS. 172-173, another embodiment of the system 12 is shown. This embodiment is similar in many ways to the embodiment shown in FIGS. 170-171. However, in this embodiment, the rigid drive members 1100 extend between the side walls 16, 18 and are positioned to one side of the lifting assemblies 630 with the lifting assemblies 630*a*, 630*b* being the closest to the rigid drive members 1100. Spools 1112*a*, 1112*c* are coupled to the rigid drive member 1100*a* adjacent to the first side wall 16. Cables 1102*a*, 1102*c* extend from the spools 1112*a*, 1112*c* over the pulleys 1140 at the upper end 624 of the lifting assemblies 630*a*, 630*c* and downward to the moving assemblies 650*a*, 650*c*, respectively. Cables 1102*b*, 1102*d* extend from the spools 1112*b*, 1112*d* over the pulleys 1140 at the upper end 624 of the lifting assemblies 630*b*, 630*d* and downward to the moving assemblies 650*b*, 650*d*, respectively. In operation, the motor assembly 636 rotates the rigid drive members 1100 to wrap the cables 1102 on or off the spools 1112, thus, raising and lowering the moving assemblies 650 and, hence, the bed 1090.

FIG. 173 shows a top view of another embodiment of the system 12. This embodiment is similar to the embodiment shown in FIG. 172. However, unlike in FIG. 172, the rigid drive members 1100 are positioned off to the opposite side of the lifting assemblies 630 so that the lifting assemblies 630*c*, 630*d* are the closest lifting assemblies 630 to the rigid drive member 1100. Otherwise, the operation and configuration of the cables 1102, spools 1112, etc. is similar to that shown in FIG. 172.

Figure 174:
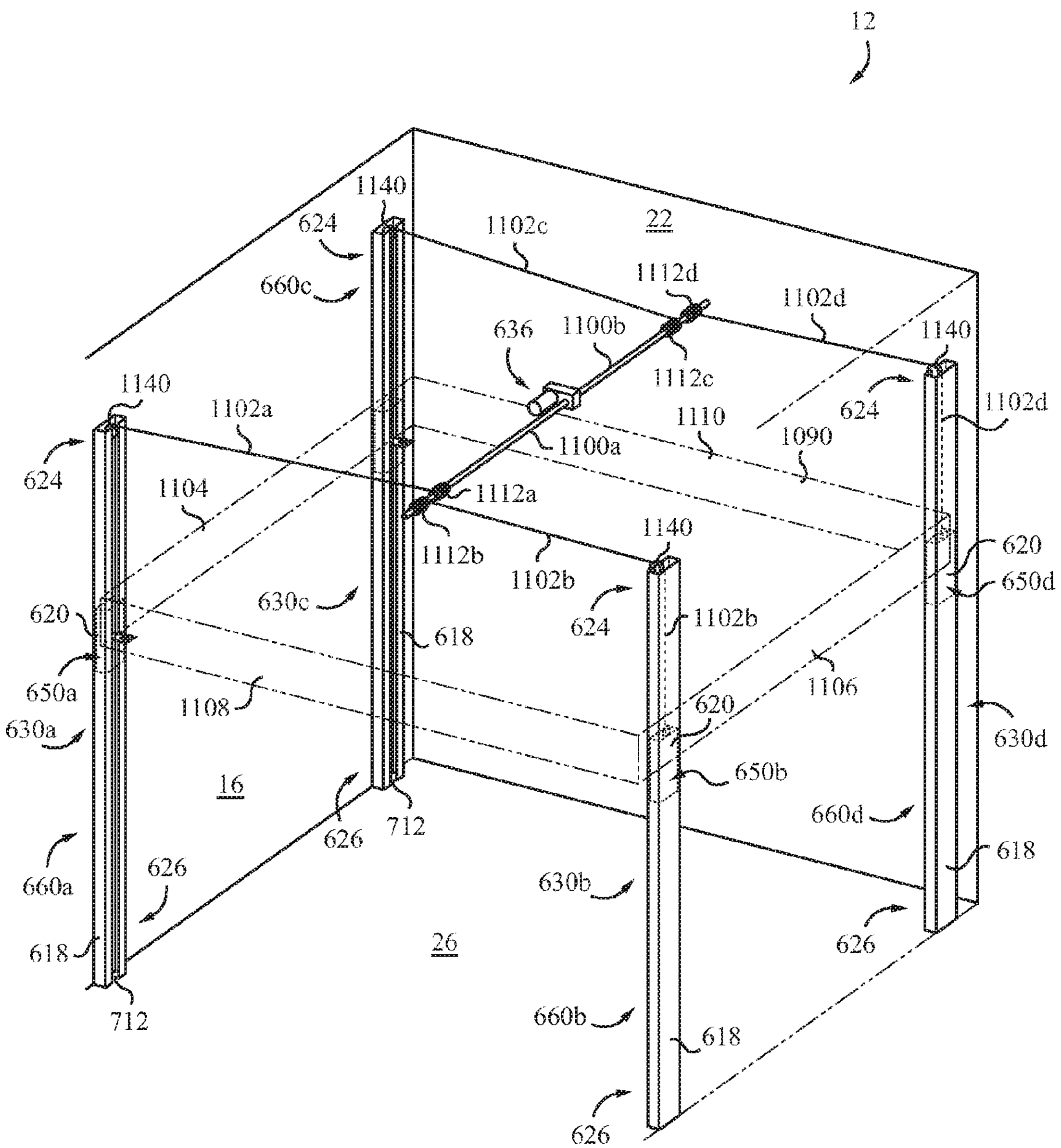
Figure 175:
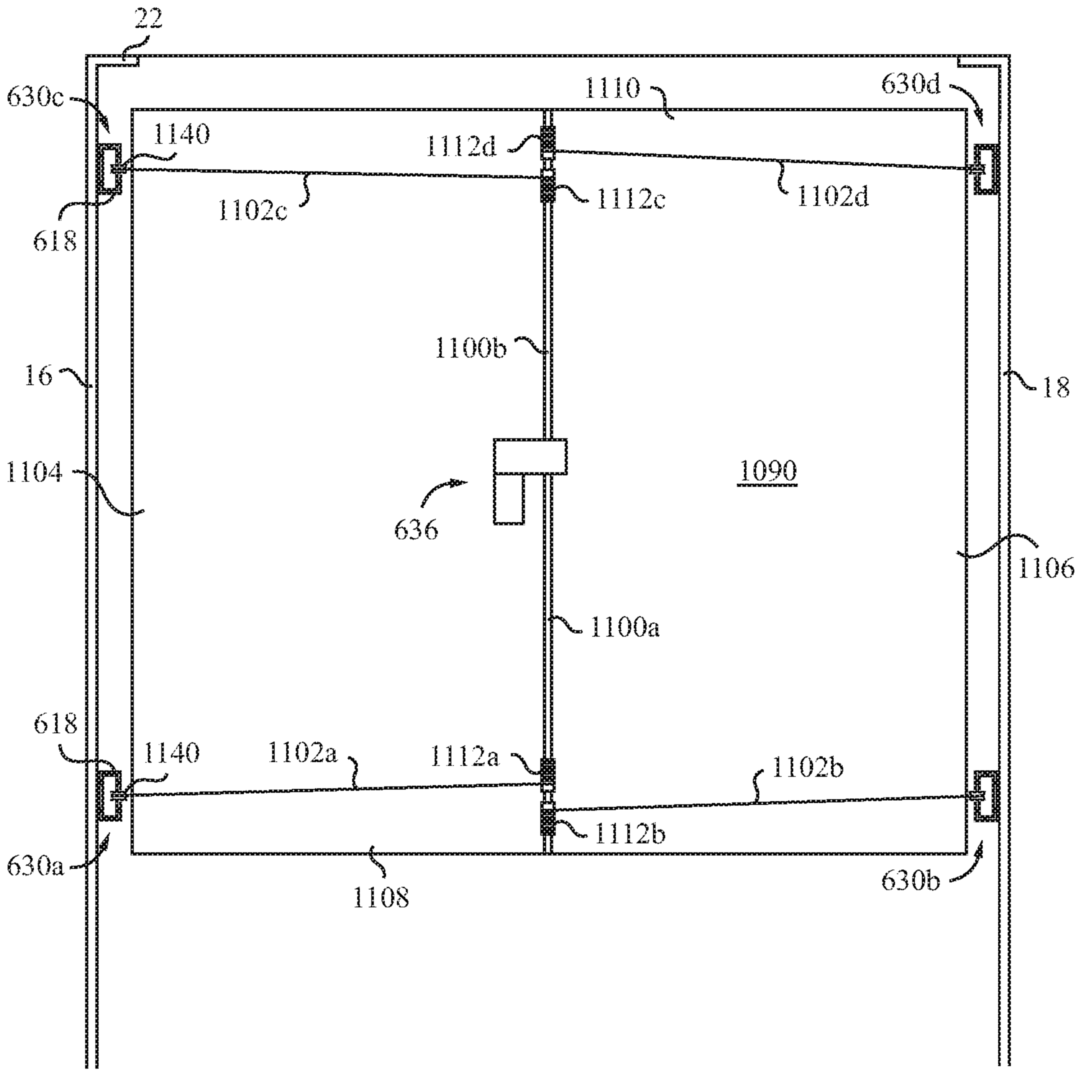

Referring to FIGS. 174-175, another embodiment of the system 12 is shown. In this embodiment, the rigid drive members 1100 extend parallel to the side walls 16, 18 and are positioned between the lifting assemblies 630*a*, 630*c* and the lifting assemblies 630*b*, 630*d*. The spools 1112*a*, 1112*b* are coupled to the rigid drive member 1100*a* and are positioned above the third side of the bed 1090. The spools 1112*c*, 1112*d* are coupled to the rigid drive member 1100*b* and are positioned above the fourth side of the bed 1090. The motor assembly 636 is coupled between the rigid drive members 1100*a*, 1100*b*.

The cables 1102 extend away from the spools 1112 toward the side walls 16, 18 where the cables 1102 wrap around the pulleys 1140 positioned at the upper end of the lifting assemblies 630. The cables 1102 extend from the pulleys 1140 and are coupled to the moving assemblies 650. Thus, as the motor assembly 636 rotates, the cables 1102 wrap on or wrap off the spools 1112 and, hence, vertically move the bed 1090.

Figure 176:
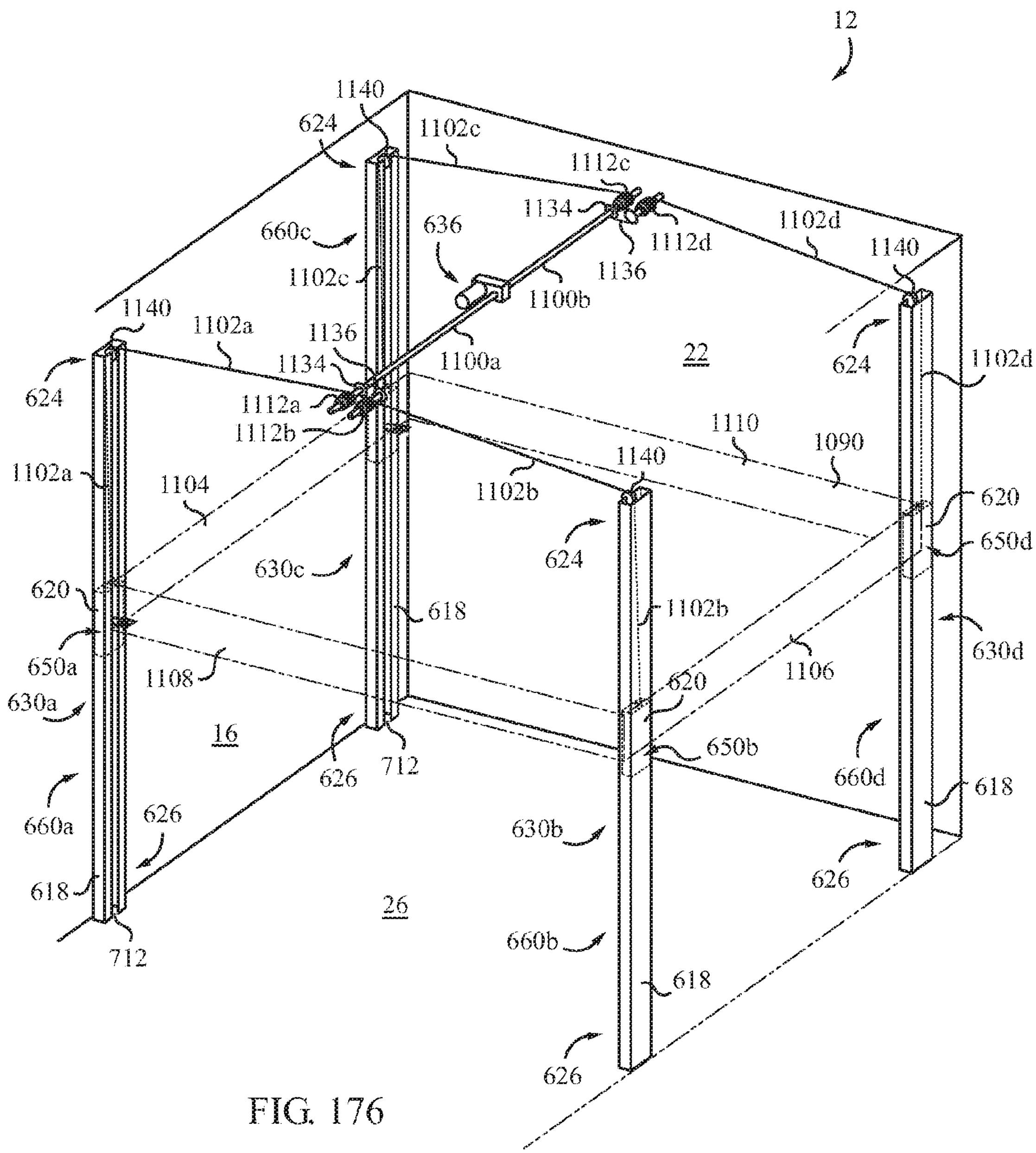
Figure 177:
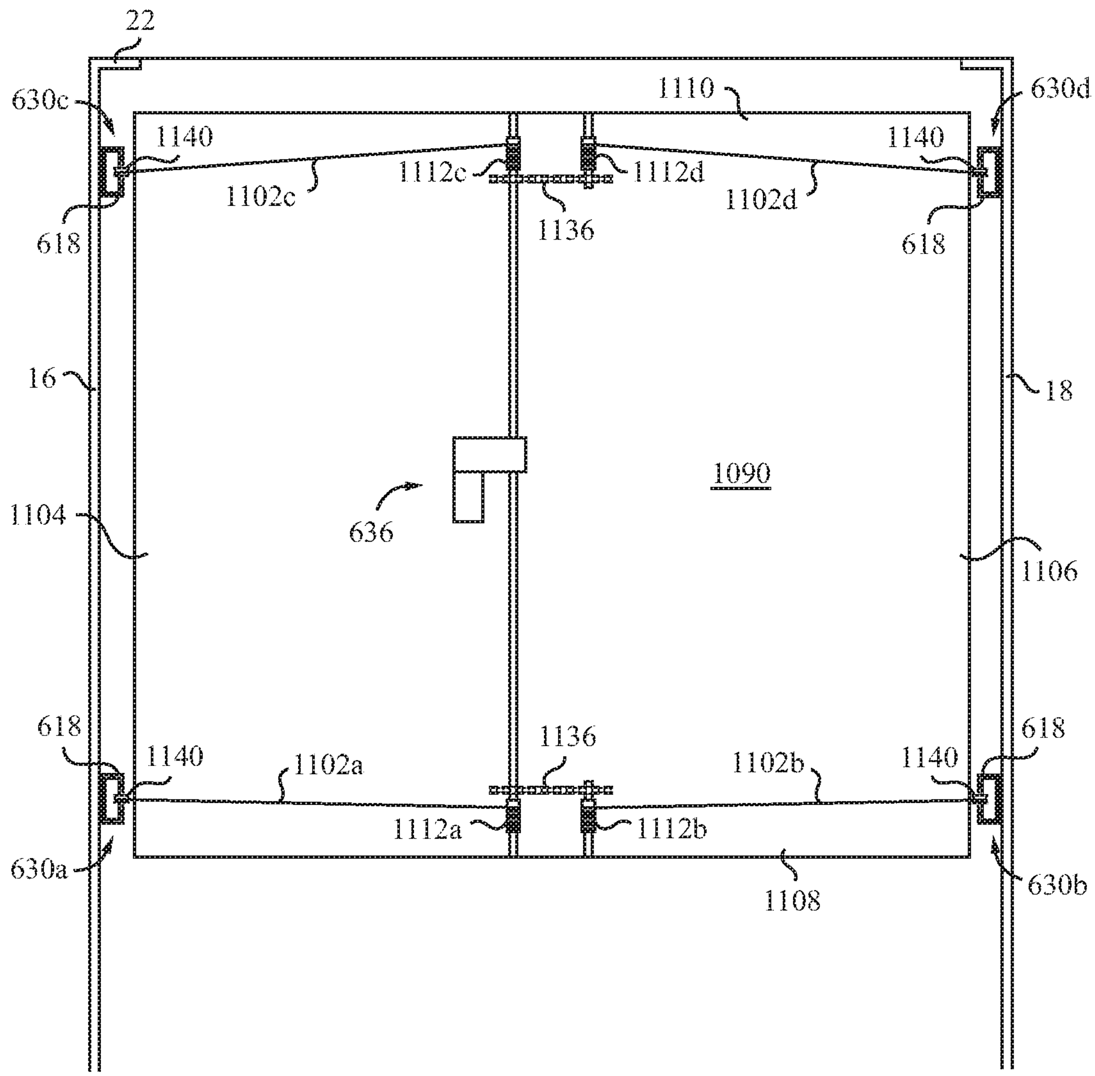

It should be appreciated that the embodiment shown in FIGS. 174-175 may be modified in a number of ways. For example, as shown in FIGS. 176-177, the spools 1112*a*, 1112*b* and the spools 1112*c*, 1112*d* may be offset and parallel to each other as explained previously. The spools 1112*a*, 1112*b* and the spools 1112*c*, 1112*d* may be rotated in unison, respectively, using the sprockets 1134 and the chains 1136.

Figure 178:
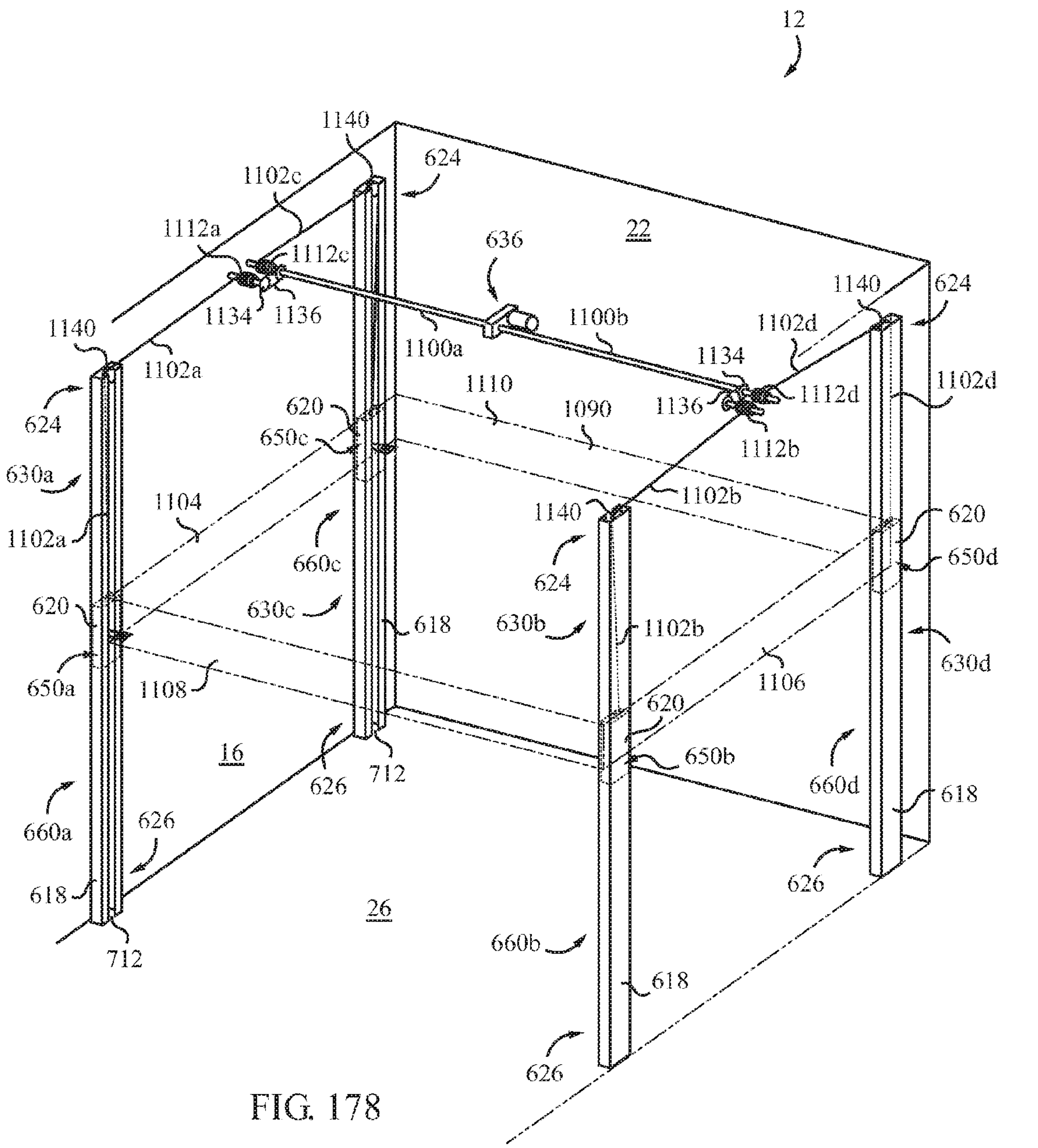
Figure 179:
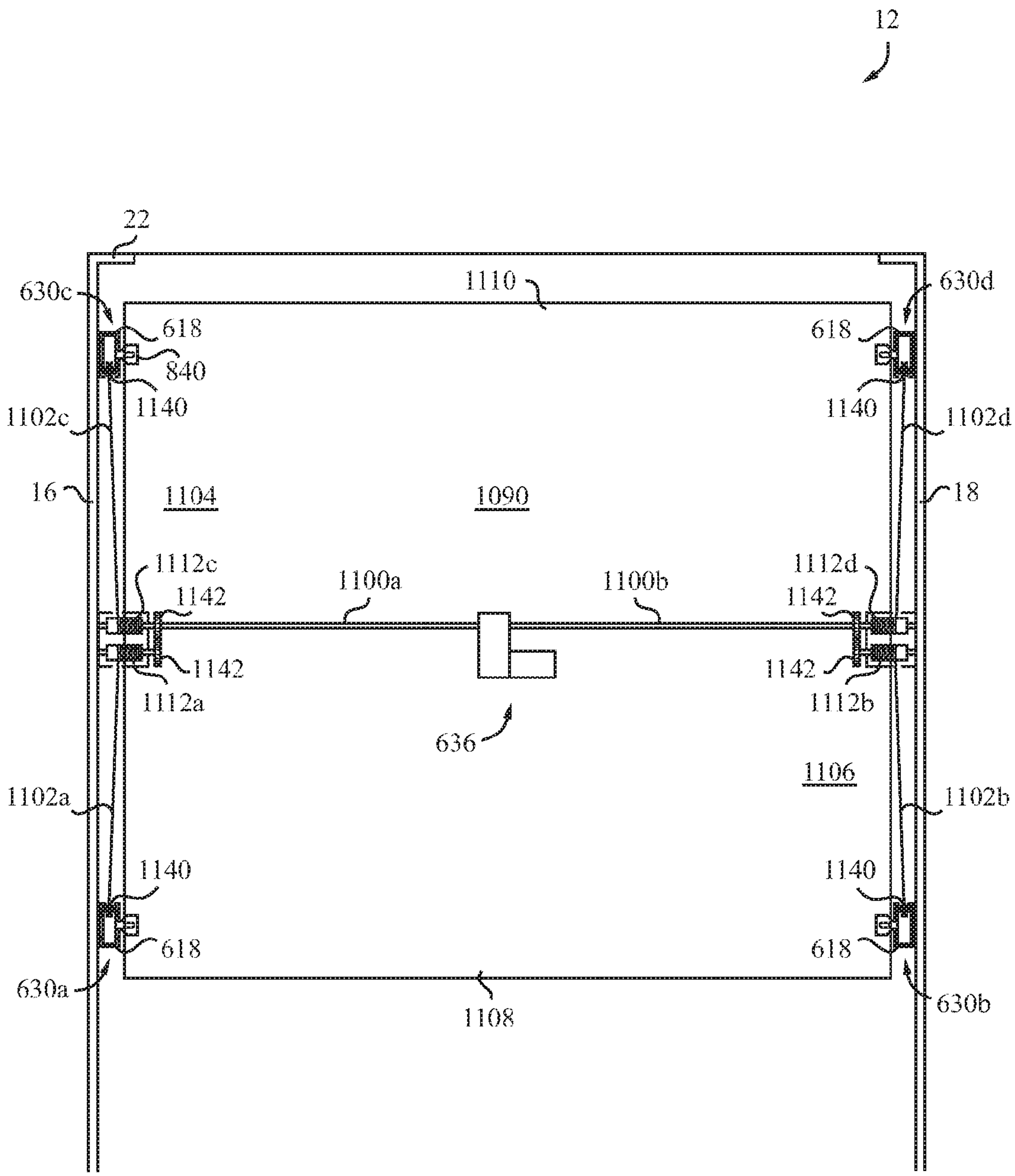

Referring to FIGS. 178-179, another embodiment is shown of the system 12. In many ways this embodiment is similar to the embodiment shown in FIG. 172. In this embodiment, the rigid drive members 1100 are positioned perpendicular to the side walls 16, 18 between the lifting assemblies 630*a*, 630*b* and the lifting assemblies 630*c*, 630*d*. Also, the spools 1112*a*, 1112*c* and the spools 1112*b*, 1112*d* are offset and parallel to each other as explained previously. The movement of the spools 1112*a*, 1112*c* and the spools 1112*b*, 1112*d* may be synchronized using the sprockets 1134 and the chains 1136 shown in FIG. 178 or intermeshing gears 1142 as shown in FIG. 179. The cables 1102 wrap on and off the spools 1112 to vertically move the bed 1090.

Figure 180:
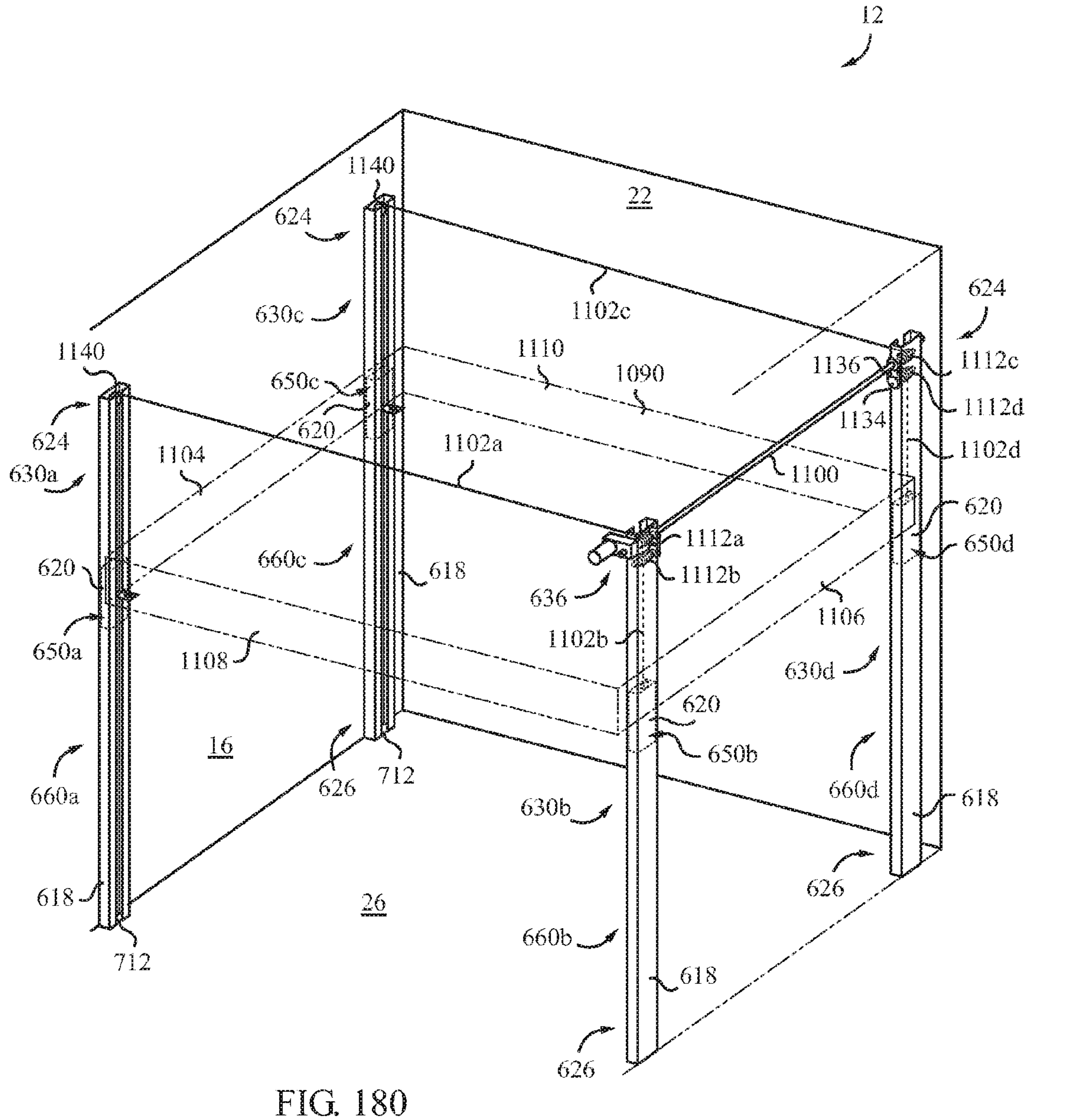
Figure 181:
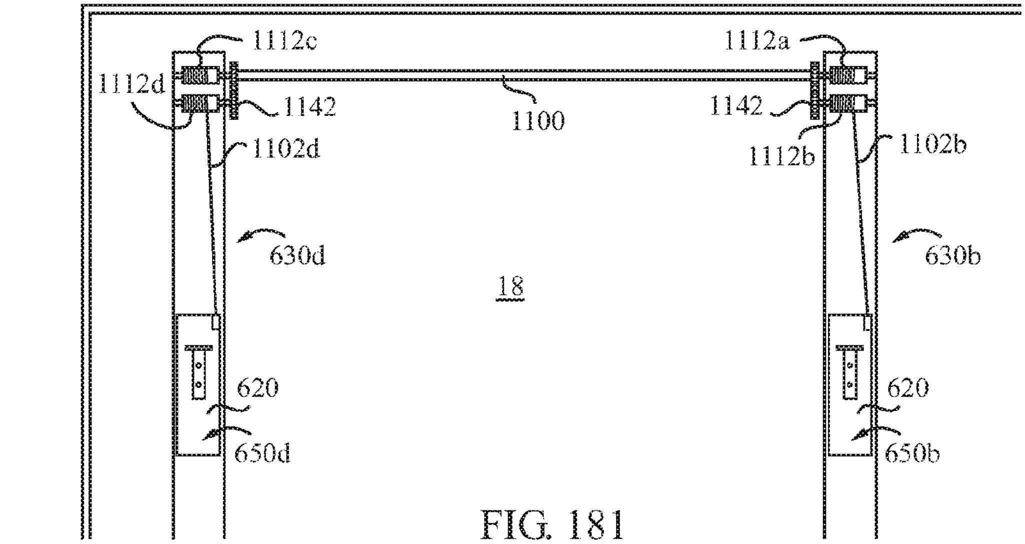
Figure 182:
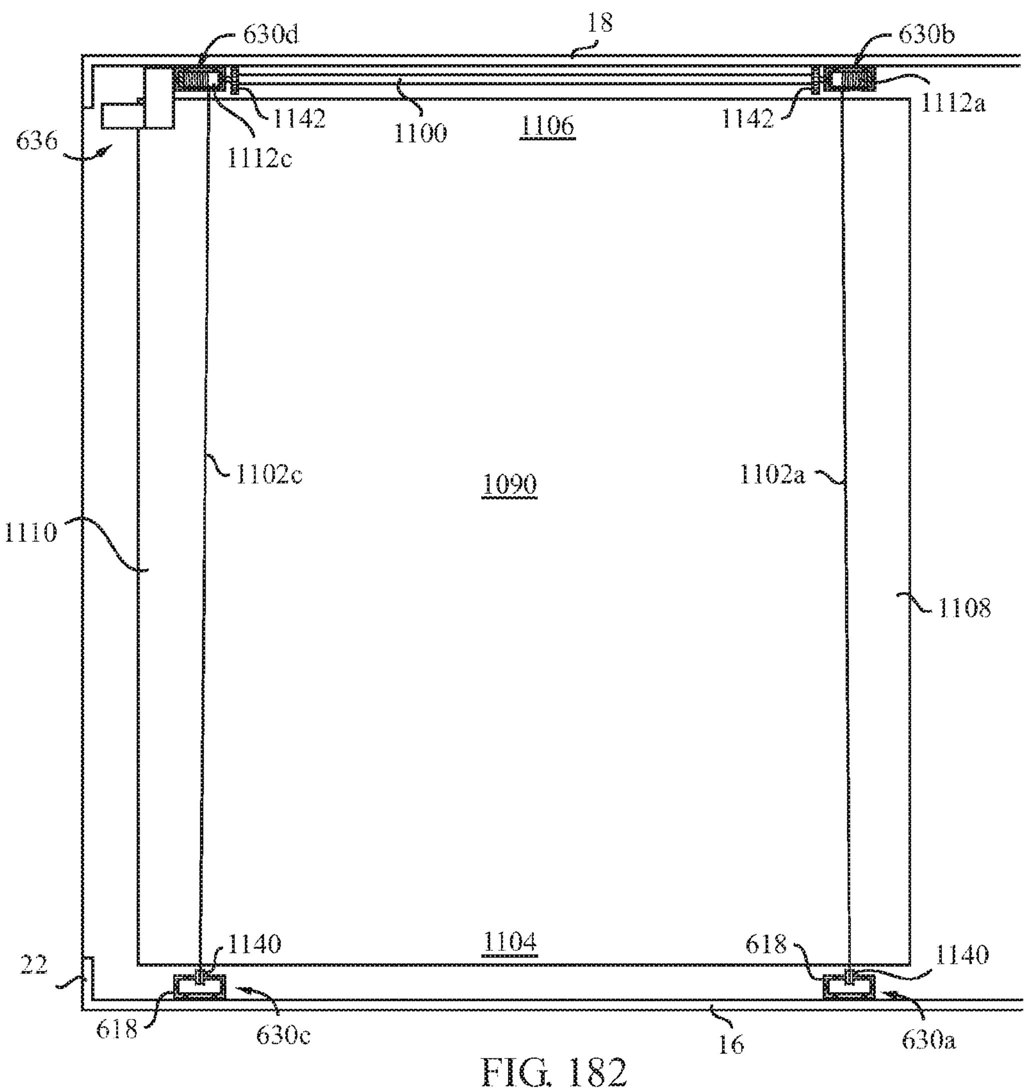

Referring to FIGS. 180-182, another embodiment is shown of the system 12. In this embodiment, the rigid drive member 1100 extends between the upper ends 624 of the lifting assemblies 630*b*, 630*d* in a manner similar to that shown in FIGS. 170-171. However, unlike FIGS. 170-171, the spools 1112*a*, 1112*b* and the spools 1112*c*, 1112*d* may be positioned in the channels 714 of the guide members 618 of the lifting assemblies 630*b*, 630*d*, respectfully. In one embodiment, the spools 1112*a*, 1112*c* may be coupled to the rigid drive member 1100 in the channels 714 of the lifting assemblies 630*b*, 630*d*, respectively. The spools 1112*b*, 1112*d* may be rotatably coupled to the guide members 618 of the lifting assemblies 630*b*, 630*d* at a position below the spools 1112*a*, 1112*c*, respectively. The spools 1112*a*, 1112*b* and the spools 1112*c*, 1112*d* may be rotated in unison using the sprockets 1134 and chains 1136, as shown in FIG. 180, or the intermeshing gears 1142, as shown in FIGS. 181-182.

The cables 1102*a*, 1102*c* extend from the spools 1112*a*, 1112*c* to the pulleys 1140 coupled to the lifting assemblies 630*a*, 630*c* and downward to the moving assemblies 650*a*, 650*c*. The cables 1102*b*, 1102*d* extend downward from the spools 1112*b*, 1112*d* to the moving assemblies 650*b*, 650*d*. In operation, the cables 1102 wrap on and off the spools 1112 depending on the direction that the rigid drive member 1100 is rotated. In this manner, the bed 1090 may be selectively raised and lowered as desired.

Figure 183:
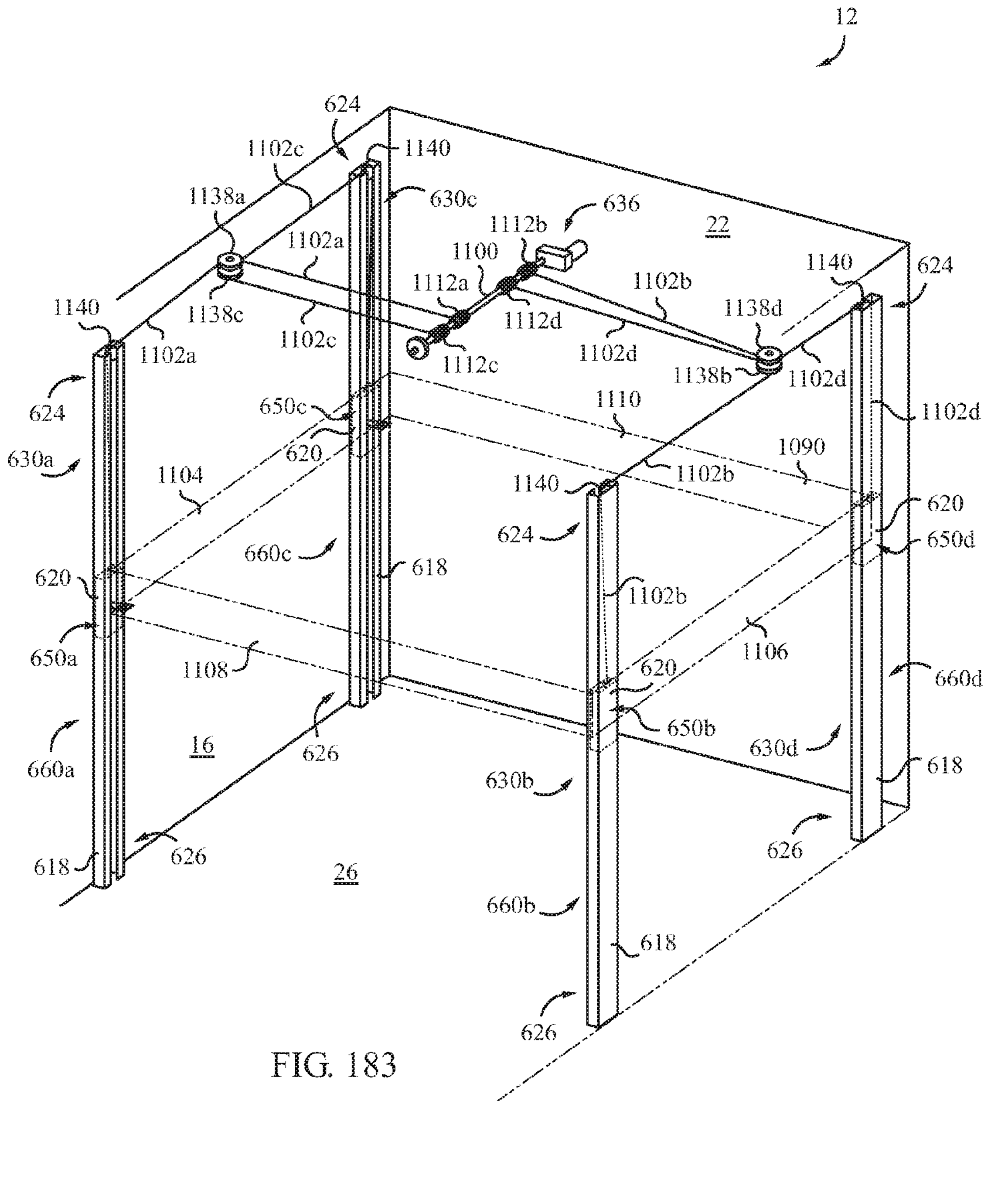
Figure 184:
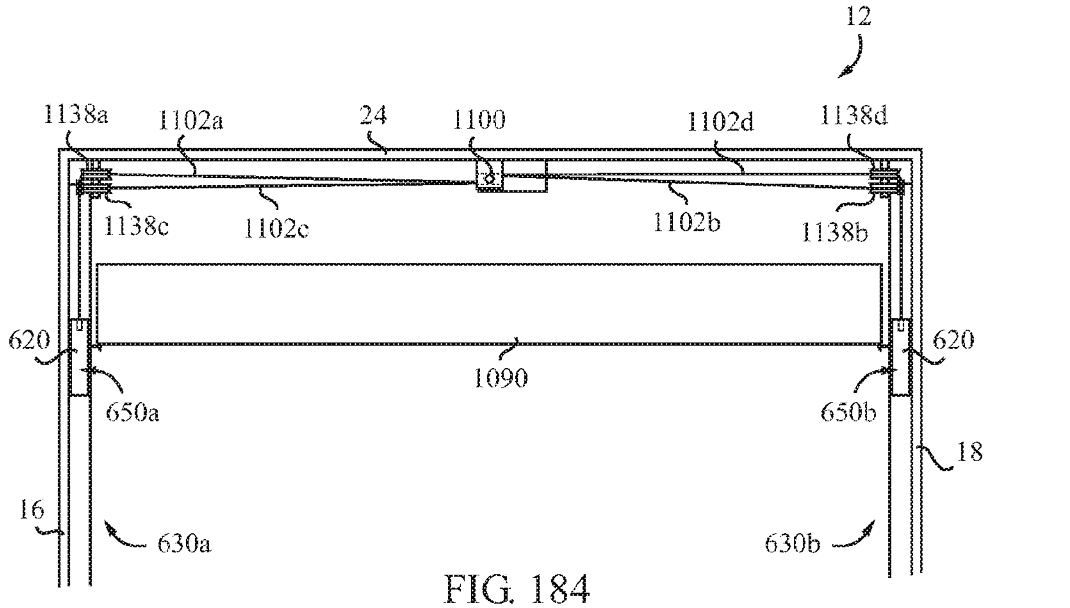
Figure 185:
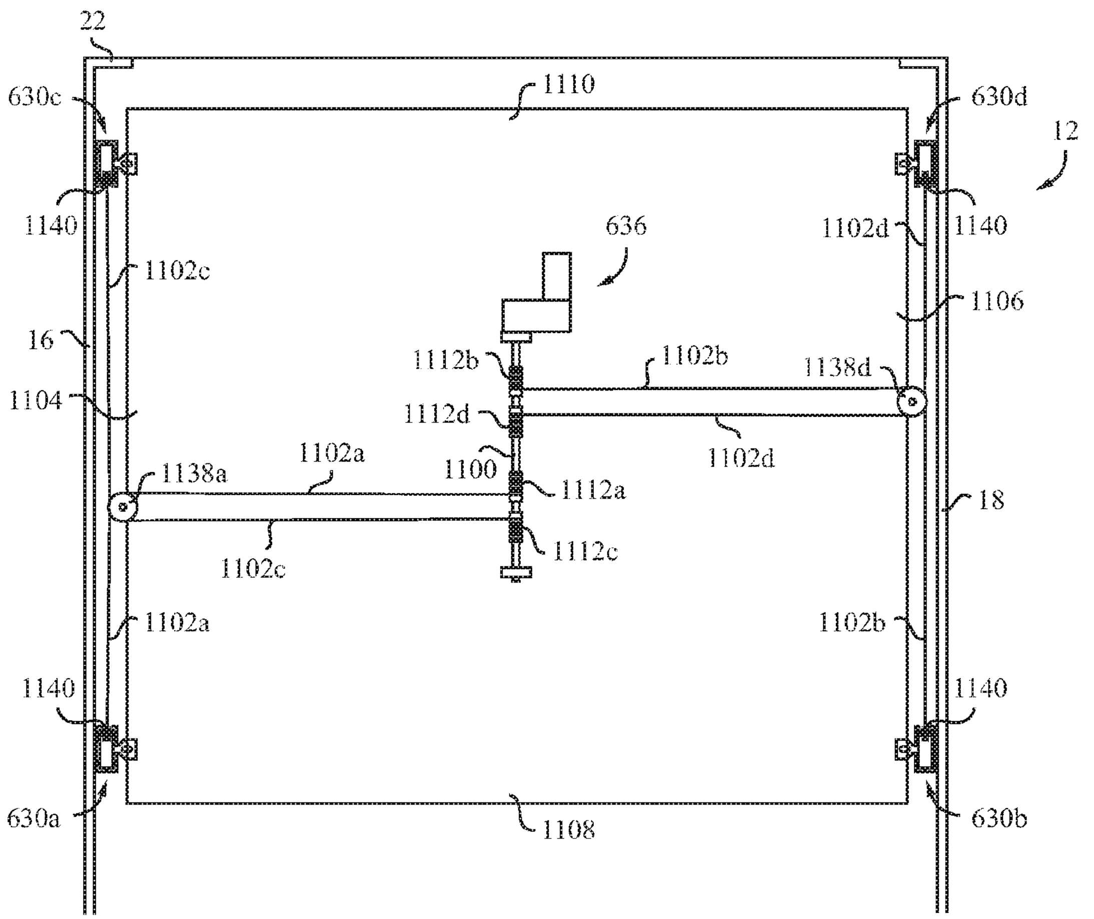

Referring to FIGS. 183-185, another embodiment of the system 12 is shown. In this embodiment, the rigid drive member 1100 may be coupled to the ceiling 24 directly above the middle of the bed 1090. The rigid drive member 1100 extends in a direction which is parallel to the side walls 16, 18. The cables 1102 extend from the spools 1112 coupled to the rigid drive member 1100 toward the side walls 16, 18 where the cables 1102 wrap around the pulleys 1138. The cables 1102 extend from the pulleys 1138 in a direction which is parallel to the side walls 16, 18 until the cables reach the pulleys 1140 coupled to the upper ends 624 of the lifting assemblies 630. The cables 1102 extend from the pulleys 1140 downward to where the cables are coupled to the moving assemblies 650. Rotating the rigid drive member 1100 wraps the cables 1102 on and off the spools 1112 to vertically move the bed 1090.

Figure 186:
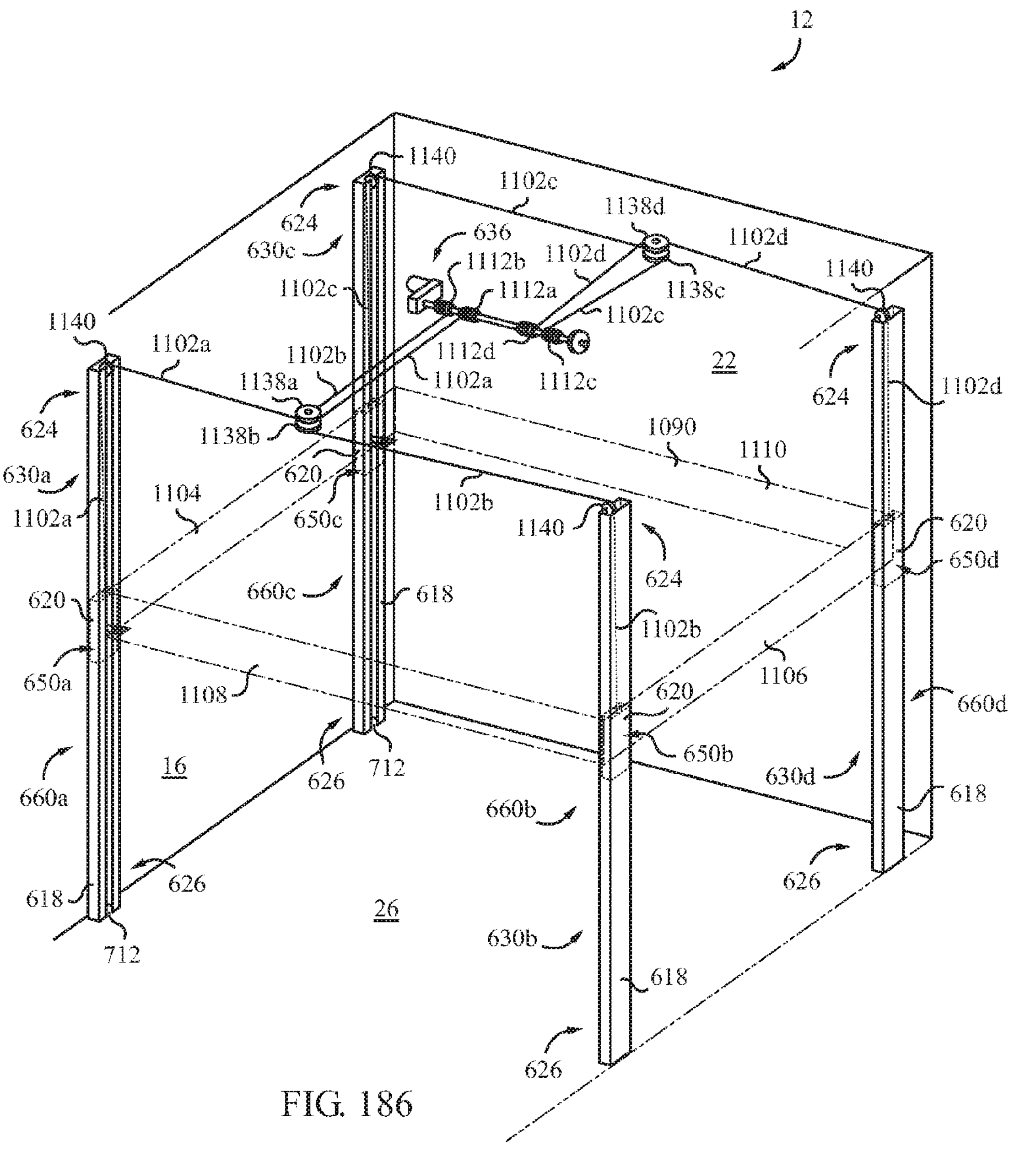
Figure 187:
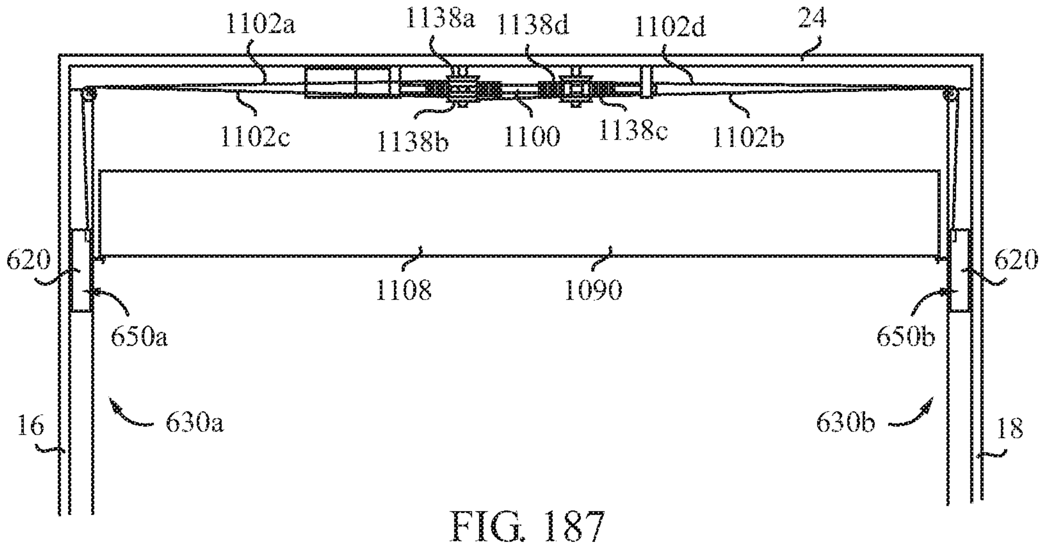
Figure 188:
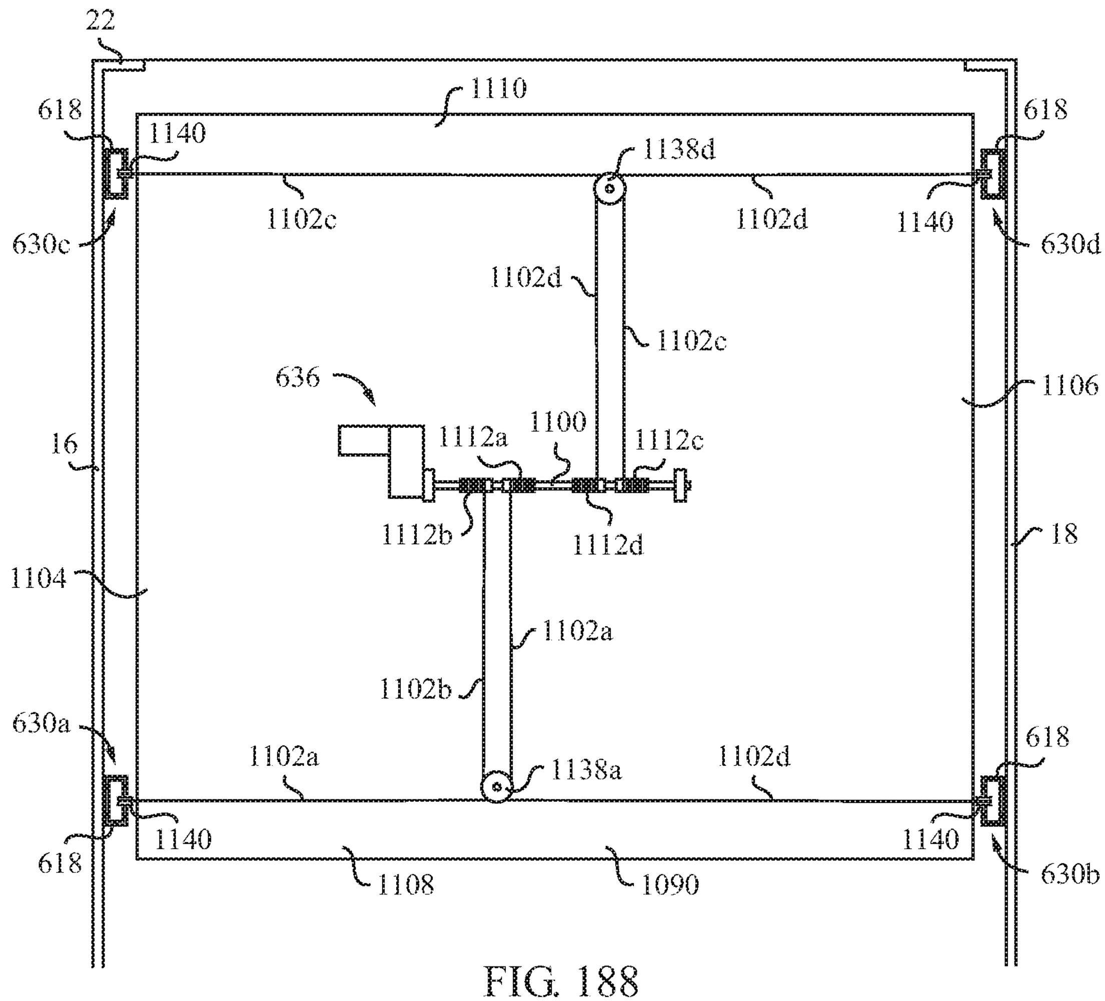

Referring to FIGS. 186-188, another embodiment of the system 12 is shown. In this embodiment, the rigid drive member 1100 may be coupled to the ceiling 24 directly above the middle of the bed 1090 also. However, in this embodiment, the rigid drive member 1100 extends in a direction which is perpendicular to the side walls 16, 18. The cables 1102 extend from the spools 1112 coupled to the rigid drive member 1100 in a direction which is parallel to the side walls 16, 18 and toward the third side 1108 and the fourth side 1110 of the bed 1090 where the cables 1102 wrap around the pulleys 1138. The cables 1102 extend from the pulleys 1138 in a direction which is perpendicular to the side walls 16, 18 until the cables reach the pulleys 1140 coupled to the upper ends 624 of the lifting assemblies 630. The cables 1102 extend from the pulleys 1140 downward to where the cables 1102 are coupled to the moving assemblies 650. Rotating the rigid drive member 1100 wraps the cables 1102 on and off the spools 1112 to vertically move the bed 1090.

Figure 189:
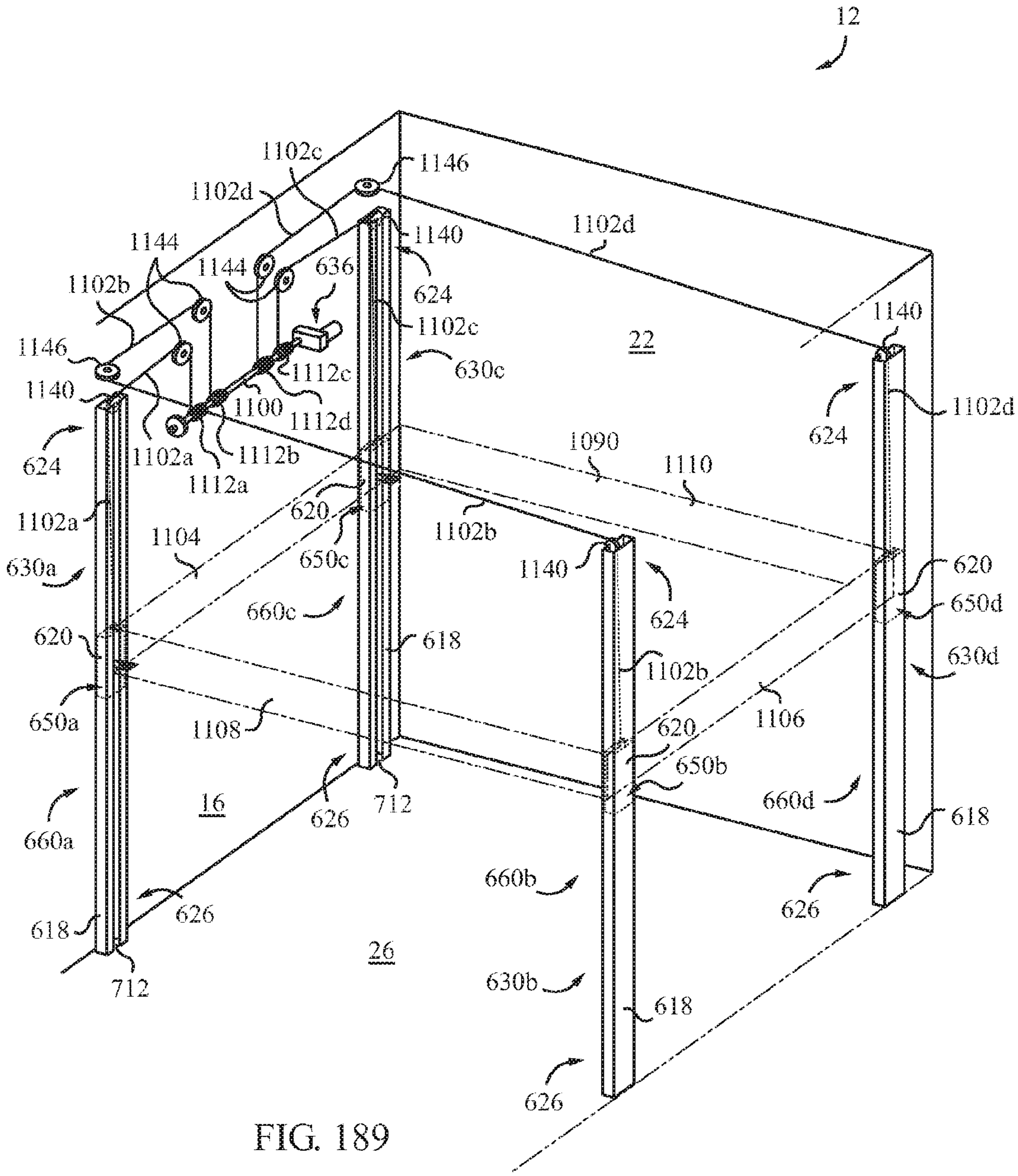

Referring to FIG. 189, another embodiment of the system 12 is shown. In this embodiment, the rigid drive member 1100 may be coupled to the first side wall 16 between the lifting assemblies 630*a*, 630*c*. In one embodiment, the rigid drive member 1100 may be positioned horizontally. The motor assembly 636 is coupled to one end of the rigid drive member 1100 and is used to drive the rigid drive member 1100. The spools 1112 are coupled to the rigid drive member 1100 so that when the rigid drive member 1100 rotates, the cables 1102 wrap on or off the spools 1112.

The cables are coupled to the spools 1112 and extend upward to the pulleys 1144. The pulleys 1144 are positioned so that the cables 1102*b*, 1102*d* extend further up than the cables 1102*a*, 1102*c*. The cables 1102*c*, 1102*d* extend from the pulleys 1144 toward the lifting assembly 630*c*. The cable 1102*c* wraps over the pulley 1140 coupled to the upper end 624 of the lifting assembly 630*c* and extends downward to where the cable 1102*c* is coupled to the moving assembly 650*c*. The cable 1102*d* wraps around the pulley 1146 coupled to the first side wall 16 above the upper end 624 of the lifting assembly 630*c* and extends toward the lifting assembly 630*d*. The cable 1102*d* wraps over the pulley 1140 coupled to the upper end 624 of the lifting assembly 630*d* and extends downward to where the cable 1102*d* is coupled to the moving assembly 650*d*.

The cables 1102*a*, 1102*b* are configured similarly to the cables 1102*c*, 1102*d*. The cables 1102*a*, 1102*b* extend from the pulleys 1144 toward the lifting assembly 630*a*. The cable 1102*a* wraps over the pulley 1140 coupled to the upper end 624 of the lifting assembly 630 and extends downward to where the cable 1102*a* is coupled to the moving assembly 650*a*. The cable 1102*b* wraps around the pulley 1146 coupled to the first side wall 16 above the upper end 624 of the lifting assembly 630*a* and extends toward the lifting assembly 630*b*. The cable 1102*b* wraps over the pulley 1140 coupled to the upper end of the lifting assembly 630*b* and extends downward to where the cable 1102*b* is coupled to the moving assembly 650*b*. Thus, when the rigid drive member 1100 is rotated, the cables 1102 wrap on or off the spools 1112 resulting in the bed 1090 being moved vertically.

It should be appreciated that the embodiment shown in FIG. 189 may be modified in a number of ways. For example, the rigid drive member 1100 may be coupled to the second side wall 18 or, for that matter, any of the walls of the structure. Numerous other modifications may also be made.

Figure 190:
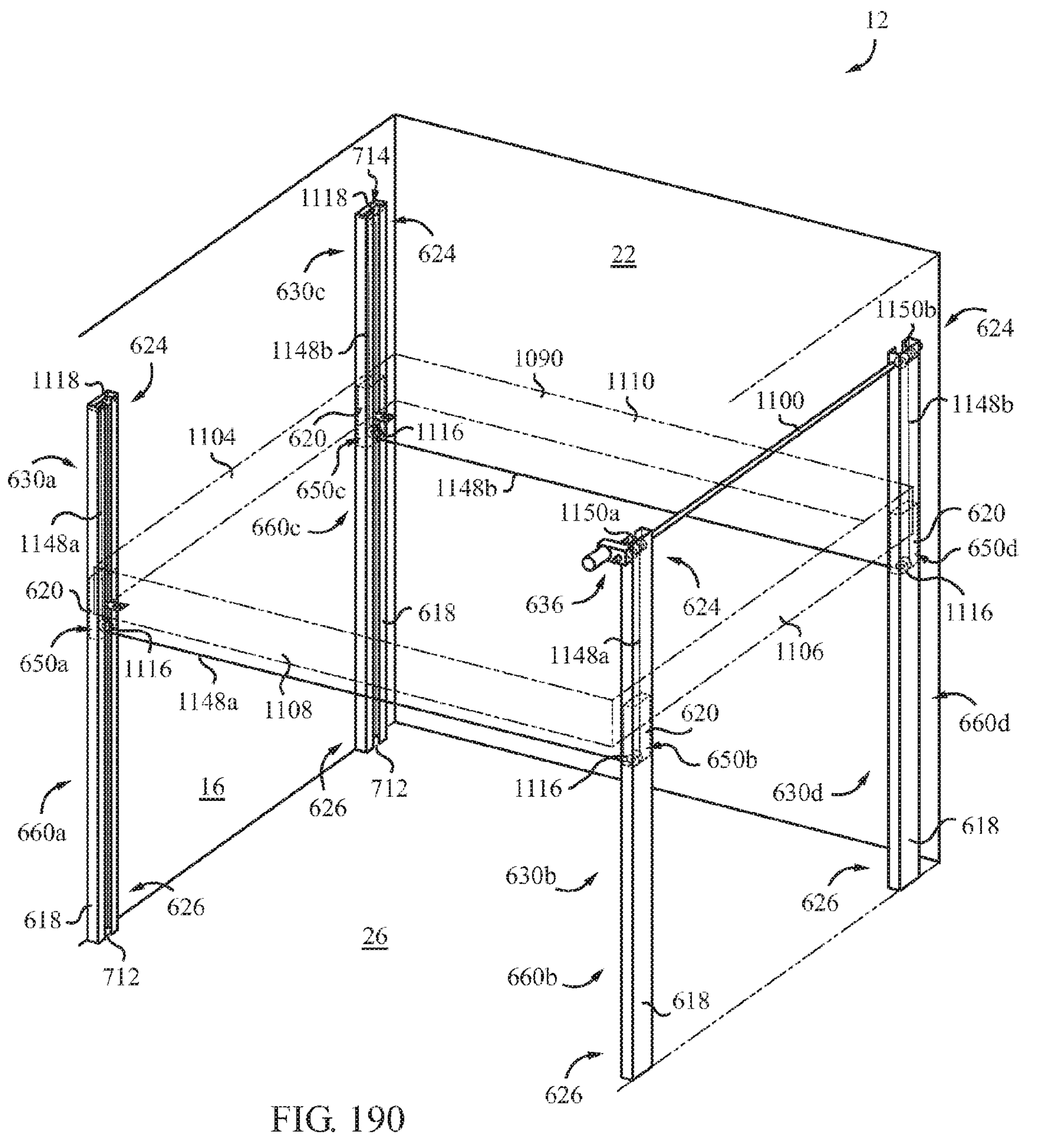
Figure 191:
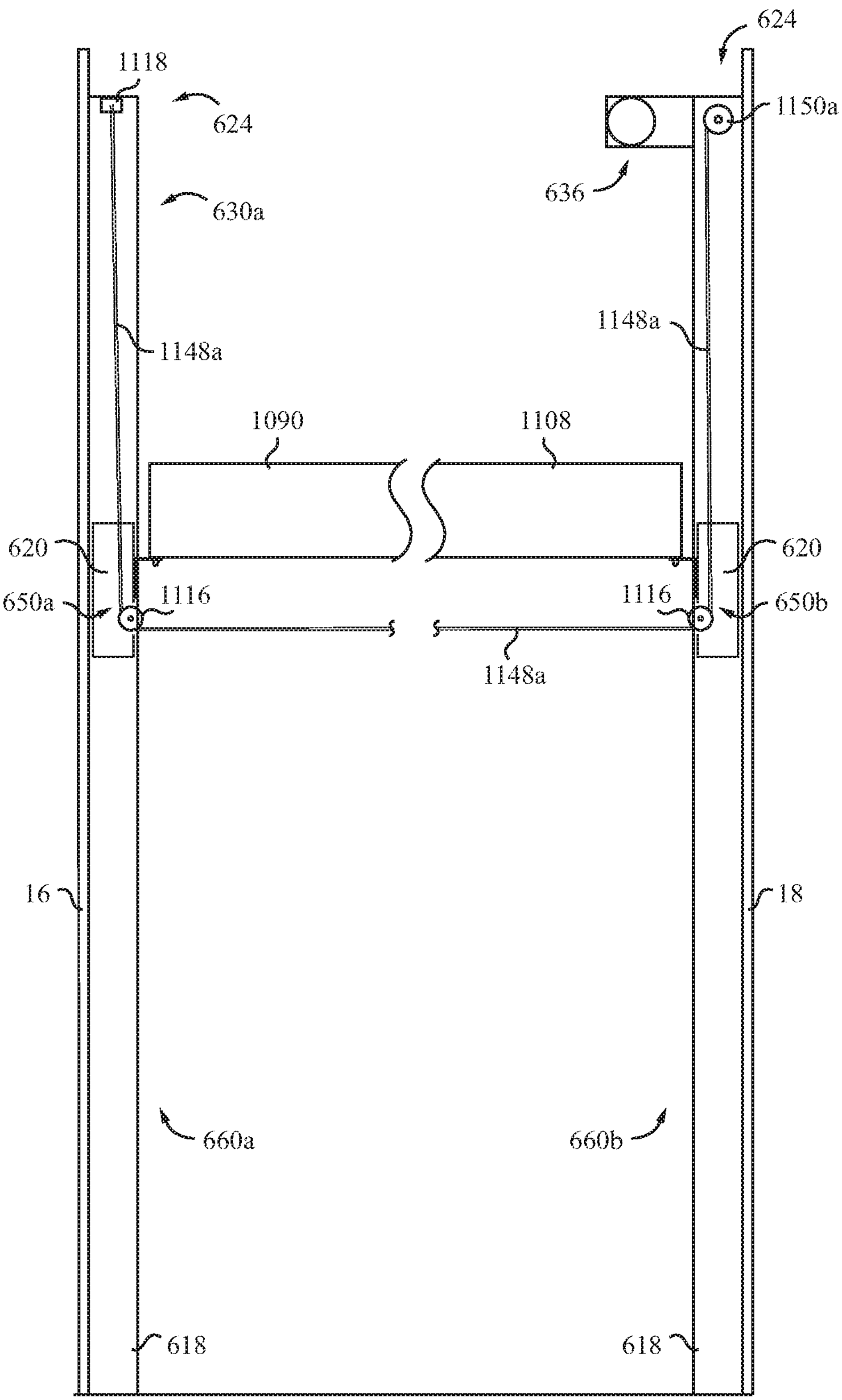

Referring to FIGS. 190-191, another embodiment is shown of the system 12. In this embodiment, the rigid drive member 1100 is coupled to and extends between the lifting assemblies 630*b*, 630*d*. Spools 1150*a*, 1150*b* (collectively referred to as 'the spools 1150") are coupled to the rigid drive member 1100 in the channels 714 of the lifting assemblies 630*b*, 630*d*, respectively. Cables 1148*a*, 1148*b* (collectively referred to as "the cables 1148") are coupled to and extend from the spools 1150*a*, 1150*b*, respectively, downward to the pulleys 1116 coupled to the moving members 620 of the moving assemblies 650*b*, 650*d*. The cables 1148 extend underneath the bed 1090 from the pulleys 1116 of the moving assemblies 650*b*, 650*d* to the pulleys 1116 of the moving assemblies 650*a*, 650*c*. From there, the cables 1148 extend upward to the anchor assemblies 1118 coupled to the upper ends 624 of the lifting assemblies 630*a*, 630*c*.

During operation, the motor assembly 636 rotates the rigid drive member 1100 to wrap the cables 1148 on or off the spools 1150 and, thus, move the bed 1090 vertically. It should be appreciated, that other embodiments may also be used. For example, the pulleys 1116 may be coupled to the bed frame 54 so that the cables 1148 extend through the bed frame 54. Numerous additional embodiments may also be provided.

Figure 192:
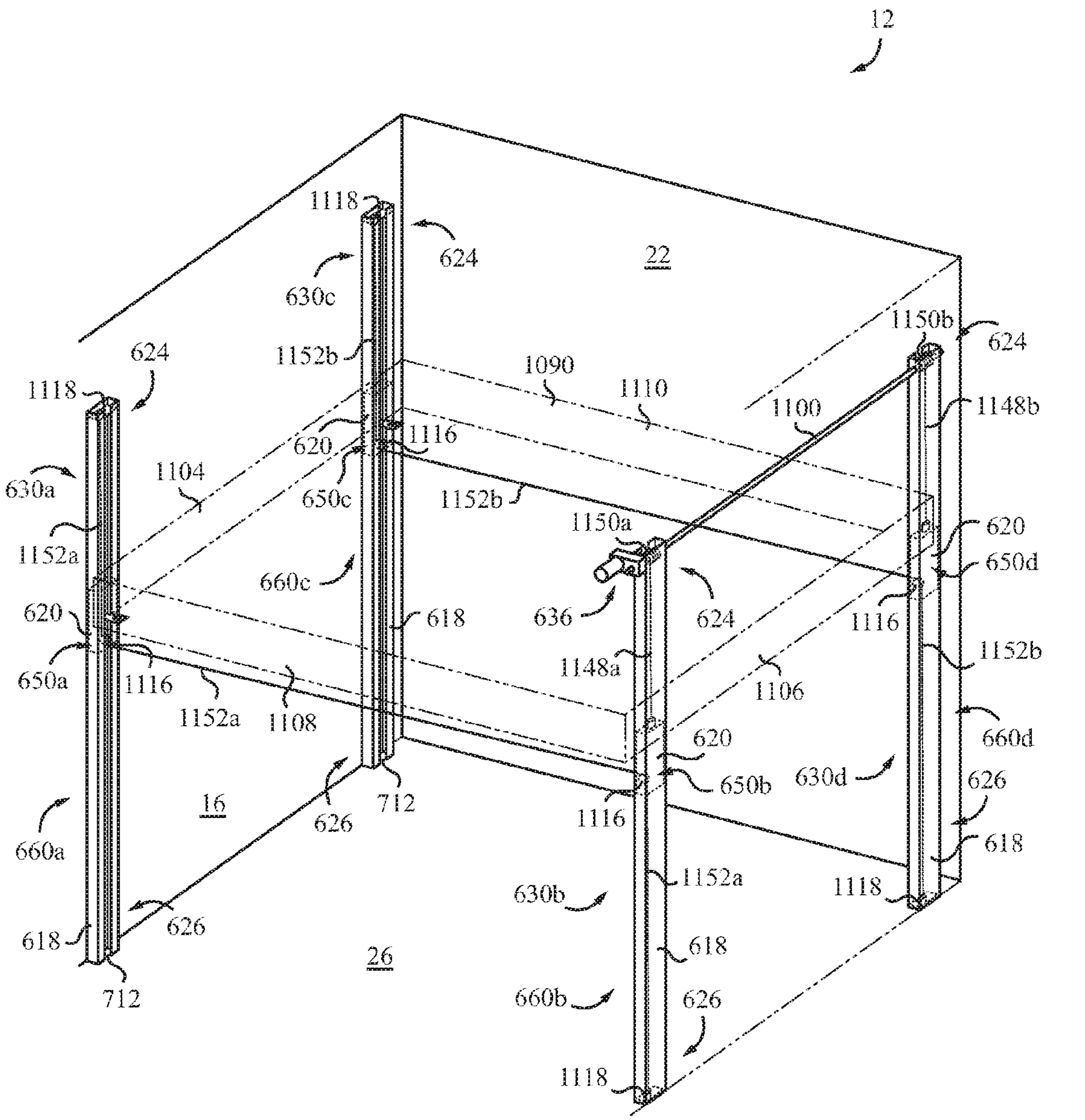
Figure 193:
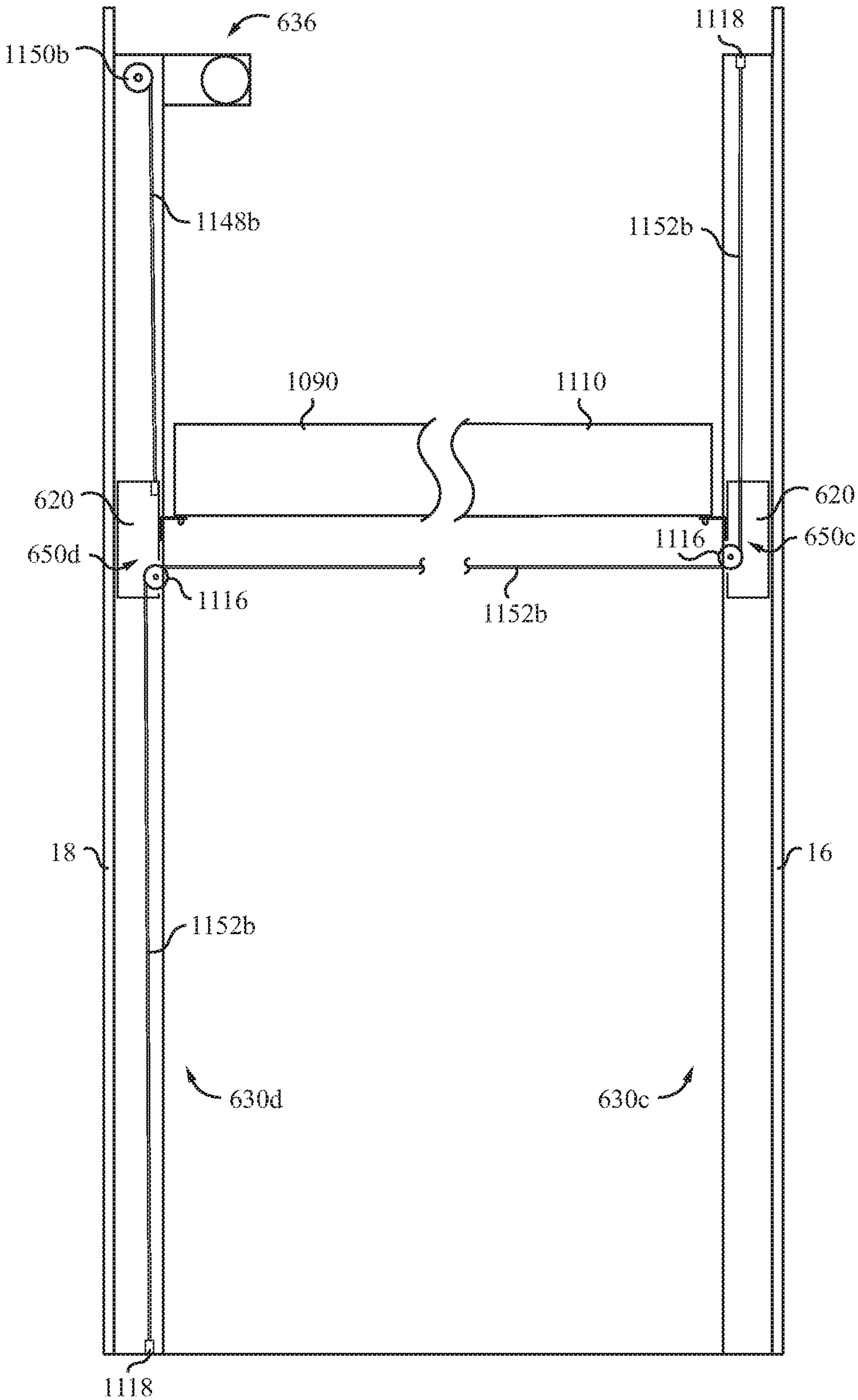

Referring to FIGS. 192-193, another embodiment of the system 12 is shown. This embodiment is similar to the embodiment shown in FIGS. 190-191 in that the rigid drive member 1100 is coupled to and extends between the lifting assemblies 630*b*, 630*d*. Also, spools 1150*a*, 1150*b* are coupled to the rigid drive member 1100 in the channels 714 in the lifting assemblies 630*b*, 630*d*, respectively. Cables 1152*a*, 1152*b* (collectively referred to as "the cables 1152") are coupled to the upper ends 624 of the lifting assemblies 630*a*, 630*c* using the anchor assemblies 1118. The cables 1152 extend from the upper ends 624 of the lifting assemblies 630*a*, 630*c* to the pulleys 1116 coupled to the moving members 620 of the moving assemblies 650*a*, 650*c*. The cables 1152 wrap under the pulleys 1116 of the moving assemblies 630*a*, 630*c* and extend underneath the bed 1090 to the pulleys 1116 coupled to the moving members 620 of the moving assemblies 650*b*, 650*d*. The cables 1152 wrap over the pulleys 1116 of the moving assemblies 650*b*, 650*d* and extend downward to where the cables 1152 are coupled to the lower end 626 of the lifting assemblies 630*b*, 630*d* using the anchor assemblies 1118.

The cables 1148*a*, 1148*b* extend from the spools 1150*a*, 1150*b* to the moving assemblies 650*b*, 650*d*, respectively. The cables 1148 are coupled to the moving assemblies 650*b*, 650*d* so that as the spools 1150 rotate, typically by being driven by the motor assembly 636, the cables 1148 wrap on or off the spools 1150, thus moving the moving assemblies 650*b*, 650*d*. As the moving assemblies 650*b*, 650*d* move vertically, the cables 1152 serve to maintain the bed 1090 in a horizontal orientation.

It should be appreciated that the embodiment shown in FIGS. 192-193 may be modified in a number of ways to provide additional embodiments. For example, in another embodiment, the rigid drive member 1100 may be coupled between the lifting assemblies 630*a*, 630*c*, and the cables 1152 may extend from the upper ends 624 of the lifting assemblies 630*b*, 630*d* to the lower ends 626 of the lifting assemblies 630*a*, 630*c*. Also, it should be appreciated that any of a number of suitable lifting assemblies 30, 630 may be used to raise the second side 1106 of the bed 1090. For example, the motor assembly 636, the rigid drive member 1100, and the cables 1148 may be replaced by one of the lifting assemblies 630 shown in FIG. 79. The lifting assembly 630 from FIG. 79 may be coupled in the middle of the second side 1106 of the bed and used to vertically move the bed 1090. Numerous other embodiments along the same lines may also be provided.

Figure 194:
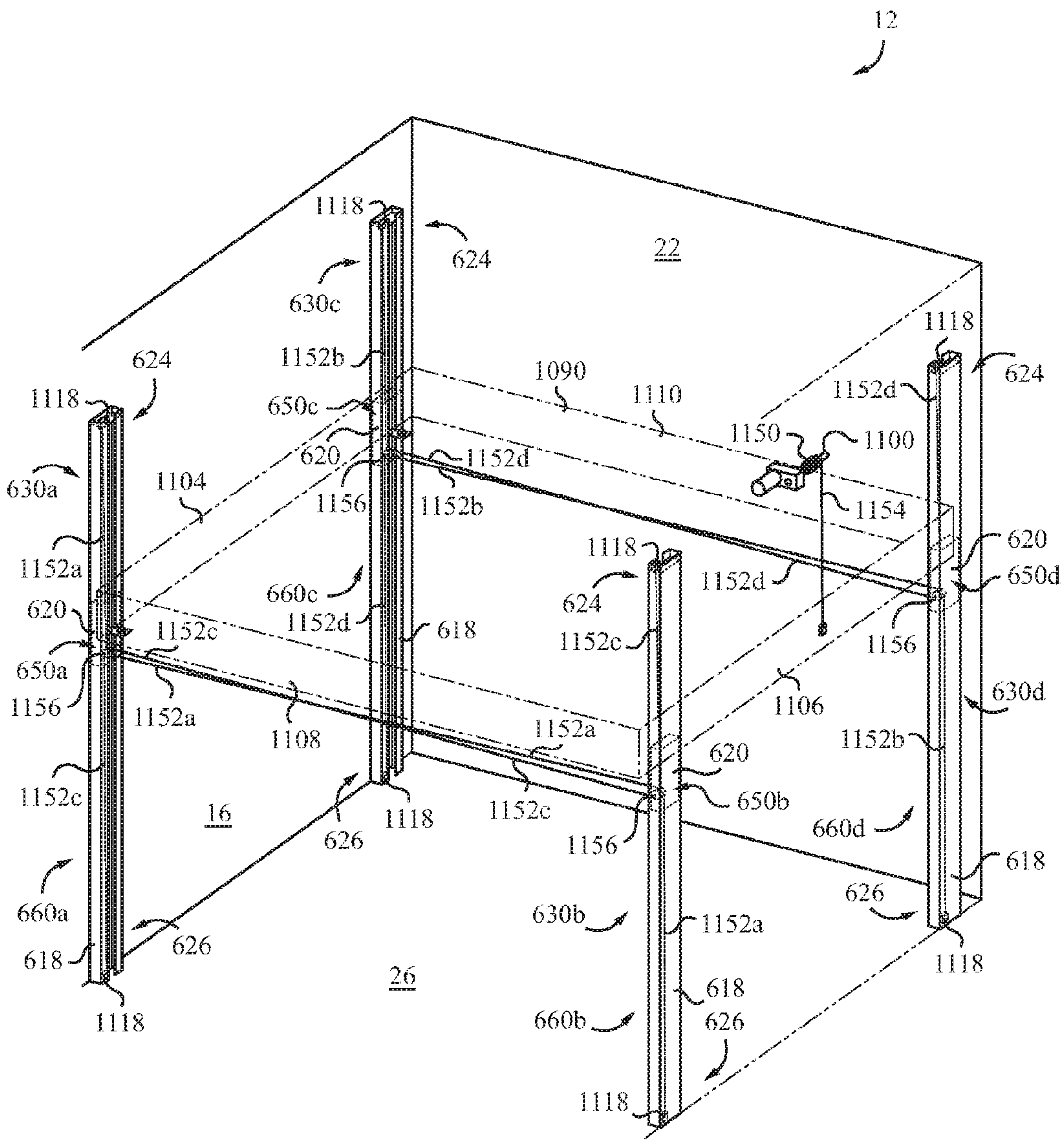

Referring to FIGS. 194-196, another embodiment of the system 12 is shown. In this embodiment, the cables 1152*a*, 1152*b* extend from the upper ends 624 of the lifting assemblies 630*a*, 630*c* to lower ends 626 of the lifting assemblies 630*b*, 630*d* as explained in relation to FIGS. 192-193. Cables 1152*c*, 1152*d* extend from the upper ends 624 of the lifting assemblies 630*b*, 630*d* to the lower ends 626 of the lifting assemblies 630*a*, 630*c* in a manner that is similar to the cables 1152*a*, 1152*b*. As shown in FIG. 196, a double pulley assembly 1156 is provided with each of the moving assemblies 650 to accommodate both of the cables 1152. In general, the double pulley assembly 1156 includes two pulleys 1116 coupled adjacent to each other.

In the embodiment described in FIG. 192, it is possible to rotate the first side 1104 of the bed 1090 upward while the second side 1106 remains in position. This may occur when the motor rigid drive member 1100 is not rotating. However, by using the cables 1152*a*, 1152*b*, 1152*c*, 1152*d* as shown in FIGS. 194-196, the bed 1090 may only be translationally moved vertically. Thus, the configuration of FIGS. 194-196 may provide additional stability.

Referring to FIGS. 194-196, the motor assembly 636 is coupled to the rigid drive member 1100 and is configured to drive the rigid drive member 1100. In one embodiment, the rigid drive member 1100 and the motor assembly 636 may be coupled to the second side wall 18 or the ceiling 24 between the lifting assemblies 630*b*, 630*d*, as shown in FIG. 194. In other embodiments, the rigid drive member 1100 and the motor assembly 636 may be coupled to the first side wall 16 or in any other suitable location. Cable 1154 is coupled to and extends from the spool 1150 to the middle of the second side 1106 of the bed 1090. The spool 1150 is coupled to the rigid drive member 1100 so that as the rigid drive member 1100 rotates, the cable 1154 wraps on or off the spool 1150, thus vertically moving the second side 1106 of the bed 1090. The vertical movement of the second side 1106 of the bed 1090 is translated into vertical movement of the first side 1104 of the bed 1090 by the cables 1152. In this manner, the single cable 1154 may be used to vertically move the bed 1090.

It should be appreciated that the embodiment shown in FIGS. 194-196 may be modified in a number of ways to provide additional embodiments. For example, the second side 1106 of the bed 1090 may be raised and lowered using any of the lifting assemblies 630 described previously. FIG. 197 shows one embodiment where the second side 1106 of the bed 1090 may be moved vertically using one of the lifting assemblies 30 (FIG. 2) described previously. In another embodiment, one of the lifting assemblies 630 shown in FIG. 79 may be positioned in place of the lifting assembly 30 in FIG. 197. Numerous other embodiments may be used.

Referring to FIGS. 198-199, another embodiment of the system 12 is shown. In this embodiment, the flexible drive members, which are shown and referred to as chains 1160*a*, 1160*b* (collectively referred to as "the chains 1160") form at least part of an endless loop between the lifting assemblies 630*a*, 630*c* and the lifting assemblies 630*b*, 630*d*. A plurality of sprockets 1158 are used to guide the movement of the chains 1160 along the endless path defined by the endless loop. In one embodiment, the sprockets 1158 rotate on axes which are perpendicular to the side walls 16, 18. The lifting assemblies 630 may be configured similarly to the lifting assemblies 630 shown in FIG. 166. For example, the gaps 712 in the guide members 618 of the lifting assemblies 630*a*, 630*c* face each other. Likewise, the gaps 712 in the guide members 618 of the lifting assemblies 630*b*, 630*d* also face each other.

A first end 1162 of the chain 1160*a* is coupled to the moving assembly 650*c*. The chain 1160*a* extends upwards from the moving assembly 650*c* and wraps around the sprocket 1158 coupled to the upper end 624 of the lifting assembly 630*c*. From there, the chain 1160*a* extends downward to the sprocket 1158 coupled to the moving member 620 of the moving assembly 650*c*. The chain 1160*a* extends in a generally horizontal direction from the sprocket 1158 of the moving assembly 650*c* to the sprocket 1158 coupled to the moving member 620 of the moving assembly 650*a*. The moving members 620 of the moving assemblies 650*a*, 650*c* include gaps 1168 to allow the chain 1160*a* to extend between the sprockets 1158. In one embodiment, the moving member may have a C shaped cross-section with the gap 1168 cooperating with the gap 712 in the guide member to allow the chain 1160*a* to extend from the sprockets 1158 of adjacent moving assemblies 650. In another embodiment, holes may be provided in the moving members 620 to allow the chain 1160*a* to extend between the sprockets 1158 of the moving assemblies 650. Numerous other configurations of the moving assemblies 650 may be provided to allow the chains 1160 to extend between the sprockets 1158 of the moving assemblies 650.

The chain 1160*a* extends upward from the sprocket 1158 of the moving assembly 650*a* to the sprocket coupled to the upper end 624 of the lifting assembly 630*a*. From there, the chain 1160*a* extends downward to the sprocket 1158 coupled to the lower end 626 of the lifting assembly 630*a*. The chain 1160*a* wraps around the sprocket 1158 and extends upward to another sprocket 1158 coupled to the moving member 620 of the moving assembly 650*a*. The chain 1160*a* extends horizontally from this sprocket 1158 to another sprocket 1158 coupled to the moving member 620 of the moving assembly 650*c*. From here, the chain 1160*a* extends downward, wraps around the sprocket 1158 coupled to the lower end 626 of the lifting assembly 630*c*, and extends back upward to where a second end 1164 of the chain 1160*a* is coupled to the moving assembly 650*c*. The chain 1160*b* is configured in the same manner with respect to the lifting assemblies 630*b*, 630*d*. Thus, the manner in which the chain 1160*b* passes through and between the lifting assemblies 630*b*, 630*d* is a mirror image of the manner in which the chain 1160*a* passes through and between the lifting assemblies 630*a*, 630*c*.

The motor assembly 636 is coupled to the upper end 624 of the lifting assembly 630*a*. The motor assembly engages a drive shaft which is used to rotate the sprocket 1158 coupled to the upper end 624 of the lifting assembly 630*a*. The drive member 634 extends from the motor assembly 636 to the upper end 624 of the lifting assembly 630*b*. The drive member 634 engages a drive shaft which is used to rotate the sprocket 1158 at the upper end 624 of the lifting assembly 630*b*. In this manner, movement of the chains 1160*a*, 1160*b* may be synchronized with each other. During operation, the motor assembly 636 is used to rotate the sprockets 1158 coupled to the upper ends 624 of the lifting assemblies 630*a*, 630*b*.

In one embodiment, cross members 1166 may be coupled between the moving assemblies 650*a*, 650*c* and the moving assemblies 650*b*, 650*d*, respectively, to conceal the portion of the chains 1160 which extend between the moving assemblies 650. The cross members 1166 may be coupled to the moving assemblies 650*b*, 650*d* in any of a number of suitable ways such as welding, bolting, and so on.

Although not shown, it should be appreciated that one or more beds (additional beds may be coupled to the lifting assemblies using additional moving members as described previously) may be moved vertically using the system 12 shown in FIGS. 198-199. The bed may be coupled to the system 12 in any of a number of suitable ways. For example, in one embodiment, the bed may be coupled to the cross members 1166. In another embodiment, the system 12 may be configured without the cross members 1166 so that the bed may be coupled directly to the moving assemblies 650. Also, the bed may be coupled to the system 12 so that variations in the width of the side walls 16, 18 may accounted for in any of the ways described previously.

It should be appreciated that the embodiment shown in FIGS. 198-199 may be modified in a number of ways to provide additional embodiments. For example, as shown in FIG. 200, the first ends 1162 of the chains 1160 may be coupled to the upper ends 624 and the second ends 1164 may be coupled to the lower ends 626 of the lifting assemblies 630*c*, 630*d*. The operation of the system 12 may otherwise be the same as described in connection with FIGS. 198-199. In another embodiment, the motor assembly 636 and/or the drive member 634 may be positioned in a variety of locations. For example, the motor assembly 636 may be positioned as shown in FIG. 198 and the drive member 634 may extend between the sprockets 1158 coupled to the upper ends 624 of the lifting assemblies 630*c*, 630*d*.

In another embodiment, shown in FIGS. 201-203, the sprockets 1158 coupled to the moving assemblies 650 may be provided in a double sprocket configuration so that the sprockets 1158 rotate on the same axis. Also, the double sprockets may be coupled to the cross members 1166 so that the motor assembly 636 and the drive member 634 may be positioned between the double sprockets of the two cross members 1166. The motor assembly 636 and the drive member 634 may be configured to engage the drive shafts of the double sprockets to drive the movement of the lifting assemblies 630. Thus, the motor assembly 636 and the drive member 634 may be configured to move vertically with the moving assemblies 650.

In one embodiment, shown in FIG. 202, the sprockets 1158 at the upper ends 624 and the lower ends 626 may be offset from each other. This may be desirable so that the lengths of the chains 1160 extend straight from the sprockets 1158 which move vertically with the moving assemblies 650 to the sprockets 1158 coupled to the upper ends 624 and the lower ends 626 of the lifting assemblies 630. Thus, when the moving assemblies 650 are raised near the upper ends 624 or lowered near the lower ends 626, the chains 1160 from the sprockets 1158 which move vertically are in line with the sprockets 1158 at the upper ends 624 and the lower ends 626 of the lifting assemblies 630.

Referring to FIG. 204, a front view of another embodiment of the lifting assemblies 630 which may be used with the system 12 is shown. The configuration of the guide assemblies 660 and the moving assemblies 650 are similar to the embodiment shown in FIGS. 198-199. In this embodiment, the first end 1162 of the chain 1160*a* is coupled to the moving assembly 650*a*. The chain 1160*a* extends upward from the moving assembly 650*a*, over the sprocket 1158 coupled to the upper end 624 of the lifting assembly 630*a*, and downward to the sprocket 1158 coupled to the lower end 626 of the lifting assembly 630*a*. From there, the chain 1160*a* extends upward to the sprocket 1158 which moves with the moving assembly 650*a* and horizontally to the sprocket 1158 which moves with the moving assembly 650*c*. From there the chain 1160*a* extends upward from the sprocket 1158, over the sprocket 1158 coupled to the upper end 624 of the lifting assembly 630*c*, and downward to the sprocket 1158 coupled to the lower end 626 of the lifting assembly 630*c*. The chain 1160*a* extends upward from the sprocket 1158 to where the second end 1164 of the chain 1160*a* is coupled to the moving assembly 650*c*. The motor assembly 636 and the drive member 634 may be coupled between the sprockets 1158 coupled to the upper ends 624 of the lifting assemblies 630*a*, 630*b*. Thus, as the motor assembly 636 rotates the sprockets 1158, the moving assemblies 650 move up or down.

Referring to FIGS. 205-206, another embodiment of the system 12 is shown. In this embodiment, the guide assemblies 660 and the moving assemblies 650 are configured to be similar to the embodiment shown in FIGS. 81-82. Also, the cross members 614 extend between and are coupled to the upper ends 624 of the lifting assemblies 630*a*, 630*c* and the lifting assemblies 630*b*, 630*d*, respectively.

The chains 1160 are configured to form at least part of an endless loop which extends through the lifting assemblies 630*a*, 630*c* and the lifting assemblies 630*b*, 630*d*. The configuration of the chain 1160*a* is described in greater detail with the understanding that a similar discussion may be provided for the chain 1160*b* since the chain 1160*b* is a mirror image of the chain 1160*a*.

As shown in FIG. 205, the chain 1160*a* is coupled to the moving assembly 650*a* and extends downward and wraps around the wheel 776 coupled to the lower end 626 of the lifting assembly 630*a*. From there the chain 1160*a* extends upward to the sprocket 724 coupled to the upper end 624 of the lifting assembly 630*a*, through the cross member 614 to the sprocket 724 coupled to the upper end 624 of the lifting assembly 630*c*, and downward to where the chain 1160*a* is coupled to the moving assembly 650*c*. The chain 1160*a* continues downward and wraps around the wheel 776 coupled to the lower end 626 of the lifting assembly 630*c*. The chain 1160*a* next extends upward to the sprocket 722 coupled to the upper end 624 of the lifting assembly 630*c*, through the cross member 614 to the sprocket 722 coupled to the upper end 624 of the lifting assembly 630*a*, and downward to where the chain 1160*a* is coupled to the moving assembly 650*a*.

The motor assembly 636 and the drive member 634 may be coupled between any one of the sprockets 722, 724 of the lifting assemblies 630*a*, 630*c* and any one of the sprockets 722, 724 of the lifting assemblies 630*b*, 630*d*. As shown in FIG. 205, the motor assembly 636 and the drive member 634 may be coupled between the sprocket 722 coupled to the upper end 624 of the lifting assembly 630*a* and the sprocket 722 coupled to the upper end 624 of the lifting assembly 630*b*. Thus, as the motor assembly 636 rotates the sprockets 722 in unison, the moving assemblies 650 move up or down.

Referring to FIGS. 207-208, another embodiment of the system 12 is shown. In this embodiment, the guide assemblies 660 and the moving assemblies 650 may be configured similarly to the embodiment shown in FIG. 79. The flexible drive members, which in one embodiment are cables 1172*a*, 1172*b* (collectively referred to as "the cables 1172"), form at least a portion of an endless loop. The rigid drive member 1100 is coupled between the upper ends 624 of the lifting assemblies 630*a*, 630*c*. The motor assembly 636 is coupled to the lifting assembly 630*c* and engages the rigid drive member 1100. Spools 1170*a*, 1170*b* (collectively referred to herein as "the spools 1170") are coupled to the rigid drive member 1100 in the channels 714 defined by the guide members 618 of the lifting assemblies 630*a*, 630*c*, respectively.

The cables 1172*a*, 1172*b* are configured to cooperate with the spools 1170*a*, 1170*b*, respectively, in a manner which is similar to the embodiment shown in FIG. 141 so that as the spools 1170 rotate one portion of each of the cables 1172 wraps on the spool 1170 while another portion wraps off the spool 1170. The manner in which the cable 1172*a* extends between the lifting assemblies 630*a*, 630*b* is described in the following. The cable 1172*b* extends between the lifting assemblies 630*c*, 630*d* in a manner similar to the cable 1172*a*.

A first end 1174 of the cable 1172*a* is coupled to the moving assembly 650*b*. The cable 1172 extends upward from the moving assembly 650*b*, over the pulley 1140 coupled to the upper end 624 of the lifting assembly 630*b*, and across to the spool 1170*a*. The cable 1172*a* wraps on the spool 1170*a* as described above. The cable 1172*a* extends downward from the spool 1170*a*, wraps around the pulley 1140 coupled to the lower end 626 of the lifting assembly 630*a*, and extends upward to the pulley 1140 coupled to the upper end 624 of the lifting assembly 630*a*. Also, the portion of the cable 1172*a* between the pulleys 1140 is coupled to the moving assembly 650*a* so that the moving assembly 650*a* moves with the cable 1172*a*. From the pulley 1140, the cable 1172 extends horizontally to another pulley 1140 coupled to the upper end 624 of the lifting assembly 630*b*. From here, the cable 1172*a* extends downward, wraps around the pulley 1140 coupled to the lower end 626 of the lifting assembly 630*b*, and extends upward to where a second end 1176 of the cable 1172*a* is coupled to the moving assembly 650*b*.

During operation, the rigid drive member 1100 is rotated by the motor assembly 636 resulting in the cables 1172 simultaneously winding on and off the spools 1170. As the cables 1172 wind on and off the spools 1170, the cables 1172 move along the endless path described above to vertically move the moving assemblies 650 and the bed. Typically, the cables 1172 are used to reciprocally and translationally move the bed.

FIG. 208 shows a view of the system 12 from inside the vehicle 10. In this embodiment, the pulleys 1140 coupled to the lower ends 626 of the lifting assemblies 630 rotate on axes which are parallel to the side walls 16, 18, whereas in the embodiment shown in FIG. 207, the same pulleys 1140 are shown rotating on axes which are perpendicular to the side walls 16, 18. The configuration of the pulleys 1140 from FIG. 207 may be desirable since the guide members 618 may protrude from the side walls 16, 18 less than the configuration shown in FIG. 208.

Referring to FIGS. 209-211, another embodiment is shown of the system 12. In many ways, this embodiment is similar to the embodiment described in connection with FIGS. 207-208. In this embodiment, however, the cables 1172*a*, 1172*b* are configured to extend between the lifting assembles 630*a*, 630*b* and the lifting assemblies 630*c*, 630*d* through the bed frame 54.

The details of the manner in which the cable 1172*a* extends between the lifting assemblies 630*a*, 630*b* are described. However, the cable 1172*b* extends between the lifting assemblies 630*c*, 630*d* in a similar fashion so that much, if not all, of the description of the cable 1172*a* is applicable to the cable 1172*b*. The first end 1174 of the cable 1172*a* is coupled to the moving assembly 650*b*. The cable 1172*a* extends upward from the moving assembly 650*b*, over the pulley 1140, and downward to one of the pulleys

1116 coupled to the bed frame 54. From here, the cable 1172*a* extends horizontally to one of the pulleys 1116 coupled to the bed frame 54 adjacent to the moving assembly 650*a*. The cable 1172*a* extends upward from the pulley 1116 to the spool 1170*a* where the cable wraps around the spool 1170*a* as described previously. The cable 1172*a* extends downward from the spool 1170*a*, wraps around the pulley 1140 coupled to the lower end 626 of the lifting assembly 630*a*, and extends upward to the other pulley 1116 coupled to the bed frame 54. From here, the cable 1172*a* extends through the bed frame 54 to the pulley 1116 coupled to the bed frame 54 adjacent to the moving assembly 650*b*. The cable 1172*a* wraps over the pulley 1116, extends downward to and wraps around the pulley 1140 coupled to the lower end 626 of the lifting assembly 630*b*, and extends upward to where the second end 1176 is coupled to the moving assembly 650*b*. Thus, as the spools 1170 rotate, the cables 1172 raise and/or lower the moving assemblies 650.

In one embodiment, as shown in FIG. 210, the bed frame 54 (or the bed 1090) may be coupled to the moving assembly 650*a* using a pin 1178 which is received in the opening 852 of the mounting member 840. As shown, the bed frame 54 may include a frame member 1114 which extends through the gap 712 and into the channel 714 of the guide member 618. Thus, the frame member 1114 may be configured to move in and out of the channel 714 to account for variations in the distance between the side walls 16, 18 as the bed 1090 is moved vertically.

Referring to FIG. 211, a front view of another embodiment of the system 12 is shown. This embodiment is largely the same as the embodiment shown in FIG. 209. However, in this embodiment, the pulleys 1140 are positioned to rotate on axes which are parallel to the side walls 16, 18, while in FIG. 209, the pulleys 1140 are positioned to rotate on axes which are perpendicular to the side walls 16, 18.

It should be appreciated that the embodiment shown in FIG. 209 may be modified in a number of ways. For example, the first ends 1174 of the cables 1172*a*, 1172*b* may be coupled to the upper ends 624 of the lifting assemblies 630*b*, 630*d*, respectively, using the anchor assemblies 1118. Likewise, the second ends 1176 of the cables 1172*a*, 1172*b* may be coupled to the lower ends 626 of the lifting assemblies 630*b*, 630*d*. FIG. 212 shows one embodiment with this configuration. In another embodiment, as shown in FIGS. 212-213, the pulleys 1116 may be coupled to the moving assembly 650. In this embodiment, the bed frame 54 may have a U-shaped cross-section and the pulleys 1116 may be coupled to the moving member 620. The bed frame 54 may be configured to be lowered onto mounting members 1180 so that the pulleys 1116 and the cable 1172*a* are positioned in the channel defined by the U-shape of the bed frame 54. The bed frame 54 may be coupled to the mounting members 1180 using fasteners which extend through holes 1182 in both the mounting members 1180 and the bed frame 54. In another embodiment, the pulleys 1140 may be positioned to rotate on axes which are parallel to the side walls 16, 18 (FIG. 214) or perpendicular to the side walls 16, 18 (FIG. 212).

Another embodiment of the system 12 is shown in FIGS. 215-216. In many ways, this embodiment is similar to the embodiments shown in FIGS. 209-214. However, the cables 1172 extend between the lifting assemblies 630 as follows. A description is provided in detail of the cable 1172*a* with the understanding that the description is equally applicable to the cable 1172*b*.

The first end 1174 of the cable 1172*a* is coupled to the moving assembly 650*a*. The cable 1172*a* extends upward from the moving assembly 650*a* to the spool 1170*a* where the cable 1172*a* wraps on the spool 1170*a* as previously described. From there, the cable 1172*a* extends downward, wraps around the pulley 1140 coupled to the lower end 626 of the lifting assembly 630*a*, and extends upward to the pulley 1116 included with the moving assembly 650*a*. From the pulley 1116, the cable 1172*a* extends underneath the bed 1090 to the pulley 1116 included with the moving assembly 650*b*. The cable 1172*a* extends upward, wraps around the pulley 1140 coupled to the upper end 624 of the lifting assembly 630*b*, and extends downward to the pulley 1140 coupled to the lower end 626 of the lifting assembly 630*b*. The cable 1172*a* extends upward from the pulley 1140 coupled to the lower end 626 of the lifting assembly 630*b* to where the second end 1176 of the cable 1172*a* is coupled to the moving assembly 650*b*.

During operation, the spools 1170 lift the moving assemblies 650*a*, 650*c*. The cables 1172 extending underneath the bed 1090 and between the lifting assemblies 630*a*, 630*b* and the lifting assemblies 630*c*, 630*d* are used to transmit the lifting force to the moving assemblies 650*b*, 650*d*. Thus, the moving assemblies 650 and the bed 1090 may be selectively raised and lowered.

Referring to FIGS. 217-219, another embodiment of the system 12. In this embodiment, the system 12 includes lifting assemblies 1230*a*, 1230*b*, 1230*c*, 1230*d* (collectively referred to as "the lifting assemblies 1230")—alternatively referred to herein as sliding assemblies or sliding mechanisms—the drive members 634*a*, 634*b*, 634*c*, and a motor assembly 636. The lifting assemblies 1230*a*, 1230*c* are coupled to the first side wall 16, and the lifting assemblies 1230*b*, 1230*d* are coupled to the second side wall 18. The lifting assemblies 1230 may be used to vertically move the lower bed 640 and, optionally, the upper bed between a use configuration where the bed 640 is positioned to be used for sleeping thereon and a stowed configuration where the bed 640 is positioned adjacent to the ceiling 24. The drive members 634*a*, 634*b*, 634*c* may be used to extend between and synchronize the movement of the lifting assemblies 1230*a*, 1230*c*, the lifting assemblies 1230*c*, 1230*d*, and the lifting assemblies 1230*d*, 1230*b*, respectively. The motor assembly 636 may be used to drive the lifting assemblies 1230.

The lifting assemblies 1230 each include a drive mechanism 1290 a moving assembly 1250, and a support assembly 1260. Each moving assembly 1250 includes a moving member, which in this embodiment is a nut 1220, that cooperates with a drive member, which in this embodiment is a screw 1202, to vertically move the bed 640. Each support assembly 1260 includes a support or guide member, which in this embodiment is a tube 1218. The drive mechanism 1290 transmits the rotary motion of the drive members 634 to rotary motion of the screw 1202 using bevel gears 1206. The drive members 634 engage the drive shaft 1240 of the drive mechanism 1290 in a manner similar to that which has been previously described in relation to other embodiments. The transmission 200 is used to transmit the rotary motion of the drive shaft 1240 to rotary motion of the drive member 634*b*.

During operation, as the motor assembly 636 rotates the screws 1202 of each lifting assembly, the nut 1220 moves vertically. The mounting member 840 is coupled to the nut 1220 and extends through a gap or slot 1212 in the tube 1218. The bed 640 is coupled to the mounting member 840 so that the bed 640 moves vertically with the moving assembly 1250. An additional bed which is superposed with the bed 640 may also be moved vertically. The additional bed may be coupled to another moving member positioned in the tube 1218 without engaging the screw 1202. The another moving member and the nut 1220 may be configured differently so that the another moving member will support the additional bed in a spaced apart position. Numerous other embodiments may also be provided.

Referring to FIGS. 220-221, another embodiment of the system 12 is shown. In this embodiment, the beds 640, 641 are shown in the third configuration 440 where the lower bed 640 is positioned to be used for sleeping thereon and the upper bed 641 is stowed adjacent to the ceiling 24 of the vehicle 10. In this embodiment, the lower bed 640 may be configured to move between a sleeping configuration 1302, shown in FIG. 220, and a seating configuration 1304 shown in FIG. 221. In the sleeping configuration 1302, the lower bed 640 is horizontal or flat and configured to receive a person to sleep thereon. In the seating configuration 1304, the lower bed 640 is configured to include a seat back 1306 and a seat base 1308 and is used to receive a person to sit thereon. Thus, in this embodiment, not only are two beds 640, 641 provided for sleeping on at night, but a seating area may also be provided for use during the day. In this embodiment, the lower bed 640 may alternatively be referred to as futon bed, seating bed, day bed, divan bed, davenport, or seating unit.

In one embodiment, the lower bed 640 may be configured to move between the sleeping configuration 1302 and the seating configuration 1304 by pivoting along a longitudinal axis 1310 of the lower bed 640. The bed frame 54 may include a pivot mechanism which is used to pivot the lower bed 640 on the axis 1310. Any of a number of suitable pivot mechanisms may be used. For example, any of the pivot mechanism commonly used for futon beds may be used. In one embodiment, the pivot mechanism may be the mechanism commonly referred to as "the kicker." In another embodiment, the pivot mechanism may be a metal mechanism which provides a low profile. In another embodiment, the pivot mechanism may be the mechanism referred to as TRIPLE-EASE provided by the Fashion Bed Group of Leggett & Platt, Incorporated, Consumer Products Unit, Number 1 Leggett Road, Carthage, Mo. 64836. Any other suitable wood, metal, plastic, etc. pivot mechanism may be used.

The mattress 52 may be any suitable mattress which is capable of being repeatedly pivoted as shown. Suitable mattresses may include those commonly found on futon beds. The bed frame 54 may include retaining members 1312 which may be used to prevent the mattress 52 from sliding off the lower bed 640 when the lower bed 640 is in the seating configuration 1304. The retaining members 1312 may also be used by the user to move the lower bed 640 between the sleeping configuration 1302 and the seating configuration 1304. It should be appreciated that the lower bed 640 may be converted into a seating unit in any of a number of suitable ways.

When the lower bed 640 is in the seating configuration 1304, the lower bed 640 may be selectively face toward the interior of the vehicle 10 or toward the exterior of the vehicle 10 through the opening 48. For example, the portion of the lower bed 640 that forms the seat back 1306 when the lower bed 640 faces one direction may be configured to form the seat base 1308 when the lower bed 640 faces the opposite direction. Likewise, the portion of the lower bed 640 that forms the seat base 1308 when the lower bed 640 faces one direction may be configured to form the seat back 1306 when the lower bed 640 faces the opposite direction.

Referring to FIGS. 222-224, one embodiment of the lower bed 640 is shown that can move between the sleeping configuration 1302 (FIG. 222) and the seating configuration 1304 (FIGS. 223-224) where the lower bed 640 forms a seating unit. The lower bed 640 may move between a first seating configuration 1404, shown in FIG. 223, where the lower bed 640 faces toward the interior of the vehicle 10 and a second seating configuration 1406, shown in FIG. 224, where the lower bed 640 faces toward the exterior of the vehicle 10.

It should be appreciated that, although the lower bed 640 is shown in FIGS. 222-224 as being used with the system 12 from FIGS. 81-82, the lower bed 640 may be used with any of the systems 12 and associated lifting assemblies 30, 630 described herein. The lower bed 640 may be used with or without the upper bed 641 and/or any of the other features and configurations of the various embodiments described herein. The lower bed 640 may be any suitable size including any size previously mentioned in relation to the lower beds 40, 640.

In the embodiment shown in FIGS. 222-224, the lower bed 640 includes a first side or section 1408 and a second side or section 1410. The lower bed 640 pivots in the center along the longitudinal axis 1310 to move between the first seating configuration 1404 where the first side 1408 forms the seat base 1308 and the second side 1410 forms the seat back 1306 and the second seating configuration 1406 where the first side 1408 forms the seat back 1306 and the second side 1410 forms the seat base 1308. The area where the first side 1408 and the second side 1410 of the lower bed 640 meet may be made from an expandable material such as Spandex to allow the surface of the lower bed 640 to pivot and stretch to form the seating unit in the seating configuration 1304. In other embodiments, the first side 1408 and the second side 1410 may be made from completely separate sections that are unconnected to each other. It should also be understood that the mattress 1452 may have any of the features, characteristics, or configurations of the mattress 52 described previously.

It should be appreciated that the lower bed 640 may have any of a number of configurations. For example, the lower bed 640 may pivot along multiple longitudinal axes. The multiple longitudinal axes may form one or more intermediate sections that are positioned between the first side 1408 and the second side 1410. It may especially be desirable to pivot the lower bed 640 along multiple longitudinal axes when the lower bed 640 is relatively large (e.g., queen size, king size, etc.). Folding or pivoting a king size lower bed 640 in the middle may result in the seat base 1308 being so deep that a user that sits on the seat base 1308 does not comfortably reach the seat back 1306. In this situation, the lower bed 640 may pivot on two longitudinal axes so that the seat base 1308 is a comfortable depth regardless of the direction that the lower bed 640 faces in the seating configuration 1304.

The lower bed 640 may be part of a lower bed assembly that includes the mattress 1452, a bed frame 1454, and the moving assemblies 650. The bed frame 1454 may be configured similarly to the bed frame 54 described herein. The bed frame 1454 is shown in greater detail in FIGS. 225-229. FIGS. 225-229 show the lower bed assembly with the mattress 1452 removed in order to better illustrate the bed frame 1454. The bed frame 1454 includes a fixed frame 1412 and a movable frame 1414. The movable frame 1414 is supported by and coupled to the fixed frame 1412.

The fixed frame 1412 is shown separately in FIG. 228. The fixed frame 1412 includes a first end frame member

1416 that extends between the lifting assemblies 630*a*, 630*c* and a second end frame member 1418 that extends between the lifting assemblies 630*b*, 630*d*. The fixed frame 1412 also includes a first cross frame member 1420 that extends between the end frame members 1416, 1418 between the lifting assemblies 630*a*, 630*b* and a second cross frame member 1422 that extends between the end frame members 1416, 1418 between the lifting assemblies 630*c*, 630*d*. The frame members 1416, 1418, 1420, 1422 form a box shaped or rectangular base of the fixed frame 1412. The fixed frame 1412 also includes a number of cross frame members 1424 that extend between the first cross frame member 1420 and the second cross frame member 1422 to provide additional support to the fixed frame 1412. The fixed frame 1412 is generally configured to remain in place and provide a solid support structure for the lower bed 640.

It should be appreciated that the configuration of the fixed frame 1412 may be varied in a number of ways. For example, the fixed frame 1412 may include cross members that extend from the first end frame member 1416 to the second end frame member 1418. The additional cross members may be provided in place of the cross-frame members 1424 or in addition to the cross-frame members 1424. Also, the frame members 1416, 1418, 1420, 1422 are shown as being made from angle iron, but it should be appreciated that the frame members 1416, 1418, 1420, 1422 may be made to have any suitable shape such as tubular, C-channel, etc. and from any suitable material such as steel, plastic, composites, wood, or the like. In addition, the cross-frame members 1420, 1422 may be coupled between the far ends of the end frame members 1416, 1418 to form a rectangle as shown in FIG. 228, or the cross-frame members 1420, 1422 may be coupled between the end frame members 1416, 1418 so that a portion of the end frame members 1416, 1418 extends past where the cross-frame members 1420, 1422 are coupled as shown in FIGS. 225-227. Numerous other configurations may also be used.

The movable frame 1414 is shown separately in FIG. 229. The movable frame 1414 is sized to fit within and be supported by the fixed frame 1412. The movable frame 1414 includes a first section 1426 and a second section 1428 that correspond to the first side 1408 and the second side 1410 of the lower bed 640. The first section 1426 and the second section 1428 are each pivotally coupled to the fixed frame 1412 using a rod or securing member 1430. The rods 1430 are positioned near the center of the lower bed 640 so that it is near the longitudinal axis 1310. The rods 1430 may be provided as a single rod or shaft that extends longitudinally from one side to the other side of each section 1426, 1428 of the movable frame 1414. The rods 1430 may be received by holes 1432 (FIG. 228) in the fixed frame 1412. For example, one end of the rod 1430 may be inserted through the hole 1432 in the first end frame member 1416 sufficiently to allow the other end of the rod 1430 to be inserted through the hole 1432 in the second end frame member 1418. The rod 1430 may include fastening grooves so that once both ends of the rod 1430 have been received by the holes 1432, a fastening grooves may receive a fastening clip to prevent the rod 1430 from coming out of the holes 1432. The rods 1430 may also be provided as relatively small rods 1430 that are coupled to the sides of each section 1426, 1428 by welding, etc. and engage the end frame members 1416, 1418 of the fixed frame 1412. The rods 1430 may be coupled to the fixed frame 1412 using fastening clips as well.

The movable frame 1414 may also include a plurality of slats 1434 that fit within a corresponding plurality of opposed supports 1436 that define openings to receive the slats 1434. The slats 1434 can move longitudinally in and out of the openings in the supports 1436. The slats 1434 may also be arched so that when a user sits or lays on the lower bed 640, the slats 1434 are compressed which reduces the arch of the slats 1434 and forces the slats 1434 further into the openings in the supports 1436. The use of the slats 1434 and the supports 1436 may provide a comfortable and lightweight way to provide extra support to the user of the lower bed 640.

The movable frame 1414 may be supported in the seating configuration 1304 in any of a number of ways. For example, in FIGS. 222-229, the movable frame 1414 includes a support structure or support member 1438 that may be used to support the seat back 1306. A separate support structure 1438 is included for each section 1426, 1428 of the movable frame 1414. The support structures 1438 are pivotally coupled to the underside of the sections 1426, 1428. In the embodiment shown in FIGS. 222-229, the support structure 1438 includes two parallel spaced apart rods or tubes 1440, 1442 connected together with a plurality of cross supports 1444. The rods 1440 are pivotally coupled to the sections 1426, 1428 near the edge of the movable frame 1414. The rods 1442 are configured to pivot away from the sections 1426, 1428 when the respective section 1426, 1428 is raised. The rods 1442 engage stops 1446 coupled to the fixed frame 1412 to securely support the seat back 1306 in the seating configuration 1304. In the seating configuration 1304, the support structure 1438 in combination with the frame of the respective section 1426, 1428 that forms the seat back 1306 forms a triangle shaped structure that provides relatively strong support for the weight of the users that rest on the seat back 1306. In one embodiment shown in FIG. 228, the fixed frame 1412 may include multiple sets of stops 1446 so that the angle of inclination of the seat back 1306 may be adjusted accordingly. When the sections 1426, 1428 are in the sleeping configuration 1302, the rods 1442 fit within the indentations 1448 in the tubular frames of the sections 1426, 1428. It should be appreciated that the support structure 1438 may be configured in any of a number of ways and include any of a number of components.

It should be appreciated that the bed frame 1454 may be configured in a number of different ways. For example, the bed frame 1454 need not be divided into a fixed frame and a movable frame. In some embodiments, the bed frame 145 may include a movable component that is closely integrated into a fixed support component. Also, the configuration of the fixed frame 1412 and the movable frame 1414 may be varied in a number of different ways.

Referring to FIGS. 230-232, another embodiment of the lower bed 640 is shown that can move between the sleeping configuration 1302 (FIG. 230) and the seating configuration 1304 (FIG. 231) where the lower bed 640 forms a seating unit. Although, not shown in FIGS. 230-232, it is contemplated that the embodiment of the lower bed 640 shown in these Figs. can be configured to move between the first seating configuration 1404 where the lower bed 640 faces toward the interior of the vehicle 10 and the second seating configuration 1406 where the lower bed 640 faces toward the exterior of the vehicle 10.

It should be appreciated that, although the lower bed 640 is shown in FIGS. 230-232 as being used with the system 12 from FIGS. 81-82, the lower bed 640 may be used with any of the systems 12 and associated lifting assemblies 30, 630 described herein. The lower bed 640 may be used with or without the upper bed 641 and/or any of the other features and configurations of the various embodiments described herein. The lower bed 640 may be any suitable size including any size previously mentioned in relation to the lower beds 40, 640.

The lower bed 640 includes a first side or section 1408 and a second side or section 1410. The lower bed 640 also includes a headrest section 1450 and a footrest section 1456. The lower bed 640 pivots in the center along the longitudinal axis 1310 to move between the sleeping configuration 1302 and the seating configuration 1304. The lower bed 640 may also pivot along axis 1311 and/or axis 1309 to move between the sleeping configuration 1302 and a third configuration where the headrest section 1450 and/or the footrest section 1456 are raised. The headrest section 1450 may be raised to allow a user to read, eat, or the like. The footrest section 1456 may be raised to increase return blood flow from the legs or for other therapeutic purposes. The areas where the lower bed 640 may pivot (e.g., axes 1309, 1310, 1311) may be made from an expandable material such as Spandex to allow the surface of the lower bed 640 to pivot and stretch to form the seating unit in the seating configuration 1304. In other embodiments, the first side 1408, the second side 1410, the headrest section 1450, and/or the footrest section 1456 may be made from completely separate sections that are unconnected to each other. It should also be understood that the mattress 1456 may have any of the features, characteristics, or configurations of the mattress 52 described previously.

The lower bed 640 is part of a lower bed assembly that includes the mattress 1452, the bed frame 1454, and the moving assemblies 650. The bed frame 1454 includes a fixed frame 1458 and a movable frame 1460. The movable frame 1460 is supported by and coupled to the fixed frame 1458. FIGS. 233-235 show the fixed frame 1458, the movable frame 1460, and the mattress 1452, respectively. The bed frame 1454 may be configured similarly to the bed frame 54 described herein. The bed frame 1454 and its various components are shown in greater detail in FIGS. 233-234 and 236-241. Many of these Figs. show the lower bed assembly with the mattress 1452 removed in order to better illustrate the bed frame 1454 and its various components.

The fixed frame 1458 includes a first end frame member 1462 and a second end frame member 1464. The first end frame member 1462 extends parallel and adjacent to the side wall 16 and adjacent to the lifting assemblies 630*a*, 630*c*. The second end frame member 1464 extends parallel and adjacent to the side wall 18 and adjacent to the lifting assemblies 630*b*, 630*d*. The fixed frame 1458 also includes cross members 1466, 1468 that extend between the end frame members 1462, 1464 and cross members 1470 that extend between the cross members 1466, 1468. It should be appreciated that the fixed frame 1458 may have many different configurations. In particular, the number, orientation, etc. of the various frame members may be modified to suit the particular situation.

In one embodiment the cross members 1466, 1468 that extend between the end frame members 1462, 1464 may be telescopic to allow for easy adjustment of the bed frame 1454 to fit between side walls 16, 18 that are spaced apart a variety of distances. For example, a single bed frame 1454 may be capable of extending or retracting lengthwise to fit between the side walls 16, 18 of a number of different recreational vehicles. Furthermore, the telescopic arrangement of the cross members 1466, 1468 may compensate for the variation in width between the side walls 16, 18 as the lower bed 640 moves up and down. As shown in FIGS. 233 and 236-237, the cross members 1446, 1448 may be shaped like a C-channel with the cross member 1446 being sized so that it can be received in the cross member 1448. In this manner, the cross members 1446, 1448 may freely move telescopically to allow the lower bed 640 to be installed in any suitable vehicle or structure. Alternatively, the cross member 1448 may be sized to be received by the cross member 1446 as shown in FIG. 236. It should be appreciated that the frame members including the cross members 1446, 1448 may have any suitable shape that provides the requisite strength to support the lower bed 640 while in use such as rectangular, tubular, plate, and so forth. Also, it should be appreciated that the bed frame 1454 may also be configured to not be telescopic. This may be desirable in situations where large quantities of bed frame 1454 are being made for one particular configuration of recreational vehicle.

The movable frame 1460 includes a first section 1472 and a second section 1474 that correspond to the first side 1408 and the second side 1410 of the lower bed 640. The first section 1472 and the second section 1474 are each pivotally coupled to the fixed frame 1458 at the cross members 1470 using a ratchet type mechanism that holds the sections 1472, 1474 in place until the sections 1472, 1474 are fully raised at which point the ratchet type mechanism resets to allow the sections 1472, 1474 to be fully lowered. The ratchet type mechanism is included in a mounting member or bracket 1476 (FIG. 242) that is used to couple the movable frame 1460 to the fixed frame 1458. The first section 1472 and the second section 1474 are also coupled together at connecting points 1478. Each connecting point 1478 includes two pivot points—one that is located on the longitudinal axis that the first section 1472 pivots on and another one that is located on the longitudinal axis that the second section 1474 pivots on (FIG. 242). It should be appreciated that although the movable frame 1460 in FIGS. 234 and 238-242 show both of the sections 1472, 1474 as being movable, the movable frame 1460 may also be configured so that only one of the sections 1472, 1474 is movable.

The movable frame 1460 may also include a headrest portion 1480 and a footrest portion 1482 that correspond to the headrest section 1450 and the footrest section 1456, respectively, of the lower bed 640. The headrest portion 1480 and the footrest portion 1482 are each pivotally coupled to intermediate portions 1484 of the sections 1472, 1474 at connecting points 1486. It should be noted that only FIG. 238 shows the connecting points 1486 between both the headrest portion 1480 and the footrest portion 1482. The headrest portion 1480 and/or the footrest portion 1482 may be coupled to the intermediate portions 1484 using the same ratchet type mechanisms described in connection with the mounting member 1476.

The movable frame 1460 may also include a plurality of slats 1434 that fit within a corresponding plurality of opposed supports 1436 in a manner similar to that previously described. A bed and/or movable frame which may be similar to the lower bed 640 and movable frame shown in FIGS. 234 and 238-241 may be obtained from Innovation USA, Inc., 7453 Candlewood Rd. #B, Hanover, Md. 21076.

Referring to FIG. 243, another embodiment of the lower bed 640 is shown that can move between the sleeping configuration 1302 (see FIG. 222) and the seating configuration 1304 (FIG. 243) where the lower bed 640 forms a seating unit. The lower bed 640 may move between a first seating configuration 1404 (not shown) where the lower bed 640 faces toward the interior of the vehicle 10 and a second seating configuration 1406, shown in FIG. 243, where the lower bed 640 faces toward the exterior of the vehicle 10.

It should be appreciated that, although the lower bed 640 may be used with any of the systems 12 and associated lifting assemblies 30, 630 described herein. The lower bed 640 may be used with or without the upper bed 641 and/or any of the other features and configurations of the various embodiments described herein. The lower bed 640 may be any suitable size including any size previously mentioned in relation to the lower beds 40, 640.

In the embodiment shown in FIG. 243, the lower bed 640 includes a first side or section 1408 and a second side or section 1410. The lower bed 640 pivots in the center along the longitudinal axis 1310 to move between the first seating configuration 1404 where the first side 1408 forms the seat base 1308 and the second side 1410 forms the seat back 1306 and the second seating configuration 1406 where the first side 1408 forms the seat back 1306 and the second side 1410 forms the seat base 1308. The area where the first side 1408 and the second side 1410 of the lower bed 640 meet may be made from an expandable material such as Spandex to allow the surface of the lower bed 640 to pivot and stretch to form the seating unit in the seating configuration. In other embodiments, the first side 1408 and the second side 1410 may be made from completely separate sections that are unconnected to each other. It should also be understood that the mattress 1452 may have any of the features, characteristics, or configurations of the mattress 52 described previously.

The lower bed 640 includes a bed frame 1454 that may be configured similarly to the bed frame 1454 shown in FIGS. 233 and 236-237. The bed frame 1454 may include a fixed frame 1458 and a movable frame 1460. In the embodiment shown in FIG. 243, the fixed frame 1458 includes cross members 1466, 1470 that are made from a tubular material. It should be appreciated that the cross members 1466, 1470 may have any suitable shape and/or be made from any suitable material. The movable frame 1460 includes a first section 1472 and a second section (not shown) which correspond to the first side 1408 and the second side 1410, respectively, of the lower bed 640. The first section 1472 and the second section may be coupled to the cross member 1466 near the longitudinal axis 1310 using a hinge or other suitable coupling arrangement.

In the embodiment shown in FIG. 243, lockable support members 1488 may be used to support and/or move the sides 1408, 1410 between the sleeping configuration 1302 and the seating configuration 1404, 1406. The lockable support members 1488 are pivotally coupled to the cross members 1470 from the fixed frame 1458 and the cross members 1471 from the movable frame 1460. The lockable support members 1488 may be lockable gas springs. Suitable lockable gas springs may be obtained from any suitable source. It should be appreciated that although two lockable support members 1488 are shown in FIG. 243, any number and configuration of lockable support members 1488 may be used to support and/or move the sides 1408, 1410 between the sleeping configuration 1302 and the seating configuration 1404, 1406.

The lockable support members 1488 may be actuated using a handle 1490 and rod 1492 arrangement as shown in FIGS. 243-244. The lockable support members 1488 each include a piston 1494 and a cylinder 1496. The lockable support members 1488 may be actuated by depressing a release pin 1498 at the end of the piston 1494. The lockable support members 1488 may be selected to provide a sufficient amount of force upon actuation to lift the sides 1408, 1410 of the lower bed 640. A tab 1500 may be coupled to the rod 1492 at a location adjacent to the release pin 1498. The handle 1490 is coupled to the rod 1492 so that rotating the handle (pulling upward on the handle) causes the rod 1492 to rotate and the tab 1500 to depress the release pin 1498 (FIG. 244). In this manner, the side 1408, 1410 may be raised with little or no effort on the part of the user. The handle 1490 may be spring biased so that when the handle 1490 is released, the release pin 1498 is no longer depressed. The user may move the side 1408, 1410 downward by rotating the handle 1490 to depress the release pin 1498 and applying sufficient downward force on the side 1408, 1410 of the lower bed 640 to overcome the force provided by the lockable support members 1488. It should be appreciated that the lockable support member 1488 may be actuated in any of a number of ways such as using a lever coupled to the piston 1494, fixed or movable Bowden wire release system, hydraulic release system, and so forth.

The lockable support member 1488 is generally coupled to the fixed frame 1458 at a suitable location to allow the side 1408, 1410 to pivot upward upon extension of the lockable support member 1488. Also, the force provided by the lockable support member 1488 may be varied as required.

Referring to FIGS. 245-249 another embodiment of the lower bed 640 is shown where the lower bed 640 can move between the sleeping configuration 1302 (FIG. 247) and the seating configuration 1304 (FIGS. 245-246 and 248-249) where the lower bed 640 forms a seating unit. The lower bed 640 may move between a first seating configuration 1404, shown in FIGS. 246 and 249 where the lower bed 640 faces one direction and a second seating configuration 1406, shown in FIGS. 245 and 248, where the lower bed 640 faces an opposite direction. It should be appreciated that the lower bed 640 may include many of the features, characteristics, and/or components described previously in connection with lower beds 40, 640 including many of the features, characteristics, and/or components described in connection with the lower beds 640 that can move between the sleeping configuration 1302 and the seating configuration 1304.

In the embodiment shown in FIGS. 245-249, the lower bed 640 includes a first side or section 1408, a second side or section 1410, and an intermediate section 1411. The first side 1408 pivots relative to the intermediate section 1411 along the longitudinal axis 1504, and the second side 1410 pivots relative to the intermediate section 1411 along the longitudinal axis 1502. The lower bed 640 pivots along the longitudinal axes 1502, 1504 to move between the sleeping configuration 1302, the first seating configuration 1404 where the first side 1408 forms the seat base 1308 and the intermediate section 1411 forms the seat back 1306, and the second seating configuration 1406 where the intermediate section 1411 forms the seat back 1306 and the second side 1410 forms the seat base 1308. The area where the first side 1408 meets the intermediate section 1411 and the second side 1410 meets the intermediate section 1411 may be made from an expandable material such as Spandex to allow the surface of the lower bed 640 to pivot and stretch to form the seating unit in the seating configuration 1304. In other embodiments, the first side 1408, the second side 1410, and/or the intermediate section 1411 may be made from completely separate sections that are unconnected to each other. It should also be understood that the mattress 1452 may have any of the features, characteristics, or configurations of the mattress 52 described previously. It should be appreciated that the mattress 1452 may be configured to include a solid material such as a board that supports each section of the mattress 1452. For example, the solid material may be included inside the cover of the mattress 1452 but below the cushion portion of the mattress 1452.

As shown in FIGS. 245-249, the lower bed 640 is configured to move between the sleeping configuration 1302 and the seating configuration 1304 by sliding one of the sides 1408, 1410 horizontally toward the intermediate section 1411, which results in the intermediate section 1411 and the other side 1408, 1410 pivoting relative to each other and being raised at the location where the intermediate section 1411 and the other side 1408, 1410 meet. One advantage to this type of configuration is that the lower bed 640 may provide additional living space when the lower bed 640 is in the seating configuration 1304 due to the horizontal movement of the seat base 1308.

The lower bed 640 is part of a lower bed assembly that includes the bed frame 1454, the lower bed 640, and the moving assemblies 650. The bed frame 1454 includes a first end frame member 1462 and a second end frame member 1464. The first end frame member 1462 and the second end frame member 1464 are spaced apart and extend parallel to each other. The lower bed 640 slides horizontally in a direction that is parallel to the end frame members 1462, 1464. The bed frame 1454 also includes cross members 1466 that extend between the end frame members 1462, 1464 and cross members 1470 (not shown in FIGS. 245-249) that extend between the cross members 1466. It should be appreciated that the bed frame 1454 may have many different configurations. For example, the bed frame 1454 may include a movable frame that is coupled to the mattress 1454 instead of the mattress 1454 including the solid material (which acts in a way as a movable frame). Moreover, the number, orientation, etc. of the various frame members may be modified to suit the particular situation.

The cross members 1466 are positioned far enough from the ends of the end frame members 1462, 1464 that the cross members 1466 do not obstruct the additional space created when the seat base 1308 slides horizontally to convert the lower bed 640 from the sleeping configuration 1302 to the seating configuration 1304. The cross members 1470 may be positioned between the cross members 1466 to provide additional strength.

The lower bed 640 may move between the sleeping configuration 1302 and the seating configuration 1304 in any of a number of ways. For example, in one embodiment, the sides 1408, 1410 may be coupled to the bed frame 1454 using a flange (e.g., a steel plate positioned horizontally) which slides in a C-channel (i.e., the end frame members 1462, 1464 may be C-channel shaped with the opening being on a top side). At each end of travel of the C-channel, ball bearings may be biased (e.g., spring, etc.) to protrude part of the way into the channel from both the top and the bottom of the C-channel. The flange may include indentations that cooperate with the ball bearings to secure the lower bed 640 in the seating configuration 1304. The manner in which the sides 1408, 1410 slide relative to the bed frame 1454 and the manner in which the lower bed 640 is secured in the seating configuration 1304 may be varied widely.

The lower bed 640 may also be configured to use the lockable support members 1488 described in connection with FIGS. 243-244. FIGS. 245-249 show one embodiment of the lower bed 640 that uses the lockable support members 1488 to move the sides 1408, 1410 horizontally. The lockable support members 1488 are coupled to the ends of the end frame members 1462, 1464 and to the underside of the lower bed 640. As shown in FIG. 246, the mattress 1452 may include recesses 1506 which are sized to receive the lockable support members 1488 to provide a more aesthetically pleasing appearance when the lower bed is in the sleeping configuration 1302. It should be appreciated that the lower bed 640 may be provided without the recesses 1506.

The lockable support members 1488 may be actuated using the handle 1490 and rod 1492 mechanism described in connection with FIGS. 243-244. The lockable support members 1488 may be actuated using the actuation mechanism shown in FIG. 244. The actuation mechanism operates by rotating the handle 1490 so that the tab 1500 depresses the release pin 1498. When the release pin 1498 is depressed, the lockable support members 1488 extend, which puts a compression force on the lower bed 640. The intermediate section 1411 may be raised slightly so that the compression force causes the intermediate section 1411 to continue to rise along with the side 1408, 1410 that is not being used as the seat base 1308. Once the intermediate section and the side 1408, 1410 that is not being used as the seat base 1308 begin to pivot, the force from the lockable support members 1488 may be sufficient to move the lower bed 640 the rest of the way into the seating configuration 1304.

The lockable support members 1488 may be coupled to the end frame members 1462, 1464 in any of a number of suitable ways. For example, as shown in FIG. 250, the bed frame 1454 may include a pin 1508 that is generally cylindrically shaped with the horizontal facing sides 1510 of the pin 1508 being curved and the vertical facing sides 1512 being flat. The lockable support member 1488 includes a mounting member 1514 which includes a cylindrical opening 1516 that is open on one side. The opening 1516 is sized to fit over the pin 1508 when the opening 1516 is lined up with the flat vertical facing sides 1512. Also, the mounting member 1514 is configured to allow the lockable support member 1488 to pivot on the pin 1508. For example, in FIGS. 248-249, the lockable support member 1488 pivots around the pin 1508 when the lower bed 640 is in the seating configuration 1304. Once the mounting member 1514 pivots around the pin 1508, the open side of the opening 1516 is no longer lined up with the flat vertical facing sides 1512 of the pin 1508. Thus, the lockable support member 1488 is prevented from disengaging from the pin 1508. The configuration shown in FIG. 250 may be desirable to allow the mattress 1542 to be quickly and easily removed from the bed frame 1454. It should be appreciated that the lockable support members 1488 may be coupled to the bed frame 1454 in any of a number of suitable ways. For example, the mounting member 1514 may include an opening 1516 that is configured to receive a pin or bolt 1518 as shown in FIG. 251.

It should be appreciated that the lower bed 640 and the lower bed assembly of which it is a part may be configured in a variety of ways. For example, the lower bed 640 may be provided as four longitudinal sections pivotally coupled together. Typically, the number of longitudinal sections that the lower bed 640 is divided into depends on the size of the lower bed 640 (e.g., queen, king, twin, etc.), the size of the seat back 1306, the size of the seat base 1308, and the distance that the seat base 1308 slides horizontally.

Referring to FIG. 252, another embodiment of the system 12 is shown. In this embodiment, the lower bed 640 may be moved between the sleeping configuration 1302 and a dining configuration 1314. In the dining configuration 1314, the lower bed 640 may be converted into a dinette which includes a table 1316—alternatively referred to herein as an eating surface or dining surface—a first seating unit or bench 1318 and a second seating unit or bench 1320. In general, the table 1316 is configured to be positioned in a plane which is elevated relative to the plane of the seating units 1318, 1320.

In one embodiment, the lower bed 640 may include a base 1324 which is provided in three sections or portions 1326, 1328, 1330 which correspond, respectively, to the table 1316 and the seating units 1318, 1320. The mattress 1452 may be divided into four portions 1322 with two of the portions 1322 being configured to be placed over the table section 1326 so that when the table section 1326 of the base is positioned to be used as the table 1316, one portion 1322 may be used as a back cushion for one of the seating units 1318 and the other portion 1322 may be used as a back cushion for the other seating unit 1320.

The bed frame 1454 may comprise angle iron frame members which extend around the perimeter of the lower bed 640 and are configured to support the base 1324 of the lower bed 640 when in the sleeping configuration 1302. The angle iron frame members include a front frame member or cross frame member 1332 and a rear frame member or cross frame member 1334 as well as numerous additional cross frame members that extend between the frame members 1332, 1334. The table section 1326 of the base 1324 may be pivotally coupled to the rear frame member 1334 using the support brace 1336 and a pivot mechanism 1340. The support brace pivots along an axis 1338 which is offset below the rear frame member 1334 so that the table section 1326 may be supported by the rear frame member 1334 without interference from the pivot mechanism 1340. In one embodiment, the support brace 1336 may be configured to slide along the underside of the table section 1326 in order to raise the table section 1326. The sliding movement may be provided using blocks coupled to the support brace 1336 which slidably cooperate with channels coupled to the underside of the table section 1326. The side of the table 1316 supported by the front frame member 1332 may be supported using a leg or support member 1342. In one embodiment, the leg 1342 may be configured to fold up against the underside of the table 1316 when the table section 1326 is supported by the front frame member 1332 and the rear frame member 1334. It should be appreciated that numerous other embodiments may also be used to raise and/or support the table 1316 in the dining configuration 1314.

In one embodiment, the front frame member 1332 of the bed frame 1454 may be divided into frame sections 1348, 1350, 1352, 1354 so that the frame sections 1350, 1352 which support the table section 1326 may fold down at the corners 1344, 1346 of the seating units 1318, 1320, respectively. The height of the lower bed 640 may be adjusted so that the leg 1342 and the frame sections 1350, 1352 of the front frame member 1332 reach the floor 26. A hinge or other suitable pivot mechanism may be provided to allow the frame sections 1350, 1352 to pivot relative to the frame sections 1348, 1354, respectively. When the lower bed 640 is in the sleeping configuration 1302, the frame sections 1350, 1352 may be coupled together using a pin 1356 which slidably engages sleeves 1358 on adjacent ends of the frame sections 1350, 1352.

It should be appreciated that numerous additional embodiments may also be provided. For example, in one embodiment, the front frame member 1332 may be one continuous piece. In this embodiment, users may need to step over the front frame member 1332 to sit on the seating units 1318, 1320. In another embodiment, a folding table 1360 may be used in place of the table 1316. As shown in FIG. 253, the lower bed 640 may include the support brackets 392 which are configured to support the folding table 1360 when it is not in use. The folding table 1360 may be removed from the support brackets 392 when the user desires to serve or prepare food or perform any other task. Also, it should be appreciated that any of the embodiments of the system 12 and, in particular, the lifting assemblies 30, 630 described herein may be used with the lower bed 640 shown in FIGS. 220-252.

Referring to FIGS. 254-255, another embodiment of the system 12 is shown. In FIG. 254, the beds 640, 641 are shown being in the stowed configuration 612. A seating unit 1362 is coupled to the first side wall 16. The seating unit 1362 includes a seat back 1364 and a seat base 1366. A dinette 1368 is coupled to the second side wall 18. The dinette 1368 includes a table 1370, a first seating unit 1372, and a second seating unit 1374. It should be understood that any combination of the seating units and the dinettes may be coupled to the side walls 16, 18. For example, in one embodiment a seating unit may be coupled to each side wall 16, 18. In another embodiment, a dinette may be coupled to each side wall 16, 18. Numerous other embodiments may also be provided.

As shown in FIG. 255, the seating unit 1362 and the dinette 1368 may be configured to fold up against the side walls 16, 18, respectively, when the beds 640, 641 are in the use configuration 610. Thus, the seating unit 1362 is positioned between the lower bed 640 and the first side wall 16, and the dinette 1368 is positioned between the lower bed 640 and the second side wall 18. The seating unit 1362 and the dinette 1368 may be configured to fold up against the side walls 16, 18 in any conventionally known manner. Also, it should be understood that lower bed 640 may be spaced apart from the side walls 16, 18 sufficiently to allow the lower bed 640 to move vertically and unimpeded by the seating unit 1362 and/or the dinette 1368. In one embodiment, the distance between the side walls 16, 18 and the lower bed 640 may be adjusted by adjusting the distance that the mounting members 840 extend outward from the moving members 620. Numerous other embodiments along those same lines may also be used.

Referring to FIGS. 256-260, another embodiment of the system 12 is shown where the lower bed 640 may be moved between the sleeping configuration 1302, the dining configuration 1314, and/or the seating configuration 1304. The seating configuration 1304 is shown in FIG. 260. The seating configuration 1304 may be converted into a dining configuration 1314 by positioning a table such as the folding table 1360 shown in FIG. 253 between the seating units shown in FIG. 260. It should be appreciated that the lifting assemblies 630 and the upper bed 641 shown in FIGS. 256-260 may have any or all of the features, characteristics, and/or components of the previous embodiments of the lifting assemblies and the upper bed 641 described herein. For example, the beds 640, 641 may move between the use configuration 610 (FIG. 256), the stowed configuration 612 (FIG. 257), and the third configuration 440. The lower bed 640 may move between the sleeping configuration 1302 and the seating configuration 1304 when the beds 640, 641 are in any of these configurations, 610, 612, 440.

It should be appreciated that the embodiment shown in FIGS. 256-260 may be useful in those situations where the user desires to pass by the lower bed 640. For example, this embodiment may be especially desirable to use in a toy hauler type recreational vehicle. In other vehicles, it may be desirable to use the configuration of the lower bed 640 shown in FIGS. 220-221. It should be understood that any of the embodiments of the lower bed 640 which move between a sleeping configuration 1302 and a seating configuration 1304 may be used in any suitable manner whether it is in a vehicle or other structure.

The lower bed 640 shown in FIGS. 256-260 may be configured similarly to the lower bed 640 shown in FIG. 252. For example, the lower bed 640 shown in FIGS. 256-260 may be divided into four physically separate pieces—a first side 1520, a second side 1522, a first intermediate section 1524, and a second intermediate section 1526. The bed frame 1454 may also include the front frame member 1332 and the rear frame member 1334 as well as additional cross members that extend between the frame members 1332, 1334. The frame members 1332, 1334 may each be divided into frame sections 1348, 1350, 1352, 1354. the bed frame 1454 may include numerous support legs 1528 that can be used to support the lower bed 640 in the sleeping configuration 1302 and/or the seating configuration 1304. The support legs may be adjustable lengthwise (e.g., telescopic) or may be fixed lengthwise. As shown in FIG. 257, the support legs 1528 may be pivotally coupled to the bed frame 1454 so that the support legs 1528 can be pivoted upward against the underside of the bed frame 1454 to provide additional space in the cargo area 28. The support legs 1528 may have any of a number of suitable configurations. For example, the support legs 1528 may be lockable gas springs that may be actuated using the handle 1490 and the rod 1492.

The sections of the lower bed 640 may be coupled together to allow the lower bed to move to a seating configuration 1304 where a first seating unit 1530 is positioned adjacent to the first side wall 16 and a second seating unit 1532 is positioned adjacent to the second side wall 18. The first seating unit 1530 and the second seating unit 1532 are positioned so that the seating units 1530, 1532 are generally parallel to the side walls 16, 18, respectively. The seating units 1530, 1532 face each other so that a walkway or path 1534 is formed between the seating units 1530, 1532 to allow a person to move from the interior of the vehicle 10 to the exterior of the vehicle 10 through the opening 48.

The first side 1520 may be movable relative to the first intermediate section 1524 and the second side 1522 may be movable relative to the second intermediate section 1526. When the lower bed 640 is in the seating configuration 1304, as shown in FIGS. 258-260, the first intermediate section 1524 and the first side 1520 form the seat back 1306 and the seat base 1308, respectively, of the first seating unit 1530. Also, the second intermediate section 1526 and the second side 1522 form the seat back 1306 and the seat base 1308, respectively, of the second seating unit 1532. The intermediate sections 1524, 1526 may move relative to the sides 1520, 1522 using the mechanism shown in U.S. Pat. No. 6,163,900 (hereinafter referred to as "the '900 patent"), entitled "Folding RV Furniture," which is hereby incorporated by reference in its entirety. The mechanism in the '900 patent may be referred to herein as a "rollover" or "tumble" mechanism because the intermediate sections 1524, 1526 rotate as well as pivot when the intermediate sections 1524, 1526 move between the sleeping configuration 1302 and the seating configuration 1304. The result is that the same side of the intermediate sections 1524, 1526 that forms the sleeping surface 1536 when the lower bed 640 is in the sleeping configuration 1302 also forms a seat back surface 1538 when the lower bed 640 is in the seating configuration 1304. The intermediate sections 1524, 1526 may each include a separate frame (e.g., internal or external frame) to provide structural integrity to the intermediate sections 1524, 1526. A suitable lower bed 640 may be obtained from Blazin Bell Tech, Inc. at P.O. Box 42325, Las Vegas, Nev. 89116 as part number DIR-059

It should be appreciated that there are numerous ways to convert the lower bed 640 into one or more of the seating units 1530, 1532. For example, the first side 1520 may be pivotally coupled to the first intermediate section 1524. Both the first side 1520 and the intermediate section 1524 may also be configured to slide horizontally toward the first side wall 16. A user may lift the first side 1520 while at the same time sliding the first intermediate section 1524 towards the first side wall 16 to provide the first seating unit 1530. A catch mechanism may be used to hold the first side 1520 and the first intermediate section 1524 in the seating configuration 1304. A similar set up may be used to move the second side 1522 and the second intermediate section 1526 to provide the second seating unit 1532. It should be appreciated that the size of the sides 1520, 1522 and the intermediate sections 1524, 1526 may be adjusted depending on which configuration is used to provide a suitable seat back 1306 and seat base 1308. Numerous other configurations may also be used.

Referring to FIGS. 259-260, the frame sections 1350, 1352 may be pivotally coupled to the frame sections 1348, 1354, respectively, for both the front frame member 1332 and the rear frame member 1334. The frame sections 1350, 1352 may pivot from the position shown in FIG. 259 where the frame sections 1350, 1352 are positioned parallel to the frame sections 1348, 1354 to the position shown in FIG. 260 where the frame sections 1350 from the frame members 1332, 1334 are positioned in front of the first seating unit 1530 and perpendicular to the frame sections 1348 and where the frame sections 1352 from the frame members 1332, 1334 are positioned in front of the second seating unit 1532 and perpendicular to the frame sections 1354. The frame section 1350, 1352 may be securely coupled together in either of the configurations shown in FIGS. 259-260. As shown in FIG. 259, the frame sections 1350, 1352 of each frame member 1332, 1334 overlap in middle of the lower bed 640 so that a hole 1540 is formed through the frame sections 1350, 1352. The frame sections 1350, 1352 may be coupled together using a fastener such as a bolt or a plastic insert. The frame sections 1350 may be coupled to each other as shown in FIG. 260, and the frame sections 1352 may be coupled to each other as also shown in FIG. 260.

In another embodiment, the lower bed 640 may be provided in two sections which move between the sleeping configuration 1302 and the seating configuration 1304 in a manner similar to that described in connection with FIGS. 220-221. The lower bed 640 may be divided roughly in half so that the side closest to the first side wall 16 converts into a first seating unit and the side closest to the second side wall 18 converts into a second seating unit. The seating units would be similar to the seating units 1350, 1352 except that the cushion or mattress for each side would be one-piece. In one example, each side of the lower bed 640 may use futon mechanisms commonly known as "wall huggers" to allow the lower bed 640 to convert into the two seating units positioned adjacent to the side walls 16, 18. It should be appreciated that numerous other mechanisms for converting an item of furniture between a bed and a seating unit may be used.

Referring to FIG. 261, another embodiment of the system 12 is shown. In this embodiment, the vehicle 10 comprises a slide-out compartment 1376 which moves between an extended position and a retracted position. In this embodiment, the slide-out compartment 1376 is positioned in an opening in the first side wall 16. However, in other embodiments, the slide-out compartment 1376 may be positioned in any of the walls of the vehicle 10. In general, the slide-out compartment 1376 includes a first side wall 1378, a second side wall 1380, a rear side wall 1386, a slide-out ceiling 1382, and a slide-out floor 1384.

The system 12 may be coupled to the slide-out compartment 1376 so that the beds 640, 641 move with the slide-out compartment between the extended and retracted positions. The lifting assemblies 630*a*, 630*c* may be coupled to the first side wall 1378 and the lifting assemblies 630*b*, 630*d* may be coupled to the second side wall 1380. The lifting assemblies 630 may be used to move the beds 640, 641 between the use configuration 610, the stowed configuration 612, and the third configuration 440. Because of the limited size of the slide-out compartment 1376, the beds 640, 641 are often single, twin, or double sized beds. Of course, depending on the configuration, the beds 640, 641 may also be larger.

It should be appreciated that numerous modifications may be made to the embodiment shown in FIG. 261. For example, in one embodiment, only two lifting assemblies 630*a*, 630*b* may be provided to vertically move the beds 640, 641. In this embodiment, the system 12 may be configured similarly to the embodiment shown in FIG. 133, except that the lifting assemblies 630*a*, 630*b* are coupled to the slide-out compartment 1376. In another embodiment, the system 12 may be configured to vertically move only the lower bed 640. In yet another embodiment, the system 12 may be configured to vertically move three beds between the use configuration 610 and the stowed configuration 612. Numerous additional embodiments may also be provided.

Referring to FIG. 262, another embodiment of the system 12 is shown. This embodiment is similar to the embodiment shown in FIGS. 79-80. However, in this embodiment, the lifting assemblies 630 are coupled to the floor 26 and/or the ceiling 24 without being coupled to the side walls 16, 18. Flanges or mounting members 1386 may be used to couple the lifting assemblies 630 to the floor 26 and the ceiling 24. This type of configuration may be suitable for large open buildings which are used to house people. For example, this configuration may be useful for military barracks and the like. In another embodiment, the system 12 may be configured to be coupled only to the floor 26. Numerous additional embodiments may also be provided.

Referring to FIGS. 263-265 another embodiment of the system 12 is shown where the lifting assemblies 630 are located inside the side walls 16, 18 of the vehicle 10 and the motor assembly 636 and the drive member 634 are positioned underneath the floor 26. The first side wall 16 includes gaps, slits, or openings 1544*a*, 1544*c* that correspond to the lifting assemblies 630*a*, 630*c*, respectively. The second side wall 18 includes gaps 1544*b*, 1544*d* that correspond to the lifting assemblies 630*b*, 630*d*, respectively (the gaps 1544*a*, 1544*b*, 1544*c*, 1544*d* are collectively referred to herein as "the gaps 1544"). The mounting members 840 which are coupled to the moving members 650 are shown extending through the gaps 1544 to support the beds 640, 641 thereon. A pin or stop member 1546 is coupled to the side walls 16, 18 adjacent to each gap 1544. The pins 1546 may be inserted through openings 1548, 1550 to support the beds 640, 641, respectively in the stowed position. It should be appreciated that the pins 1546 may be inserted through the openings 1548 to support both of the beds 640, 641 in the stowed configuration 612. Also, the pins may be inserted through the openings 1550 to support the bed 640, if it is the only bed included with the system 12, or to support the bed 641 in the third configuration 440.

A number of advantages may be realized by positioning the lifting assemblies 630 in the side walls 16, 18. For example, additional space is freed up between the side walls 16, 18. This may allow the user to transport larger off-road vehicles or other cargo. Also, the interior of the vehicle 10 may be more aesthetically pleasing with the lifting assemblies 630 positioned out of sight. It should be appreciated that the system 12 shown in FIGS. 263-265 may be modified in a number of ways. For example, in one embodiment, the gaps 1544 may extend all of the way to the floor 26. This may be useful when the system 12 is used to lift objects such as off-road vehicles. In another embodiment, the gaps 1544 may extend all of the way to the ceiling 24. Numerous additional embodiments may be provided.

FIG. 264 shows the vehicle 10 with the side walls 16, 18 partially cut-away to show the lifting assemblies 630*a*, 630*b*. FIG. 265 shows the vehicle 10 with the body removed and the lifting assemblies 630 coupled to the frame 1552 of the vehicle 10. The cross members 614 extend between the lower ends 626 of the lifting assemblies 630 and through some of the cross members included with the frame 1552 of the vehicle 10. It should be appreciated that the frame 1552 is one of many configurations that may be used. For example, in other embodiments the frame may be a conventional frame having two longitudinal members with cross members that extend between the longitudinal members. The longitudinal members may be configured to be more toward the center of the vehicle 10 so that the cross members not only extend between the longitudinal members, but also extend beyond the longitudinal members to a location directly beneath the side walls 16, 18. Numerous other configurations of the frame 1552 may also be used.

It should also be appreciated that the system 12 may be positioned inside the walls of any suitable vehicle. A toy hauler type recreational vehicle may be one type of vehicle where such an arrangement may be desirable. However, it is contemplated that other recreational vehicles such as motorhomes and the like as well as other vehicles or structures may have the system 12 mounted inside the walls.

Referring to FIG. 266, an exploded view is shown of one embodiment of the lifting assembly 630*a* that may be positioned inside the first side wall 16 of the vehicle 10. It should be appreciated that the other lifting assemblies 630*b*, 630*c*, 630*d* may be configured similarly to the lifting assembly 630*a*. The lifting assembly includes a lower drive mechanism 691, which is similar to the upper drive mechanism 690 shown in FIG. 87 except that the lower drive mechanism 691 is coupled to the lower end 626 of the guide member 618. Although the motor assembly 636 is not shown in FIG. 266, it should be appreciated that the motor assembly 636 may be coupled to the guide member 618 in a similar manner to what is shown in FIG. 87.

The idler assembly 777 shown and described in FIG. 117 is shown in FIG. 266 as being coupled to the upper end 624 of the guide member 618. The use of the idler assembly 777 instead of the yoke assembly 764 may be desirable due to the weight that is put on the idler assembly 777. The use of the bearings 726, 728 and the sprocket 725 may provide additional load capacity at the upper end 624 of the guide member 618 compared to the yoke assembly 777. It should be appreciated, however, that it is not necessary to use the bearings 726, 728 or the sprocket 725. In other embodiments, the bearings 726, 728 may be omitted and the sprocket 725 may be replaced with a wheel that does not have teeth. It should be noted that, in this configuration, the distinction between the load bearing side of the drive member 616*a* and the return side is not as pronounced since a very large portion of the drive member 616*a* bears the load from the beds 640, 641. The return portion would only be that portion of the drive member 616*a* from the sprocket 722 upward to where the drive member 616*a* is coupled to the moving assembly 650*a*.

As explained previously, the pin 1546 may be inserted into the holes 1548, 1550 to support one or more of the beds 640, 641 in the raised position. As shown in FIG. 266, the pin 1546 can be inserted into the openings or hole 944 in the securing flange 710 and the opening or hole 945 in the base 706 of the guide member 618. The pin 1546 includes an engaging section 1554, which is formed by two adjacent rings that are of larger diameter than the rest of the pin 1546. The rings define a groove in the pin 1546. The opening 944 includes a large round portion and a smaller narrow slot directly below the large round portion. The opening 944 may be thought of as being shaped like a keyhole. The large round portion is sized to receive the rings on the pin 1546. The pin 1546 may be fixed securely in place by inserting the distal ring through the large round portion of the opening 944 and then moving the pin 1546 downward into the smaller narrow slot of the opening 944 so that the securing flange 710 is positioned between the two rings on the pin 1546. In other words, one of the rings is on the outside of the securing flange 710 and another one of the rings is on the inside of the securing flange 710. In many situations, the side wall 16 may be positioned flush against the base 706 so that the pin 1546 is unable to be inserted through the opening 944 in the base 706. This problem may be overcome by sizing the pin 1546 so that it extends only as far as the outer surface of the base 706 of the guide member 618 when the pin 1546 is in place. The moving assembly 651*a* includes corresponding notches or recesses 943 which are sized to receive the pin 1546. It should be appreciated that numerous other embodiments of the lifting assemblies 630 may also be positioned in the side walls 16, 18 of the vehicle 10.

Another embodiment of the system 12 is shown in FIGS. 267-268. As shown in FIGS. 267-268, the lifting assemblies 630 are positioned inside the side walls 16, 18. The motor assembly 636, drive member 634 and cross member 614 are positioned in the ceiling 24 of the vehicle 10. The configuration of the lifting assemblies 630 may be very similar to that shown in FIGS. 81-82 since the lifting assemblies 630 have not been inverted or other changes made to the lifting assemblies 630.

Referring to FIGS. 269-271, additional embodiments of the system 12 are shown. In these embodiments, the system 12 may be used to vertically move a wall mounted unit 1556 between a use position where the wall mounted unit 1556 is positioned for use and a stowed position where the wall mounted unit 1556 is positioned adjacent to the ceiling 24 of the vehicle 10. Examples of wall mounted units 1556 that may be moved using the system 12 include furniture such as a couch, bed, desk, entertainment center and the like; appliances such as a stove, microwave, television and the like; storage units such as a cabinet, cupboard, shelf, counter; and other miscellaneous objects such as a sink.

In FIG. 269, the wall mounted unit 1556 is an entertainment center which includes a television 1558. The wall mounted unit 1556 may be coupled to the lifting assemblies 630*a*, 630*c* using a fastener such as a bolt or screw which extends through the back of the wall mounted unit 1556 and into the moving assemblies 650*a*, 650*c*. A spacer may be positioned between the moving assemblies 650*a*, 650*c* and the back of the wall mounted unit 1556 to prevent the wall mounted unit 1556 from pressing up against the guide member 618 when the fastener is tightened. The wall mounted unit 1556 may be designed to include a recess in the back for the guide member 618 to fit in so that the remainder of the wall mounted unit 1556 is positioned flush with the first side wall 16. It should be appreciated that although two lifting assemblies 630*a*, 630*c* are shown, one or more than two lifting assemblies 630 may also be used to vertically move the wall mounted unit 1556. Any of the lifting assemblies 30, 630 may be used to vertically move the wall mounted unit 1556.

It should be appreciated that one wall mounted unit 1556 may be coupled to the first side wall 16 and another wall mounted unit 1556 may be coupled to the second side wall 18. The wall mounted units 1556 may be moved independently of each other, e.g., using separate motors, or may be moved in unison using drive member 634. In another embodiment, a fold down couch or dinette may be coupled to the first side wall 16 below the wall mounted unit 1556. The fold down couch or dinette may also be moved vertically using the system 12. As shown in FIG. 269, the wall mounted unit 1556 may include doors 1474 (e.g., cupboard doors and the like), shelves (not shown), storage areas, etc. It should be appreciated that the configuration of the wall mounted unit 1556 may vary widely.

In FIG. 270, another embodiment of the system 12 is shown which may be used to move two wall mounted units 1556, 1562 positioned one above another. In this embodiment, the upper wall mounted unit 1556 is the entertainment center shown in FIG. 269. The lower wall mounted unit 1562 may include a counter surface 1564 that can be lowered to increase the available counter space in the vehicle 10. As shown in FIG. 270, the counter surface 1564 of the lower wall mounted unit 1562 can be lowered to be flush with the fixed counter surface 1566 to create one large counter surface. One common limitation of many vehicles is the lack of counter space. Thus, this embodiment may be used to substantially increase the counter space.

In another embodiment, the lower wall mounted unit 1562 may be used to provide a counter surface 1564 that is a standalone surface. The counter surface 1564 may be any suitable counter surface such as Corian, formica, etc. Also, the lower wall mounted unit 1562 may be only a counter surface without the cabinets or cupboards shown in FIG. 270. Additionally, the lower wall mounted unit 1562 may be an entertainment center which includes an opening to receive the television 1558. Numerous other embodiments may also be provided.

The upper wall mounted unit 1556 and the lower wall mounted unit 1562 may be raised in a similar manner as the lower bed 640 and the upper bed 641 are raised. For example, the lower wall mounted unit 1562 may be raised initially until it contacted the underside of the upper wall mounted unit 1556 or the moving assemblies 650 contact the moving assemblies 651. From this point on, the wall mounted units 1556, 1562 move upward together to the stowed position. It should be appreciated that the position of the upper wall mounted unit 1556 in the use position may be altered as described in connection with FIG. 102. Numerous other objects or items may also be moved vertically in a similar fashion such as desks, tables, etc.

Referring to FIG. 271, another embodiment is shown of the system 12 which is used to vertically move one or more wall mounted units 1556, 1562. In this embodiment, the lifting assemblies 630 are positioned inside the first side wall 16. Also, the lifting assemblies 630 may be used to move the sink 1568 between a stowed and a use position. It should be appreciated that the plumbing for the sink 1568 may be provided using flexible tubing so that the sink 1568 can be raised and lowered without disconnecting the plumbing. Also, the sink 1568 may be raised in tandem with the wall mounted units 1556, 1562, or the sink 1568 may be raised using one or more separate lifting assemblies 630. If the sink is raised in tandem with the wall mounted unit 1562, then the sink 1568 may not be positioned as close to the ceiling 24 as it otherwise could be. Thus, it may be desirable to move the sink 1568 using one or more separate lifting assemblies 630 so that the sink 1568 may be positioned closer to the ceiling 24 in the stowed position.

Referring to FIGS. 272-275, one embodiment of the vehicle 10 is shown. In this embodiment, the vehicle 10 may be a toy hauler, cargo hauler, or the like. It should be appreciated, however, that the various configurations described and shown in FIGS. 272-275 may be equally applicable to a wide range of vehicles and/or structures. The vehicle 10 includes a number of objects that may be moved vertically between a stowed position and a use position using the system 12. In particular, the vehicle 10 includes the superposed beds 640, 641 positioned near the rear wall 22 (a portion of the rear wall 22 may be used as a ramp door to move vehicles into and/or out of the vehicle 10). The vehicle 10 further includes another bed 1570 coupled to the first side wall 16. Cabinets 1572 are also coupled to the first side wall 16 directly above the bed 1570. A counter 1574 and an entertainment center 1576 are coupled to the second side wall 18. The counter 1574 is positioned directly below the entertainment center 1576. The counter 1574 also includes some small cabinets 1578 which are located underneath the counter 1574. The entertainment center 1576 includes a flat panel television 1580 and cabinets 1582. The cabinets 1582 may be used to house audio/video equipment or any other items as desired.

The vehicle 10 also includes a number of lifting assemblies 630 which are used to raise and lower the various objects included in the vehicle 10. In the embodiment shown in FIGS. 272-275, all of the lifting assemblies 630 are positioned inside the side walls 16, 18. However, it should be appreciated that the lifting assemblies 630 may also be coupled to the outside of the side walls 16, 18 in the interior of the vehicle 10. FIG. 273 shows the various objects in a lowered position and the beds 640, 1570 in the sleeping configuration 1302. This configuration may be typical during nighttime use of the vehicle 10. FIG. 274 shows all of the various objects in a lowered position except for the upper bed 641, which is in the stowed position. The beds 640, 1570 are shown in the seating configuration 1304. This configuration may be typical during daytime use of the vehicle 10.

The beds 640, 641 are coupled to lifting assemblies 630*a*, 630*b*, 630*c*, 630*d* using a configuration similar to that shown in FIGS. 263-265. In FIGS. 272-275, the lower bed 640 is larger than the upper bed 641. It should be appreciated, however, that the beds 640, 641 may be the same size and/or any combination of sizes. For example, in one embodiment, the lower bed 640 may be smaller than the upper bed 641. The lower bed 640 may be configured to move between a sleeping configuration 1302 and a seating configuration 1304. This may be accomplished using any of the applicable embodiments of the lower bed 640 described previously.

The bed 1570 may also move between the sleeping configuration 1302 and the seating configuration 1304. In one embodiment, the bed 1570 may be configured similarly to the half of the lower bed 640 in FIGS. 256-260 that is coupled to lifting assemblies 630*a*, 630*c*. It should be appreciated that the bed 1570 may move between the sleeping configuration 1302 and the seating configuration 1304 in any of the ways described herein.

The bed 1570 is positioned directly underneath the cabinets 1572. Both the bed 1570 and the cabinets 1572 may be raised and lowered using additional lifting assemblies 630 included in the first side wall 16. The lifting assemblies 630 may move the bed 1570 until it reaches the cabinets 1572. From this point on, the lifting assemblies 630 move the bed 1570 and the cabinets 1572 together to a stowed configuration. In this manner, the bed 1570 may be used to move the cabinets 1572 between a use position and a stowed position.

The counter 1574 and the entertainment center 1576 are also coupled to additional lifting assemblies 630 included in the second side wall 18. The additional lifting assemblies 630 may be used to move the counter 1574 and the entertainment center 1576 between a use configuration and a stowed configuration. The counter 1574 and the entertainment center 1576 may move vertically in a manner similar to the bed 1570 and the cabinets 1572. For example, the lifting assemblies 630 first move the counter 1574 until it reaches the entertainment center 1576. From this point on, the lifting assemblies 630 move the counter 1574 and the entertainment center 1576 in tandem to the stowed configuration. In one embodiment, a separate motor assembly is provided to raise and lower the beds 640, 641, the bed 1570 and the cabinets 1572, and the counter 1574 and the entertainment center 1576.

It should be appreciated that any combination of the objects mentioned herein may be moved vertically in the vehicle 10. For example, another counter 1574 may be substituted for the bed 1570. Another bed 1570 may be substituted for the counter 1574. Numerous additional embodiments are also contemplated.

Referring to FIGS. 276-279, another embodiment of the vehicle 10 is shown. This embodiment is similar in many ways to the embodiment shown in FIGS. 272-275. Accordingly, similarities between the two embodiments are not repeated with the understanding that any similarities apply equally to each embodiment. In FIGS. 276-279, the sink 1568 and the stove 1584 are also moved vertically between a use position and a stowed position. As shown in FIGS. 277-279, the fuel line to the stove as well as the water and drain lines to and from the sink may be included in a single bundle of flexible tubing 1586. The sink 1568 may still be configured to include a sink trap at the base to prevent unwanted odors from entering the vehicle 10 and/or prevent certain materials from entering the gray water tank of the vehicle 10. The sink trap may be provided using rigid PVC plastic. The flexible drain tubing for the sink 1568 may be coupled to the end of the sink trap.

The vehicle 10 in FIGS. 276-279 may also include a cupboard 1588 that moves vertically and is positioned above the sink 1568 and the stove 1584. The cupboard 1588 may include a microwave oven, toaster oven, or the like. The cupboard 1588 may move vertically in a similar fashion as the bed 1570 and the cabinet 1572. In the embodiment shown in FIGS. 276-279, the sink 1568, the stove 1584, and the counter 1574 form an integral unit. This means that the sink 1568, the stove 1584, and the counter 1574 all move vertically at the same time and catch the entertainment center 1576 and the cupboard 1588 on the way up. It should be appreciated that the sink 1568, the stove 1584, and/or the counter 1574 may each be provided as separate units.

Referring to FIGS. 275 and 279, the bed 1570 may be used to store various items while the vehicle 10 is in transit. For example, netting or retaining material 1590 may be provided all the way around the bed 1570 to prevent any materials from falling off the bed 1570 while the vehicle 10 is in motion. The items may be placed on the bed 1570 prior to or after the bed 1570 is raised. Flexible support members 1592 may be coupled between the ceiling 24 and the bed 1570 to provide extra support to the bed 1570 while the vehicle 10 is in motion. The flexible support members 1592 may be positioned on the side of the bed 1570 that is furthest from the lifting assemblies 630. Additional netting or retaining material 1590 may also be suspended from the underside of the counter 1574. Additional items may be transported in the additional netting 1590.

The vehicle 10 shown in FIGS. 272-279 may also have a number of other options that are typically found in vehicles of this type. For example, the vehicle 10 includes a wet bath (e.g., cassette type toilet, etc.) 1594 and storage units 1596 near the front wall 14 of the vehicle 10. A refrigerator may also be embedded in the storage units 1596. In one embodiment, the vehicle 10 may have V-shaped front wall 14 that follows the general contour of the tongue of the frame. The use of a V-shaped front wall 14 may be used to provide additional space in the interior of the vehicle 10. For example, a wash basin may be positioned in the V-shaped nose of the vehicle 10. It should be appreciated that many additional components of conventional recreational vehicles may also be included in the vehicle 10.

In one embodiment, the vehicle 10 may be no more than 25 feet in length from the tip of the tongue to the end of the bumper. In other embodiments, the vehicle 10 may be no more than 24, 23, 22, 21, 20, 19, 18, 17, or 16 feet in length. The vehicle 10 may also be configured to have at least about 10 feet of unobstructed cargo space. In other embodiments, the vehicle 10 may have at least about 11, 12, 13, 14, 15, or 16 feet of unobstructed cargo space. Unobstructed cargo space is meant to refer to space where there are no major items positioned between the side walls 16, 18 that would substantially impede the loading and/or unloading of off-road vehicles. For example, the cargo area 28 would still be considered "unobstructed cargo space" even though there is a small protrusion into the cargo area 28 near the floor 26 caused by the placement of a fuel filling line. Also, the cargo area 28 would still be considered "unobstructed cargo space" even though one or more couches, dinettes, etc. are fold-up flat against the side walls 16, 18.

Referring to FIG. 280, the vehicle 10 may be configured to include two systems 12 where one of the systems is used to vertically move one or more beds and the other system 12 may be used to vertically move one or more off-road vehicles. The system 12 used to vertically move an off-road vehicle includes lifting assemblies 1390*a*, 1390*b*, 1390*c*, 1390*d* (collectively referred to as "the lifting assemblies 1390"). In general, the lifting assemblies 1390 operate in a similar manner to the lifting assemblies 630. However, a cross member 1388 extends between the lower ends 626 of the lifting assemblies 1390*a*, 1390*c* and the lifting assemblies 1390*b*, 1390*d*. The cross members 1388 are configured to be similar to the cross members 614. The cross members 1388 are positioned on the side walls 16, 18 to pass underneath the lifting assemblies 630*a*, 630*b*. From one point of view, the system 12 used to vertically move an off-road vehicle is similar to the system 12 used to move the beds 640, 641, except that the cross members 1388 extend between the lower ends 626 of the lifting assemblies 1390 in the former system 12 while the cross members 614 extend between the upper ends 624 of the lifting assemblies 630 in the latter system 12. The configuration of the sprockets 722, 724, flexible drive members 616, and the like may otherwise be the same between the two systems. It should be noted however, that sprockets are used at the upper ends 624 of the lifting assemblies 1390 to engage the flexible drive members 616, which in this embodiment may be roller chains.

Each of the lifting assemblies 1390 may include a moving assembly 1392*a*, 1392*b*, 1392*c*, 1392*d* (collectively referred to as "the moving assemblies 1392")—alternatively referred to herein as a carriage, a trolley, a sliding unit, or a moving guide assembly—and a guide assembly 1394*a*, 1394*b*, 1394*c*, 1394*d* (collectively referred to as the "the guide assemblies 1394")—alternatively referred to herein as a support assembly. It should be noted that the moving assemblies 1392 do not include mounting members 840 which extend outward from the moving assemblies 1392. This may be desirable to prevent the mounting members 840 from interfering with the vertical movement of the beds 640, 641. A support structure (not shown) may be provided which is configured to be coupled to the moving assemblies 1392 and to receive one or more off-road vehicles. The support structure may engage the moving assemblies 1392 by extending through the gap 1396 in the guide assemblies 1394 and resting on the top of the moving assemblies 1392. Numerous additional embodiments may also be provided for how the support structure engages the moving assemblies 1392.

In one embodiment, the off-road vehicles may be four-wheelers. The four-wheelers may be positioned on the support structure so that the handlebars are near the lifting assemblies 1390*a*, 1390*b*. The four-wheelers may be raised so that the handlebars are near the ceiling 24 of the vehicle 10 and the seats are near the underside of the lower bed 640. Additional four-wheelers may be backed into the cargo area 28 so that the seats of the additional four-wheelers are positioned underneath the support structure and the handlebars are positioned near the rear wall 22. In this manner, the dual systems 12 may be used to fit additional off-road vehicles into the vehicle 10.

FIGS. 281-282 show another embodiment of a system 12 which may be used to vertically move the beds 640, 641 and/or one or more off-road vehicles 1598. The off-road vehicles 1598 may be any suitable off-road vehicle, although ATVs are shown in FIGS. 281-282. The lifting assemblies 630 are positioned inside the side walls 16, 18 of the vehicle 10. This may be desirable to allow the moving assemblies 650 to move down to the floor 26. In FIG. 281, the mattress 52 of the lower bed 640 has been removed to reveal a platform or bed frame 1600. The platform 1600 may be configured similarly to the bed frames 54, 1454. The platform 1600 is capable of receiving one or more off-road vehicles 1598 thereon. The platform 1600 includes anchors 1602 that may be used to secure the off-road vehicles 1598 to the platform 1600. The anchors 1602 may have any suitable configuration. In one embodiment, the anchors 1602 may be D-ring anchors that are capable of pivoting upward when in use and pivoting flat with the platform 1600 when not in use. Also, the rear edge or side wall 1604 of the platform 1600 may be configured to pivot downward to form a small ramp that the off-road vehicles 1598 may use to drive onto the platform 1600. After the off-road vehicle 1598 has been loaded onto the platform 1600, the rear edge 1604 may pivot back up and be secured in place using any suitable fastener. In this manner, the edge 1604 and the front edge or side wall 1606 provide barriers to further prevent the off-road vehicle 1598 from coming off the platform 1600 during travel.

The platform 1600 may be raised as shown in FIG. 282 so that additional off-road vehicles 1598 may be positioned in the vehicle 10 underneath the platform 1600. The number of off-road vehicle 1598 that may be loaded into the vehicle 10 depends on the size of the off-road vehicles 1598. The floor 26 of the vehicle 10 may also include anchors 1602. It should be appreciated that the configuration of the lifting assemblies 630, the upper bed 641, and the platform 1600 may be altered in a number of ways to provide additional embodiments.

Referring to FIGS. 283-289, various embodiments of the vehicles 10 are shown. In the embodiment shown in FIG. 283, the vehicle 10 includes a door 1398 in the first side wall 16. The door 1398 is positioned between the lifting assemblies 30*a*, 30*c*. The door 1398 pivots on a horizontal axis to be used as a ramp to load and unload off-road vehicles. In the embodiment shown in FIG. 284, the door 1398 is positioned as shown in FIG. 283, but in this embodiment, the door 1398 pivots on a vertical axis. In this embodiment, the door 1398 may be used to load and/or unload various items such as bicycles, barbecues, and the like in the cargo area 28.

In another embodiment, shown in FIG. 285, the vehicle 10 may include a door 1400 in the second side wall 18 which is positioned opposite the door 1398 in the first side wall 16. The door 1400 is positioned between the lifting assemblies 30*b*, 30*d*, and the door 1398 is positioned as shown in FIG. 283. Both doors 1398, 1400 pivot on horizontal axes and may be used as ramps to move the off-road vehicles into and out of the vehicle 10. This configuration may allow an off-road vehicle to be loaded using the door 1398 and unloaded using the door 1400. In this manner, the off-road vehicle may move forward during both the loading and unloading operations.

Referring to FIG. 286, another embodiment is shown of the vehicle 10. In this embodiment, the door 1398 may be configured to be wider than the embodiment shown in FIG. 283. In particular, the door 1398 may be configured to extend forward from the lifting assembly 30*c* at the rear of the vehicle 10 to a point beyond the lifting assembly 30*a* sufficient to allow an off-road vehicle to fit through the opening 48 on both the right side of the lifting assembly 30*a* and the left side of the lifting assembly 30*a*. In this embodiment, the lifting assembly 30*a* extends from the first side wall 16 at the top of the opening 48 to the floor 26 in the middle of the opening 48. Thus, an off-road vehicle may be moved into the cargo area either to the left side of the lifting assembly 30*a* (i.e., between the lifting assemblies 30*c*, 30*a*) and the right side of the lifting assembly 30*a* (i.e., between the lifting assembly 30*a* and the first side wall 16 on the right side of the opening 48).

In another embodiment, shown in FIG. 287, the door 1398 may be configured as shown in FIG. 286, but the lifting assembly 30*a* may be removed. In this embodiment, the corner of the bed 40 previously supported by the lifting assembly 30*a* may now be supported using the support 588 which folds out when the bed 40 is lowered. Thus, in this embodiment, the lifting assembly 30*a* is not positioned in the opening 48. As shown in FIGS. 288-289, the configuration of the system 12 shown in FIG. 287 may be used to vertically move the beds 40, 41 between the use configuration 384 and the stowed configuration 388. The upper bed 41 may be supported in the use configuration 384 using straps 1402 coupled to the ceiling 24 of the vehicle 10. Alternatively, the upper bed 41 may be supported using the stops 394 and the support brackets 396. Numerous other embodiments may also be provided.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing Figs. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. The incorporated subject matter should not be used to limit or narrow the scope of the explicitly recited or depicted subject matter.

U.S. Pat. Pub. No. 2016/0332552 (application Ser. No. 15/191,982), titled "Mobile Structure Couch-Bed Configuration," published on 17 Nov. 2017.
U.S. Pat. No. 9,380,881 (application Ser. No. 14/177,936), titled "Strap Bed Lift," issued on 5 Jul. 2016.
  U.S. Prov. App. No. 61/932,634, titled "Bed Lift," filed on 28 Jan. 2014.
U.S. Pat. No. 8,651,545 (application Ser. No. 13/685,471), titled "Bed Lift," issued on 18 Feb. 2014.
U.S. Pat. No. 8,336,940 (application Ser. No. 13/270,046), titled "Structure Including an Item That Moves Vertically," issued on 25 Dec. 2012.
U.S. Pat. No. 8,038,193 (application Ser. No. 12/779,849), titled "Strap Bed Lift," issued on 18 Oct. 2011.
U.S. Pat. No. 7,744,142 (application Ser. No. 12/135,806), titled "Strap Bed Lift," issued on 29 Jun. 2010.
U.S. Pat. No. 7,384,093 (application Ser. No. 11/422,532), titled "System for Lifting Various Objects in a Vehicle," issued on 10 Jun. 2008.
U.S. Pat. No. 7,350,850 (application Ser. No. 11/255,165), titled "Bed that Moves Vertically and Converts into a Couch," issued on 1 Apr. 2008.
  U.S. Prov. App. No. 60/639,676, titled "System and Method for Moving Objects," filed on 27 Dec. 2004.
  U.S. Prov. App. No. 60/621,606, titled "System and Method for Moving Objects," filed on 21 Oct. 2004.
Int'l Pat. Pub. No. WO 2005/012156 (App. No. PCT/US2004/025360), titled "System and Method for Moving Objects," published on 10 Feb. 2005.
  U.S. Prov. App. No. 60/560,872, titled "Systems and Methods for Moving Items in a Vehicle," filed on 9 Apr. 2004.
  U.S. Prov. App. No. 60/544,000, titled "Systems and Methods for Moving Items in a Vehicle," filed on 12 Feb. 2004.
  U.S. Prov. App. No. 60/534,092, titled "Apparatus and Method for Moving Items in a Vehicle," filed on 2 Jan. 2004.
  U.S. Prov. App. No. 60/510,270, titled "Vertical Sliding Mechanisms and Systems," filed on 9 Oct. 2003.
  U.S. Prov. App. No. 60/492,440, titled "Vertical Sliding Mechanisms and Systems," filed on 4 Aug. 2003.
  U.S. Prov. App. No. 60/491,448, titled "Vertical Sliding Mechanisms and Systems," filed on 31 Jul. 2003.

The invention claimed is:

1. A vehicle comprising:
a slide-out room movable between a retracted position where the slide-out room is retracted inside the vehicle and an extended position where the slide-out room is extended outward from the vehicle; and
a bed movable vertically and at least substantially translationally between a lowered position where the bed is positioned to receive one or more persons thereon and a raised position where the bed is stowed;
wherein the bed is coupled to the slide-out room and moves with the slide-out room as the slide-out room moves between the retracted position and the extended position.

2. The vehicle of claim 1 wherein the bed is a first bed, the vehicle comprising:
a second bed positioned above the first bed;
wherein the first bed and the second bed are movable vertically and at least substantially translationally between a lowered position where the first bed and the second bed are spaced apart to receive one or more persons thereon and a raised position where the first bed and the second bed are stowed; and
wherein the first bed and the second bed are coupled to the slide-out room and move with the slide-out room as the slide-out room moves between the retracted position and the extended position.

3. The vehicle of claim 2 wherein the first bed and the second bed are movable vertically and at least substantially translationally between the lowered position, the raised position, and a third position where the first bed is lowered to receive one or more persons thereon and the second bed is raised and stowed.

4. The vehicle of claim 2 wherein the first bed is movable between a sleeping configuration where at least a portion of the first bed is at least substantially flat to receive one or more persons to sleep thereon and a seating configuration where the first bed includes a seat base and a seat back to receive one or more persons to sit thereon.

5. The vehicle of claim 1 wherein the bed is a lower bed, the vehicle comprising:
an upper bed positioned above the lower bed;
wherein the upper bed is coupled to the slide-out room and moves with the slide-out room as the slide-out room moves between the retracted position and the extended position.

6. The vehicle of claim 1 wherein:
the slide-out room comprises:
  a first side wall; and
  a second side wall positioned opposite the first side wall;
wherein the bed is coupled to the first wall and the second wall.

7. The vehicle of claim 1 wherein:
the slide-out room comprises:
  a first side wall;
  a second side wall positioned opposite the first side wall; and
  a rear wall coupled to and extending between the first side wall and the second side wall;
the bed comprises:
  a first side bounded by the first side wall of the slide-out room;
  a second side positioned opposite the first side of the bed, the second side of the bed being bounded by the second side wall of the slide-out room; and
  a rear side extending between the first side of the bed and the second side of the bed, the rear side of the bed being bounded by the rear wall of the slide-out room; and
  a front side extending between the first side of the bed and the second side of the bed, the front side of the bed being open to an interior of the vehicle.

8. The vehicle of claim 1 wherein the bed is stowed adjacent to a ceiling of the vehicle in the raised position.

9. The vehicle of claim 8 wherein the bed is stowed adjacent to a ceiling of the slide-out room in the raised position.

10. The vehicle of claim 1 wherein the bed is positioned parallel to a lengthwise direction of the vehicle.

11. The vehicle of claim 1 wherein the vehicle is a motorhome.

12. The vehicle of claim 1 comprising:

a first flexible drive member extending lengthwise in a vertical direction adjacent to a first wall of the slide-out room; and a second flexible drive member extending lengthwise in a vertical direction adjacent to a second wall of the slide-out room;

wherein the first flexible drive member and the second flexible drive member support the weight of the bed and are used to move the bed between the lowered position and the raised position.

13. The vehicle of claim 12 wherein the first flexible drive member and the second flexible drive member each comprise a strap.

14. The vehicle of claim 12 wherein the first flexible drive member and the second flexible drive member each comprise a chain.

15. The vehicle of claim 12 wherein the first flexible drive member and the second flexible drive member each comprise a cable.

16. The vehicle of claim 12 wherein the first flexible drive member and the second flexible drive member are each at least part of an endless loop.

17. The vehicle of claim 1 comprising:

a first stop coupled to the slide-out room, the first stop being positioned to support the bed in the lowered position; and a second stop coupled to the slide-out room, the second stop being positioned to support the bed in the lowered position.

18. The vehicle of claim 1 comprising:

a first guide member coupled to the slide-out room, the first guide member being configured to guide vertical movement of the bed and prevent the bed from swinging horizontally as the bed moves between the lowered position and the raised position; and a second guide member coupled to the slide-out room, the second guide member being configured to guide vertical movement of the bed and prevent the bed from swinging horizontally as the bed moves between the lowered position and the raised position.

19. The vehicle of claim 18 comprising:

a first moving member coupled to the bed, the first moving member cooperating with the first guide member to guide vertical movement of the bed and prevent the bed from swinging horizontally as the bed moves between the lowered position and the raised position; and a second moving member coupled to the bed, the second moving member cooperating with the second guide member to guide vertical movement of the bed and prevent the bed from swinging horizontally as the bed moves between the lowered position and the raised position.

20. The vehicle of claim 1 comprising a motor configured to drive movement of the bed between the lowered position and the raised position.

21. The vehicle of claim 20 comprising a switch configured to deactivate the motor when the bed reaches the lowered position and/or the raised position.

22. The vehicle of claim 20 wherein the motor is positioned under the bed and moves vertically with the bed as the bed moves between the lowered position and the raised position.

23. The vehicle of claim 1 comprising:

a first flexible drive member extending lengthwise in a vertical direction adjacent to a first wall of the slide-out room;

a second flexible drive member extending lengthwise in a vertical direction adjacent to a second wall of the slide-out room;

a first guide member coupled to the slide-out room;

a second guide member coupled to the slide-out room;

a first moving member coupled to the bed, the first moving member cooperating with the first guide member to guide vertical movement of the bed and prevent the bed from swinging horizontally as the bed moves between the lowered position and the raised position;

a second moving member coupled to the bed, the second moving member cooperating with the second guide member to guide vertical movement of the bed and prevent the bed from swinging horizontally as the bed moves between the lowered position and the raised position; and a motor configured to drive movement of the first flexible drive member and the second flexible drive member and thereby move the bed between the lowered position and the raised position;

wherein the motor is positioned under the bed and is moveably vertically with the bed as die bed moves between the lowered position and the raised position.

24. The vehicle of claim 23 wherein die first flexible drive member comprises a first strap and the second flexible drive member comprises a second strap, and wherein the motor is configured to wrap the first strap and the second strap on a shaft to move the bed from die lowered position to the raised position.

25. A bed lift system for a slide-out room in a vehicle, the bed lift system comprising:

a bed frame configured to fit in the slide-out room of the vehicle;

a first flexible drive member configured to be coupled to the slide-out room and extend downward to the bed frame;

a second flexible drive member configured to be coupled to the slide-out room and extend downward to the bed frame;

a motor coupled to the bed frame, the motor being configured to drive movement of the first flexible drive member and the second flexible drive member to move the bed frame vertically and at least substantially translationally between a lowered position in the slide-out room and a raised position in die slide-out room where the bed frame is stowed, the motor also being configured to move vertically with the bed frame;

a first guide member configured to be coupled to the slide-out room;

a second guide member configured to be coupled to the slide-out room;

a first moving member coupled to the bed, the first moving member cooperating with the first guide member when the first guide member is coupled to the slide-out room to guide vertical movement of the bed frame and prevent the bed frame from swinging horizontally as the bed frame moves between the lowered position and the raised position;

a second moving member coupled to the bed, the second moving member cooperating with the second guide member when the second guide member is coupled to the slide-out room to guide vertical movement of the bed frame and prevent the bed frame from swinging horizontally as the bed frame moves between the lowered position and the raised position.

26. The bed lift system of claim 25 wherein the first flexible drive member comprises a first strap and the second flexible drive member comprises a second strap, and wherein the motor is configured to wrap the first strap and the second strap on a shaft to move the bed frame from the lowered position to the raised position.

27. The vehicle of claim 2 wherein the first bed is part of a lower bed assembly, wherein the lower bed assembly is configured to move the second bed from the lowered position to the raised position.

28. The vehicle of claim 3 wherein the first bed is part of a lower bed assembly, wherein the lower bed assembly is configured to move the second bed from the lowered position to the raised position.

* * * * *